US010739865B2

(12) United States Patent
Kramer et al.

(10) Patent No.: US 10,739,865 B2
(45) **Date of Patent: *Aug. 11, 2020**

(54) OPERATING ENVIRONMENT WITH GESTURAL CONTROL AND MULTIPLE CLIENT DEVICES, DISPLAYS, AND USERS

(71) Applicant: Oblong Industries, Inc., Los Angeles, CA (US)

(72) Inventors: Kwindla Hultman Kramer, Los Angeles, CA (US); John Underkoffler, Los Angeles, CA (US); Carlton Sparrell, Los Angeles, CA (US); Navjot Singh, Los Angeles, CA (US); Kate Hollenbach, Los Angeles, CA (US); Paul Yarin, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,913

(22) Filed: Jun. 4, 2019

(65) Prior Publication Data

US 2019/0286243 A1 Sep. 19, 2019

Related U.S. Application Data

(63) Continuation of application No. 16/051,829, filed on Aug. 1, 2018, now Pat. No. 10,353,483, which is a (Continued)

(51) Int. Cl.

*G09G 5/00* (2006.01)
*G06F 3/01* (2006.01)
(Continued)

(52) U.S. Cl.

CPC ................ *G06F 3/017* (2013.01); *G06F 3/02* (2013.01); *G06F 3/0236* (2013.01); (Continued)

(58) Field of Classification Search

CPC ...... G06F 3/017; G06F 3/0325; G06F 3/1423; G06K 9/00375; G06K 9/00355; G06K 2009/3225

See application file for complete search history.

(56) References Cited

U.S. PATENT DOCUMENTS 4,843,568 A 6/1989 Krueger et al.
5,454,043 A 9/1995 Freeman
(Continued)

FOREIGN PATENT DOCUMENTS

CN 102422236 A 4/2012
EP 0899651 A2 3/1999
(Continued)

OTHER PUBLICATIONS

Kenjy, Kitagawa, Development of "MultiVNC", a support tool for IT education, IPSJ SIG Technical Report, Japan, Information Processing Society of Japan, Nov. 20, 2004, vol. 2004, No. 117, p. 67-72.

(Continued)

*Primary Examiner* — Vijay Shankar
(74) *Attorney, Agent, or Firm* — Jeffrey Schox; Shant Tchakerian

(57) ABSTRACT

Embodiments described herein includes a system comprising a processor coupled to display devices, sensors, remote client devices, and computer applications. The computer applications orchestrate content of the remote client devices simultaneously across the display devices and the remote client devices, and allow simultaneous control of the display devices. The simultaneous control includes automatically
(Continued)

detecting a gesture of at least one object from gesture data received via the sensors. The detecting comprises identifying the gesture using only the gesture data. The computer applications translate the gesture to a gesture signal, and control the display devices in response to the gesture signal.

20 Claims, 281 Drawing Sheets

Related U.S. Application Data continuation of application No. 15/843,753, filed on Dec. 15, 2017, now Pat. No. 10,067,571, which is a continuation of application No. 15/582,243, filed on Apr. 28, 2017, now Pat. No. 9,880,635, which is a continuation of application No. 14/145,016, filed on Dec. 31, 2013, now Pat. No. 9,740,293, said application No. 15/843,753 is a continuation of application No. 15/582,243, filed on Apr. 28, 2017, now Pat. No. 9,880,635, which is a continuation of application No. 14/145,016, filed on Dec. 31, 2013, now Pat. No. 9,740,293, which is a continuation-in-part of application No. 14/078,259, filed on Nov. 12, 2013, now Pat. No. 9,684,380, which is a continuation-in-part of application No. 12/572,698, filed on Oct. 2, 2009, now Pat. No. 8,830,168, and a continuation-in-part of application No. 13/850,837, filed on Mar. 26, 2013, now Pat. No. 9,804,902, and a continuation-in-part of application No. 12/417,252, filed on Apr. 2, 2009, now Pat. No. 9,075,441, and a continuation-in-part of application No. 12/487,623, filed on Jun. 18, 2009, now abandoned, and a continuation-in-part of application No. 12/553,845, filed on Sep. 3, 2009, now Pat. No. 8,531,396, and a continuation-in-part of application No. 12/553,902, filed on Sep. 3, 2009, now Pat. No. 8,537,111, and a continuation-in-part of application No. 12/553,929, filed on Sep. 3, 2009, now Pat. No. 8,537,112, and a continuation-in-part of application No. 12/557,464, filed on Sep. 10, 2009, now Pat. No. 9,910,497, and a continuation-in-part of application No. 12/579,340, filed on Oct. 14, 2009, now Pat. No. 9,063,801, and a continuation-in-part of application No. 13/759,472, filed on Feb. 5, 2013, now Pat. No. 9,495,228, and a continuation-in-part of application No. 12/579,372, filed on Oct. 14, 2009, now Pat. No. 9,052,970, and a continuation-in-part of application No. 12/773,605, filed on May 4, 2010, now Pat. No. 8,681,098, and a continuation-in-part of application No. 12/773,667, filed on May 4, 2010, now Pat. No. 8,723,795, and a continuation-in-part of application No. 12/789,129, filed on May 27, 2010, now Pat. No. 9,823,747, and a continuation-in-part of application No. 12/789,262, filed on May 27, 2010, now Pat. No. 8,669,939, and a continuation-in-part of application No. 12/789,302, filed on May 27, 2010, now Pat. No. 8,665,213, and a continuation-in-part of application No. 13/430,509, filed on Mar. 26, 2012, now Pat. No. 8,941,588, and a continuation-in-part of application No. 13/430,626, filed on Mar. 26, 2012, now Pat. No. 8,896,531, and a continuation-in-part of application No. 13/532,527, filed on Jun. 25, 2012, now Pat. No. 8,941,589, said application No. 14/145,016 is a continuation-in-part of application No. 12/572,689, filed on Oct. 2, 2009, now Pat. No. 8,866,740, and a continuation-in-part of application No. 12/572,698, filed on Oct. 2, 2009, now Pat. No. 8,830,168, and a continuation-in-part of application No. 12/109,263, filed on Apr. 24, 2008, now Pat. No. 8,407,725, and a continuation-in-part of application No. 12/417,252, filed on Apr. 2, 2009, now Pat. No. 9,075,441, said application No. 14/078,259 is a continuation-in-part of application No. 13/532,605, filed on Jun. 25, 2012, now abandoned, and a continuation-in-part of application No. 13/532,628, filed on Jun. 25, 2012, now Pat. No. 8,941,590, and a continuation-in-part of application No. 13/888,174, filed on May 6, 2013, now Pat. No. 8,890,813, and a continuation-in-part of application No. 13/909,980, filed on Jun. 4, 2013, now abandoned, and a continuation-in-part of application No. 14/048,747, filed on Oct. 8, 2013, now Pat. No. 9,952,673, and a continuation-in-part of application No. 14/064,736, filed on Oct. 28, 2013, now Pat. No. 10,642,364.

(60) Provisional application No. 61/747,940, filed on Dec. 31, 2012, provisional application No. 61/785,053, filed on Mar. 14, 2013, provisional application No. 61/787,650, filed on Mar. 15, 2013, provisional application No. 61/787,792, filed on Mar. 15, 2013, provisional application No. 61/500,416, filed on Jun. 23, 2011.

(51) Int. Cl.

| | |
|---|---|
| ***H04L 29/08*** | (2006.01) |
| ***G06K 9/00*** | (2006.01) |
| ***G06F 3/023*** | (2006.01) |
| ***G06F 3/03*** | (2006.01) |
| ***G06F 3/0346*** | (2013.01) |
| ***G06F 3/0354*** | (2013.01) |
| ***G06F 3/0481*** | (2013.01) |
| ***G06F 3/02*** | (2006.01) |
| ***H04N 7/15*** | (2006.01) |
| ***H04M 3/56*** | (2006.01) |
| ***H04N 7/14*** | (2006.01) |
| ***G06F 3/0484*** | (2013.01) |
| *G06K 9/32* | (2006.01) |
| *G06K 9/46* | (2006.01) |

(52) U.S. Cl.

CPC .......... *G06F 3/0304* (2013.01); *G06F 3/0325* (2013.01); *G06F 3/0346* (2013.01); *G06F 3/03545* (2013.01); *G06F 3/04812* (2013.01); *G06F 3/04842* (2013.01); *G06F 3/04845* (2013.01); *G06K 9/00375* (2013.01); *G06K 9/00389* (2013.01); *H04L 67/025* (2013.01); *H04M 3/567* (2013.01); *H04N 7/147* (2013.01); *H04N 7/15* (2013.01); *G06K 9/4642* (2013.01); *G06K 2009/3225* (2013.01)

(56) References Cited

U.S. PATENT DOCUMENTS

| | | | |
|---|---|---|---|
| 5,581,276 | A | 12/1996 | Cipolla et al. |
| 5,594,469 | A | 1/1997 | Freeman et al. |
| 5,651,107 | A | 7/1997 | Frank et al. |
| 5,982,352 | A | 11/1999 | Pryor |
| 6,002,808 | A | 12/1999 | Freeman |
| 6,043,805 | A | 3/2000 | Hsieh |
| 6,049,798 | A | 4/2000 | Bishop et al. |
| 6,072,494 | A | 6/2000 | Nguyen |
| 6,075,895 | A | 6/2000 | Qiao et al. |
| 6,191,773 | B1 | 2/2001 | Maruno et al. |
| 6,198,485 | B1 | 3/2001 | Mack et al. |

(56) References Cited

U.S. PATENT DOCUMENTS 6,215,890 B1 4/2001 Matsuo et al.
6,222,465 B1 4/2001 Kumar et al.
6,256,033 B1 7/2001 Nguyen
6,351,744 B1 2/2002 Landresse
6,385,331 B2 5/2002 Harakawa et al.
6,456,728 B1 9/2002 Doi et al.
6,486,874 B1 11/2002 Muthuswamy et al.
6,501,515 B1 12/2002 Iwamura
6,515,669 B1 2/2003 Mohri
6,703,999 B1 3/2004 Iwanami et al.
6,807,583 B2 10/2004 Hrischuk et al.
6,819,782 B1 11/2004 Imagawa et al.
6,950,534 B2 9/2005 Cohen et al.
7,034,807 B2 4/2006 Maggioni
7,042,440 B2 5/2006 Pryor et al.
7,050,606 B2 5/2006 Paul et al.
7,058,204 B2 6/2006 Hildreth et al.
7,109,970 B1 9/2006 Miller
7,129,927 B2 10/2006 Mattsson
7,145,551 B1 12/2006 Bathiche et al.
7,159,194 B2 1/2007 Wong et al.
7,164,117 B2 1/2007 Breed et al.
7,170,492 B2 1/2007 Bell
7,227,526 B2 6/2007 Hildreth et al.
7,229,017 B2 6/2007 Richley et al.
7,259,747 B2 8/2007 Bell
7,280,346 B2 10/2007 Lewis et al.
7,340,077 B2 3/2008 Gokturk et al.
7,348,963 B2 3/2008 Bell
7,366,368 B2 4/2008 Morrow et al.
7,372,977 B2 5/2008 Fujimura et al.
7,379,563 B2 5/2008 Shamaie
7,379,566 B2 5/2008 Hildreth
7,379,613 B2 5/2008 Dowski et al.
7,389,591 B2 6/2008 Jaiswal et al.
7,421,093 B2 9/2008 Hildreth et al.
7,428,542 B1 9/2008 Fink et al.
7,428,736 B2 9/2008 Dodge et al.
7,430,312 B2 9/2008 Gu
7,436,595 B2 10/2008 Cathey et al.
7,466,308 B2 12/2008 Dehlin
7,466,398 B2 12/2008 Cheng et al.
7,519,223 B2 4/2009 Dehlin et al.
7,555,142 B2 6/2009 Hildreth et al.
7,555,613 B2 6/2009 Ma
7,559,053 B2 7/2009 Krassovsky et al.
7,570,805 B2 8/2009 Gu
7,574,020 B2 8/2009 Shamaie
7,576,727 B2 8/2009 Bell
7,598,942 B2 10/2009 Underkoffler et al.
7,627,834 B2 12/2009 Rimas-Ribikauskas et al.
7,665,041 B2 2/2010 Wilson et al.
7,685,083 B2 3/2010 Fairweather
7,692,131 B2 4/2010 Fein et al.
7,725,547 B2 5/2010 Albertson et al.
7,822,267 B2 10/2010 Gu
7,827,698 B2 11/2010 Jaiswal et al.
7,834,846 B1 11/2010 Bell
7,848,542 B2 12/2010 Hildreth
7,850,526 B2 12/2010 Zalewski et al.
7,854,655 B2 12/2010 Mao et al.
7,898,522 B2 3/2011 Hildreth et al.
7,949,157 B2 5/2011 Afzulpurkar et al.
7,966,353 B2 6/2011 Wilson
7,979,850 B2 7/2011 Ivanov et al.
7,984,452 B2 7/2011 Chakravarty et al.
7,991,920 B2 8/2011 Back et al.
8,059,089 B2 11/2011 Daniel
8,094,873 B2 1/2012 Kelusky et al.
8,116,518 B2 2/2012 Shamaie et al.
8,144,148 B2 3/2012 El et al.
8,212,550 B2 7/2012 Katsurahira et al.
8,234,578 B2 7/2012 Ferren et al.
8,254,543 B2 8/2012 Sasaki et al.
8,259,996 B2 9/2012 Shamaie
8,269,817 B2 9/2012 Kumar et al.
8,274,535 B2 9/2012 Hildreth et al.
8,280,732 B2 10/2012 Richter et al.
8,300,042 B2 10/2012 Bell
8,325,214 B2 12/2012 Hildreth
8,341,635 B2 12/2012 Arimilli et al.
8,355,529 B2 1/2013 Wu et al.
8,363,098 B2 1/2013 Rosener et al.
8,370,383 B2 2/2013 Kramer et al.
8,401,125 B2 3/2013 Wang et al.
8,407,725 B2 3/2013 Kramer et al.
8,472,665 B2 6/2013 Hildreth
8,531,396 B2 9/2013 Underkoffler et al.
8,537,111 B2 9/2013 Kramer et al.
8,537,112 B2 9/2013 Kramer et al.
8,559,676 B2 10/2013 Hildreth
8,565,535 B2 10/2013 Shamaie
8,593,576 B2 11/2013 Friedman
8,625,849 B2 1/2014 Hildreth et al.
8,659,548 B2 2/2014 Hildreth
8,666,115 B2 3/2014 Perski et al.
8,669,939 B2 3/2014 Underkoffler et al.
8,681,098 B2 3/2014 Underkoffler et al.
8,704,767 B2 4/2014 Dodge et al.
8,723,795 B2 5/2014 Underkoffler et al.
8,726,194 B2 5/2014 Hildreth
8,745,541 B2 6/2014 Wilson et al.
8,769,127 B2 7/2014 Selimis et al.
8,830,168 B2 9/2014 Underkoffler et al.
8,856,691 B2 10/2014 Geisner et al.
8,866,740 B2 10/2014 Underkoffler et al.
8,941,589 B2 1/2015 Csaszar et al.
9,063,801 B2 6/2015 Kramer et al.
9,075,441 B2 7/2015 St. Hilaire et al.
9,213,890 B2 12/2015 Huang et al.
9,261,979 B2 2/2016 Shamaie et al.
9,317,128 B2 4/2016 Minnen et al.
9,465,457 B2 10/2016 Thompson et al.
9,684,380 B2 6/2017 Kramer et al.
9,740,293 B2 8/2017 Kramer et al.
9,740,922 B2 8/2017 Csaszar et al.
9,823,764 B2 11/2017 Schwesinger et al.
9,880,635 B2 1/2018 Kramer et al.
9,990,046 B2 6/2018 Minnen et al.
10,067,571 B2 9/2018 Kramer et al.
10,296,099 B2 5/2019 Kramer et al.
10,353,483 B2 * 7/2019 Kramer ............... G06F 3/03545
2002/0041327 A1 4/2002 Hildreth et al.
2002/0065950 A1 5/2002 Katz et al.
2002/0085030 A1 7/2002 Ko et al.
2002/0126876 A1 9/2002 Paul et al.
2002/0184401 A1 12/2002 Kadel et al.
2002/0186200 A1 12/2002 Green
2002/0186221 A1 12/2002 Bell
2002/0194393 A1 12/2002 Hrischuk et al.
2003/0048280 A1 3/2003 Russell
2003/0076293 A1 4/2003 Mattsson
2003/0103091 A1 6/2003 Wong et al.
2003/0169944 A1 9/2003 Dowski et al.
2004/0125076 A1 7/2004 Green
2004/0145808 A1 7/2004 Cathey et al.
2004/0161132 A1 8/2004 Cohen et al.
2004/0183775 A1 9/2004 Bell
2004/0193413 A1 9/2004 Wilson et al.
2005/0006154 A1 1/2005 Back et al.
2005/0031166 A1 2/2005 Fujimura et al.
2005/0212753 A1 9/2005 Marvit et al.
2005/0257013 A1 11/2005 Ma
2006/0010400 A1 1/2006 Dehlin et al.
2006/0055684 A1 3/2006 Rimas-Ribikauskas et al.
2006/0098873 A1 5/2006 Hildreth et al.
2006/0138225 A1 6/2006 Richley et al.
2006/0173929 A1 8/2006 Wilson
2006/0177103 A1 8/2006 Hildreth
2006/0187196 A1 8/2006 Underkoffler et al.
2006/0208169 A1 9/2006 Breed et al.
2006/0210112 A1 9/2006 Cohen et al.
2006/0269145 A1 11/2006 Roberts
2006/0281453 A1 12/2006 Jaiswal et al.

(56) References Cited

U.S. PATENT DOCUMENTS

| | | | |
|---|---|---|---|
| 2007/0021208 | A1 | 1/2007 | Mao et al. |
| 2007/0109266 | A1 | 5/2007 | Davis et al. |
| 2007/0112714 | A1 | 5/2007 | Fairweather |
| 2007/0121125 | A1 | 5/2007 | Dodge et al. |
| 2007/0139541 | A1 | 6/2007 | Fein et al. |
| 2007/0266310 | A1 | 11/2007 | Sasaki et al. |
| 2007/0282951 | A1 | 12/2007 | Selimis et al. |
| 2007/0288467 | A1 | 12/2007 | Strassner et al. |
| 2008/0013793 | A1 | 1/2008 | Hillis et al. |
| 2008/0036743 | A1 | 2/2008 | Westerman et al. |
| 2008/0148149 | A1 | 6/2008 | Singh et al. |
| 2008/0170776 | A1 | 7/2008 | Albertson et al. |
| 2008/0208517 | A1 | 8/2008 | Shamaie |
| 2008/0222660 | A1 | 9/2008 | Tavi et al. |
| 2008/0225041 | A1 | 9/2008 | El et al. |
| 2008/0225042 | A1 | 9/2008 | Birtwistle et al. |
| 2009/0184924 | A1 | 7/2009 | Uchida |
| 2010/0013905 | A1 | 1/2010 | Kumar et al. |
| 2010/0060568 | A1 | 3/2010 | Fisher et al. |
| 2010/0281432 | A1 | 11/2010 | Geisner et al. |
| 2010/0306713 | A1 | 12/2010 | Geisner et al. |
| 2010/0315439 | A1 | 12/2010 | Huang et al. |
| 2011/0025598 | A1 | 2/2011 | Underkoffler et al. |
| 2011/0090407 | A1 | 4/2011 | Friedman |
| 2011/0291926 | A1 | 12/2011 | Gokturk et al. |
| 2012/0069168 | A1 | 3/2012 | Huang et al. |
| 2012/0119985 | A1 | 5/2012 | Kang |
| 2012/0229383 | A1 | 9/2012 | Hamilton et al. |
| 2012/0239396 | A1 | 9/2012 | Johnston et al. |
| 2015/0054729 | A1 | 2/2015 | Minnen et al. |
| 2015/0077326 | A1 | 3/2015 | Kramer et al. |
| 2016/0162082 | A1 | 6/2016 | Schwesinger et al. |
| 2017/0038846 | A1 | 2/2017 | Minnen et al. |
| 2018/0107281 | A1 | 4/2018 | Kramer et al. |
| 2018/0299966 | A1 | 10/2018 | Minnen et al. |
| 2019/0171496 | A1 | 6/2019 | Kramer et al. |

FOREIGN PATENT DOCUMENTS

| | | | |
|---|---|---|---|
| EP | 1883238 | B1 | 4/2014 |
| JP | 2001228843 | A | 8/2001 |
| JP | 2003085112 | A | 3/2003 |
| JP | 2006031359 | A | 2/2006 |
| JP | 2008123408 | A | 5/2008 |
| WO | 1989009972 | A1 | 10/1989 |
| WO | 1999035633 | A2 | 7/1999 |
| WO | 2008134452 | A2 | 11/2008 |
| WO | 2010030822 | A1 | 3/2010 |
| WO | 2010045394 | A1 | 4/2010 |

OTHER PUBLICATIONS

"Addison-Wesley: "Inside Macintosh—vol. I", vol. I Chapter 1-8, Jan. 1, 1985 (Jan. 1, 1985), pp. 1-58."

"Bacon, J.; et al., "Using Events to Build Distributed Applications", Second International Workshop on Services in Distributed and Networked Environments, 1995, pp. 148-155.", Jul. 24, 2015 00:00:00.0.

"Bretzner, Lars et al. "A Prototype System for Computer Vision Based Human Computer Interaction", Technical report CVA251, ISRN KTH NA/P—Jan. 2009—SE. Department of Numerical Analysis and Computer Science, KTH (Royal Institute of Technology), S-100 44 Stockh", Sep. 1, 2017 00:00:00.0.

"Carey, Michael J.; et al., "The Architecture of the Exodus Extensible Dbms", Proceeding OODS, 1986, pp. 52-65.", Feb. 26, 2018 00:00:00.0.

"Hyakutake Akito: et al. 3-D Interaction with a Large Wall Display using Transparent Markers, Graduate School of Information Systems, University of Electro-Communications, 1-5-1 Chofugaoka Chofu Tokyo 182-8585, Japan, pp. 97-100.", Oct. 3, 2017 00:00:00.0.

"Japanese Office Action Japanese Application No. 2017-246355, dated Nov. 6, 2018."

"Jiang,H,; et al., "Demis: A Dynamic Event Model for Interactive Systems", Proceedings of the Acm Symposium on Virtual Reality Software and Technology, 2002, pp. 97-104.", Mar. 12, 2018 00:00:00.0.

"Johanson, B.; et al., "The Event Heap: A Coordination Infrastructure for Interactive Workspaces", Proceedings Fourth IEEE Workshop on Mobile Computing Systems and Applications, 2002, pp. 83-93.", Jul. 28, 2017 00:00:00.0.

"Johanson, B.; et al., "The Interactive Workspaces Project: Experiences with Ubiquitous Computing Rooms", IEEE Pervasive Computing, 2002, vol. 1 (2), pp. 67-74."

"Mansouri-Samani, M.; et al., "A Configurable Event Service for Distributed Systems", Third International Conference on Annapolis Configurable Distributed Systems, 1996, pp. 210-217.", Mar. 12, 2018 00:00:00.0.

"Rubine, D., "Specifying Gestures by Example", Computer Graphics, 1991, vol. 25 (4), pp. 329-337.", Jul. 24, 2015 00:00:00.0.

"Velipasalar S.; et al., "Specifying, Interpreting and Detecting High-level, Spatio-Temporal Composite Events in Single and Multi-Camera Systems", Conference on Computer Vision and Pattern Recognition Workshop, 2006, pp. 110-110.", Feb. 26, 2018 00:00:00.0.

"William A McCuskey., "On Automatic Design of Data Organization", American Federation of Information Processing Societies, 1970, pp. 187-199."

"Your MAC has much further capability! Macintosh power up perfect guide, Mac Power Up Perfect Guide, Mac100%, Japan, Shinyusha Inc., Apr. 1, 2010, vol. 8, pp. 92-93."

Hyakutake, Akito , et al., "3-D Interaction with a Large Wall Display using Transparent Markers", AVI '10, May 25-29, 2010, Rome, Italy, pp. 97-100.

* cited by examiner

MEZZANINE LOGICAL DIAGRAM

MEZZANINE RACK DIAGRAM
NETWORKING & POWER DISTRIBUTION NOT SHOWN (a) *Feature Set B*

(b) *Feature Set C*

Depict pose with left hand as viewed from back p = pinkie
r = ring finger
m = middle finger
i = index finger
t = thumb

<table>
<tr><td>^</td><td>= curled non-thumb</td></tr>
<tr><td>></td><td>= curled thumb</td></tr>
<tr><td>|</td><td>= straight finger or thumb pointed straight up</td></tr>
<tr><td>\ or /</td><td>= straight finger or thumb pointing at angle</td></tr>
<tr><td>x</td><td>= finger or thumb pointing into plane</td></tr>
</table>

<table>
<tr><th></th><th>p</th><th>r</th><th>m</th><th>i</th><th>t</th></tr>
<tr><th>Pose name</th><th colspan="5">Hand Pose</th></tr>
<tr><td>fist</td><td>^</td><td>^</td><td>^</td><td>^</td><td>></td></tr>
<tr><td>ofp-closed</td><td>^</td><td>^</td><td>^</td><td>|</td><td>></td></tr>
<tr><td>ofp-open-left</td><td>^</td><td>^</td><td>^</td><td>|</td><td>-</td></tr>
<tr><td>ofp-open-right</td><td>^</td><td>^</td><td>^</td><td>|</td><td>-</td></tr>
<tr><td>open hand</td><td>\</td><td>/</td><td>\</td><td>/</td><td>-</td></tr>
<tr><td>palm open left</td><td>|</td><td>|</td><td>|</td><td>|</td><td>-</td></tr>
<tr><td>palm open right</td><td>|</td><td>|</td><td>|</td><td>|</td><td>-</td></tr>
<tr><td>victory</td><td>^</td><td>^</td><td>\</td><td>/</td><td>></td></tr>
</table>

FIG. 12

Add hand orientation to complete pose must specify two variables 1. palm direction (if hand were flat)
2. finger direction (if hand were flat)

| | |
|---|---|
| - | medial |
| + | lateral |
| x | anterior |
| * | posterior |
| ^ | cranial |
| v | caudal |

orientation variables come after colon, e.g.:

| | |
|---|---|
| ^ ^ x \| - : - x | x-y-z start position |
| ^ ^ \ / > : * v | upside-down v |

FIG. 13

FIG. 14 - gestures for spatial mapping application in kiosk

| ID | Label | Description | Hand 1 | | Hand 2 | |
|---|---|---|---|---|---|---|
| | | | | | | |
| 1 | grabnav / pan & zoom | drive cursor in zoom and lock cursor to map for lateral or depth scrolling | VV-:x^ or IIII-x^ to ^^^^> | open hand or open palm pushing into screen transitions to fist, which can move in xy - or z plane | | |
| 2 | palette | prompts lens menu | ^^^\|-:x^ | ofp-open ceiling transitions to thumb click | | |
| 3 | victory | full rest out of lens selection | ^^V>:x^ | V-sign | | |
| 4 | frame-it | creates an instance of lens that can be resized | ^^^\|-:x^ | ofp-open hands with the index fingers parallel point upward toward the ceiling. | ^^^\|-:x^ | ofp-open hands with the index fingers parallel point upward toward the ceiling |
| 5 | cinematographer | change aspect ratio of lens, i.e. resize | ^^^\|-:x^ | ofp-open hands with the index finger pointing upward toward the ceiling. | ^^^\|-:x^ | ofp-open hands with the index fingers perpendicular to hand-1 index finger |

FIG. 14

FIG. 15 - gestures for media browser application in kiosk

| ID | Label | Description | Hand 1 | | Hand 2 | |
|---|---|---|---|---|---|---|
| | | | | | | |
| 4 | frame-it | creates an instance of lens that can then be resized | ^^^\|-:X^ | ofp-open hands with the index fingers parallel point upward toward the ceiling. | ^^^\|-:x^ | ofp-open hands with the index fingers parallel point upward toward the ceiling |
| 5 | cinematographer | change aspect ratio of lens, i.e. resize | ^^^\|-:x^ | ofp-open hands with the index finger pointing upward toward the ceiling. | ^^^\|-:x^ | ofp-open hands with the index fingers perpendicular to hand-1 index finger |
| 6 | click L/R | click left/right to previous/next | ^^^\|-:x^ | Ofp-open followed by clicking thumb up | | |
| 7 | home/end | jump to first or last slide, reflecting direction of point | ^^^\|-:x^ or ^^^\|>:x^ | ofp-open or ofp-closed points to fist | ^^^^>:x^ | fist |
| 8 | pushback | push slides into receding perspective, enabling rapid scrolling across slides | \|\|\|\|-:x^ | Push palm toward screen | | |
| 9 | jog dial | velocity-based scrolling through slides | ^^^\|-:x^ | ofp-open | ^^^\|>:x^ | ofp-closed |

FIG. 15

FIG. 16 - gestures for a suite including upload/pointer/rotate applications in kiosk

| ID | Label | Description | Hand 1 | | Hand 2 | |
|---|---|---|---|---|---|---|
| | | | | | | |
| 3 | victory | select application from suite menu | ^^V>:x^ | V-sign | | |
| 8 | pushback | navigate application choices in suite menu | llll-:x^ | Push palm toward screen | | |

FIG. 16

$$f(x) = 1 + \frac{\exp(\varepsilon \cdot \chi) - 1}{\exp(\varepsilon) - 1} \chi \, Z_{max}$$

normalized displacement allows the full zoom range to be mapped to user's individual range of motion (i.e. child + adult have equal control over system despite physical differences in arm length)

1. Depict pose with left hand as viewed from back p = pinkie finger<br>r = ring finger<br>m = middle finger<br>i = index finger<br>t = thumb

<table>
<tr><td>^</td><td>= curled non-thumb</td></tr>
<tr><td>></td><td>= curled thumb</td></tr>
<tr><td>|</td><td>= straight finger or thumb pointed straight up</td></tr>
<tr><td>\ or /</td><td>= straight finger or thumb pointed at angle</td></tr>
<tr><td>-</td><td>= thumb pointing straight sideways</td></tr>
<tr><td>x</td><td>= finger or thumb pointing into plane</td></tr>
</table>

<table>
<tr><th></th><th>p</th><th>r</th><th>m</th><th>i</th><th>t</th></tr>
<tr><th>Pose name</th><th colspan="5">Hand Pose</th></tr>
<tr><td>flat</td><td>|</td><td>|</td><td>|</td><td>|</td><td>|</td></tr>
<tr><td>fist</td><td>^</td><td>^</td><td>^</td><td>^</td><td>></td></tr>
<tr><td>mime gun</td><td>^</td><td>^</td><td>^</td><td>|</td><td>-</td></tr>
<tr><td>2 or peace</td><td>^</td><td>^</td><td>\</td><td>/</td><td>></td></tr>
<tr><td>one-finger point</td><td>^</td><td>^</td><td>^</td><td>|</td><td>></td></tr>
<tr><td>two-finger point</td><td>^</td><td>^</td><td>|</td><td>|</td><td>></td></tr>
<tr><td>x-y-z</td><td>^</td><td>^</td><td>x</td><td>|</td><td>-</td></tr>
<tr><td>ok</td><td>|</td><td>|</td><td>|</td><td>^</td><td>></td></tr>
<tr><td>pinkie point</td><td>|</td><td>^</td><td>^</td><td>^</td><td>></td></tr>
<tr><td>bracket</td><td>x</td><td>x</td><td>x</td><td>x</td><td>x</td></tr>
<tr><td>4</td><td>\</td><td>\</td><td>|</td><td>/</td><td>></td></tr>
<tr><td>3</td><td>^</td><td>\</td><td>|</td><td>/</td><td>></td></tr>
<tr><td>5</td><td>\</td><td>\</td><td>|</td><td>/</td><td>/</td></tr>
</table>

FIG. 22

2. Add hand orientation to complete pose must specify two variables:
1. palm direction (if hand were flat)
2. finger direction (if hand were flat)

| | |
|---|---|
| - | medial |
| + | lateral |
| x | anterior |
| * | posterior |
| ^ | cranial |
| v | caudal |

orientation variables come after colon, e.g.:

| | | |
|---|---|---|
| ^ ^ x \| - : - x | = | x·y·z start position |
| ^ ^ \ / > : * v | = | upside-down v |

FIG. 23

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG. 24

4. Orientation blends

Achieve variable blending by enclosing pairs e.g.:

| | |
|---|---|
| \| \| \| \| \| : (vx) (x^) | flat at 45 degrees pitch toward screen |
| ^ ^ \| \| > : ( - ( - v)) x | two-finger point rolled medially to 22.5 degrees (halfway between palm medial and palm rolled to 45 degrees) |

<table>
<tr><th rowspan="2">Gest I.D.</th><th rowspan="2">Description</th><th colspan="2">Hand 1</th><th colspan="2">Hand 2</th></tr>
<tr><th>Pose</th><th>Motion</th><th>Pose</th><th>Motion</th></tr>
<tr><td>1</td><td>point at object (invoke and move cursor)</td><td>^ ^ ^ | - : - x</td><td>point mime gun</td><td></td><td></td></tr>
<tr><td>2</td><td>select object</td><td>^ ^ ^ | | : - x</td><td>drop thumb to select</td><td></td><td></td></tr>
<tr><td>3</td><td>move spatially / zoom in / out</td><td>^ ^ x | - : - x</td><td>rotate / translate</td><td></td><td></td></tr>
<tr><td>4</td><td>snapshot</td><td>^ ^ ^ | - : x -</td><td>make square with 2 hands</td><td>^ ^ ^ | - : x ^</td><td>make square with 2 hands</td></tr>
<tr><td>5</td><td>demarcate rectangular region</td><td>^ ^ ^ | - : x -</td><td>make square then adjust size</td><td>^ ^ ^ | - : x ^</td><td>make square then adjust size</td></tr>
<tr><td>6</td><td>clear the decks</td><td>| | | | | : + x</td><td>sweep hand laterally</td><td>| | | | | : - x</td><td>sweep hand medially</td></tr>
<tr><td>7</td><td>organize objects into a circle</td><td>^ ^ ^ | - : - ^</td><td>look through circle of O.K. sign</td><td></td><td></td></tr>
<tr><td>8</td><td>two-finger point at objects</td><td>^ ^ | | - : - x</td><td>point</td><td></td><td></td></tr>
<tr><td>9</td><td>two-finger select object</td><td>^ ^ ^ | | : - x</td><td>drop thumb to select</td><td></td><td></td></tr>
<tr><td>10</td><td>mark start time</td><td>x x x x x : - ^</td><td>strike pose</td><td></td><td></td></tr>
<tr><td>11</td><td>mode change 1</td><td>| | | | | : - ^</td><td>strike pose-make "T" with two hands</td><td>| | | | | : v -</td><td>strike pose-make "T" with two hands</td></tr>
<tr><td>12</td><td>mode change 11</td><td>| | | | | : - ^</td><td>strike pose - parallel hands</td><td>| | | | | : - ^</td><td>strike pose - parallel hands</td></tr>
<tr><td>13</td><td>push back and slide workspace</td><td>| | | | - : x ^</td><td>push palm toward screen - - move sideways to find new regions</td><td></td><td></td></tr>
</table>

FIG. 27A

<table>
<tr><th rowspan="2">Gest I.D.</th><th rowspan="2">Description</th><th colspan="2">Hand 1</th><th colspan="2">Hand 2</th></tr>
<tr><th>Pose</th><th>Motion</th><th>Pose</th><th>Motion</th></tr>
<tr><td>14</td><td>enter sub-application</td><td>| | | | | : x ^</td><td>strike pose</td><td>| | | | | : x ^</td><td>strike pose</td></tr>
<tr><td>15</td><td>return from sub-application</td><td>| | | | | : . ^</td><td>strike pose</td><td>| | | | | : . ^</td><td>strike pose</td></tr>
<tr><td>16</td><td>select option</td><td>^ ^ ^ | - : - x</td><td>medial roll</td><td></td><td></td></tr>
<tr><td>17</td><td>roll time forward/back</td><td>| | | | | : v x</td><td>Yaw hand at elbow while keeping hand parallel to floor</td><td></td><td></td></tr>
<tr><td>18</td><td>stop time</td><td>| | | | | : x ^</td><td>strike pose</td><td></td><td></td></tr>
<tr><td>19</td><td>loop time</td><td>^ ^ ^ | - : x ^</td><td>circular motion with "L"</td><td></td><td></td></tr>
<tr><td>20</td><td>demarcate irregular region</td><td>^ ^ ^ | - : v x</td><td>start with 2 finger tips together. 1 hand holds start position.</td><td>^ ^ ^ | - : - x</td><td>other hand traces out shape - select "click" for vertices</td></tr>
<tr><td>21</td><td>tag object</td><td>| ^ ^ ^ > : - x</td><td>pinky-point at object then roll hand medially</td><td></td><td></td></tr>
<tr><td>22</td><td>group data streams</td><td>^ ^ ^ | - : v x</td><td>bring finger tips of two hands together</td><td>^ ^ ^ | - : v x</td><td>bring finger tips of two hands together</td></tr>
<tr><td>23</td><td>restore encapsulated workspace</td><td>| | | | | : + x</td><td>sweep hand medially</td><td>| | | | | : - x</td><td>sweep hand laterally</td></tr>
</table>

FIG. 27B first quadword of every slaw

| | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
| | | | | |
| wee cons: | 01xxxxxx | xxxxxxxx | xx●xxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xx●xxxxx | xxxxxxxx |
| wee list quadlen: | rrrrqqqq | qqqqqqqq | qqqqqqqq | qqqqqqqq |
| | | | | |
| full string: | 1*100000 | 00000000 | 00000000 | 00000001 |
| full cons: | 1*100000 | 00000000 | 00000000 | 00000010 |
| | | | | |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

| | | | | |
|---|---|---|---|---|
| numeric: | 00001xxx | xxxxxxxx | xxxxxxxx | xxxxxxxx |
| | | | | |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xx●xxxxx | xxxxxxxx |

FIG. 33B1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

| | | | | |
|---|---|---|---|---|
| numeric 2-vector: | xxxxxxxx | xxx01xxx | xxxxxxxx | xxxxxxxx |
| numeric 3-vector: | xxxxxxxx | xxx10xxx | xxxxxxxx | xxxxxxxx |
| numeric 4-vector: | xxxxxxxx | xxx11xxx | xxxxxxxx | xxxxxxxx |

for any numeric entity, array or not, a size-in-bytes-minus-one is stored in the last eight bits -- if a singleton, this describes the size of the data part; if an array, it's the size of a single element -- so:

| | | | | |
|---|---|---|---|---|
| num'c unit bsize mask: | 00001xxx | xxxxxxxx | xxxxxxxx | mmmmmmmm |

and for arrays, there are these:

| | | | | |
|---|---|---|---|---|
| num'c breadth follows: | xxxxxxxx | xxxxx1xx | xxxxxxxx | xxxxxxxx |
| num'c 8-byte breadth: | xxxxxxxx | xxxxx11x | xxxxxxxx | xxxxxxxx |
| num'c wee breadth mask: | xxxxxxxx | xxxxx0mm | mmmmmmmm | xxxxxxxx |

FIG. 33B2

Client -> Mezzanine Heartbeat

Web client: Join a session

Client Machine | Native Machine

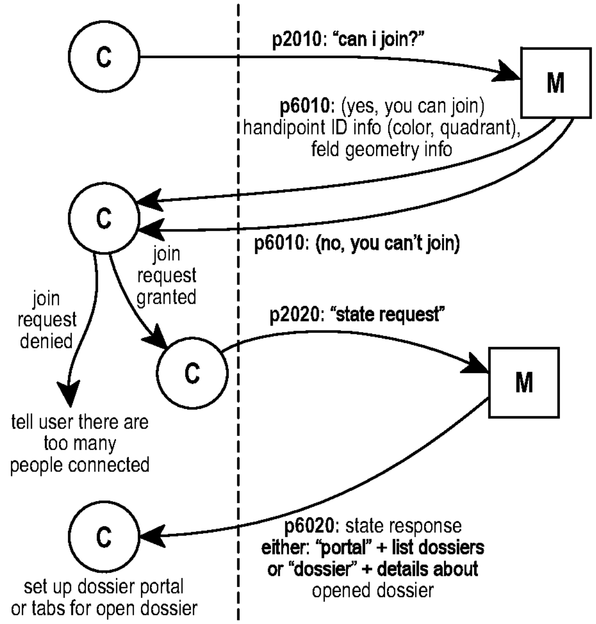

Protein Definitions

```
p2010: "can i join?"
d: {mezzanine, [prot-spec: v1.0],
      request, join,
      [from: [10.10.192.74, 84]]}
i:  *none

p6010: (can join)
d:  {mezzanine, [prot-spec: v1.0],
      response, join,
      [from: native_mezz],
      [to: [10.10.192.74, 84]]}
i:  {permission: true,
      handipoint: {color: v4f <r, g, b, a>,
        quadrant: v2f<h, v>},
      felds: {
        left: {type: "wall",
             cent: v3f<x, y, z>,
             phys-size: v2f<w, h>,
             norm: v3f<x,y,z>,
             over: v3f<x,y,z>,
             px-size:  v2i <w, h>,
             px-origin: v2i <x, y>}
        main: { ... },
        right: { ... } } }

p6010: (can't join)
d:  {mezzanine, [prot-spec: v1.0],
      response, join,
      [from: native_mezz]
      [to: [10.10.192.74, 84]]}
i:  {permission: false}

p2020: (state request)
d:  {mezzanine, [prot-spec: v1.0],
      request, mez-state, [detail: full],
      [from: [10.10.192.74, 85]]}
i:  *none
```

```
p6020: state-response (portal)
d: {mezzanine, [prot-spec: v1.0],
      response, mez-state, [detail: full],
      [from: native_mezz],
      [to: [10.10.192.74, 85]]}
i:  {state: portal,
      uids: [uid1, uid2, ... uidn],
      dossiers:
        {uid1:
           {name: "dossier name",
           thumb_url: "http://...",
           modified:  2011 Apr 20 16:20:00}
        uid2: { ... },
        ....
        uidn: { ... }}}

p6020:  state-response (dossier)
d:  {mezzanine, [prot-spec: v1.0],
      response, mez-state, [detail: full],
      [from: native_mezz],
      [to: [10.10.192.74, 85]]}
i:  {state: dossier,
      dossier: {
        uid: 02342342781023423,
        name: "kitten presentation",
        deck: { num-slides: 23,
            visible-left-slide: 21.0,
            cur-slide: 22,
            visible-right-slide: 22.0,
            pushback-state: 0.0},
        assets: [ [uid1, name, url],
            [uid2, name, url],
            ...
            [uidn, name, url]]}}
```

FIG. 44

Web client: Join a session

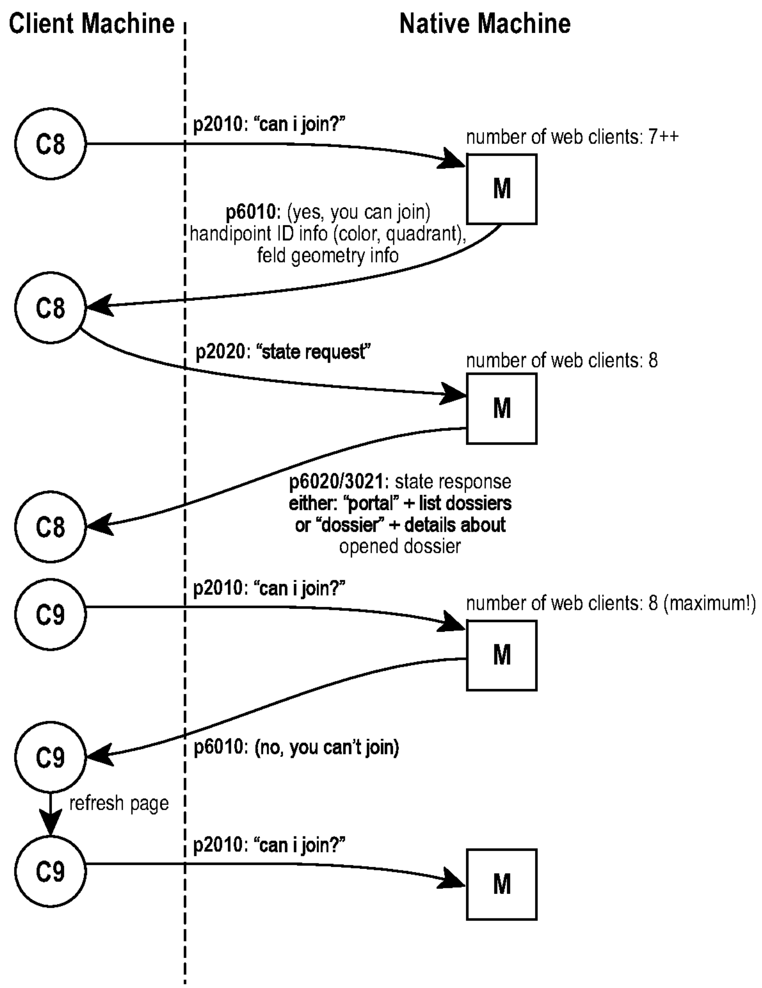

Protein Definitions

```
p2010: "can i join?"
d: {mezzanine,
    [prot-spec: v1.0], request, join,
    [from: [10.10.192.74, 84]]}
i: *none

p6010: (can join)
d: {mezzanine,
    [prot-spec: v1.0], response, join,
    [from: native_mezz],
    [to: [10.10.192.74, 84]]}
i: {permission: true,
    handipoint: {color: v4f <r, g, b, a>,
      quadrant: v2f<h, v>},
    felds: {
      left: {type: "wall",
          cent: v3f<x, y, z>,
          phys-size: v2f<w, h>,
          norm: v3f<x,y,z>,
          over: v3f<x,y,z>,
          px-size: v2i <w, h>,
          px-origin: v2i <x, y>}
      main: { ... },
      right: { ... } } }

p6011: (can't join)
d: {mezzanine,
    [prot-spec: v1.0], response, join,
    [from: native_mezz]
    [to: [10.10.192.74, 84]]}
i: {permission: false}

p2020: (state request)
d: {mezzanine,
    [prot-spec: v1.0], request, mez-state,
    [detail: full],
    [from: [10.10.192.74, 85]]}
i: *none

p6020: state-response (portal)
d: {mezzanine,
    [prot-spec: v1.0], response, mez-state,
    [detail: full],
    [from: native_mezz],
    [to: [10.10.192.74, 85]]}
i: {state: portal,
    uids: [uid1, uid2, ... uidn],
    dossiers:
      {uid1:
         {name: "dossier name",
         thumb_url: "http://...",
         modified: 2011 Apr 20 16:20:00}
      uid2: { ... },
      ....
      uidn: { ... }}}

p6021: state-response (dossier)
d: {mezzanine,
    [prot-spec: v1.0], response, mez-state,
    [detail: full],
    [from: native_mezz],
    [to: [10.10.192.74, 85]]}

i: {state: dossier,
    dossier: {
      uid: 02342342781023423,
      name: "kitten presentation",
      deck: { num-slides: 23,
          visible-left-slide: 21.0,
          cur-slide: 22,
          visible-right-slide: 22.0,
          pushback-state: 0.0},
      assets: [ [uid1, name, url],
          [uid2, name, url],
          ...
          [uidn, name, url]]}}
```

FIG. 45

Web client: New dossier [error case 1]

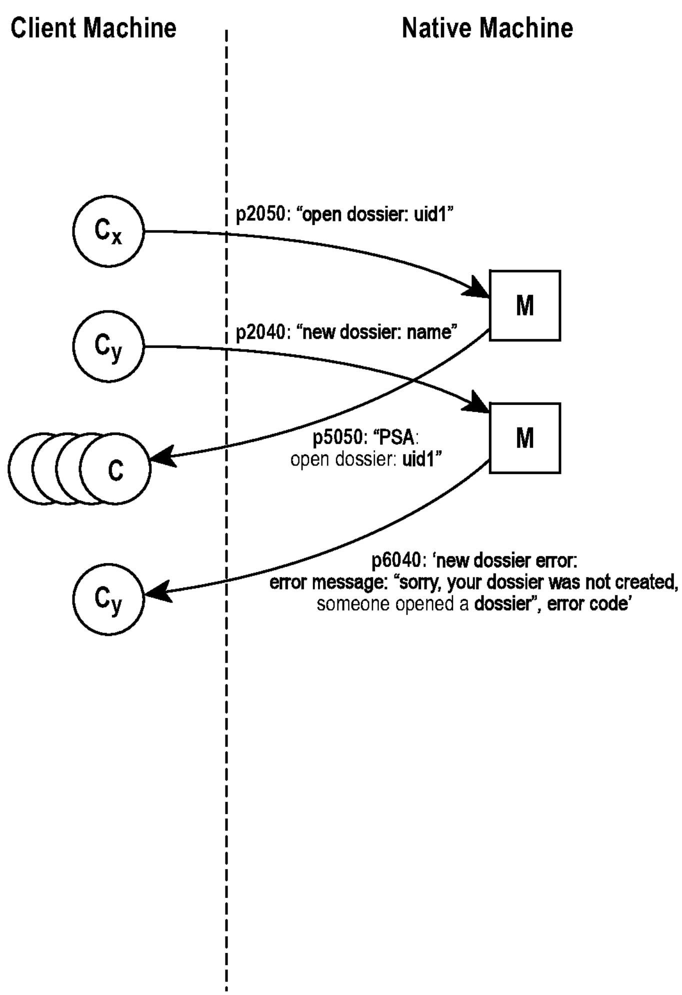

Protein Definitions

```
p2050:
d: {mezzanine, [prot-spec: v1.0],
     request, open-dossier,
     [from: [10.10.192.45, 83]]}
i:  {uid: 02342342781023423}

p2040:
d: {mezzanine, [prot-spec: v1.0],
     request, new-dossier,
     [from: [10.10.192.74, 17]}
i:  {name: my_new_presentation}

p5050:
d:  {mezzanine, [prot-spec: v1.0],
     psa, open-dossier,
     [from: native_mezz]}
i:   {dossier: {
     uid: 02342342781023423,
     name: "kitten presentation",
     in-use-by: native_mezz,
     deck: { num-slides: 23,
        visible-left-slide: 22.0,
        cur-slide: 23,
        visible-right-slide: 23.0,
        pushback-state: 0.0},
     assets: { [uid1, name, url],
        [uid2, name, url], ...
        [uidn, name, url]}}}
```

```
p6040:
d: {mezzanine, [prot-spec: v1.0],
     response, new-dossier,
     [from: native_mezz],
     [to: [10.10.192.74, 17]],
     error}
i:  {summary: "could not create new dossier",
     description: "sorry, your dossier was not
     created, someone opened a dossier",
     error-code: 12983489798372 }
```

FIG. 48

Web client: Rename dossier (error)

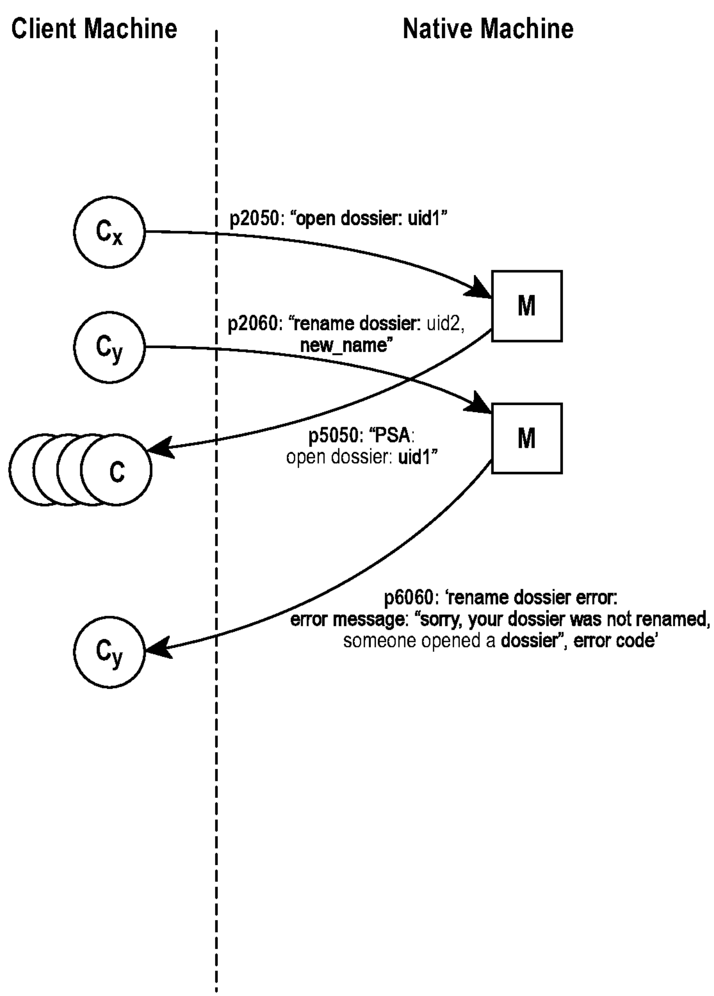

Protein Definitions

```
p2050: open dossier
d: {mezzanine, [prot-spec: v1.0],
      request, open-dossier,
      [from: [10.10.192.74, 83]]}
i:  {uid: 02342342781023423}

p2060: rename dossier
d: {mezzanine, [prot-spec: v1.0],
      request, rename-dossier,
      [from: [10.10.192.45, 21]]}
i:  {1234780234: { name: icanhasnewname}}

p5050: open dossier psa
d:  {mezzanine, [prot-spec: v1.0],
      psa, open-dossier,
      [from: native_mezz]}
i:   {dossier: {
      uid: 02342342781023423,
      name: "kitten presentation",
      in-use-by: native_mezz,
      deck: { num-slides: 23,
         visible-left-slide: 21.0,
         cur-slide: 22,
         visible-right-slide: 22.0,
         pushback-state: 0.0},
      assets: { [uid1, name, url],
         [uid2, name, url], ...
         [uidn, name, url]}}}

p6060: rename dossier error
d: {mezzanine, [prot-spec: v1.0],
      response, rename-dossier,
      [from: native_mezz],
      [to: [10.10.192.45, 21]],
      error}
i:  {summary: "could not rename dossier",
      description: "sorry, your dossier was not
      renamed, someone opened a dossier",
      error-code: 12983489798372 }
```

FIG. 55

Native: Duplicate dossier

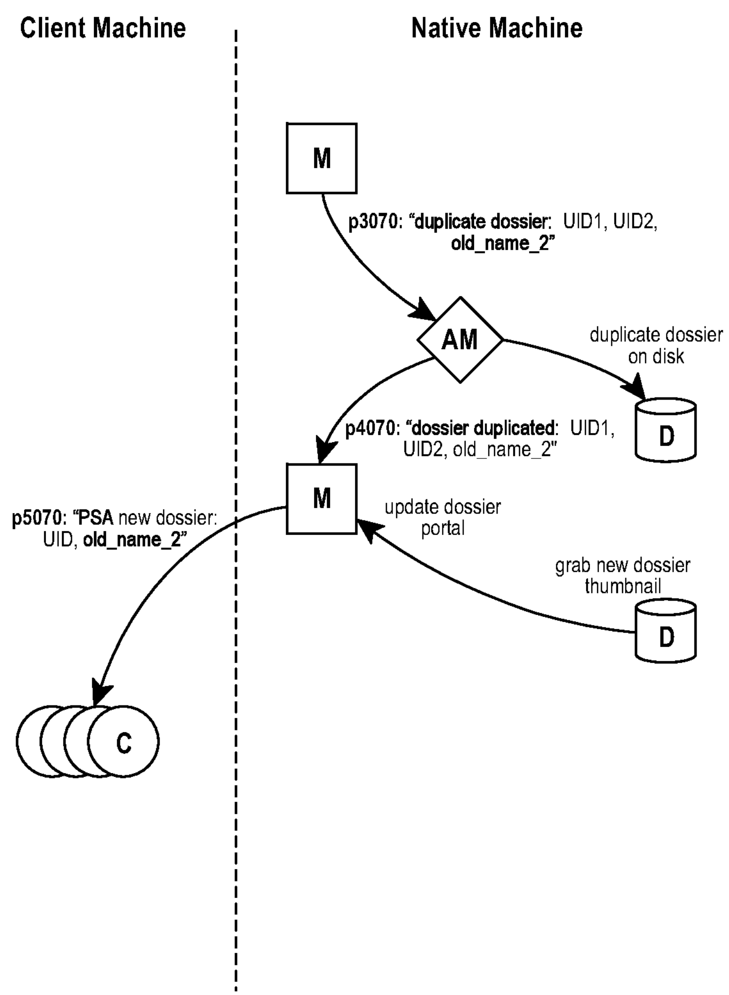

Protein Definitions p3070: duplicate dossier
```
d: {mezzanine, [prot-spec: v1.0],
      request, duplicate-dossier,
      [from: native_mez],
      [to: asset_manager]}
i:  { dossier: { uid: uid1 },
      new dossier: {
         uid: uid2,
         name: kittens_presentation_2,
         mod-date: 2011 Apr 20 16:20:00 }}
```

p4070: duplicate dossier
```
d:  {mezzanine, [prot-spec: v1.0],
      response, duplicate-dossier,
      [from: asset-manager],
      [to: native_mez]}
i:   {dossier: { uid: uid1 },
      new dossier: {
         uid: uid2,
         name: kittens_presentation_2,
         thumb-url: http://the_new_url.png }}
```

p5070: new dossier psa
```
d:  {mezzanine, [prot-spec: v1.0],
      psa, new-dossier,
      [from: native_mezz]}
i:   {uid2: { name: kittens_presentation_2,
         thumb-url: http://the_new_url.png,
         mod-date: 2011 Apr 20 16:20:00 }}
```

FIG. 57

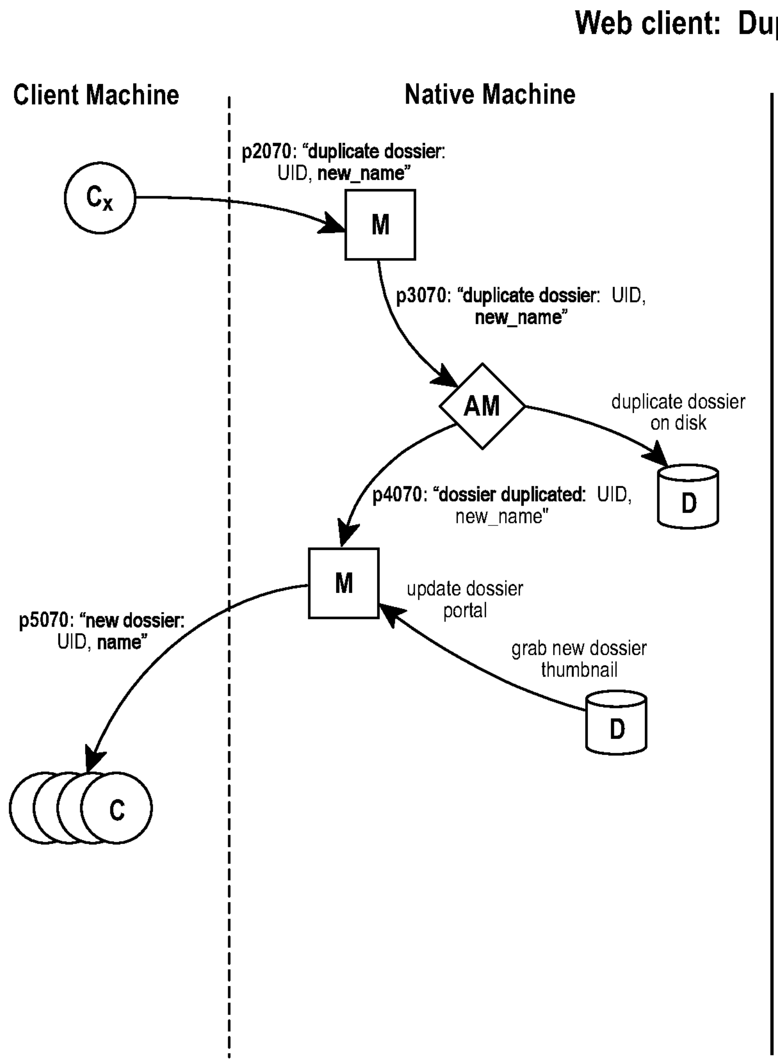

Protein Definitions

```
p2070: duplicate dossier
d: {mezzanine, [prot-spec: v1.0],
      request, duplicate-dossier,
      [from: [10.10.192.74, 16]]}
i: {uid: uid1,
      name: cuter_kittens_presentation}

p3070: duplicate dossier
d: {mezzanine, [prot-spec: v1.0],
      request, duplicate-dossier,
      [from: native_mez],
      [to: asset-manager]}
i: {dossier: { uid: uid1 },
      new dossier: {
         uid: uid2,
         name: cuter_kittens_presentation,
         mod-date: 2011 Apr 20 16:20:00 }}

p4070: duplicate dossier
d: {mezzanine, [prot-spec: v1.0],
      response, duplicate-dossier,
      [from: asset-manager],
      [to: native_mez]}
i: {dossier: { uid: uid1 },
      new-dossier: {
         uid: uid2,
         name: cuter_kittens_presentation,
         thumb-url: http://the_new_url.png}}

p5070: new dossier psa
d: {mezzanine, [prot-spec: v1.0],
      psa, new-dossier,
      [from: native_mezz]}
i: {uid2: { name: cuter_kittens_presentation,
         thumb-url: http://the_new_url.png,
         mod-date: 2011 Apr 20 16:20:00 }}
```

FIG. 58

Web client: Delete dossier (error)

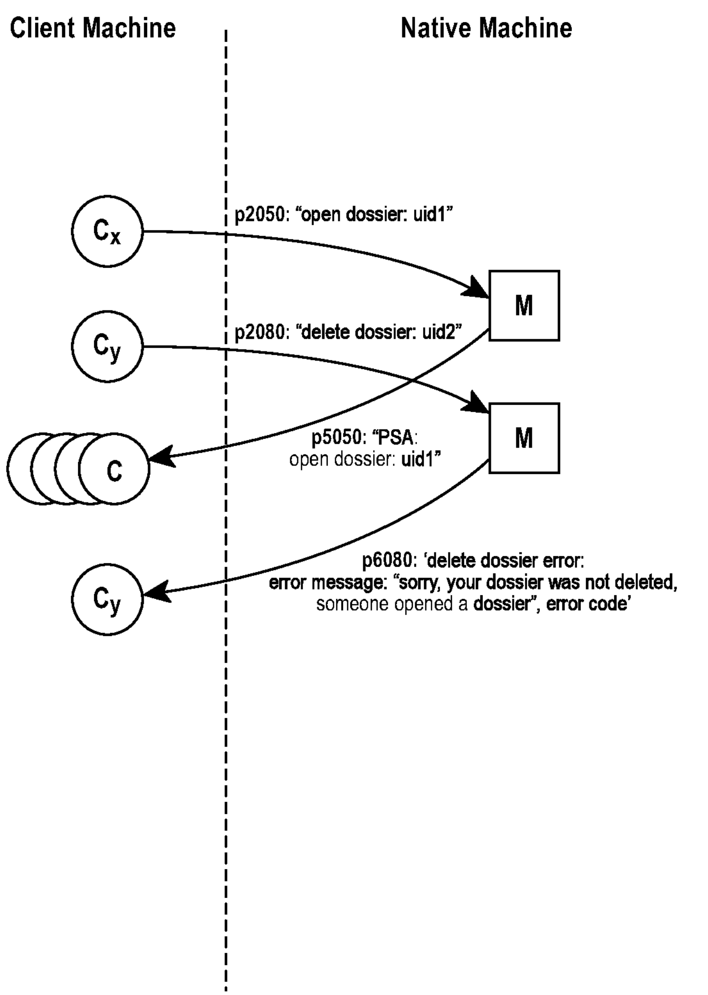

Protein Definitions

```
p2050: open dossier
d: {mezzanine, [prot-spec: v1.0],
     request, open-dossier,
     [from: [10.10.192.74, 83]]}
i:  {uid: 643243234278102342}

p2080: delete dossier
d: {mezzanine, [prot-spec: v1.0],
     request, delete-dossier,
     [from: [10.10.192.45, 16]}
i:  {uid: 023423427810234231}

p5050: open dossier psa
d:  {mezzanine, [prot-spec: v1.0],
     psa, open-dossier,
     [from: native_mezz]}
i:   {dossier: {
     uid: 643243234278102342,
     name: "kitten presentation",
     in-use-by: native_mezz,
     deck: { num-slides: 23,
        visible-left-slide: 21.0,
        cur-slide: 22,
        visible-right-slide: 22.0,
        pushback-state: 0.0},
     assets: { [uid1, name, url],
        [uid2, name, url], ...
        [uidn, name, url]}}}

p6080: delete dossier error
d: {mezzanine, [prot-spec: v1.0],
     response, delete-dossier,
     [from: native_mezz],
     [to: [10.10.192.45, 16]],
     error}
i:  {summary: "could not delete dossier",
     description: "sorry, your dossier was not
     deleted, someone opened a dossier",
     error-code: 12983489798372 }
```

FIG. 63

Native: Scroll Slide(s) and Pushback

Web Client: Scroll deck

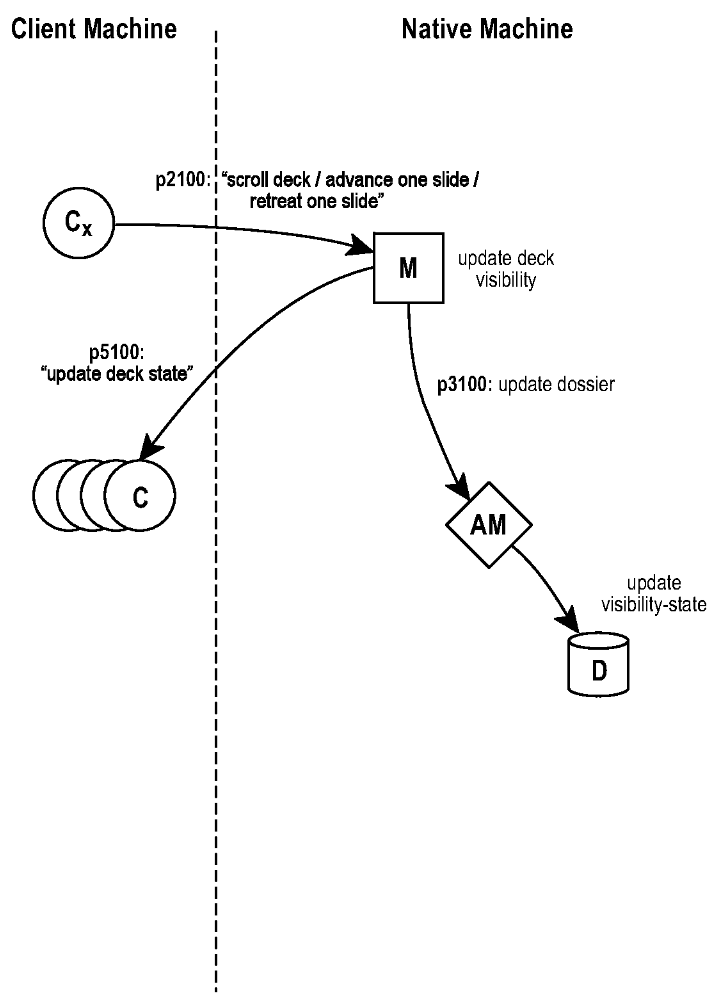

Protein Definitions p2100: scroll deck
d: {mezzanine, [prot-spec: v1.0],
request, scroll-deck,
[from: [10.10.192.74, 82]]}
i: {visible-deck-center: 22.0} p5100: update deck
d: {mezzanine, [prot-spec: v1.0],
psa, deck-state,
[from: native_mezz]}
i: {deck: { num-slides: 24,
visible-left-slide: 21.0,
cur-slide: 22,
visible-right-slide: 23.0,
pushback-state: 0.0}} p3100: update dossier
d: {mezzanine, [prot-spec: v1.0],
request, update-deck,
[from: native_mezz],
[to: asset_manager]}
i: {dossier: { uid: uid1,
mod-date: 2011 Apr 20 16:20:00,
deck-state: { num-slides: 24,
visible-left-slide: 21.0,
cur-slide: 22,
visible-right-slide: 23.0,
pushback-state: 0.0},
first-slide: uid }}

FIG. 73

Web Client: Upload Asset(s)/Slide(s)

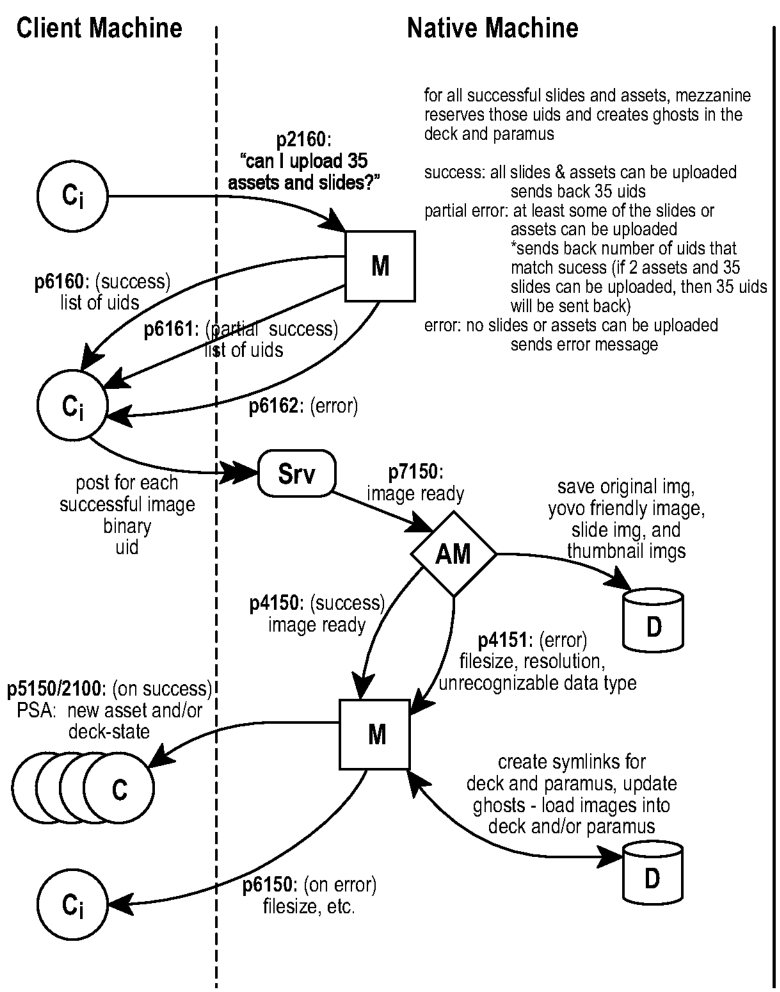

Protein Definitions p2160: upload images
d: {mezzanine, [prot-spec: v1.0],
request, upload-images,
[from: [10.10.192.74, 85]]}
i: {type: both, num-images: 35} p6160: upload images (success)
d: {mezzanine, [prot-spec: v1.0],
response, upload-images, [from: native_mezz],
[to: [10.10.192.74, 85]]}
i: {uids: [uid1, uid2, ..., uid35]} p6161: upload images (partial success)
d: {mezzanine, [prot-spec: v1.0],
response, upload-images, [from: native_mezz],
[to: [10.10.192.74, 85]], advisory}
i: {uids: [uid1, uid2, ..., uid35],
summary: "Paramus is full", description: "blah",
error-code: 80001} p6162: upload images (error)
d: {mezzanine, [prot-spec: v1.0],
response, upload-images, [from: native_mezz],
[to: [10.10.192.74, 85]], error}
i: {summary: "Paramus & Deck are full",
description: "you can't do that",
error-code: 0x3489327431} p7150: image ready
d: {mezzanine, [prot-spec: v1.0],
request, image-ready, [from: [10.10.192.74, 85]],
[to: asset_manager]}
i: { dossier: [ uid: 789432],
uid: uid1, file-name: angry_kitten.jpg,
data: binary image data} p4150: image ready (success)
d: {mezzanine, [prot-spec: v1.0],
request, image-ready, [from: asset_manager],
[to: native_mez]}
i: { dossier: { uid: 789432},
uid: uid1, file-name: angry_kitten.jpg,
thumb-url: http://path_2_kittten_thumb_png,
min-thumb-url: http://path/to/
image_capture_13_mini_thumb.png,
full-image-url: http://path_2_kitten.png,
slide-image-url: http://path_2_slide.png} p4151: image ready (error)
d: {mezzanine, [prot-spec: v1.0], request,
image-ready, [from: asset_manager],
[to: [native_mez, [fwd: [10.10.192.74, 85]]]],
error}
i: { dossier: [ uid: 789432 ],
file-name: angry_kitten.jpg,
summary: "Image Upload Error",
description: "%s is in an unrecognizable format",
error-code: B0007} p5150: new asset psa (success)
d: {mezzanine, [prot-spec: v1.0],
psa, new-asset, [from: native_mez]}
i: {paramus-uids: [uid1, uid2, ..., uidn],
uid: { file-name: angry_kitten.jpg,
thumb-url: http://path_2_kitten_thumb.png,
full-image-url: http://path_2_kitten.png}} p5100: update deck (success)
d: {mezzanine, [prot-spec: v1.0],
psa, deck-state, [from: native_mezz]}
i: {deck: { num-slides: 24,
visible-left-slide: 21.0, cur-slide: 22,
visible-right-slide: 23.0,
pushback-state: 1.0}} p6150: image ready (file error)
d: {mezzanine, [prot-spec: v1.0], request,
image-ready, [from: native_mez],
[to: [10.10.192.74, 85]], error}
i: {file-name: angry_kitten.jpg,
summary: "Image Upload Error",
description: "%s is in an unrecognizable format",
error-code: 80007}

FIG. 77

Client: Upload Asset(s)/Slide(s) Directly

Web client: Upload Asset(s)/Slide(s)
(timeout occurs)

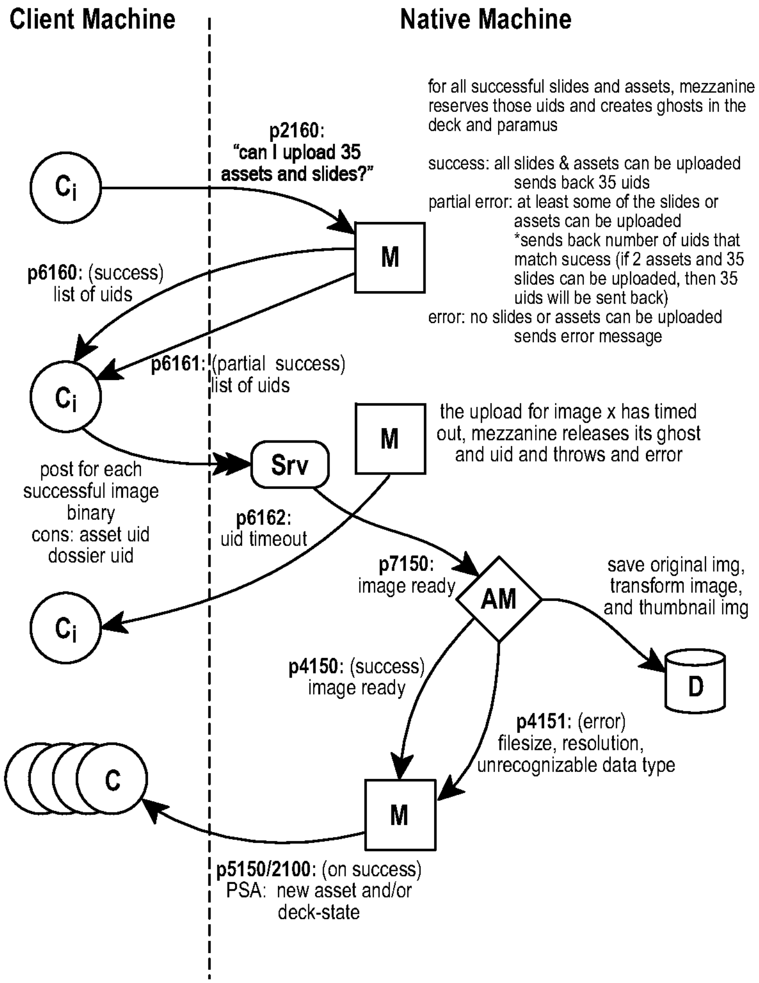

Protein Definitions p2160: upload images
d: {mezzanine, [prot-spec: v1.0],
request, upload-images,
[from: [10.10.192.74, 85]]}
i: {type: both, num-images: 35} p6160: upload images (success)
d: {mezzanine, [prot-spec: v1.0],
response, upload-images, [from: native_mezz],
[to: [10.10.192.74, 85]]}
i: {uids: [uid1, uid2, ..., uid35]} p6161: upload images (partial success)
d: {mezzanine, [prot-spec: v1.0],
response, upload-images, [from: native_mezz],
[to: [10.10.192.74, 85]], advisory}
i: {uids: [uid1, uid2, ..., uid35],
summary: "Paramus is full", description: "blah",
error-code: 80001} p7150: image ready
d: {mezzanine, [prot-spec: v1.0],
request, image-ready, [from: [10.10.192.74, 85]],
[to: asset_manager]}
i: { dossier: { uid: 789432 },
uid: uid1, file-name: angry_kitten.jpg,
data: binary image data} p4150: image ready (success)
d: {mezzanine, [prot-spec: v1.0],
request, image-ready, [from: asset_manager],
[to: native_mez]}
i: { dossier: { uid: 789432},
uid: uid1, file-name: angry_kitten.jpg,
thumb-url: http://path_2_kittten_thumb_png,
min-thumb-url: http://path/to/
image_capture_13_mini_thumb.png,
full-image-url: http://path_2_kitten.png,
slide-image-url: http://path_2_slide.png} p4151: image ready (error)
d: {mezzanine, [prot-spec: v1.0], request,
image-ready, [from: asset_manager],
[to: [native_mez, [fwd: [10.10.192.74, 85]]]],
error}
i: { dossier: [ uid: 789432 ],
file-name: angry_kitten.jpg,
summary: "Image Upload Error",
description: "%s is in an unrecognizable format",
error-code: 80007} p5150: new asset psa (success)
d: {mezzanine, [prot-spec: v1.0],
psa, new-asset, [from: native_mez]}
i: {paramus-uids: [uid1, uid2, ..., uidn],
uid: { file-name: angry_kitten.jpg,
thumb-url: http://path_2_kitten_thumb.png,
full-image-url: http://path_2_kitten.png }} p5100: update deck (success)
d: {mezzanine, [prot-spec: v1.0],
psa, deck-state, [from: native_mezz]}
i: {deck: { num-slides: 24,
visible-left-slide: 21.0, cur-slide: 22,
visible-right-slide: 23.0,
pushback-state: 1.0}} p6150: image ready (file error)
d: {mezzanine, [prot-spec: v1.0], request,
image-ready, [from: native_mez],
[to: [10.10.192.74, 85]], error}
i: {file-name: angry_kitten.jpg,
summary: "Image Upload Error",
description: "%s is in an unrecognizable format",
error-code: 80007} p6162: upload images (timeout error)
d: {mezzanine, [prot-spec: v1.0],
response, upload-images, [from: native_mezz],
[to: [10.10.192.74, 85]], error}
i: {uids: [uidx, uidy, ..., uidn],
summary: "image upload error",
description: "timeout",
error-code: 0x3489327431}

FIG. 79

Web client: Download All Assets

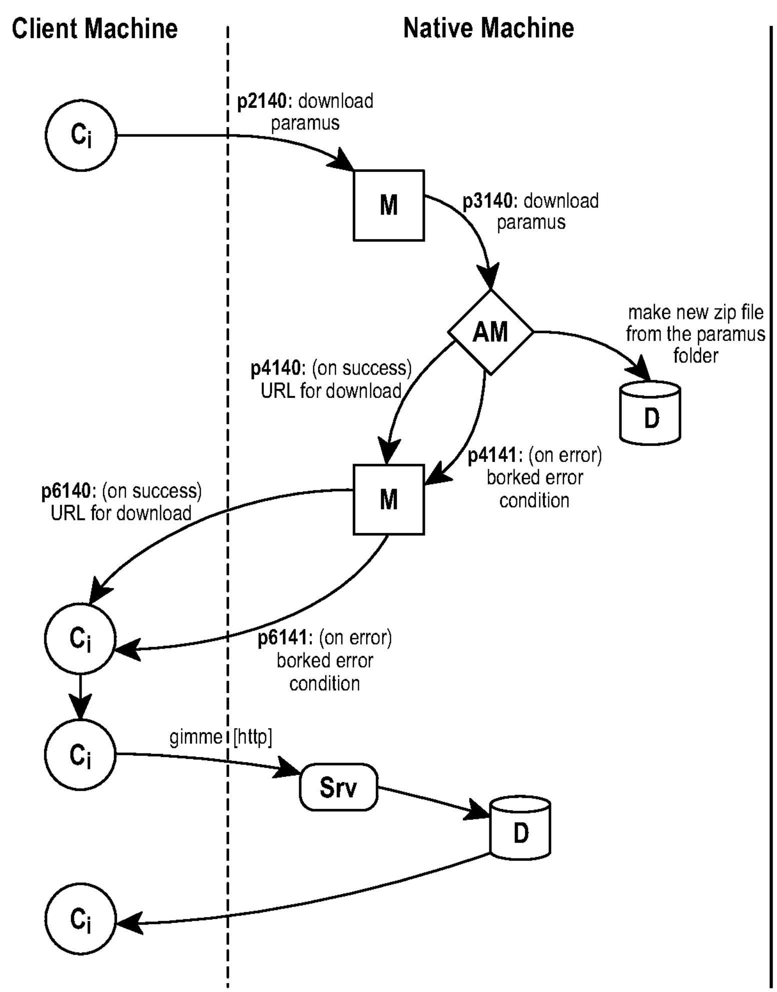

Protein Definitions p2140: download paramus
d: {mezzanine, [prot-spec: v1.0], request,
download-paramus,
[from: [10.10.192.74, 84]]}
i: *none p3140: download paramus
d: {mezzanine, [prot-spec: v1.0], request,
download-paramus, [from: native_mezz],
[to: [asset_manager,
[fwd: [10.10.192.74, 84]]]]}
i: {dossier: {uid: uid1}} p4140: download paramus (success)
d: {mezzanine, [prot-spec: v1.0], response,
download-paramus, [from: asset_manager],
[to: [native_mez, [fwd: [10.10.192.74, 84]]]]}
i: {dossier: {uid: uid1},
paramus-url: http://my_zipped_assets.zip} p4141: download paramus (error)
d: {mezzanine, [prot-spec: v1.0], response,
download-paramus, [from: asset_manager],
[to: [native_mez, [fwd: [10.10.192.74, 84]]]]
error}
i: {dossier: {uid: uid1}, summary: "borked",
description: "blah", error-code: 8145} p6140: download paramus (success)
d: {mezzanine, [prot-spec: v1.0], response,
download-paramus, [from: native mez],
[to: [10.10.192.74, 84]]}
i: {paramus-url: http://my_zipped_assets.zip} p6151: download paramus (error)
d: {mezzanine, [prot-spec: v1.0], response,
download-paramus, [from: native_mez],
[to: [10.10.192.74, 84]], error}
i. {summary: "borked", description: "blah",
error-code: 8145}

FIG. 81

Web client: Download All Slides

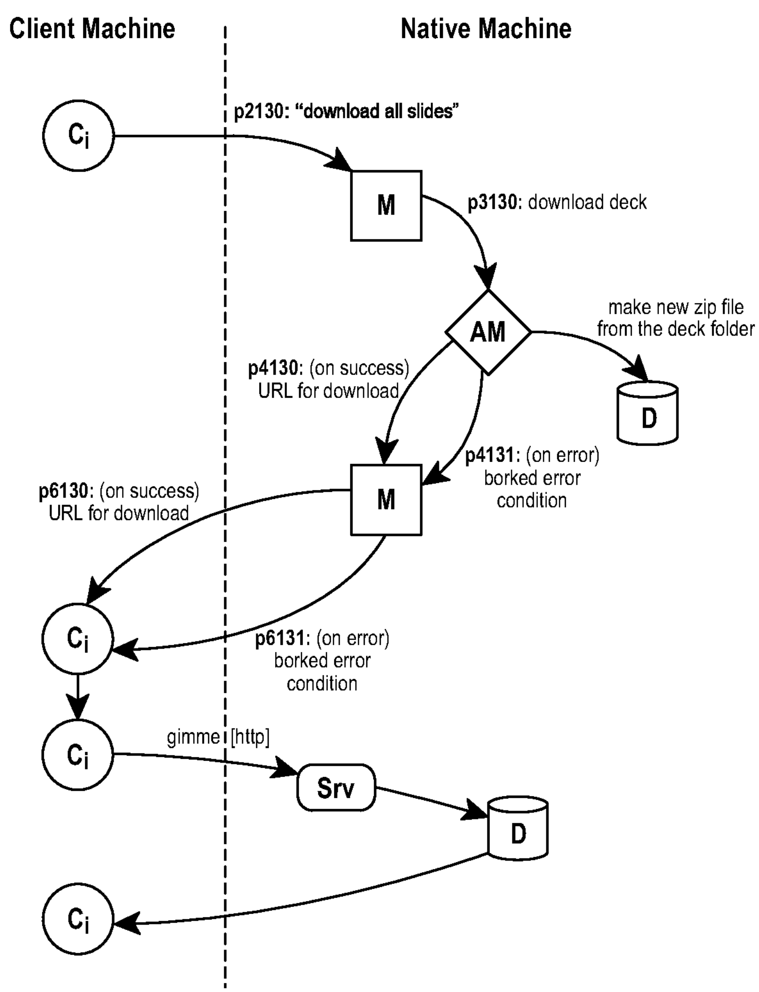

Protein Definitions p2130: download deck
d: {mezzanine, [prot-spec: v1.0], request,
download-deck, [from: [10.10.192.74, 84]]}
i: *none p3130: download deck
d: {mezzanine, [prot-spec: v1.0], request,
download-paramus, [from: native_mezz],
[to: [asset_manager, [fwd: [10.10.192.74, 84]]]]}
i: {dossier: {uid: uid1}} p4130: download deck (success)
d: {mezzanine, [prot-spec: v1.0], response,
download-deck, [from: asset_manager],
[to: [native_mez, [fwd: [10.10.192.74, 84]]]]}
i: {dossier: {uid: uid1},
deck-url: http://my_zipped_slides.zip} p4131: download deck (error)
d: {mezzanine, [prot-spec: v1.0], response,
download-paramus, [from: asset_manager],
[to: [native_mez, [fwd: [10.10.192.74, 84]]]],
error}
i: {dossier: {uid: uid1},
summary: "borked", description: "blah",
error-code: 8123} p6130: download deck (success)
d: {mezzanine, [prot-spec: v1.0], response,
download-deck, [from: native mez],
[to: [10.10.192.74, 84]]}
i: {deck-url: http://my_zipped_slides.zip} p6131: download deck (error)
d: {mezzanine, [prot-spec: v1.0], response,
download-deck, [from: native_mez],
[to: [10.10.192.74, 84]], error}
i. {summary: "borked", description: "blah",
error-code: 8123}

FIG. 82

Web Client: Delete an Asset

Client Machine | Native Machine | Protein Definitions

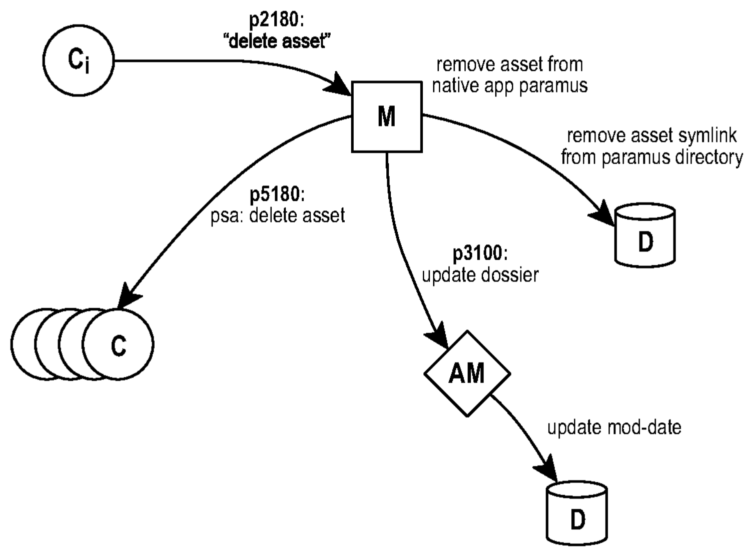

p2180: delete an asset
d: {mezzanine, [prot-spec: v1.0], request,
delete-asset, [from: [10.10.192.74, 87]]}
i: {uid: uid_n} p5180: psa delete asset
d: {mezzanine, [prot-spec: v1.0], psa,
delete-asset, [from: native_mezz]}
i: {uid: uid_n} p3100: update dossier
d: {mezzanine, [prot-spec: v1.0],
request, update-deck,
[from: native_mezz],
[to: asset_manager]}
i: {dossier: { uid: uid1,
mod-date: 2011 Apr 20 16:20:0}}

FIG. 83

Web Client: Delete All Slides

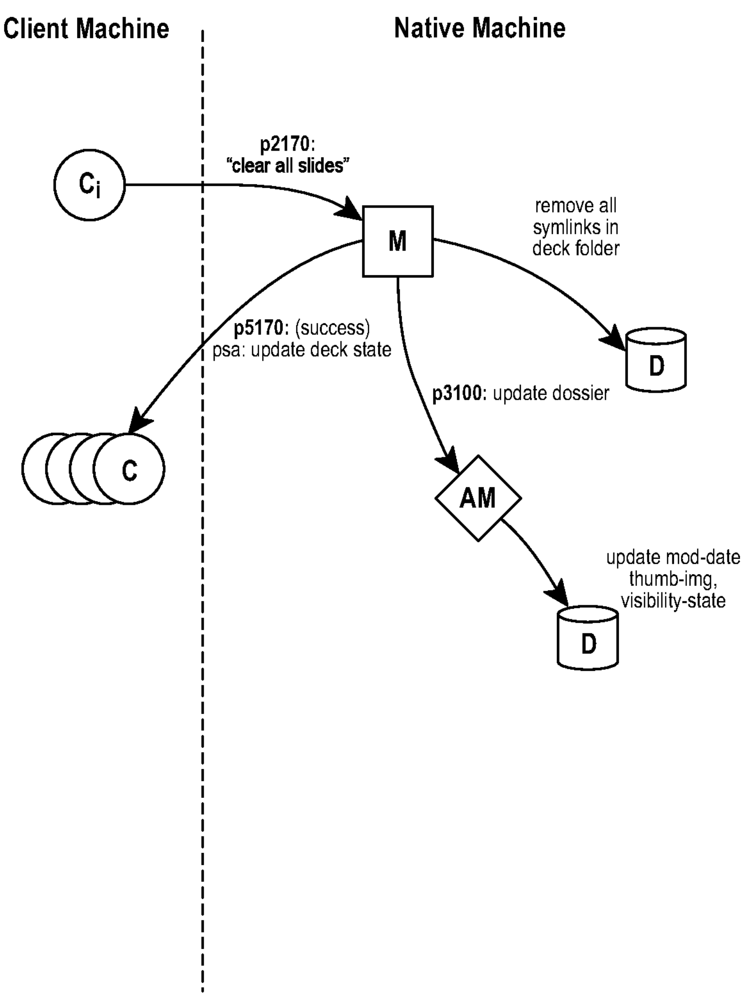

Protein Definitions p2170: clear deck
d: {mezzanine, [prot-spec: v1.0], request,
clear-deck, [from: [10.10.192.74, 87]],
[to: native_mezz]}
i: *none p5170: clear deck psa
d: {mezzanine, [prot-spec: v1.0], psa,
deck-state, [from: native_mezz]}
i: {deck: { num-slides: 0,
visible-left-slide: 0.0, cur-slide: -1,
visible-right-slide: 0.0, pushback-state: 0.0}} p3100: update dossier
d: {mezzanine, [prot-spec: v1.0],
request, update-deck,
[from: native_mezz],
[to: asset_manager]}
i: {dossier: { uid: uid1,
mod-date: 2011 Apr 20 16:20:00,
deck-state: { num-slides: 0,
visible-left-slide: -1.0,
cur-slide: -1,
visible-right-slide: -1.0,
pushback-state: 1.0}
first-slide: null}}

FIG. 85

| | | |
|---|---|---|
| **p2010** | **can i join?**<br>client → mezzanine *mz-to-native* |
| *descrips:* | mezzanine,<br>prot-spec v1.0,<br>request,<br>join,<br>from:,<br>[<client uid>, <transaction number>] |
| *ingests:* | none |

FIG. 86 p2020 state request
client → mezzanine *mz-to-native*

*descrips:*
mezzanine,
prot-spec v1.0,
request,
mez-state,
from:,
[<client uid>, <transaction number>]

*ingests:* none

FIG. 87 p2040 create new dossier
client → mezzanine *mz-to-native*

*descrips:*
mezzanine,
prot-spec v1.0,
request,
new-dossier,
from:,
[<client uid>, <transaction number>]

*ingests:*
name: <name string>

FIG. 88 p2050 open dossier
client → mezzanine *mz-to-native*

*descrips:* mezzanine,
prot-spec v1.0,
request,
open-dossier,
from:
[<client uid>, <transaction number>]

*ingests:* uid: <dossier uid>

FIG. 89 p2060 rename dossier
client → mezzanine *mz-to-native*

*descrips:*
mezzanine,
prot-spec v1.0,
request,
rename-dossier,
from:,
[<client uid>, <transaction number>]

*ingests:*
uid: <dossier uid>,
name: <new name>

FIG. 90

| | |
|---|---|
| **p2070** | **duplicate dossier**<br>client → mezzanine *mz-to-native* |
| *descrips:* | mezzanine,<br>prot-spec v1.0,<br>request,<br>duplicate-dossier,<br>from:,<br>[<client uid>, <transaction number>] |
| *ingests:* | uid: <dossier uid>,<br>name: <name of duplicate> |

FIG. 91

| | |
|---|---|
| **p2080** | **delete dossier**<br>client → mezzanine *mz-to-native* |
| *descrips:* | mezzanine,<br>prot-spec v1.0,<br>request,<br>delete-dossier,<br>from:,<br>[<client uid>, <transaction number>] |
| *ingests:* | uid: <dossier uid> |

FIG. 92 p2090 close dossier
client → mezzanine *mz-to-native*

*descrips:*
mezzanine,
prot-spec v1.0,
request,
close-dossier,
from:,
[<client uid>, <transaction number>]

*ingests:* none

FIG. 93 p2100 scroll deck
client → mezzanine *mz-to-native*

*descrips:*
mezzanine,
prot-spec v1.0,
request,
scroll-deck,
from:,
[<client uid>, <transaction number>]

*ingests:*
visible-deck-center: <float>

FIG. 94 p2110 pushback
client → mezzanine *mz-to-native*

*descrips:*
mezzanine,
prot-spec v1.0,
request,
pushback-deck,
from:,
[<client uid>, <transaction number>]

*ingests:*
transport-mode: single-shot || continuous,
pushback-state: <float>

FIG. 95 p2120 passforward ratchet
client → mezzanine *mz-to-native*

*descrips:*
mezzanine,
prot-spec v1.0,
request,
ratchet,
from:,
[<client uid>, <transaction number>]

*ingests:* ratchet-state: pointing || demarcating || passthrough

FIG. 96 p2130 download all slides
client → mezzanine *mz-to-native*

*descrips:* mezzanine,
prot-spec v1.0,
request,
download-deck,
from:,
[<client uid>, <transaction number>]

*ingests:* none

FIG. 97 p2140 download all assets
client → mezzanine *mz-to-native*

*descrips:* mezzanine,
prot-spec v1.0,
request,
download-paramus,
from:,
[<client uid>, <transaction number>]

*ingests:* none

FIG. 98

| | | |
|---|---|---|
| **p2160** | **upload images**<br>client → mezzanine *mz-to-native* | |
| *descrips:* | mezzanine,<br>prot-spec v1.0,<br>request,<br>upload-images,<br>from:,<br>[<client uid>, <transaction number>] | |
| *ingests:* | type: both \|\| asset \|\| slide,<br>num-images: <int> | |

FIG. 99 p2170 delete all slides
client → native mezz *mz-to-native*

*descrips:* mezzanine,
prot-spec v1.0,
request,
clear-deck,
from:,
[<client uid>, <transaction number>]

*ingests:* none

FIG. 100 p2180 delete an asset
client → native mezz *mz-to-native*

*descrips:*
mezzanine,
prot-spec v1.0,
request,
delete-asset,
from:,
[<client uid>, <transaction number>]

*ingests:*
uid: <asset uid>

FIG. 101 p2190 delete all assets
client → native mezz *mz-to-native*

*descrips:*
mezzanine,
prot-spec v1.0,
request,
clear-paramus,
from:,
[<client uid>, <transaction number>]

*ingests:* none

FIG. 102

```
p2250       passforward
            client → mezzanine   mz-to-native

descrips:   mezzanine,
            prot-spec v1.0,
            request,
            passforward,
            from:,
            <client uid>

ingests:    cur-origin: <v3f (x, y, z)>,
            cur-aim: <v3f (x, y, z)>,
            pressure-reports: {
                main: <float> },
            space-cntx: left || right || main
```

FIG. 103 p2300 set windshield opacity
client → mezzanine *mz-to-native*

*descrips:*
mezzanine,
prot-spec v1.0,
request,
set-windshield-opacity,
from:,
[<client uid>, <transaction number>]

*ingests:*
transport-mode: single-shot || continuous,
opacity: <float: [0.0, 1.0]>

FIG. 104

| | |
|---|---|
| **p2xxx** | **deck detail request**<br>client → mezzanine *mz-to-native* |
| *descrips:* | mezzanine,<br>prot-spec v1.0,<br>request,<br>deck-detail,<br>from:,<br>[<client uid>, <transaction number>] |
| *ingests:* | none |

FIG. 105 p2xxx download asset
client → mezzanine *mz-to-native*

*descrips:*
mezzanine,
prot-spec v1.0,
request,
download-paramus,
from:,
[<client uid>, <transaction number>]

*ingests:*
dossier-uid: <dossier uid>
asset-uid: <asset uid>

FIG. 106 p3040 create new dossier
mezzanine → asset manager *mz-native-to-astman*

*descrips:*
mezzanine,
prot-spec v1.0,
request,
new-dossier,
from:,
native-mezz,
to:,
asset-manager

*ingests:*
```
dossier: {
    uid: <dossier uid>,
    name: <dossier name>,
    mod-date-utc: <utc timestamp>,
    mod-date: <timestamp> }
```

FIG. 107 p3070 duplicate dossier
mezzanine → asset manager *mz-native-to-astman*

*descrips:*
```
mezzanine,
prot-spec v1.0,
request,
duplicate-dossier,
from:,
native-mezz,
to:,
asset-manager
```

*ingests:*
```
dossier: {
      uid: <dossier uid> },
new-dossier {
      uid: <duplicate uid>,
      name: <new name>,
      mod-date-utc: <utc timestamp>,
      mod-date: <timestamp> }
```

FIG. 108

```
p3100       update dossier
            mezzanine -> asset manager   mz-native-to-astman

descrips:   mezzanine,
            prot-spec v1.0,
            request,
            update-dossier,
            from:,
            native-mezz,
            to:,
            asset-manager

ingests:    dossier: {
               uid: uid1,
               [optional] mod-date-utc: <utc timestamp>,
               [optional] mod-date: <timestamp>,
               [optional] deck-state: {
                  num-slides: <int>,
                  cur-slide: <int>,
                  visible-slide-count: <float>,
                  pushback: <float> },
               [optional] first-slide: <slide uid> }
```

FIG. 109 p3130 download all slides
mezzanine → asset manager *mz-native-to-astman*

*descrips:*
mezzanine,
prot-spec v1.0,
request,
download-deck,
from:,
native-mezz,
to:,
asset-manager

*ingests:*
dossier: {
uid: <dossier uid> }

FIG. 110 p3140 download all assets
mezzanine → asset manager

*descrips:* mezzanine,
prot-spec v1.0,
request,
download-paramus,
from:,
native-mezz,
to:,
asset-manager

*ingests:* dossier: {
uid: <dossier uid> }

Fig. 111 p3150 image ready
mezzanine → asset manager *mz-native-to-astman*

*descrips:*
mezzanine,
prot-spec v1.0,
request,
image-ready,
from:,
native-mezz,
to:,
asset-manager

*ingests:*
dossier: {
    uid: <dossier uid> },
uid: <asset uid>,
file-name: <image name eg. image_capture_13.png>,
data: <binary image data>

FIG. 112 p3160 expect upload
mezzanine → asset manager *mz-native-to-astman*

*descrips:*
mezzanine,
prot-spec v1.0,
request,
expect-upload,
from:,
native-mezz,
to:,
asset-manager

*ingests:*
client-provenance: <client uid>,
for-dossier: <dossier uid>,
asset-uids: [<asset 1 uid>, <asset 2 uid>, ... , <asset n uid>]

FIG. 113 p3170 forget upload
mezzanine → asset manager *mz-native-to-astman*

*descrips:*
mezzanine,
prot-spec v1.0,
request,
forget-upload,
from:,
native-mezz,
to:,
asset-manager

*ingests:*
for-dossier: <dossier uid>,
asset-uids: [<asset 1 uid>, <asset 2 uid>, ... , <asset n uid>]

FIG. 114 p3340 convert original image
mezzanine → asset manager *mz-native-to-astman*

*descrips:*
mezzanine,
prot-spec v1.0,
request,
convert-orig-image,
from:,
native-mezz,
to:,
asset-manager

*ingests:*
dossier-uid: <dossier uid>,
asset-uid: <asset uid>,
image-name: <name string>

FIG. 115 p4040 new dossier created
asset manager → mezzanine *mz-astman-to-native*

*descrips:*
mezzanine,
prot-spec v1.0,
response,
new-dossier,
from:,
asset-manager,
to:,
native-mezz

*ingests:*
```
dossier: {
    uid: <dossier uid>,
    name: <name string>,
    thumb-uri: <uri eg. "http://.../thumb.jpg"> }
```

FIG. 116 p4070 dossier duplicated
asset manager → mezzanine *mz-astman-to-native*

*descrips:*
mezzanine,
prot-spec v1.0,
response,
duplicate-dossier,
from:,
asset-manager,
to:,
native-mezz

*ingests:*
```
dosiser: {
    uid: <dossier uid> },
new-dossier: {
    uid: <duplicate dossier uid>,
    name: <name of duplicate>,
    thumb-uri: <uri> }
```

FIG. 117 p4130 download all slides (success)
asset manager → mezzanine *mz-astman-to-native*

*descrips:*
mezzanine,
prot-spec v1.0,
response,
download-deck,
from:,
asset-manager,
to:,
native-mezz

*ingests:*
uid: <dossier uid>,
deck-uri: <uri, eg. "http://.../slides.zip">,
prov-and-tid: [
<client uid>,
<transaction number>]

FIG. 118 p4131 download all slides [error]
asset manager → mezzanine *mz-astman-to-native*

*descrips:*
mezzanine,
prot-spec v1.0,
response,
download-deck,
from:,
asset-manager,
to:,
native-mezz,
error

*ingests:*
summary: "error downloading slides",
description: <detailed error string>,
error-code: "mz-download-deck"
prov-and-tid: [
<client uid>,
<transaction number>]

FIG. 119

```
p4150       image ready [success]
            asset manager → mezzanine   mz-astman-to-native

descrips:   mezzanine,
            prot-spec v1.0,
            response,
            image-ready,
            from:,
            asset-manager,
            to:,
            native-mezz

ingests:    dossier: {
                uid: <dossier uid> },
            uid: <asset uid>,
            file-name: <name string, eg. "image_capture_13.png">
```

```
p4150       image ready
            asset manager -> native mezzanine

descrips:   mezzanine,
            [prot-spec: v1.0],
            response,
            image-ready,
            [from: asset-manager]
            [to: [native_mezz,
                [fwd: [10.10.192.74, 97]]]]
ingests:    dossier: {
                uid: uid1},
            uid: 928374302987402398742,
            file-name: image_capture_13.png,
            thumb-url: http://path/to/image_cap
                ture_13_thumb.png,
            min-thumb-url: http://path/to/image_
                capture_13_mini_thumb.png,
            full-image-url: http://path/to/image_cap
                ture_13.png,
            slide-image-url: http://path/to/image_
                capture_13_slide.png
```

FIG. 120 p4151 image ready [error]
asset manager→ mezzanine *mz-astman-to-native*

*descrips:*
mezzanine,
prot-spec v1.0,
response,
image-ready,
from:,
asset-manager,
to:,
native-mezz,
error

*ingests:*
dossier: {
    uid: <dossier uid> },
file-name: <name string>,
summary: "image upload error",
description: "%s is an unrecognizable file format",
error-code: 0x928347389

FIG. 121 p5000 heartbeat [portal]
mezzanine → all clients *mz-from-native*

*descrips:*
mezzanine,
prot-spec v1.0,
heartbeat,
from:,
native-mezz

*ingests:*
state: portal,
dossiers: <sha1/md5 of dossier uids & names> heartbeat [dossier]
mezzanine → all clients *mz-from-native* mezzanine,
prot-spec v1.0,
heartbeat,
from:,
native-mezz state: dossier,
deck: {
    num-slides: <int>,
    cur-slide: <int>,
    visible-slide-count: <float>,
    pushback-state: <float> },
paramus: <sha1/md5 of asset uids>

FIG. 122 p5040 new dossier created
mezzanine → all clients *mz-from-native*

*descrips:*
mezzanine,
prot-spec v1.0,
psa,
new-dossier,
from:,
native-mezz

*ingests:*
uid: {
thumb-uri: <uri eg."relative/path/to/doss-thumb.png">,
mod-date-utc: <utc timestamp>,
mod-date: <timestamp>,
all-thumbs: [<uri eg. "relative/path/to/doss-thumb.png">] }

FIG. 123

```
p5050       dossier opened
            mezzanine → all clients   mz-from-native

descrips:   mezzanine,
            prot-spec v1.0,
            psa,
            open-dossier,
            from:,
            native-mezz

ingests:    dossier: {
                uid: <dossier uid>,
                name: <name string>,
                in-use-by: native-mezz,
                deck: {
                    num-slides: <int>,
                    cur-slide: <int>,
                    visible-slide-count: <float>,
                    pushback-state: <float> },
            assets: [
                [<asset 1 uid>, <orig-img 1 uri>, <thumb-img 1 uri>],
                [<asset 2 uid>, <orig-img 2 uri>, <thumb-img 2 uri>],
                ...
                [<asset n uid>, <orig-img n uri>, <thumb-img n uri>] }
```

FIG. 124 p5060 dossier renamed
mezzanine → all client *mz-from-native*

*descrips:*
mezzanine,
prot-spec v1.0,
psa,
rename-dossier
from:,
native-mezz

*ingests:*
```
dossier: {
    uid: <dossier uid>,
    name: <new name>,
    mod-date-utc: <utc timestamp>,
    mod-date: <timestamp> }
```

FIG. 125 p5070 new (duplicate) dossier created
mezzanine → all clients *mz-from-native*

*descrips:*
mezzanine,
prot-spec v1.0,
psa,
new-dossier
from:,
native-mezz

```
uid: {
    thumb-uri: <uri eg. "relative/path/to/doss-thumb.png">,
    mod-date-utc: <utc timestamp>,
    mod-date: <timestamp>,
    all-thumbs, [<uri "relative/path/to/doss-thumb.png">] }
```

FIG. 126 p5080 dossier deleted
mezzanine → all clients *mz-from-native*

*descrips:*
mezzanine,
prot-spec v1.0,
psa,
delete-dossier
from:,
native-mezz

*ingests:*
uid: <dossier uid>

FIG. 127

```
p5090       dossier closed
            mezzanine → all clients & asset manager   mz-from-native, mz-native-to-astman

descrips:   mezzanine,
            prot-spec v1.0,
            psa,
            close-dossier
            from:,
            native-mezz

ingests:    max-ds-uid: <dossier uid>,
            uids: [<dossier 1 uid>, <dossier 2 uid>, ..., <dossier n uid>],
            dossiers: {
                <dossier 1 uid>: {
                    name: <dossier name>,
                    thumb-uri: <uri eg. "relative/path/to/doss-thumb.png">,
                    mod-date-utc: <utc timestamp>,
                    mod-date: <timestamp>,
                    all-thumbs: [<uri>] },
                <dossier 2 uid>: { ... },
                ....
                <dossier n uid>: { ... } }
```

FIG. 128 p5100 deck state
mezzanine → all clients *mz-from-native*

*descrips:*
```
mezzanine,
prot-spec v1.0,
psa,
deck-state
from:,
native-mezz
```

*ingests:*
```
deck: {
    num-slides: <int>,
    cur-slide: <int>,
    visible-slide-count: <float>,
    pushback-state: <float> },
sequins: {
    other-mezzes: [7, 7],
    browser-client: [8, 8] }
```

FIG. 129 p5150 new asset
mezzanine → all clients *mz-from-native*

*descrips:*
mezzanine,
prot-spec v1.0,
psa,
new-asset
from:,
native-mezz

*ingests:*
paramus-uids: [<asset 1 uid>, <asset 2 uid>, ..., <asset n uid>],
uid: {
file-name: <name eg. "image_capture_13.png">,
thumb-uri: <uri eg. rel/path/to/img-thumb-480x270.png>,
full-image-uri: <uri eg. relative/path/to/original.png> }

FIG. 130 p5180 delete an asset (success)
mezzanine → all clients *mz-from-native*

*descrips:*
mezzanine,
prot-spec v1.0,
psa,
delete-asset
from:,
native-mezz

*ingests:*
uid: <asset uid>

FIG. 131 p5190 delete all assets [success]
mezzanine → all clients *mz-from-native*

*descrips:* mezzanine,
prot-spec v1.0,
psa,
clear-paramus
from:,
native-mezz

*ingests:* none

FIG. 132 p5xxx slide deleted
mezzanine → all clients *mz-from-native*

*descrips:* mezzanine,
prot-spec v1.0,
psa,
slide-delete
from:,
native-mezz

*ingests:* uid: <slide uid>

FIG. 133 p5xxx slide reordered
mezzanine → all clients *mz-from-native*

*descrips:* mezzanine,
prot-spec v1.0,
psa,
slide-reorder
from:,
native-mezz

*ingests:* uid: <slide uid>,
ordinal: <int>

FIG. 134

| | |
|---|---|
| **p5xxx** | **windshield cleared**<br>mezzanine → all clients *mz-from-native* |
| *descrips:* | mezzanine,<br>prot-spec v1.0,<br>psa,<br>clear-windshield<br>from:,<br>native-mezz |
| *ingests:* | none |

FIG. 135

| | |
|---|---|
| **p5xxx** | **deck cleared**<br>mezzanine → all clients *mz-from-native* |
| *descrips:* | mezzanine,<br>prot-spec v1.0,<br>psa,<br>clear-deck<br>from:,<br>native-mezz |
| *ingests:* | none |

FIG. 136 p5xxx download asset (success)
mezzanine → client *mz-astman-to-native*

*descrips:*
mezzanine,
prot-spec v1.0,
response,
download-paramus,
from:,
asset-manager,
to:,
native-mezz

*ingests:*
dossier-uid: <dossier uid>,
asset-uid <asset uid>,
asset-url: <uri, eg. "http://assets /...png">,
prov-and-tid: [
<client uid>,
<transaction number>]

FIG. 137 p5xxx download asset [error]
mezzanine→ client *mz-astman-to-native*

*descrips:*
mezzanine,
prot-spec v1.0,
response,
download-paramus,
from:,
asset-manager,
to:,
native-mezz,
error

*ingests:*
summary: "error downloading asset",
description: <detailed error string>,
error-code: "mz-download-asset",
prov-and-tid: [
<client uid>,
<transaction number>]

FIG. 138 p6010 can join

```
mezzanine → client   mz-from-native

descrips:
  mezzanine,
  prot-spec v1.0,
  response,
  join
  from:,
  native-mezz
  to:,
  [<client uid>, <transaction number>]

ingests:
  permission: true
  [optional] handipoint: {
        color: v4f <r, g, b, a>,
        quadrant: v2f <h, v>,
        ratchet-state: <default ratchet state> },
  [optional] felds: {
        left: {
              type: "wall",
              cent: v3f <x, y, z>,
              phys-size: v2f <w, h>,
              norm: v3f <x,y,z>,
              over: v3f <x,y,z>,
              px-size: v2i <w, h>,
              view-dist: <float: 1400.5> },
        main: { ... },
        right: { ... } }
```

can't join

```
mezzanine → client   mz-from-native

descrips:
  mezzanine,
  prot-spec v1.0,
  response,
  join
  from:,
  native-mezz
  to:,
  [<client uid>, <transaction number>]

ingests:
  permission: false
```

FIG. 139

```
p6020       full state response (portal)
            mezzanine -> client   mz-from-native

descrips:   mezzanine,
            prot-spec v1.0,
            response,
            mez-state,
            (detail: full),
            from:,
            native-mezz
            to:,
            [<client uid>, <transaction number>]

ingests:    state: portal,
            uids: [<dossier 1 uid>, <dossier 2 uid>, ..., <dossier n uid>],
            dossiers: {
                <dossier 1 uid>: {
                    name: <dossier name>,
                    thumb-uri: <uri eg. "rel/path/to/doss-thumb.png">,
                    mod-date-utc: <utc timestamp>,
                    mod-date: <timestamp>,
                    all-thumbs: [<uri eg. "rel/path/to/doss-thumb.png">] },
                <dossier 2 uid>: { ... },
                ...
                <dossier n uid>: { ... } }
```

FIG. 140

```
p6022       full state response (dossier)
            mezzanine → client   mz-from-native

descrips:   mezzanine,
            prot-spec v1.0,
            response,
            mez-state,
            (detail: full),
            from:,
            native-mezz
            to:,
            [<client uid>, <transaction number>]

ingests:    state: dossier,
            dossier: {
                uid: <dossier uid>,
                name: <dossier name>,
                deck: {
                    num-slides: <int>,
                    cur-slide: <int>,
                    visible-slide-count: <float>,
                    pushback-state: <float> },
                assets: [
                    [<asset 1 uid>, <orig-img 1 uri>, <thumb-img 1 uri>],
                    [<asset 2 uid>, <orig-img 2 uri>, <thumb-img 3 uri>],
                    ...
                    [<asset n uid>, <orig-img n uri>, <thumb-img n uri>] ] }
```

FIG. 141 p6041 create new dossier (error)
mezzanine → client *mz-from-native*

*descrips:*
mezzanine,
prot-spec v1.0,
response,
new-dossier
from:,
native-mezz
to:,
[<client uid>, <transaction number>],
error

*ingests:*
summary: "could not create new dossier",
description: "sorry, your dossier was not created. someone
opened a dossier",
error-code: 0x2839755

FIG. 142 p6043 create new dossier (error)
mezzanine → client *mz-from-native*

*descrips:*
mezzanine,
prot-spec v1.0,
response,
new-dossier
from:,
native-mezz
to:,
[<client uid>, <transaction number>],
error

*ingests:*
summary: "could not create new dossier",
description: "bad dossier name",
error-code: 0x2839755

FIG. 143 p6051 open dossier (error)
mezzanine → client *mz-from-native*

*descrips:*
mezzanine,
prot-spec v1.0,
response,
open-dossier
from:,
native-mezz
to:,
[<client uid>, <transaction number>],
error

*ingests:*
summary: "could not open dossier",
description: "sorry! someone else opened a different dossier.",
error-code: 0x7829430984

FIG. 144 p6061 rename dossier (error)
mezzanine → client *mz-from-native*

*descrips:*
mezzanine,
prot-spec v1.0,
response,
rename-dossier
from:,
native-mezz
to:,
[<client uid>, <transaction number>],
error

*ingests:*
summary: "could not rename dossier",
description: "sorry, someone else opened a new dossier before
yours was renamed."
error-code: 0x30928429

FIG. 145 p6071 duplicate dossier (error)
mezzanine → client *mz-from-native*

*descrips:*
mezzanine,
prot-spec v1.0,
response,
duplicate-dossier
from:,
native-mezz
to:,
[<client uid>, <transaction number>]

*ingests:*
summary: "could not duplicate dossier",
description: "sorry, someone else opened
a new dossier before yours was duplicated."
error-code: 0x309284339

FIG. 146 p6081 delete dossier (error)
mezzanine → client *mz-from-native*

*descrips:*
mezzanine,
prot-spec v1.0,
response,
delete-dossier
from:,
native-mezz
to:,
[<client uid>, <transaction number>],
error

*ingests:*
summary: "could not delete dossier",
description: "sorry, someone else opened a dossier before yours
was deleted."
error-code: 0x309284330

FIG. 147 p6083 delete dossier [error]
mezzanine → client *mz-from-native*

*descrips:*
mezzanine,
prot-spec v1.0,
response,
delete-dossier
from:,
native-mezz
to:,
[<client uid>, <transaction number>],
error

*ingests:*
summary: "could not delete dossier",
description: "could not remove from file system."
error-code: 0x309284330

FIG. 148 p6120 passforward ratchet state
mezzanine → client *mz-from-native*

*descrips:*
mezzanine,
prot-spec v1.0,
response,
ratchet
from:,
native-mezz
to:,
[<client uid>, <transaction number>]

*ingests:* ratchet-state: pointing || demarcating || passthrough

FIG. 149 p6130 download all slides (success)
mezzanine → client *mz-from-native*

*descrips:*
mezzanine,
prot-spec v1.0,
response,
download-deck
from:,
native-mezz
to:,
[<client uid>, <transaction number>]

*ingests:*
deck-uri: <uri eg. "http://.../slides.zip">

FIG. 150 p6131 download all slides [error]
mezzanine → client *mz-from-native*

*descrips:*
mezzanine,
prot-spec v1.0,
response,
download-deck
from:,
native-mezz
to:,
[<client uid>, <transaction number>],
error

*ingests:*
summary: "couldn't download slides",
description: <detailed error string>,
error-code: 0x32743928742

FIG 151 p6140 download all assets (success)
mezzanine → client *mz-from-native*

*descrips:*
mezzanine,
prot-spec v1.0,
response,
download-paramus
from:,
native-mezz
to:,
[<cclient uid>, <transaction number>]

*ingests:* paramus-uri: <uri eg. "http://.../assets.zip">

FIG. 152 p6141 download all assets (error)
mezzanine → client *mz-from-native*

*descrips:*
mezzanine,
prot-spec v1.0,
response,
download-paramus
from:,
native-mezz
to:,
[<client uid>, <transaction number>],
error

*ingests:*
summary: "couldn't download assets"
description: <detailed error string>,
error-code: 0x32743928742

FIG. 153 p6151 image ready (error)
mezzanine → client *mz-from-native*

*descrips:*
mezzanine,
prot-spec v1.0,
response,
image-ready
from:,
native-mezz
to:,
[<client uid>, <transaction number>],
error

*ingests:*
file-name: <string>,
summary: "image upload error",
description: "%s is an unrecognizable file format",
error-code: 0x928347389

FIG. 8I p6160 upload images [success]
mezzanine → client *mz-from-native*

*descrips:*
mezzanine,
prot-spec v1.0,
response,
upload-images
from:,
native-mezz
to:,
[<client uid>, <transaction number>]

*ingests:*
uids: [<asset 1 uid>, <asset 2 uid>, ..., <asset n uid>]

FIG. 155 p6161 upload images (error 1)
mezzanine → client *mz-from-native*

*descrips:*
mezzanine,
prot-spec v1.0,
response,
upload-images
from:,
native-mezz
to:,
[<client uid>, <transaction number>],
error

*ingests:*
(*optional*) uids: [<asset 1 uid>, <asset 2 uid>, ..., <asset n uid>],
summary: "paramus and deck are full",
description: <error detail>,
error-code: 0x3489327431 upload images (error 2)
mezzanine → client *mz-from-native* mezzanine,
prot-spec v1.0,
response,
upload-images
from:,
native-mezz
to:,
[<client uid>, <transaction number>],
error uids: [<asset x uid>, <asset y uid>, ..., <asset n uid>],
summary: "image upload error",
description: "timeout",
error-code: 0x928347389

FIG. 156 p6162 upload images (partial success)
mezzanine → client *mz-from-native*

*descrips:*
mezzanine,
prot-spec v1.0,
response,
upload-images
from:,
native-mezz
to:,
[<client uid>, <transaction number>]
error

*ingests:*
uids: [<asset 1 uid>, <asset 2 uid>, ..., <asset n uid>],
summary: "paramus is full",
description: "you can only have 54 assets in the palette.",
error-code: 0x3489327432

FIG. 157 p6191 delete all assets (error)
mezzanine → client *mz-from-native*

*descrips:*
mezzanine,
prot-spec v1.0,
response,
clear-paramus
from:,
native-mezz
to:,
[<client uid>, <transaction number>]
error

*ingests:*
summary: "couldn't clear palette",
description: <detailed error string>,
error-code: 0x389235

FIG. 158

```
p6xxx      deck detail response
           mezzanine -> client   mz-from-native

descrips:  mezzanine,
           prot-spec v1.0,
           response,
           deck-detail
           from:,
           native-mezz
           to:,
           [<client uid>, <transaction number>]

ingests:   slides: [
               [<asset 1 uid>, <thumb-uri 1>, <full-uri 1>],
               [<asset 2 uid>, <thumb-uri 2>, <full-uri 2>],
               ...
               [<asset n uid>, <thumb-uri n>, <full-uri n>] ]
```

FIG. 159 p7150 image ready
client → asset manager *mz-native-to-astman*

*descrips:*
mezzanine,
prot-spec v1.0,
request,
image-ready
from:,
[<client uid>, <transaction number>],
to:,
asset-manager

*ingests:*
dossier: {
    uid: <dossier uid> },
uid: <asset uid>,
file-name: <name string>,
data: <binary data>

FIG. 160 pxxxx video source list
mezzanine → client *mz-from-native*

*descrips:*
mezzanine,
prot-spec v1.0,
psa,
video-source-list
from:,
native-mezz

*ingests:*
video-sources: [
[<video 1 uid>, <name>],
[<video 2 uid>, <name>],
...
[<video n uid>, <name>] ]

FIG. 161 pxxxx hoboken status
mezzanine → client *mz-from-native*

*descrips:*
mezzanine,
prot-spec v1.0,
psa,
hoboken-status
from:,
native-mezz

*ingests:*
video-feeds: [
[<video 1 uid>, <name>, <volume>],
[<video 2 uid>, <name>, <volume>],
...
[<video n uid>, <name>, <volume>] ]

FIG. 162 pxxxx video thumbnail available
mezzanine → client *mz-from-native*

*descrips:*
mezzanine,
prot-spec v1.0,
psa,
update-video-thumbnail
from:,
native-mezz

*ingests:*
```
video: {
    uid: <video uid>,
    thumb-uri: <uri eg "http://.../video-1.png" }
```

FIG. 163 pxxxx set hoboken video source
client → mezzanine *mz-to-native*

*descrips:*
mezzanine,
prot-spec v1.0,
request,
set-hoboken-video-source
from:,
[<client uid>, <transaction number>]

*ingests:*
slot: <int: [1,4]>,
uid: <video uid>

FIG. 164 pxxxx adjust video audio
client → mezzanine *mz-to-native*

*descrips:*
mezzanine,
prot-spec v1.0,
request,
update-video-audio
from:,
[<client uid>, <transaction number>]

*ingests:*
```
video: {
    slot: <int: [1,4]>, // or uid?
    volume: <float: [0,1]> }
```

FIG. 165 pxxxx video audio adjusted (singular)
mezzanine → client *mz-from-native*

*descrips:*
mezzanine,
prot-spec v1.0,
psa,
update-video-audio
from:,
native-mezz

*ingests:*
video: {
    uid: <video uid>,
    volume: <float: [0,1]> } video audio adjusted (multiple)
mezzanine → client *mz-from-native* mezzanine,
prot-spec v1.0,
psa,
update-video-audio
from:,
native-mezz videos: {
    1: {
        uid: <video uid>,
        volume: <float: [0,1]> }

FIG. 166

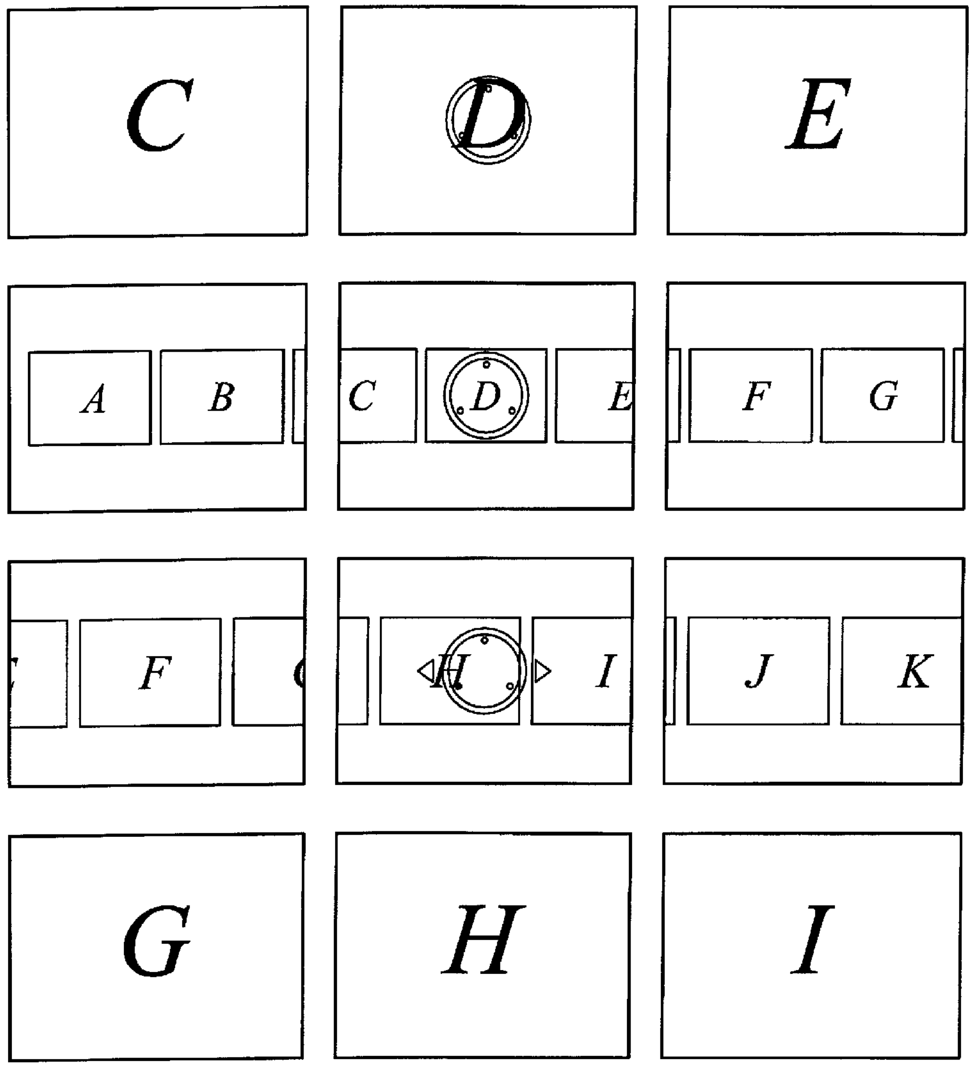

the deck is quiescent. pilot presses wand button with wand pointed toward ceiling. the pushback glyph fades on.

with the button still depressed, pilot pushes the wand (still aimed aloft) forward, toward the screen; the deck recedes. this, planet earth, is pushback.

pilot translates the button-depressed wand leftward; the deck follows. finally, pilot releases the wand's button...

... whereupon the deck springs forward, centering itself en route so that the slide 'most nearly centered' at the time of button release ends occupying the center field.

FIG. 169

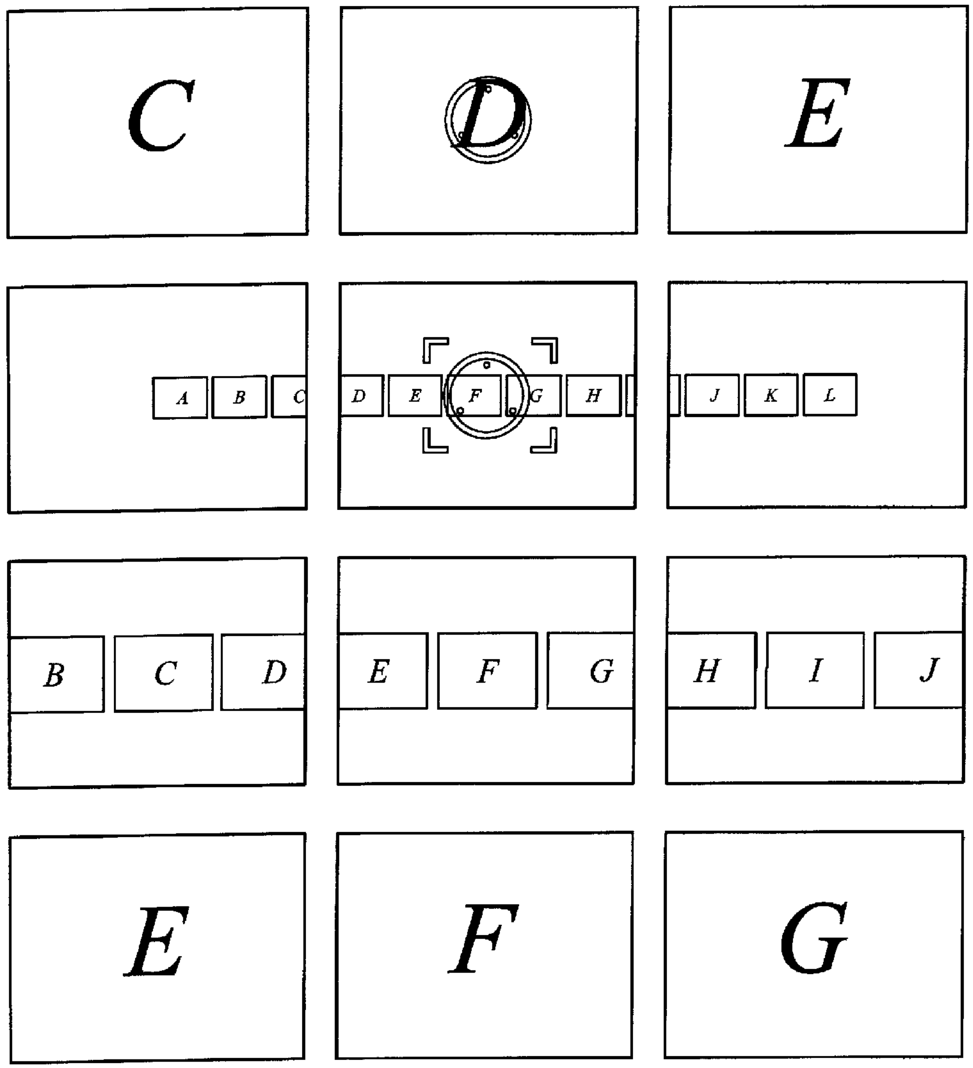

quiescent deck; pilot engages pushback mechanics as before.

pilot pushes back (toward screen), past a depth threshold. a modified glyph indicates that pushback lock-ing may be engaged.

pilot releases the wand button; the deck springs forward, but only to 'lock depth'.

when pilot depresses the wand's button subsequently, irrespective of the wand's aim or attitude the deck springs back to fullscreen depth.

FIG. 170 while in event passthrough mode, pilot may switch the meaning of button presses from 'left button' to 'right button'...

... by 'ratcheting' the wand: rapidly rotating the wand 120 degrees around its principal axis.

pressing the wand's button then effects a 'right mouse button click' on the remote system.

ratcheting the wand once more results in a return to 'left mouse button' mode.

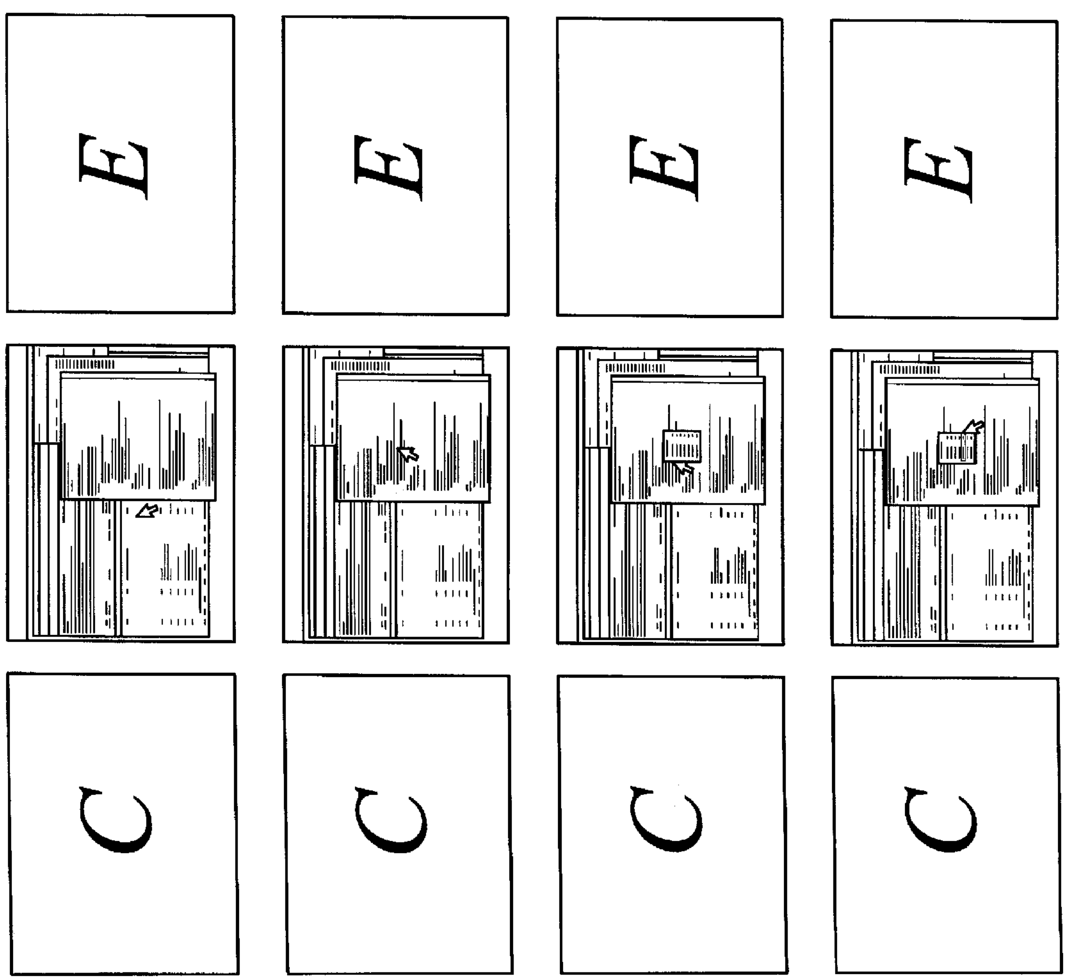

FIG. 172

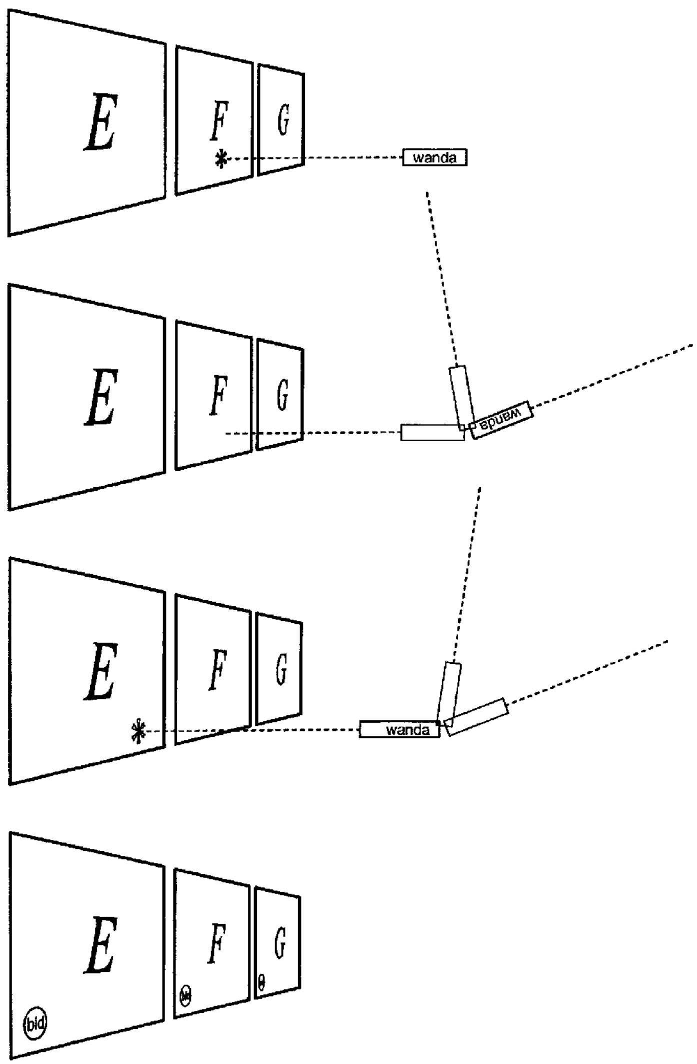

pilot aims the wand at the center field and presses the wand's button.

... and with the button kept depressed, swings the wand upward toward and then past the vertical, ending with the wand aimed behind her...

... and then reverses the motion, bringing the wand's aim back to meet any of the three fields;

whereupon the system exits to build mode. thus is the importance of fly-fishing.

FIG. 173

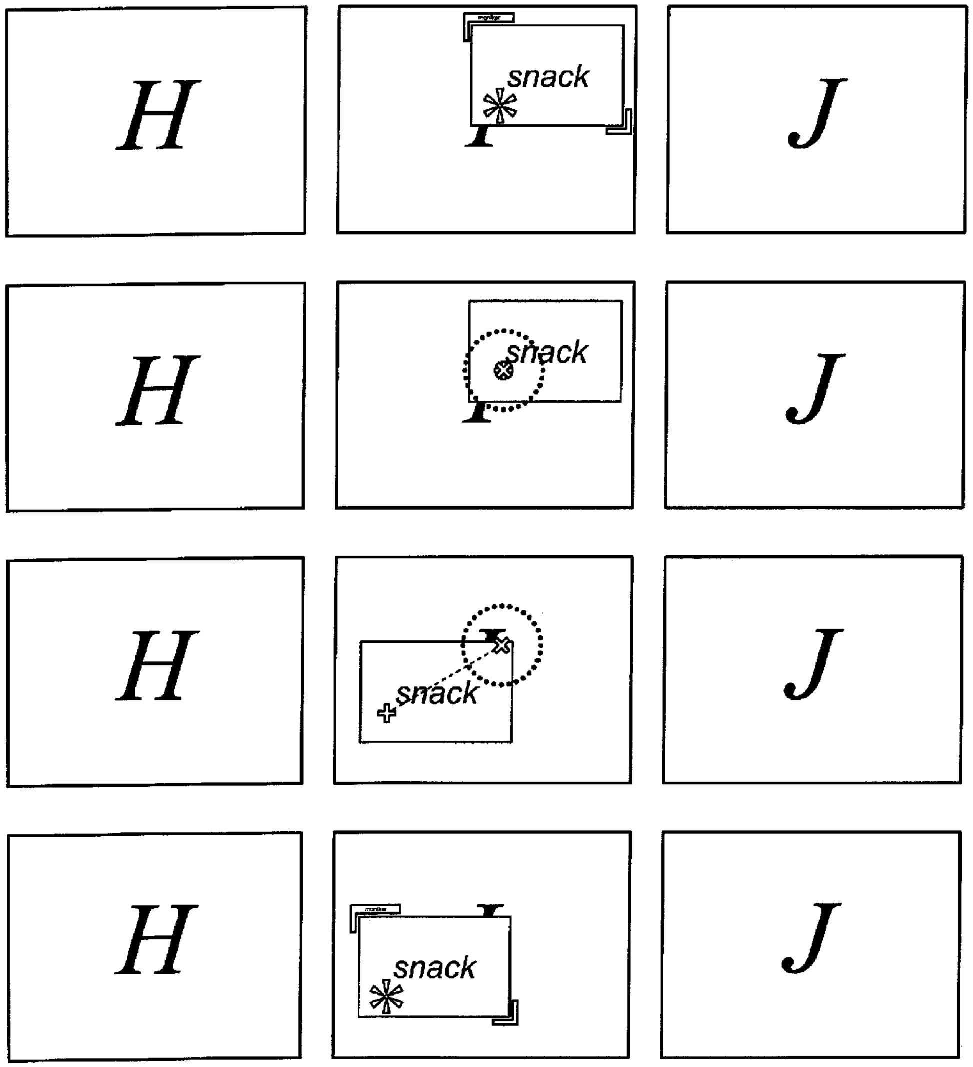

with the cursor atop an element (which is manifesting its exoskel), pilot depresses wand button...

... whereupon the exoskeleton disappears, as does the normal cursor; the move/scale glyph appears. the pilot redirects the wand until the move/scale sub-cursor exceeds the circular move threshold...

... at which point the element begins to follow the wand's aim.

pilot releases the wand's button, and the element ceases it translation; the cursor reverts to its normal form, and the exoskeleton reappears.

FIG. 175

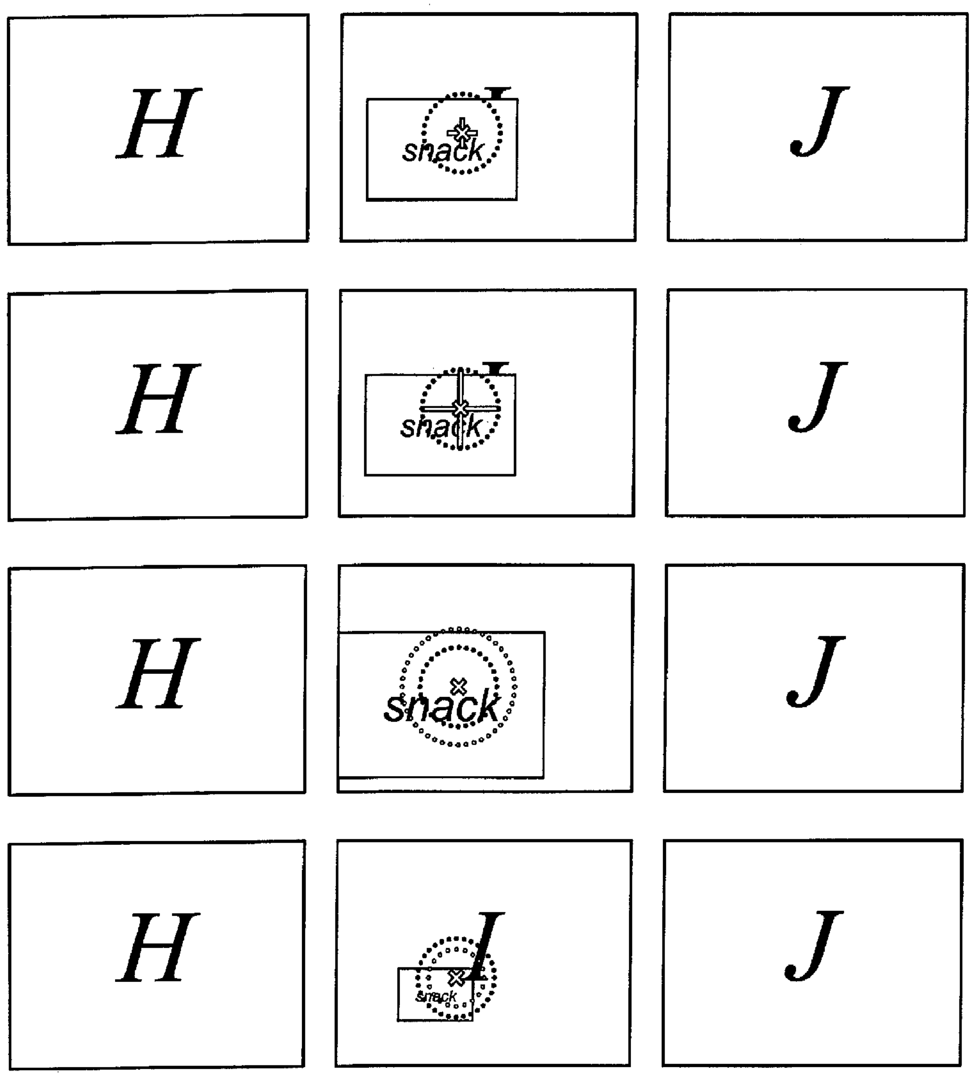

pilot depresses wand button while atop an element; the move/scale glyph appears, and pilot begins pulling wand backward along its axis.

when the wand-pull crosses a backward distance threshold, active scaling is engaged and will remain so until the wand button is released.

continued translation of the wand toward pilot increases the element's size...

whereas pushing the wand in the other direction reduces the element's size. (modified axial detent to allow easy return to the original scale?)

FIG. 176

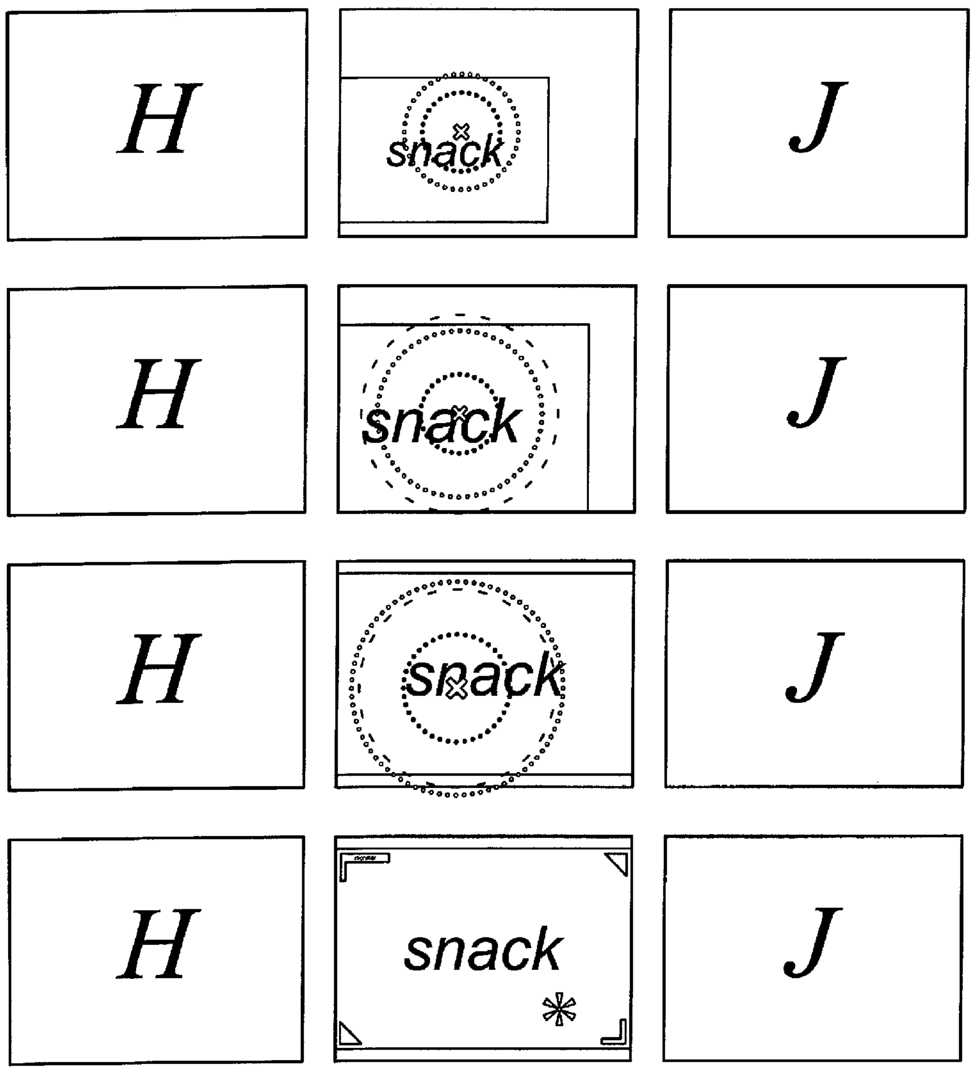

pilot has engaged element scaling, and is increasing the element's size.

when the element has been scaled to the precise size of the field, a new axial detent is established (with corresponding glyphics) throughout which no further scaling is effected, but during which instead the element's interpolates toward centeredness.

when the fullfield detent has been reached the element is both fullfield and edge-aligned. pilot releases wand button.

thereafter (while in build mode), the elements exoskeleton adds subglyphs to indicate that it is 'locked' in fullscreen mode.

FIG. 177

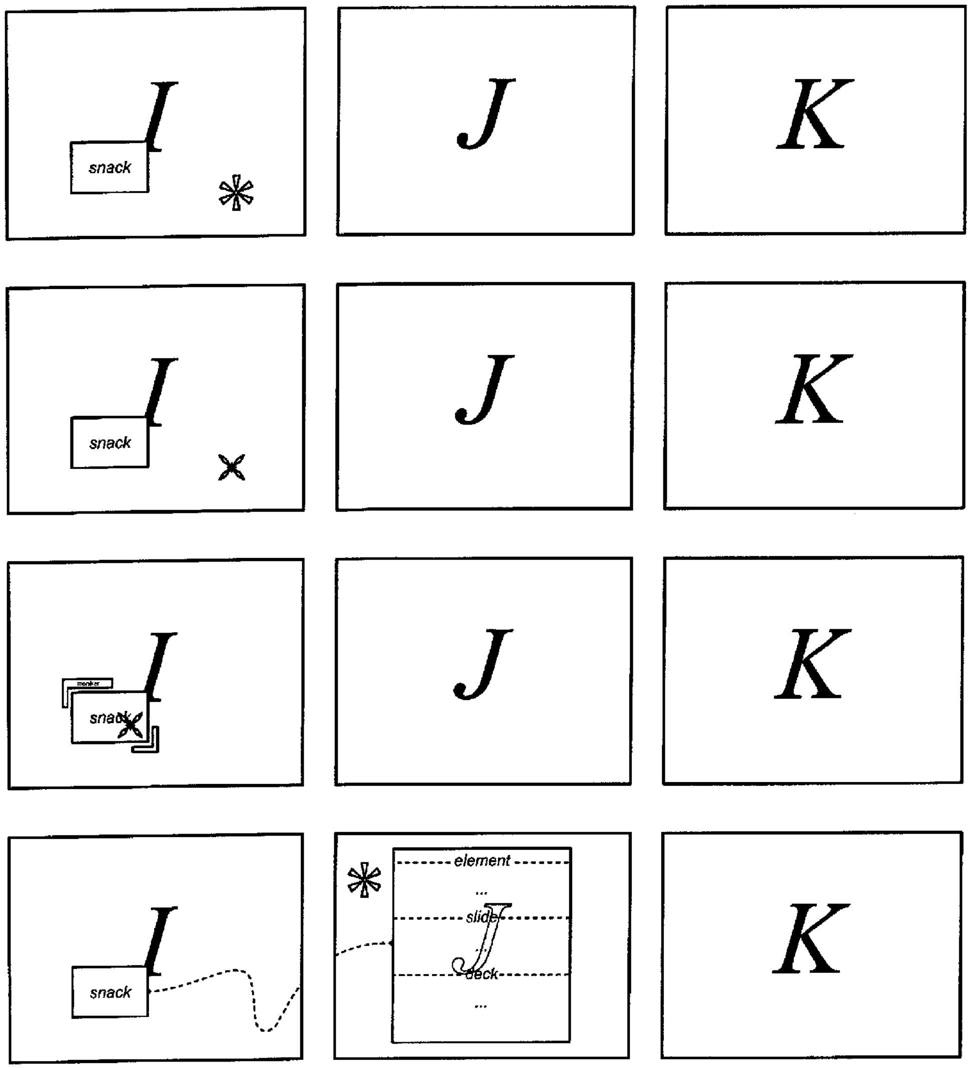

by ratchet-spinning the wand (a rapid spin around its principal axis), pilot effects a switch from the default cursor...

to the context cursor.

when pilot brings context cursor atop an element, the element's exoskeleton manifests. depressing and releasing the wand's button then summons the context card (which can always be dismissed by exercising the button with the cursor outside the card's bounds).

the context card expresses a set of options 'in decreasing proximity to the element on which it was summoned'; this means that the top items affect the element directly, the next group pertain to the element's context or surround, and so forth.

*FIG. 178* pilot, esurient, summons context card on element to be replicated.

pilot direct-selects 'dup' from the context card.

the element is multiplied. pilot is rewarded.

dd.

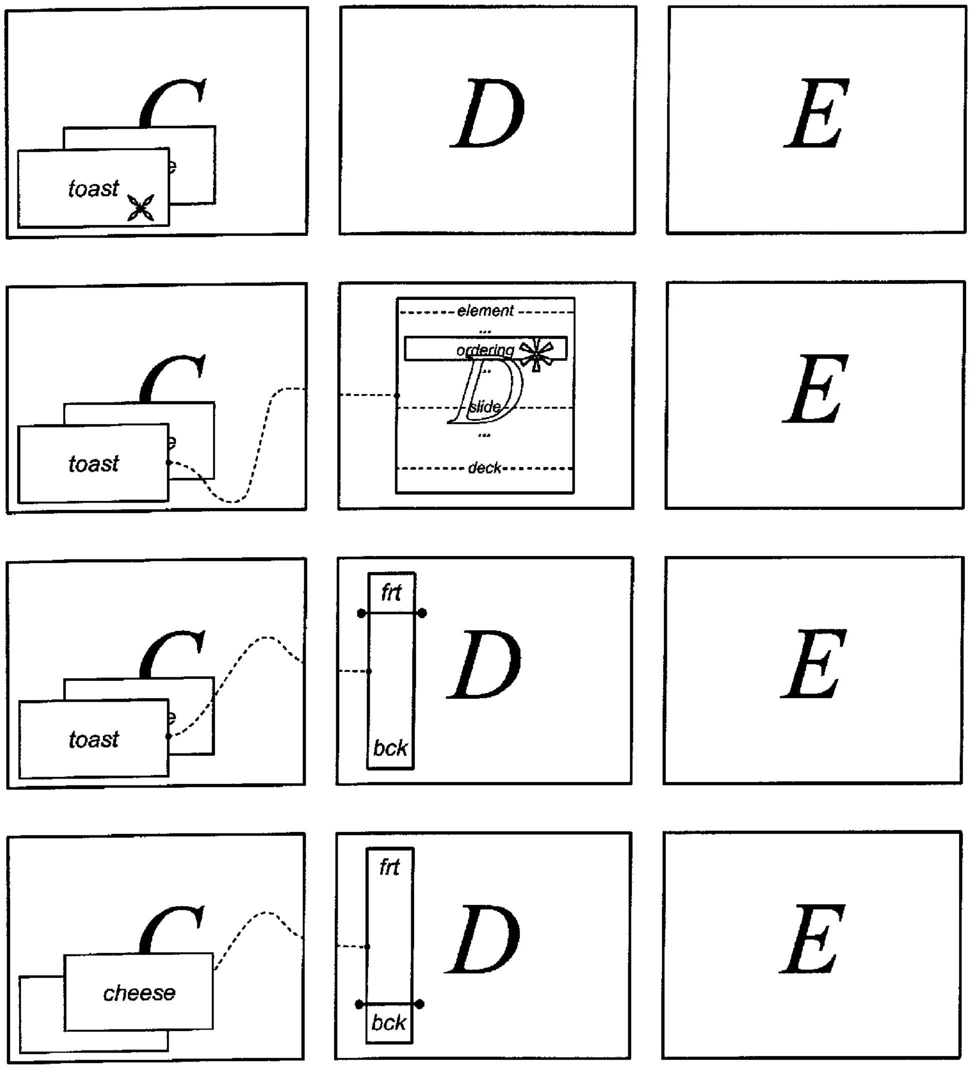

pilot feels a subtle unease with the current order of things, and so summons the context card on an element that wants adjusting.

pilot direct-selects 'ordering' from the context card.

pilot is presented with an 'ordering slider' which reacts to forward-back movement of the wand. (as ever, aiming the wand toward the ceiling and depressing its button cancels the operation.)

pushing the wand forward has succeeded in reordering the original element toward the back of the back-to-front stack; pilot depresses and releases the wand's button to permanently effect this change.

FIG. 181

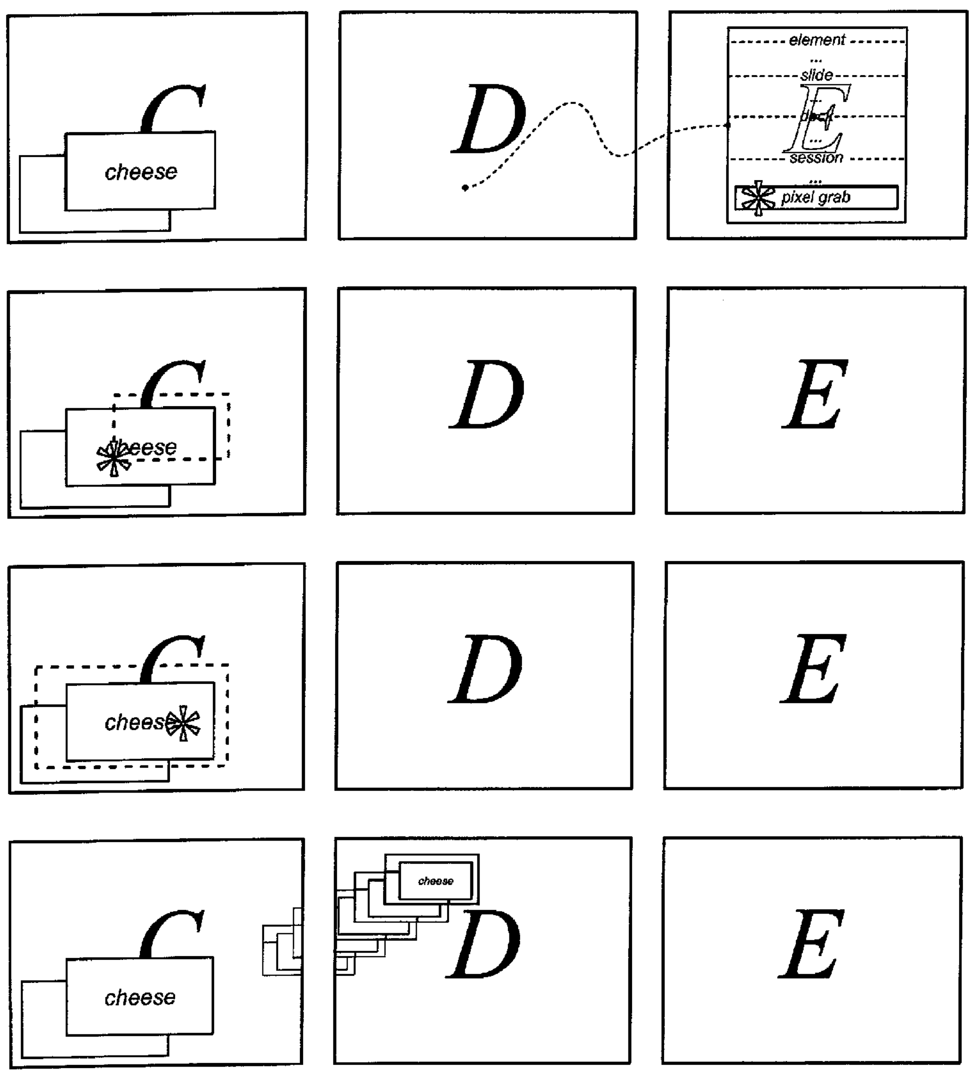

pilot wishes to remember things, or at least part of things, exactly as they are. she direct-selects 'pixel grab' from the session-section of the context card.

pilot aims the wand directly at the field part of whose contents she intends to record, depresses the wand's button, adjusts the aim to indicate the opposite corner of the region she's demarcating, and releases the button.

a snapshotting rectangle now sits atop the field. pilot may reposition it by dragging near any of the corners or resize it by dragging from the edges. to cancel pixel grab, pilot aims the wand ceilingward and exercises its button...

... or pilot may carry through, and depress and release the wand's button while the cursor occupies the interior of the demarcated rect-angle; a copy of the region's instan-taneous pixels flies off to paramus, from which it may be used like any other image asset.

FIG. 182

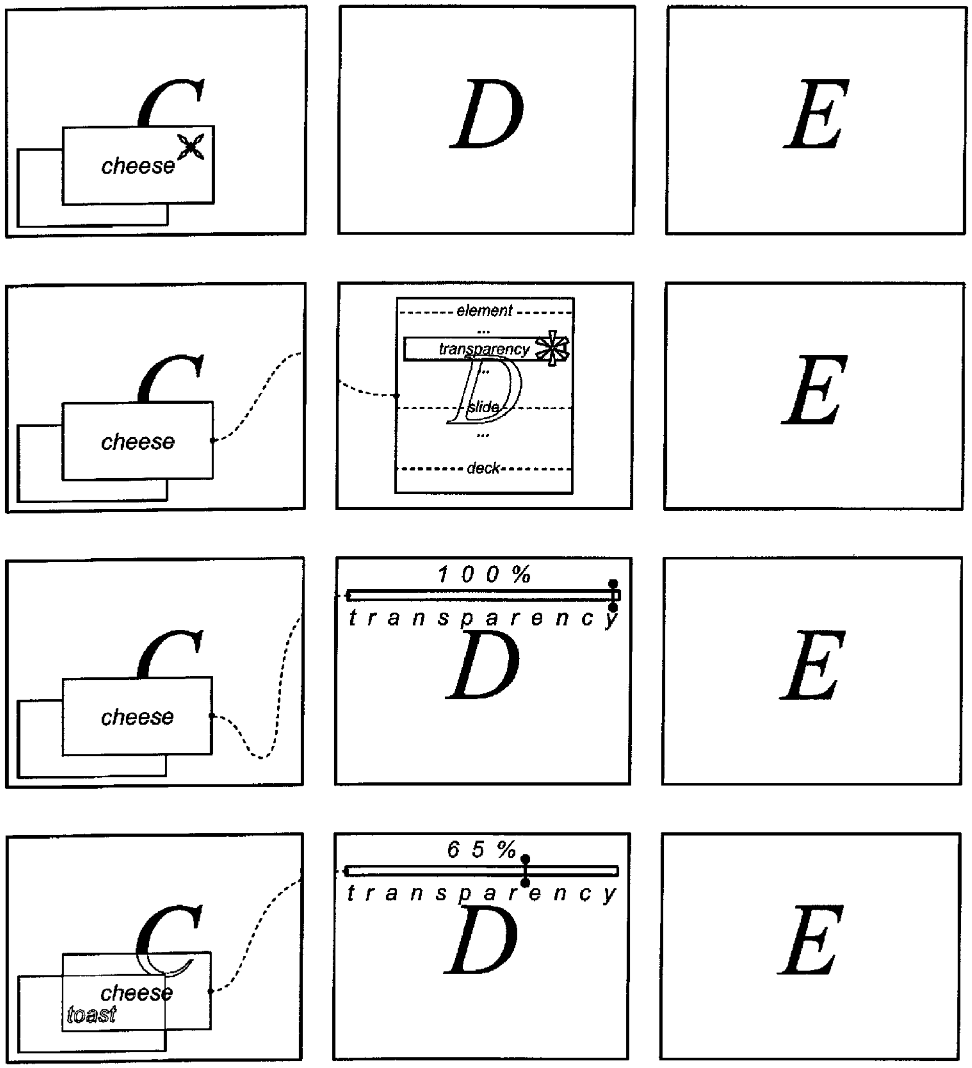

pilot summons context card on the element whose transparency she has developed a quiet desperation about adjusting.

pilot direct-selects 'transparency' from the context card.

pilot is presented with a transparency slider. if (as is always the case) she aims the wand ceilingward and clicks its button, the operation is cancelled and the slider is dismissed without changing the element's state...

... but if pilot clicks the wand's button while aiming at any field, the slider interaction is engaged. adjustments are based on lateral translation of the wand (not aiming). ceiling-click cancels; forward-click accepts.

*FIG. 183* pilot, with vague spectrum-altering intent, summons the context card on an element.

pilot direct-selects 'color from the context card.

pilot is presented with a color-choice mechanism of such unremitting splendor that it cannot be rendered by adobe products.

pilot finishes fine-adjustment of her color selection.

as in build mode, pilot engages pushback mechanics by pointing wand aloft, depressing its button, and pushing the wand toward the screen.

once the wand is past the push-back-lock forward threshold, the pilot releases its button.

fifteen media assets are visible in paramus; hoboken features a system card, four dvi/live inputs, and a deck browser.

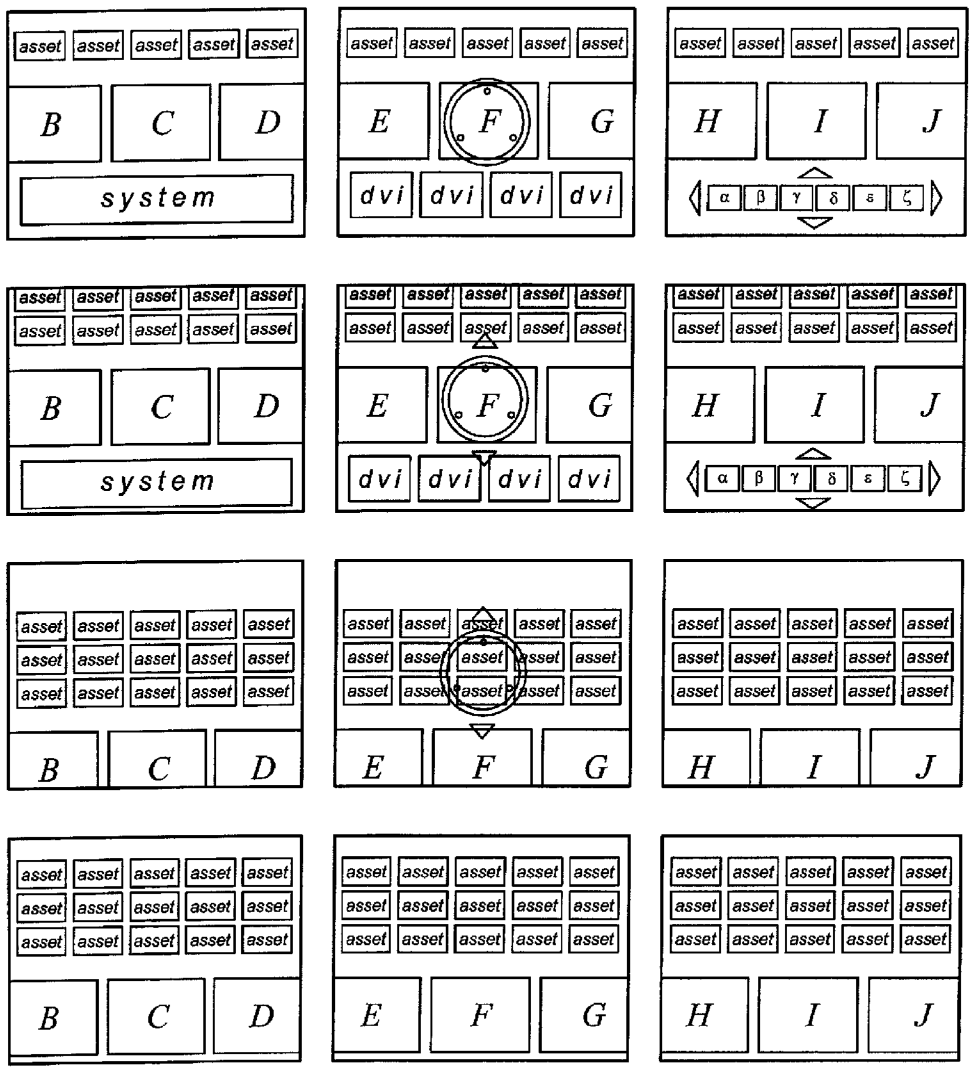

with the deck already pushed back, pilot pushes back once more, now with a substantial downward component to the wand's translational motion...

... and the space, locked laterally, is subject now to a purely vertical displacement (as indicated by visual addenda to the pushback glyph).

the pushback glyph eventually indicates that the space has exceeded its maximum 'meaningful' downward displacement. pilot releases the wand's button...

... whereupon the space drifts quickly upward into maxi-paramus alignment.

FIG. 187

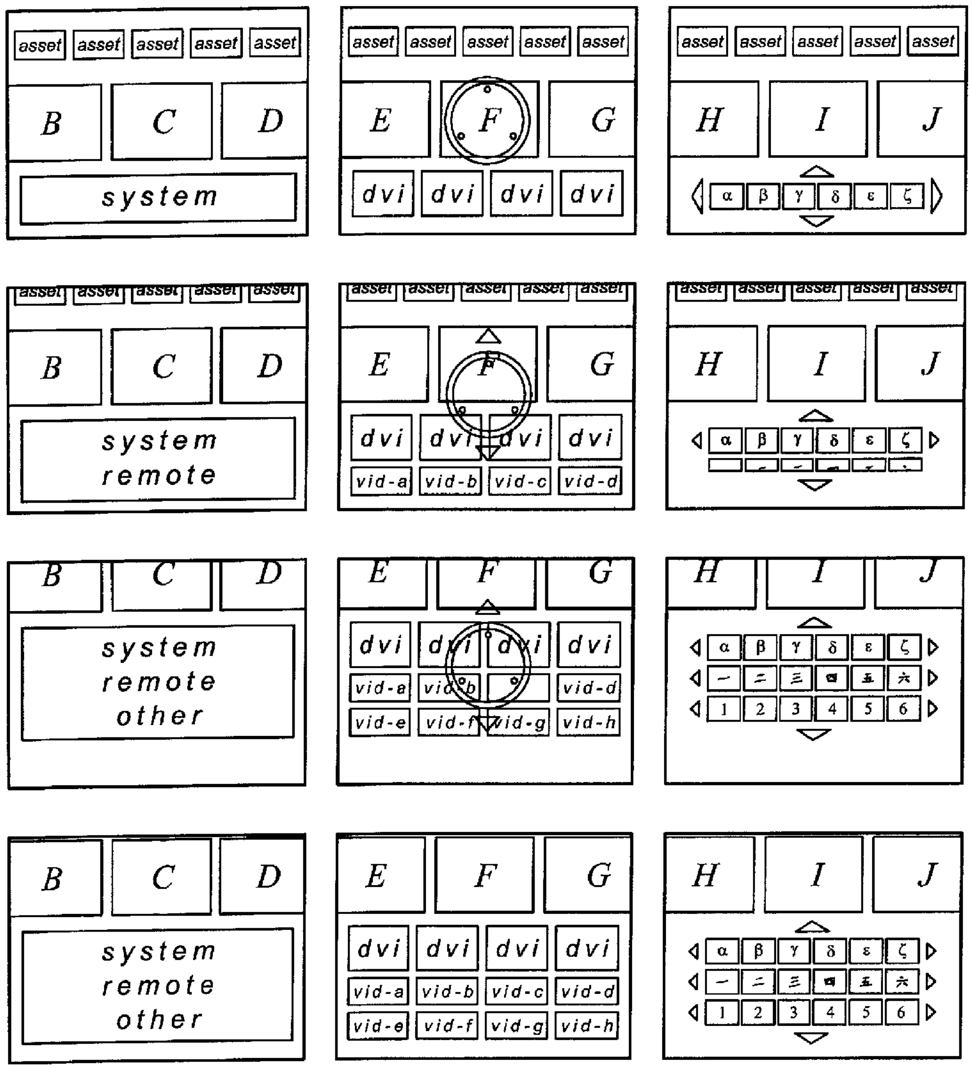

with the deck already pushed back, pilot pushes back once more, now with a substantial downward component to the wand's translational motion...

... and the space, pinioned horizontally, is available now for purely vertical displacment (as shown by additional subelements that appear as part of the pushback glyph).

as pilot continues to pull upward, the pushback glyph eventually indicates that the space has exceeded its maximum 'useable' displacement. pilot releases the wand's button...

... whereupon the space drifts swiftly downward into maxi-hoboken alignment.

FIG. 188

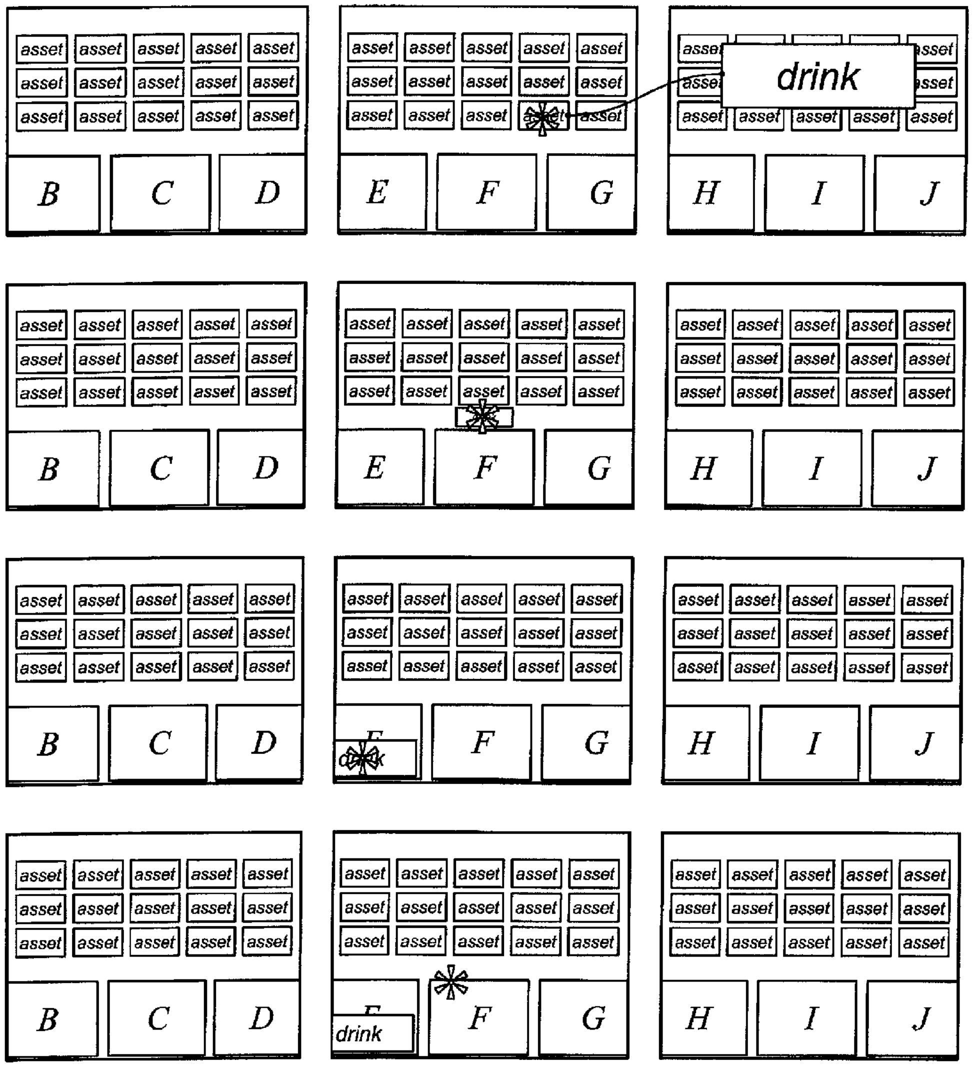

with the cursor hovering over an asset in paramus, pilot depresses the wand's button. the enlarged asset view immediately back down to 'thumbnail size' and rapidly positions itself under the cursor.

pilot begins moving cursor – button still pressed -- toward the target slide; a 'copy' of the asset at its 'natural size'.

when the cursor passes into a slide's bounds, the asset scales to its 'natural size'.

pilot releases the wand's button, and the asset becomes an elelment on the slide.

FIG. 191

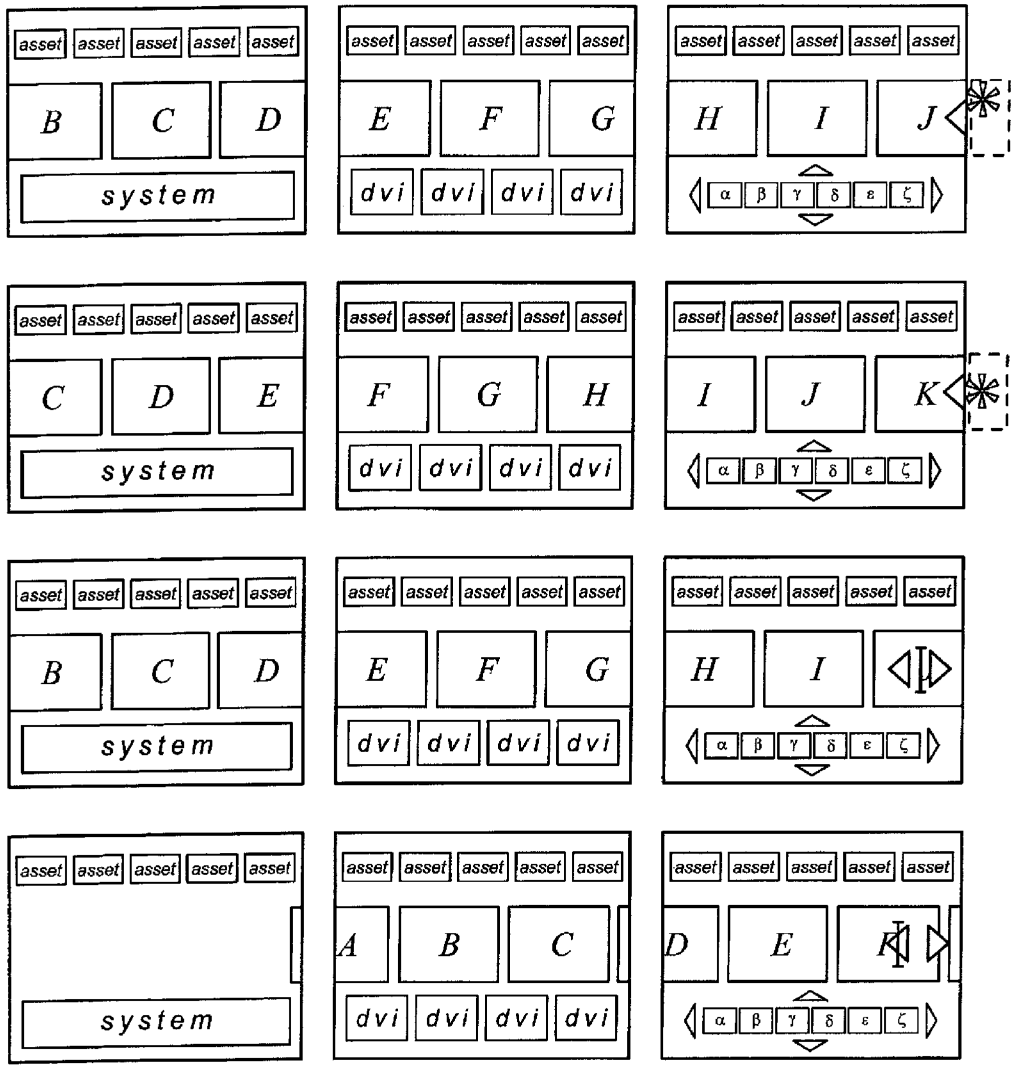

pilot aims cursor just off the edge of the rightmost field. a scroll-glyph fades swiftly up; the pilot rapidly depresses and releases the wand's button...

... and the deck scrolls leftward by a single slide-width.

now, however, pilot depresses and holds the wand's button. the normal cursor disappears, and the scroll-glyph changes from 'simple' to 'full' form. in this state, left-right displacements of the wand are quantized to three detent zones right (and three left)...

which allow the deck to be scrolled at three different speeds and in either direction. pilot may access the same functionality by aiming just off the left edge of the left field.

*FIG. 194* with space in pushed-back format, pilot summons context card on slide to be deleted.

pilot direct-selects 'del' from the slide-section of the context card.

the slide is deleted; the deck closes ranks.

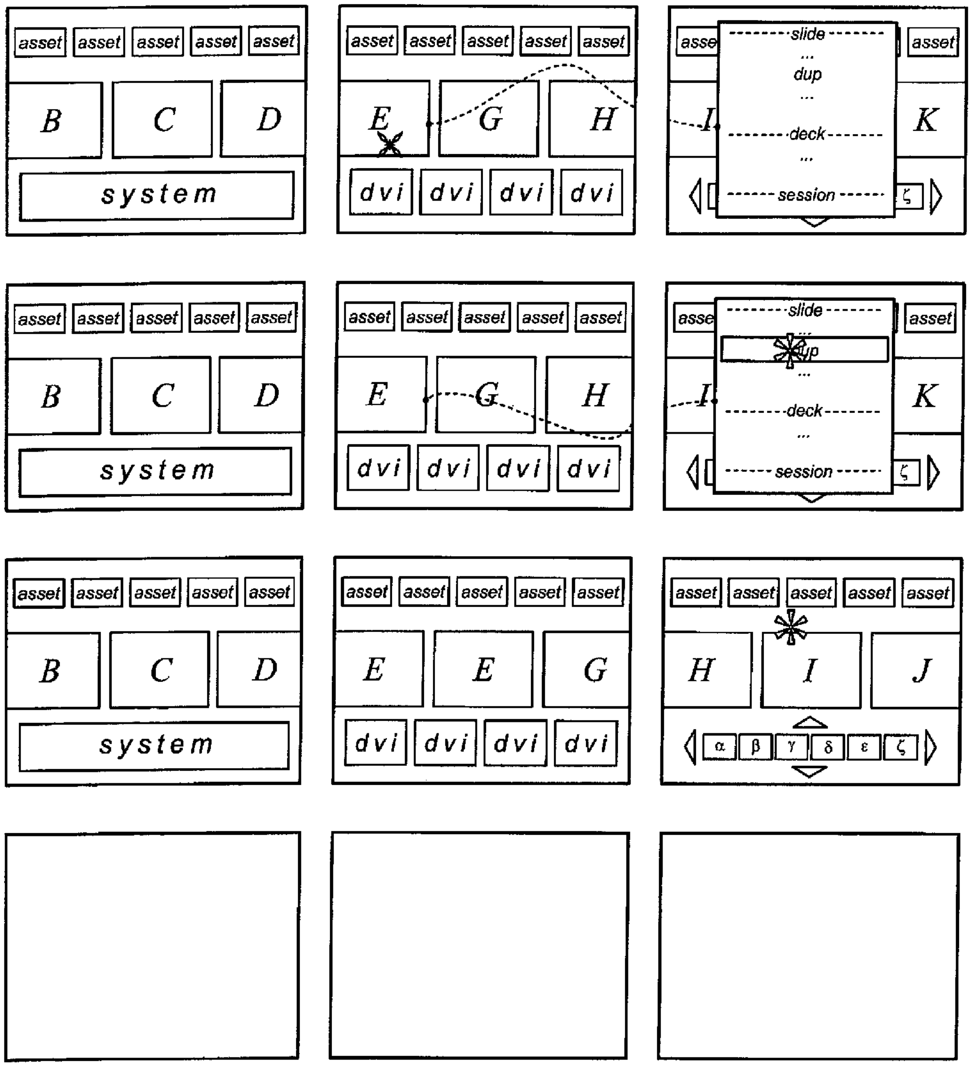

pilot summons the context card on the slide that's so unbelievably great that is needs to appear twice in the deck.

pilot earnestly direct-selects 'dup' in the slide-section of the context card.

lo! the slide is replicated; the new copy is placed to the right of the original (although: how could one tell that it hasn't been placed to the left?) the deck makes room for the doppelganger.

FIG. 196

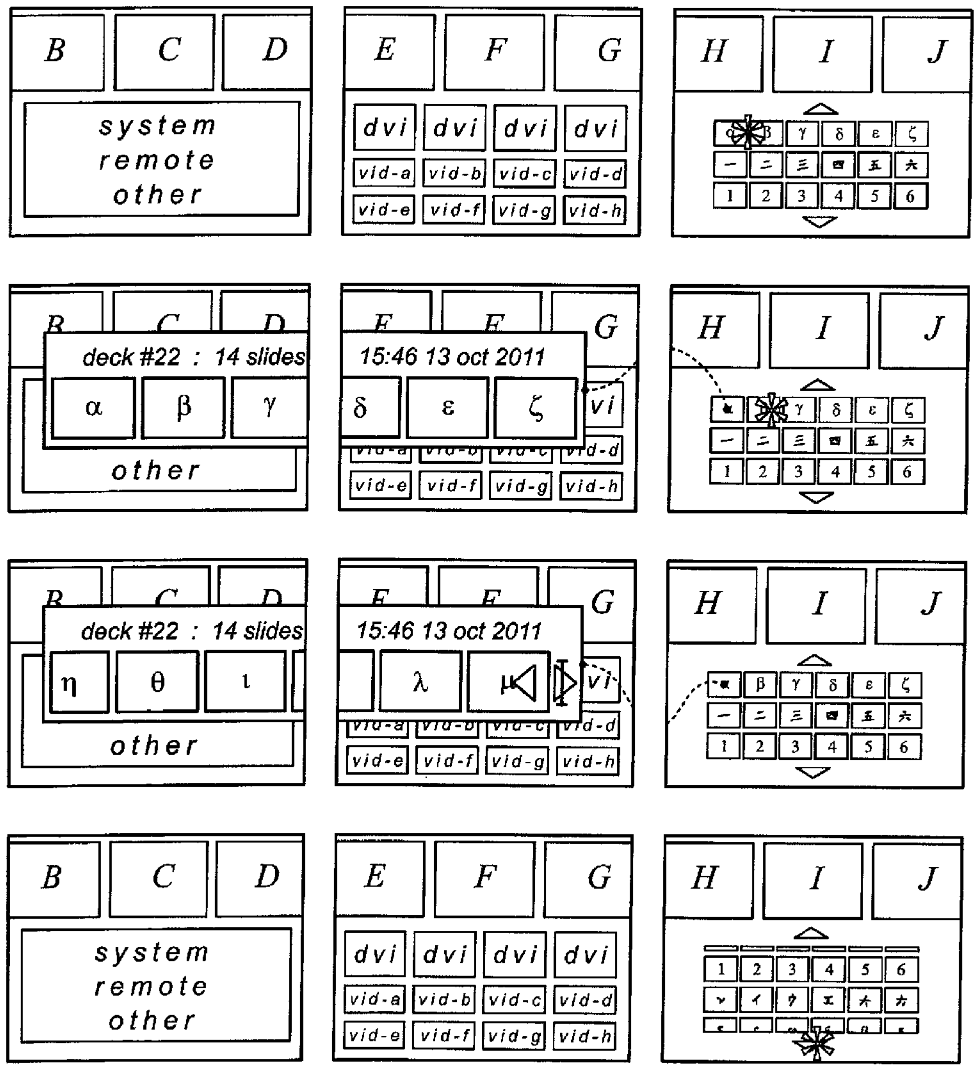

the space is in pushed-back, maxi-hoboken format. pilot allows the cursor to linger over one of the browser's miniature decks...

... and an expanded view of the deck, together with some identifying metainformation, appears.

pilot may scroll contents of 'pre-view' deck (horizontal scrolling).

pilot may scroll among the browser's various miniature decks (vertical scrolling).

FIG. 198 space is in pushed-back and maxi-hoboken configuration. pilot is sick and tired of one of the alternate decks; and why shouldn't she be? pilot summons the context card on the abhorrent deck.

pilot direct-selects 'delete' from the deck-section of the context card.

and so it goes. the unloved deck is deleted, and the deck beneath it glides upward.

dd.

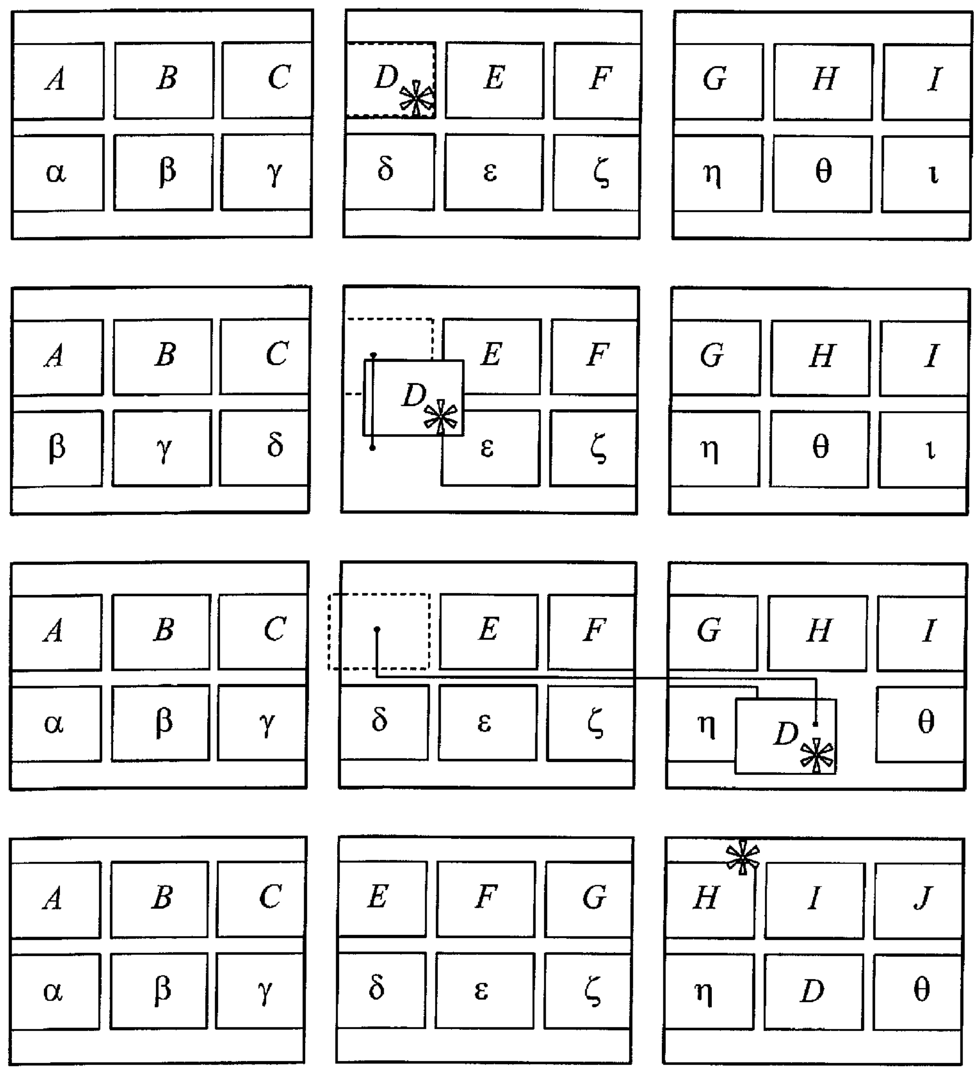

pilot moves cursor atop the slide to be moved and depresses wand's button; an outline appears above the slide.

pilot drags the slide downward. the outline remains at the position of the slide's origin. a lengthening segment connects the origin and potential destination loci.

pilot continues to displace the slide laterally. (note that she could abandon the operation at any time simply by aiming the wand well off any field and releasing the wand's button.)

when pilot releases the wand's button, the transfer is effected, the transferred slide is aligned vertically in its new deck, both decks close their spacing, and both align with the center field's center.

*FIG. 203*

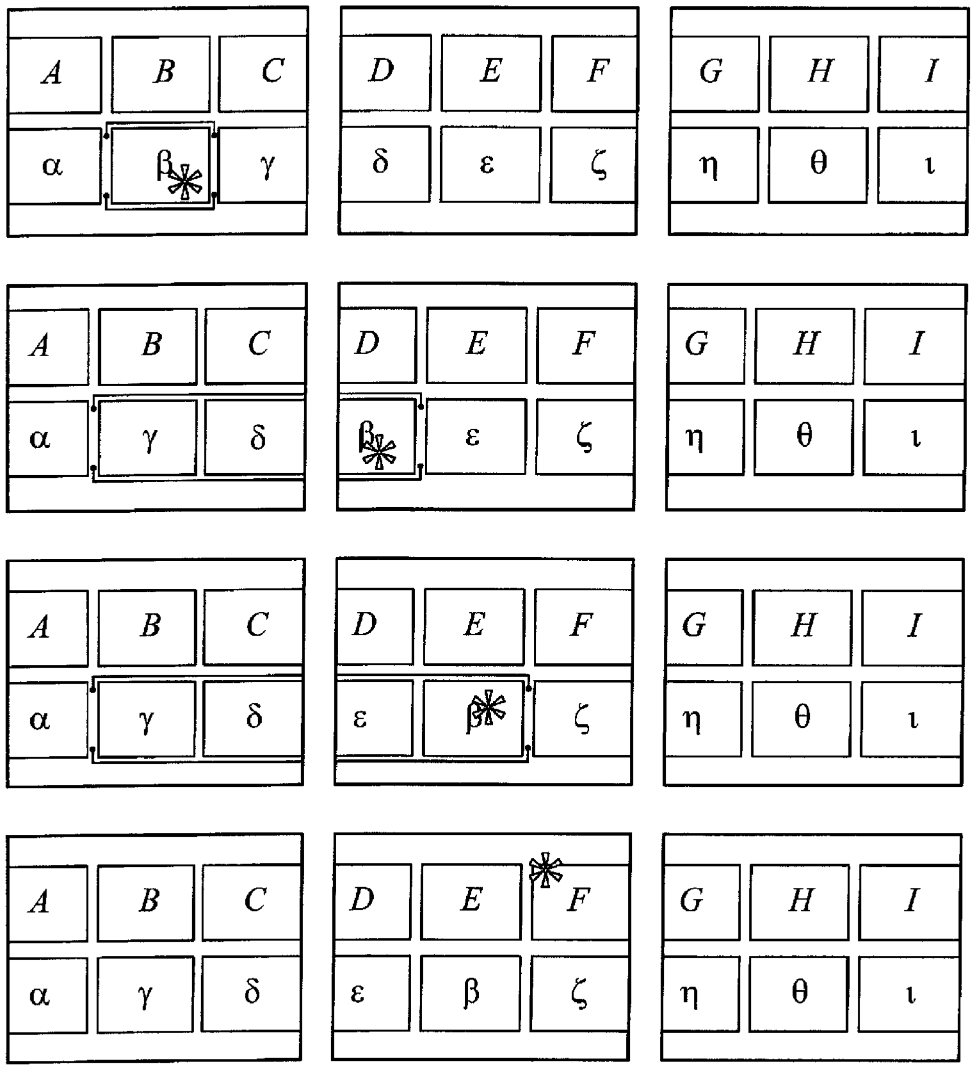

pilot depresses the wand's button while the cursor is atop the slide to be reordered and then begins displacing the cursor laterally (this initiates an intra-deck, vs. inter-deck, slide shuffling).

pilot moves the cursor laterally; the deck's slides reorder themselves in a slide-width-quantized fashion as the cursor progressively traverses each slide-locus's center.

adjustment of the slide's position continues. pilot may at any point abandon the operation (and revert the decks' state) by aiming well off the fields and releasing the wand's button.

pilot releases the wand's button, and the reordering is effected.

*FIG. 204* pilot wishes to leave a/b deck view and return to the normal build mode view. she summons the context card anywhere on any field...

... and direct-selects 'normal view'.

the current deck descends to its central position; the visibility and position of paramus and hoboken are restored; and the b deck returns to its place in miniature form within the browser.

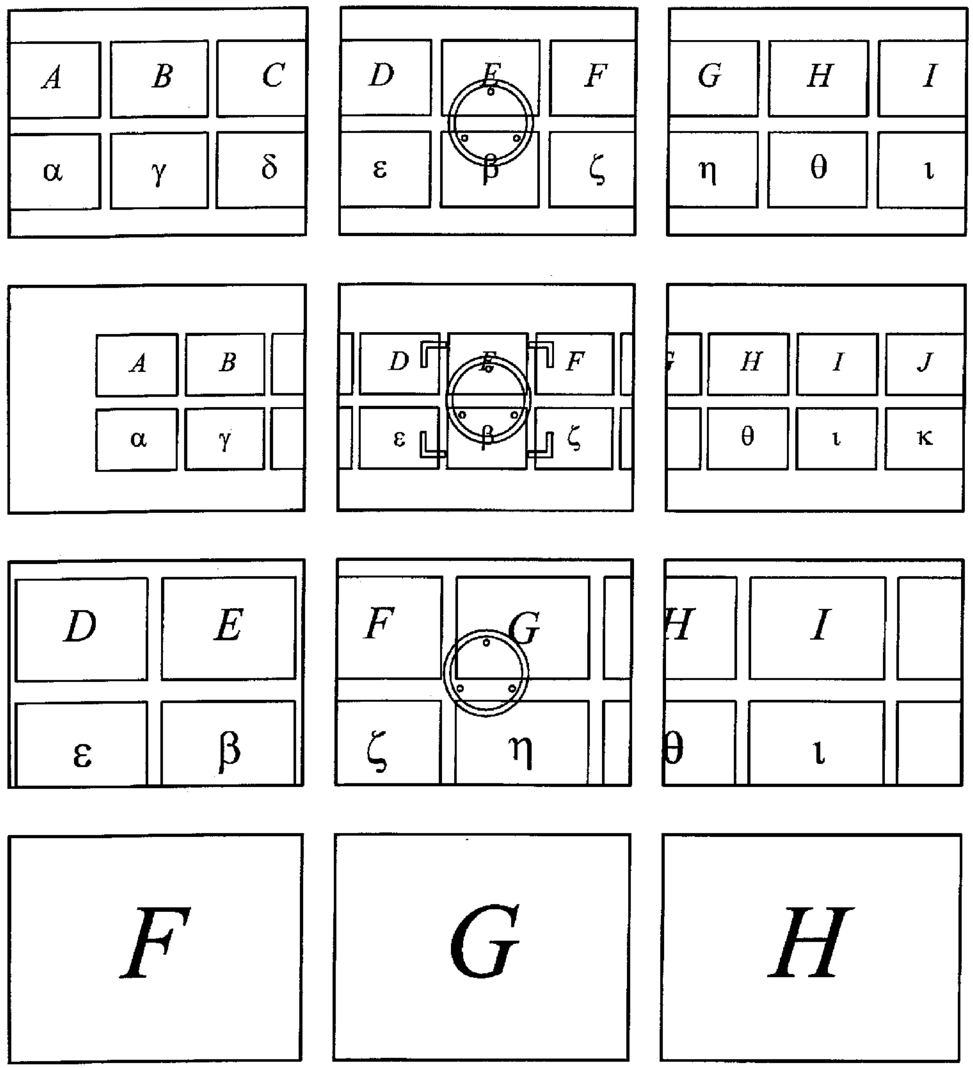

pilot, having worked in a/b deck view for what seems like an eternity, engages pushback by aiming the wand at the ceiling and depressing its button.

pilot briefly pushes the wand forward (toward the screen) before reversing direction and pulling the wand backward, past the view locking threshold.

as pilot pulls the wand back toward herself, the enlarging space automatically descends so as to approach vertical centeredness for the a-deck.

pilot releases the wand's button, and the deck springs forward to a full-field, field-aligned view.

FIG. 207

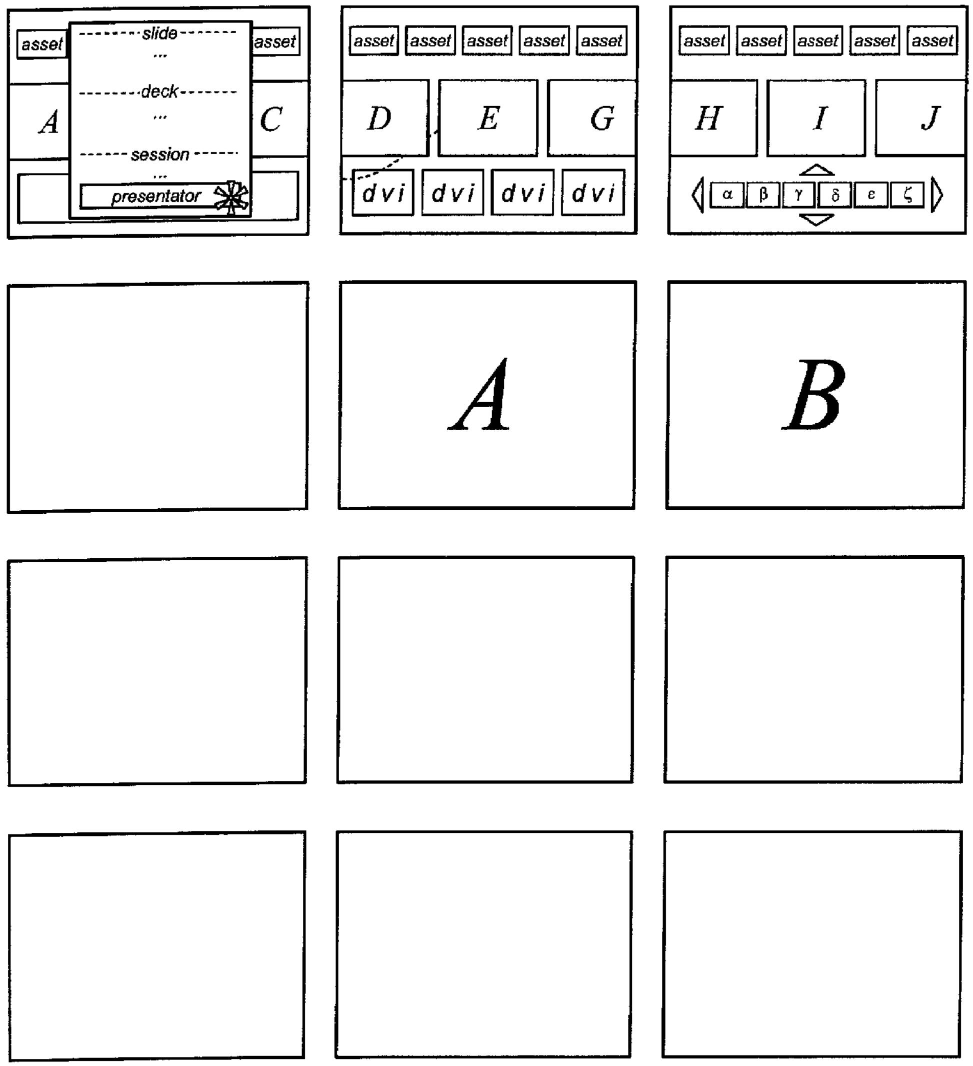

from any view in build mode, pilot summons the context card on any element, slide, background, or interface unit. every resulting context card sports the item 'presentator' in its session-section.

when pilot direct-selects 'presentator' from the context card, the current deck moves forward so that its first slide occupies the whole of the center field, all else disappears. the system is now in presentation mode.

FIG. 208 from a pushed-back view, pilot summons the context card on the system region.

pilot direct-selects 'log out' from the session-section of the context card.

the system returns to its top-level, login-awaiting state.

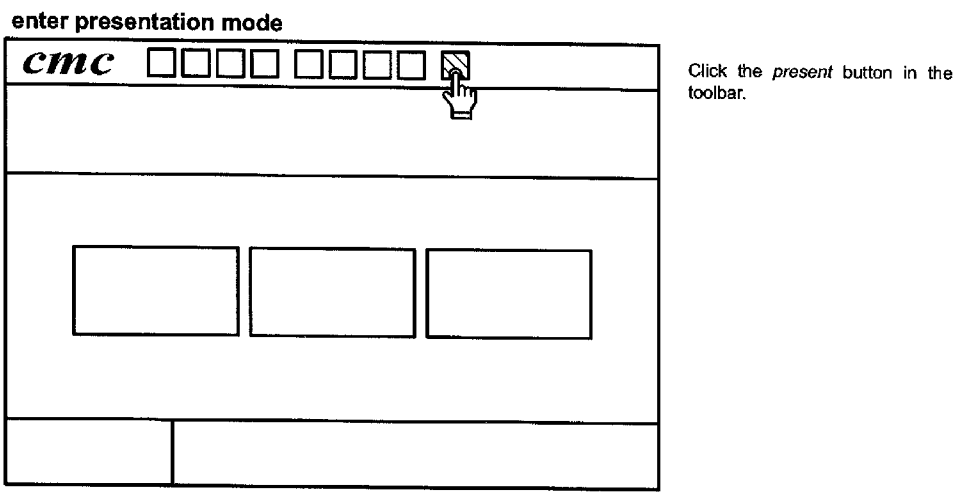
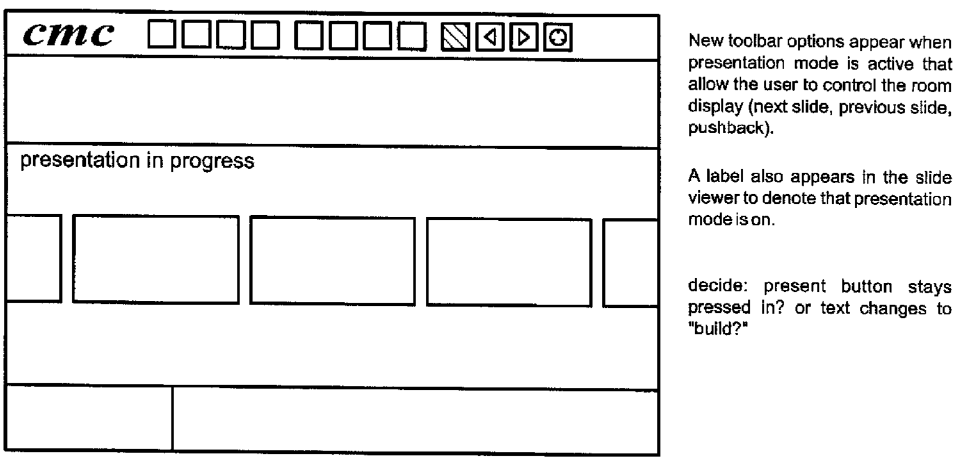
*FIG. 211*

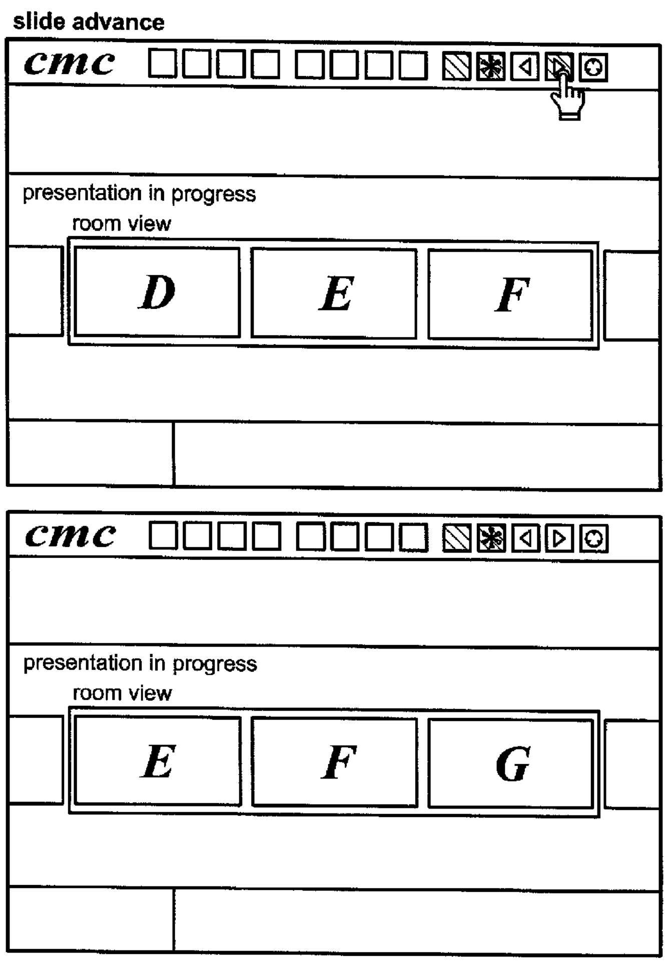

The user presses the *next* slide button to advance the room display to the next slide.

Alternatively: the user can press the n key (as long as they're not actively editing a text box!)

Note: this auto-enables pass forward for the web user. The web user can turn off pass forward by toggling the button to the right of the presentation button.

Pressing this button also causes the slide preview to sync to the next slide. (?)

*FIG. 212*

The user presses the *previous slide* button to retreat the room display to the previous slide.

Alternatively: the user can press the p key (as long as they're not actively editing a text box!)

Pressing this button also causes the slide preview to center around the previous slide. (?)

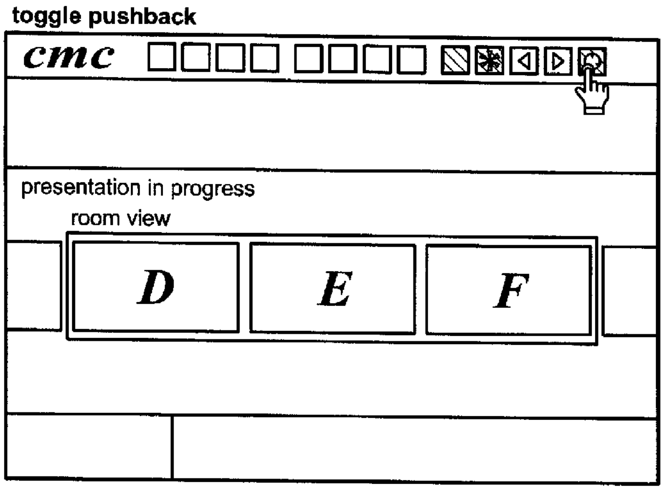

User presses the "push back" button, which has an icon similar to the pushback glyph in the native interface.

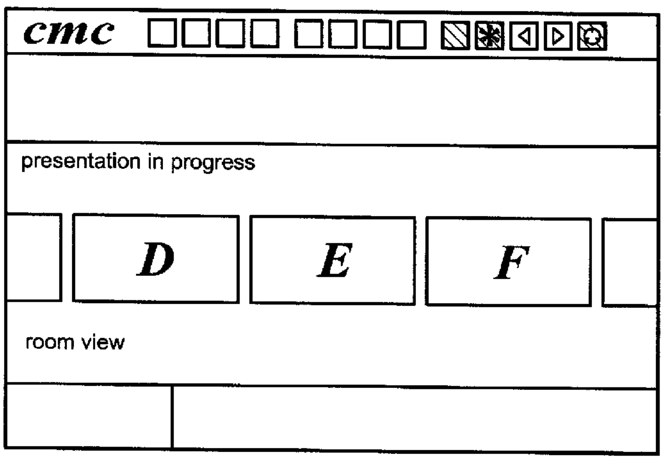

room view indicator expands to show that more slides are now visible in the room view. The push-back button in the toolbar retains its "pushed" state - the button should also go into this state when the room view is pushed back with the wand.

Note that the vertical extents of the room view cover more area outside of the slides.

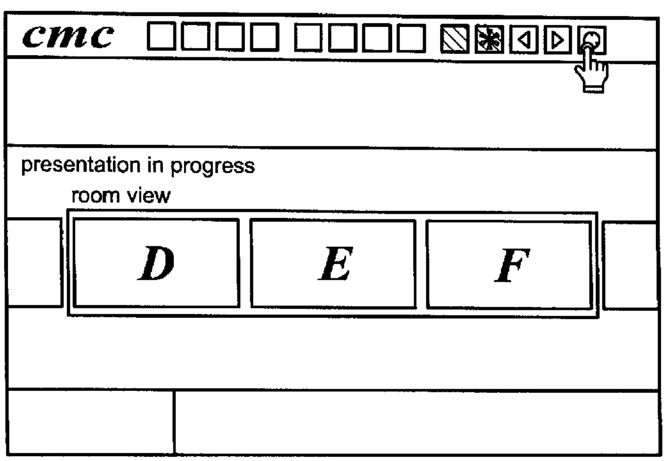

The web user can press the push-back button again to turn push-back off. Note that the web user can unlock pushback even if they did not initiate it.

*FIG. 214* pointer pass forward

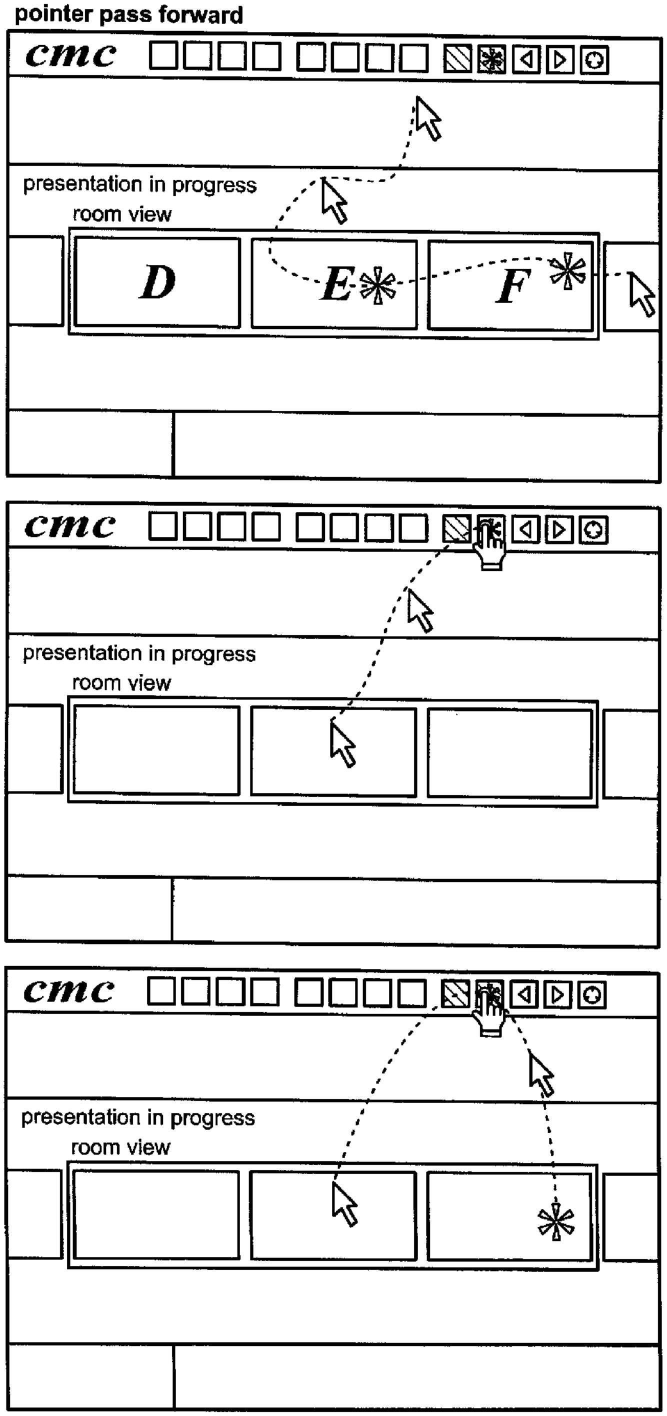

Web user can toggle whether or not their pointer is passed to the current slide via the toolbar menu. By default, pass forward is active when the user enters presentation mode.

When the user moves the mouse within the room view, it turns into a handipoint icon to show that it can be seen by other people. When the user is on a slide that isn't seen by others, it appears as a normal system mouse cursor.

To disable passthrough during a presentation, the user clicks on the pushed handipoint button.

This enables the web user to move the media on screen without the cursor. Stealth mode!

Pass forward can be re-activated by clicking on the handipoint button again.

*FIG. 215* move element
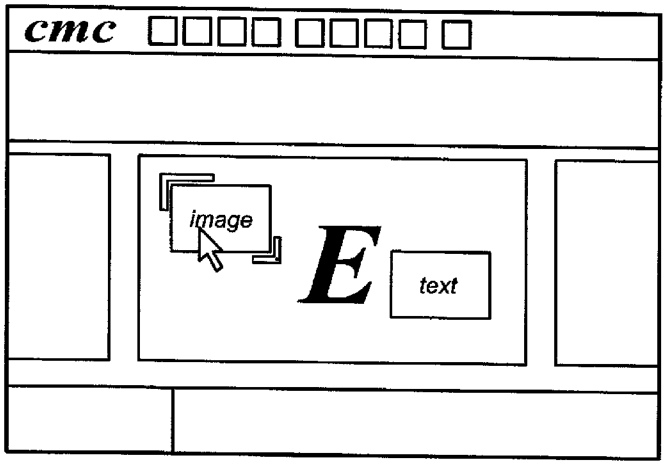
User hovers mouse cursor over the element they want to move.
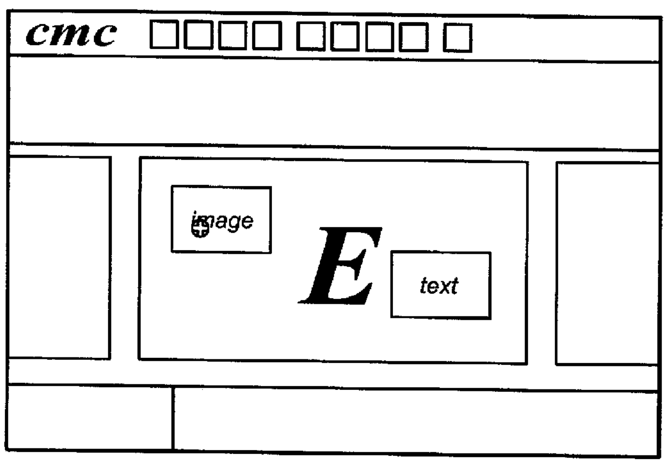
User clicks and holds the left mouse button to initiate the drag Exoskeleton disappears. Mouse disappears (possible?) and move glyph appears.
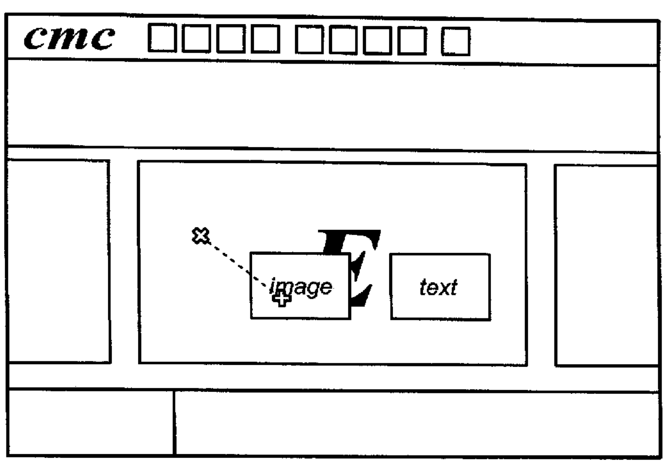
Web user drags the mouse to move the object. A glyph similar to the native interface is used, but there is no circular threshold to cross.
*FIG. 218A*

The user releases the left mouse button (or whatever their primary button is for their native mouse) and the object stays in the new location.

The object's exoskeleton reappears, since the mouse is now hovering over it. Mouse cursor returns to normal.

scale element

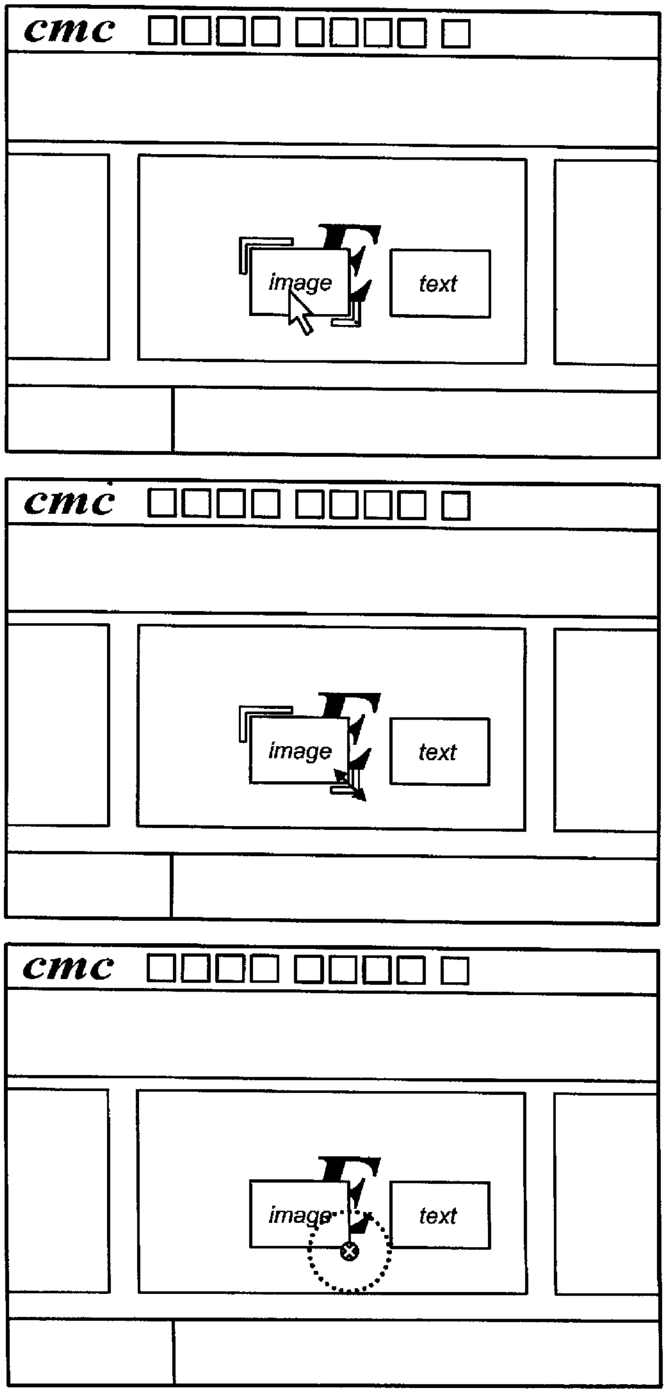

User moves mouse cursor over element they'd like to scale. Exoskeleton appears.

User moves the mouse to the exoskeleton that surrounds the bottom right corner. The mouse cursor turns into the resize cursor.

If the user clicks and holds the mouse while the resize cursor is visible, they can drag the mouse to change the size of the window. Clicking brings up the grab glyph. A glyph shows how much scaling (none to start) has been done in this drag. The exoskeleton disappears.

*FIG. 219A*

The scale glyph shows where to drag the mouse back to return the item to its original size, as well as a graphic displaying how much it's been scaled. Here, the scale is growing.

Here, the scale shrinks the object.

When the user releases the cursor, the extra scaling glyph disappears.

summon context card for element
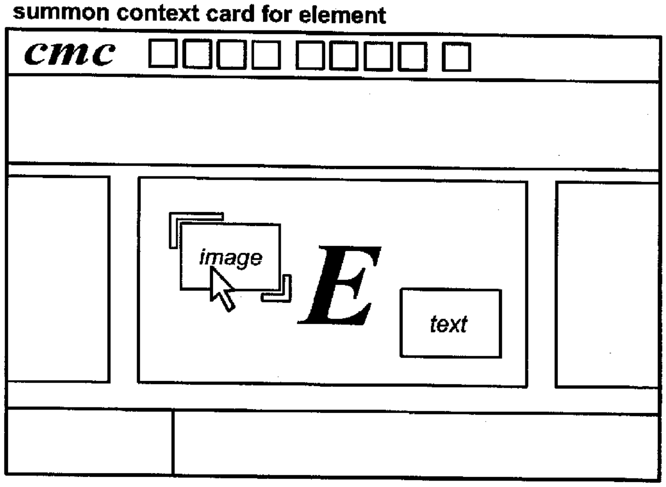
User hovers mouse over element of interest.
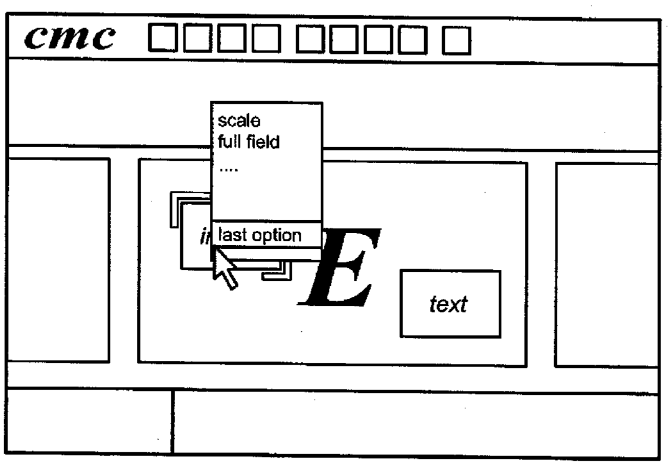
User clicks mouse with OS-specific context click (CTRL + click for Mac, right button for windows etc). Context card appears above/below or to the left/right of mouse depending on where it can fit.
*FIG. 220* full field element
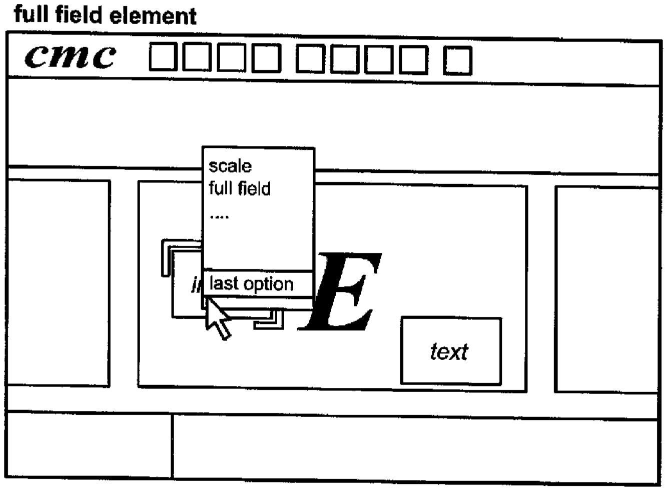
User summons context card.
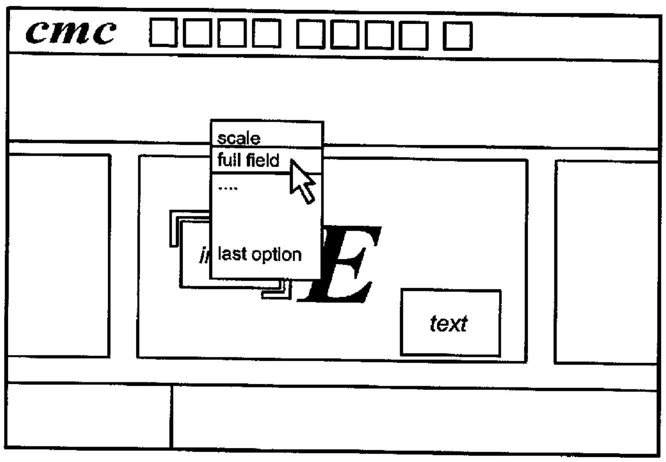
User moves mouse to the full field option on the context card. User clicks it with left (primary) mouse button.
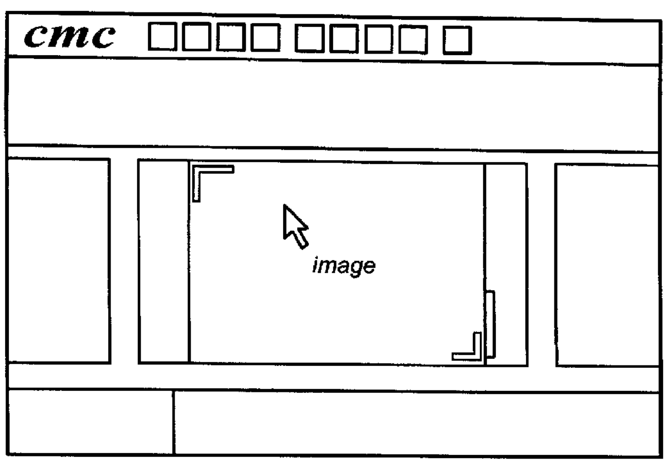
Enhance! Enfronten! Preserve aspect ratio! Keep exoskeleton in bounds!
*FIG. 221* duplicate element

User summons context card.

User selects duplicate from the context card.

Twins! Like the Governator and Danny Devito.

adjust element ordering

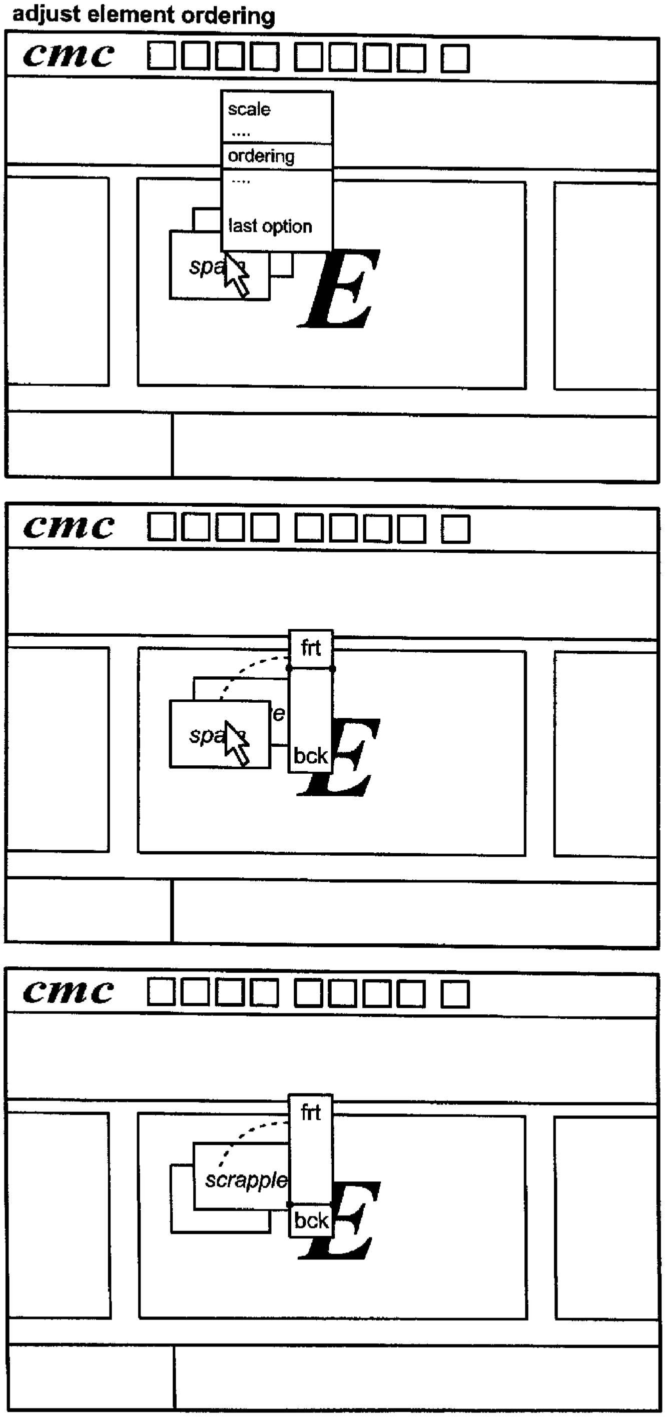

User can adjust the ordering of elements if something just doesn't feel right. What's behind that spam?

User summons context menu for the object that needs some adjusting the selects ordering.

User is presented with an ordering slider similar to the one in the native interface. The initial position in the slider indicates the object's current position. Mouse cursor disappears and is functionally replaced by a marker on the slider.

User drags the mouse downward, moving the cursor, and changing the ordering of the element so it is in the back.

Scapple is promoted!

*FIG. 224A*

User releases mouse. Changes become etched in stone for all eternity. Cursor reappears.

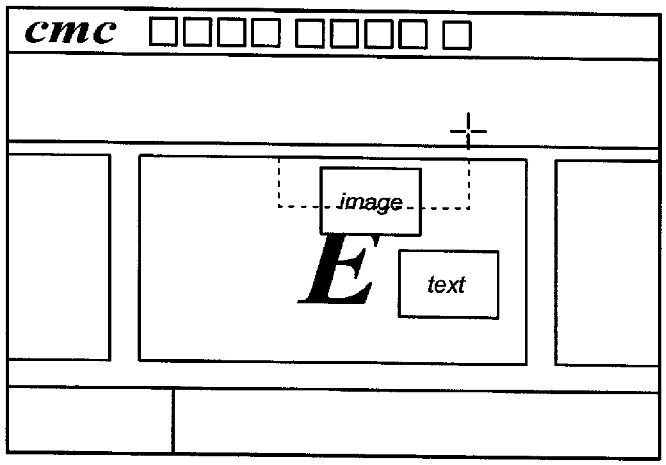
User is not allowed to include off-slide area, unless that area is also on the room screen (see next section). If the cursor veers off the slide, the outline indicates that the snapshot ends at the edge of the slide.
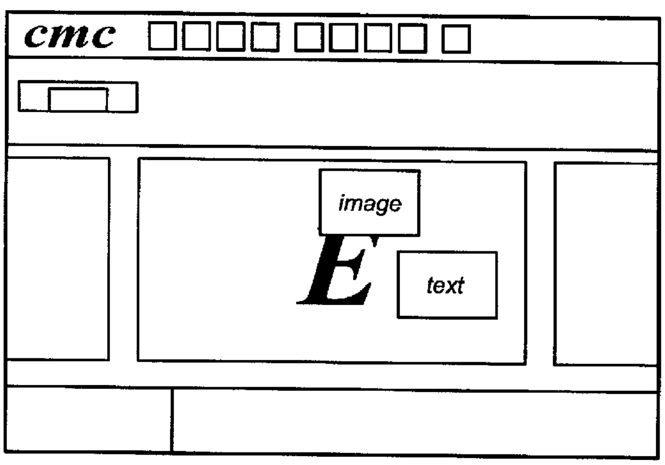
User releases mouse button. Slide capture appears as a new asset in asset browser.
*FIG. 225B* adjust element transparency
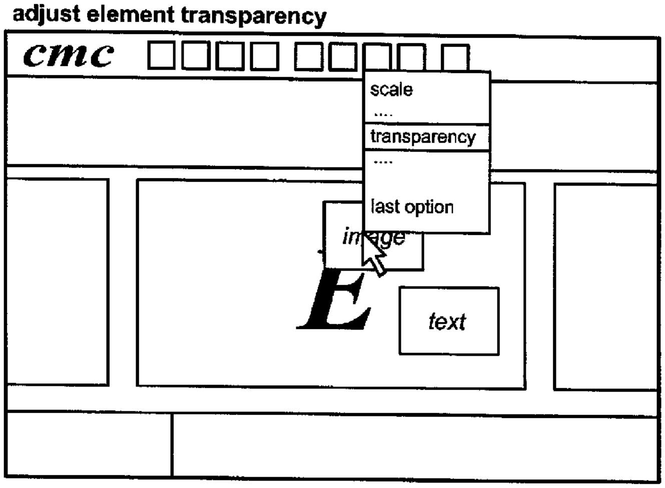
User summons context card and selects transparency.
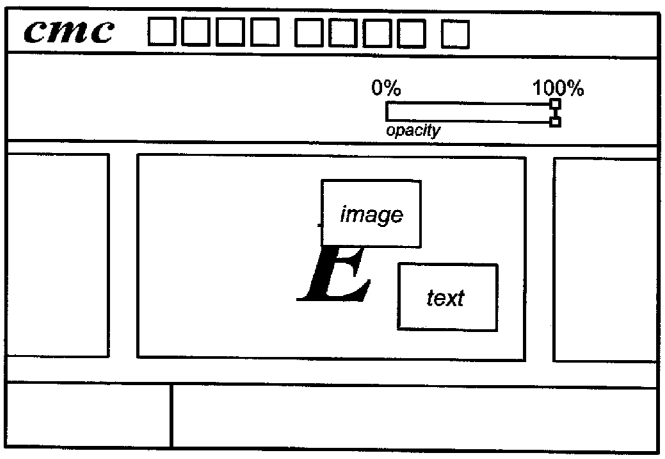
Transparency slider appears. Mouse cursor disappears. User moves mouse horizontally to adjust transparency.
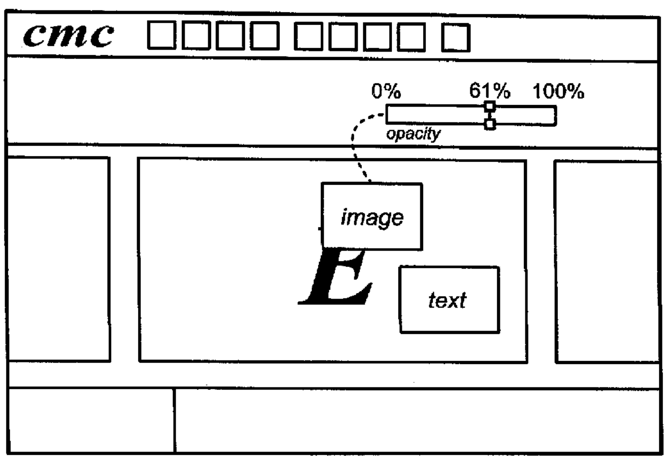
User drags mouse to adjust cursor; clicks again to confirm the new selection.
*FIG. 226* adjust element color

User brings up context card for a text element and selects one of the color options.

Something wonderful that mimics the g-speak-native interface or something horrible that matches the OS-native interface happens here...

Huzzah! The color is magenta.

reveal asset browser

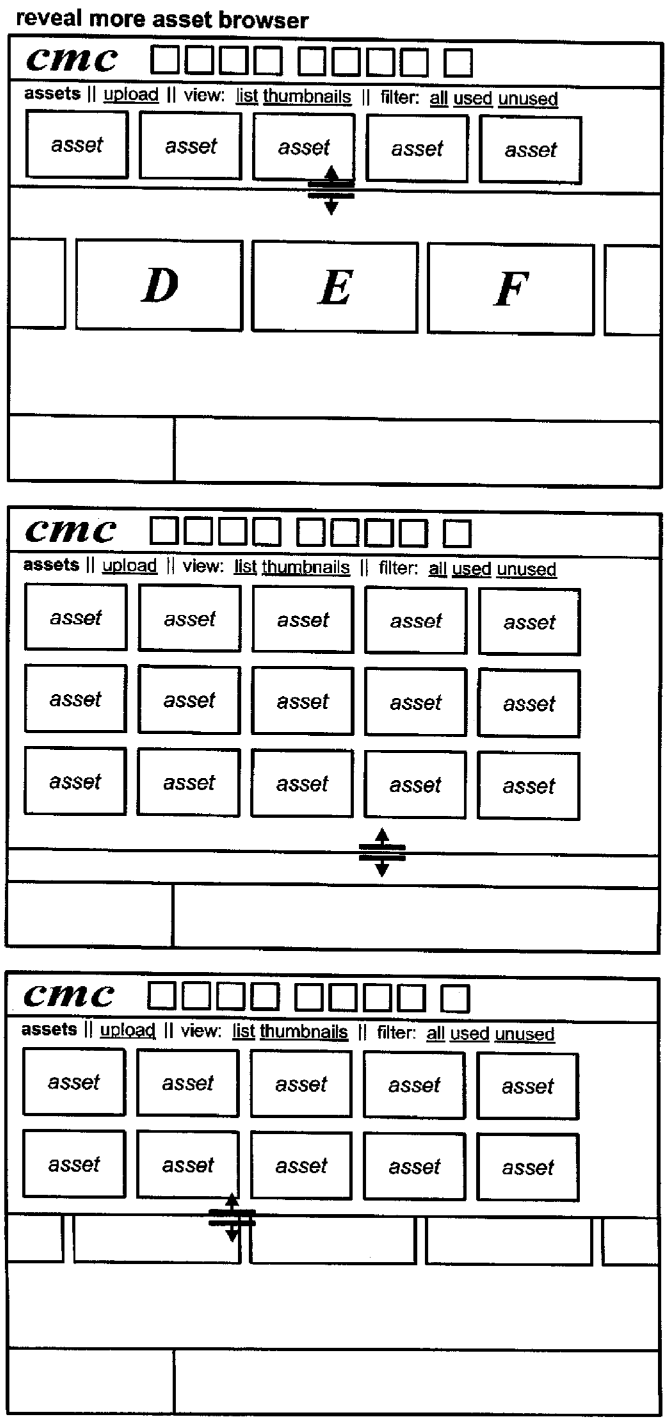

Let's see more of those assets. User hovers mouse over the divider between the asset browser and the slide preview, sees move cursor, clicks and holds.

The user can make the asset browser extend to the text menu for the slide viewer, but it cannot hide the slide viewer's text menu (that's its maximum size).

When the user is happy with the size of the asset browser, they release the mouse button. Note that the cursor doesn't change until they wander off the edge of the slide viewer and the asset browser.

FIG. 229

The element appears in the attribute browser immediately, with a progress bar to show its upload progress.

When the upload is finished, a thumbnail of the image comes in to view.

Then the progress bar disappears.

reveal more deck and video browser

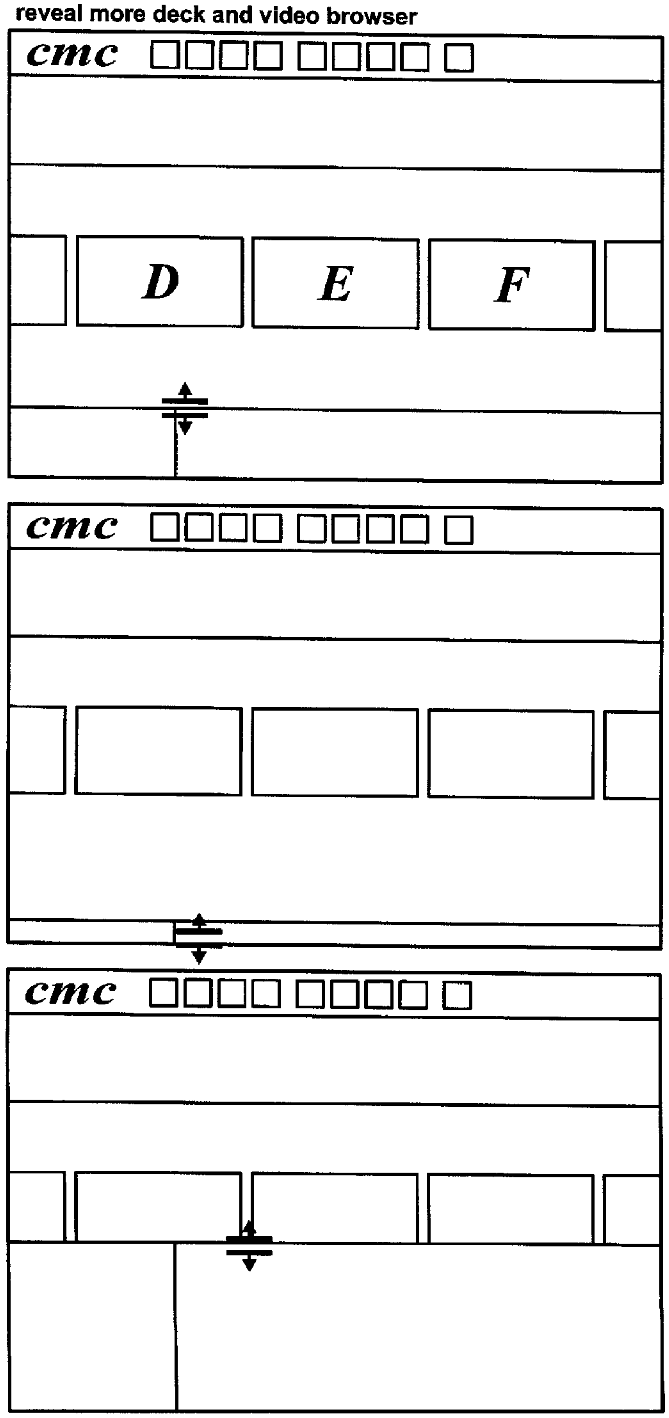

User hovers mouse over the divider between the deck browser and the slide preview, sees move cursor, clicks and holds.

If the user wants to shrink the area of the deck browser, they are blocked at the minimum size, which allows room for the text-only menu.

Note that here, the user has reached that threshold and the mouse cursor has separated from the minimum height. There's also a maximum height that gives the slide preview just enough space to maintain its text menu.

When the user is happy with the size of the deck browser, they release the mouse button. Note that the cursor doesn't change until they wander off the edge of the slide viewer and the deck browser.

*FIG. 232* zoom slide viewer area
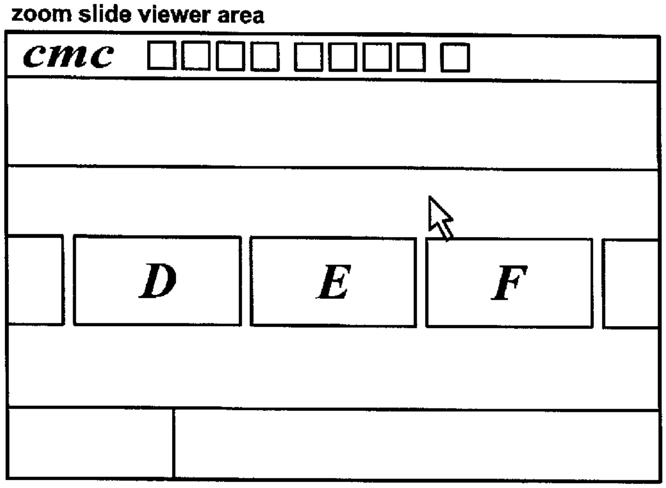
User moves the mouse over the slide preview window.
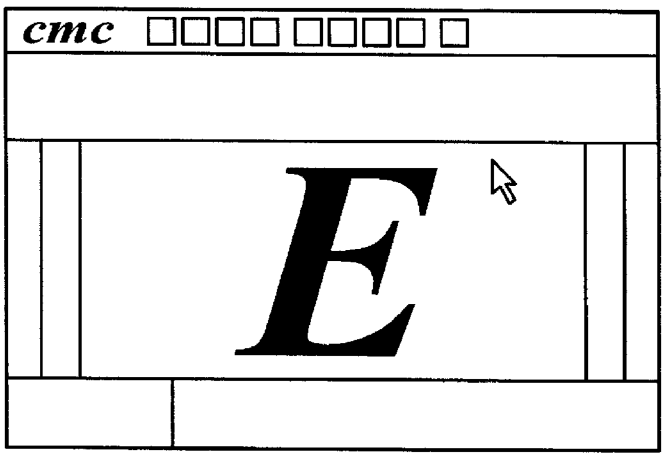
User scrolls the mouse wheel up to zoom in. There is a max zoom-in level where the laptop matches the room view pixel for pixel. The slide viewer is zoomed relative to the center of the view.
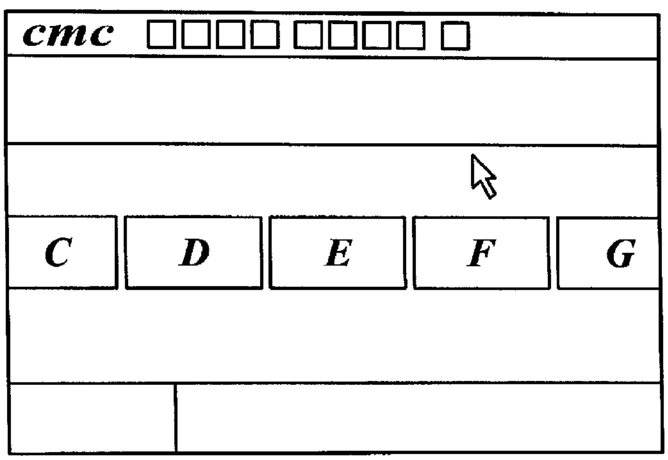
Or, user scrolls the mouse wheel down to zoom out. There is a max zoom out level.
*FIG. 233A* inspect asset in asset browser

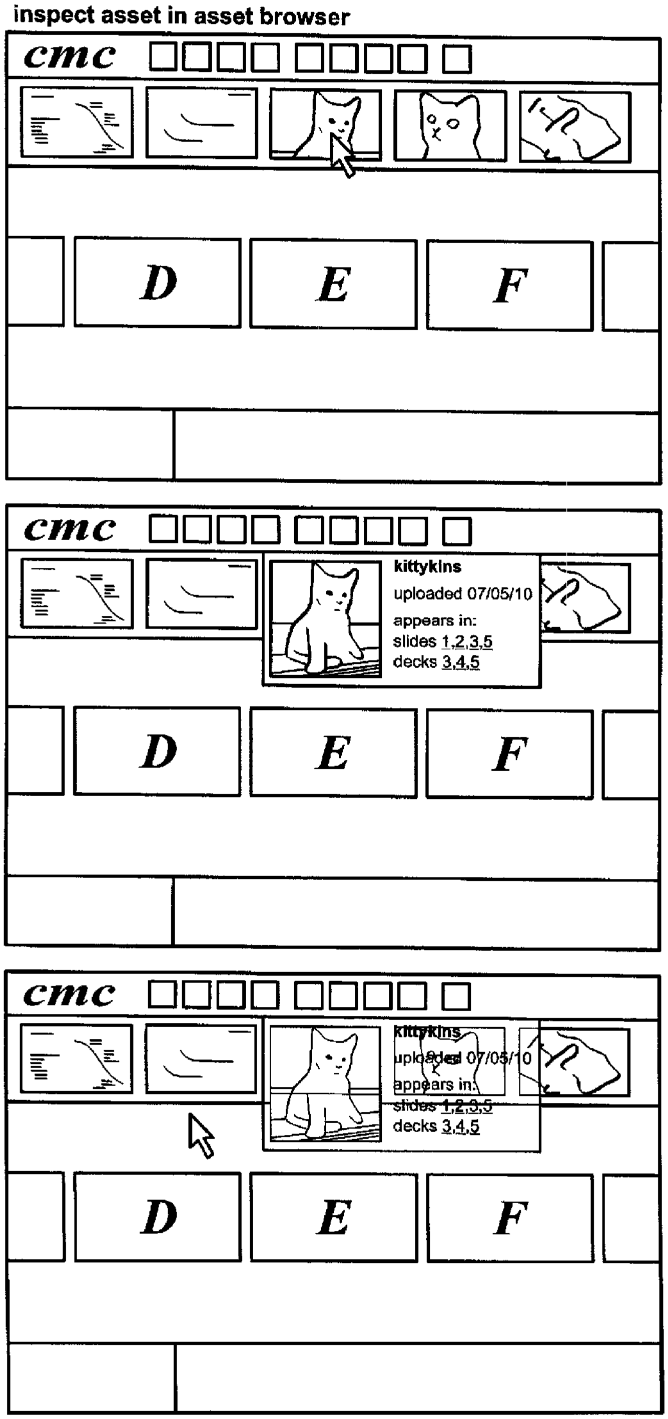

Look at those adorable assets! The user would like to know more about the asset in the middle. The user moves the mouse over the image, and waits...

and after a brief wait, a label pops up with more information about our dear kittykins.

That information includes where the asset appears, and the links to jump to those locations.

The user dismisses the asset details by moving the mouse out of the panel. Panel fades away.

*FIG. 234* insert asset into slide

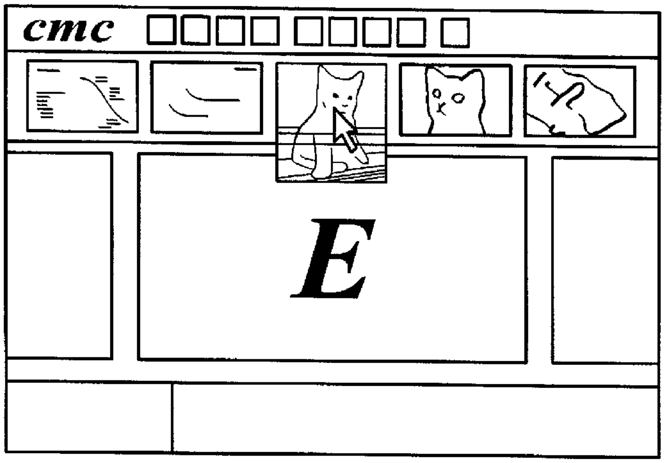

User hovers over asset they'd like to put in the slide and left-mouse-clicks. They see the full, uncropped image at ... well, let's think about what size still. But it's partially transparent.

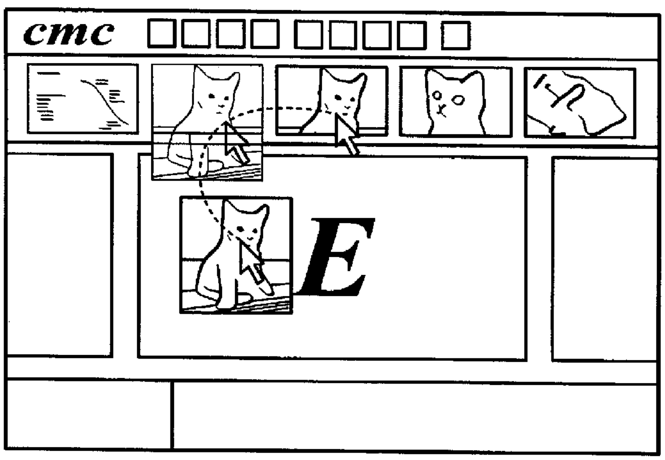

When the user hovers over a slide, the image regains its normal opacity to show what it will stick to the slide.

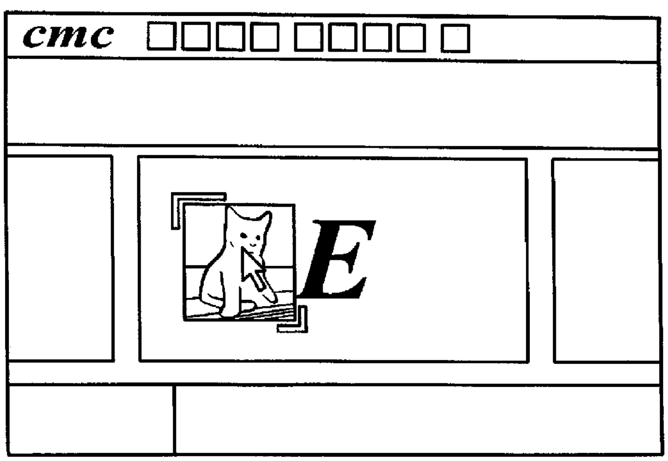

Exoskeleton appears when the object is dropped to show that the operation completed successfully and because the mouse is now hovering over the object.

*FIG. 235* insert live / dvi input into slide

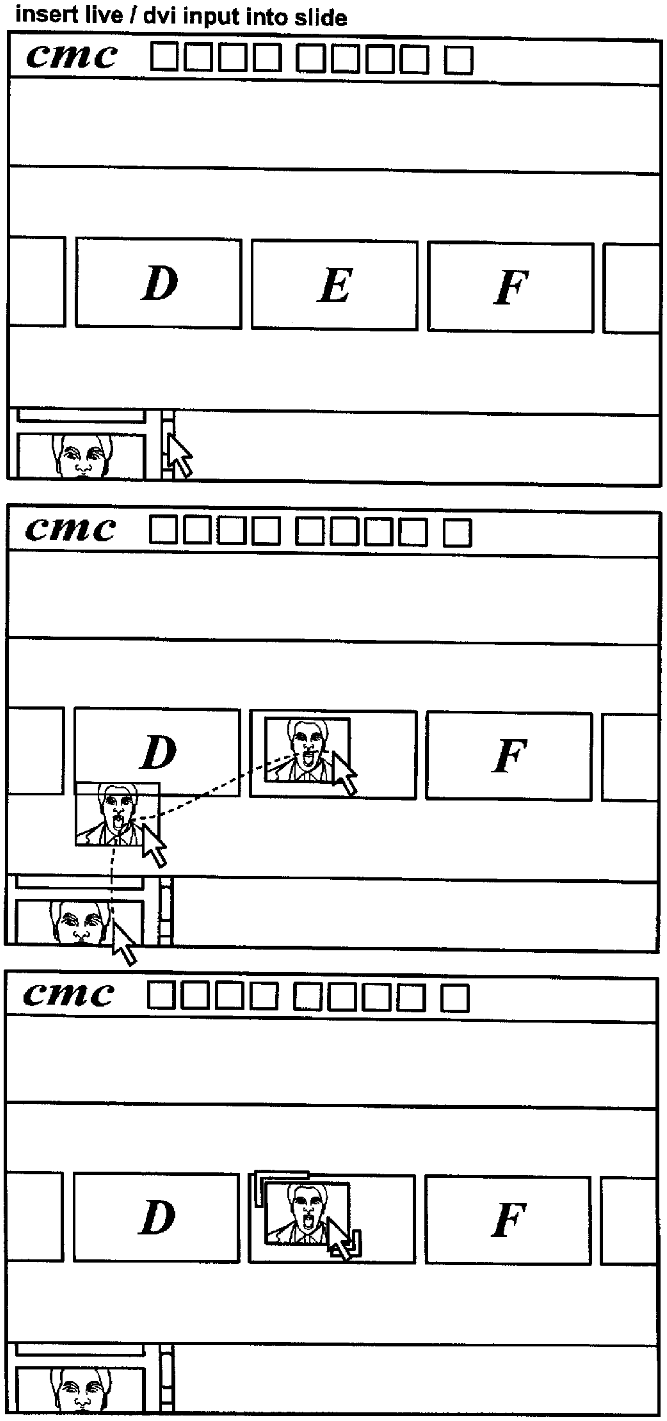

User scrolls to the video feed they're looking for in the video browser.

Ah, there's the one.

User clicks on the video of interest and drags it over the slide preview.

Video is greyed out in regions it can't be dropped, but appears in full color when it's over a slide.

User releases mouse button. Exo-skeleton appears because the video is now a real object and the mouse is hovering over it. LOOK OUT!

*FIG. 236*

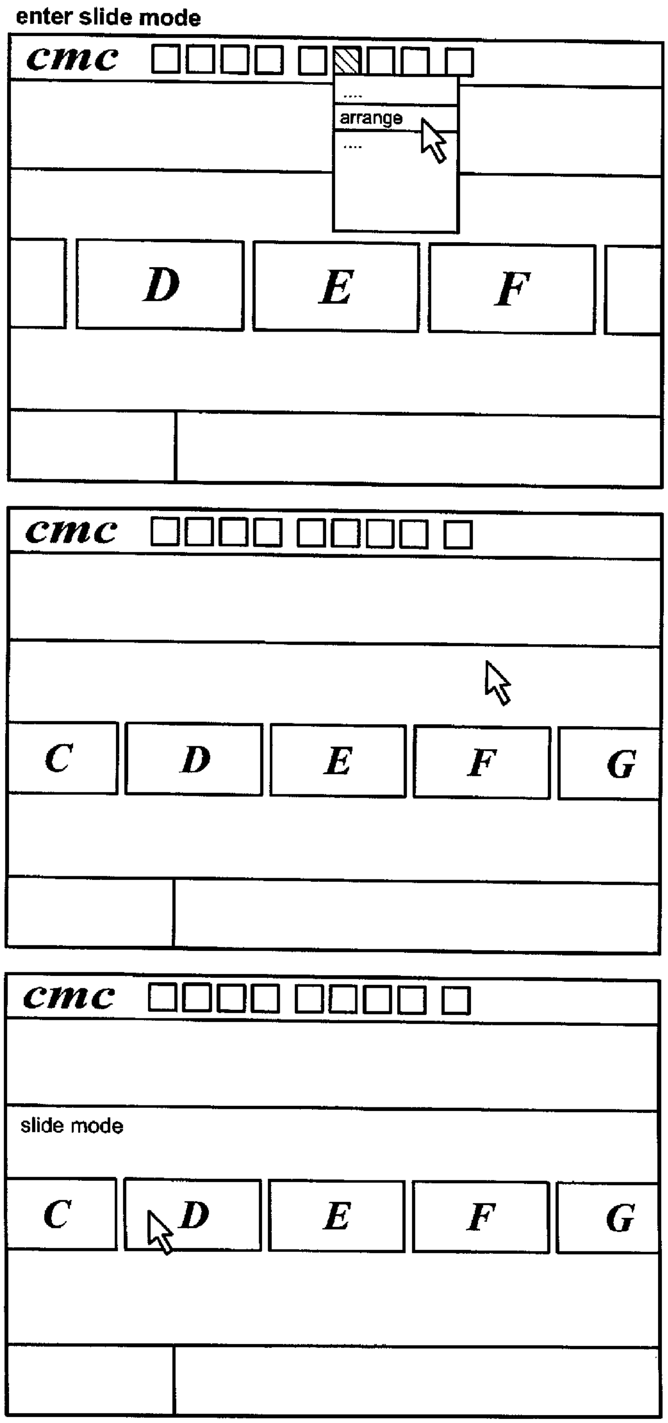

Let it first be said that this feature needs a better name than slide mode. Second, this feature allows users to change the order of slides and perform operations on individ ual slides, rather than the objects on slide.There are two different ways to enter slide mode.

One way: click arrange in the slides menu in the toolbar.

Alternatively: zoom out to max level using the scroll wheel or the menu.

There's some feedback on screen to indicate that you're now in slide mode. Maybe it's enough for the individual elements on slides to disappear: Gray out? Fade?

In any case, now whole slides highlight when the user drags the mouse over them.

*FIG. 237* jump to slide

User clicks the *jump to...* link in the slides menu.

A dialog box appears, asking the user which slide they'd like to jump to. User enters slide number in the dialog box and presses ok!

Slide view jumps to slide entered.

delete slide

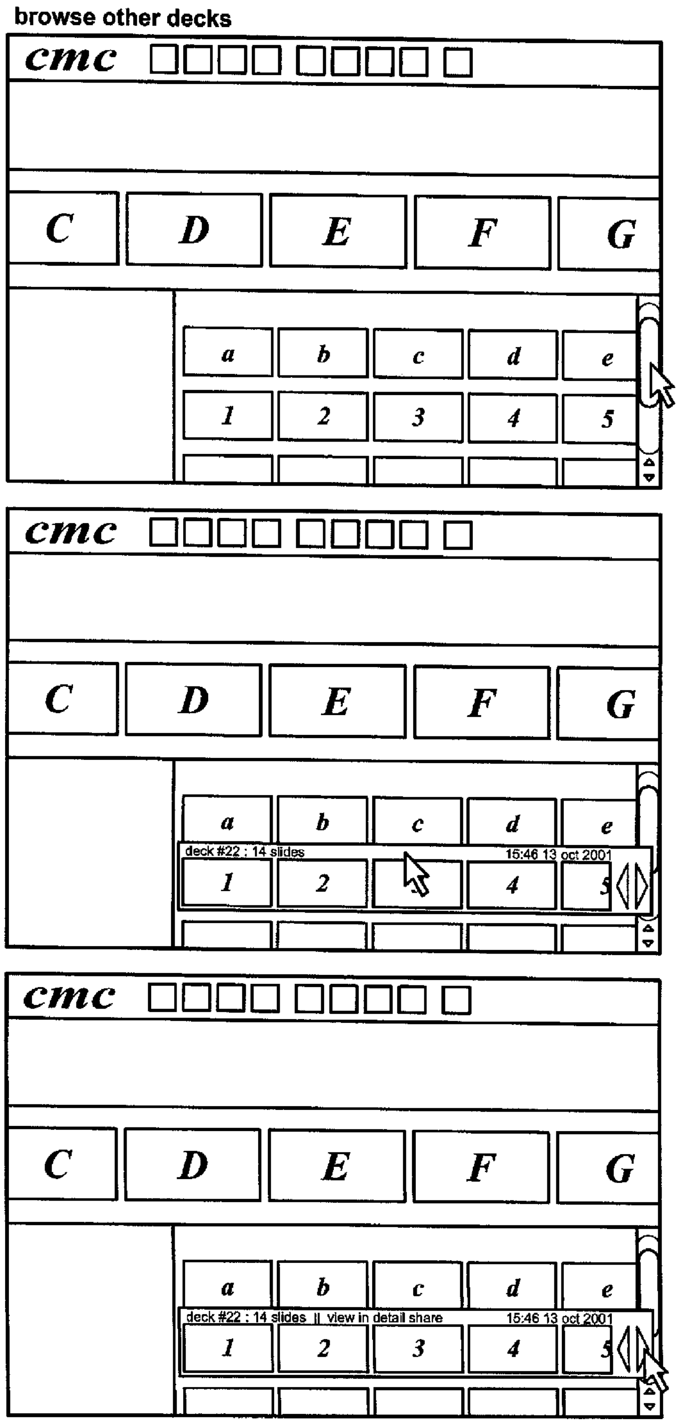

With the deck browser at a comfortable size, the user can scroll through previews of decks in the dossier.

The user hovers the mouse cursor over the deck of interest and waits just a moment...

... and a more detailed view appears, that allows lateral scrolling.

User scrolls through slides using the buttons on the right. We should decide if we want this to be an OS-native scroll bar or not.

FIG. 244 swap current deck with other

User pulls up deck details and clicks *swap*.

The selected deck now appears in the slide viewer. The deck that previously inhabited the slide viewer takes the place of the other deck in the deck viewer.

conflict resolution: other participant deletes working deck

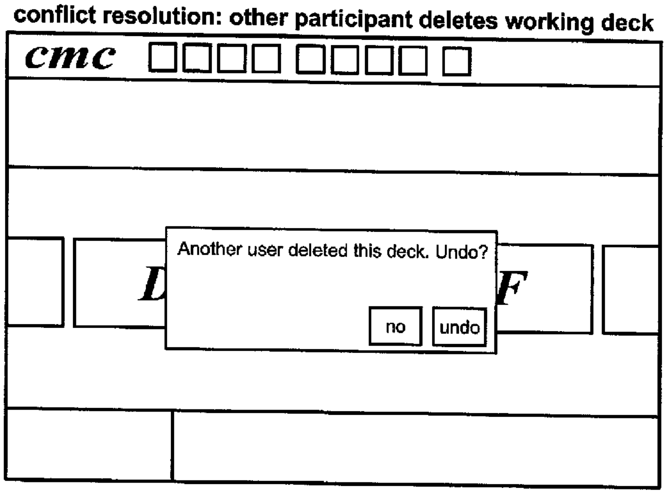

Since web views don't have to be in sync with the room view (or other web views), it is possible that a deck can be deleted by another source while the user is interacting with it in the slide viewer.

In this case, the user gets a chance to veto the deletion. We give more attention to what the words are on this card.

*FIG. 246* download slides (as images) to laptop
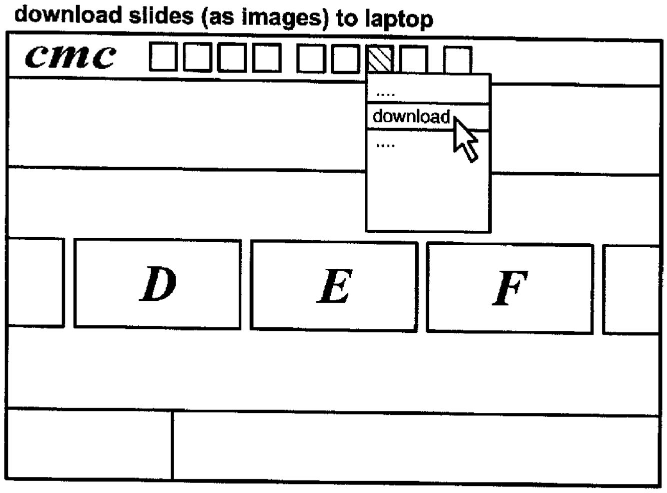
From the deck menu in the toolbar, the user selects download.
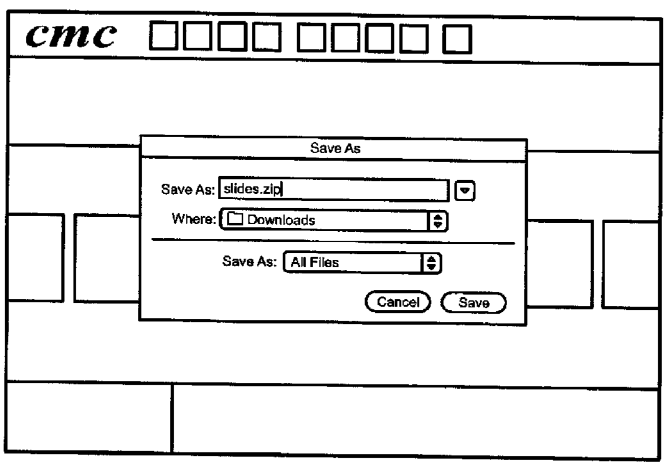
An OS-native Save As dialog pops up, asking the user where they want to save the file. User edits the file name and clicks *Save*. The operating system saves the current deck as a zip file in a (we hope) predictable place.
*FIG. 249* share laptop view with room

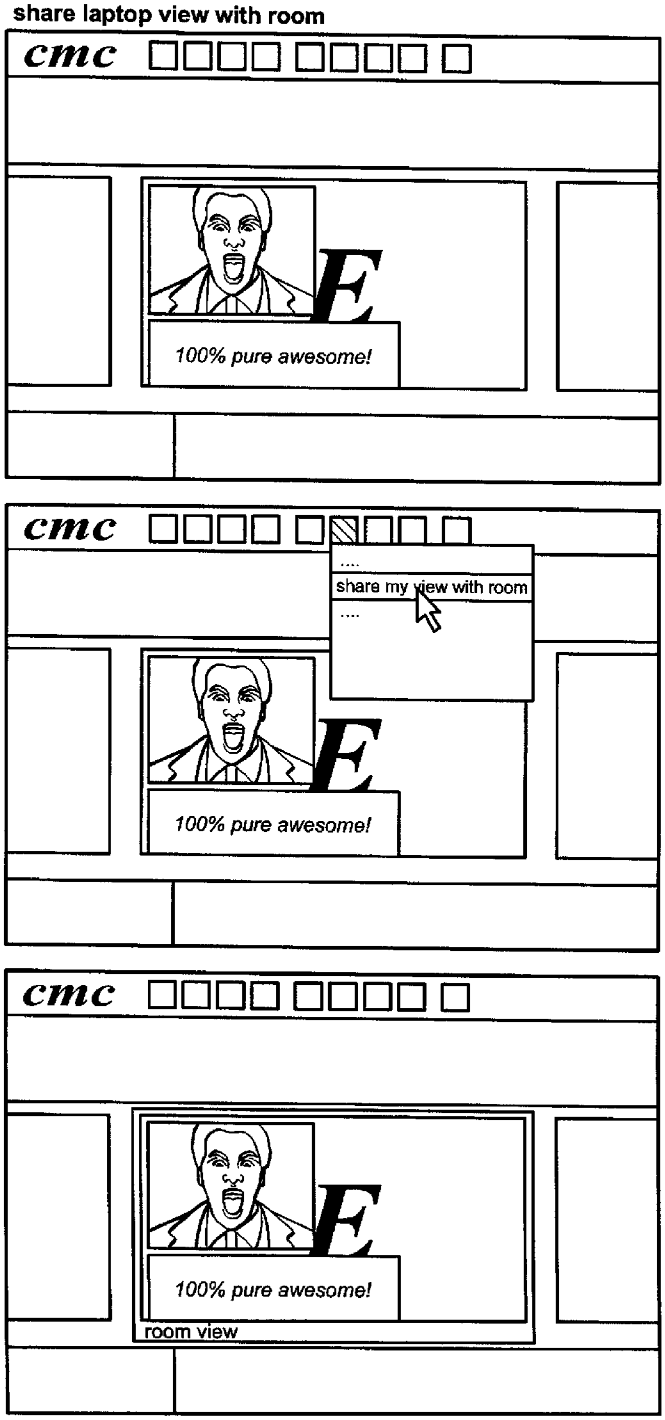

User wants everyone looking at the room display to abandon what they're doing and see what he's been working on independently. User has a particular slide in mind, already visible in his browser.

With everything in place, the user brings up the slides menu (should be dossier? deck? hmm...) and selects *share my view with room*.

Native interface updates to web user's view. Web user is appeased by local feedback that now shows his masterpiece is seen by all.

*FIG. 250* sync laptop to room view
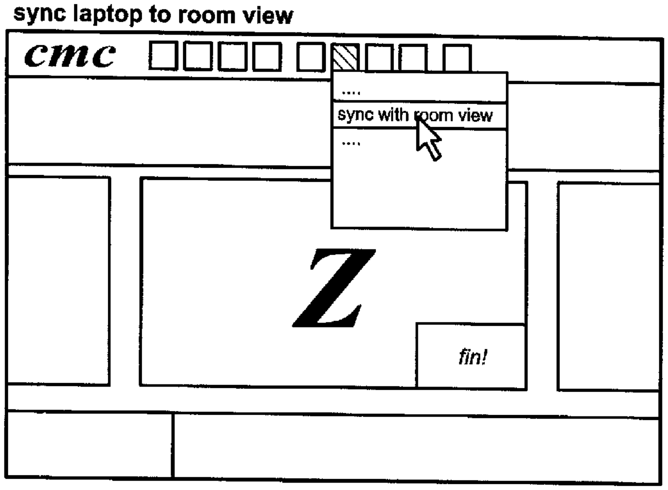
User has finished working ahead on slides at the end of the presentation and wants to follow along with what everyone else is doing.
User summons the slides menu, and selects *sync with room view*.
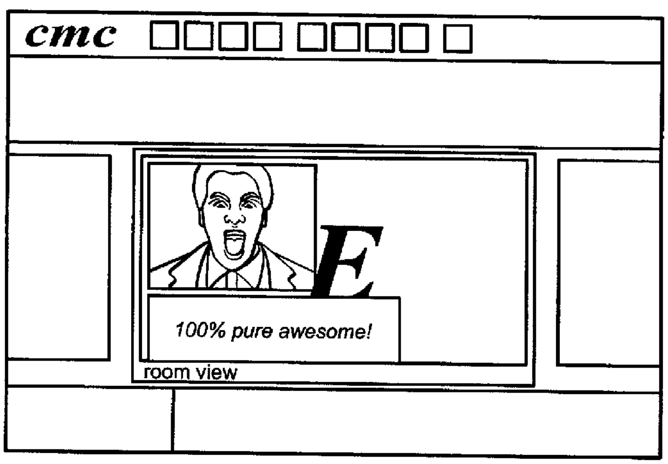
User sees what the room view sees.
*FIG. 251*

User syncs with room view when in pushed-back state.

User moves mouse into room view area. User can look at the room view to see their cursor move and interact with elements in Hoboken and Paramus.

We may want to define some keyboard shortcuts here, too.

OPERATING ENVIRONMENT WITH GESTURAL CONTROL AND MULTIPLE CLIENT DEVICES, DISPLAYS, AND USERS

CROSS-REFERENCE TO RELATED APPLICATIONS

This application is a continuation of U.S. application Ser. No. 16/051,829, filed 1 Aug. 2018, which is a continuation of U.S. application Ser. No. 15/843,753, filed 15 Dec. 2017, which is a continuation of U.S. application Ser. No. 15/582,243, filed 28 Apr. 2017, which is a continuation of U.S. application Ser. No. 14/145,016, filed 31 Dec. 2013, which claims the benefit of U.S. Provisional Patent Application No. 61/747,940, filed 31 Dec. 2012, U.S. Provisional Patent Application No. 61/787,792, filed 15 Mar. 2013, U.S. Provisional Patent Application No. 61/785,053, filed 14 Mar. 2013, U.S. Provisional Patent Application No. 61/787,650, filed 15 Mar. 2013, all of which are incorporated in their entirety herein by this reference.

This application is a continuation of U.S. application Ser. No. 16/051,829, filed 1 Aug. 2018, which is a continuation of U.S. application Ser. No. 15/843,753, filed 15 Dec. 2017, which is a continuation of U.S. application Ser. No. 15/582,243, filed 28 Apr. 2017, which is a continuation of U.S. patent application Ser. No. 14/145,016, filed 31 Dec. 2013, which is a continuation-in-part of U.S. patent application Ser. Nos. 12/572,689, 12/572,698, 13/850,837, 12/417,252, 12/487,623, 12/553,845, 12/553,902, 12/553,929, 12/557,464, 12/579,340, 13/759,472, 12/579,372, 12/773,605, 12/773,667, 12/789,129, 12/789,262, 12/789,302, 13/430,509, 13/430,626, 13/532,527, 13/532,605, 13/532,628, 13/888,174, 13/909,980, 14/048,747, 14/064,736, and 14/078,259, all of which are incorporated in their entirety herein by this reference.

TECHNICAL FIELD

The embodiments described herein relate generally to processing system and, more specifically, to gestural control in spatial operating environments.

BACKGROUND

Conventional collaborative-space solutions reflect older architectures of input and output, which privilege individual use and reflect low bandwidth assumptions. Furthermore, even as users meet to get work done, their digital tools are incompatible. The devices and "solutions" people bring to a meeting or presentation simply often cannot work together. The physical spaces where users meet to collaborate must evolve, to reflect new technology and, importantly, user and business demand. Consider two shifts in the marketplace.

First, pixels are abundant. Displays are cheaper in price and higher in quality. Companies and organizations leverage increased display resolutions, network capacities, and computational systems to present mixed media in conference room and command wall settings. The user goal is impactful, pixel-savvy presentation, discussion, and analysis. Second, data is abundant. Computational devices and systems for storing, accessing, and manipulating data are cheaper and higher quality.

Computing's form factors also are diverse, and its embodiments—desktops, laptops, mobile telephones, tablets, network solutions, cloud computing, enterprise systems—only continue to proliferate. These devices and solutions handle data in a myriad of ways. Across the spectrum, from the capture of low-level data, its processing into appropriate high-level events, its manipulation by the user, and exchange across networks, computers implement different approaches in, for example, data format and typing, operating system, and applications. These are only some of the many challenges that stymie interoperability.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIG. 1I a block diagram of the asset bin and live bin of Mezz, under an embodiment.

FIG. 12 is a diagram of poses in a gesture vocabulary of the SOE, under an embodiment.

FIG. 13 is a diagram of orientation in a gesture vocabulary of the SOE, under an embodiment.

FIG. 14 is an example of commands of the SOE in the kiosk system used by the spatial mapping application, under an embodiment.

FIG. 15 is an example of commands of the SOE in the kiosk system used by the media browser application, under an embodiment.

FIG. 16 is an example of commands of the SOE in the kiosk system used by applications including upload, pointer, rotate, under an embodiment.

FIG. 22 is a diagram of poses in a gesture vocabulary, under an embodiment.

FIG. 23 is a diagram of orientation in a gesture vocabulary, under an embodiment.

FIG. 24 is a diagram of two hand combinations in a gesture vocabulary, under an embodiment.

FIGS. 27A and 27B show example commands, under an embodiment.

FIGS. 33B/1 and 33B/2 show a slaw header format, under an embodiment.

FIGS. 42-85 are flow diagrams of Mezz protein communication by feature, under an embodiment.

FIG. 42 is a flow diagram of a Mezz process for Mezz initiating a heartbeat with Client, under an embodiment.

FIG. 43 is a flow diagram of a Mezz process for Client initiating heartbeat with Mezz, under an embodiment.

FIG. 44 is a flow diagram of a Mezz process for Client requesting to join a session, under an embodiment.

FIG. 45 is a flow diagram of a Mezz process for Clients requesting to join a session (max), under an embodiment.

FIG. 46 is a flow diagram of a Mezz process for Mezz creating a new dossier, under an embodiment.

FIG. 47 is a flow diagram of a Mezz process for Client requesting a new dossier, under an embodiment.

FIG. 48 is a flow diagram of a Mezz process for Client requesting a new dossier (error 1), under an embodiment.

FIG. 49 is a flow diagram of a Mezz process for Client requesting a new dossier (error 2 and 3), under an embodiment.

FIG. 50 is a flow diagram of a Mezz process for Mezz opening a dossier, under an embodiment.

FIG. 51 is a flow diagram of a Mezz process for Client requesting opening a dossier, under an embodiment.

FIG. 52 is a flow diagram of a Mezz process for Client requesting opening a dossier (error 1), under an embodiment.

FIG. 53 is a flow diagram of a Mezz process for Client requesting opening a dossier (error 2), under an embodiment.

FIG. 54 is a flow diagram of a Mezz process for Client requesting renaming of a dossier, under an embodiment.

FIG. 55 is a flow diagram of a Mezz process for Client requesting renaming of a dossier (error 1), under an embodiment.

FIG. 56 is a flow diagram of a Mezz process for Client requesting renaming of a dossier (error 2), under an embodiment.

FIG. 57 is a flow diagram of a Mezz process for Mezz duplicating a dossier, under an embodiment.

FIG. 58 is a flow diagram of a Mezz process for Client duplicating a dossier, under an embodiment.

FIG. 59 is a flow diagram of a Mezz process for Client duplicating a dossier (error 1), under an embodiment.

FIG. 60 is a flow diagram of a Mezz process for Client duplicating a dossier (error 2 and 3), under an embodiment.

FIG. 61 is a flow diagram of a Mezz process for Mezz deleting a dossier, under an embodiment.

FIG. 62 is a flow diagram of a Mezz process for Client deleting a dossier, under an embodiment.

FIG. 63 is a flow diagram of a Mezz process for Client deleting a dossier (error), under an embodiment.

FIG. 64 is a flow diagram of a Mezz process for Mezz closing a dossier, under an embodiment.

FIG. 65 is a flow diagram of a Mezz process for Client closing a dossier, under an embodiment.

FIG. 66 is a flow diagram of a Mezz process for a new slide, under an embodiment.

FIG. 67 is a flow diagram of a Mezz process for deleting a slide, under an embodiment.

FIG. 68 is a flow diagram of a Mezz process for reordering slides, under an embodiment.

FIG. 69 is a flow diagram of a Mezz process for a new windshield item, under an embodiment.

FIG. 70 is a flow diagram of a Mezz process for deleting a windshield item, under an embodiment.

FIG. 71 is a flow diagram of a Mezz process for resizing/moving/full-feld windshield item, under an embodiment.

FIG. 72 is a flow diagram of a Mezz process for scrolling slide(s) and pushback, under an embodiment.

FIG. 73 is a flow diagram of a Mezz process for web client scrolling deck, under an embodiment.

FIG. 74 is a flow diagram of a Mezz process for web client pushback, under an embodiment.

FIG. 75 is a flow diagram of a Mezz process for web client pass-forward ratchet, under an embodiment.

FIG. 76 is a flow diagram of a Mezz process for new asset (pixel grab), under an embodiment.

FIG. 77 is a flow diagram of a Mezz process for Client upload of asset(s)/slide(s), under an embodiment.

FIG. 78 is a flow diagram of a Mezz process for Client upload of asset(s)/slide(s) directly, under an embodiment.

FIG. 79 is a flow diagram of a Mezz process for web client upload of asset(s)/slide(s) (timeout occurs), under an embodiment.

FIG. 80 is a flow diagram of a Mezz process for web client download of an asset, under an embodiment.

FIG. 81 is a flow diagram of a Mezz process for web client download of all assets, under an embodiment.

FIG. 82 is a flow diagram of a Mezz process for web client download of all slides, under an embodiment.

FIG. 83 is a flow diagram of a Mezz process for web client delete of an asset, under an embodiment.

FIG. 84 is a flow diagram of a Mezz process for web client delete of all assets, under an embodiment.

FIG. 85 is a flow diagram of a Mezz process for web client delete of all slides, under an embodiment.

FIGS. 86-166 are protein specifications for Mezz proteins, under an embodiment.

FIG. 86 is an example Mezz protein specification (join), under an embodiment.

FIG. 87 is an example Mezz protein specification (state request), under an embodiment.

FIG. 88 is an example Mezz protein specification (create new dossier), under an embodiment.

FIG. 89 is an example Mezz protein specification (open dossier), under an embodiment.

FIG. 90 is an example Mezz protein specification (rename dossier), under an embodiment.

FIG. 91 is an example Mezz protein specification (duplicate dossier), under an embodiment.

FIG. 92 is an example Mezz protein specification (delete dossier), under an embodiment.

FIG. 93 is an example Mezz protein specification (close dossier), under an embodiment.

FIG. 94 is an example Mezz protein specification (scroll deck), under an embodiment.

FIG. 95 is an example Mezz protein specification (push-back), under an embodiment.

FIG. 96 is an example Mezz protein specification (pass-forward ratchet), under an embodiment.

FIG. 97 is an example Mezz protein specification (download all slides), under an embodiment.

FIG. 98 is an example Mezz protein specification (download all assets), under an embodiment.

Figure 1A:
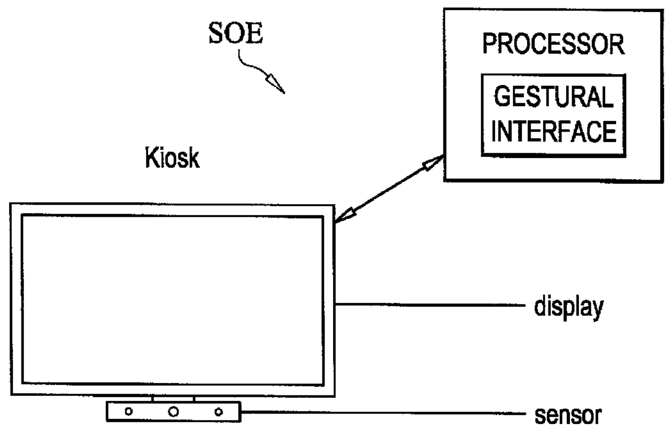
FIG. 1A is a block diagram of the SOE kiosk including a processor hosting the hand tracking and shape recognition component or application, a display and a sensor, under an embodiment.

FIG. 99 is an example Mezz protein specification (upload images), under an embodiment.

FIG. 100 is an example Mezz protein specification (delete all slides), under an embodiment.

FIG. 101 is an example Mezz protein specification (delete an asset), under an embodiment.

FIG. 102 is an example Mezz protein specification (delete all assets), under an embodiment.

FIG. 103 is an example Mezz protein specification (pass-forward), under an embodiment.

FIG. 104 is an example Mezz protein specification (set windshield opacity), under an embodiment.

FIG. 105 is an example Mezz protein specification (deck detail request), under an embodiment.

FIG. 106 is an example Mezz protein specification (download asset), under an embodiment.

FIG. 107 is an example Mezz protein specification (create new dossier), under an embodiment.

FIG. 108 is an example Mezz protein specification (duplicate dossier), under an embodiment.

FIG. 109 is an example Mezz protein specification (update dossier), under an embodiment.

FIG. 110 is an example Mezz protein specification (download all slides), under an embodiment.

FIG. 111 is an example Mezz protein specification (download all assets), under an embodiment.

FIG. 112 is an example Mezz protein specification (image ready), under an embodiment.

FIG. 113 is an example Mezz protein specification (expect upload), under an embodiment.

FIG. 114 is an example Mezz protein specification (forget upload), under an embodiment.

FIG. 115 is an example Mezz protein specification (convert original image), under an embodiment.

FIG. 116 is an example Mezz protein specification (new dossier created), under an embodiment.

FIG. 117 is an example Mezz protein specification (dossier duplicated), under an embodiment.

FIG. 118 is an example Mezz protein specification (download all slides [success]), under an embodiment.

FIG. 119 is an example Mezz protein specification (download all slides [error]), under an embodiment.

FIG. 120 is an example Mezz protein specification (image ready [success]), under an embodiment.

FIG. 121 is an example Mezz protein specification (image ready [error]), under an embodiment.

FIG. 122 is an example Mezz protein specification (heartbeat [portal], heartbeat [dossier]), under an embodiment.

FIG. 123 is an example Mezz protein specification (new dossier created), under an embodiment.

FIG. 124 is an example Mezz protein specification (dossier opened), under an embodiment.

FIG. 125 is an example Mezz protein specification (dossier renamed), under an embodiment.

FIG. 126 is an example Mezz protein specification (new [duplicate] dossier created), under an embodiment.

FIG. 127 is an example Mezz protein specification (dossier deleted), under an embodiment.

FIG. 128 is an example Mezz protein specification (dossier closed), under an embodiment.

FIG. 129 is an example Mezz protein specification (deck state), under an embodiment.

FIG. 130 is an example Mezz protein specification (new asset), under an embodiment.

FIG. 131 is an example Mezz protein specification (delete an asset [success]), under an embodiment.

FIG. 132 is an example Mezz protein specification (delete all assets [success]), under an embodiment.

FIG. 133 is an example Mezz protein specification (slide deleted), under an embodiment.

FIG. 134 is an example Mezz protein specification (slide reordered), under an embodiment.

FIG. 135 is an example Mezz protein specification (windshield cleared), under an embodiment.

FIG. 136 is an example Mezz protein specification (deck cleared), under an embodiment.

FIG. 137 is an example Mezz protein specification (download asset [success]), under an embodiment.

FIG. 138 is an example Mezz protein specification (download asset [error]), under an embodiment.

FIG. 139 is an example Mezz protein specification (can join, can't join), under an embodiment.

FIG. 140 is an example Mezz protein specification (full state response [portal]), under an embodiment.

FIG. 141 is an example Mezz protein specification (full state response [dossier]), under an embodiment.

FIG. 142 is an example Mezz protein specification (create new dossier [error]), under an embodiment.

FIG. 143 is another example Mezz protein specification (create new dossier [error]), under an embodiment.

FIG. 144 is an example Mezz protein specification (open dossier [error]), under an embodiment.

FIG. 145 is an example Mezz protein specification (rename dossier [error]), under an embodiment.

FIG. 146 is an example Mezz protein specification (duplicate dossier [error]), under an embodiment.

FIG. 147 is an example Mezz protein specification (delete dossier [error]), under an embodiment.

FIG. 148 is another example Mezz protein specification (delete dossier [error]), under an embodiment.

FIG. 149 is another example Mezz protein specification (passforward ratchet state), under an embodiment.

FIG. 150 is an example Mezz protein specification (download all slides [success]), under an embodiment.

FIG. 151 is an example Mezz protein specification (download all slides [error]), under an embodiment.

FIG. 152 is an example Mezz protein specification (download all assets [success]), under an embodiment.

FIG. 153 is an example Mezz protein specification (download all assets [error]), under an embodiment.

FIG. 154 is an example Mezz protein specification (image ready [error]), under an embodiment.

FIG. 155 is an example Mezz protein specification (upload images [success]), under an embodiment.

FIG. 156 is an example Mezz protein specification (upload images [error 1]), under an embodiment.

FIG. 157 is an example Mezz protein specification (upload images [partial success]), under an embodiment.

FIG. 158 is an example Mezz protein specification (delete all assets [error]), under an embodiment.

FIG. 159 is an example Mezz protein specification (deck detail response), under an embodiment.

FIG. 160 is an example Mezz protein specification (image ready), under an embodiment.

FIG. 161 is an example Mezz protein specification (video source list), under an embodiment.

FIG. 162 is an example Mezz protein specification (Hoboken status), under an embodiment.

FIG. 163 is an example Mezz protein specification (video thumbnail available), under an embodiment.

FIG. 164 is an example Mezz protein specification (set Hoboken video source), under an embodiment.

FIG. 165 is an example Mezz protein specification (adjust video audio), under an embodiment.

FIG. 166 is an example Mezz protein specification (video audio adjusted [singular], video audio adjusted [multiple]), under an embodiment.

Figure 167:
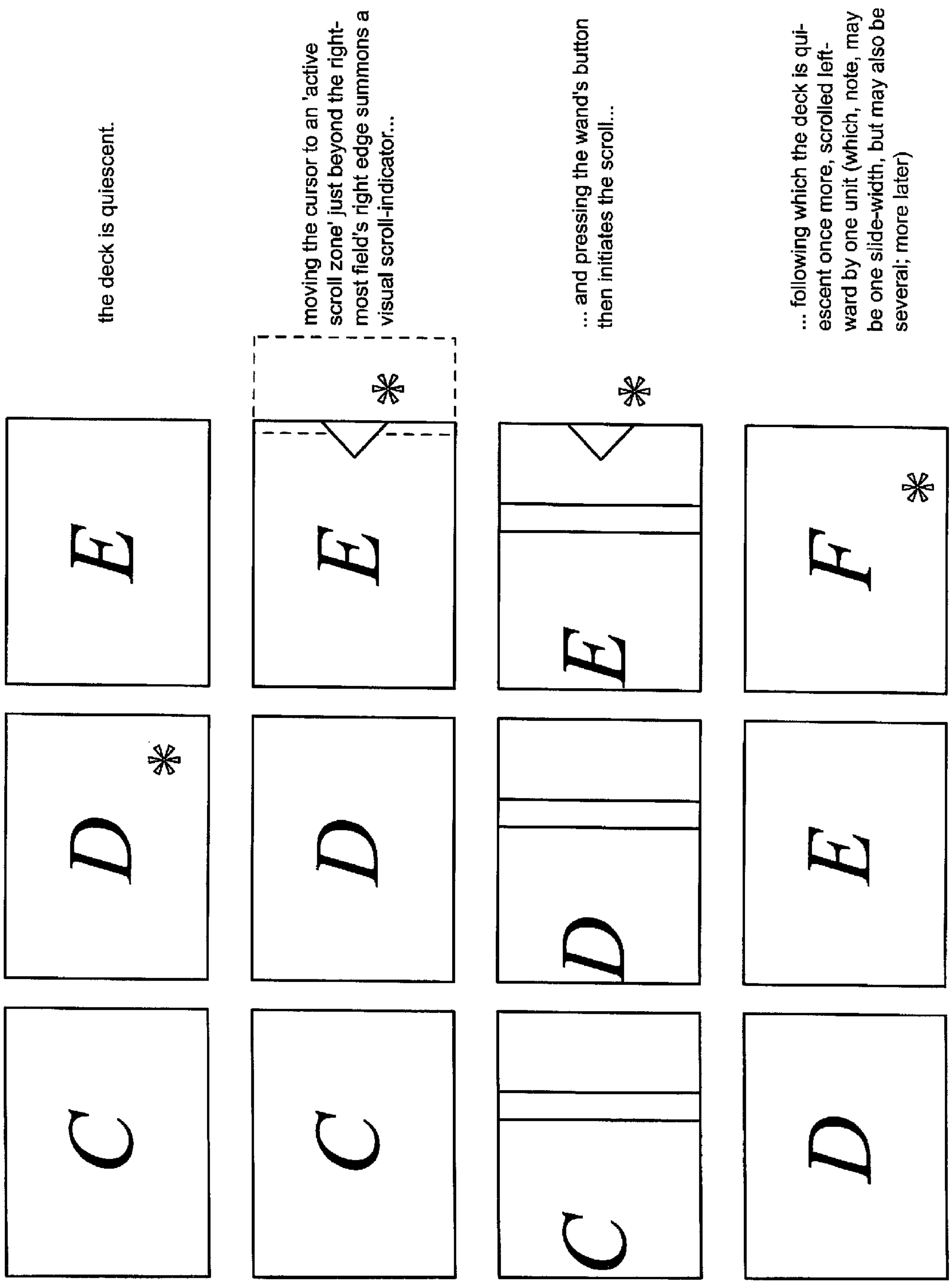

FIGS. 167-173 show Mezzanine presentation mode operations, under an embodiment FIG. 167 shows presentation mode slide advance operations, under an embodiment.

Figure 168:
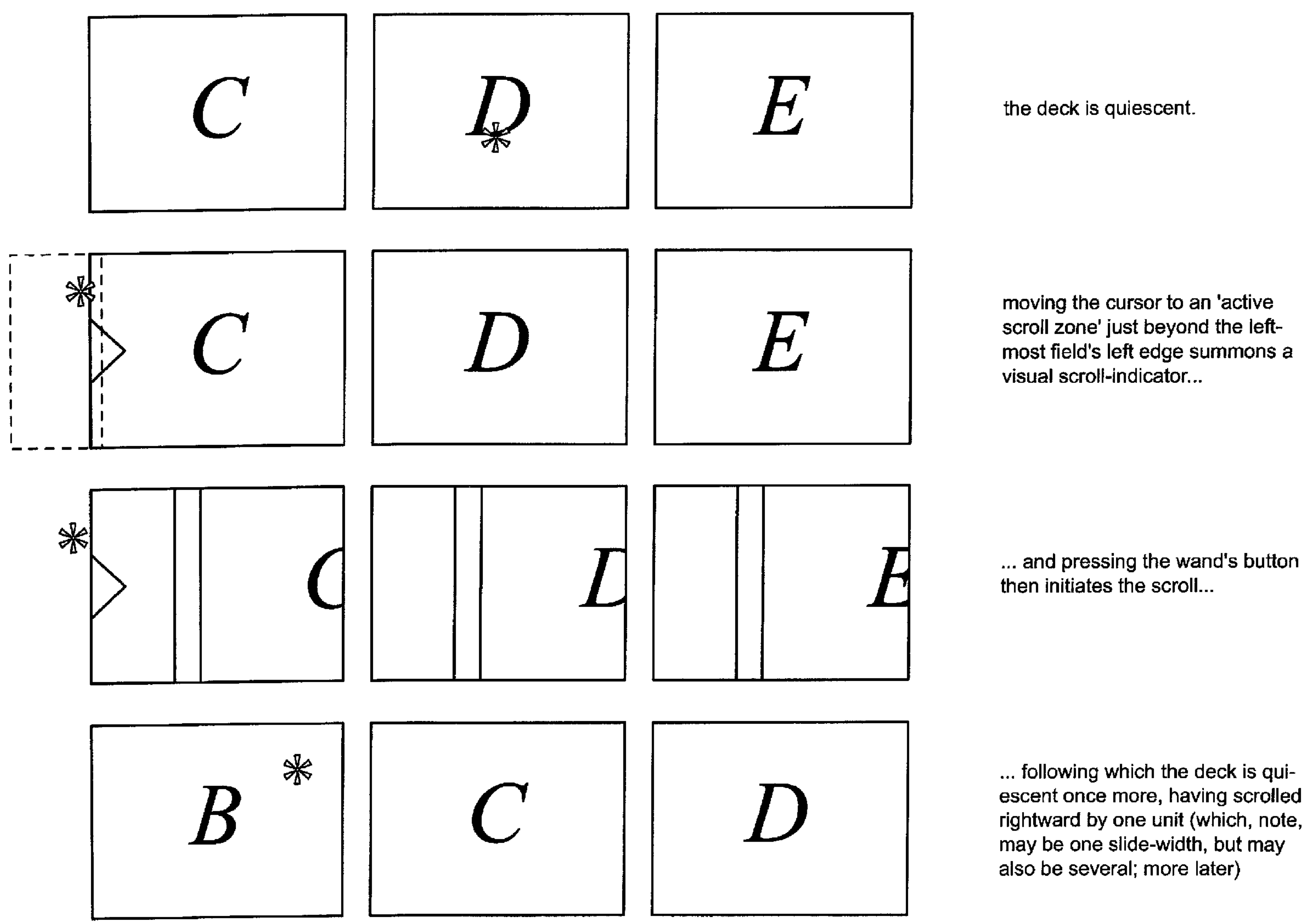

FIG. 168 shows presentation mode slide retreat operations, under an embodiment.

FIG. 169 shows presentation mode pushback transport operations, under an embodiment.

FIG. 170 shows presentation mode pushback locking operations, under an embodiment.

Figure 171:
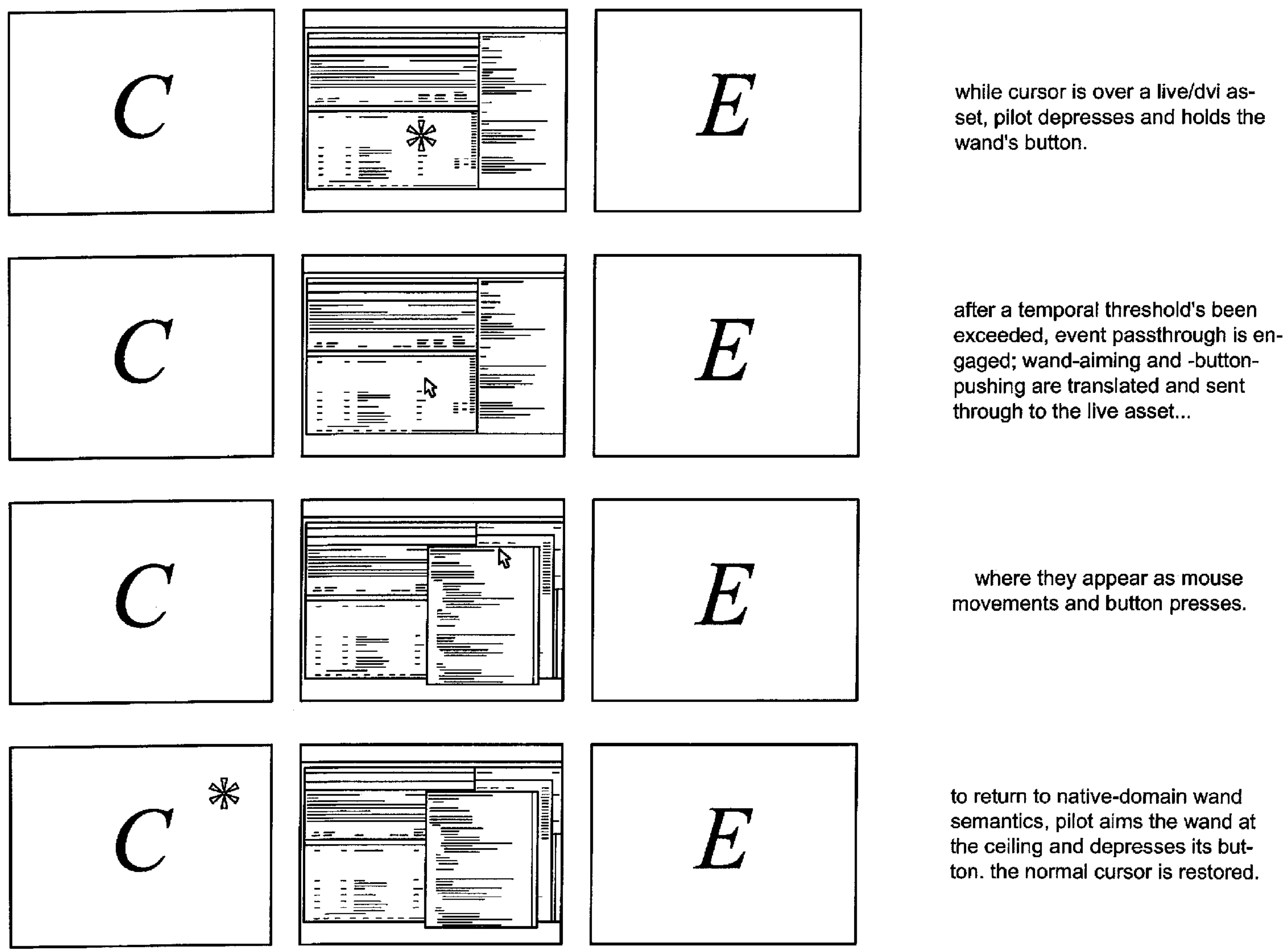

FIG. 171 shows presentation mode passthrough operations, under an embodiment.

FIG. 172 shows presentation mode passthrough, button selection operations, under an embodiment.

FIG. 173 shows presentation mode exit operations, under an embodiment.

FIGS. 174-210 show Mezzanine build mode operations, under an embodiment

Figure 174:
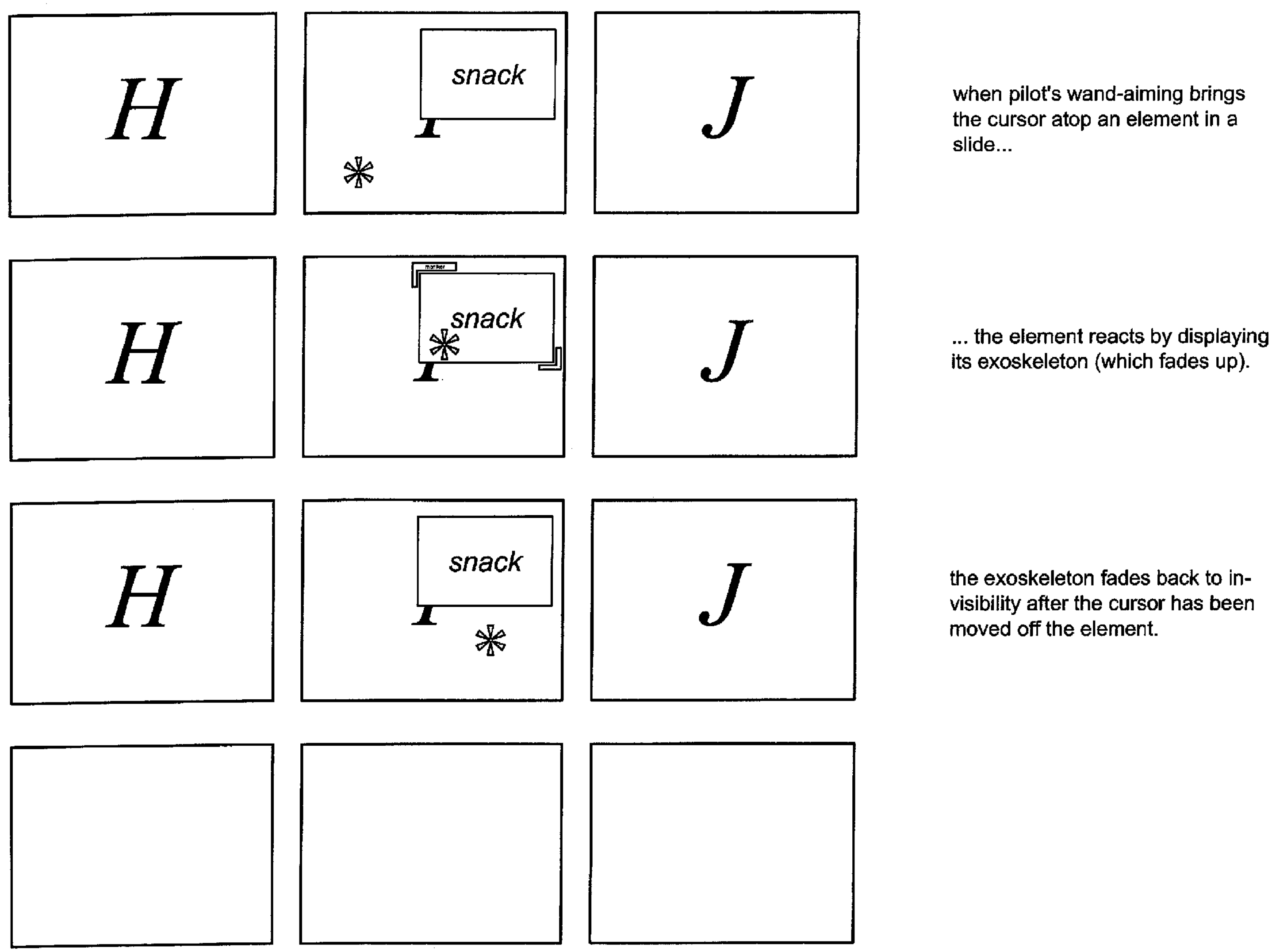

FIG. 174 shows build mode highlight element operations, under an embodiment.

FIG. 175 shows build mode move element operations, under an embodiment.

FIG. 176 shows build mode scale element operations, under an embodiment.

FIG. 177 shows build mode fullfeld element operations, under an embodiment.

FIG. 178 shows build mode summon context card operations, under an embodiment.

Figure 179:
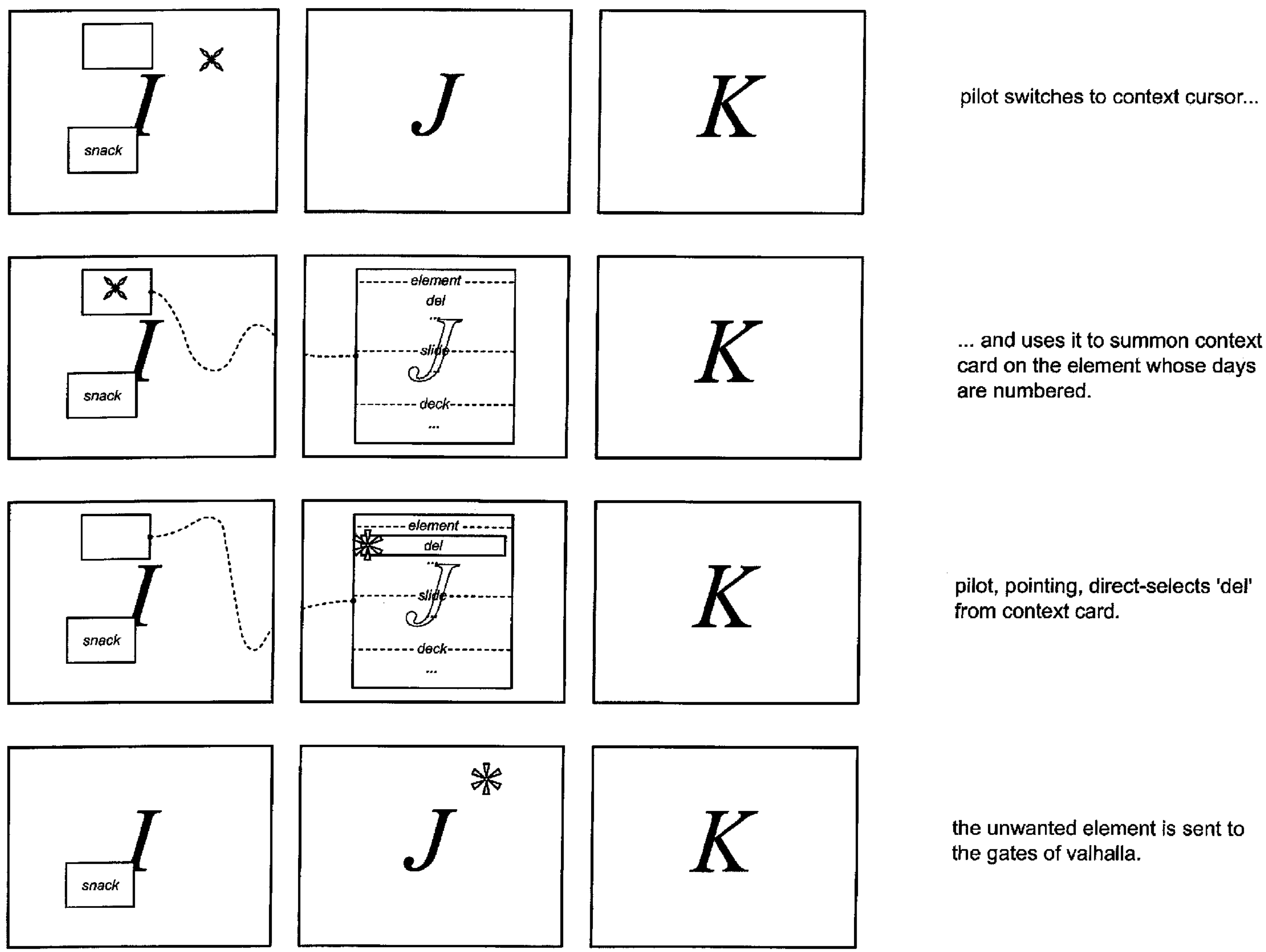

FIG. 179 shows build mode delete element operations, under an embodiment.

Figure 180:
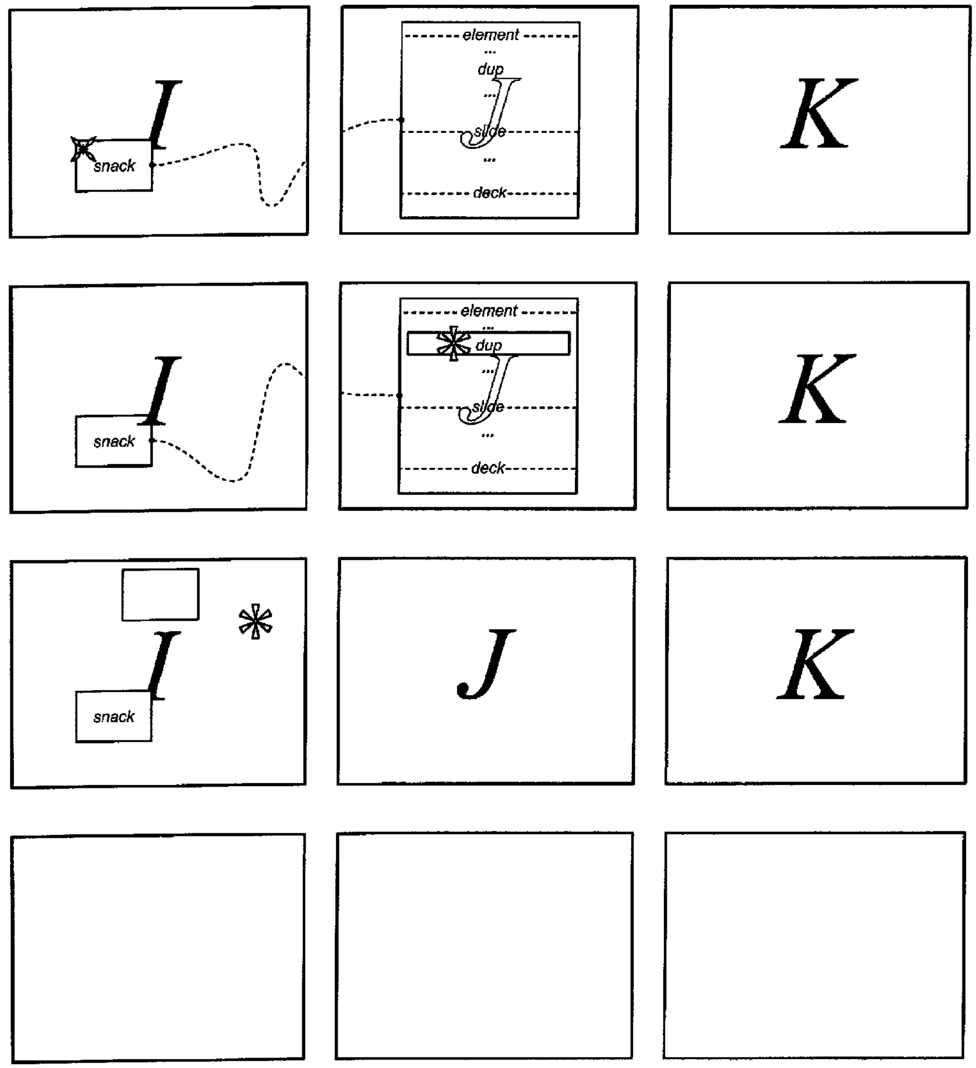

FIG. 180 shows build mode duplicate element operations, under an embodiment.

FIG. 181 shows build mode adjust element ordering operations, under an embodiment.

FIG. 182 shows build mode grab on-feld pixel operations, under an embodiment.

FIG. 183 shows build mode adjust element transparency operations, under an embodiment.

Figure 184:
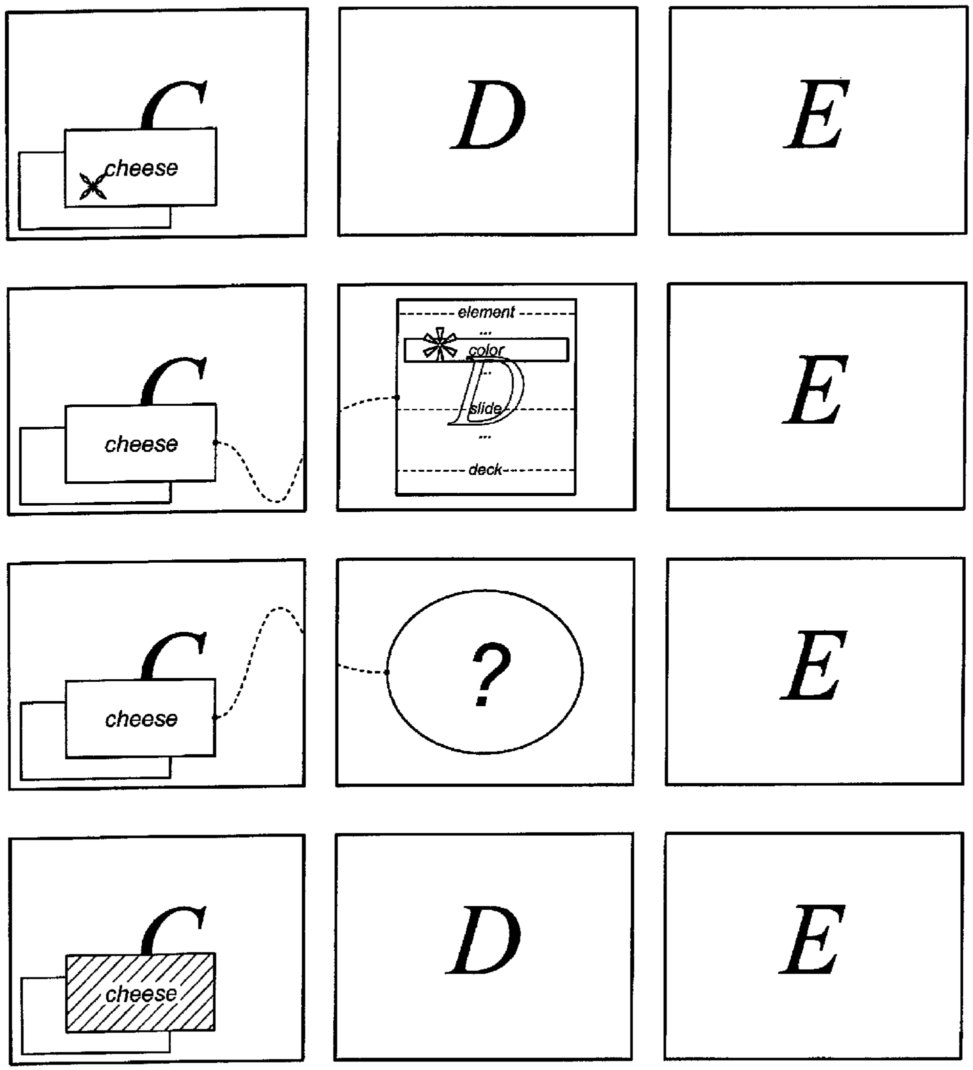

FIG. 184 shows build mode adjust element color operations, under an embodiment.

Figure 185:
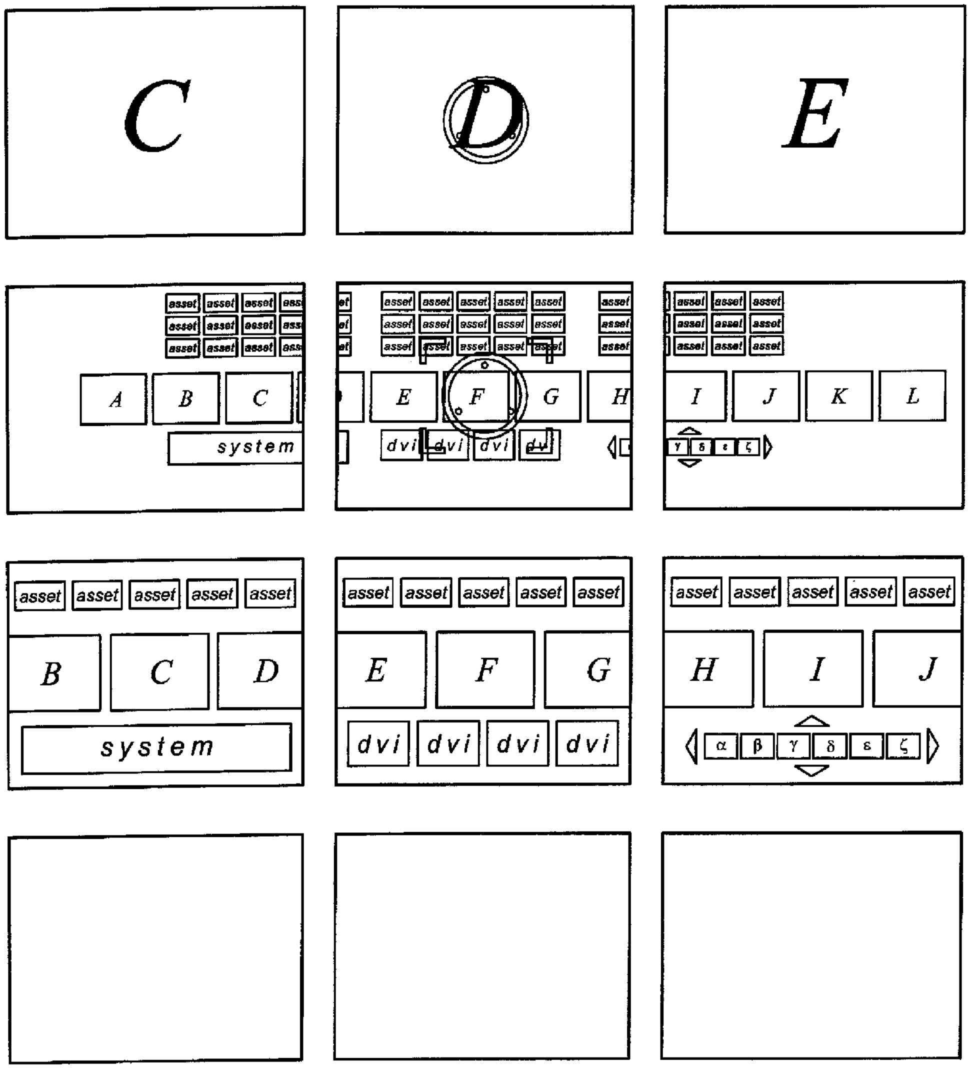

FIG. 185 shows build mode reveal Paramus and hoboken operations, under an embodiment.

Figure 186:
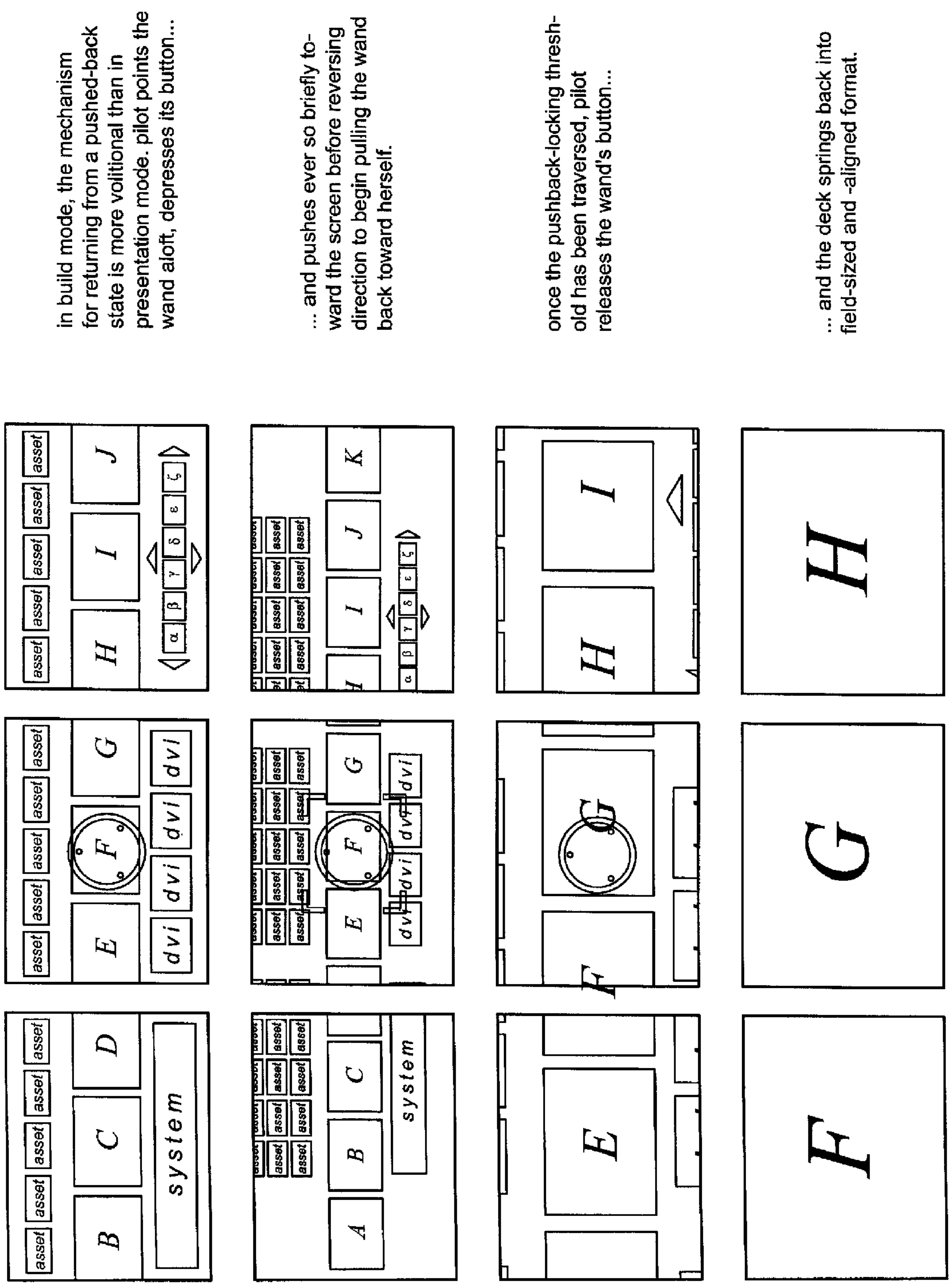

FIG. 186 shows build mode return from pushback operations, under an embodiment.

FIG. 187 shows build mode reveal more Paramus operations, under an embodiment.

FIG. 188 shows build mode reveal more hoboken operations, under an embodiment.

Figure 189:
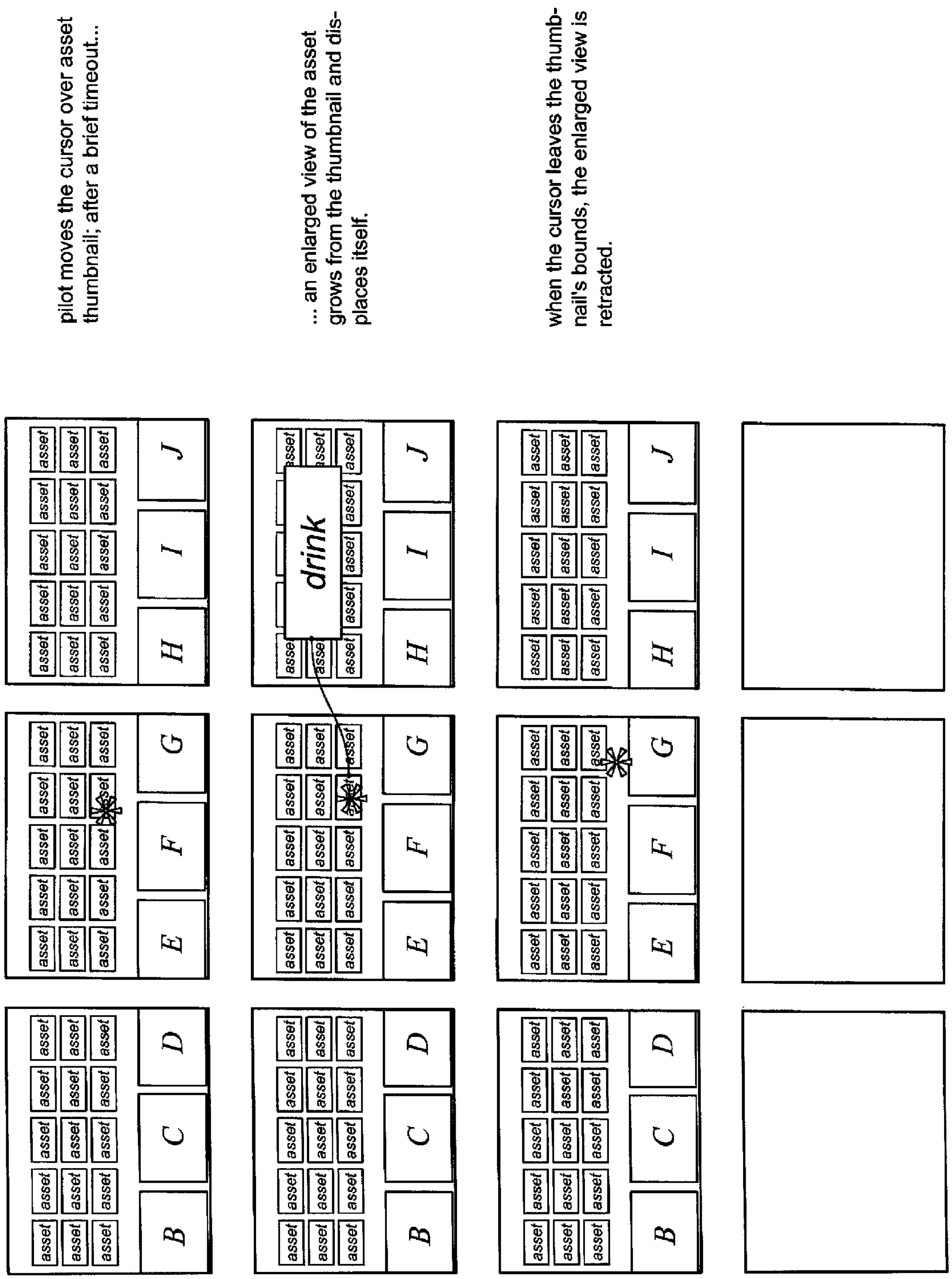

FIG. 189 shows build mode inspect asset in Paramus operations, under an embodiment.

Figure 190:
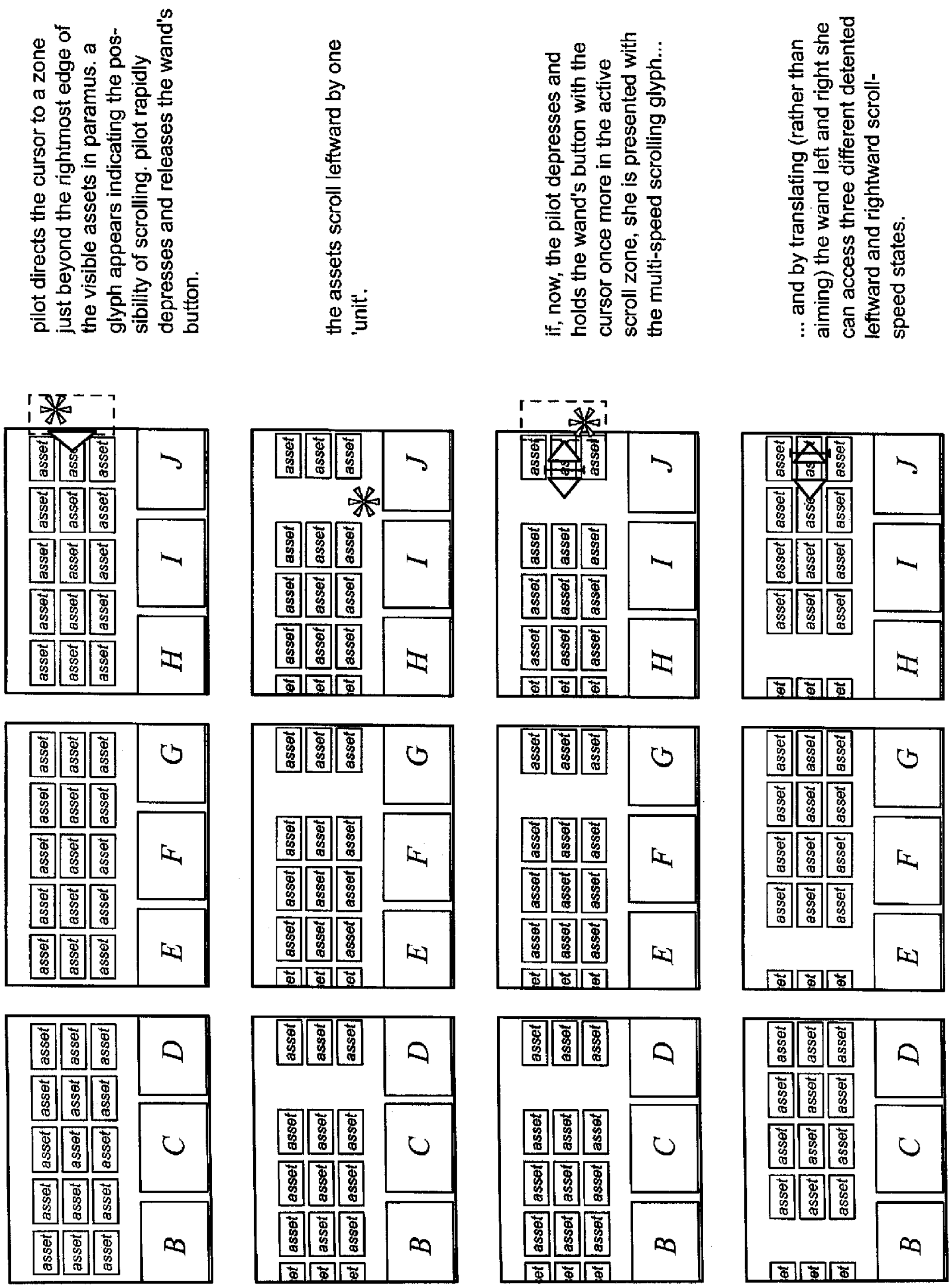

FIG. 190 shows build mode scroll Paramus laterally operations, under an embodiment.

FIG. 191 shows build mode insert asset into slide operations, under an embodiment.

Figure 192:
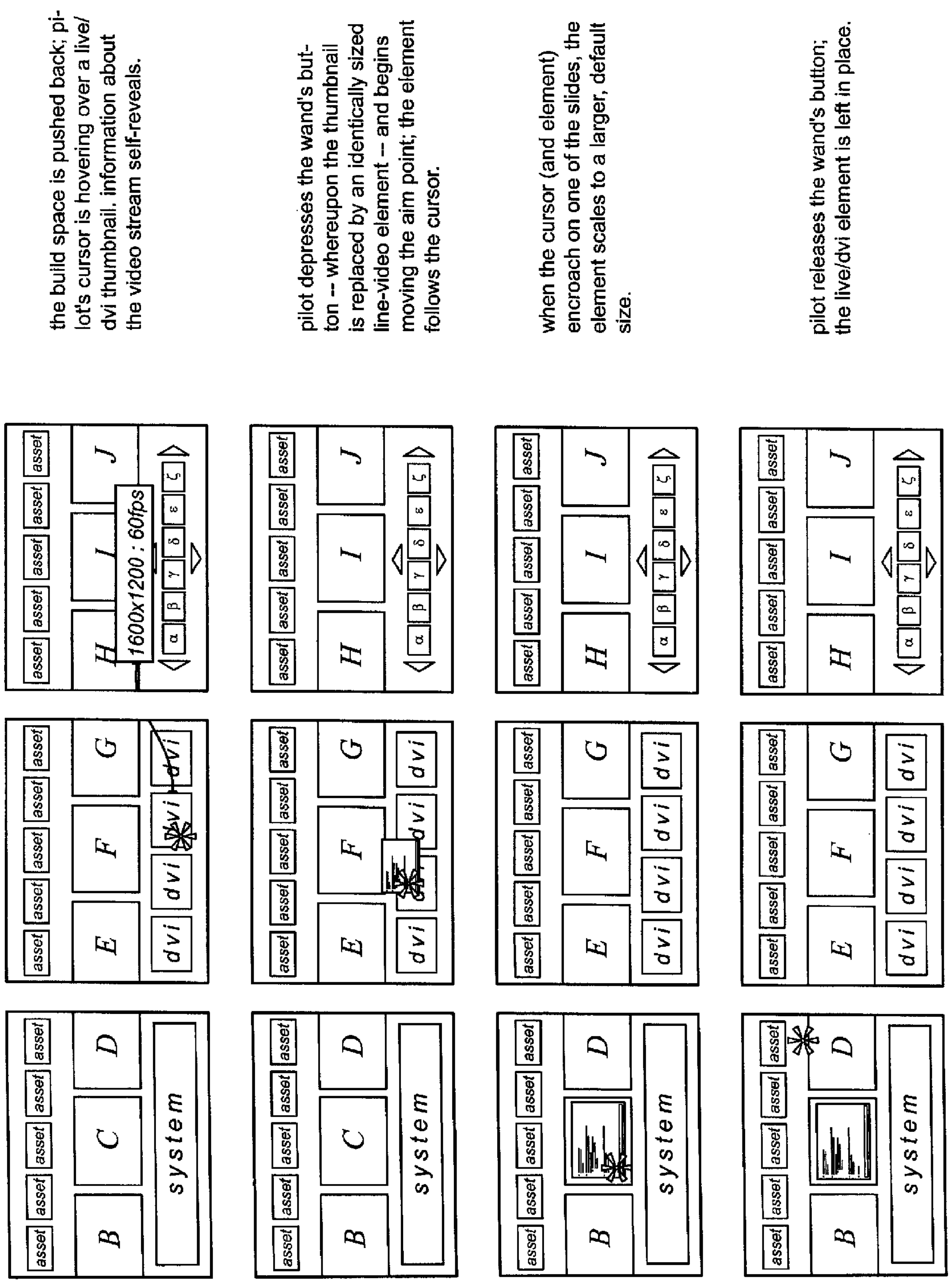

FIG. 192 shows build mode insert input into slide operations, under an embodiment.

Figure 193:
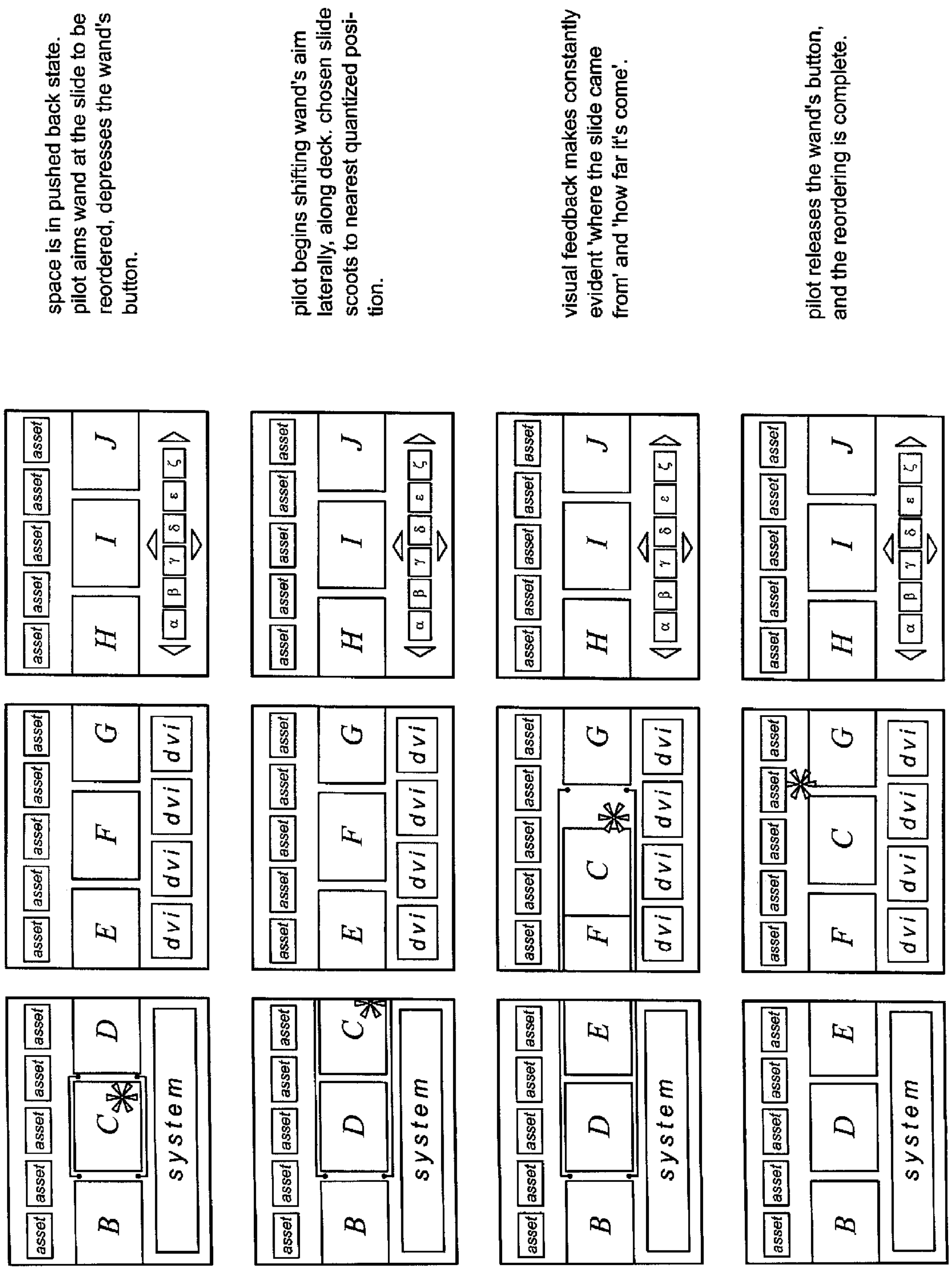

FIG. 193 shows build mode reorder deck operations, under an embodiment.

FIG. 194 shows build mode scroll deck operations, under an embodiment.

Figure 195:
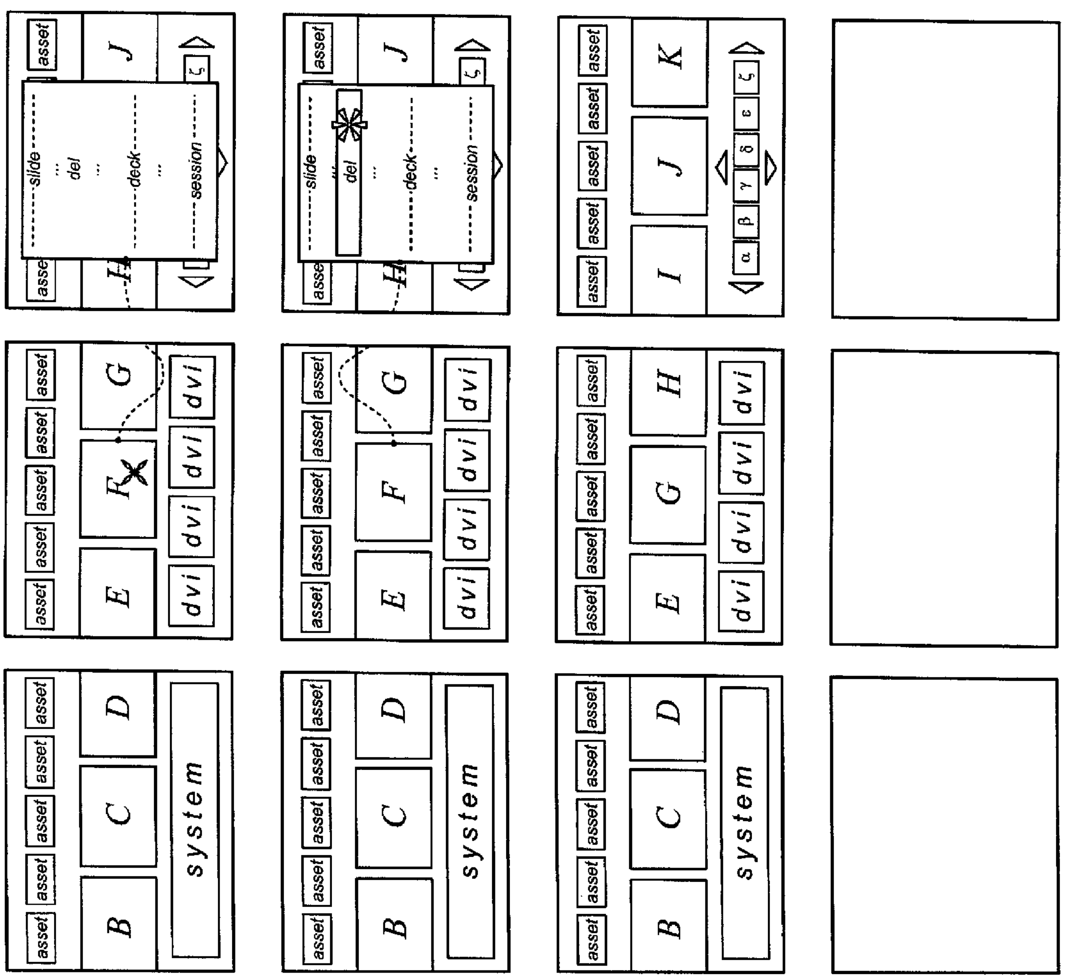

FIG. 195 shows build mode delete slide operations, under an embodiment.

FIG. 196 shows build mode duplicate slide operations, under an embodiment.

Figure 197:
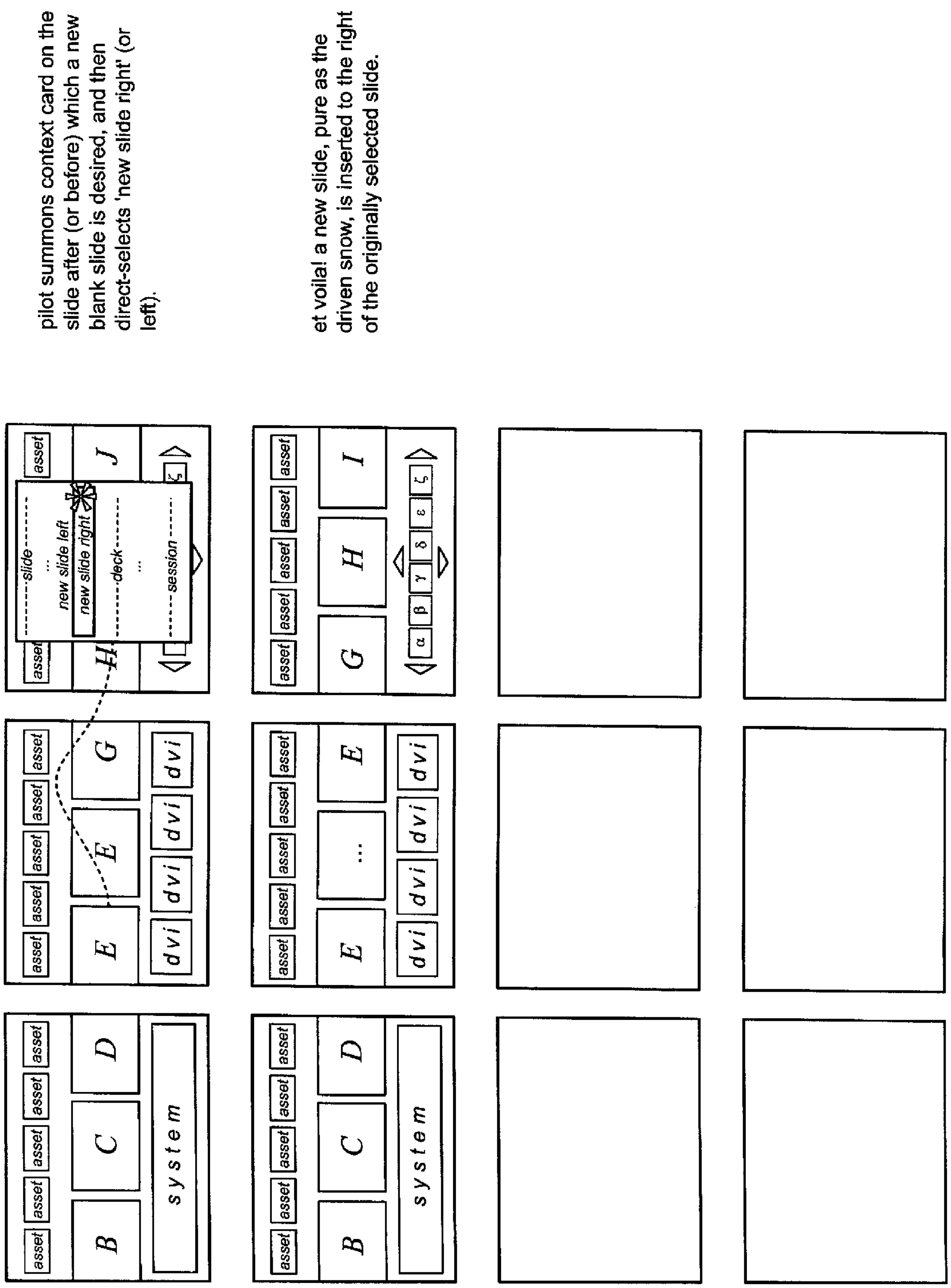

FIG. 197 shows build mode insert blank slide operations, under an embodiment.

FIG. 198 shows build mode browse other deck operations, under an embodiment.

Figure 199:
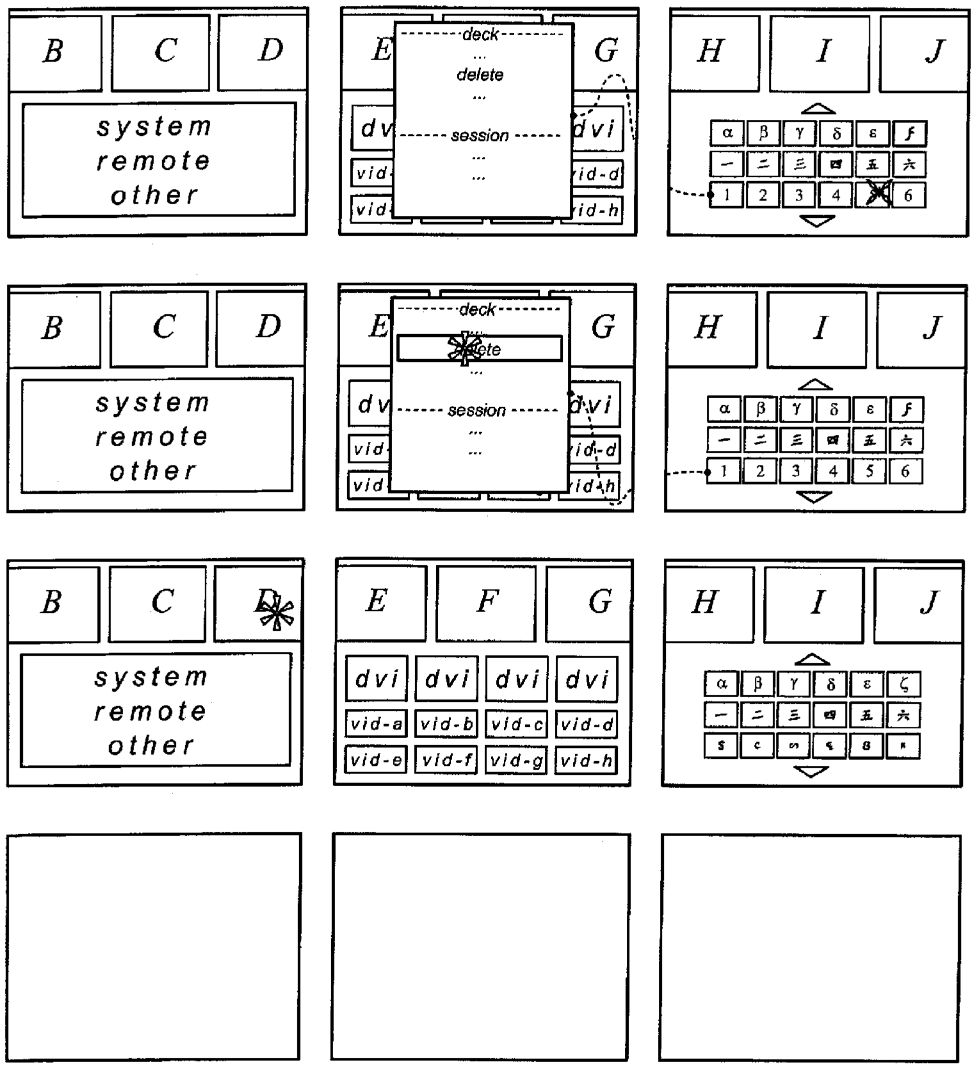

FIG. 199 shows build mode delete other deck operations, under an embodiment.

Figure 200:
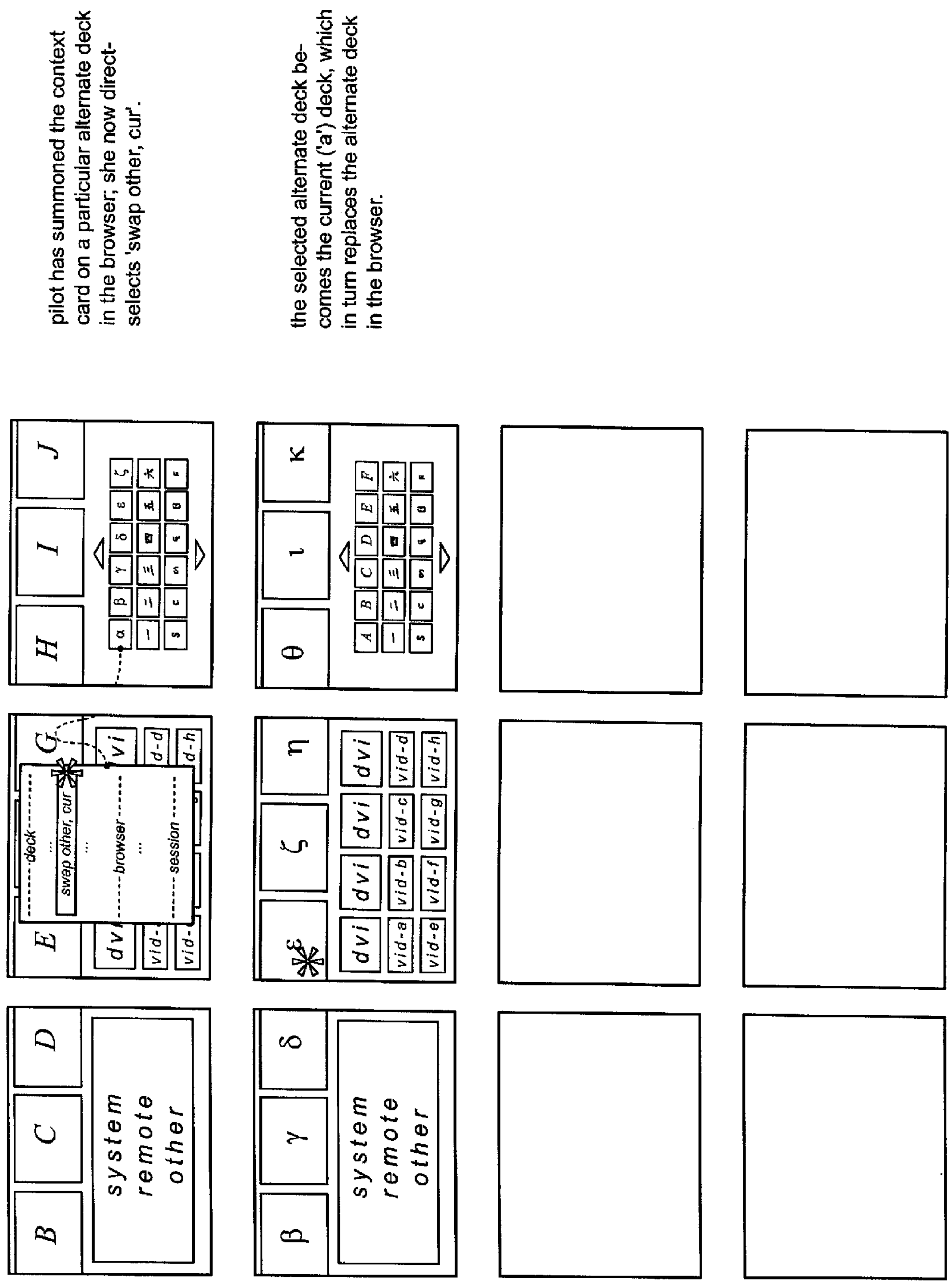

FIG. 200 shows build mode swap current deck with other operations, under an embodiment.

Figure 201:
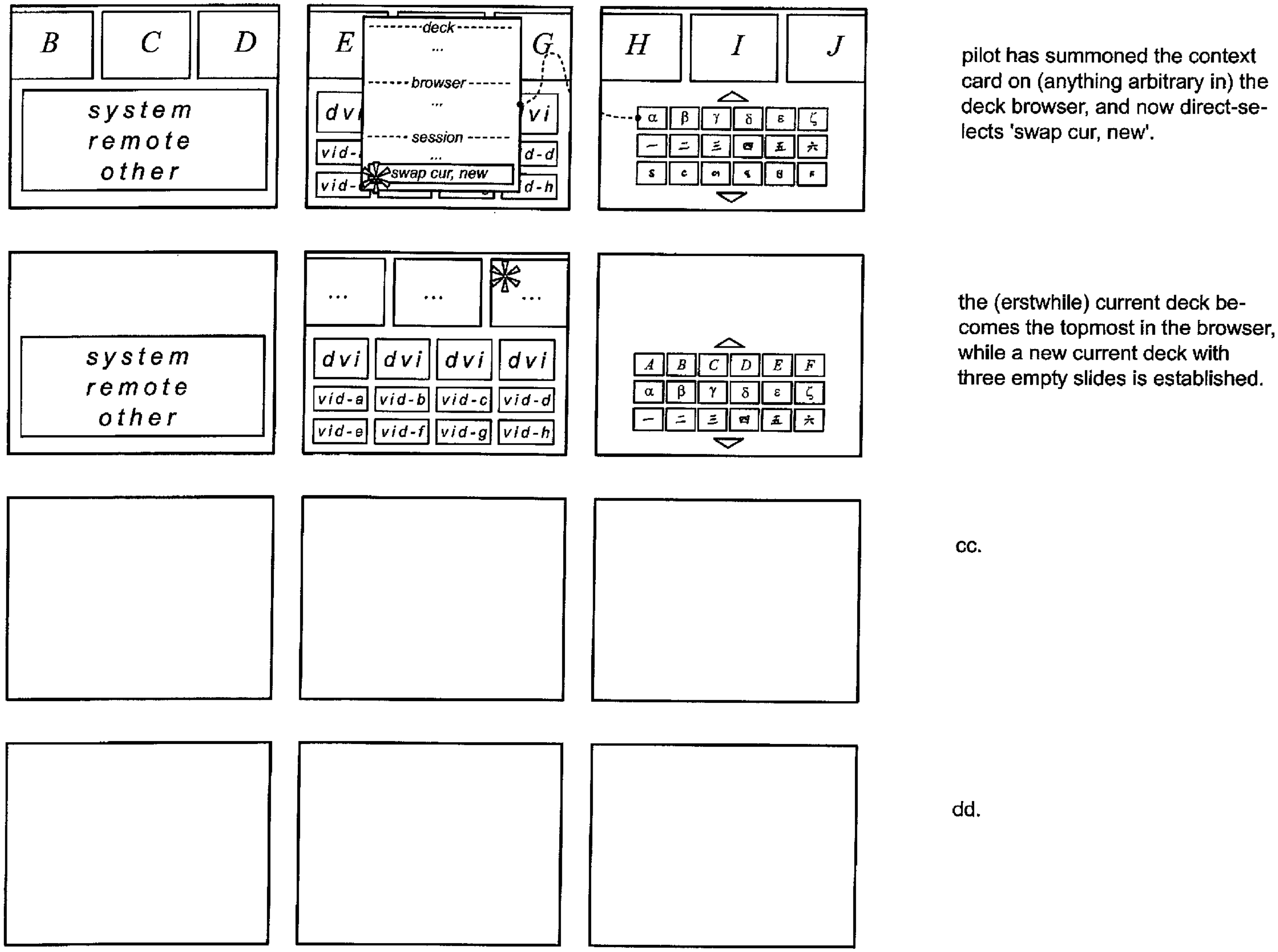

FIG. 201 shows build mode swap current deck with new empty operations, under an embodiment.

Figure 202:
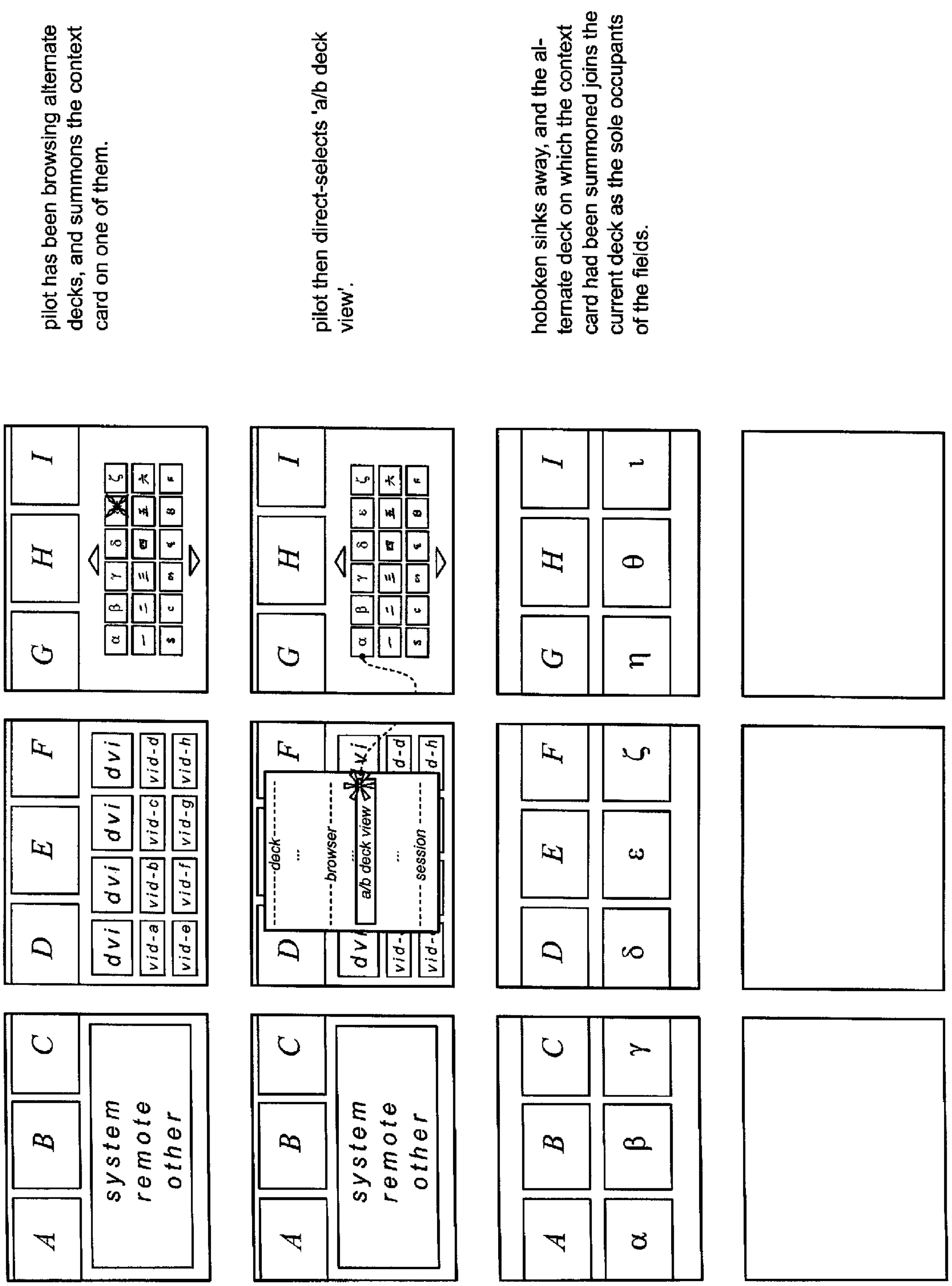

FIG. 202 shows build mode engage deck view operations, under an embodiment.

FIG. 203 shows build mode move slide between decks operations, under an embodiment.

FIG. 204 shows build mode reorder slide within deck operations, under an embodiment.

Figure 205:
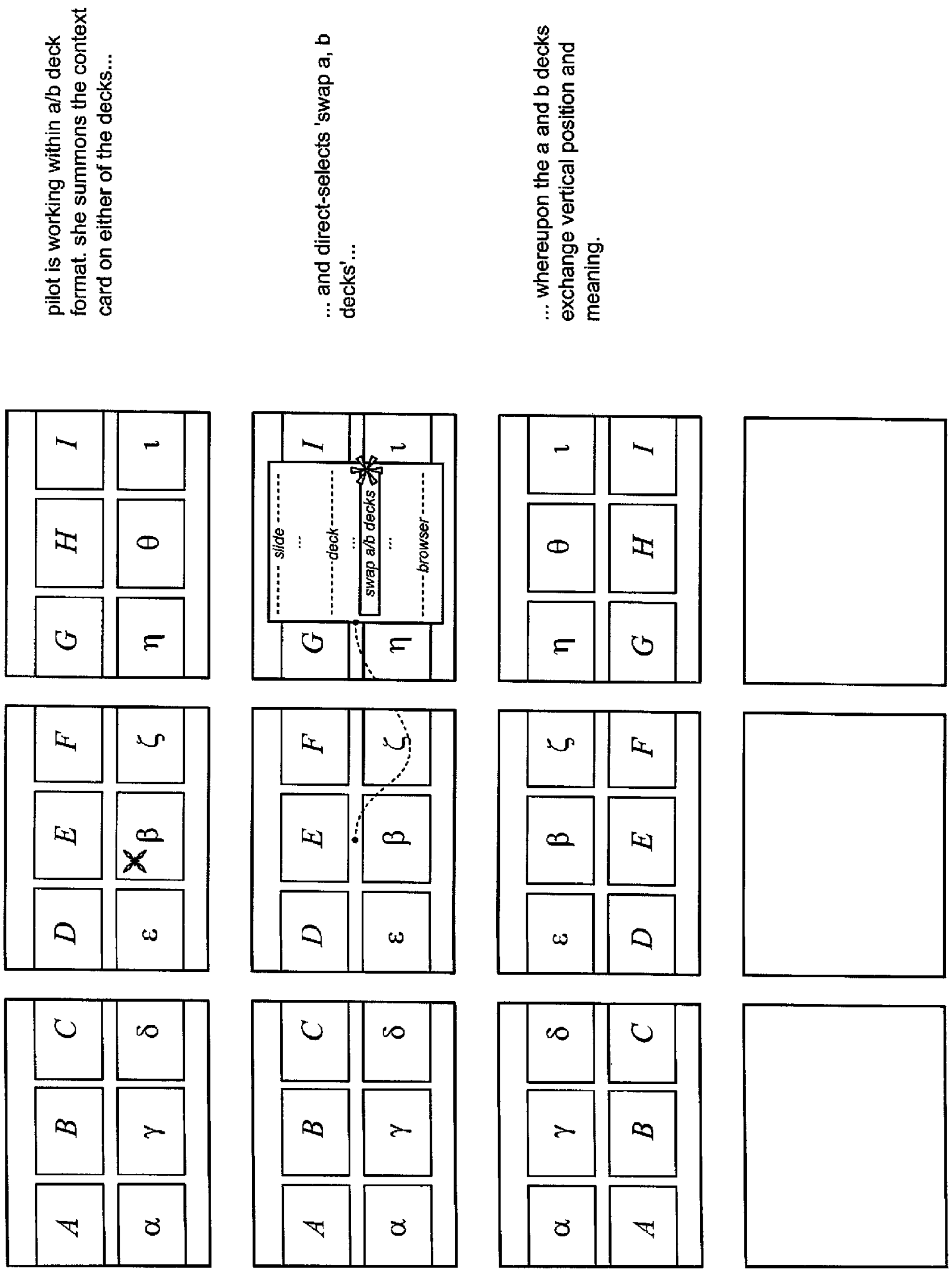

FIG. 205 shows build mode swap decks operations, under an embodiment.

Figure 206:
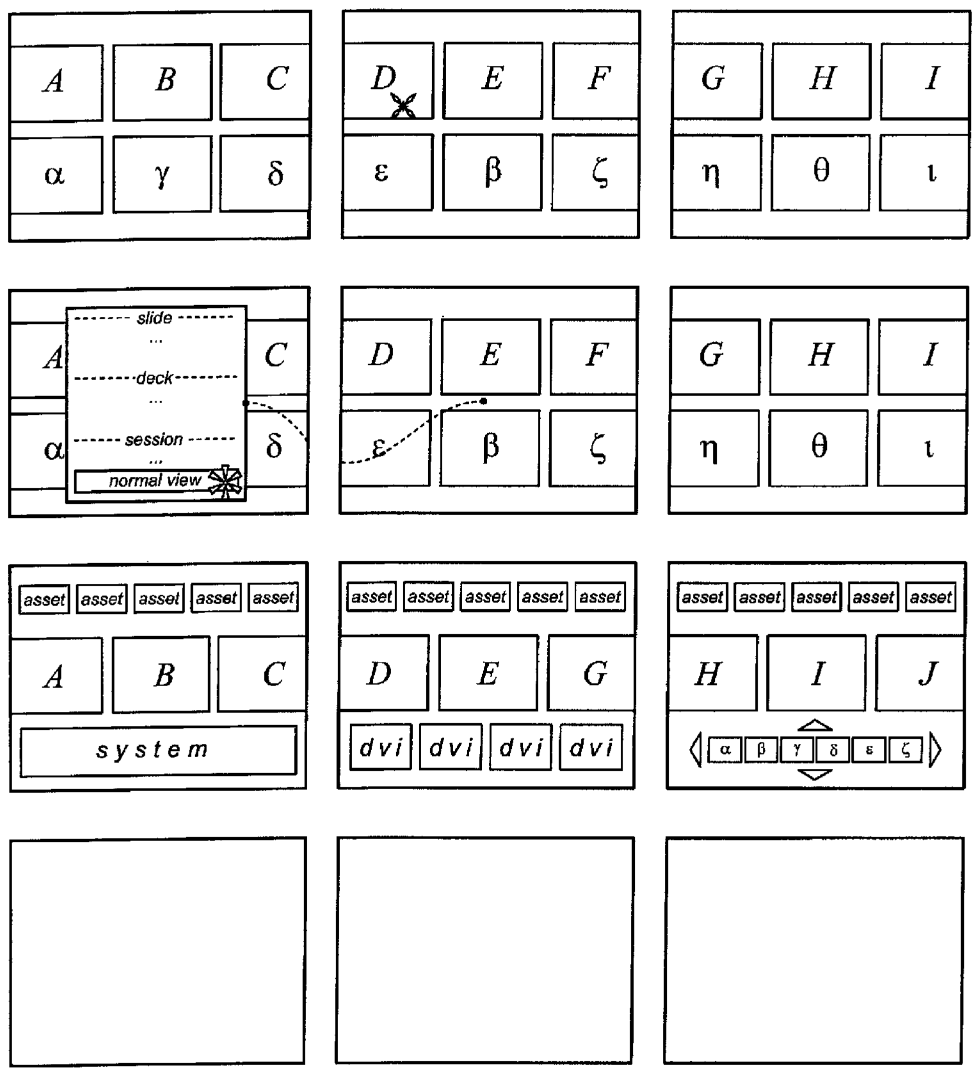

FIG. 206 shows build mode dismiss deck view (1) operations, under an embodiment.

FIG. 207 shows build mode dismiss deck view (2) operations, under an embodiment.

FIG. 208 shows build mode enter presentation mode (1) operations, under an embodiment.

Figure 209:
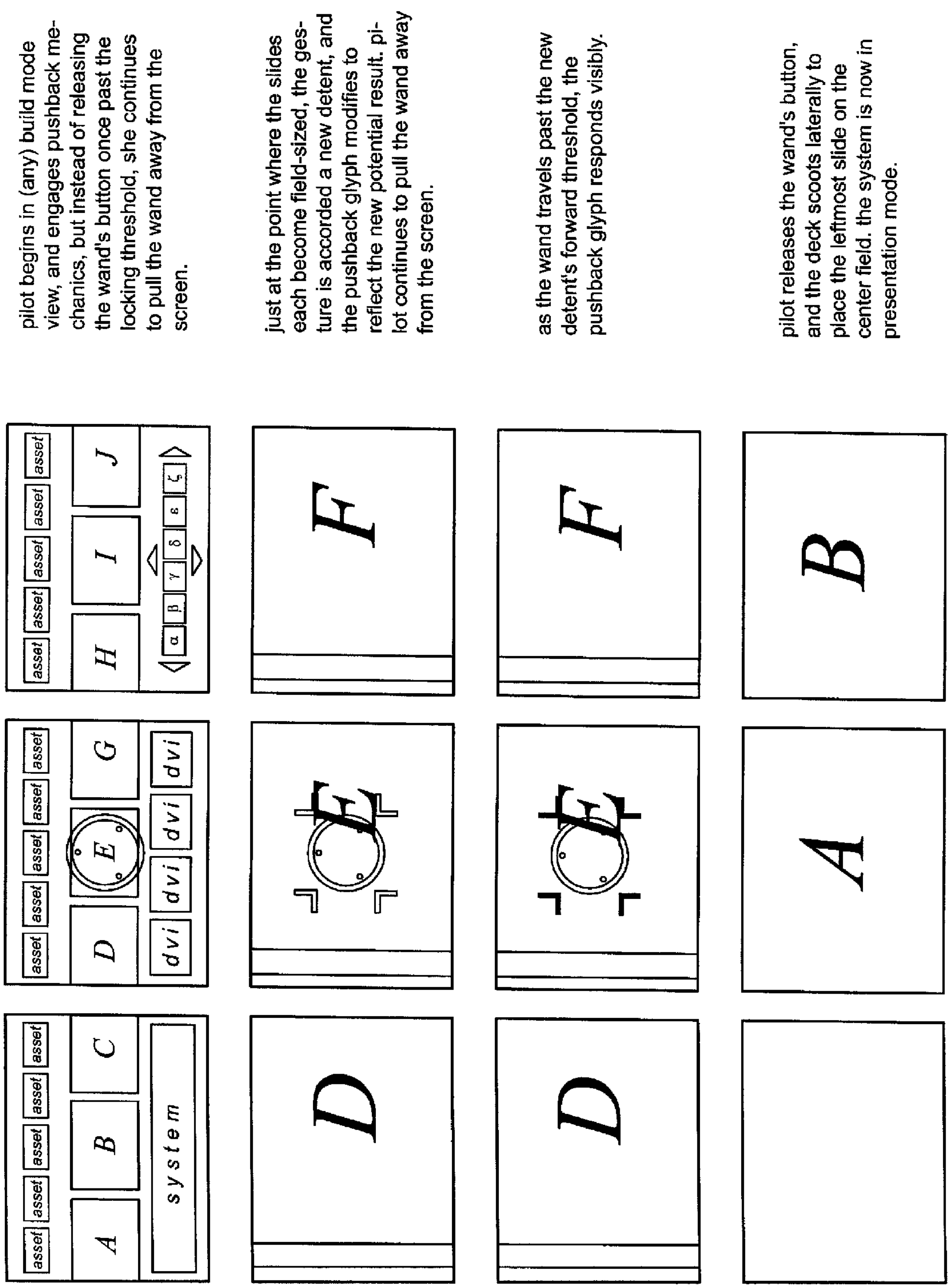

FIG. 209 shows build mode enter presentation mode (2) operations, under an embodiment.

Figure 210:
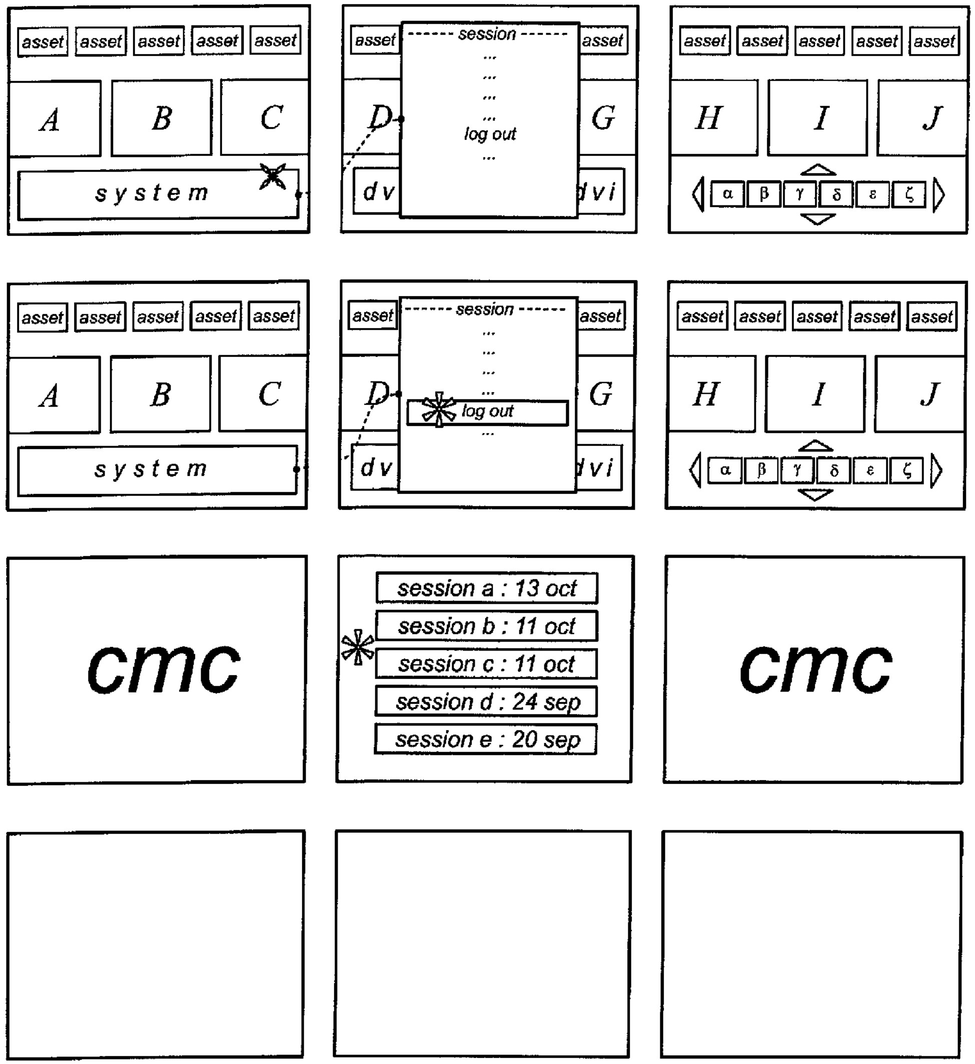

FIG. 210 shows build mode session ending operations, under an embodiment.

FIGS. 211-216 show Mezzanine web client presentation mode operations, under an embodiment FIG. 211 shows web client presentation mode entry operations, under an embodiment.

FIG. 212 shows web client presentation mode slide advance operations, under an embodiment.

Figure 213:
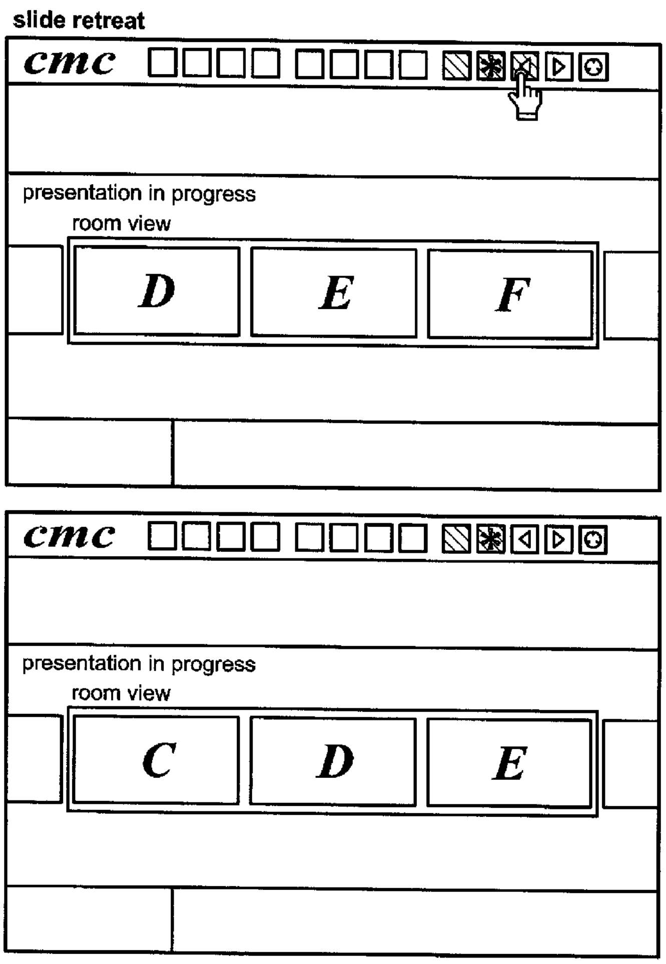

FIG. 213 shows web client presentation mode slide retreat operations, under an embodiment.

FIG. 214 shows web client presentation mode toggle pushback operations, under an embodiment.

FIG. 215 shows web client presentation mode pointer pass forward operations, under an embodiment.

Figure 216:
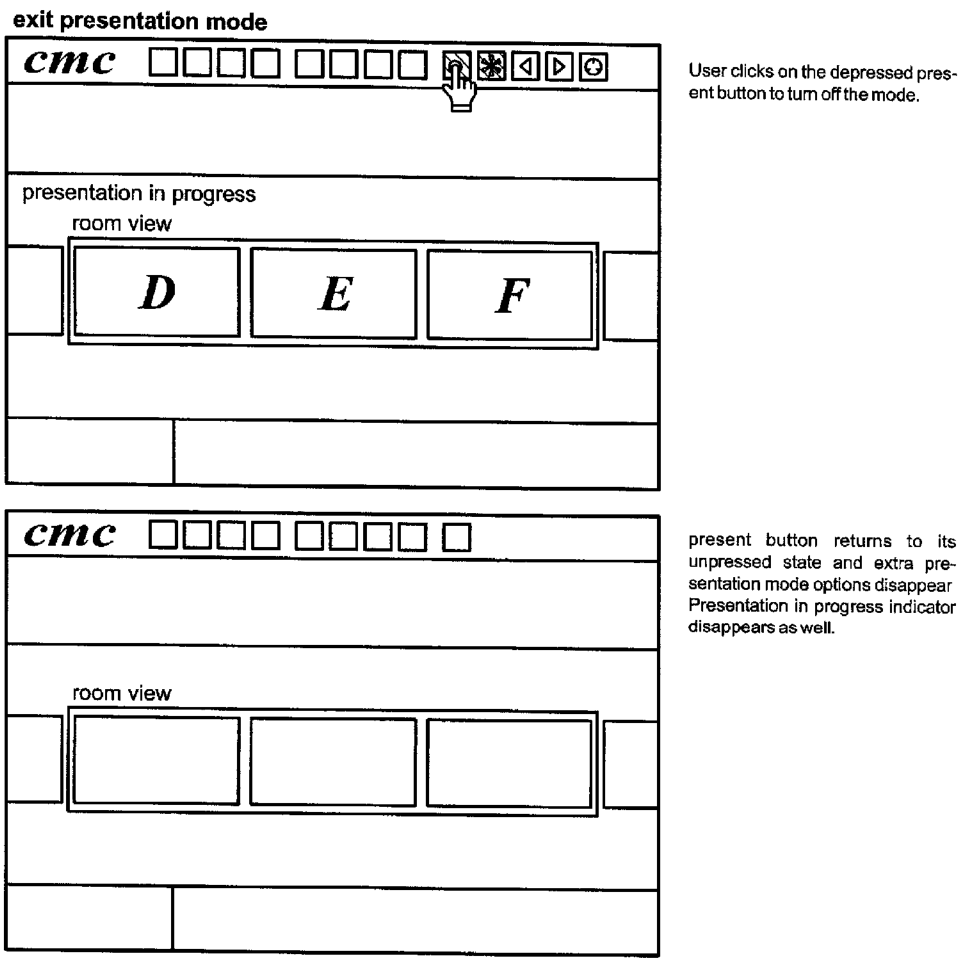

FIG. 216 shows web client presentation mode exit operations, under an embodiment.

Figure 217:
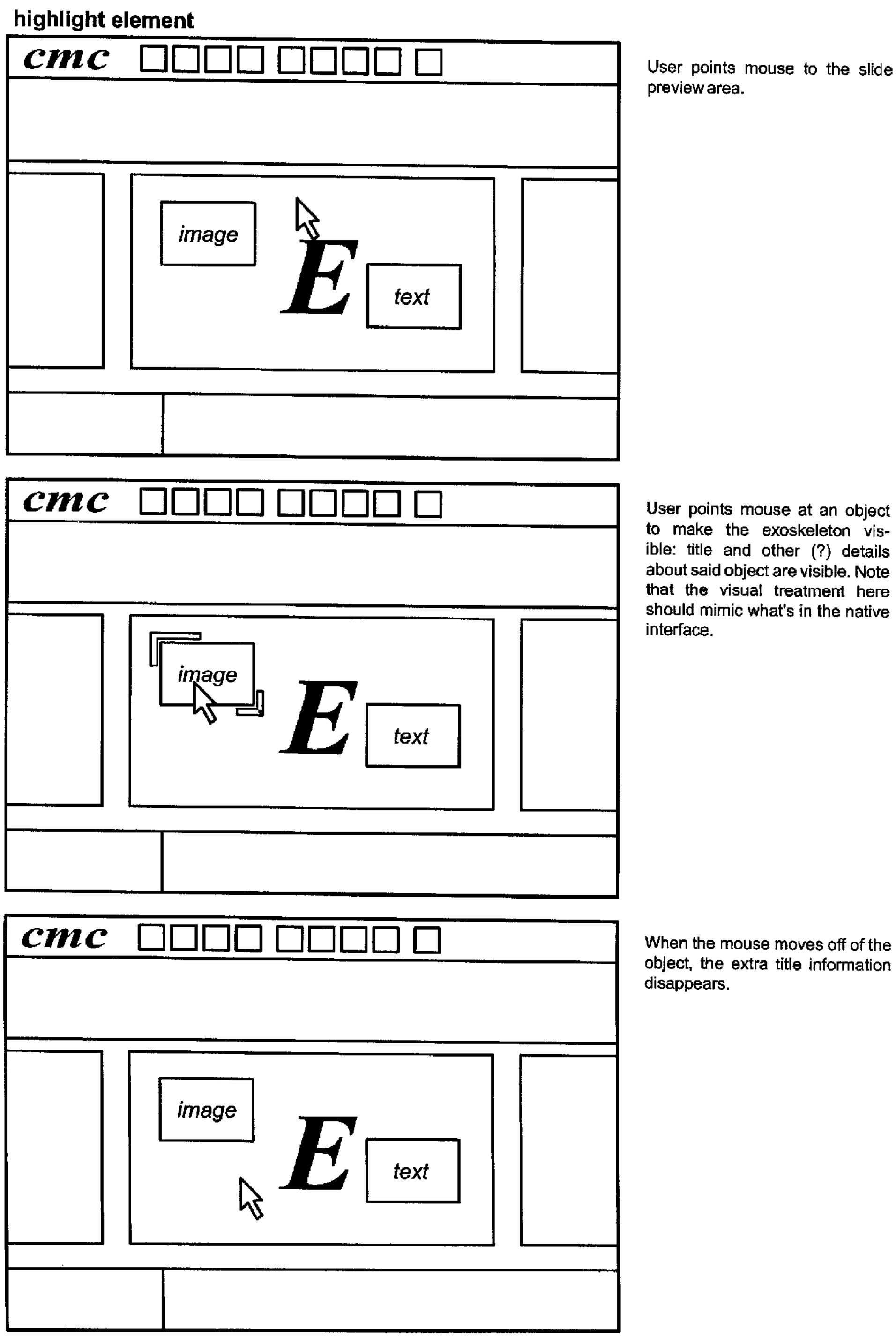

FIGS. 217-252 show Mezzanine web client build mode operations, under an embodiment FIG. 217 shows web client build mode highlight element operations, under an embodiment.

Figure 218B:
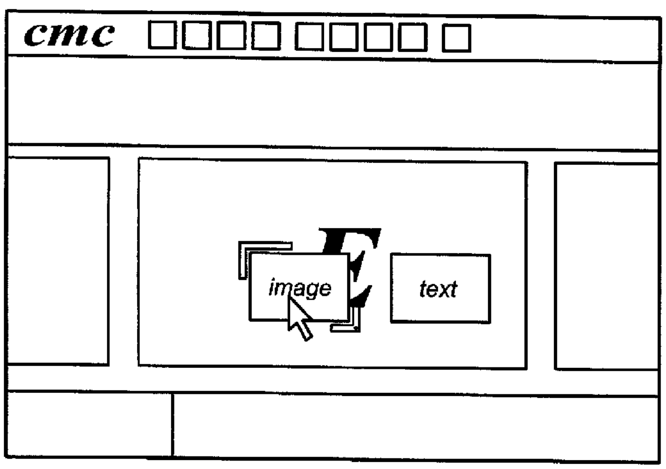

FIGS. 218A and 218B show web client build mode move element operations, under an embodiment.

Figure 219B:
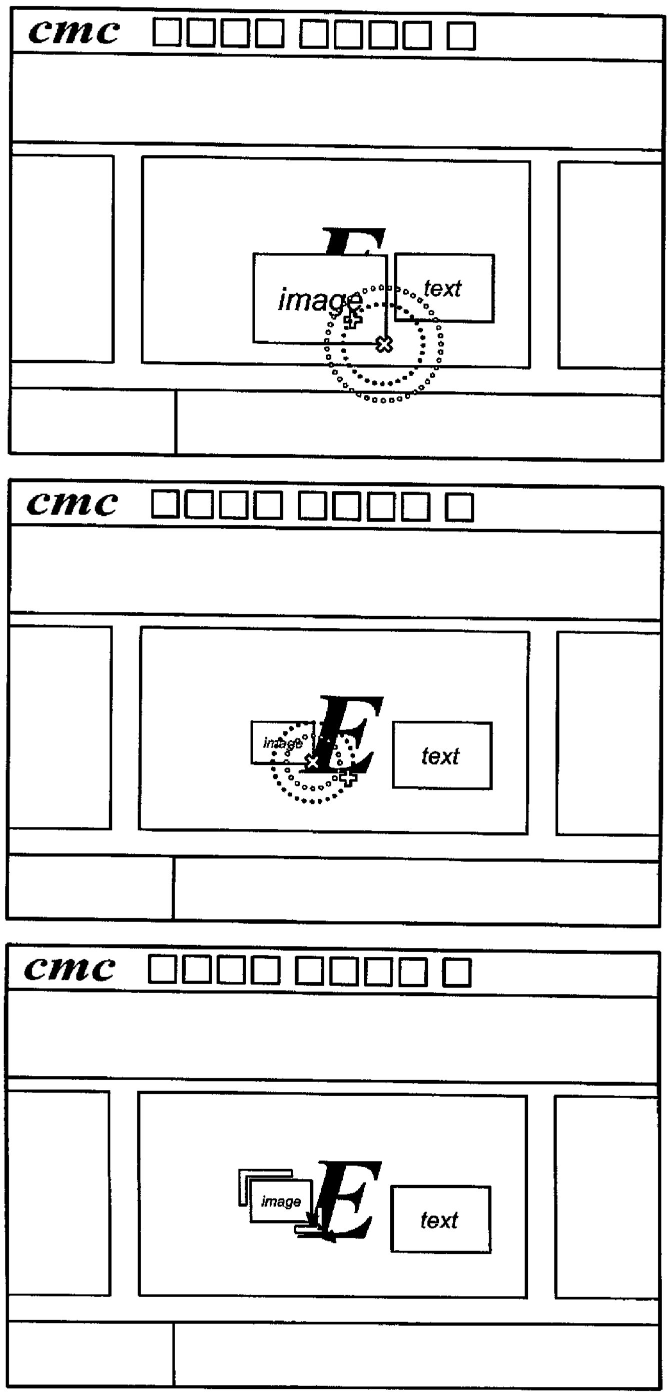

FIGS. 219A and 219B show web client build mode scale element operations, under an embodiment.

FIG. 220 shows web client build mode summon context card for element operations, under an embodiment.

FIG. 221 shows web client build mode full feld element operations, under an embodiment.

Figure 222:
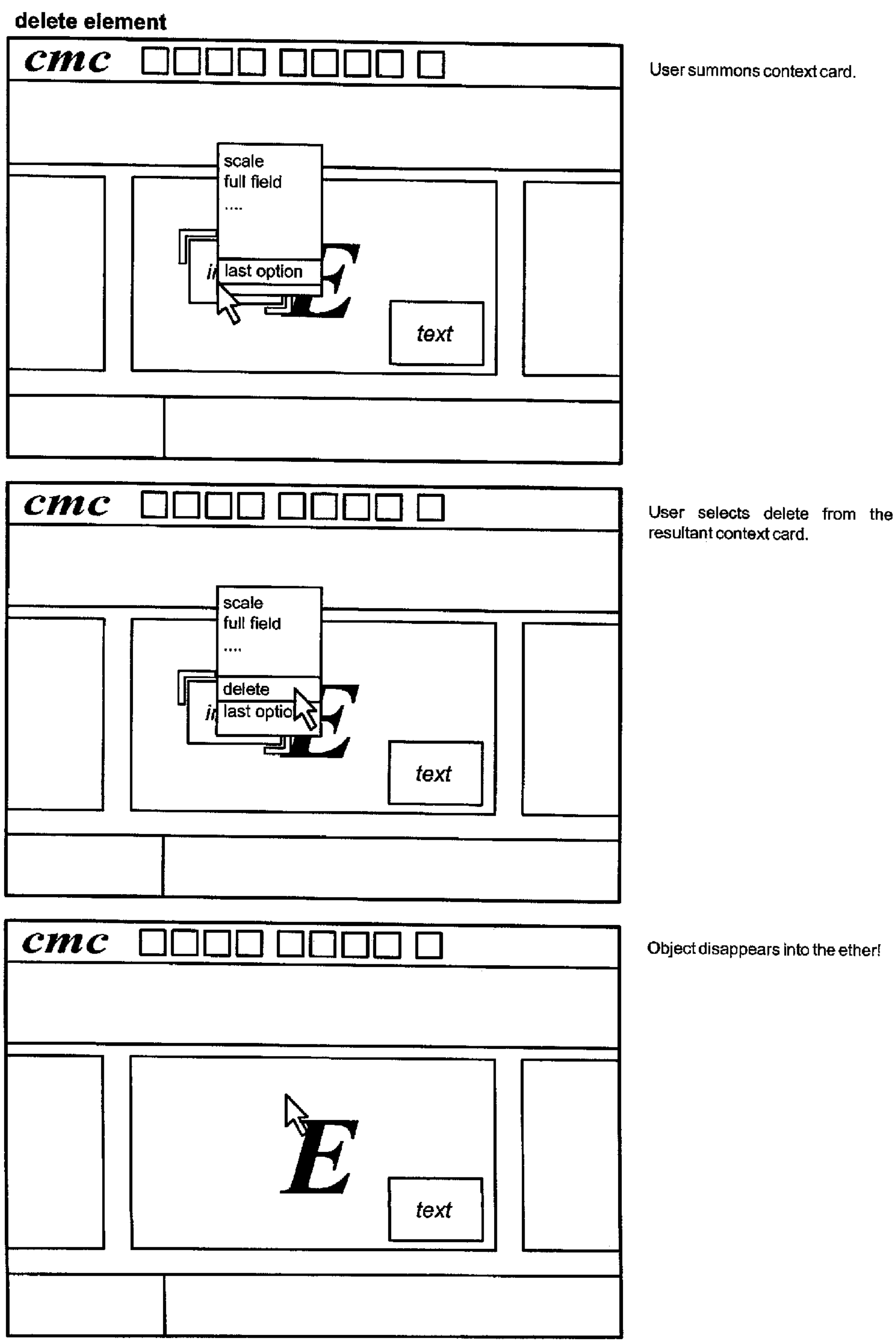

FIG. 222 shows web client build mode delete element operations, under an embodiment.

Figure 223:
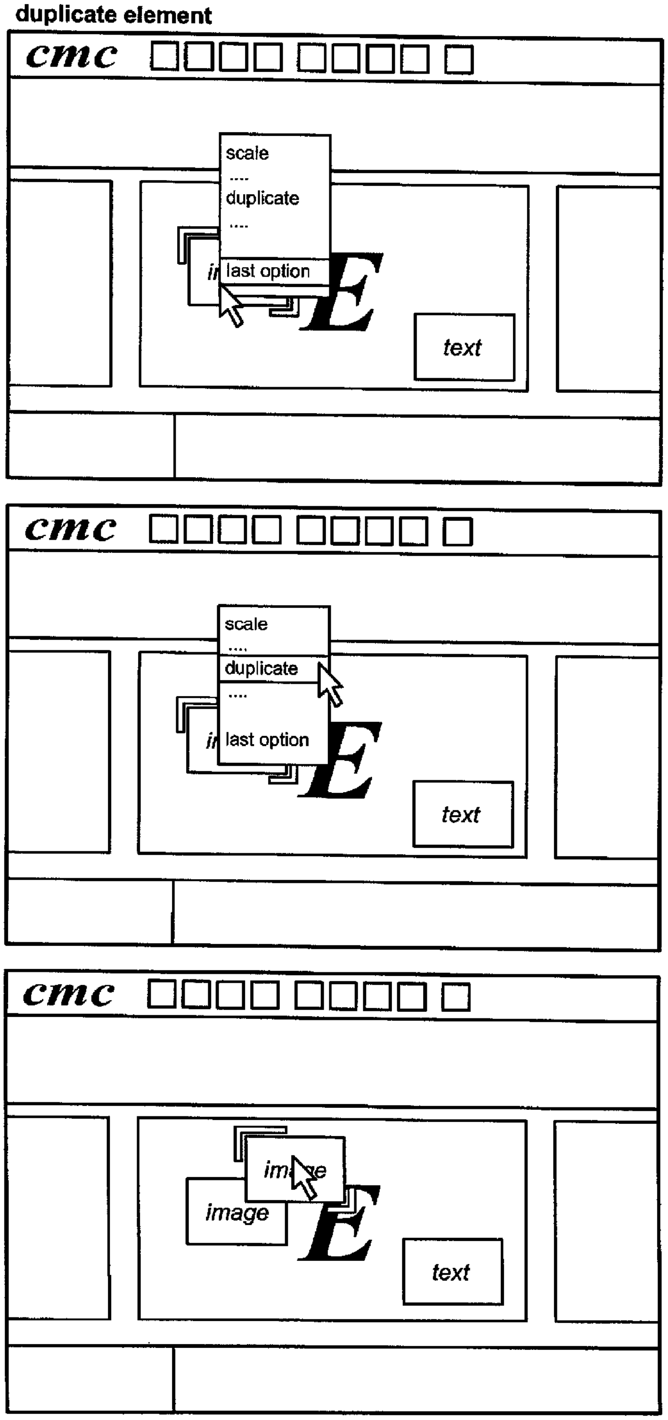

FIG. 223 shows web client build mode duplicate element operations, under an embodiment.

Figure 224B:
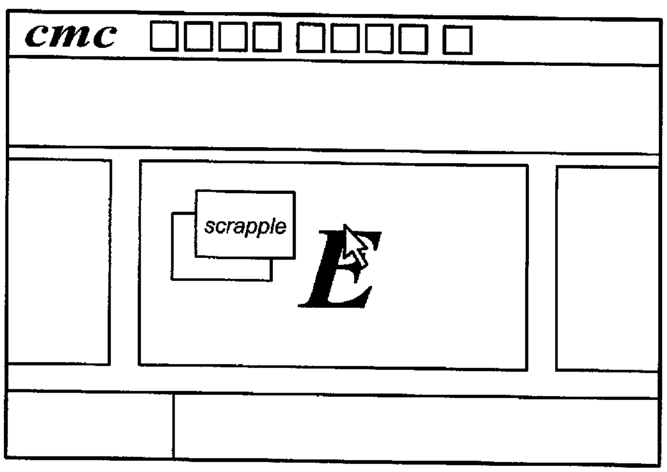

FIGS. 224A and 224B show web client build mode adjust element ordering operations, under an embodiment.

Figure 225A:
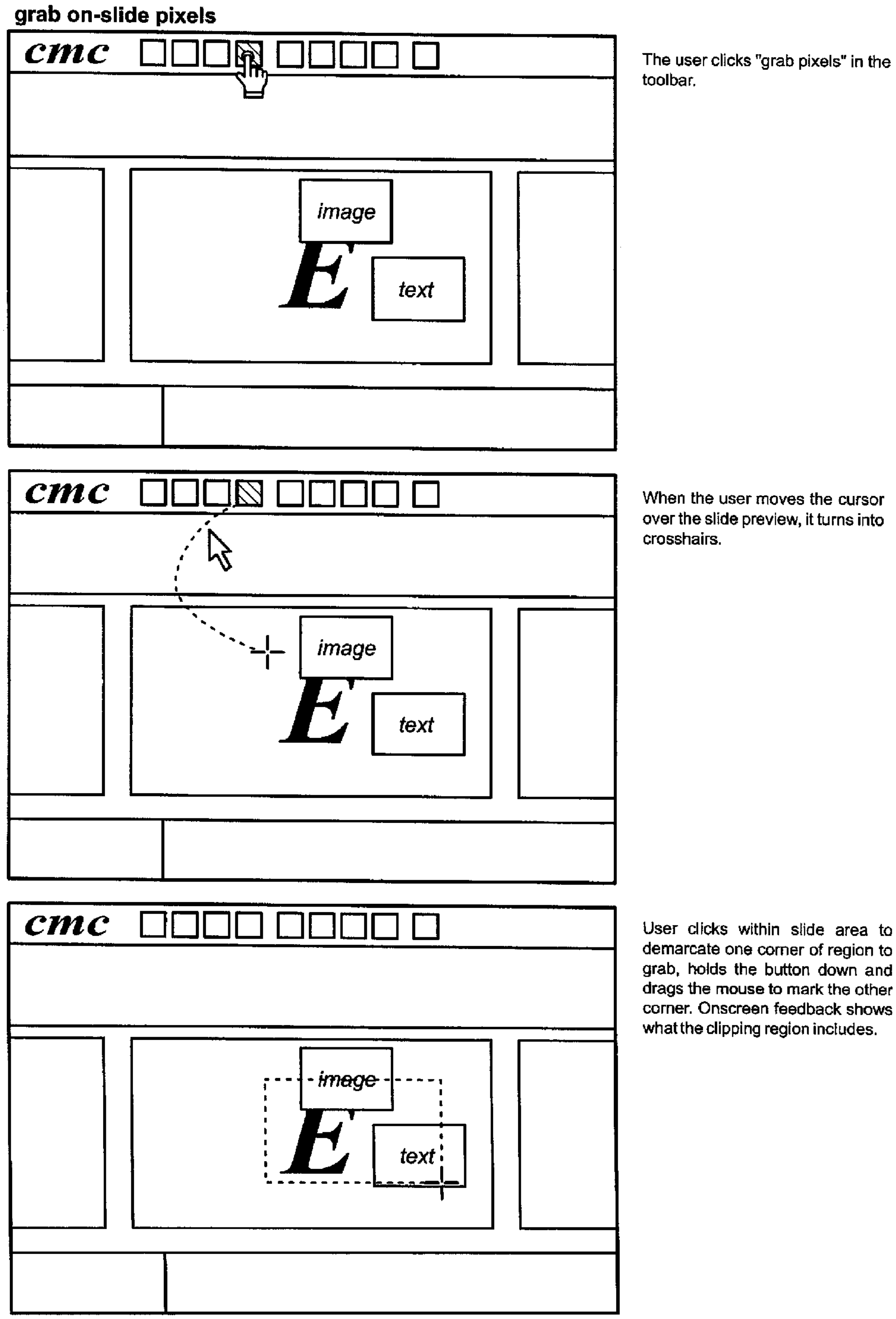

FIGS. 225A and 225B show web client build mode grab on-slide pixel operations, under an embodiment.

FIG. 226 shows web client build mode adjust element transparency operations, under an embodiment.

Figure 227:
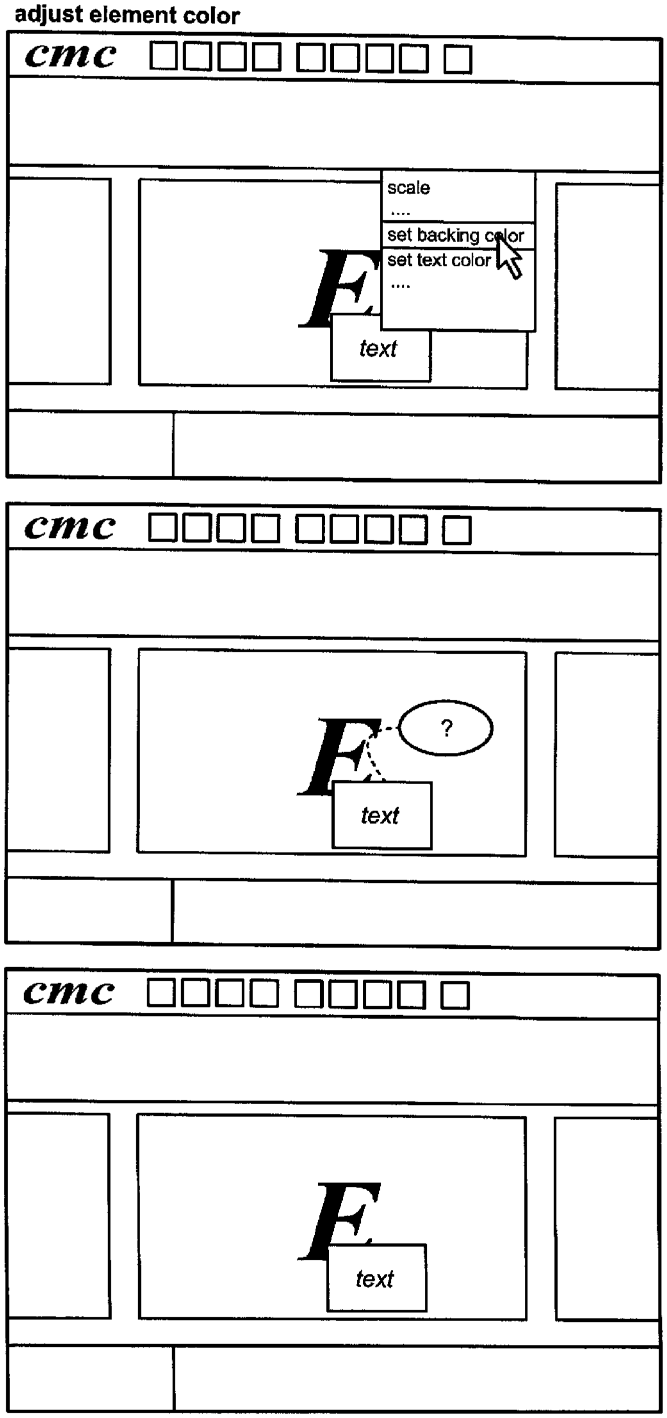

FIG. 227 shows web client build mode adjust element color operations, under an embodiment.

Figure 228:
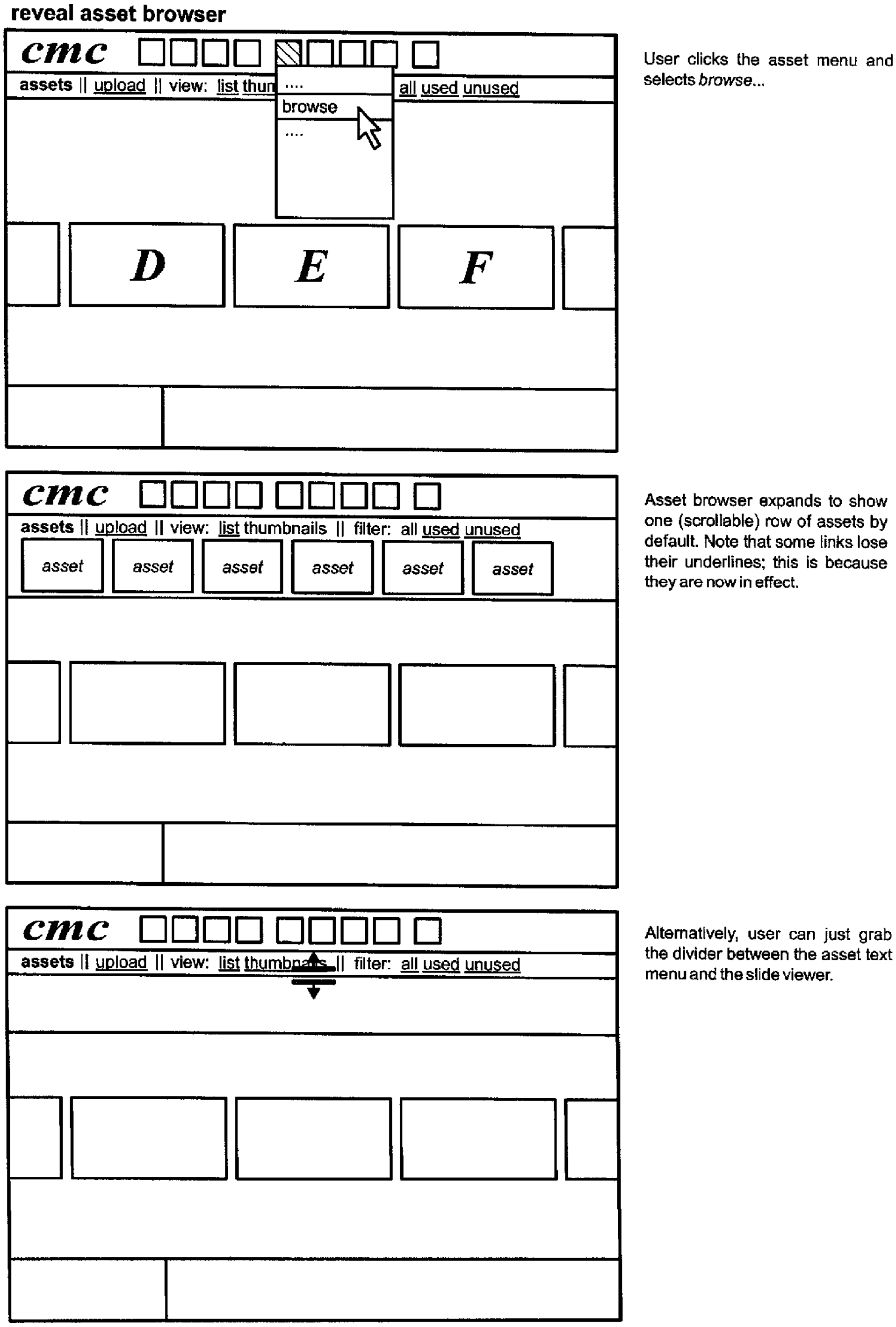

FIG. 228 shows web client build mode reveal asset browser operations, under an embodiment.

FIG. 229 shows web client build mode reveal more asset browser operations, under an embodiment.

Figure 230A:
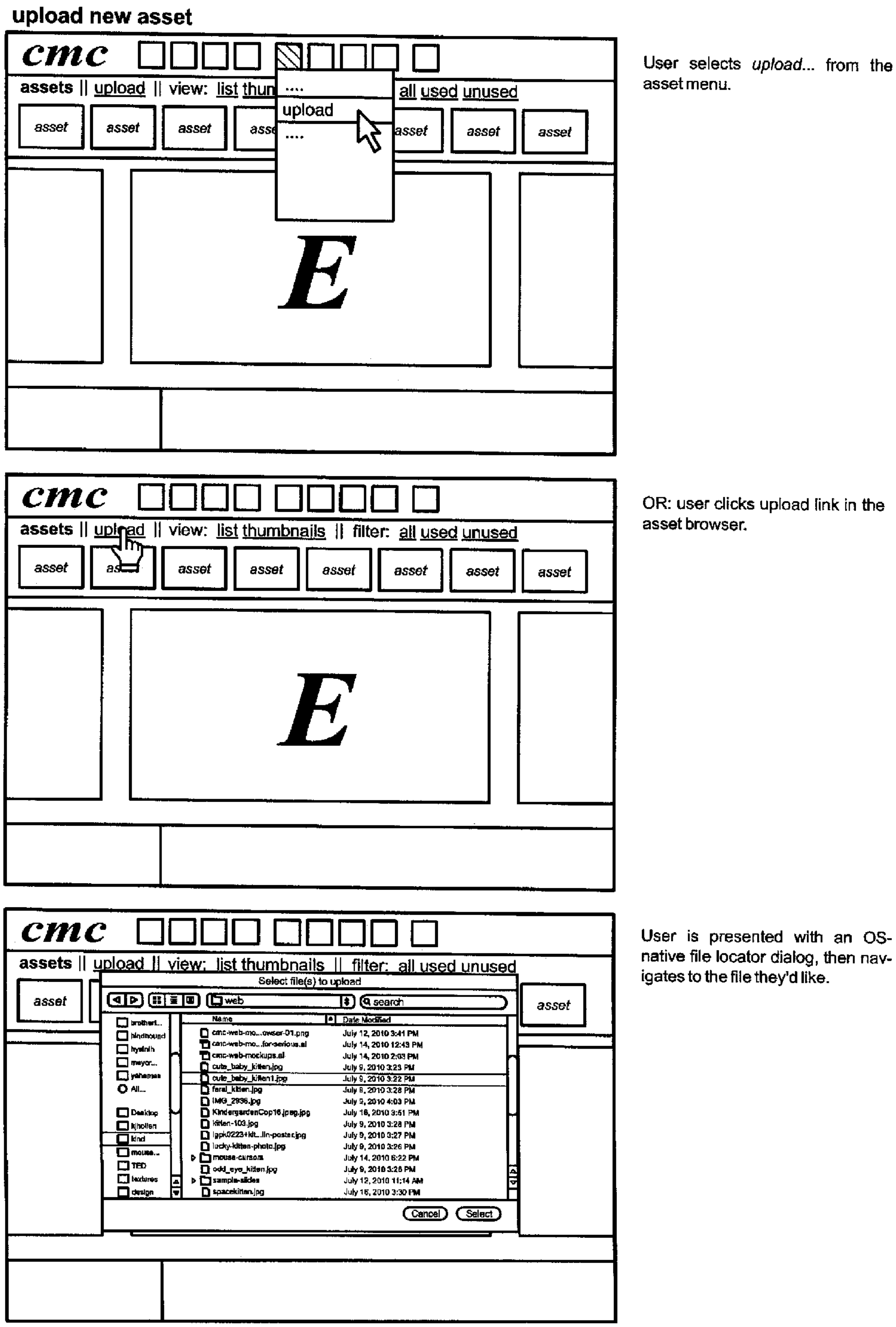
Figure 230B:
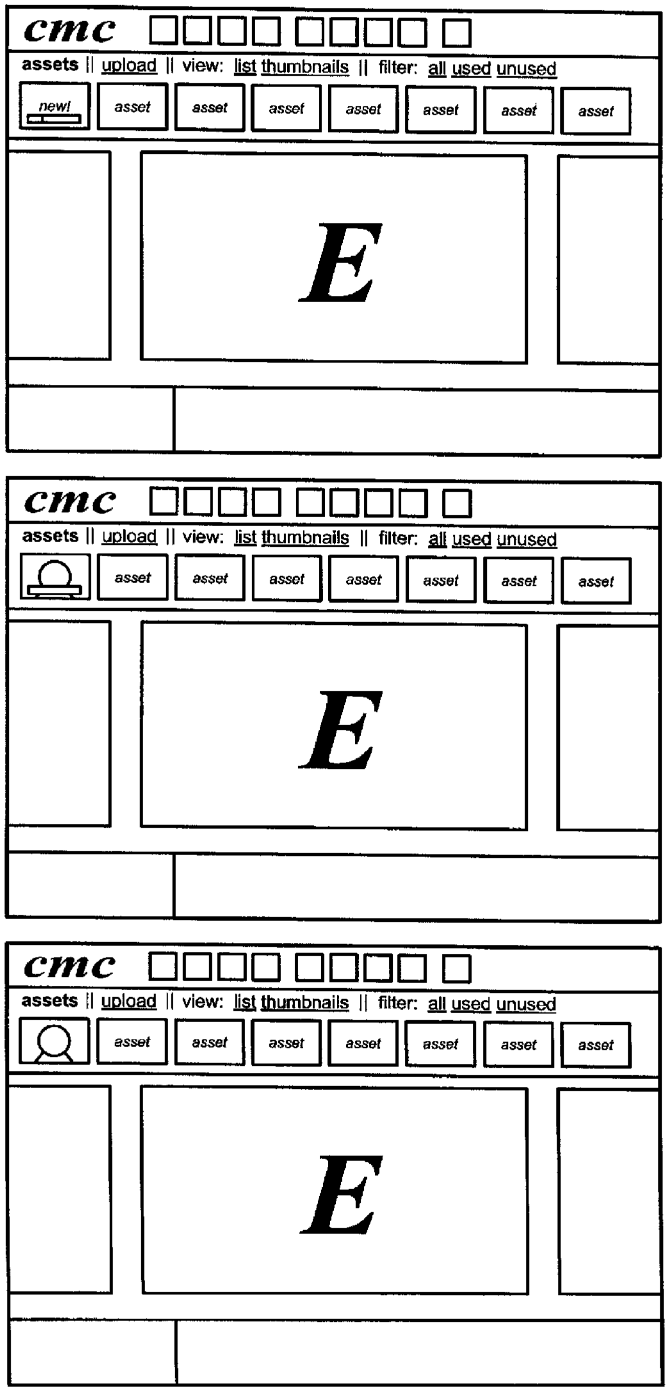

FIGS. 230A and 230B show web client build mode upload new asset operations, under an embodiment.

Figure 231:
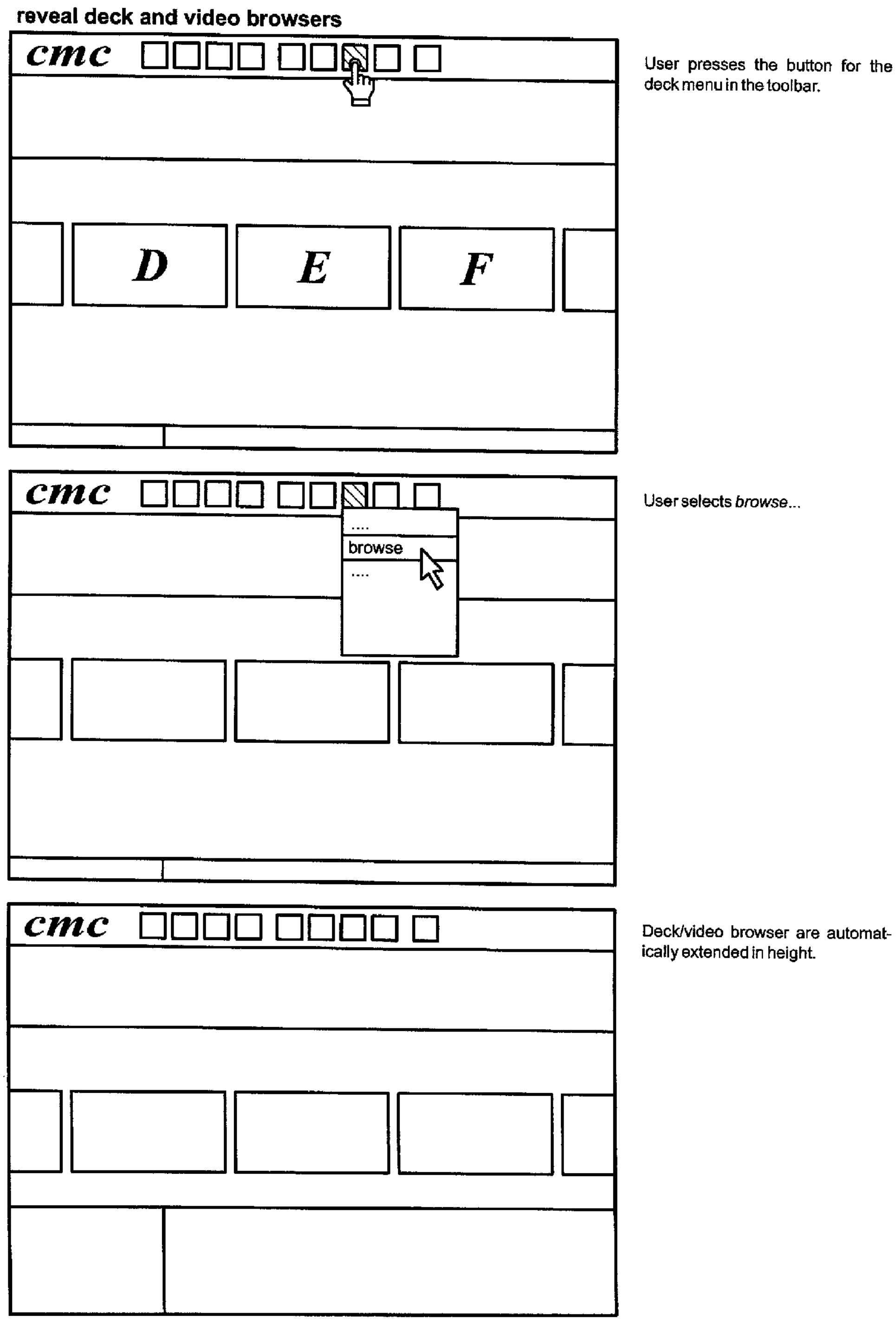

FIG. 231 shows web client build mode reveal deck and video browser operations, under an embodiment.

FIG. 232 shows web client build mode reveal more deck and video browser operations, under an embodiment.

Figure 233B:
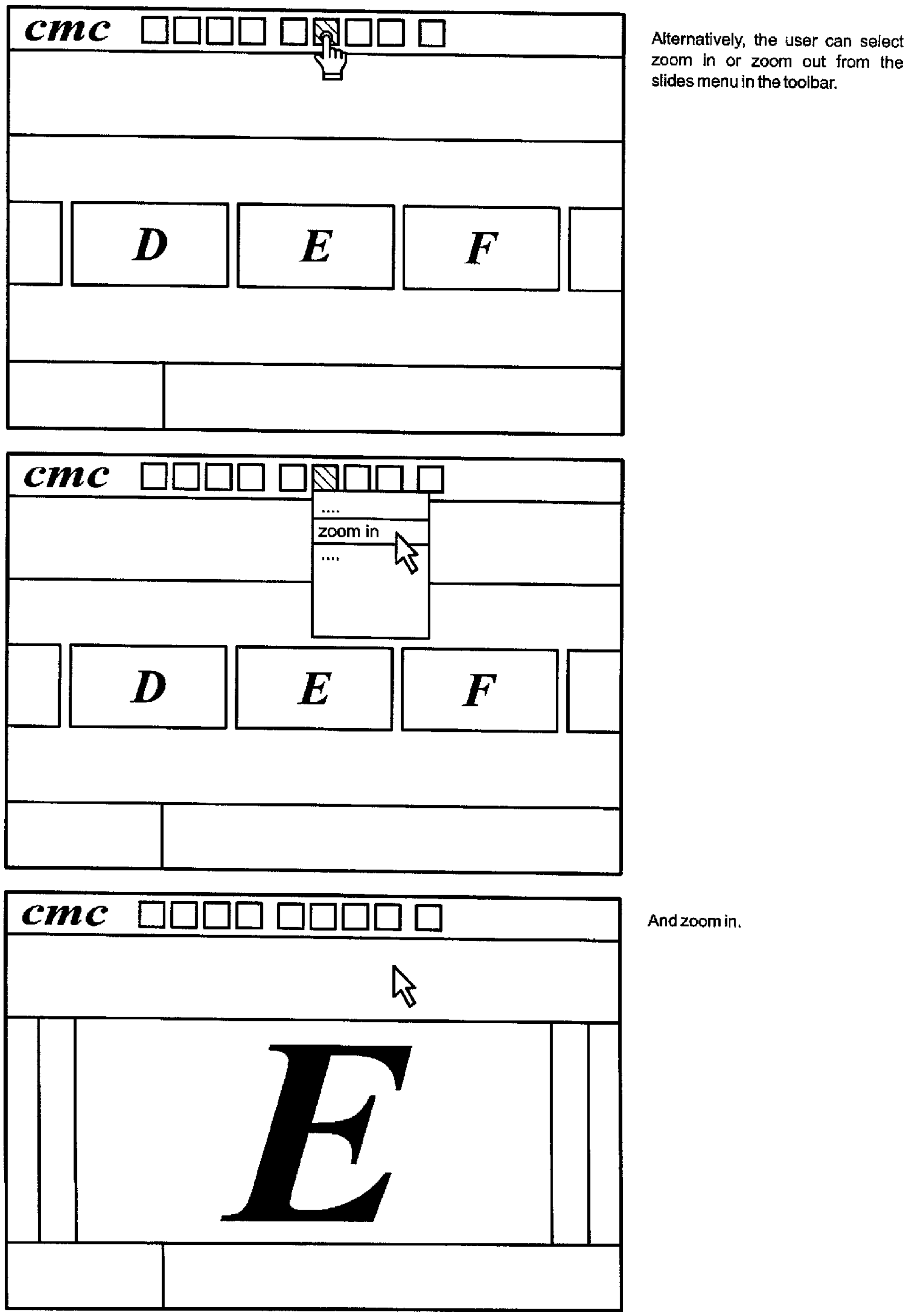

FIGS. 233A and 233B show web client build mode zoom slide viewer area operations, under an embodiment.

FIG. 234 shows web client build mode inspect asset in asset browser operations, under an embodiment.

FIG. 235 shows web client build mode insert asset into slide operations, under an embodiment.

FIG. 236 shows web client build mode insert input into slide operations, under an embodiment.

FIG. 237 shows web client build mode enter slide mode operations, under an embodiment.

Figure 238:
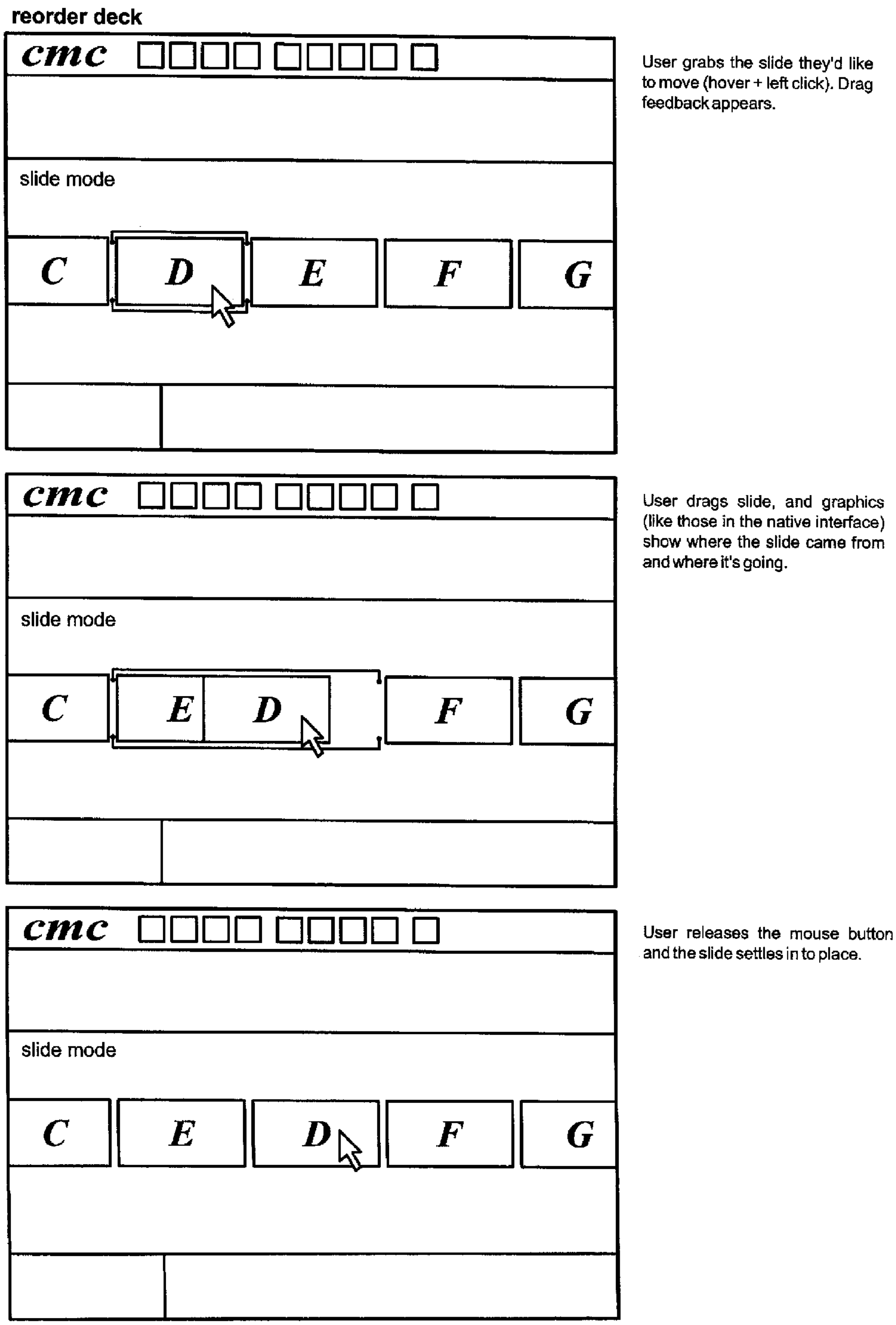

FIG. 238 shows web client build mode reorder deck operations, under an embodiment.

Figure 239:
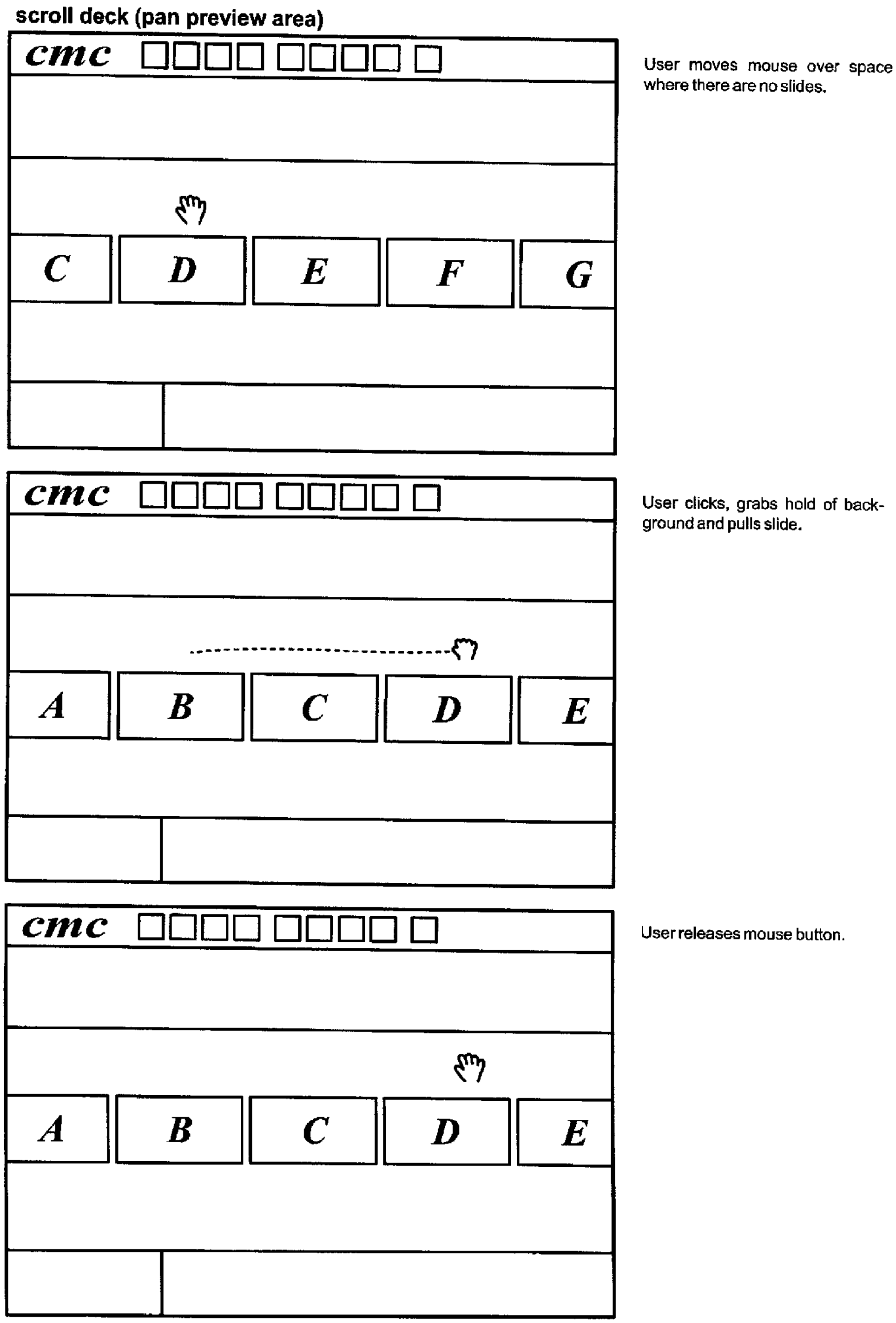

FIG. 239 shows web client build mode scroll deck operations, under an embodiment.

Figure 240:
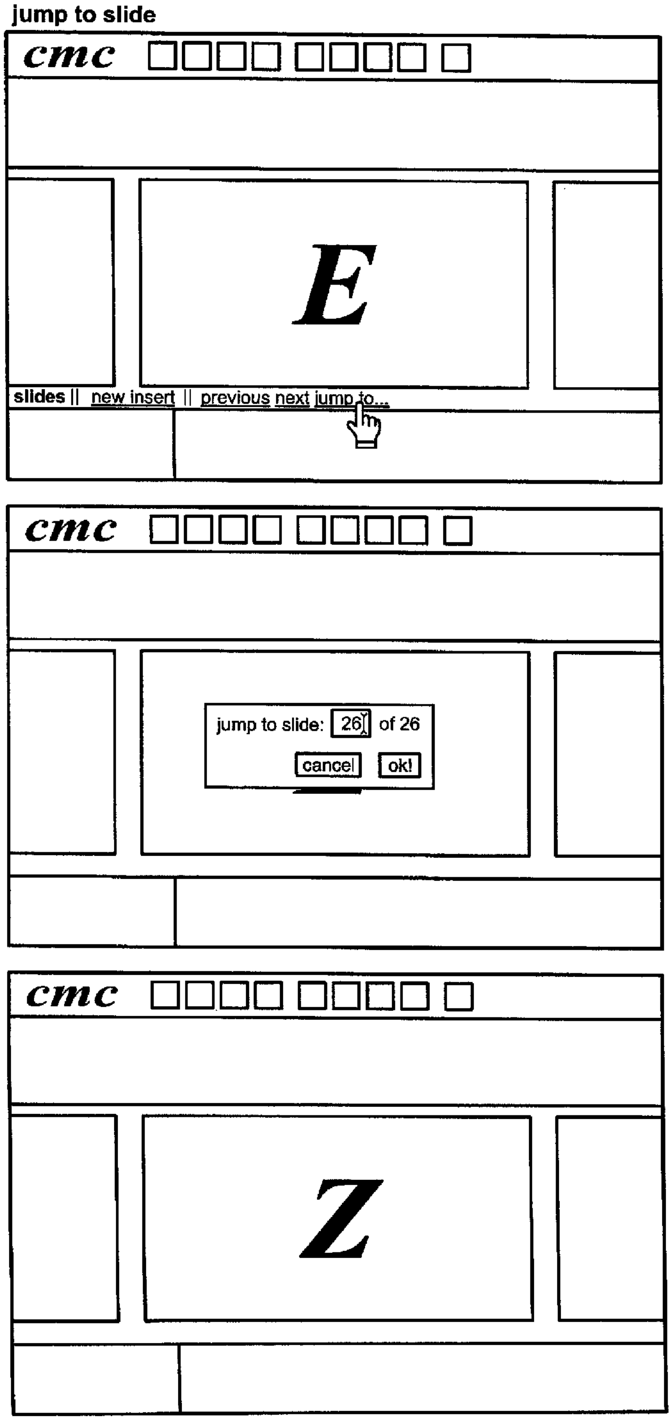

FIG. 240 shows web client build mode jump to slide operations, under an embodiment.

Figure 241:
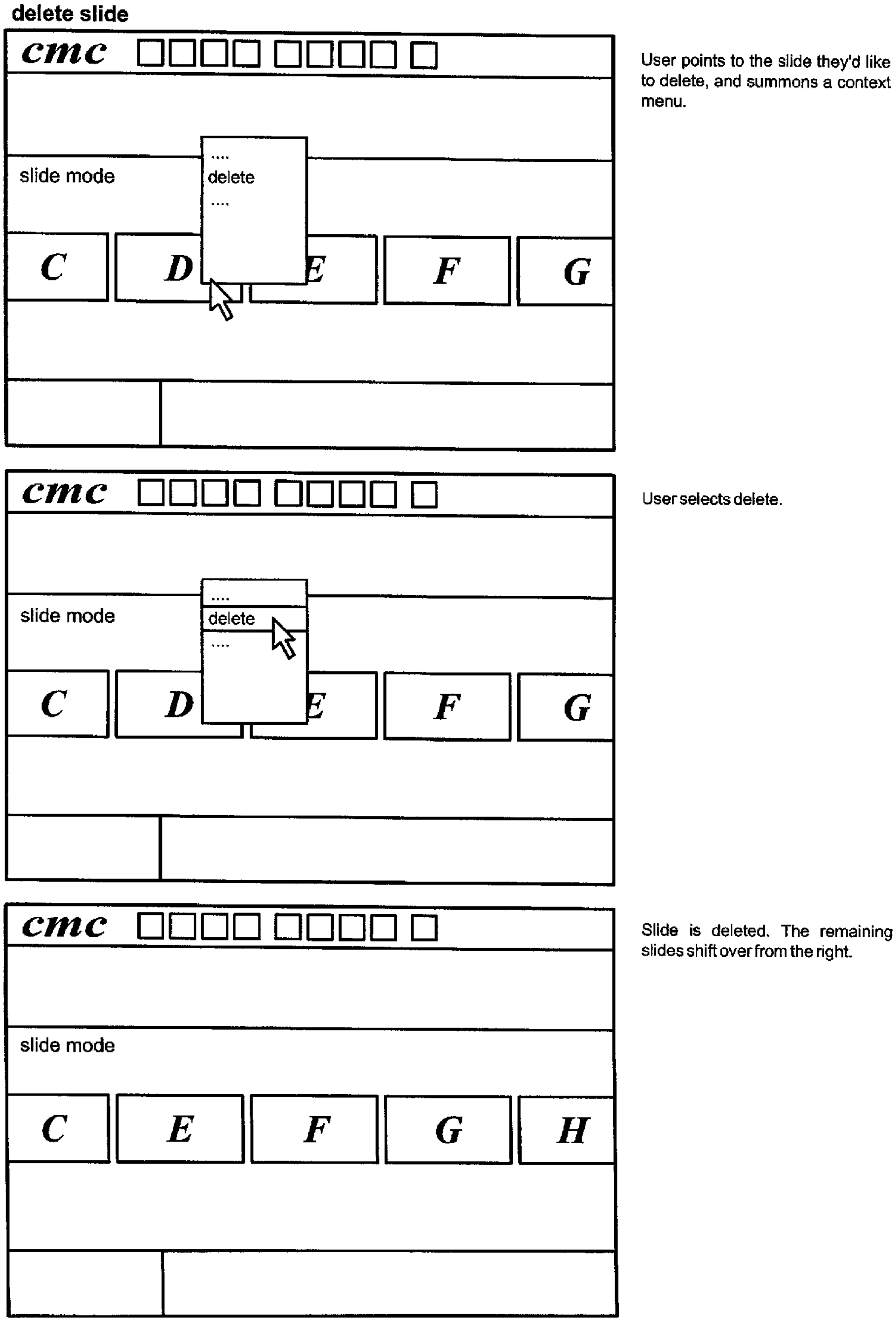

FIG. 241 shows web client build mode delete slide operations, under an embodiment.

Figure 242:
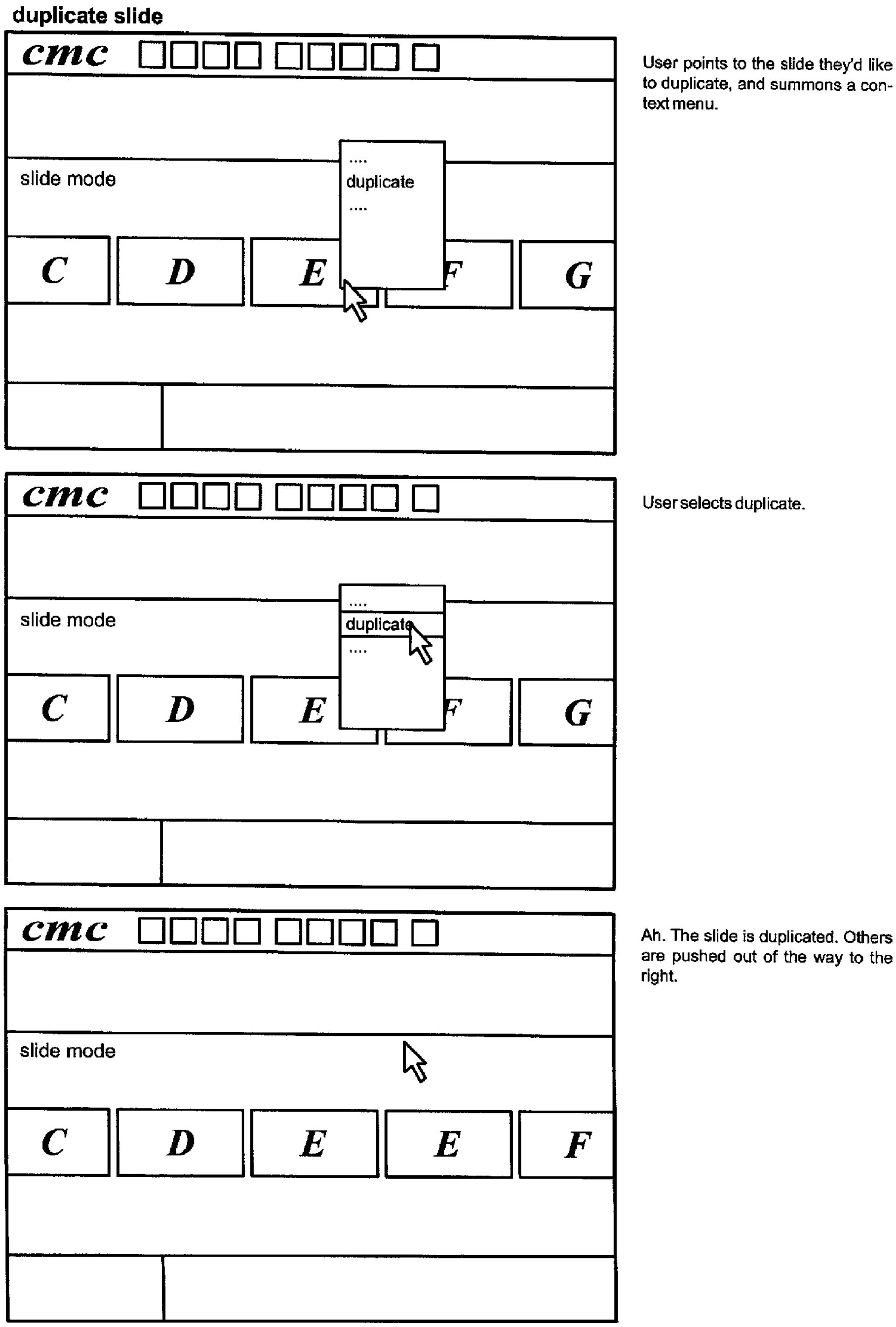

FIG. 242 shows web client build mode duplicate slide operations, under an embodiment.

Figure 243:
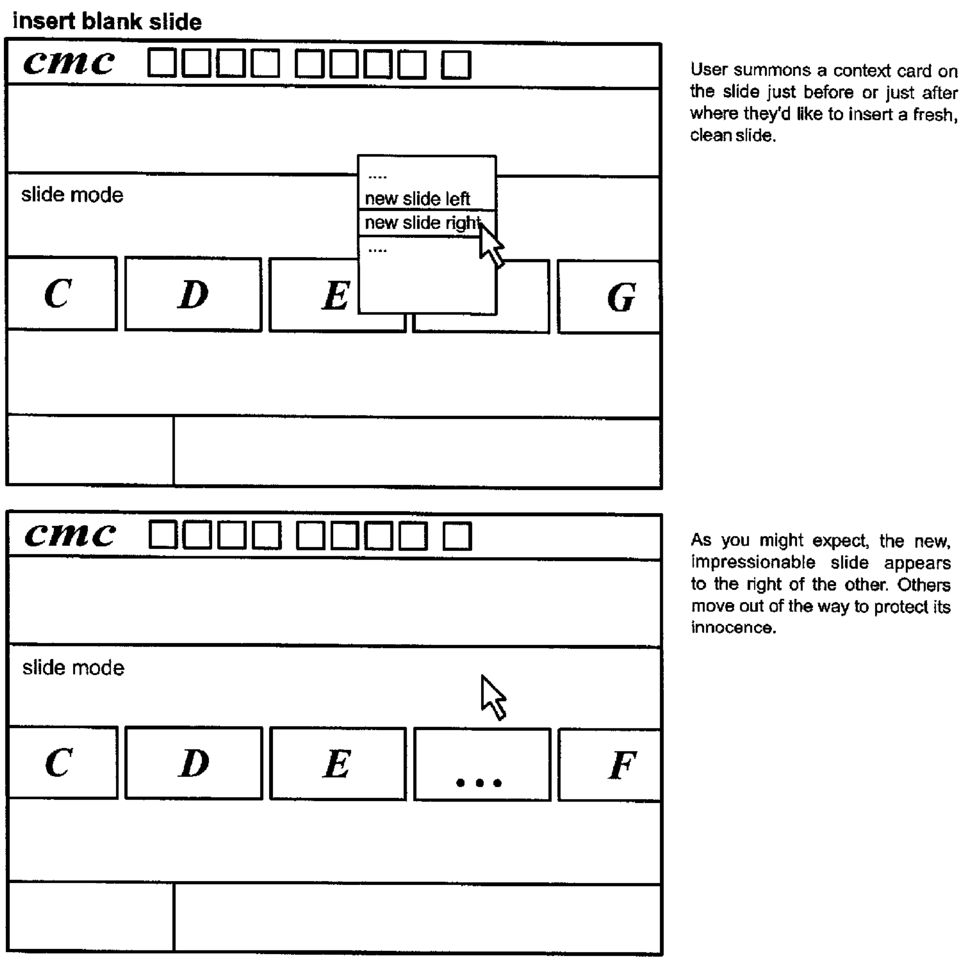

FIG. 243 shows web client build mode insert blank slide operations, under an embodiment.

FIG. 244 shows web client build mode browse other deck operations, under an embodiment.

Figure 245:
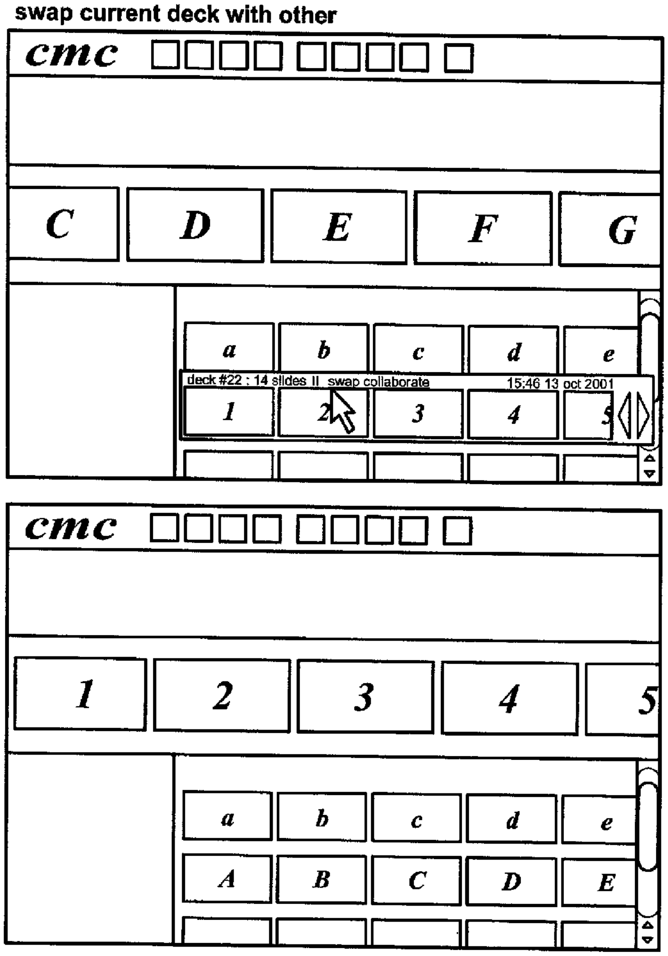

FIG. 245 shows web client build mode swap current deck with other operations, under an embodiment.

FIG. 246 shows web client build mode conflict resolution operations, under an embodiment.

Figure 247:
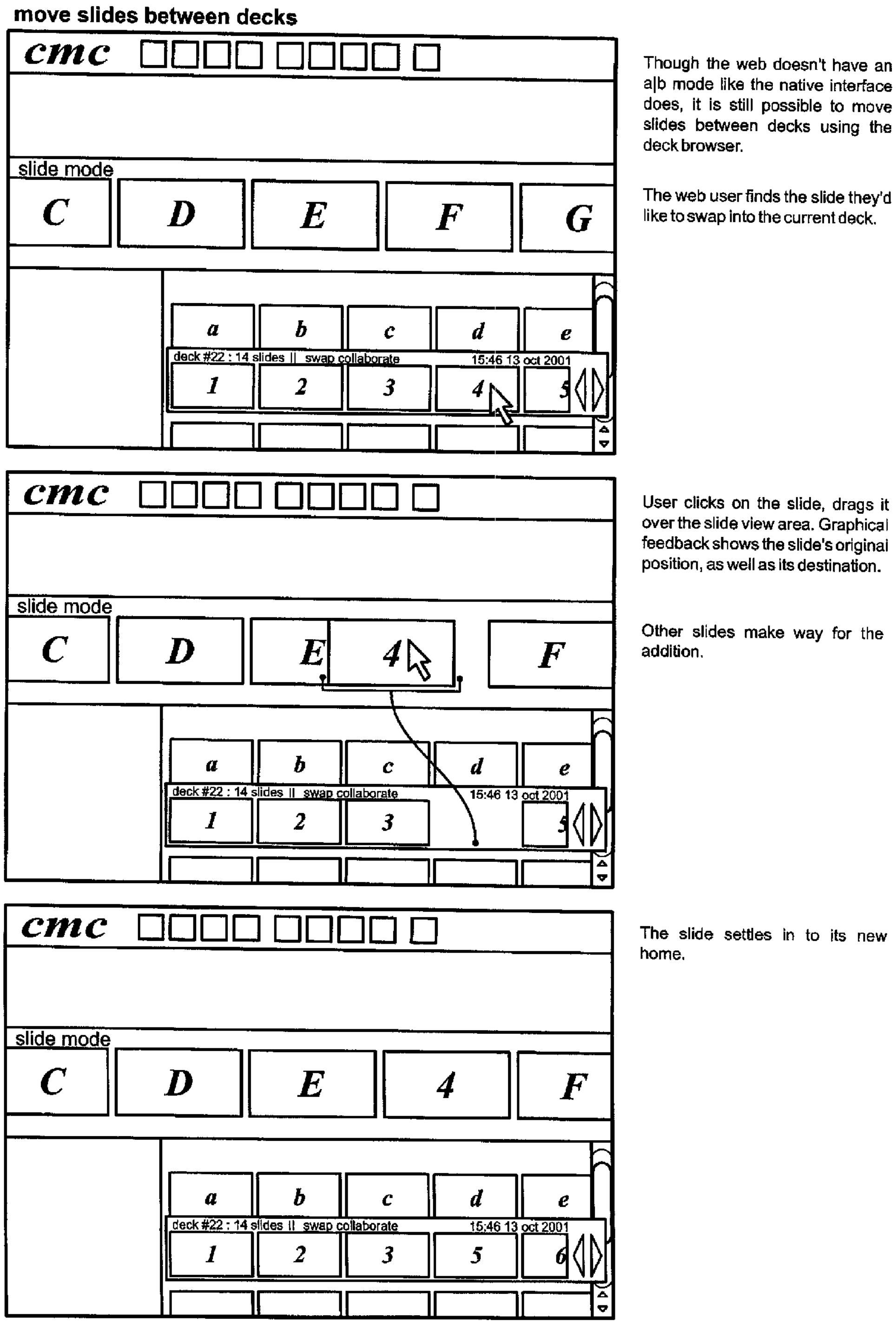

FIG. 247 shows web client build mode move slide between decks operations, under an embodiment.

Figure 248:
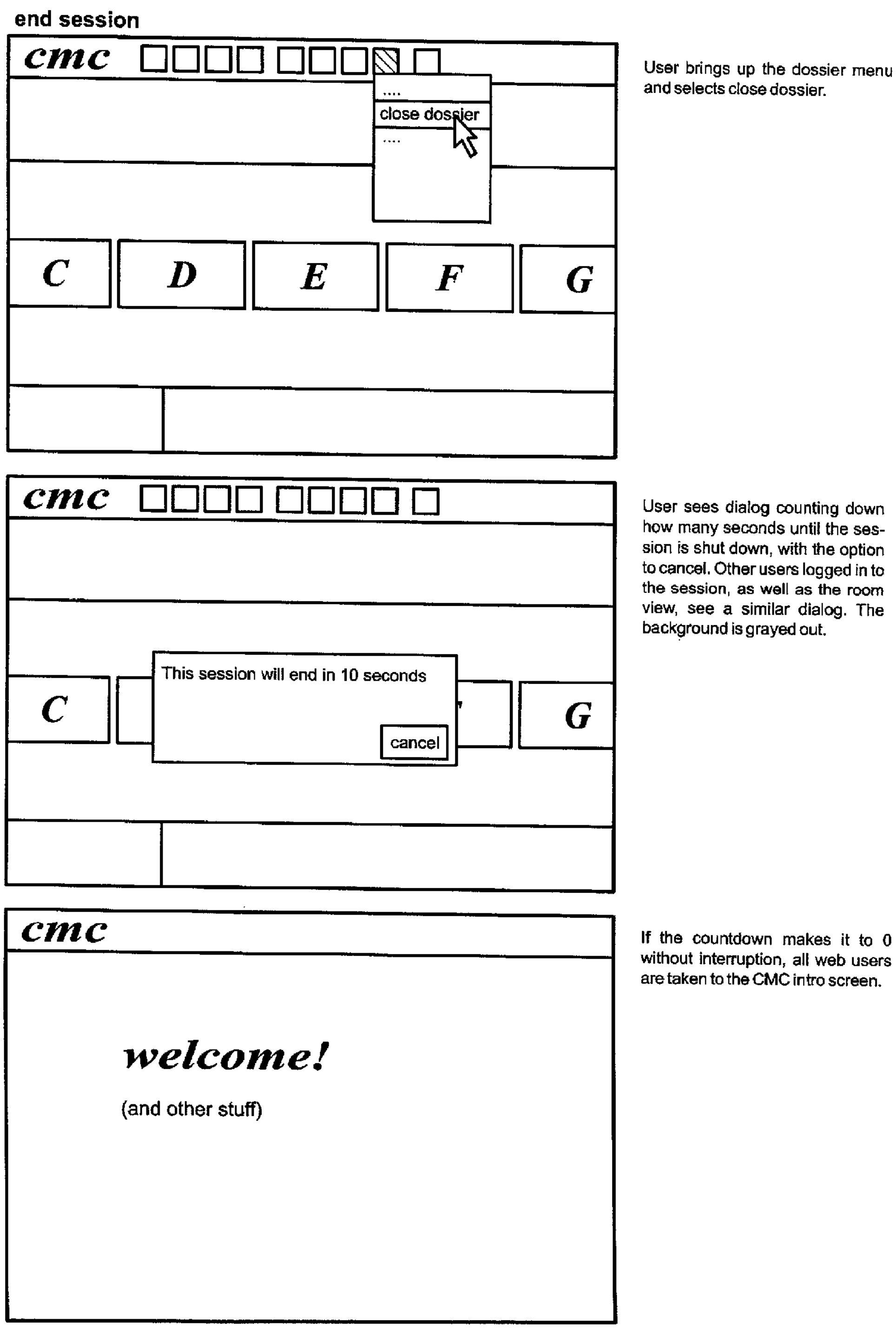

FIG. 248 shows web client build mode session ending operations, under an embodiment.

FIG. 249 shows web client build mode session download slide operations, under an embodiment.

FIG. 250 shows web client build mode session share view operations, under an embodiment.

FIG. 251 shows web client build mode session sync view operations, under an embodiment.

Figure 252:
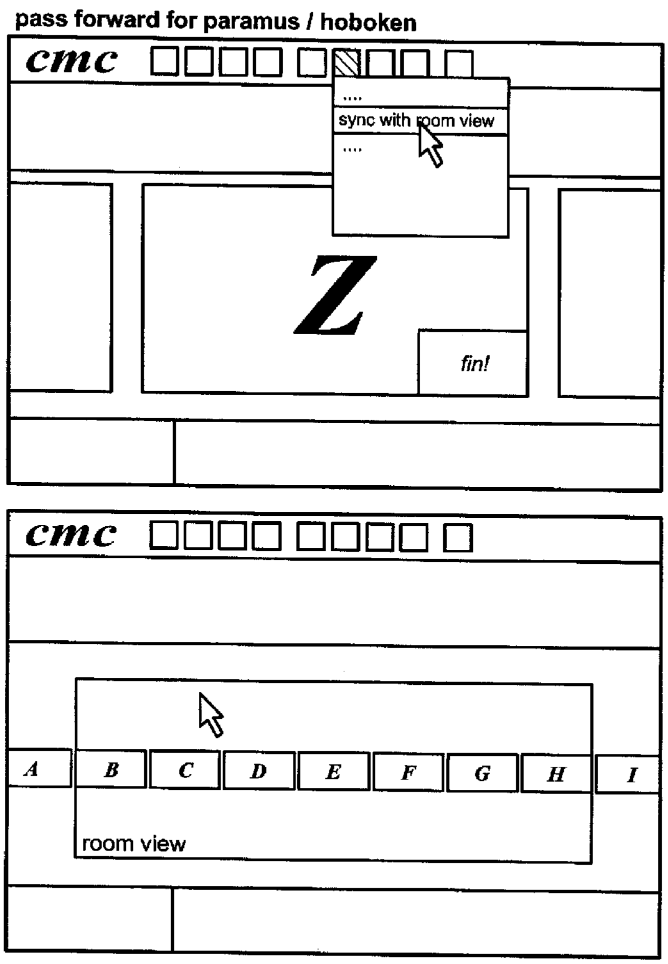

FIG. 252 shows web client build mode session pass forward operations, under an embodiment.

DETAILED DESCRIPTION

SOE Kiosk

Embodiments described herein provide a gestural interface that automatically recognizes a broad set of hand shapes and maintains high accuracy rates in tracking and recognizing gestures across a wide range of users. Embodiments provide real-time hand detection and tracking using data received from a sensor. The hand tracking and shape recognition gestural interface described herein enables or is a component of a Spatial Operating Environment (SOE) kiosk (also referred to as "kiosk" or "SOE kiosk"), in which a spatial operating environment (SOE) and its gestural interface operate within a reliable, markerless hand tracking system. This combination of an SOE with markerless gesture recognition provides functionalities incorporating novelties in tracking and classification of hand shapes, and developments in the design, execution, and purview of SOE applications.

Embodiments described herein also include a system comprising a processor coupled to display devices, sensors, remote client devices (also referred to as "edge devices"), and computer applications. The computer applications orchestrate content of the remote client devices simultaneously across at least one of the display devices and the remote client devices, and allow simultaneous control of the display devices. The simultaneous control includes automatically detecting a gesture of at least one object from gesture data received via the sensors. The gesture data is absolute three-space location data of an instantaneous state of the at least one object at a point in time and space. The detecting comprises aggregating the gesture data, and identifying the gesture using only the gesture data. The computer applications translate the gesture to a gesture signal, and control at least one of the display devices and the remote client devices in response to the gesture signal.

The Related Applications referenced herein includes descriptions of systems and methods for gesture-based control, which in some embodiments provide markerless gesture recognition, and in other embodiments identify users' hands in the form of glove or gloves with certain indicia. The SOE kiosk system provides a markerless setting in which gestures are tracked and detected in a gloveless, indicia-free system, providing unusual finger detection and latency, as an example. The SOE includes at least a gestural input/output, a network-based data representation, transit, and interchange, and a spatially conformed display mesh. In scope the SOE resembles an operating system as it is a complete application and development platform. It assumes, though, a perspective enacting design and function that extend beyond traditional computing systems. Enriched, capabilities include a gestural interface, where a user interacts with a system that tracks and interprets hand poses, gestures, and motions.

As described in detail in the description herein and the Related Applications, all of which are incorporated herein by reference, an SOE enacts real-world geometries to enable such interface and interaction. For example, the SOE employs a spatially conformed display mesh that aligns physical space and virtual space such that the visual, aural, and haptic displays of a system exist within a "real-world" expanse. This entire area of its function is realized by the SOE in terms of a three-dimensional geometry. Pixels have a location in the world, in addition to resolution on a monitor, as the two-dimensional monitor itself has a size and orientation. In this scheme, real-world coordinates annotate properties. This descriptive capability covers all SOE participants. For example, devices such as wands and mobile units can be one of a number of realized input elements.

This authentic notion of space pervades the SOE. At every level, it provides access to its coordinate notation. As the location of an object (whether physical or virtual) can be expressed in terms of geometry, so then the spatial relationship between objects (whether physical or virtual) can be expressed in terms of geometry. (Again, any kind of input device can be included as a component of this relationship.) When a user points to an object on a screen, as noted in the Related Applications and the description herein, the SOE interprets an intersection calculation. The screen object reacts, responding to a user's operations. When the user perceives and responds to this causality, supplanted are old modes of computer interaction. The user acts understanding that within the SOE, the graphics are in the same room with her. The result is direct spatial manipulation. In this dynamic interface, inputs expand beyond the constraints of old methods. The SOE opens up the full volume of three-dimensional space and accepts diverse input elements.

Into this reconceived and richer computing space, the SOE brings recombinant networking, a new approach to interoperability. The Related Applications and the description herein describe that the SOE is a programming environment that sustains large-scale multi-process interoperation. The SOE comprises "plasma," an architecture that institutes at least efficient exchange of data between large numbers of processes, flexible data "typing" and structure, so that widely varying kinds and uses of data are supported, flexible mechanisms for data exchange (e.g., local memory, disk, network, etc.), all driven by substantially similar APIs, data exchange between processes written in different programming languages, and automatic maintenance of data caching and aggregate state to name a few. Regardless of technology stack or operating system, the SOE makes use of external data and operations, including legacy expressions. This includes integrating spatial data of relatively low-level quality from devices including but not limited to mobile units such as the iPhone. Such devices are also referred to as "edge" units.

As stated above, the SOE kiosk described herein provides the robust approach of the SOE within a self-contained markerless setting. A user engages the SOE as a "free" agent, without gloves, markers, or any such indicia, nor does it require space modifications such as installation of screens, cameras, or emitters. The only requirement is proximity to the system that detects, tracks, and responds to hand shapes and other input elements. The system, comprising representative sensors combined with the markerless tracking system, as described in detail herein, provides pose recognition within a pre-specified range (e.g., between one and three meters, etc.). The SOE kiosk system therefore provides flexibility in portability and installation but embodiments are not so limited.

Figure 1B:
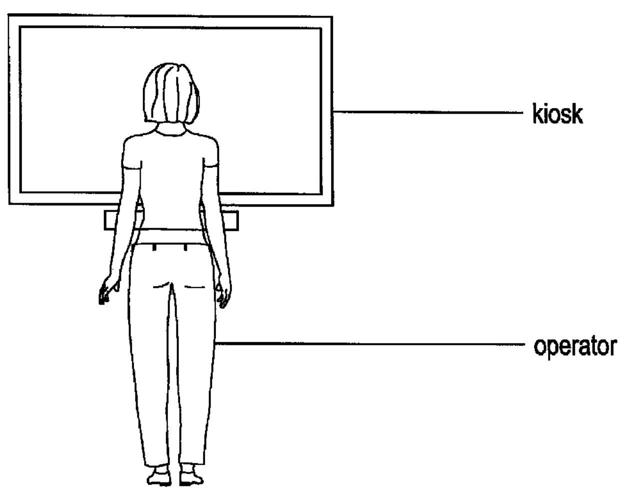
FIG. 1B shows a relationship between the SOE kiosk and an operator, under an embodiment.

FIG. 1A is a block diagram of the SOE kiosk including a processor hosting the gestural interface component or application that provides the vision-based interface using hand tracking and shape recognition, a display and a sensor, under an embodiment. FIG. 1B shows a relationship between the SOE kiosk and an operator, under an embodiment. The general term "kiosk" encompasses a variety of set-ups or configurations that use the markerless tracking and recognition processes described herein. These different installations include, for example, a processor coupled to a sensor and at least one display, and the tracking and recognition component or application running on the processor to provide the SOE integrating the vision pipeline. The SOE kiosk of an embodiment includes network capabilities, whether provided by coupled or connected devices such as a router or engaged through access such as wireless.

Figure 1C:
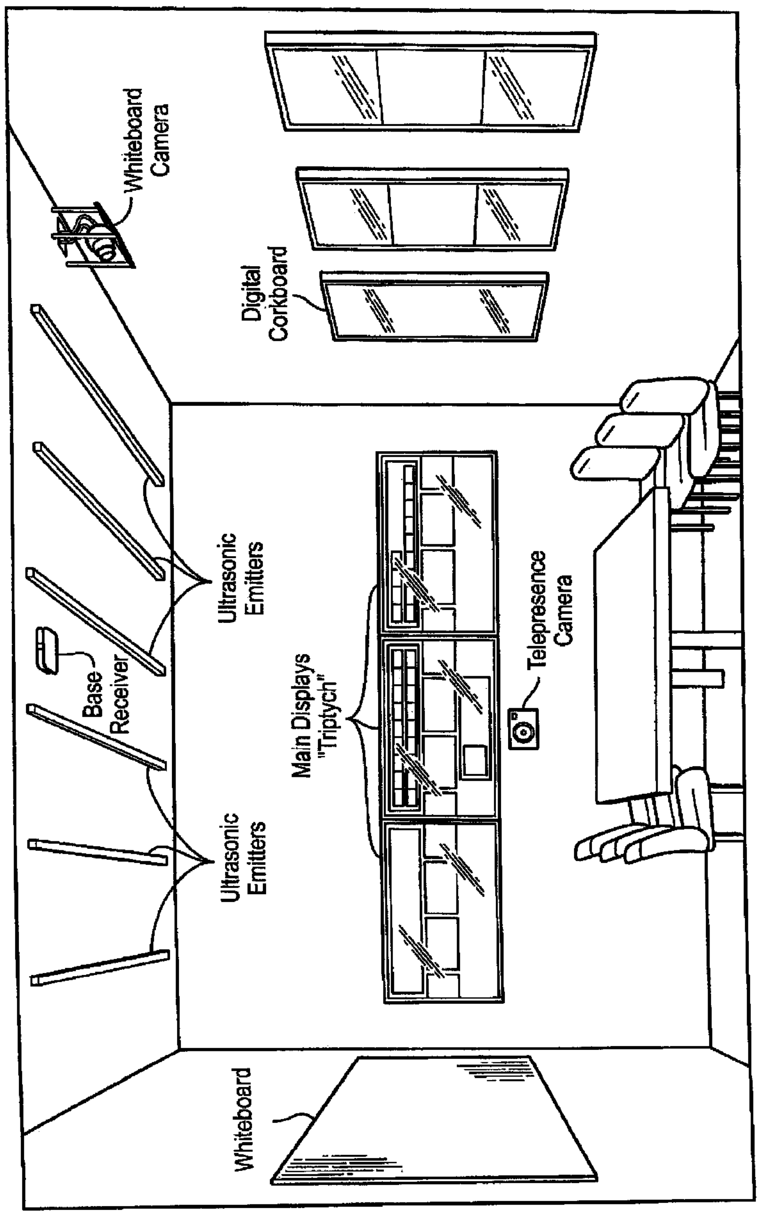
FIG. 1C shows an installation of Mezzanine, under an embodiment.
Figure 1D:
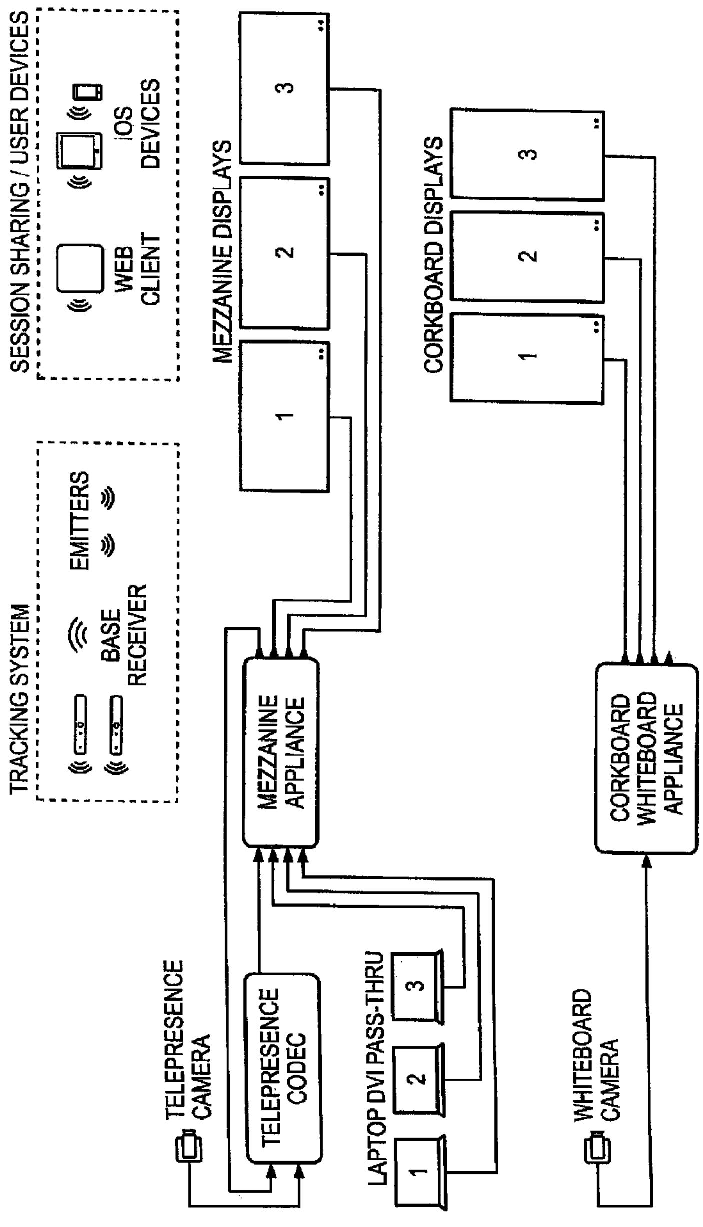
FIG. 1D shows an example logical diagram of Mezzanine, under an embodiment.
Figure 1E:
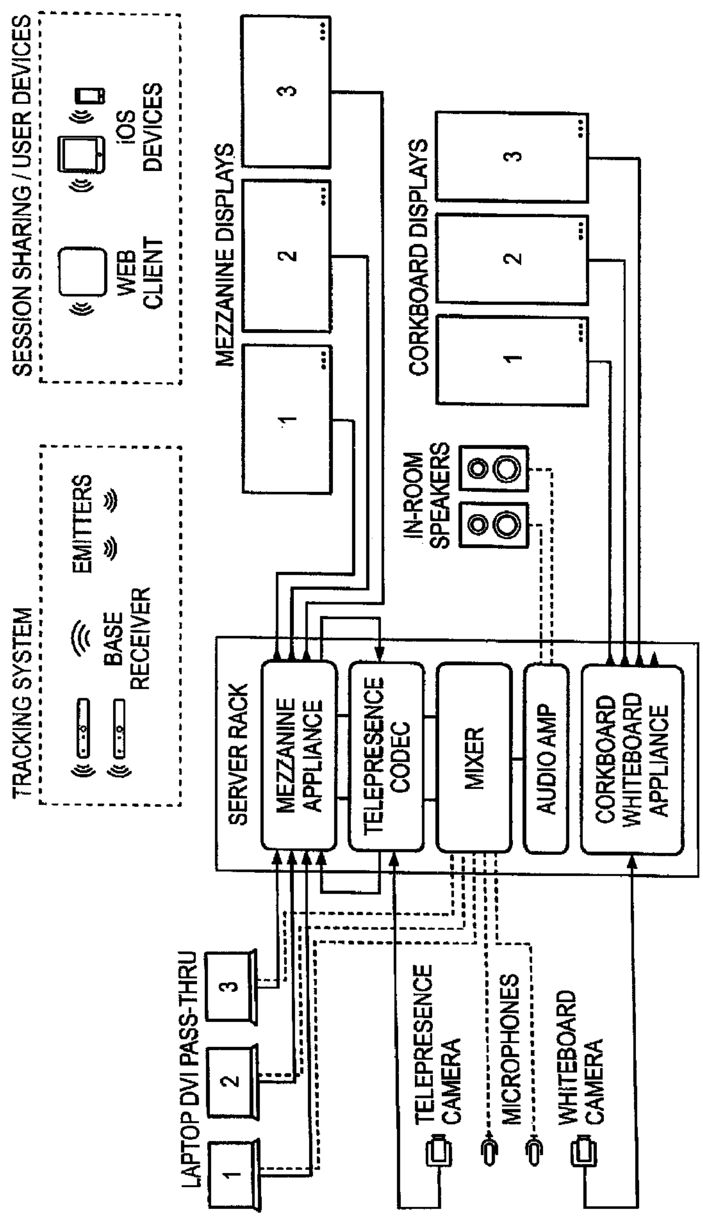
FIG. 1E shows an example rack diagram of Mezzanine, under an embodiment.

The kiosk of an embodiment is also referred to as Mezzanine, or Mezz. Mezzanine is a workspace comprising multiple screens, multiple users, and multiple devices. FIG. 1C shows an installation of Mezzanine, under an embodiment. FIG. 1D shows an example logical diagram of Mezzanine, under an embodiment. FIG. 1E shows an example rack diagram of Mezzanine, under an embodiment.

Mezzanine includes gestural input/output, spatially conformed display mesh, and recombinant networking, but is not so limited. As a component of a Spatial Operating Environment (SOE), Mezzanine enables a seamless robust collaboration. In design, execution, and features it addresses a lack in the traditional technologies not limited to "telepresence," "videoconferencing," "whiteboarding," "collaboration," and related areas. The capabilities of Mezzanine include but are not limited to real-time orchestration of multi-display settings, simultaneous control of the display environment, laptop video and application sharing, group whiteboarding, remote streaming video, and remote network connectivity of multiple Mezzanine installations and additional media sources.

Mezzanine includes gestural input/output, spatially conformed display mesh, and recombinant networking (without being limited to these).

With reference to FIGS. 1C-1E, the Mezz system and method of collaborative technology comprises a workspace across multiple screens, multiple users, and multiple devices. It repurposes the high-definition display(s) in any conference room into a shared workspace and, as such, allows real-time orchestration of multi-display settings, and enables simultaneous control of the display environment, laptop video and application sharing, and group whiteboarding. Multiple users, on a variety of devices, can present and manipulate image and video assets on the room's shared screens. A user controls the system through multi-modal input devices (MMID) (see, Related Applications), a browser-based client, and participants' own iOS and Android devices. When laptops are coupled or connected into Mezz, those desktops' pixels appear on the display triptych and can be moved, resealed, and integrated into the session's workflow. A participant can then 'reach through' a collaborative screen to interact directly with applications running on any connected laptop. An embodiment also supports collaboration between multiple Mezz systems.

Built on top of a Spatial Operating Environment (SOE) as described in detail herein, Mezz includes gestural input/output, spatially conformed mesh, and recombinant networking (without being limited to these). In design, execution, and features it addresses a lack in the traditional technologies not limited to "telepresence," "videoconferencing," "whiteboarding," "collaboration," and related areas.

Generally, a user uploads electronic assets (e.g., image, video, etc.) to Mezz. These assets are organized into a dossier, which is not unlike a file. A dossier, which comprises a working session in Mezz, can include image assets, video assets, and also a deck. A deck is an ordered collection of slides, where a slide is an asset. The portal is a collection of dossiers. To manipulate these application elements including assets, slides, and dossier, a user engages in actions such as create, open, delete, move, scale, reorder, rename, duplicate, download, and clear. Mezz includes components that are specific types of containers for asset display and manipulation, and it also includes a whiteboard and corkboard for asset use. A user is either in the portal or in a dossier. Mezz control is afforded through a Multi-Modal Input Device (MMID), a web-based client, an iOS client, and/or an Android client to name a few. Mezz functionality of an embodiment includes but is not limited to triptych, portal, dossier, paramus, hoboken, deck, slide, corkboard, whiteboard, wand control, iOS client, and web client, and functions include but are not limited to uploading assets, inserting, reordering and deleting slides comprising a deck; capturing whiteboard inputs, and reachthrough.

Mezz is built on top of a platform referred to as "g-speak", described in the Related Applications. Its core functional components, some of which are documented in the Related Applications, include: multi-device, spatial input and output; Plasma networking and multi-application support; and a geometry engine that renders pixels across multiple screens with real-world spatial registration. More specifically, Mezzanine is an ecosystem of processes and devices that communicate and interact with each other in real time. These separate modules communicate with each other using Plasma, described herein. As described in detail herein and in the Related Applications, Plasma is a framework for time-based intra-process, inter-process, or inter-machine data transport.

At the architectural level, Mezz refers to the yovo application that is responsible for rendering elements to the triptych, handling inputs from input devices and other devices, and maintaining overall system state. The yovo application is assisted by another yovo process called the Asset Manager that transforms images received from other devices, called Clients. Clients are broadly defined as non-yovo, non-Mezz devices that couple or connect to Mezz. Clients include the mezz web application and mobile devices that support the iOS or Android platforms.

An embodiment of Mezz comprises a hardware device coupled or connected to components including but not limited to: a tracking system; a main display screen, referred to as "triptych" in an embodiment; numerous video or computer sources; network port; a multi-modal input device; digital corkboards; whiteboard. The tracking system provides spatial data input. In an embodiment a tracking system is the Intersense IS-900 tracking system but is not so limited. Another embodiment uses an internal PCI version of the IS-900 but is not so limited.

Output ports (e.g., DVI, etc.) of the hardware device couple or connect one or more displays (e.g., two, four, etc.) as the main display screen/triptych. In an example embodiment, three 55" displays are installed adjoining one another, comprising one "triptych." Alternative embodiments support horizontal and vertical tiling of displays, each up to 1920×1280 resolution, for example.

Input ports (e.g., DVI, etc.) couple or connect to numerous video/computer sources (e.g., two, four, etc.). In an embodiment one gigabit Ethernet network port is provided to allow couplings or connections to remote streaming video sources and interaction with applications running on the connected computers. Numerous spatial wands or input devices are also supported.

Mezz is characterized by different feld configurations. The term "Feld" as used herein refers to an abstract idea of a usually planar display space, used to generalize the idea of a screen. In a broad sense, it is a demarcated region of interest, in which graphical constructs and spatial constructs can be placed. VisiFeld is the rendering version.

For example, a user may hope to use Mezzanine in a smaller room. For every large conference room an organization of any size has, that same entity also has many rooms and offices, which physically may not accommodate a full triptych installation. A single-feld Mezzanine gives users more options. Furthermore, it saves an organization from having to invest in different types of display and communication infrastructure. It also ensures that all of its technology can collaborate seamlessly. For instance, an executive with a single-feld Mezzanine in her office could join a collaboration with a full triptych Mezzanine in a larger conference room. Support for mixed-geometry collaborations is essential to the needs of these users.

A second example concerns price flexibility. A single-feld Mezz provides options to smaller organizations that may have interest in Mezzanine and the features it provides.

A third example involves big pixel displays. Some companies have already invested heavily in the installation of "big pixel displays"—custom display technology designed to fill entire walls with pixels. These configurations may have widely varying resolutions, as well as diverse aspect ratios. These companies often have lots of data to visualize, from many sources, but the configuration of sources to show is cumbersome and inflexible. Mezz, in addition to maximizing the use of their investment, adds additional flexibility, reduces IT overhead, and introduces the possibility of collaboration.

Mezz support includes triptych, uniptych, and polyptych geometries. The triptych is a standard Mezzanine configuration and, as described, its attributes include three displays, coplanar, 16:9 aspect ratios, 48:9 combined aspect ratio, 55" display only, and same-size bezel and mullions.

"Uniptych" is a term for the single-feld display that retains its association with an "iptych" family of geometry definitions. Correspondingly, the specification may use to "off-iptych" to refer to regions of space that lie beyond the bounds of the workspace felds, regardless of their number. It comprises a single display, a range of display sizes between 45" and 65," and 16:9 aspect ratio, however in alternative embodiments the aspect ratio is variable. "Polyptych" is a term for the multi-feld display that retains its association with an "iptych" family of geometry definitions Mezz provides applications that run natively. An embodiment includes numerous applications as follows. A Web Server application enables a user to connect to Mezz through a web browser to control and configure the CMC. Example interactions include setting the resolution on the output video ports, configuring the network settings, controlling software updates and enabling file transfers. It can be referred o as the "web client." iOS and Android applications enable a user to connect to Mezz through a mobile device of the iOS or the Android platform to control the system. A Calibration application is an application that allows a user to calibrate a newly or already installed system and also allows a user to verify the calibration of a system.

Mezz also includes an SOE Window Manager application that enables users to interact in real-time with displayed windows, applications and widgets using gestural or wand control. The users may select, move and scale windows, or directly interact with the individual applications. This application includes a recording capability where layouts can be saved and restored.

A Video Passthrough application creates windows in the Window Manager of locally connected live video sources. If these feeds are from connected computers, the application enables passthrough control of events from wand/big screen to control input on the connected small screen. It is referred to as "passthrough."

A Whiteboard application integrates whiteboard functionality into the window manager. This includes web control of the presentation screen and windows from a connected computer through the web browser. A proxy application, known as "pass-forward" or "passforward," is easily installed on a laptop or desktop and enables applications running on that device to be controlled on the Mezz command wall through a proxy widget when the device is coupled or connected to Mezz through DVI and Ethernet.

The Mezz environment enables multiuser collaboration across a variety of device as described in detail herein. In an example embodiment, the triptych is the heart of Mezz, and in this example comprises three connected screens at the center of the Mezz user experience, allowing users to display and manipulate graphic and video assets. The Mezz screens are named by their position in the triptych (e.g., left, center, right).

The triptych can be used in two modes: fullscreen and pushback mode. Fullscreen mode can also be thought of as 'presentation' mode, and pushback mode as 'editing' mode. These names do not strictly define their functions, but act as a general guide as to how they might be used. The Mezz wand can be used to switch between modes as well as manipulate objects in the Mezz environment. Mezz's primary control device is the wand, but it can also be controlled via a web browser client and an iOS device to name a few. Furthermore, any combination of these devices may be used simultaneously. Some functions such as dossier naming are performed using the web browser client or a connected iOS device.

Mezz of an embodiment comprises corkboards and a whiteboard. Corkboards are additional screens beyond the Mezz triptych, and can be used to view additional assets. The whiteboard is an area that can be digitally captured by Mezz by pointing the wand at the whiteboard area and pressing the wand button. Captured image assets immediately appear in the asset bin.

The wand is a primary means of controlling the Mezz environment in an embodiment. Mezz tracks the position and orientation of the wand extremely accurately in three-dimensional (3D) space, allowing precise control of objects and mode selection within the Mezz environment. Mezz tracks multiple wands simultaneously; each wand projects a pointer when aimed at a display controlled by Mezz. Each pointer appearing in the Mezz environment has a color-coded dot associated with it, allowing participants in the Mezz session to know who is performing a particular task. Coupled with a number of innovative gestures, the wand has a single button used to perform all Mezz functions.

Figure 1F:
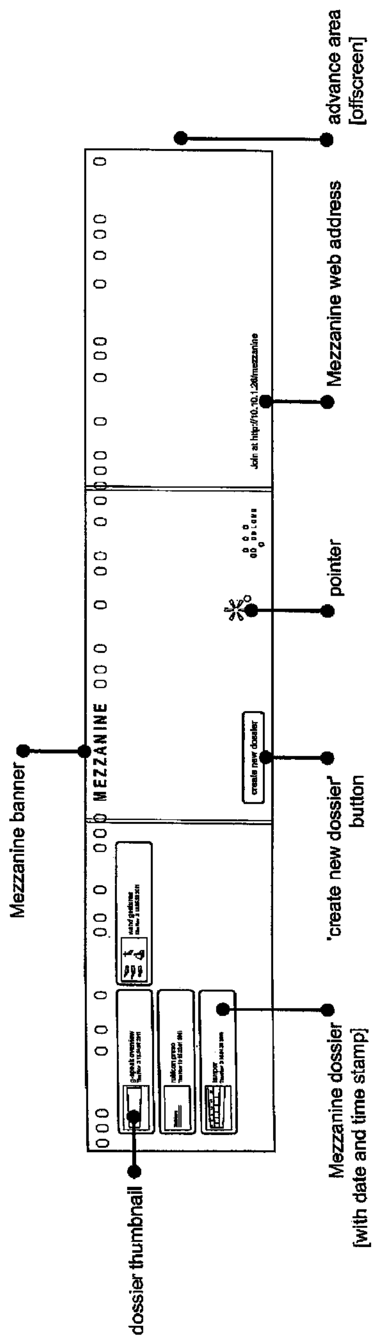
FIG. 1F is a block diagram of a dossier portal of Mezz, under an embodiment.

FIG. 1F is a block diagram of a dossier portal of Mezz, under an embodiment. In operation, open a dossier to start working with Mezz. The dossier portal shows a list of all available dossiers that can be opened within the Mezz environment. Selecting (e.g., clicking) a dossier open the dossier, and clicking and holding the selector exposes duplication and deletion functionality. Mezz is either in the dossier portal, or in a dossier itself. Each dossier shows a time stamp from the last time it was edited. A thumbnail from the dossier appears to the left of the name. The right screen shows the 'create new dossier' button; click it to create a new, blank Mezz dossier. Click the new, blank dossier to open it. Dossier naming of an embodiment is done using the web client or a connected iOS device but is not so limited. The right screen shows the web address used to connect to a Mezz session with a supported web browser.

Figure 1G:
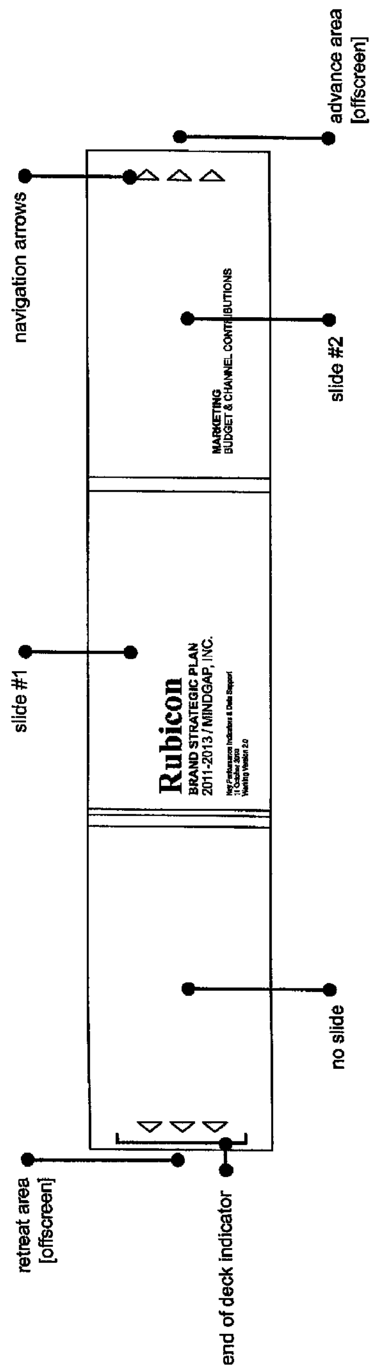
FIG. 1G is a block diagram of a triptych (fullscreen) of Mezz, under an embodiment.

FIG. 1G is a block diagram of a triptych (fullscreen) of Mezz, under an embodiment. Fullscreen mode is often used to give presentations. Fullscreen mode is the "zoomed in" view of the Mezz environment. Use the pushback gesture to toggle between fullscreen and pushback modes. Advance the deck by pointing the wand offscreen to the right and clicking the button. Retreat the deck by pointing the wand offscreen to the left and clicking the button. Slides in the slide deck can be reordered by dragging them left or right. Once a slide has been dragged to nearly cover another slide's position, the displaced slide snaps to the moved slide's original position.

Figure 1H:
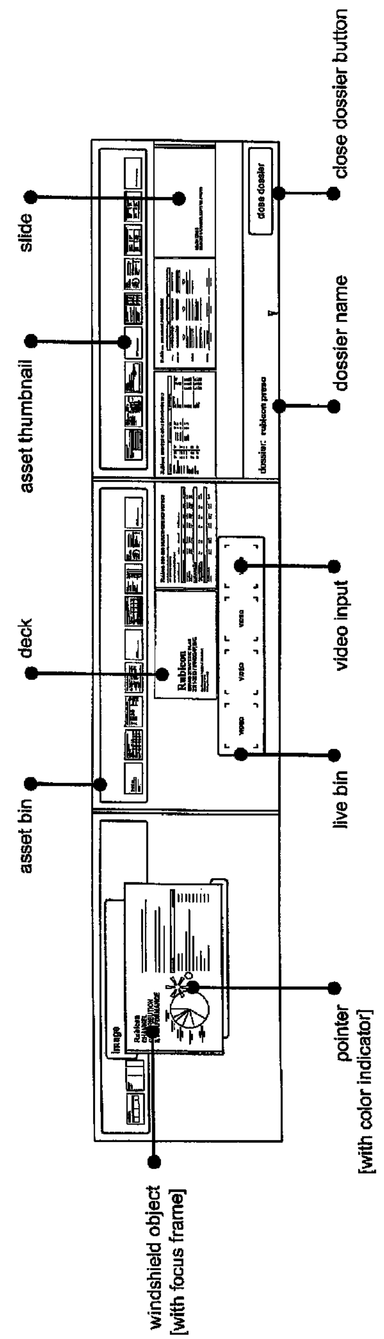
FIG. 1H is a block diagram of a triptych (pushback) of Mezz, under an embodiment.

FIG. 1H is a block diagram of a triptych (pushback) of Mezz, under an embodiment. Pushback mode is useful for manipulating and editing Mezz assets. Pushback mode is the "zoomed out" view of the Mezz environment. This view allows users to see a greater number of slides in the deck, as well as the asset and live bins. Each screen of the triptych has a space for assets at the top called the asset bin. As assets are added to the dossier, they first fill the center asset bin, then the right, then the left. Images in the asset bin can be dragged into the deck or onto the windshield using the wand. The deck can be advanced or retreated by clicking offscreen right or left. A single click with the wand on either an asset thumbnail or a video thumbnail places the object on the windshield. Video thumbnails appear in the live bin when a video source is connected. A banner with the dossier name and a 'close dossier' button appear in pushback mode when a pointer is aimed off the bottom of the right screen. Clicking the 'close dossier' button disconnects all users and devices and returns Mezz to the dossier portal.

FIG. 1I is a block diagram of the asset bin and live bin of Mezz, under an embodiment. The asset bin displays image objects that have been loaded into the current dossier. The video bin contains DVI-connected video sources. Bin objects can be dragged into the deck or placed onto the windshield. The asset and live bins are visible in pushback mode. Live bin thumbnails update periodically. To place an object into the deck, drag the object to its desired position, and release the button. To place an object on the windshield, drag the object to an area outside of the deck, and release the button. Or, maximize the object by clicking it. Slides move out of the way to make room for objects dragged from a bin.

Figure 1J:
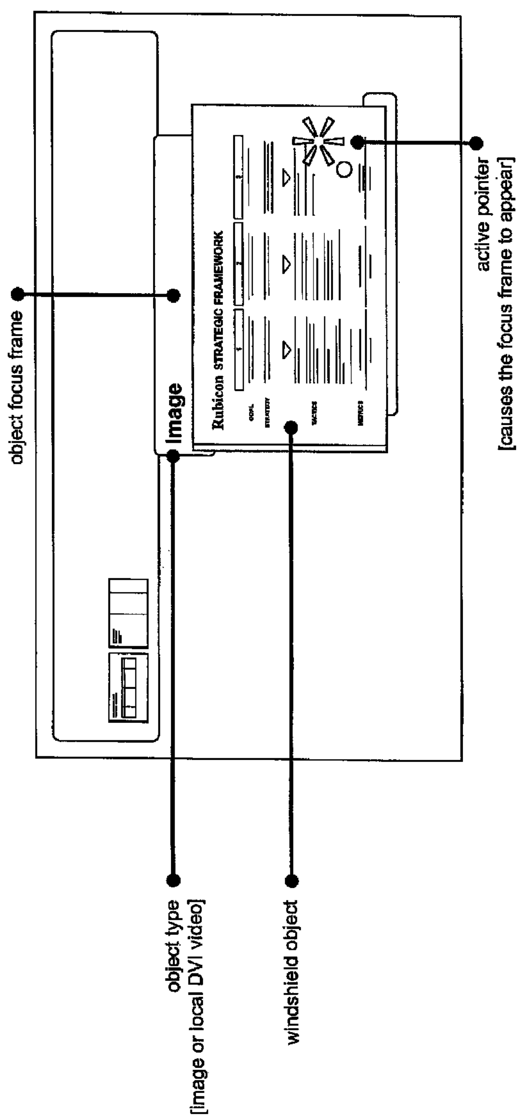
FIG. 1J is a block diagram of the windshield of Mezz, under an embodiment.

FIG. 1J is a block diagram of the windshield of Mezz, under an embodiment. The windshield is an 'always on top' work area. Whether Mezz is in fullscreen or pushback mode, objects on the windshield are composited on top of everything else. Fullscreen objects can he used to act as a frame or cover for deck objects; when an operator would only like a single slide to appear at a time, for example. Placing an object on the windshield involves dragging an object from the asset bin or live bin to its desired position. Sources from the live bin can also be placed on the windshield; these objects appear with the header 'Local DVI Input' when they have focus. To move an object on the windshield, drag it. Fullscreened windshield objects cause brackets to appear at screen edges when they are moved.

Figure 1K:
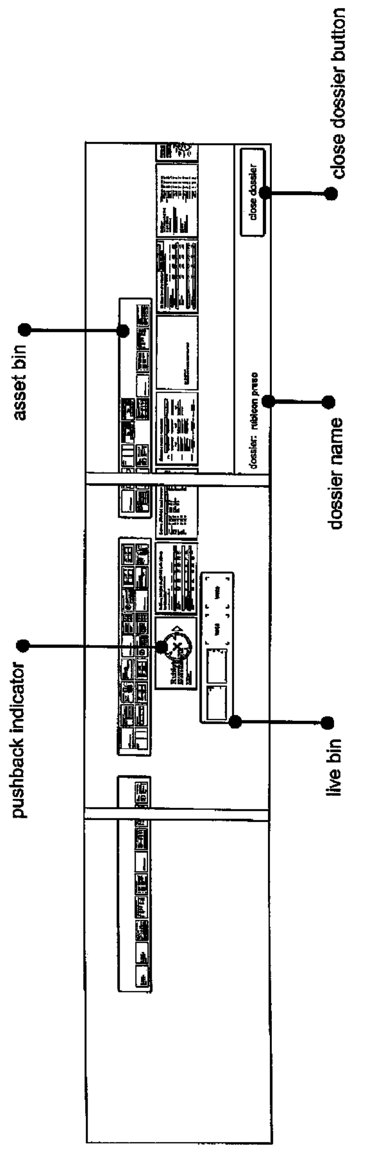
FIG. 1K is a block diagram showing pushback control of Mezz, under an embodiment.

FIG. 1K is a block diagram showing pushback control of Mezz, under an embodiment. To change views in Mezz, use the pushback gesture. Pushback smoothly scales the view of the entire Mezz workspace, allowing the operator to move easily between modes. To engage pushback, point the wand toward the ceiling, hold the button, then push toward and pull away from the screen. The Mezz workspace fluidly zooms in and out as you push and pull using this gesture.

Releasing the button snaps to either fullscreen mode or pushback mode, depending on the current zoom level. If the view is pushed way back, Mezz snaps to pushback mode. If the view is zoomed in, Mezz snaps to fullscreen mode. Moving the wand left or right (parallel to the screen) moves the slides in the deck in the same direction as your movement. Objects on the windshield are unaffected by pushback so that the objects always remain the same size.

Figure 1L:
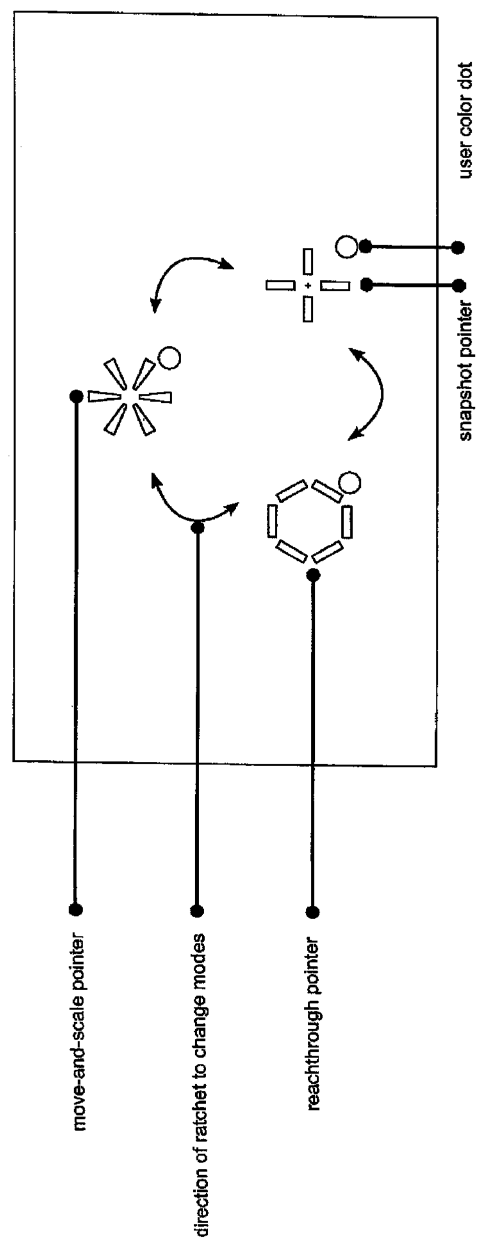
FIG. 1L is a diagram showing input mode control of Mezz, under an embodiment.

FIG. 1L is a diagram showing input mode control of Mezz, under an embodiment. To change input modes in Mezz, use the ratchet gesture. Three wand input modes are available in Mezz: move-and-scale, snapshot, and reachthrough. Ratcheting the wand by rotating clockwise or counter-clockwise switches between the modes, changing the pointer to indicate which mode is active. From any mode, ratchet in the direction indicated in the diagram above to activate the desired mode. Mode selection wraps around so that ratcheting continually in the same direction eventually brings an operator back to the mode in which he/she started. At any time the operator may point the wand to the ceiling to return to move-and-scale mode.

Figure 1M:
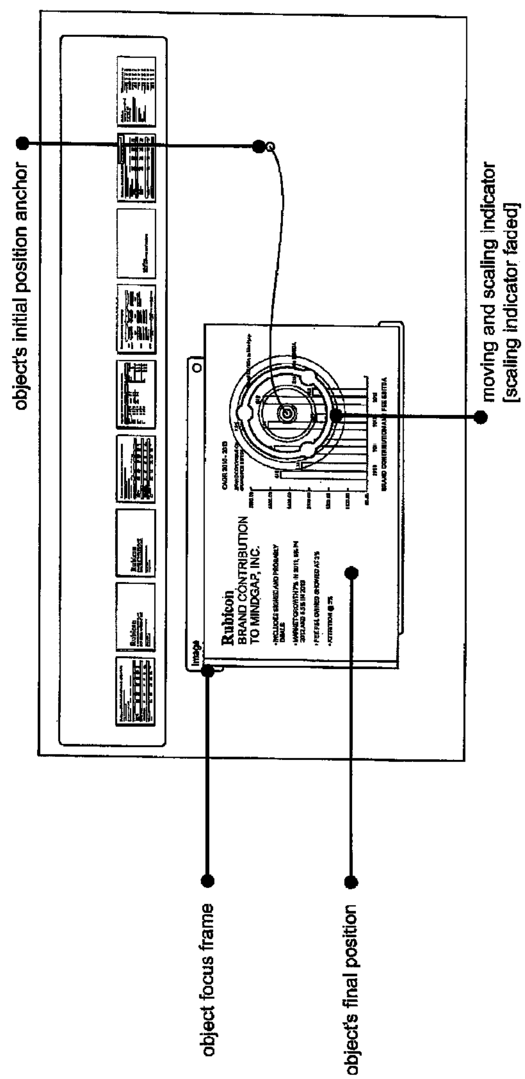
FIG. 1M is a diagram showing object movement control of Mezz, under an embodiment.

FIG. 1M is a diagram showing object movement control of Mezz, under an embodiment. To move an object in Mezz, drag it. The operator points the wand at the object on the windshield he/she wishes to move, clicks the wand button, drags the object to the new position, and releases the button. As the object is moved, an anchor appears at the center of the object's starting position. A wavy line connects the anchor to the object's new position. With the wand, an operator can move an object and scale it at the same time. When moving a fullscreened-object from one screen to another, brackets appear at the edge of the screen to show that the object will snap to fill the screen when the button is released. Objects in a slide deck are moved using the same method: drag the object to its desired position and release the button.

Figure 1N:
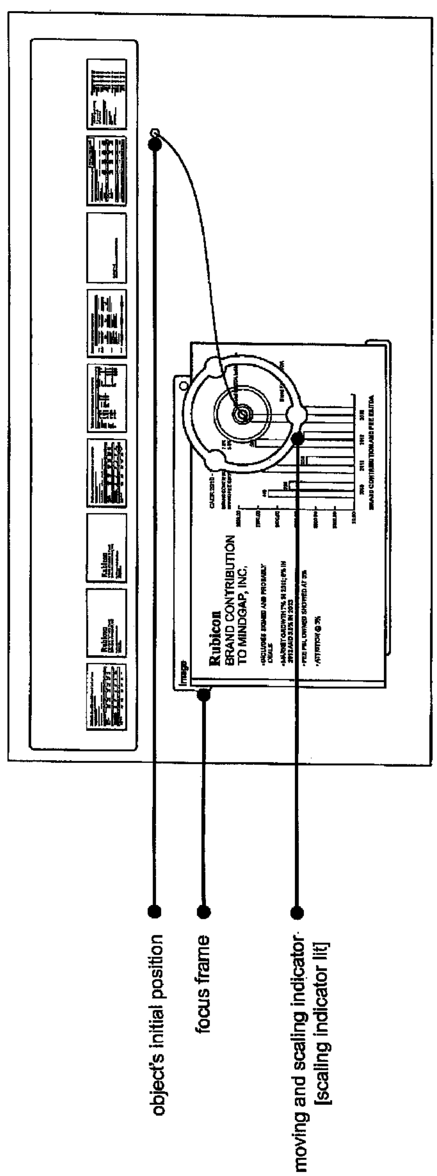
FIG. 1N is a diagram showing object scaling of Mezz, under an embodiment.
Figure 1O:
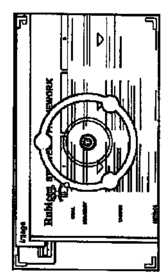
FIG. 1O is a diagram showing object scaling of Mezz at button release, under an embodiment.

FIG. 1N is a diagram showing object scaling of Mezz, under an embodiment. To scale an object in Mezz, use the scaling gesture, point the wand at the object, hold down the wand button, then pull the wand away from the screen to enlarge the object and push the wand toward the screen to shrink the object. Release the button when the object is at the desired size. To fill the screen (fullscreen) with an object, enlarge it until brackets appear at the screen edges, then release the button. A fullscreened-object snaps to the center of the screen. FIG. 1O is a diagram showing object scaling of Mezz at button release, under an embodiment. Brackets appear at the screen edges to indicate that a button release at that scale level fullscreens that object.

Figure 1P:
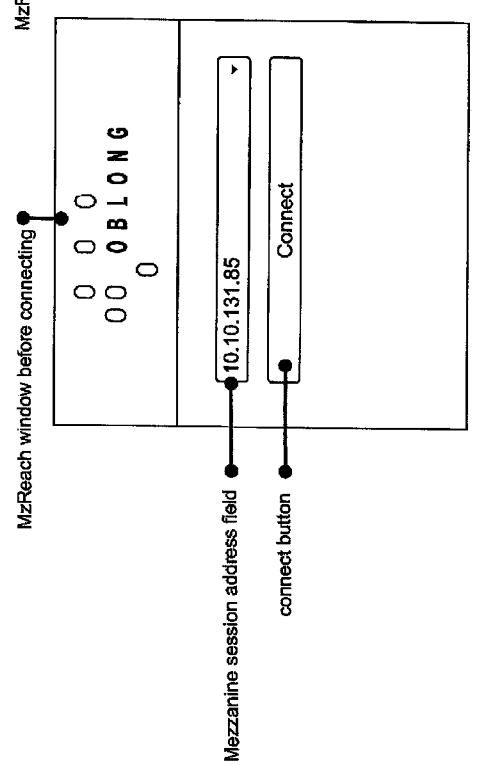
FIG. 1P is a block diagram showing reachthrough of Mezz prior to connecting, under an embodiment.
Figure 1Q:
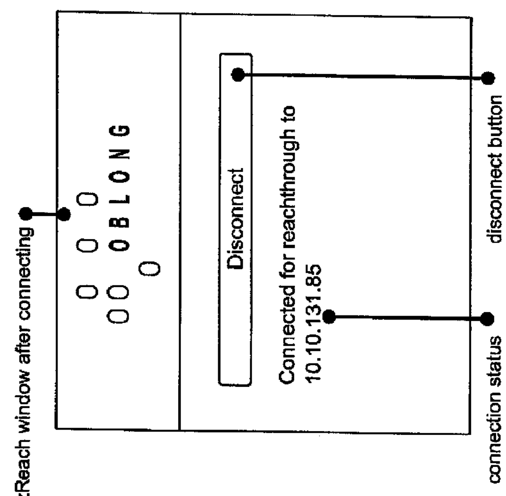
FIG. 1Q is a block diagram showing reachthrough of Mezz after connecting, under an embodiment.

FIG. 1P is a block diagram showing reachthrough of Mezz prior to connecting, under an embodiment. FIG. 1Q is a block diagram showing reachthrough of Mezz after connecting, under an embodiment. To use Mezz's reachthrough capability, an operator runs the reachthrough application on the connected computer. A computer DVI output is connected to one of Mezz's DVI inputs. When MI output is connected to Mezz, a thumbnail of the desktop appears in the corresponding input of the Mezz live bin. Reachthrough remains inactive until the corresponding application is running. Run reachthrough by double-clicking the MzReach icon. To allow Mezz reachthrough, type in the IP address or hostname of the Mezz server an operator is wishing to join, or use the drop-down menu to select recently-used Mezz servers. Next, click the Connect button. When the operator is finished, click the Disconnect button. The Mezz IP address or hostname is usually displayed at the dossier portal. See your system administrator for more information. Both physical (DVI) and network connections support the reachthrough function, though either connection may be present independently.

Figure 1R:
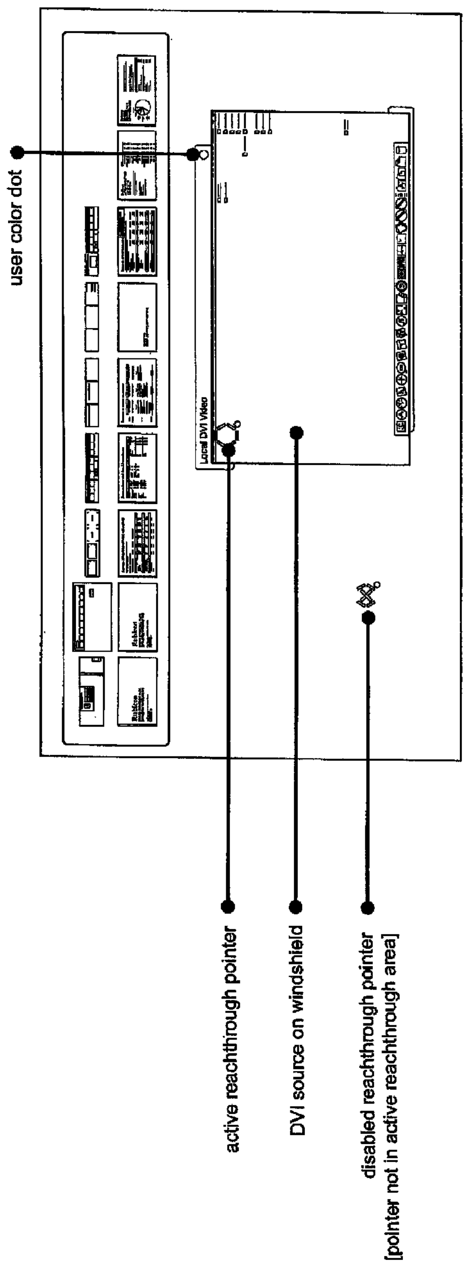
FIG. 1R is a diagram showing reachthrough of Mezz with a reachthrough pointer, under an embodiment.

FIG. 1R is a diagram showing reachthrough of Mezz with a reachthrough pointer, under an embodiment. An operator takes control of a DVI-connected video source with the reachthrough pointer. Activate the reachthrough pointer with the ratchet gesture. Using the reachthrough pointer, click, drag, select, and so on, as would be done with a mouse. The feedback provided while using reachthrough should be exactly the same would be provided if controlling the source directly. The DVI-connected machine is running the reachthrough application in support of reachthrough.

Figure 1S:
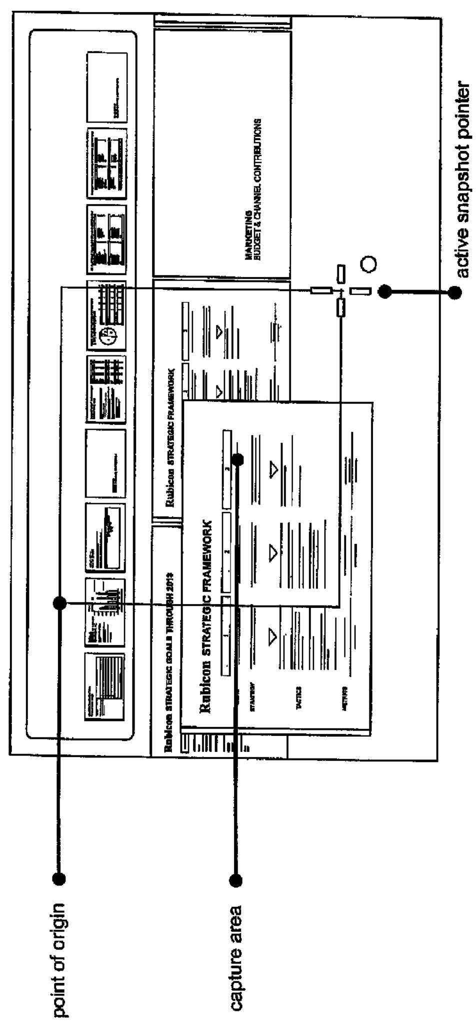
FIG. 1S is a diagram showing snapshot control of Mezz, under an embodiment.

FIG. 1S is a diagram showing snapshot control of Mezz, under an embodiment. Activate the snapshot pointer with the ratchet gesture, then drag across the area of the workspace wishing to be captured. When the area is covered, release the wand button. When dragging across the desired area, a highlighted area with a marquee appears, indicating the area that is to be captured. All visible objects (including those on the windshield) are captured, and the snapshot appears last in the asset bin. To cancel, before releasing the wand button, drag the pointer back across the point of origin, then release the wand button.

Figure 1T:
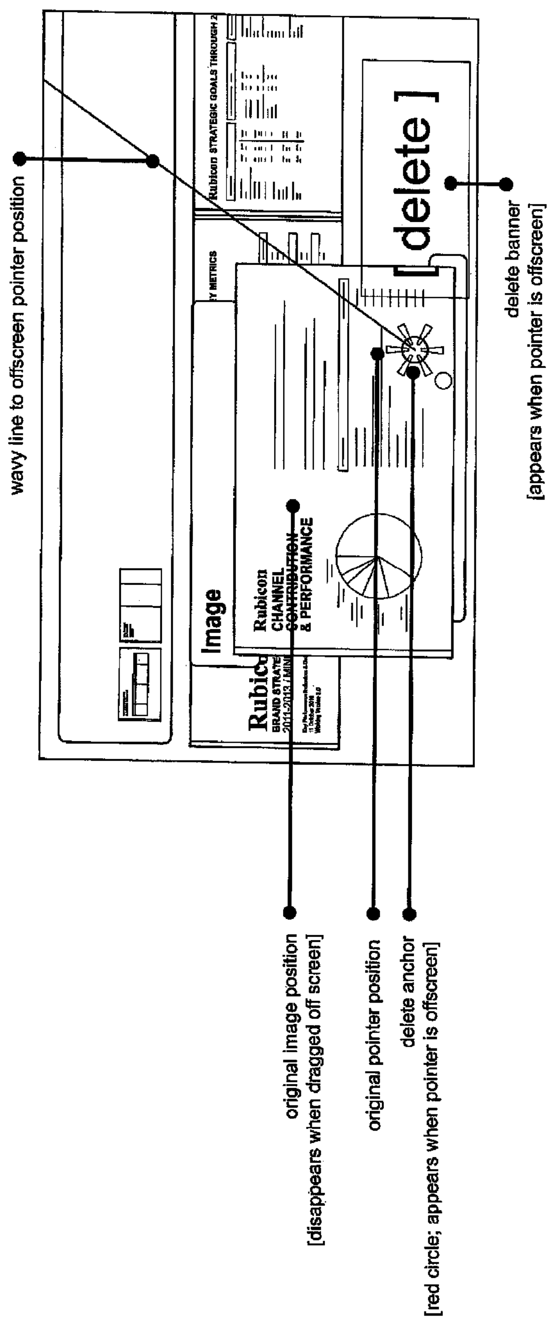
FIG. 1T is a diagram showing deletion control of Mezz, under an embodiment.

FIG. 1T is a diagram showing deletion control of Mezz, under an embodiment. Entering move-and-scale input mode the operator, to delete any object, drags it to the ceiling, and releases the wand button. The object is then removed from the dossier. Deleting slides, windshield objects, or image assets is all done the same way. Any visible objects in fullscreen or pushback modes can be deleted. The feedback Mezz provides when an operator is deleting an object replaces the object, when dragged offscreen toward the ceiling, with a delete banner and a red anchor. When a slide is deleted from the deck, a delete banner is overlayed over the original position of the slide.

Figure 2:
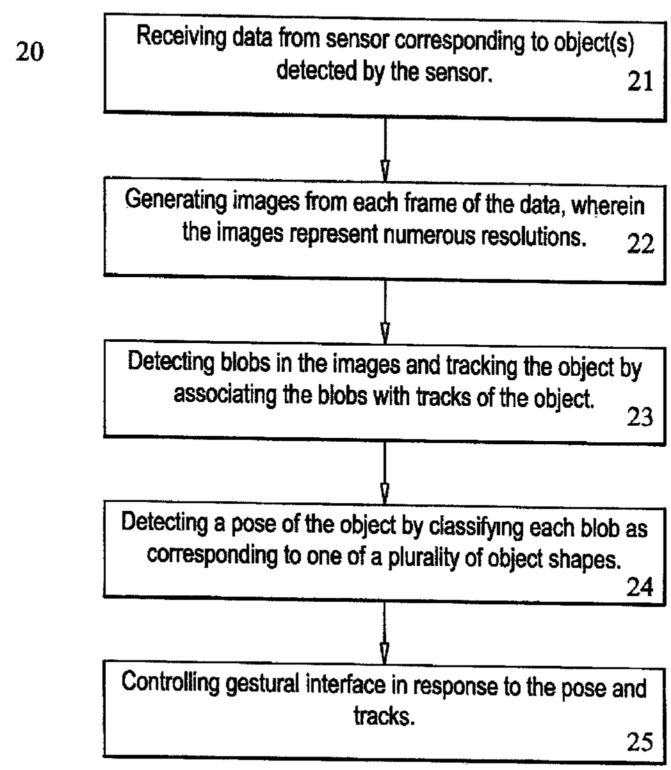
FIG. 2 is a flow diagram of operation of the vision-based interface performing hand or object tracking and shape recognition, under an embodiment.

FIG. 2 is a flow diagram of operation of the gestural or vision-based interface performing hand or object tracking and shape recognition 20, under an embodiment. The vision-based interface receives data from a sensor 21, and the data corresponds to an object detected by the sensor. The interface generates images from each frame of the data 22, and the images represent numerous resolutions. The interface detects blobs in the images and tracks the object by associating the blobs with tracks of the object 23. A blob is a region of a digital image in which some properties (e.g., brightness, color, depth, etc.) are constant or vary within a prescribed range of value, such that all point in a blob can be considered in some sense to be similar to each other. The interface detects a pose of the object by classifying each blob as corresponding to one of a number of object shapes 24. The interface controls a gestural interface in response to the pose and the tracks 25.

Figure 3:
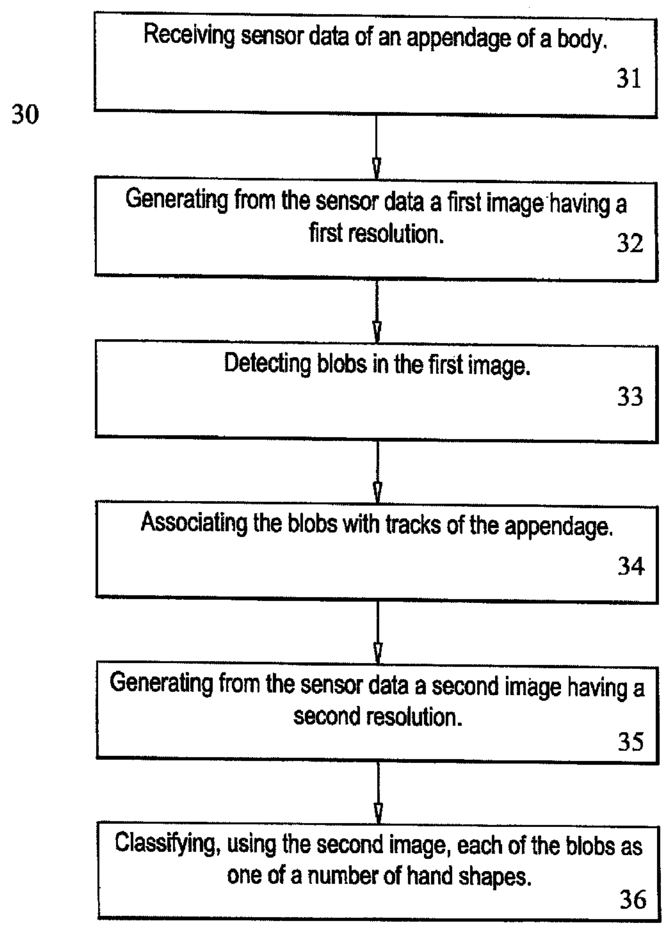
FIG. 3 is a flow diagram for performing hand or object tracking and shape recognition, under an embodiment.

FIG. 3 is a flow diagram for performing hand or object tracking and shape recognition 30, under an embodiment. The object tracking and shape recognition is used in a vision-based gestural interface, for example, but is not so limited. The tracking and recognition comprises receiving sensor data of an appendage of a body 31. The tracking and recognition comprises generating from the sensor data a first image having a first resolution 32. The tracking and recognition comprises detecting blobs in the first image 33. The tracking and recognition comprises associating the blobs with tracks of the appendage 34. The tracking and recognition comprises generating from the sensor data a second image having a second resolution 35. The tracking and recognition comprises using the second image to classify each of the blobs as one of a number of hand shapes 36.

Example embodiments of the SOE kiosk hardware configurations follow, but the embodiments are not limited to these example configurations. The SOE kiosk of an example embodiment is an iMac-based kiosk comprising a 27" version of the Apple iMac with an Asus Xtion Pro, and a sensor is affixed to the top of the iMac. A Tenba case includes the iMac, sensor, and accessories including keyboard, mouse, power cable, and power strip.

The SOE kiosk of another example embodiment is a portable mini-kiosk comprising a 30" screen with relatively small form-factor personal computer (PC). As screen and stand are separate from the processor, this set-up supports both landscape and portrait orientations in display.

The SOE kiosk of an additional example embodiment comprises a display that is a 50" 1920×1080 television or monitor accepting DVI or HDMI input, a sensor (e.g., Asus Xtion Pro Live, Asus Xtion Pro, Microsoft Kinect, Microsoft Kinect for Windows, Panasonic D-Imager, SoftKinetic DS311, Tyzx G3 EVS, etc.), and a computer or process comprising a relatively small form-factor PC running a quad-core CPU and an NVIDIA NVS 420 GPU.

As described above, embodiments of the SOE kiosk include as a sensor the Microsoft Kinect sensor, but the embodiments are not so limited. The Kinect sensor of an embodiment generally includes a camera, an infrared (IR) emitter, a microphone, and an accelerometer. More specifically, the Kinect includes a color VGA camera, or RGB camera, that stores three-channel data in a 1280×960 resolution. Also included is an IR emitter and an IR depth sensor. The emitter emits infrared light beams and the depth sensor reads the IR beams reflected back to the sensor. The reflected beams are converted into depth information measuring the distance between an object and the sensor, which enables the capture of a depth image.

The Kinect also includes a multi-array microphone, which contains four microphones for capturing sound. Because there are four microphones, it is possible to record audio as well as find the location of the sound source and the direction of the audio wave. Further included in the sensor is a 3-axis accelerometer configured for a 2G range, where G represents the acceleration due to gravity. The accelerometer can be used to determine the current orientation of the Kinect.

Low-cost depth cameras create new opportunities for robust and ubiquitous vision-based interfaces. While much research has focused on full-body pose estimation and the interpretation of gross body movement, this work investigates skeleton-free hand detection, tracking, and shape classification. Embodiments described herein provide a rich and reliable gestural interface by developing methods that recognize a broad set of hand shapes and which maintain high accuracy rates across a wide range of users. Embodiments provide real-time hand detection and tracking using depth data from the Microsoft Kinect, as an example, but are not so limited. Quantitative shape recognition results are presented for eight hand shapes collected from 16 users and physical configuration and interface design issues are presented that help boost reliability and overall user experience.

Hand tracking, gesture recognition, and vision-based interfaces have a long history within the computer vision community (e.g., the put-that-there system published in 1980 (e.g., R. A. Bolt. Put-that-there: Voice and gesture at the graphics interface. Conference on Computer Graphics and Interactive Techniques, 1980 ("Bolt"))). The interested reader is directed to one of the many survey papers covering the broader field (e.g., A. Erol, G. Bebis, M. Nicolescu, R. Boyle, and X. Twombly. Vision-based hand pose estimation: A review. Computer Vision and Image Understanding, 108: 52-73, 2007 ("Erol et al."); S. Mitra and T. Acharya. Gesture recognition: A survey. IEEE Transactions on Systems, Man and Cybernetics-Part C, 37(3):311-324, 2007 ("Mitra et al."); X. Zabulis, H. Baltzakis, and A. Argyros. Vision-based hand gesture recognition for human-computer interaction. The Universal Access Handbook, pages 34.1-34.30, 2009 ("Zabulis et al."); T. B. Moeslund and E. Granum. A survey of computer vision-based human motion capture. Computer Vision and Image Understanding, 81:231-268, 2001 ("Moeslund-1 et al."); T. B. Moeslund, A. Hilton, and V. Kruger. A survey of advances in vision-based human motion capture and analysis. Computer Vision and Image Understanding, 104:90-126, 2006 ("Moeslund-2 et al.")).

The work of Plagemann et al. presents a method for detecting and classifying body parts such as the head, hands, and feet directly from depth images (e.g., C. Plagemann, V. Ganapathi, D. Koller, and S. Thrun. Real-time identification and localization of body parts from depth images. IEEE International Conference on Robotics and Automation (ICRA), 2010 ("Plagemann et al.")). They equate these body parts with geodesic extrema, which are detected by locating connected meshes in the depth image and then iteratively finding mesh points that maximize the geodesic distance to the previous set of points. The process is seeded by either using the centroid of the mesh or by locating the two farthest points. The approach presented herein is conceptually similar but it does not require a pre-specified bounding box to ignore clutter. Furthermore, Plagemann et al. used a learned classifier to identify extrema as a valid head, hand, or foot, whereas our method makes use of a higher-resolution depth sensor and recognizes extrema as one of several different hand shapes.

Shwarz et al. extend the work of Plagemann et al. by detecting additional body parts and fitting a full-body skeleton to the mesh (e.g., L. A. Schwarz, A. Mkhitaryan, D. Mateus, and N. Navab. Estimating human 3d pose from time-of-flight images based on geodesic distances and optical flow. Automatic Face and Gesture Recognition, pages 700-706, 2011 ("Shwarz et al.")). They also incorporate optical flow information to help compensate for self-occlusions. The relationship to the embodiments presented herein, however, is similar to that of Plagemann et al. in that Shwarz et al. make use of global information to calculate geodesic distance which will likely reduce reliability in cluttered scenes, and they do not try to detect finger configurations or recognize overall hand shape.

Shotton et al. developed a method for directly classifying depth points as different body parts using a randomized decision forest (e.g., L. Breiman. Random forests. Machine Learning, 45(1):5-32, 2001 ("Breiman")) trained on the distance between the query point and others in a local neighborhood (e.g., J. Shotton, A. Fitzgibbon, M. Cook, T. Sharp, M. Finocchio, R. Moore, A. Kipman, and A. Blake. Real-time human pose recognition in parts from a single depth image. IEEE Conf on Computer Vision and Pattern Recognition, 2011 ("Shotton et al.")). Their goal was to provide higher-level information to a real-time skeleton tracking system and so they recognize 31 different body parts, which goes well beyond just the head, hands, and feet. The approach described herein also uses randomized decision forests because of their low classification overhead and the model's intrinsic ability to handle multi-class problems.

Embodiments described herein train the forest to recognize several different hand shapes, but do not detect non-hand body parts.

In vision-based interfaces, as noted herein, hand tracking is often used to support user interactions such as cursor control, 3D navigation, recognition of dynamic gestures, and consistent focus and user identity. Although many sophisticated algorithms have been developed for robust tracking in cluttered, visually noisy scenes (e.g., J. Deutscher, A. Blake, and I. Reid. Articulated body motion capture by annealed particle filtering. Computer Vision and Pattern Recognition, pages 126-133, 2000 ("Deutscher et al."); A. Argyros and M. Lourakis. Vision-based interpretation of hand gestures for remote control of a computer mouse. Computer Vision in HCI, pages 40-51, 2006. 1 ("Argyros et al.")), long-duration tracking and hand detection for track initialization remain challenging tasks. Embodiments described herein build a reliable, markerless hand tracking system that supports the creation of gestural interfaces based on hand shape, pose, and motion. Such an interface requires low-latency hand tracking and accurate shape classification, which together allow for timely feedback and a seamless user experience.

Embodiments described herein make use of depth information from a single camera for local segmentation and hand detection. Accurate, per-pixel depth data significantly reduces the problem of foreground/background segmentation in a way that is largely independent of visual complexity. Embodiments therefore build body-part detectors and tracking systems based on the 3D structure of the human body rather than on secondary properties such as local texture and color, which typically exhibit a much higher degree of variation across different users and environments (See, Shotton et al., Plagemann et al.).

Embodiments provide markerless hand tracking and hand shape recognition as the foundation for a vision-based user interface. As such, it is not strictly necessary to identify and track the user's entire body, and, in fact, it is not assumed that the full body (or even the full upper body) is visible. Instead, embodiments envision situations that only allow for limited visibility such as a seated user where a desk occludes part of the user's arm so that the hand is not observably connected to the rest of the body. Such scenarios arise quite naturally in real-world environments where a user may rest their elbow on their chair's arm or where desktop clutter like an open laptop may occlude the lower portions of the camera's view.

Figure 4:
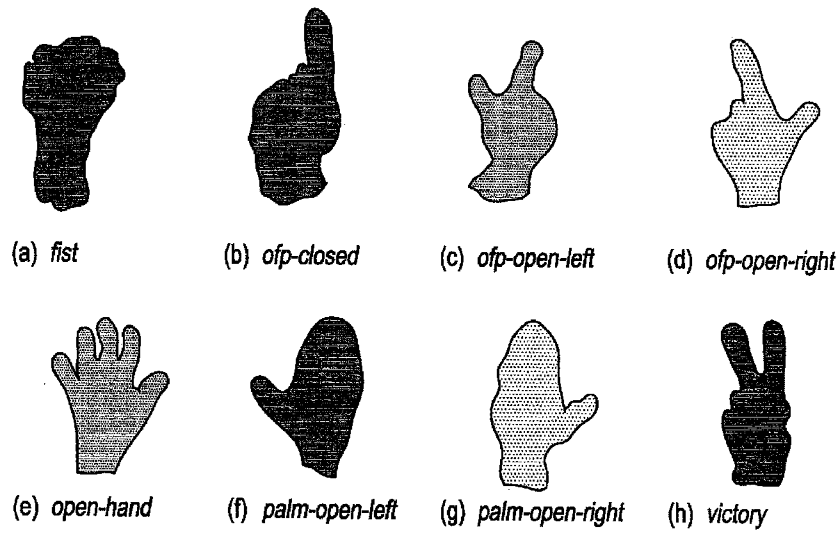
FIG. 4 depicts eight hand shapes used in hand tracking and shape recognition, under an embodiment.

FIG. 4 depicts eight hand shapes used in hand tracking and shape recognition, under an embodiment. Pose names that end in -left or -right are specific to that hand, while open and closed refer to whether the thumb is extended or tucked in to the palm. The acronym "ofp" represents "one finger point" and corresponds to the outstretched index finger.

The initial set of eight poses of an embodiment provides a range of useful interactions while maintaining relatively strong visual distinctiveness. For example, the combination of open-hand and first may be used to move a cursor and then grab or select an object. Similarly, the palm-open pose can be used to activate and expose more information (by "pushing" a graphical representation back in space) and then scrolling through the data with lateral hand motions.

Other sets of hand shapes are broader but also require much more accurate and complete information about the finger configuration. For example, the American Sign Language (ASL) finger-spelling alphabet includes a much richer set of hand poses that covers 26 letters plus the digits zero through nine. These hand shapes make use of subtle finger cues, however, which can be difficult to discern for both the user and especially for the vision system.

Figure 5:
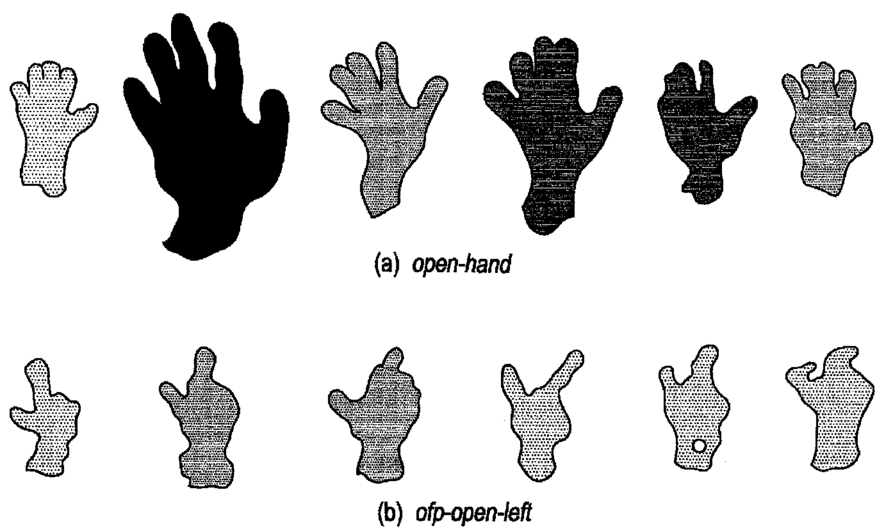
FIG. 5 shows sample images showing variation across users for the same hand shape category.

Despite the fact that the gesture set of an embodiment is configured to be visually distinct, a large range of variation was seen within each shape class. FIG. 5 shows sample images showing variation across users for the same hand shape category. Although a more accurate, higher-resolution depth sensor would reduce some of the intra-class differences, the primary causes are the intrinsic variations across people's hands and the perspective and occlusion effects caused by only using a single point of view. Physical hand variations were observed in overall size, finger width, ratio of finger length to palm size, joint ranges, flexibility, and finger control. For example, in the palm-open pose, some users would naturally extend their thumb so that it was nearly perpendicular to their palm and index finger, while other users expressed discomfort when trying to move their thumb beyond 45 degrees. Similarly, variation was seen during a single interaction as, for example, a user might start an palm-open gesture with their fingers tightly pressed together but then relax their fingers as the gesture proceeded, thus blurring the distinction between palm-open and open-hand. Additionally, the SOE kiosk system can estimate the pointing angle of the hand within the plane parallel to the camera's sensor (i.e., the xy-plane assuming a camera looking down the z-axis). By using the fingertip, it notes a real (two-dimensional) pointing angle.

The central contribution of embodiments herein is the design and implementation of a real-time vision interface that works reliably across different users despite wide variations in hand shape and mechanics. The approach of an embodiment is based on an efficient, skeleton-free hand detection and tracking algorithm that uses per-frame local extrema detection combined with fast hand shape classification, and a quantitative evaluation of the methods herein provide a hand shape recognition rate of more than 97% on previously unseen users.

Detection and tracking of embodiments herein are based on the idea that hands correspond to extrema in terms of geodesic distance from the center of a user's body mass. This assumption is violated when, for example, a user stands with arms akimbo, but such body poses preclude valid interactions with the interface, and so these low-level false negatives do not correspond to high-level false negatives. Since embodiments are to be robust to clutter without requiring a pre-specified bounding box to limit the processing volume, the approach of those embodiments avoids computing global geodesic distance and instead takes a simpler, local approach. Specifically, extrema candidates are found by directly detecting local, directional peaks in the depth image and then extract spatially connected components as potential hands.

The core detection and tracking of embodiments is performed for each depth frame after subsampling from the input resolution of 640×480 down to 80×60. Hand shape analysis, however, is performed at a higher resolution as described herein. The downsampled depth image is computed using a robust approach that ignores zero values, which correspond to missing depth data, and that preserves edges. Since the depth readings essentially represent mass in the scene, it is desirable to avoid averaging disparate depth values which would otherwise lead to "hallucinated" mass at an intermediate depth.

Local peaks are detected in the 80×60 depth image by searching for pixels that extend farther than their spatial neighbors in any of the four cardinal directions (up, down, left, and right). This heuristic provides a low false negative rate even at the expense of many false positives. In other words, embodiments do not want to miss a real hand, but may include multiple detections or other objects since they will be filtered out at a later stage.

Figure 7:
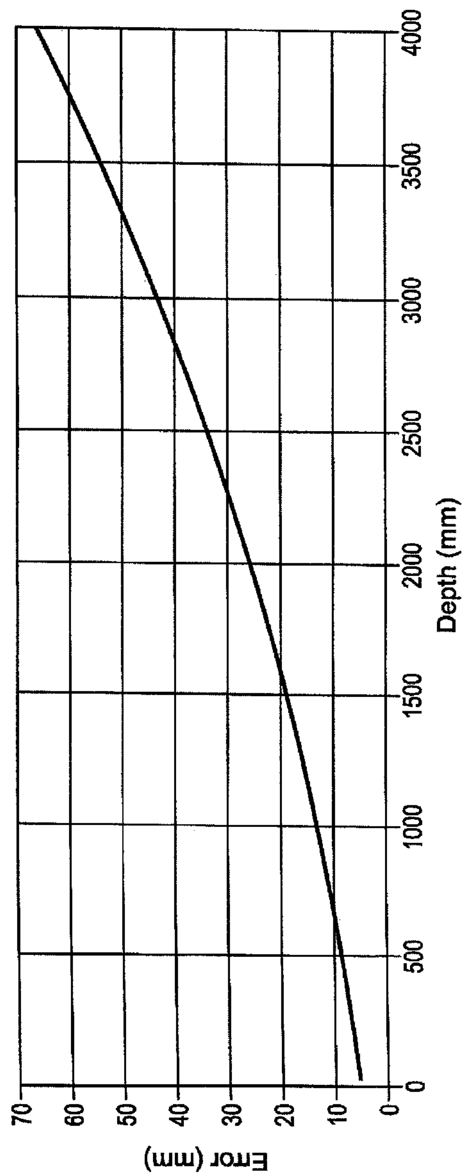
FIG. 7 shows a plot of the estimated minimum depth ambiguity as a function of depth based on the metric distance between adjacent raw sensor readings, under an embodiment.

Each peak pixel becomes the seed for a connected component ("blob") bounded by the maximum hand size, which is taken to be 300 mm plus a depth-dependent slack value that represents expected depth error. For the Microsoft Kinect, the depth error corresponds to the physical distance represented by two adjacent raw sensor readings (see FIG. 7 which shows a plot of the estimated minimum depth ambiguity as a function of depth based on the metric distance between adjacent raw sensor readings). In other words, the slack value accounts for the fact that searching for a depth difference of 10 mm at a distance of 2000 mm is not reasonable since the representational accuracy at that depth is only 25 mm.

The algorithm of an embodiment estimates a potential hand center for each blob by finding the pixel that is farthest from the blob's border, which can be computed efficiently using the distance transform. It then further prunes the blob using a palm radius of 200 mm with the goal of including hand pixels while excluding the forearm and other body parts. Finally, low-level processing concludes by searching the outer boundary for depth pixels that "extend" the blob, defined as those pixels adjacent to the blob that have a similar depth. The algorithm of an embodiment analyzes the extension pixels looking for a single region that is small relative to the boundary length, and it prunes blobs that have a very large or disconnected extension region. The extension region is assumed to correspond to the wrist in a valid hand blob and is used to estimate orientation in much the same way that Plagemann et al. use geodesic backtrack points (see, Plagemann et al.).

The blobs are then sent to the tracking module, which associates blobs in the current frame with existing tracks. Each blob/track pair is scored according to the minimum distance between the blob's centroid and the track's trajectory bounded by its current velocity. In addition, there may be overlapping blobs due to low-level ambiguity, and so the tracking module enforces the implied mutual exclusion. The blobs are associated with tracks in a globally optimal way by minimizing the total score across all of the matches. A score threshold of 250 mm is used to prevent extremely poor matches, and thus some blobs and/or tracks may go unmatched.

After the main track extension, the remaining unmatched blobs are compared to the tracks and added as secondary blobs if they are in close spatial proximity. In this way, multiple blobs can be associated with a single track, since a single hand may occasionally be observed as several separate components. A scenario that leads to disjoint observations is when a user is wearing a large, shiny ring that foils the Kinect's analysis of the projected structured light. In these cases, the finger with the ring may be visually separated from the hand since there will be no depth data covering the ring itself. Since the absence of a finger can completely change the interpretation of a hand's shape, it becomes vitally important to associate the finger blob with the track.

The tracking module then uses any remaining blobs to seed new tracks and to prune old tracks that go several frames without any visual evidence of the corresponding object.

Regarding hand shape recognition, the 80×60 depth image used for blob extraction and tracking provides in some cases insufficient information for shape analysis. Instead, hand pose recognition makes use of the 320×240 depth image, a Quarter Video Graphics Array (QVGA) display resolution. The QVGA mode describes the size or resolution of the image in pixels. An embodiment makes a determination as to which QVGA pixels correspond to each track. These pixels are identified by seeding a connected component search at each QVGA pixel within a small depth distance from its corresponding 80×60 pixel. The algorithm of an embodiment also re-estimates the hand center using the QVGA pixels to provide a more sensitive 3D position estimate for cursor control and other continuous, position-based interactions.

An embodiment uses randomized decision forests (see, Breiman) to classify each blob as one of the eight modeled hand shapes. Each forest is an ensemble of decision trees and the final classification (or distribution over classes) is computed by merging the results across all of the trees. A single decision tree can easily overfit its training data so the trees are randomized to increase variance and reduce the composite error. Randomization takes two forms: (1) each tree is learned on a bootstrap sample from the full training data set, and (2) the nodes in the trees optimize over a small, randomly selected number of features. Randomized decision forests have several appealing properties useful for real-time hand shape classification: they are extremely fast at runtime, they automatically perform feature selection, they intrinsically support multi-class classification, and they can be easily parallelized.

Methods of an embodiment make use of three different kinds of image features to characterize segmented hand patches. Set A includes global image statistics such as the percentage of pixels covered by the blob contour, the number of fingertips detected, the mean angle from the blob's centroid to the fingertips, and the mean angle of the fingertips themselves. It also includes all seven independent Flusser-Suk moments (e.g., J. Flusser and T. Suk. Rotation moment invariants for recognition of symmetric objects. IEEE Transactions on Image Processing, 15:3784-3790, 2006 ("Flusser et al.")).

Fingertips are detected from each blob's contour by searching for regions of high positive curvature. Curvature is estimated by looking at the angle between the vectors formed by a contour point $C_i$ and its k-neighbors $C_{i-k}$ and $C_{i+k}$ sampled with appropriate wrap-around. The algorithm of an embodiment uses high curvature at two scales and modulates the value of k depending on the depth of the blob so that k is roughly 30 mm for the first scale and approximately 50 mm from the query point for the second scale.

Figure 8:
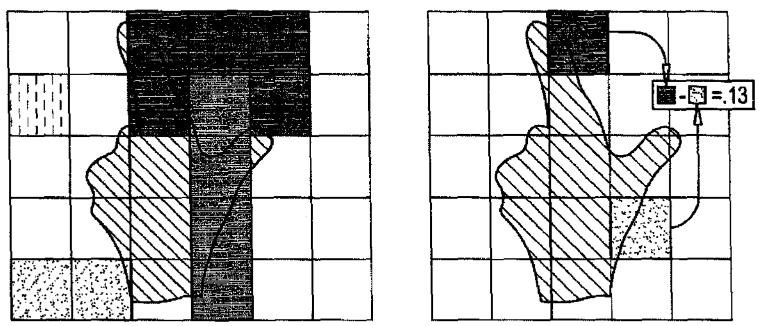
FIG. 8 shows features extracted for (a) Set B showing four rectangles and (b) Set C showing the difference in mean depth between one pair of grid cells, under an embodiment.

Feature Set B is made up of the number of pixels covered by every possible rectangle within the blob's bounding box normalized by its total size. To ensure scale-invariance, each blob image is subsampled down to a 5×5 grid meaning that there are 225 rectangles and thus 225 descriptors in Set B (see FIG. 8 which shows features extracted for (a) Set B showing four rectangles and (b) Set C showing the difference in mean depth between one pair of grid cells).

Feature Set C uses the same grid as Set B but instead of looking at coverage within different rectangles, it comprises the difference between the mean depth for each pair of individual cells. Since there are 25 cells on a 5×5 grid, there are 300 descriptors in Set C. Feature Set D combines all of the features from sets A, B, and C leading to 536 total features.

As described herein, the blob extraction algorithm attempts to estimate each blob's wrist location by search for extension pixels. If such a region is found, it is used to estimate orientation based on the vector connecting the center of the extension region to the centroid of the blob. By rotating the QVGA image patch by the inverse of this angle, many blobs can be transformed to have a canonical orientation before any descriptors are computed. This process improves classification accuracy by providing a level of rotation invariance. Orientation cannot be estimated for all blobs, however. For example if the arm is pointed directly at the camera then the blob will not have any extension pixels. In these cases, descriptors are computed on the untransformed blob image.

Figure 6A:
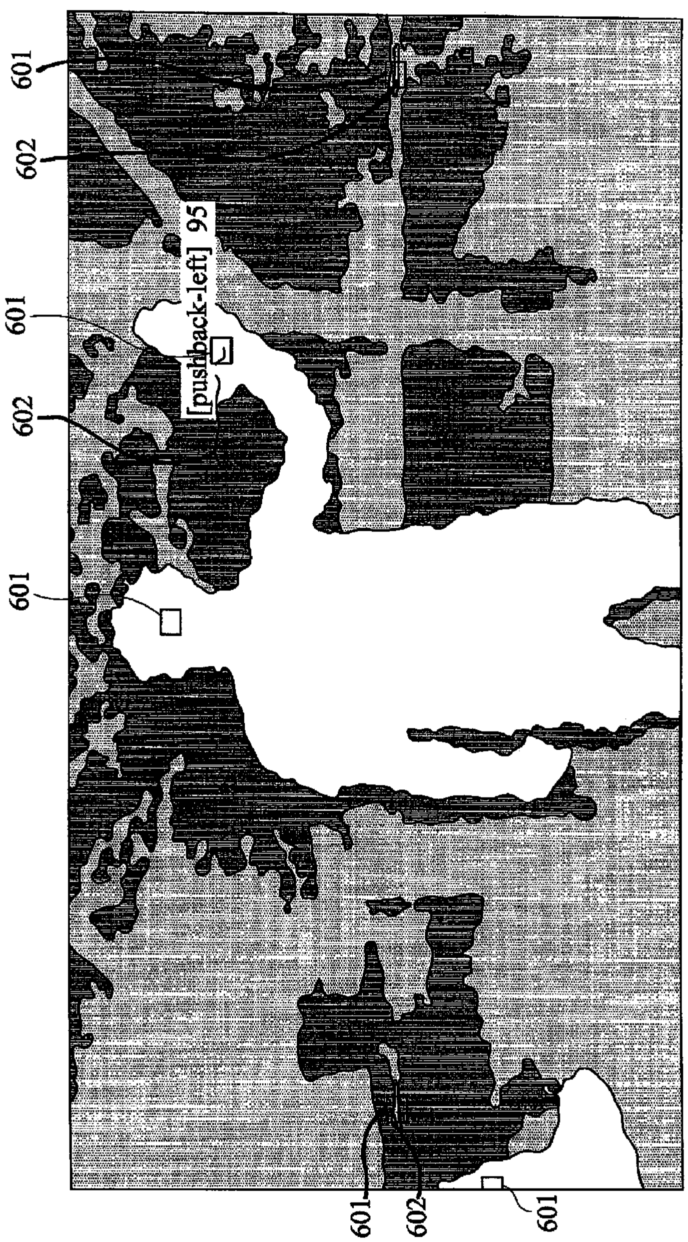
FIGS. 6A, 6B, and 6C (collectively FIG. 6) show sample frames showing pseudo-color depth images along with tracking results, track history, and recognition results along with a confidence value, under an embodiment.
Figure 6B:
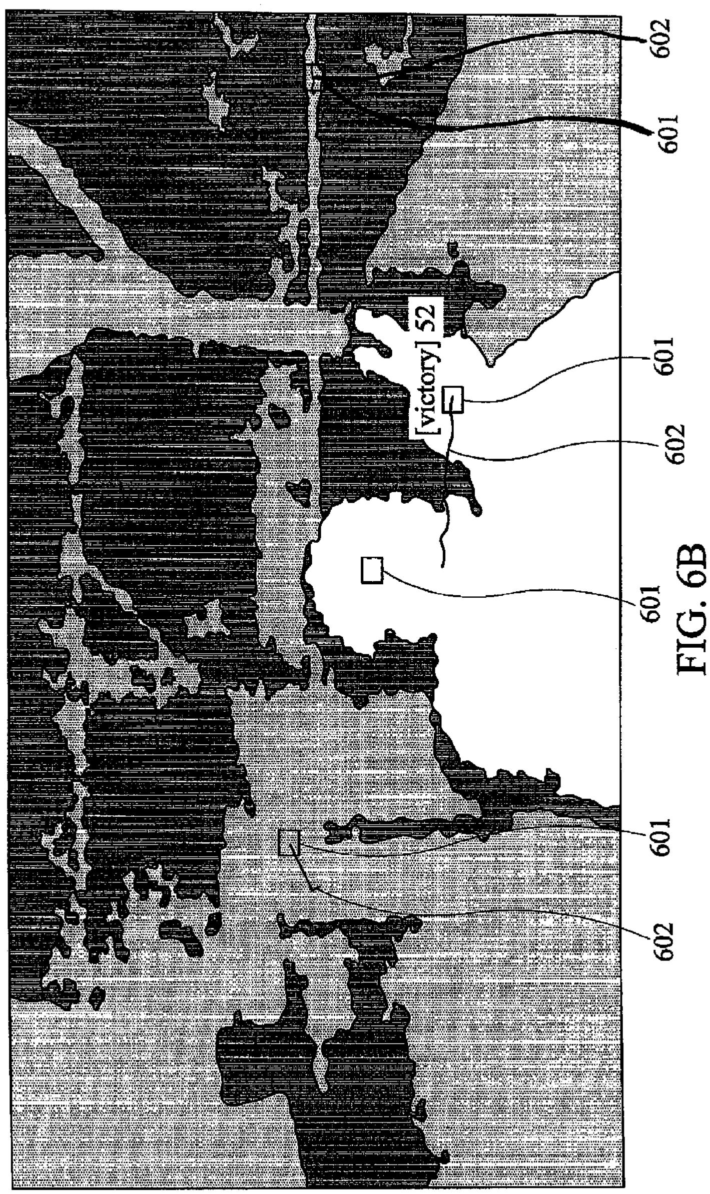
Figure 6C:
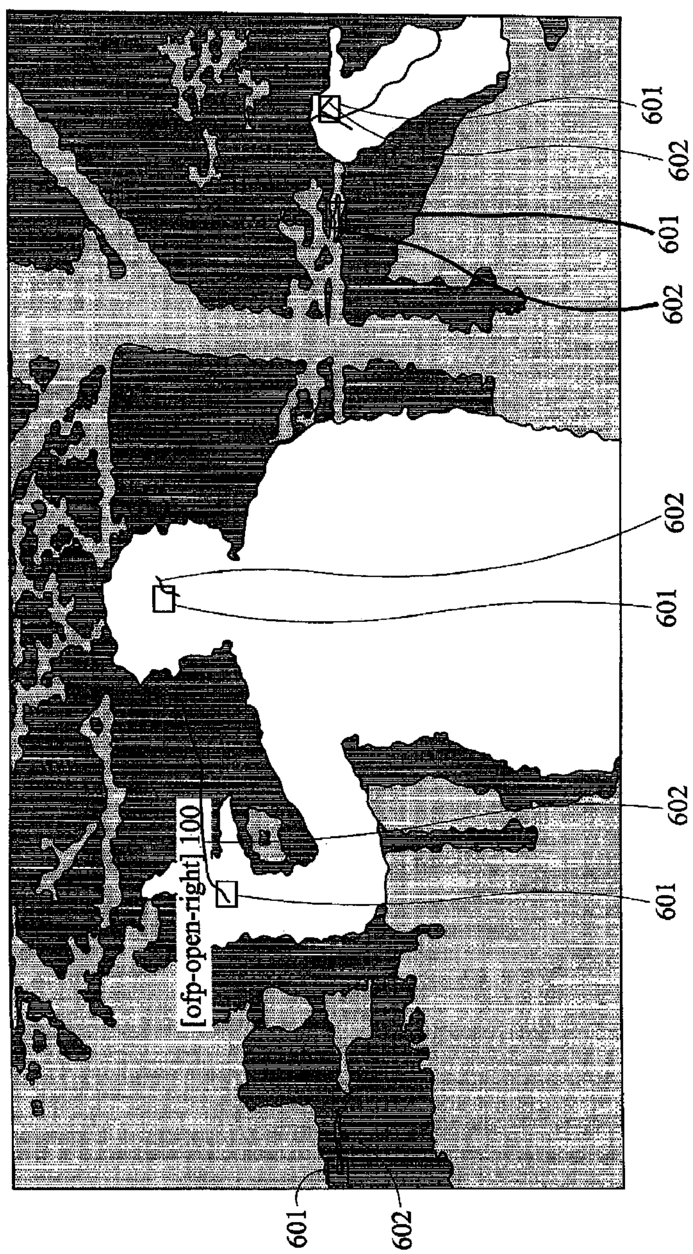

To evaluate the embodiments herein for real-time hand tracking and shape recognition, sample videos were recorded from 16 subjects (FIGS. 6A, 6B, and 6C (collectively FIG. 6)) show three sample frames showing pseudo-color depth images along with tracking results 601, track history 602, and recognition results (text labels) along with a confidence value). The videos were captured at a resolution of 640×480 at 30 Hz using a Microsoft Kinect, which estimates per-pixel depth using an approach based on structured light. Each subject contributed eight video segments corresponding to the eight hand shapes depicted in FIG. 4. The segmentation and tracking algorithm described herein ran on these videos with a modified post-process that saved the closest QVGA blob images to disk. Thus the training examples were automatically extracted from the videos using the same algorithm used in the online version. The only manual intervention was the removal of a small number of tracking errors that would otherwise contaminate the training set. For example, at the beginning of a few videos the system saved blobs corresponding to the user's head before locking on to their hand.

Some of the hand poses are specific to either the left or right hand (e.g., palm-open-left) whereas others are very similar for both hands (e.g., victory). Poses in the second set were included in the training data twice, once without any transformation and once after reflection around the vertical axis. Through qualitative experiments with the live, interactive system, it was found that the inclusion of the reflected examples led to a noticeable improvement in recognition performance.

The 16 subjects included four females and 12 males ranging from 25 to 40 years old and between 160 and 188 cm tall. Including the reflected versions, each person contributed between 1,898 and 9,625 examples across the eight hand poses leading to a total of 93,336 labeled examples. The initial evaluation used standard cross-validation to estimate generalization performance. Extremely low error rates were found, but the implied performance did not reliably predict the experience of new users with the live system who saw relatively poor classification rates.

An interpretation is that cross-validation was over-estimating performance because the random partitions included examples from each user in both the training and test sets. Since the training examples were extracted from videos, there is a high degree of temporal correlation and thus the test partitions were not indicative of generalization performance. In order to run more meaningful experiments with valid estimates of cross-user error, a switch was made to instead use a leave-one-user-out approach. Under this evaluation scheme, each combination of a model and feature set was trained on data from 15 subjects and evaluated the resulting classifier on the unseen 16th subject. This process was repeated 16 times with each iteration using data from a different subject as the test set.

Figure 9:
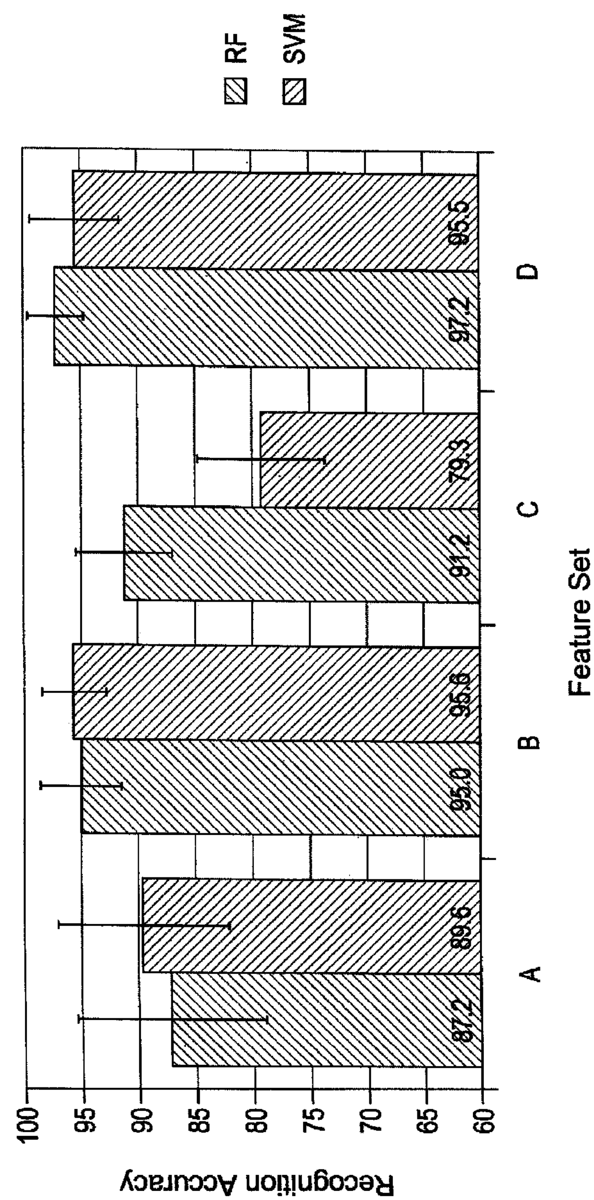
FIG. 9 is a plot of a comparison of hand shape recognition accuracy for randomized decision forest (RF) and support vector machine (SVM) classifiers over four feature sets, under an embodiment.

FIG. 9 plots a comparison of hand shape recognition accuracy for randomized decision forest (RF) and support vector machine (SVM) classifiers over four feature sets, where feature set A uses global statistics, feature set B uses normalized occupancy rates in different rectangles, feature set C uses depth differences between points, and feature set D combines sets A, B, and C. FIG. 9 therefore presents the average recognition rate for both the randomized decision forest (RF) and support vector machine (SVM) models. The SVM was trained with LIBSVM (e.g., C. C. Chang and C. J. Lin. LIBSVM: A library for support vector machines. ACM Transactions on Intelligent Systems and Technology, 2:27:1-27:27, 2011 ("Chang et al.")) and used a radial basis function kernel with parameters selected to maximize accuracy based on the results of a small search over a subset of the data. Both the RF and SVM were tested with the four feature sets described herein.

The best results were achieved with the RF model using Feature Set D (RF-D). This combination led to a mean cross-user accuracy rate of 97.2% with standard deviation of 2.42. The worst performance for any subject under RF-D was 92.8%, while six subjects saw greater than 99% accuracy rates. For comparison, the best performance using an SVM was with Feature Set B, which gave a mean accuracy rate of 95.6%, standard deviation of 2.73, and worst case of 89.0%.

Figure 10:
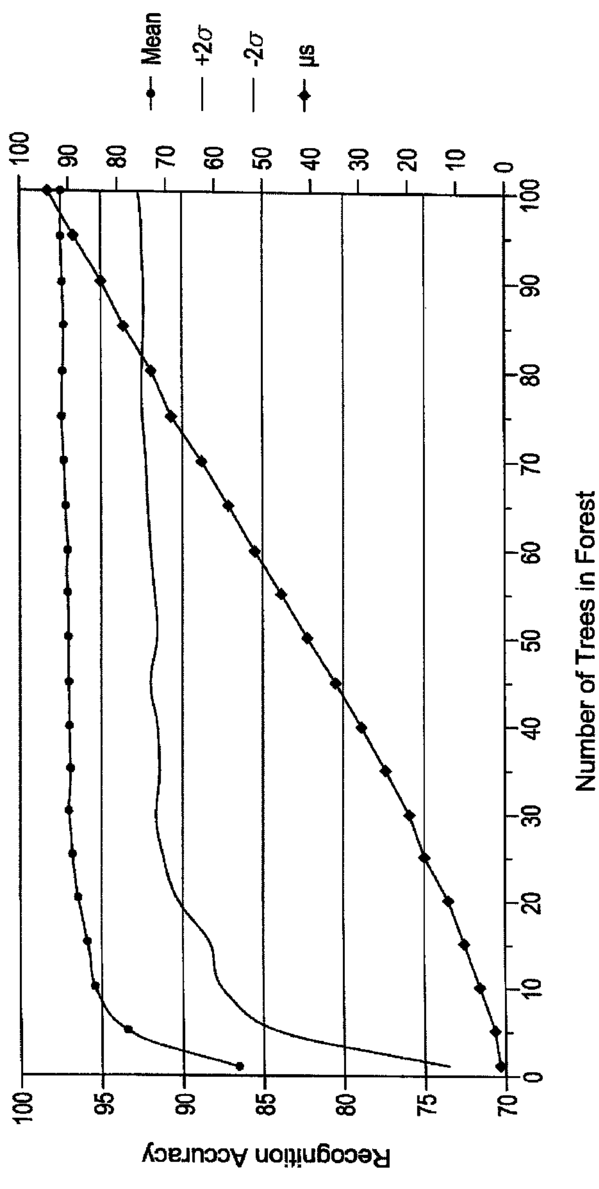
FIG. 10 is a plot of a comparison of hand shape recognition accuracy using different numbers of trees in the randomized decision forest, under an embodiment.
Figure 11:
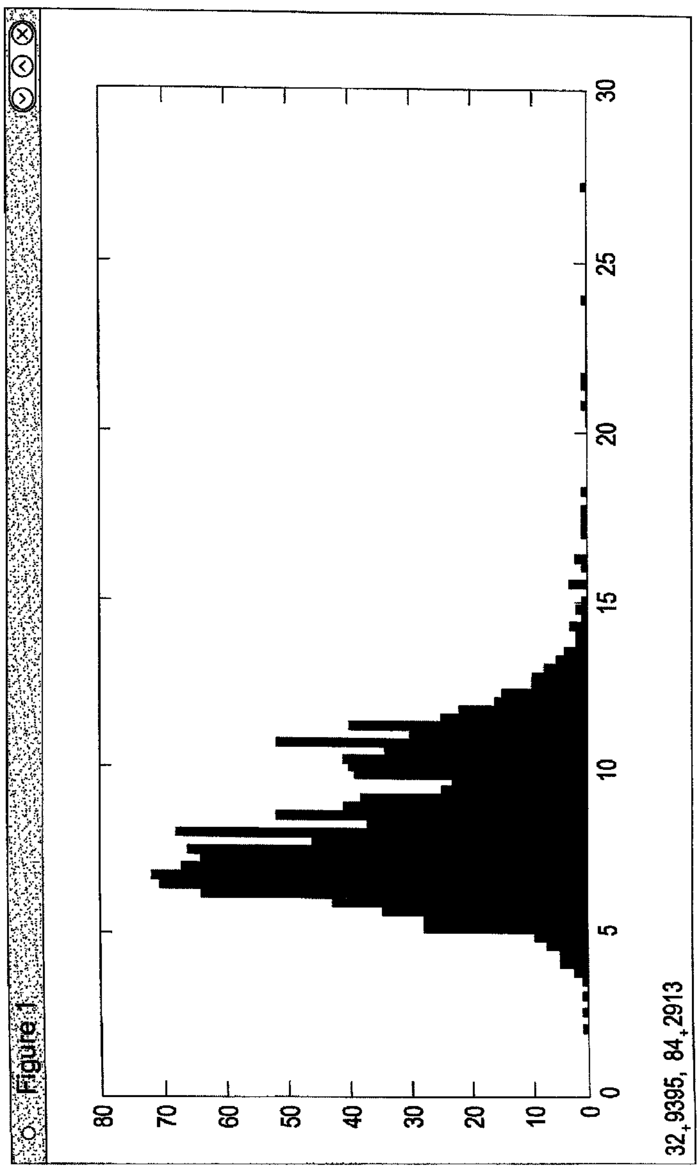

The RF results presented in FIG. 9 are based on forests with 100 trees. Each tree was learned with a maximum depth of 30 and no pruning. At each split node, the number of random features selected was set to the square root of the total number of descriptors. The ensemble classifier evaluates input data by merging the results across all of the random trees, and thus runtime is proportional to the number of trees. In a real-time system, especially when latency matters, a natural question is how classification accuracy changes as the number of trees in the forest is reduced. FIG. 10 presents a comparison of hand shape recognition accuracy using different numbers of trees in the randomized decision forest. The graph shows mean accuracy and ±2σ lines depicting an approximate 95% confidence interval (blue circles, left axis) along with the mean time to classify a single example (green diamonds, right axis). FIG. 10 shows that for the hand shape classification problem, recognition accuracy is stable down to 30 trees where it only drops from 97.2% to 96.9%. Even with 20 trees, mean cross-user accuracy is only reduced to 96.4%, although below this point, performance begins to drop more dramatically. On the test machine used, an average classification speed seen was 93.3 μs per example with 100 trees but only 20.1 μs with 30 trees.

Although higher accuracy rates might be desirable, the interpretation of informal reports and observation of users working with the interactive system of an embodiment is that the current accuracy rate of 97.2% is sufficient for a positive user experience. An error rate of nearly 3% means that, on average, the system of an embodiment can misclassify the user's pose roughly once every 30 frames, though such a uniform distribution is not expected in practice since the errors are unlikely to be independent. It is thought that the errors will clump but also that many of them will be masked during real use due to several important factors. First, the live system can use temporal consistency to avoid random, short-duration errors. Second, cooperative users will adapt to the system if there is sufficient feedback and if only minor behavioral changes are needed. And third, the user interface can be configured to minimize the impact of easily confused hand poses.

A good example of adapting the interface arises with the pushback interaction based on the palm-open pose. A typical use of this interaction allows users to view more of their workspace by pushing the graphical representation farther back into the screen. Users may also be able to pan to different areas of the workspace or scroll through different object (e.g., movies, images, or merchandise). Scrolling leads to relatively long interactions and so users often relax their fingers so that palm-open begins to look like open-hand even though their intent did not changed. An embodiment implemented a simple perception tweak that prevents open-hand from disrupting the pushback interaction, even if open-hand leads to a distinct interaction in other situations. Essentially, both poses are allowed to continue the interaction even though only palm-open can initiate it. Furthermore, classification confidence is pooled between the two poses to account for the transitional poses between them.

Experimentation was also performed with physical changes to the interface and workspace. For example, a noticeable improvement was seen in user experience when the depth camera was mounted below the primary screen rather than above it. This difference likely stems from a tendency of users to relax and lower their hands rather than raise them due to basic body mechanics and gravity. With a bottom-mounted camera, a slightly angled or lowered hand provides a better view of the hand shape, whereas the view from a top-mounted camera will degrade. Similarly, advantage can be taken of users' natural tendency to stand farther from larger screens. Since the Kinect and many other depth cameras have a minimum sensing distance in the 30-80 cm range, users can be encouraged to maintain a functional distance with as few explicit reminders and warning messages as possible. The interface of an embodiment does provide a visual indication when an interaction approaches the near sensing plane or the edge of the camera's field of view, but implicit, natural cues like screen size are much preferred.

As described herein, other markerless research has focused on skeleton systems. As an SOE expression, the kiosk system described herein focuses on tracking and detection of finger and hands, in contrast to conventional markerless systems. The human hand represents an optimal input candidate in the SOE. Nimble and dexterous, its configurations make full use of the system's volume. Furthermore, a key value of the SOE is the user's conviction of causality. In contrast to conventional systems in which the gesture vocabulary is flat or static primarily, the kiosk system of an embodiment achieves spatial manipulation with dynamic and sequential gestures incorporating movement along the depth dimension.

Figure 11:
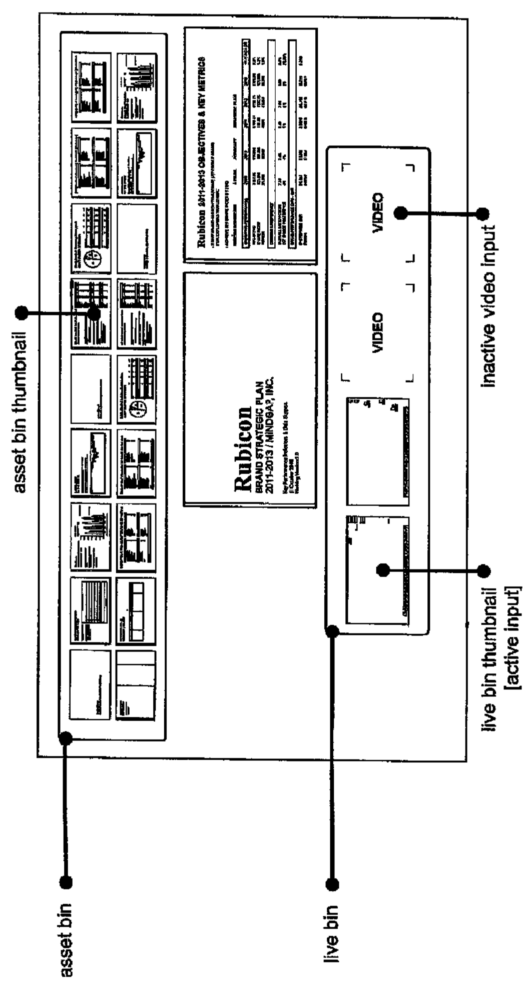
FIG. 11 is a histogram of the processing time results (latency) for each frame using the tracking and detecting component implemented in the kiosk system, under an embodiment.

In a characterization of latency, processing algorithms add approximately 10 milliseconds (ms) of latency with experiments showing a range from 2 to 30 ms (e.g., mean approximately 8.5 ms, standard deviation approximately 2.5 ms, minimum approximately 2 ms, maximum approximately 27 ms) depending on scene complexity. Experiments with embodiments reflected representative scenarios (e.g., one user, no clutter; one user with clutter; two users, no clutter). Results were estimated from 1,287 frames of data, in a typical hardware set-up (Quad Core Xeon E5506 running at 2.13 Ghz.). FIG. 11 is a histogram of the processing time results (latency) for each frame using the tracking and detecting component implemented in the kiosk system, under an embodiment. Results do not include hardware latency, defined as time between capture on the camera and transfer to the computer. Results also do not include acquisition latency, defined as time to acquire the depth data from the driver and into the first pool, because this latter value depends on driver implementation, and experiments were staged on the slower of the two drivers supported in kiosk development. The achieved latency of an embodiment for processing hand shapes is novel, and translates to interactive latencies of within one video frame in a typical interactive display system. This combination of accurate hand recognition and low-latency provides the seamless experience necessary for the SOE.

Gestures of A SOE in a Kiosk

The Related Applications describe an input gesture language, and define a gesture vocabulary string, referenced here, and illustrated in the figures herein. For example, FIG. 12 shows a diagram of poses in a gesture vocabulary of the SOE, under an embodiment. FIG. 13 shows a diagram of orientation in a gesture vocabulary of the SOE, under an embodiment. The markerless system recognizes at least the following gestures, but is not limited to these gestures:

1. GrabNav, Pan/Zoom: In a dynamic sequence, an open hand (\/\/-:x^) or open palm (||||-:x^) pushes along the x-axis and then transitions to a first (^^^^>).
2. Palette: A one-finger-point-open pointing upward toward ceiling (ofp-open, ^^^|→:x^, gun, L) transitions to a thumb click.
3. Victory: A static gesture (^^\/>:x^).
4. Goal-Post/Frame-It: Two ofp-open hands with the index fingers parallel point upward toward the ceiling (^^^|→:x^) and (^^^|-:x^).
5. Cinematographer: In a two-handed gesture, one ofp-open points with index finger pointing upward (^^^|-:x^). The second hand, also in ofp-open, is rotated, such that the index fingers are perpendicular to each other (^^^|-:x^).
6. Click left/right: In a sequential gesture, an ofp-open (^^^|-:x^) is completed by closing thumb (i.e., snapping thumb "closed" toward palm).
7. Home/End: In a two-handed sequential gesture, either opf-open (^^^|-:x^) or ofp-closed (^^^|>:x^) points at first (^^^>:x^) with both hands along a horizontal axis.
8. Pushback: U.S. patent application Ser. No. 12/553,845 delineates the pushback gesture. In the kiosk implementation, an open palm (|||-:x^) pushes into the z-axis and then traverses the horizontal axis.
9. Jog Dial: In this continuous, two-handed gesture, one hand is a base and the second a shuttle. The base hand is ofp-open pose (^^^|-:x^), the shuttle hand ofp-closed pose (^^^|>:x^).

These gestures are implemented as described in detail herein and as shown in FIGS. 14-16. The Spatial Mapping application includes gestures 1 through 5 above, and FIG. 14 is an example of commands of the SOE in the kiosk system used by the spatial mapping application, under an embodiment. The Media Browser application includes gestures 4 through 9 above, and FIG. 15 is an example of commands of the SOE in the kiosk system used by the media browser application, under an embodiment. The Edge Application Suite, Upload/Pointer/Rotate, includes gestures 3 and 8 above, and FIG. 16 is an example of commands of the SOE in the kiosk system used by applications including upload, pointer, rotate, under an embodiment.

Applications

Applications are described herein as examples of applications that realize the SOE approach within the particularities of the markerless setting, but embodiments of the SOE kiosk are not limited to only these applications. Implementing the SOE in a markerless setting, these applications achieve novel work and reflect different capabilities and priorities. The applications of an embodiment include Spatial Mapping, Media Browser, Rotate, Upload, and Pointer. The Spatial Mapping application enables robust manipulation of complex data sets including integration of external data sets. The Media Browser application enables fluid, intuitive control of light footprint presentations. The Rotate, Upload and Pointer applications comprise an iOS suite of applications that enable seamless navigation between kiosk applications. To provide low barrier to entry in terms of installation, portability, and free agency, the kiosk works with reduced sensing resources. The Kinect sensor described in detail herein, for example, provides frame rate of 30 Hz; a system described in the Related Applications comprises in an embodiment gloves read by a Vicon camera, is characterized by 100 Hz. Within this constraint, the kiosk achieves low-latency and reliable pose recognition with its tracking and detecting system.

The SOE applications presented herein are examples only and do not limit the embodiments to particular applications, but instead serve to express the novelty of the SOE. Specifically, the SOE applications structure allocation of the spatial environment and render appropriately how the user fills the geometrical space of the SOE. Stated in terms of user value, the SOE applications then achieve a seamless, comfortable implementation, where the user fully makes use of the volume of the SOE. Similarly, the SOE applications structure visual elements and feedback on screen—certainly for appropriate visual presence and, more fundamentally for the SOE, for a spatial manipulation that connects user gesture and system response.

The SOE applications described herein sustain the user's experience of direct spatial manipulation; her engagement with three-dimensional space; and her conviction of a shared space with graphics. So that the user manipulates data as she and graphics were in the same space, the SOE applications deploy techniques described below including but not limited to broad gestures; speed threshold; dimension-constrained gestures; and falloff.

In regard to architecture, the SOE applications of an embodiment leverage fully the interoperability approach of the SOE. The SOE applications display data regardless of technology stack/operating system and, similarly, make use of low-level data from edge devices (e.g., iPhone, etc.), for example. To connect an edge device to a SOE, the user downloads the relevant g-speak application. The description herein describes functionality provided by the g-speak pointer application, which is a representative example, without limiting the g-speak applications for the iOS or any other client.

As described in the Related Applications, regardless of input device, the SOE accepts events deposited by proteins into its pool architecture. Similarly, the SOE kiosk integrates data from iOS devices using the proteins and pool architecture. The applications described herein leverage feedback built into the kiosk stack. When a user's gesture moves beyond the range of the sensor at the left and right edges, as well as top and bottom, the system can signal with a shaded bar along the relevant edge. For design reasons, the applications provide feedback for movement beyond the left, right, and top edge.

Applications—Spatial Mapping

The Spatial Mapping application (also referred to herein as "s-mapping" or "s-map") provides navigation and data visualization functions, allowing users to view, layer, and manipulate large data sets. Working within the SOE built on a real-world geometry, s-map brings to bear assets suited to spatial data rendering. With this SOE framework, spatial mapping provides three-dimensional manipulation of large datasets. As it synchronizes data expression with interface, the user's interaction of robust data becomes more intuitive and impactful. Such rendering pertains to a range of data sets as described herein. The descriptions herein invoke a geospatial construct (the scenario used in the application's development).

The Spatial Mapping application provides a combination of approaches to how the user interacts with spatial data. As a baseline, it emphasizes a particular perception of control. This application directly maps a user's movements to spatial movement: effected is a one-to-one correlation, a useful apprehension and control where stable manipulation is desired. Direct data location, a key value in any scenario, can be particularly useful for an operator, for example, of a geospatial map. At the same time, s-map makes available rapid navigation features, where a user quickly moves through large data sets. So that the effects of her input are multiplied, the Spatial Mapping application correlates input to acceleration through spatial data. In its provision of gestures for stable manipulation and rapid navigation, s-mapping takes into account not only user motion and comfort, but also function. As described herein, the Spatial Mapping application corresponds the gesture to the kind of work the user undertakes. The SOE therefore provides a seamless throughput from user to data. The user's manipulations are the data commands themselves.

Filtering

The Spatial Mapping application of an embodiment opens displaying its home image such as, in the example used throughout this description, a map of earth. When the user presents the input hand element, the tracking and detection pipeline provides gesture data. The application additionally filters this data to provide users with a high-degree of precision and expressiveness while making the various actions in the system easy and enjoyable to perform. Raw spatial movements are passed through a first-order, low-pass filter before being applied to any interface elements they are driving.

With interactions such as the map navigation gesture where the user's physical movements directly drive the logical movements of the digital map, unintended motion or noise can make getting to a desired location difficult or impossible. Sources of noise include the natural trembling of the user's hand, error due to low-fidelity tracking sensors, and artifacts of the algorithms used in tracking the user's motion. The filtering of an embodiment comprises adaptive filtering that counters these sources of noise, and this filtering is used in analog-type gestures including but not limited to the grab navigation, frame-it, and vertical menu gestures to name a few.

Figure 17A:
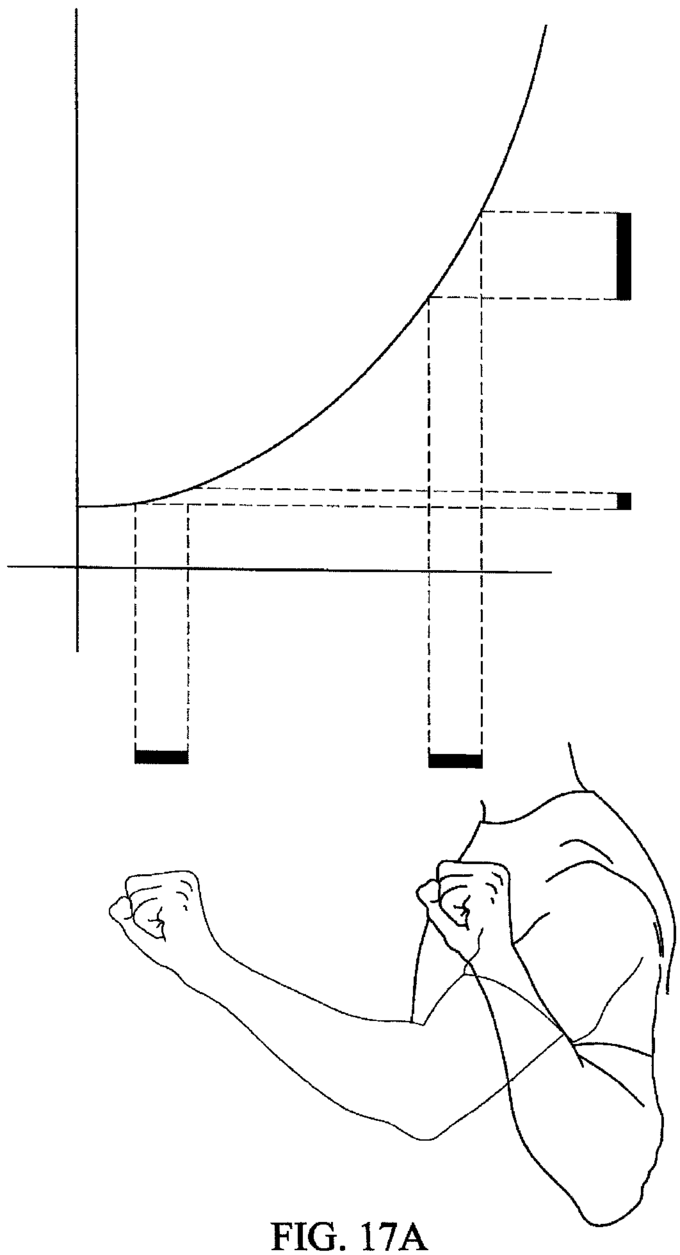
FIG. 17A shows the exponential mapping of hand displacement to zoom exacerbating the noise the further the user moves his hand.
Figure 17B:
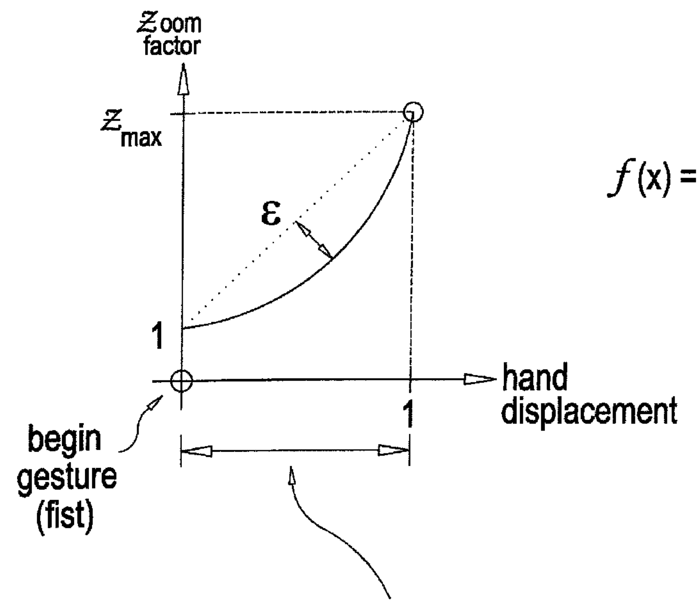
FIG. 17B shows a plot of zoom factor (Z) (Y-axis) versus hand displacement (X-axis) for positive hand displacements (pulling towards user) using a representative adaptive filter function, under an embodiment.
Figure 17C:
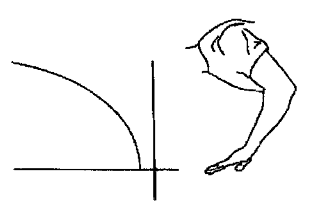
FIG. 17C shows the exponential mapping of hand displacement to zoom as the open palm drives the on-screen cursor to target an area on a map display, under an embodiment.
Figure 17D:
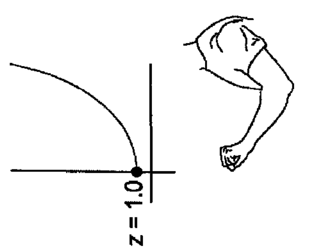
FIG. 17D shows the exponential mapping of hand displacement to zoom corresponding to clenching the hand into a first to initialize the pan/zoom gesture, under an embodiment.

Considering the grab gesture as an example using the adaptive filtering of an embodiment, FIG. 17A shows the exponential mapping of hand displacement to zoom exacerbating the noise the further the user moves his hand. To counter this effect, the strength of the filter is changed adaptively (e.g., increased, decreased) in an embodiment in proportion to the user's displacement. FIG. 17B shows a plot of zoom factor (Z) (Y-axis) versus hand displacement (X-axis) for positive hand displacements (pulling towards user) using a representative adaptive filter function, under an embodiment. The representative adaptive filter function of an example is as follows, but is not so limited: Considering the grab gesture example in detail further, FIG. 17C shows the exponential mapping of hand displacement to zoom as the open palm drives the on-screen cursor to target an area on a map display, under an embodiment. FIG. 17D shows the exponential mapping of hand displacement to zoom corresponding to clenching the hand into a first to initialize the pan/zoom gesture, under an embodiment. The displacement is measured from the position where the first first appears.

$$f(x) = 1 + \frac{\exp(\varepsilon \cdot x) - 1}{\exp(\varepsilon) - 1} \times Zmax$$

The variable ε represents eccentricity of the filter function curve, the variable x represents range of motion, and Zmax represents the maximum zoom. The normalized displacement allows the full zoom range to be mapped to the user's individual range of motion so that regardless of user, each has equal control over the system despite physical differences in body parameters (e.g., arm length, etc.). For negative hand displacements (pushing away), the zoom factor (Z) is calculated as follows:

$$Z = \frac{1}{f(\|x\|)}$$

Figure 17E:
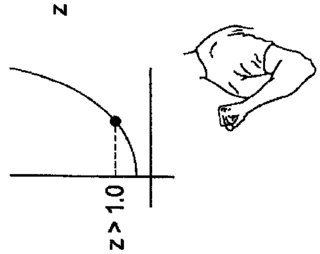
FIG. 17E shows the exponential mapping of hand displacement to zoom during panning and zooming (may occur simultaneously) of the map, under an embodiment.

FIG. 17E shows the exponential mapping of hand displacement to zoom during panning and zooming (may occur simultaneously) of the map, under an embodiment. The initial hand displacement of an embodiment produces a relatively shallow amount of zoom, and this forgiveness zone allows for a more stable way to navigate the map at a fixed zoom level.

Figure 17F:
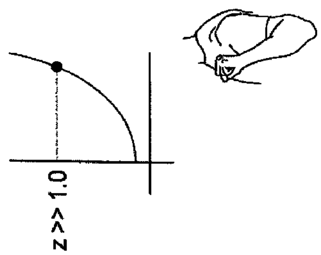
FIG. 17F shows that the exponential mapping of hand displacement to zoom level as the open palm drives the on-screen cursor to target an area on a map display allows the user to reach greater distances from a comfortable physical range of motion, under an embodiment.
Figure 17G:
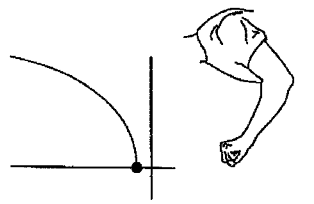
FIG. 17G shows that the direct mapping of hand displacement ensures that the user may always return to the position and zoom at which they started the gesture, under an embodiment.

FIG. 17F shows that the exponential mapping of hand displacement to zoom level as the open palm drives the on-screen cursor to target an area on a map display allows the user to reach greater distances from a comfortable physical range of motion, under an embodiment. FIG. 17G shows that the direct mapping of hand displacement ensures that the user may always return to the position and zoom at which they started the gesture, under an embodiment.

Navigating Data Sets

The user can navigate this home image, and subsequent graphics, with a sequence of gestures two-fold in effect. This sequence is referred to with terms including grab/nav and pan/zoom. Throughout the Spatial Mapping application, the "V" gesture (^^\/>:x^) initiates a full reset. The map zooms back to its "home" display (the whole earth, for example, in the geospatial example begun above).

First, the user "grabs" the map. An open hand (\/\/-:x^) or open palm (||||-:x^) moves a cursor across the lateral plane to target an area. A transition to a first (^^^^>:x^) then locks the cursor to the map. The user now can "drag" the map: the first traversing the frontal plane, mapped to the image frame, moves the map. In a function analogous to pushback (comments below), pan/zoom correlates movement along the depth dimension to other logical transformations.

In the pan/zoom sequence, the user pushes the first (^^^^>:x^) toward the screen to effect a zoom: the visible area of the map is scaled as to display a larger data region. Throughout the gesture motion, data frame display is tied to zoom level. Data frames that most clearly depict the current zoom level stream in and replace those too large or too small as the map zooms. Similarly, as the user pulls the first away from the screen, the map scales towards the area indicated, displaying a progressively smaller data region. Additionally, the user may pan the visible area of the map by displacing the first within the frontal plane, parallel with the map. Lateral first movements pan the map to the right and left while vertical first movements pan up and down.

The sensing environment of the kiosk, limited, would misinterpret this transition from open hand to fist. As the user rapidly traverses the lateral plane, the sensor interprets the palm, blurred, as a fist. To secure functionality, the Spatial Mapping application incorporates a speed threshold into the gesture. Rapid movement does not trigger detection of fist, and its subsequent feedback. Instead, the embodiment uses intentional engagement: if a certain speed is exceeded in lateral movement, the application interprets the movement as continued. It does not jump into "first" recognition.

The first gesture is a broad gesture that works within the precision field of the sensor. At the same time it provides a visceral design effect sought with grab: the user "secures" or "locks" her dataspace location. Even with a sensor such as the Kinect described herein, which does not allow pixel-accurate detection, the user is able to select map areas accurately.

As a tool for manipulating large data sets, s-mapping juxtaposes this lock step with nimble movement. Working with extensive data sets, the user needs to push through broad ranges. The user with a map of the earth might jump from the earth level, to country, state, and city.

Direct mapping would compromise this sweep through data. Therefore, the gesture space of the system of an embodiment limits the range of the gesture. Furthermore, the tolerances of the user limit the gesture range of an embodiment. Typically, a user moves her hands comfortably only within a limited distance. Imprecision encroaches upon her gesture, destabilizing input.

Conforming gestures to usability parameters is a key principle and design execution of the SOE. For robust navigation through large data sets, the application uses "falloff," a technique of non-linear mapping of input to output. It provides an acceleration component as the user zooms in or out of a data range.

The system measures displacement from the position where the first first appears. Since it remembers the origin of z-displacement, the user can return to the position where she started her zoom gesture. While the application supports simultaneous pan and zoom, initial hand offset yields a limited effect. This buffer zone affords stable navigation at a fixed zoom level.

The application exponentially maps z-displacement of the hand to zoom as described in detail herein. In its effect, the mapping application recalls a key functionality of pushback, whereby the user quickly procures context within a large dataset. The Related Applications contextualize and describe the gesture in detail. Pushback relates movement along the depth dimension to translation of the dataspace along the horizontal axis. The user's movement along the depth dimension triggers a z-axis displacement of the data frame and its lateral neighbors (i.e., frames to the left and right). In s-map, the map remains spatially fixed and the user's movement is mapped to the logical zoom level, or "altitude factor." As stated, panning and zooming can occur simultaneously in the application. Components such as "dead space" and glyph feedback, which do not figure in s-map, are included in the media browser application described later in this document.

Layering Data Sets

The second provision of s-map is its visualization of multiple data sets. With the proliferation of complex, large data sets, the navigation of individual ranges is followed effectively by the question of their juxtaposition. The application combines access to data sets with their fluid layering.

The Related Applications describe how the SOE is a new programming environment. A departure from traditional interoperation computing, it integrates manifold and fundamentally different processes. It supports exchange despite differences in data type and structure, as well as programming language. In the mapping application, the user then can access and control data layers from disparate sources and systems. For example, a geospatial iteration may access a city-state map from a commercial mapping vendor; personnel data from its own legacy system; and warehouse assets from a vendor's system. Data can be stored locally or accessed over the network.

The application incorporates a "lens" feature to access this data. Other terms for this feature include but are not limited to "fluoroscope." When laid onto a section of map, the lens renders data for that area. In a manner suggested by "lens" label, the area selected is seen through the data lens. The data sets appear on the left side of the display in a panel (referred to as "pane," "palette," "drawer," and other similar terms). S-map's design emphasizes the background map: the visual drawer only is present when in use. This is in keeping with the SOE emphasis on graphics as manipulation, and its demotion of persistent menus that might interfere with a clean spatial experience.

The gesture that pulls up this side menu mirrors workflow. First, an ofp-open (^^^|-:x^) triggers a vertical menu to display on the left side of the screen. The call is ambidextrous, summoned by the left or right hand. Then, vertical motion moves within selections, and finally, a click with the thumb or ratchet-rotation of the wrist fixes the selection. When moving up or down for selection, only the y-axis contributes to interface response. Incidental x- and z-components of the hand motion make no contribution. This lock to a single axis is an important usability technique employed often in SOE applications.

This design reflects two principles of the system of an embodiment. Aligning with workflow, the sequence is designed to correlate with how the user would use the gestures. Second, their one-dimensional aspect allows extended use of that dimension. While the SOE opens up three dimensions, it strategically uses the components of its geometry to frame efficient input and create a positive user experience.

During this selection process, as throughout the program, the user can reset in two ways. As noted herein, the "V" gesture (^^V>:x^) yields a full reset. The map zooms back to its "home" display (the whole earth, for example, in the geospatial example begun above. Any persistent lenses fade away and delete themselves. The first gesture accomplishes a "local" reset: if the user has zoomed in on an area, the map retains this telescoped expression. However, by forming the first gesture, the lens will fade away and delete itself upon escaping the gesture. In both the "V" and first reset, the system retains memory of the lens selection, even as physical instances of the lens dissipate. The user framing a lens after reset creates an instance of the lens type last selected.

The first gesture, as described herein, is the "grab" function in navigation. With this gesture recall, the interface maintains a clean and simple feel. However, the application again designs around user tolerances. When forming a fist, one user practice not only curls the finger closed, but then also drops the hand. Since the application deploys direct mapping, and the first gesture "grabs" the map, the dropping hand yanks the map to the floor. Again, a speed threshold is incorporated into the gesture: a user exceeding a certain speed does not trigger grab. Instead the system interprets the first as reset.

Layering Data Sets—Overlaying

After selecting a data set, the user creates and uses a layer in three ways: (1) moving it throughout the map; (2) resizing the lens; and (3) expanding it to redefine the map. To engage these actions, the user instantiates a lens. Again following workflow, the gesture after selection builds on its configuration of either left or right opf-open hand. To render the selected lens, the second hand is raised in "frame-it" (appearing like a goal-post). It uses two ofp-open hands with the index fingers parallel and pointing toward the ceiling (^^^|-:x^) and (^^^|-:x^). The gesture segues cleanly from the palette menu gesture, easily extending it.

This data lens now can be repositioned. As described herein, as the user moves it, the lens projects data for the area over which it is layered. The user may grow or shrink the size of the lens, by spreading her hands along the lateral base of her "frame" (i.e., along the x-axis, parallel to the imaginary line through her outstretched thumbs). The default fluoroscope expression is a square, whose area grows or shrinks with resizing. The user can change the aspect ratio by rotating "frame-it" ninety degrees. In function, this "cinematographer" gesture (^^^|-:x^) and (^^^|-:x-) is equivalent to "frame-it." Feature-wise, though, the user can set aspect ratio by resizing the rectangle formed by his hands.

This "frame-it"—as a follow-up gesture—is more advanced, and is leveraged fully by a "pro" user, who optimizes for both feature and presentation. The SOE gestural interface is a collection of presentation assets: gestures are dramatic when performed sharply and expressing full-volume when possible. The user can swing this cinematographer frame in a big arc, and so emphasize the lens overlay. The rich gestural interface also lets the user fine-tune his gestures as he learns the tolerances of the system. With these sharp or dramatic gestures, he can optimize his input.

The fluoroscope can engage the screen and express its data in a number of ways. Three example methods by which the fluoroscope engages the screen and so expresses its data are as follows:

(1) For the data layer to subsume the entire screen (shifting into "fullscreen" mode), the user spreads his hands. Beyond a threshold distance, the lens shifts into fullscreen mode where it subsumes the entire screen.

(2) To fix the data layer to the map, the user pushes the lens "onto" the map; i.e. pushing toward the screen. The user, for example, can assign the lens to a particular area, such as a geographic region. As the user moves the map around, the lens remains fixed to its assigned area.

(3) To fix the data layer to the display, the user pulls the lens toward him. The lens, affixed to the display, floats above the background image. As the user moves the map around, the map reveals data when moved underneath the lens.

This pushing or pulling snaps the lens onto, respectively, the map or the display. The sequence from resizing to snapping is an illustration of how the application uses the building blocks of the SOE geometry. As with lens selection (when gestures expressed/constrained within one dimension called up the palette), lens resizing also occurs within one plane, i.e. frontal. The z-axis then is used for the snap motion.

These gestures for data layering are designed around user practice for two reasons. First, when a user "frames" a lens, the embodiment considers how quickly the user wants to slide his hands together/apart. The comfortable and expressive range of motion is measured in terms of actual space. To reflect how far the body wants to move, the application can be adjusted or adapted per user, per gesture. In addition to enhancing the user experience, this approach is output agnostic. The size of the screen does not affect the gesture expression. This decoupling, where the user's movement is constant, facilitates porting the application.

As the user selects and implements lenses, overlay can incorporate transparency. Topology data is an example of a lens that makes use of transparency. The system composites lenses on top of the base map and other layers, incorporating transparency as appropriate.

Edge Devices

As an SOE agent, s-map allows the option of incorporating low-level data from edge devices (as defined in "Context" above). This includes but is not limited to "pointer" functionality, where the application makes use of inertial data from a device. The device, an example of which is an iPhone, comprises the downloaded g-speak pointer application for the iOS client. Pointing the phone at the screen, and holding a finger down, any user within the SOE area can track a cursor across the display.

Applications—Media Browser

The media browser is built to provide easy use and access. It reflects the organic adaptability of the SOE: while its engineering enables dynamic control of complex data sets, its approach naturally distills in simpler expressions. A complete SOE development space, the kiosk supports applications suitable for a range of users and operational needs. Here, the browser allows intuitive navigation of a media deck.

On initiation, the application opens to a home slide with a gripe "mirror" in the upper right hand area. A system feedback element, this mirror is a small window that indicates detected input. The information is anonymized, the system collecting, displaying, or storing no information particular to users outside of depth. The mirror displays both depth information and gripe string. The feedback includes two benefits. First, the application indicates engagement, signaling to the user the system is active. Second, the mirror works as an on-the-spot debugging mechanism for input. With the input feedback, the user can see what the system interprets her as doing.

Non-Scrolling Gestures/Function

At its start no one gesture is required to initiate action under an embodiment. The user can provide input as necessary to his function, which include but are not limited to the following: previous/next, where the user "clicks" left or right to proceed through the slides one-by-one; home/end, where the user jumps to first or last slide; overview, where the user can view all slides in a grid display and select; velocity-based scrolling, where the user rapidly scrolls through a lateral slide display.

The inventory herein lists gestures by name and correlating function, and then describes the system input. To proceed through the slides one-by-one, the user "clicks" left/right for previous/next.

The gesture is a two-part sequence. The first component is ofp-open (^^^|-:x^); its orientation indicates direction: pointing up with the left hand moves left, to the previous slide; pointing up with the right hand moves right, to the next slide; pointing left or right (with the index finger parallel to the ground) moves in the direction of the point.

The application provides visual feedback on the user's input. This first part of the gesture prompts oscillating arrows. Appearing on the relevant side of the screen, the arrows indicate the direction the browser will move, as defined by the user's orientation input. The second part of the gesture "clicks" in that direction by closing the thumb (^^^||:x^ or ^^^|>:x^). Visual feedback is also provided including, but not limited to, arrows that darken slightly to indicate possible movement, and a red block that flashes to indicate user is at either end of slide deck.

To jump to the first or last slide, the user points to his fist, both hands along a horizontal axis. The system accepts pointing either open (^^^|-:x^) or closed (^^^|>:x^). The pointing direction determines direction. Pointing left (toward left first) jumps to first slide. Pointing right (toward right first) jumps to last slide.

With the overview function, the browser displays all slides in a grid. To enter overview, the user points both hands in the cinematographer gesture. Either cinematographer or goal post exits the user from overview, back to the last displayed slide. Pushback lets the user scroll across slides and select a different one to display in the sequential horizontal deck.

Scrolling Gestures/Functions—Pushback

The scrolling function of the browser enables a user to rapidly and precisely traverse the horizontal collection of slides that is the deck. Two gestures—pushback and jog-dial—enact capabilities analogous to scrolling. Their descriptions herein include comments on how the media browser application allocates space, on behalf of the user, and correlates user movement to graphics display.

The Related Applications describe how pushback structures user interaction with quantized—"detented"—spaces. By associating parameter-control with the spatial dimension, it lets the user acquire rapid context. Specifically, in the media browser, the slides comprising elements of the data set are coplanar and arranged laterally. The data space includes a single natural detent in the z-direction and a plurality of x-detents. Pushback links these two.

The pushback schema divides the depth dimension into two zones. The "dead" zone is the half space farther from the display; the "active" zone is that closer to the display. Along the horizontal plane, to the left and right of the visible slide are its coplanar data frames, regularly spaced.

The user, when on a slide, forms an open palm (||||-:x^). The system, registering that point in space, displays a reticle comprising two concentric glyphs. The smaller inner glyph indicates the hand is in the dead zone. The glyph grows and shrinks as the user moves his hand forward and back in the dead zone. In order to expand available depth between his palm and screen, the user can pull his hand back. The inner glyph reduces in size until a certain threshold is reached, and the ring display stabilizes.

At any time the user can push into the z-axis. When he crosses the threshold separating dead zone from active, the system triggers pushback. The system measures the z-value of the hand relative to this threshold, and generates a correspondence between it and a scaling function described herein. The resulting value generates a z-axis displacement of the data frame and its lateral neighbors. The image frame recedes from the display, as if pushed back into perspective. In the media browser the effect is the individual slide receding into the sequence of slides. As the user pushes and pulls, the z-displacement is updated continuously. The effect is the slide set, laterally arranged, receding and verging in direct response to his movements.

The glyph also changes when the user crosses the pushback threshold. From scaling-based display, it shifts into a rotational mode: the hand's physical z-axis offset from the threshold is mapped into a positive (in-plane) angular offset. As before, the outer glyph is static; the inner glyph rotates clockwise and anti clockwise, relating to movement toward and away from the screen.

The user entering the active zone triggers activity in a second dimension. X-axis movement is correlated similarly to x-displacement of the horizontal frame set. A positive value corresponds to the data set elements—i.e., slides—sliding left and right, as manipulated by the user's hand. In the media browser, as the user scrolls right, the glyph rotates clockwise. Scrolling left, the glyph rotates counterclockwise. The user exits pushback and selects a slide by breaking the open-palm pose. The user positions the glyph to select a slide: the slide closest to glyph center fills the display. The frame collect springs back to its original z-detent, where one slide is coplanar with the display.

Figure 18A:
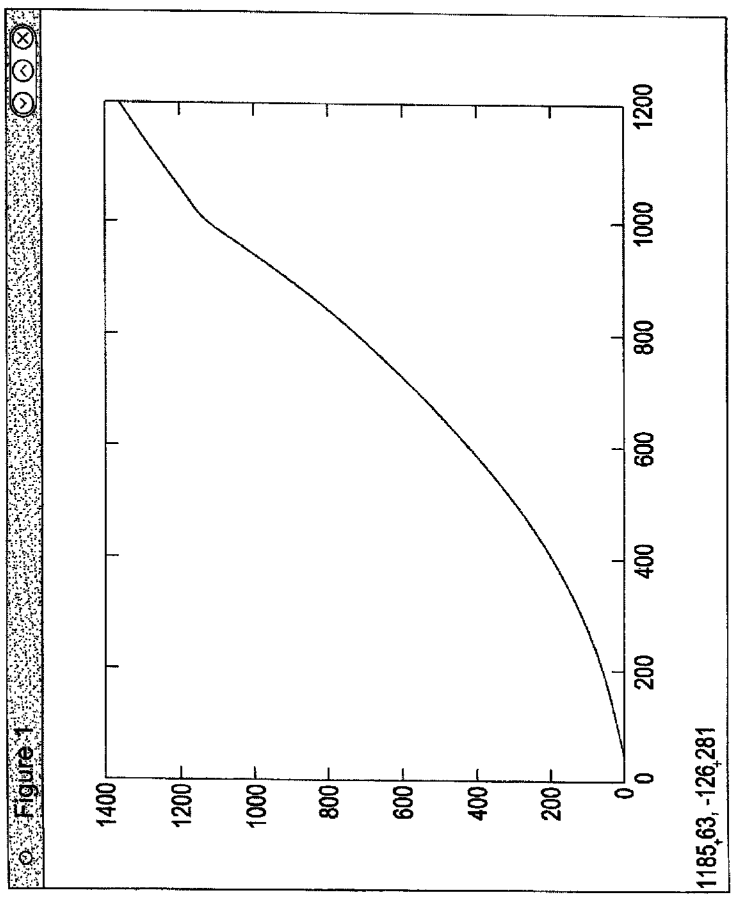
FIG. 18A is a shove filter response for a first range [0 . . . 1200] (full), under an embodiment.
Figure 18B:
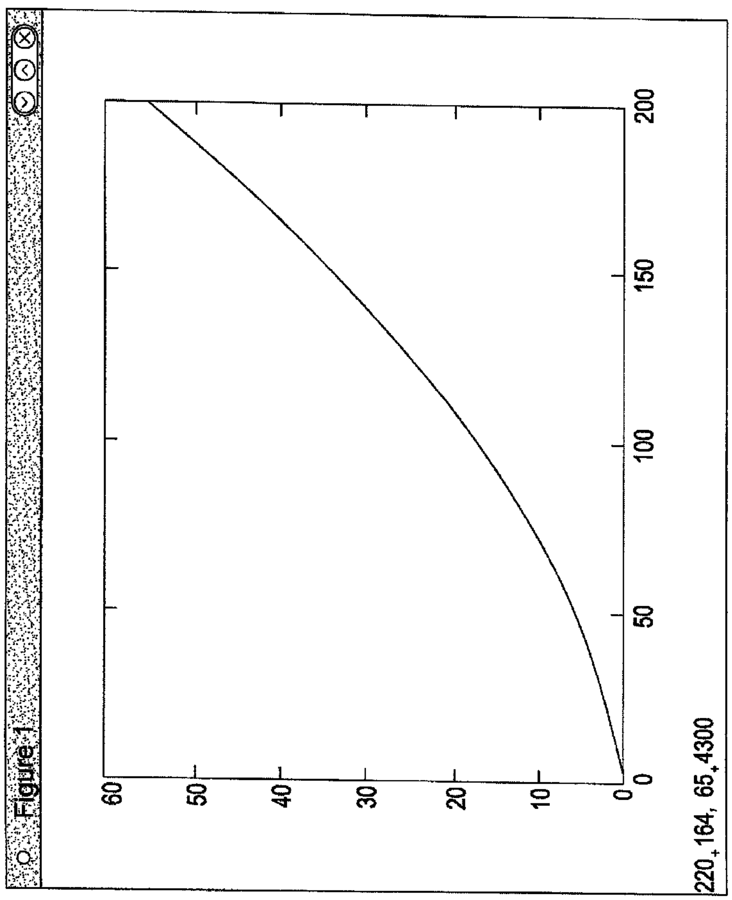
FIG. 18B is a shove filter response for a second range [0 . . . 200] (zoom), under an embodiment.

Expressions of the system's pushback filter are depicted in FIGS. 18A and 18B. In summary, the application calculates hand position displacement, which is separated into components corresponding to the z-axis and x-axis. Offsets are scaled by a coefficient dependent on the magnitude of the offset. The coefficient calculation is tied to the velocity of the motions along the lateral and depth planes. Effectively, small velocities are damped; fast motions are magnified.

Pushback in the media browser includes two components. The description above noted that before the user pushes into the z-axis, he pulls back, which provides a greater range of z-axis push. As the user pulls back, the system calculates the displacement and applies this value to the z-position that is crossed to engage pushback. In contrast to a situation where the user only engages pushback near the end of the gesture, this linkage provides an efficient gesture motion.

Additionally, pushback in the media browser application is adapted for sensor z-jitter. As the palm pushes deeper/farther along the z-axis, the sensor encounters jitter. To enable stable input within the sensor tolerance, the system constrains the ultimate depth reach of the gesture. Example expressions of pushback gesture filters implemented in the media browser application of the kiosk are as follows, but the embodiment is not so limited:

```
double Pushback::ShimmyFilterCoef(double mag, double dt)
{
const double vel = mag / dt; // mm/s
const double kmin = 0.1;
const double kmax = 1.1;
const double vmin = 40.0;
const double vmax = 1800.0;
double k = kmin;
if (vel > vmax) k = kmax;
else if (vel > vmin) k = kmin + (vel−vmin)/(vmax−vmin)*(kmax−kmin);
return k;
}
double Pushback::ShoveFilterCoef(double mag, double dt)
{
const double vel = mag / dt; // mm/s
const double kmin = 0.1;
const double kmax = 1.1;
const double vmin = 40.0;
const double vmax = 1000.0;
double k = kmin;
if (vel > vmax) k = kmax;
else if (vel > vmin) k = kmin + (vel−vmin)/(vmax−vmin)*(kmax−kmin);
return k;
}
pos_prv = pos_cur; // new time step so cur becomes prev
const Vect dv = e->CurLoc( ) − pos_prv;
double deltaShove = dv.Dot(shove_direc);
deltaShove *= ShoveFilterCoef(fabs(deltaShove), dt);
double deltaShimmy = dv.Dot(shimmy_direc);
deltaShimmy *= ShimmyFilterCoef(fabs(deltaShimmy), dt);
pos_cur = pos _prv + shove_direc*deltaShove +
shimmy_direc*deltaShimmy;
```

"Shimmy" covers lateral motion and "Shove" covers forward/backward motion. Both filters are the same in an embodiment, except the shove filter vmax is smaller, which results in faster movement sooner.

Generally, an embodiment computes the position offset (dv) for the current frame and then separates it into the shove component (deltaShove) and shimmy (deltaShimmy) component, which corresponds to the z-axis and x-axis. An embodiment scales the partial offsets by a coefficient that depends on the magnitude of the offset, and reconstructs the combined offset.

If the coefficient is 1.0, no scaling is applied and the physical offset is exactly mapped to the virtual offset. A value in (0.0, 1.0) damps the motion and a value above 1.0 magnifies the motion.

The coefficient calculation is a linear interpolation between a minimum and maximum coefficient (0.1 and 1.1 here) based on where the velocity sits in another range (40 to 1800 for shimmy and 40 to 1000 for shove). In practice, this means that for small velocities, significant damping is applied, but fast motions are magnified by to some degree (e.g., 10%, etc.).

FIG. 18A is a shove filter response for a first range [0 . . . 1200] (full), under an embodiment. FIG. 18B is a shove filter response for a second range [0 . . . 200] (zoom), under an embodiment.

Scrolling Input/Functions—Jog-Dial

Jog-dial provides an additional scrolling interaction. This two-handed gesture has a base and shuttle, which provides velocity control. The base hand is ofp-open (^^^|-:x^), and the shuttle hand is ofp-closed (^^^|>:x^). When the system detects the gesture, it estimates their distance over a period of 200 ms, and then maps changes in distance to the horizontal velocity of the slide deck. The gesture relies on a "dead" zone, or central detent, as described in the Related Applications.

At any distance exceeding that minimal one, the application maps that value to a velocity. A parameter is calculated that is proportional to screen size, so that the application considers the size of screen assets. This enables, for example, rapid movement on a larger screen where display elements are larger. The speed is modulated by frame rate and blended into a calculated velocity of the shuttle hand.

Example expressions of jog-dial implemented in an embodiment of the kiosk are as follows, but the embodiment is not so limited:

```
double MediaGallery::ShuttleSpeed(double vel) const
{
double sign = 1.0;
if (vel < 0.0){
sign = −1.0;
vel = −vel;
}
const double a = 200.0;
const double b = 1.0;
const double c = 0.05;
const double d = 140.0;
const double alpha = std::min(1.0, vel/a);
return sign * −shuttleScale * (vel*alpha + (1.0−alpha)*a
/ (b+exp(−c*(vel−d))));
}
const double detent = 15.0;
double dx = dist − baseShuttleDist;
if (fabs(dx) < detent) return OB_OK; // central detent
if (dx < 0) dx += detent;
else dx −= detent;
// map hand offset into slide offset
double dt = now − timeLastShuttle;
timeLastShuttle = now;
double offset = ShuttleSpeed(dx) * dt;
shuttleVelocity = offset*0.6 + shuttleVelocity*0.4;
```

Generally, the SOE kiosk of an embodiment estimates hand distance (baseShuttleDist) when the interaction starts and then any changes within approximately +/−15 mm have no effect (the central detent), but the embodiment is not so limited. If a user moves more than +/−15 mm, the distance (minus the detent size) is mapped to a velocity by the ShuttleSpeed function. The shuttleScale parameter is proportional to the screen size as it feels natural to move faster on a larger screen since the assets themselves are physically larger. Further, the speed is modulated by the frame rate (dt) and blended into the global shuttleVelocity.

Figure 19A:
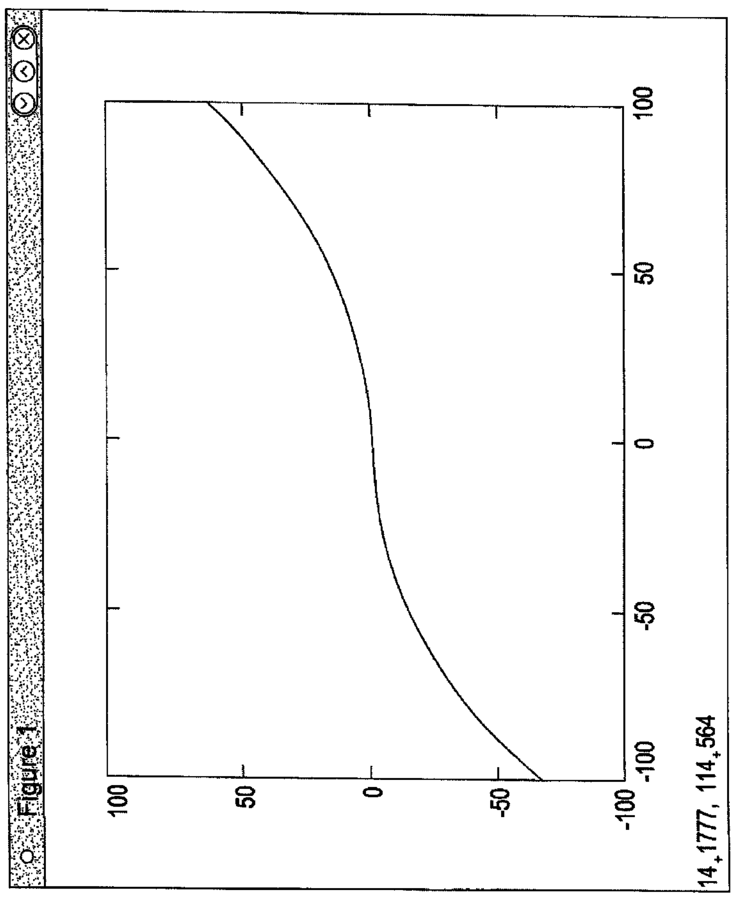
FIG. 19A is a first plot representing velocity relative to hand distance, under an embodiment.
Figure 19B:
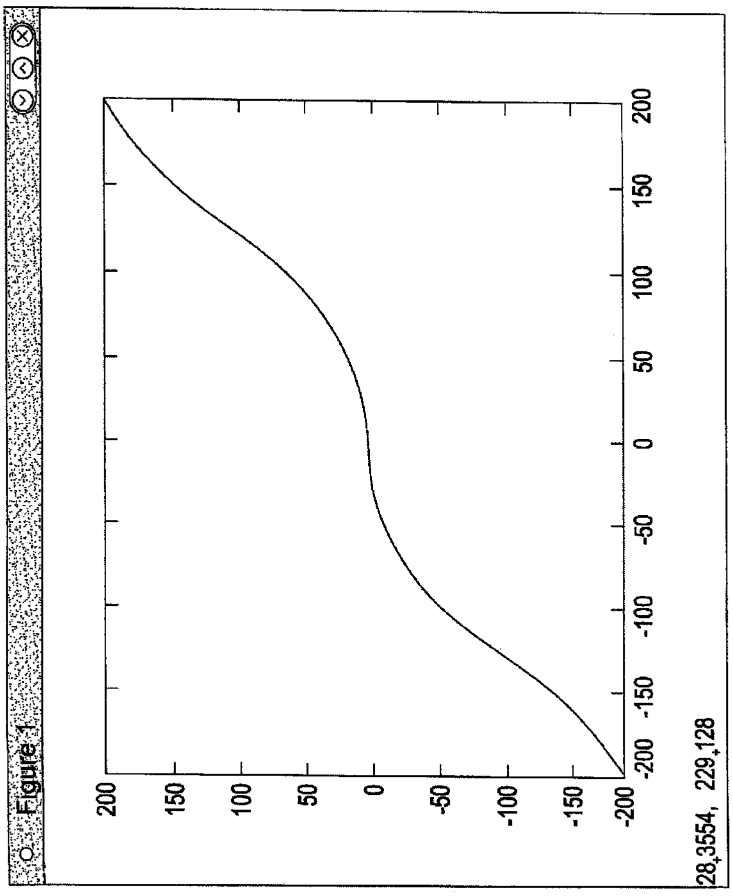
FIG. 19B is a second plot representing velocity relative to hand distance, under an embodiment.
Figure 19C:
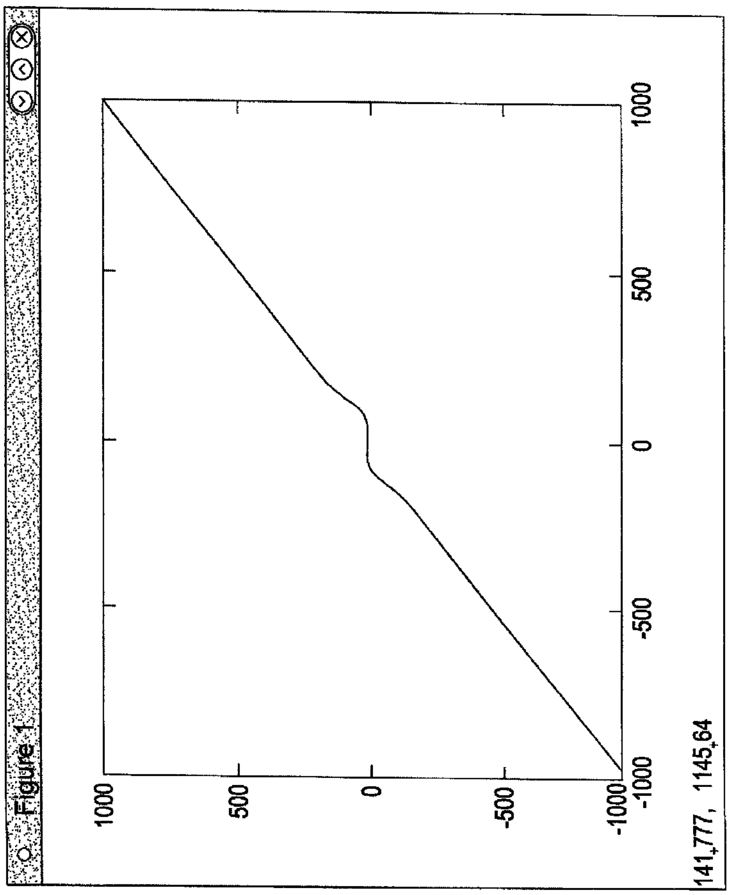
FIG. 19C is a third plot representing velocity relative to hand distance, under an embodiment.

The achieved effect is essentially linear, as depicted in FIGS. 19A-19C, which show how the function behaves over different scales and hand distances. FIG. 19A is a first plot representing velocity relative to hand distance, under an embodiment. FIG. 19B is a second plot representing velocity relative to hand distance, under an embodiment. FIG. 19C is a third plot representing velocity relative to hand distance, under an embodiment. The embodiment is generally linear, meaning distance is directly mapped to velocity, but for small distances the system can move even more slowly to allow more control because the combination of features disclosed herein allows both precise, slow movement and rapid movement.

iPhone Input

As an SOE agent, the media browser accepts and responds to low-level data available from different devices. For example, the browser accepts inertial data from a device such as an iPhone, which has downloaded the g-speak application corresponding to the iOS client. The architecture can designate inputs native to the device for actions: in this instance, a double-tap engages a "pointer" functionality provided by the g-speak pointer application. Maintaining pressure, the user can track a cursor across a slide.

Video

The application supports video integration and control. Ofp-open (^^^|-:x^) plays video; closing to a first (^^^^>:x^) pauses. Again, the system also accepts data like that from an iPhone, enabled with the g-speak pointer application: double tap pauses playback; slide triggers scrubbing.

Applications—Edge Suite—Upload, Pointer, Rotat

A suite of applications highlights the data/device integration capabilities of the kiosk. As noted earlier, the SOE is an ecumenical space. The plasma architecture described in the Related Applications sets up an agnostic pool for data, which seeks and accepts the range of events. While it is designed and executed to provide robust spatial functionalities, it also makes use of low-level data available from devices connected to the SOE.

The upload, pointer, and rotate applications collect and respond to low-level data provided by a device fundamentally not native to the environment; i.e., a device not built specifically for the SOE. The edge device downloads the g-speak application to connect to the desired SOE. Described herein is functionality provided by the g-speak pointer application, which is representative without limiting the g-speak applications for the iOS or any other client.

In these applications an iOS device with the relevant g-speak application can join the SOE at any time, and the data from this "external" agent is accepted. Its data is low-level, constrained in definition. However, the SOE does not reject it based on its foreign sourcing, profile, or quality. Data is exchanged via the proteins, pools, and slawx architecture described in the Related Applications and herein. The edge device can deposit proteins into a pool structure, and withdraw proteins from the pool structure; the system looks for such events regardless of source.

This low-level data of an embodiment takes two forms. First, the iOS generates inertial data, providing relative location. The SOE also makes use of "touchpad" mode, which directly maps commands to screen. Persistent is the robust spatial manipulation of an SOE; at the same time, gesture use is strategic. Applications like upload/rotate/pointer are developed specifically for general public settings, where an unrestricted audience interacts with the kiosk. The suite, then, chooses to use a select number of gestures, optimizing for ease-of-use and presentation.

Displayed on the system's home screen are elements including the g-speak pointer app icon, kiosk application icons, the tutorial, and the sensor mirror. The g-speak pointer app icon provides download information. To navigate across applications, the user input is pushback. As her open hand pushes toward the screen (into the z-axis), the menu recedes into a display she rapidly tracks across (in this example, along the horizontal axis). To select an application, the user pauses on the desired application. The "V" gesture (^^\/>:x^) prompts selection. Pushback (μμ-:x^) is used across the applications as an exit gesture. Once the user's open palm crosses a distance threshold, the screen darkens and assets fade. Breaking the gesture, as with a closed fist, triggers exit.

The tutorial and sensor mirror are displayed in a panel near the bottom of every screen, including this system start screen. Installations are described herein where this example suite is used in unrestricted settings, where the general public interacts with the kiosk. The tutorial and sensor mirror are elements beneficial in such settings.

The tutorial is a set of animations illustrating commands to navigate across applications (and, within a selection, to use the application). The sensor mirror, as noted earlier, can act effectively as a debugging mechanism, its feedback helping the user adjust input. Like the tutorial, it also is useful for public access. With a traditional computer, the system is dormant until the user activates engagement. With the kiosk, the sensor mirror is a flag, indicating to the user the system has been engaged. As stated herein, the information is anonymized and restricted to depth.

Upload is an application for uploading and viewing images; its design reflects its general public use in settings such as retail and marketing but is not so limited. It deploys familiar iOS client actions. A vertical swipe switches an iPhone to its camera screen, and the user takes a photo. The phone prompts the user to discard or save the image. If a user opts to save, the file is uploaded to the system, which displays the image in its collection. The system accepts the default image area set by the device, and this value can be modified by the application caretaker.

Applications—Edge Suite—Upload

The default display is a "random" one, scattering images across the screen. A highlighted circle appears behind an image just uploaded. A double-tap selects the photo. To drag, a user maintains pressure. This finger engagement with the screen issues inertial data accepted by the kiosk.

Moving an image to front and center enlarges the image, in this example. Additional display patterns include a grid; a whorl whose spiral can fill the screen; and radial half-circle. A horizontal swipe cycles through these displays (e.g., with left as previous, and right as next). A double-tap rotates an image rotated by a display like whorl or radial.

The user also can provide touchpad input. This is a direct mapping to the screen (instead of inertial). Double-tap again selects an image, and maintained pressure moves an element. A swipe is understood as this same pressure; a two-finger swipe, then, cycles through displays.

Applications—Edge Suite—Pointer

Pointer is an experiential, collaborative application that engages up to two users. A swipe starts the application. Displayed is a luminescent, chain-link graphic for each user. The chains are bent at its links, coiled and angled in random manner. A double-tap is selection input; maintaining pressure lets the user then move the chain, as if conducting it.

This engagement is designed around the system environment, which presents latency and precision challenges. First, the user connects typically over a wireless network that can suffer in latency. Also, user motion may be erratic, with input also constrained by the data provided by the device. Instead of structuring selection around specific points, the application reads selection as occurring with a general area. As the user swirls the chain across the screen, the visual feedback is fluid. It emphasizes this aesthetic, masking latency.

The pointer application also provides touchpad interaction. Double-tap selects an area, and maintained pressure moves the pointer. The application accepts and displays input for up to two devices.

Applications—Edge Suite—Rotate

A multi-player, collaborative pong game, rotate layers gesture motion on top of accelerometer data. In this example, a ratchet motion controls the paddle of a pong game.

Displayed at start, the field of play is a half-circle (180 degrees). A ball bouncing off the baseline of the half-circle ricochets off at some random angle toward an arc that is a paddle controlled by a user. Each participant is assigned an arc, its color correlated to its player. The player moves the paddle/arc to strike the ball back to the baseline. Each time the ball bounces again off the center, its speed increases. Each time it strikes the paddle, the paddle gets smaller. (This decrease is some set small percentage, whereby the paddle does not disappear.) The game, then, increases in difficulty.

A double-tap joins the game. The user, maintaining pressure with a digit, rotates the paddle with a ratchet motion. Radial input from the device is passed only when the finger is on the screen. The paddle stops in space, the ball still bouncing, if the user releases pressure. The paddle pulses after approximately ten seconds of no input. The ball freezes with game state freeze when the user moves to exit the game.

The ratchet motion maps to visuals on screen as designed to account for user practice. While the wrist provides a full 180 degrees of rotation, a user starting from a "central" position typically rotates 30 degrees in either direction. The application accounting for this behavior relatively maps this motion to paddle control and feedback. To reach the maximum distance in either direction, for example, the user is not required to fill 180 degrees.

One design and velocity aspect extends the user engagement: paddle size does not always map directly to hit area. To nurture user success and repeat experiences, the application in certain conditions extends paddle function outside of its visually perceived area. When a certain speed threshold is surpassed, the user moving the paddle rapidly, the hit area increases. Akin to "angels in the outfield" effect, this extension does not display, to avoid user perception of a bug. Because the paddle is indeed moving rapidly, the user's apprehension typically does not keep pace. Per its application relevance for commercial settings, the caretaker defines values, modified with text input, that control the game, including arc width, arc distance from center, and ball velocity.

Example Use Cases

The kiosk system brings to bear benefits of flexibility because its installation is lighter, as well as portable. The following example use cases highlight this operational maneuverability, and invoke functionalities and gestures described in the baseline applications described above. These examples represent, without limiting, the domains that benefit from the SOE kiosk.

In a military setting, a briefing is convened to review a recent incident in a field of operations. In an operations room with a kiosk, on officer uses the mapping application to convey a range of information, touching on political boundaries; terrain; personnel assets; population density; satellite imagery. Asset location and satellite imagery are linked in from sources appropriate to the briefing nature. Data sources can be stored locally or accessed via the network. The officer selects political boundaries data (palette gesture, ^^^|-:x^) and snaps it to the entire display area (cinematographer, ^^^|-:x^), before zooming in on a recent flare-up in activity (pan/zoom, \/\/-:x^ to ^^^^>:x^). He pulls up the fluoroscope menu on the left side of the display (palette, ^^^|-:x^). He selects (closing his thumb) and snaps (cinematographer, ^^^|-:x^) onto the area first a population density lens, then a terrain lens. After discussing these area contours, he pushes in (zoom, ^^^^>:x^) to note asset location at time of activity. Further zooming in (^^^^>:x^) he expands the region displays and reviews asset location at present-day.

Under an example use case involving emergency preparation and response, as a hurricane approaches the coastline, government agencies and officials issue advisories and move quickly to share information with the public. The governor's office convenes a press conference with participation of his emergency response czar, weather service director, law enforcement figures, public utility officials, as well as officials from his administration. With a kiosk sourcing data from these different agencies, the press conference uses maps displaying wind data, precipitation data, population density, evacuation routes, and emergency shelters.

An extraction engineer and a geologist review an extraction area in an additional use case, using a geospatial map with lenses for topology; soil samples; subsurface topology; original subsoil resources; rendered subsoil resources. The customized application includes recognition of edge devices. From a global map of operations, the extraction engineer pushes into a detailed display of the extraction area (pan/zoom, \/\/-:x^ to ^^^^>:x^). From the lens menu she selects rendered subsoil resources (palette, ^^^|-:x^); accessed from an external database over the network, it shows the current expression of subsoil resources. She creates an original subsoil resource lens (frame-it, ^^^|-"x^), which displays extraction at some point in the past. The geologist uses his iPhone, with the downloaded g-speak pointer application, to point to a particular swath: as they discuss recent geological occurrences, the geologist frames a subsurface topology lens (frame-it, ^^^|-"x^), and pulling it toward himself, fixes the fluoroscope to the display where an underground river approaches the extraction area. The geologist then grabs the map (fist, ^^^^>:x^): he moves it to slide adjoining regions underneath the subsurface lens, the two colleagues discussing recent activity.

Under yet another example use case, joint reconstruction procedure makes use of two kiosks in a sterile operating room. At one screen a nurse controls a version of the media browser. Its default overview display shows patient data such as heart rate, blood pressure, temperature, urine, and bloodwork. A second kiosk runs a spatial mapping implementation, which lets the surgeons zoom in on assets including x-rays, CT scans, MRIs, and the customized procedure software used by the hospital. As the team works, displayed is an image from procedure software, which provides positioning information. A surgeon on the procedure team holds up his first and pulls it toward himself, to view the thighbone in more detail. (^^^^>:x^). When an unexpected level of resistance is encountered in relevant cartilage, a surgeon on the team pulls up the lens panel and selects MRI images of the area (palette, ^^^|-:x^).

At a financial services seminar a speaker starts a deck presentation. He clicks right to move from one slide to the next (click R, ^^^|-:x^). When an audience member raises a question about building a complete portfolio, he navigates quickly back to a previous slide using two hands (jog dial, ^^^|-:x^), which shows the components of a portfolio in a piechart. He gets out his phone, with the downloaded g-speak pointer application, and holds down a finger to use the device as pointer, discussing the different investment types. He dwells at length on a certain mutual fund. With his free hand, he again navigates quickly to a different slide, this time with pushback (IIII-:x^). An audience member asks about structuring college funds for his grandchildren. The speaker jog dials to a slide with video (^^^|-:x^ and ^^^|>:x^), where a customer talks about the same goal, and how the speaker's firm helped him balance his different financial interests.

A luxury brand installs a kiosk in key locations of a major department store, including New York, London, Paris, and Tokyo. Its hardware installation reflects brand values, including high-end customization of the casing for the screen. It runs a media browser, showcasing the brand's "lookbook" and advertising campaign. With the simple "L"-like gesture, (^^^|-:x^ to (^^^||:x^ or ^^^|>:x^), users can click through slides with different looks. Video slides throughout play "behind-the-scenes" footage of photo shoots, where the stylist and photographer discuss the shoot. A central video plays footage from the most recent fashion show in Paris.

A beverage company installs a kiosk endcap in grocery stores to introduce a new energy drink. Experiential, the kiosk lets users play a version of the collaborative Rotate game. A teen passing by with his mom stops to watch the center graphic on the home screen: the main game graphic, the paddle rotates back and forth to block a bouncing ball. The teen follows the simple instructions at the top of the screen to download the free g-speak pointer application onto his phone. A tutorial graphic at the bottom of the screen shows a hand, finger pressed to phone, rotating the wrist. The teen follows the gesture and plays a few rounds while his parent shops. When his parent returns, the two follow another tutorial on the bottom of the screen, which shows pushback (||||-:x^). This gesture pulls up slides with nutrition information; one slide includes an extended endorsement from a regional celebrity athlete.

Spatial Operating Environment (SOE)

Figure 20:
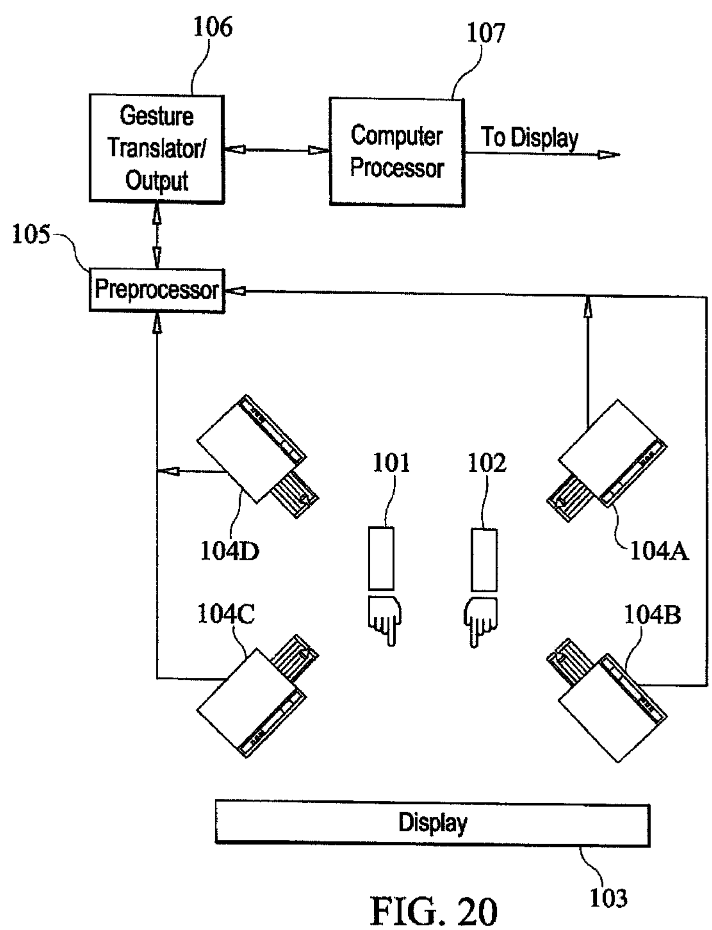
FIG. 20 is a block diagram of a gestural control system, under an embodiment.

Embodiments of a spatial-continuum input system are described herein in the context of a Spatial Operating Environment (SOE). As an example, FIG. 20 is a block diagram of a Spatial Operating Environment (SOE), under an embodiment. A user locates a hand 101 (or hands 101 and 102) in the viewing area 150 of an array of cameras (e.g., one or more cameras or sensors 104A-104D). The cameras detect location, orientation, and movement of the fingers and hands 101 and 102, as spatial tracking data, and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103. The systems and methods described in detail above for initializing real-time, vision-based hand tracking systems can be used in the SOE and in analogous systems, for example.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

While the SOE includes the vision-based interface performing hand or object tracking and shape recognition described herein, alternative embodiments use sensors comprising some number of cameras or sensors to detect the location, orientation, and movement of the user's hands in a local environment. In the example embodiment shown, one or more cameras or sensors are used to detect the location, orientation, and movement of the user's hands 101 and 102 in the viewing area 150. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

While the embodiments described herein include markerless vision-based tracking systems, the SOE of an alternative embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate ‘ cloud’ of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labeling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 21.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 21:
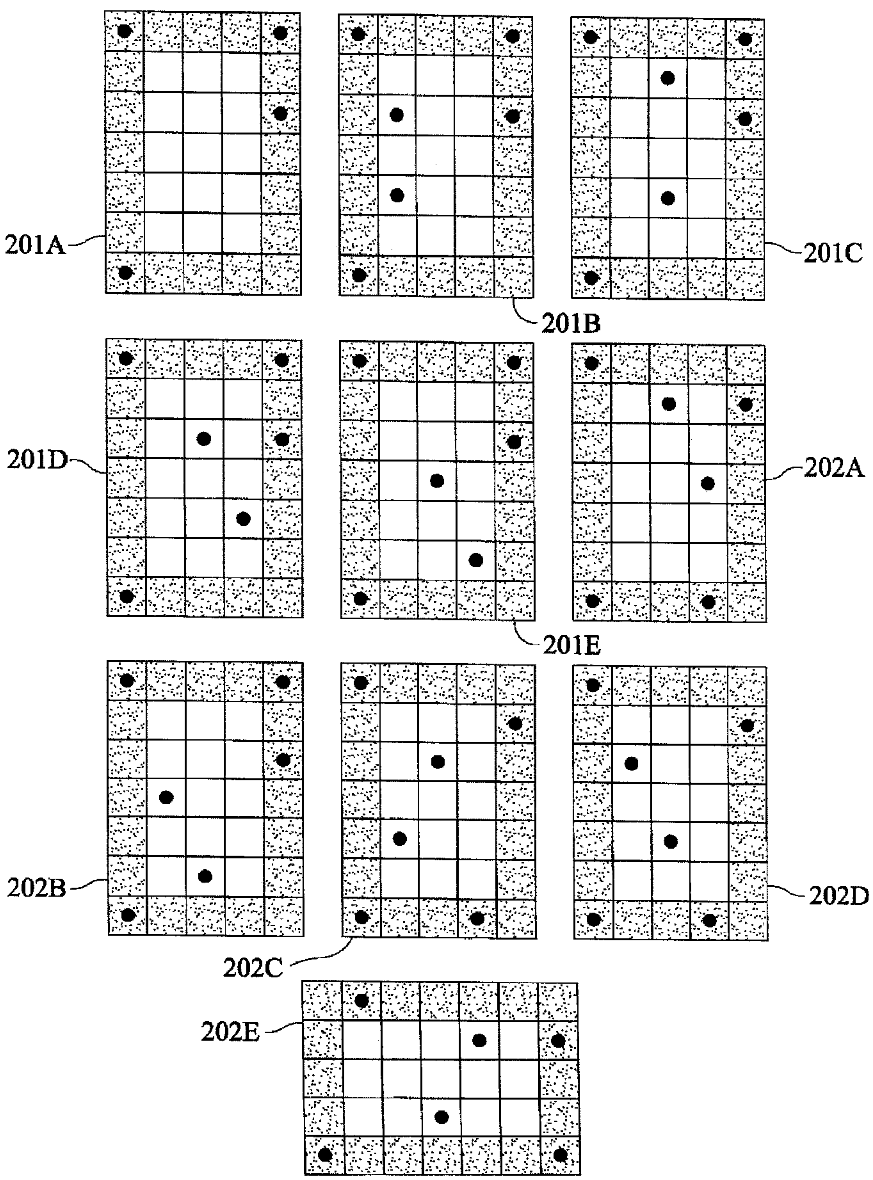
FIG. 21 is a diagram of marking tags, under an embodiment.

Referring now to FIG. 21, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 21) are disposed at certain points in the grid array to provide information.

Qualifying information may be encoded in the tags' marker patterns through segmentation of each pattern into ‘common’ and ‘unique’ subpatterns. For example, the present embodiment specifies two possible ‘border patterns’, distributions of markers about a rectangular boundary. A ‘family’ of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible ‘shrink-film’. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or ‘paint’—individual markers directly onto the operator's fingers and hands.

Gesture Vocabulary

The SOE of an embodiment contemplates a gesture vocabulary comprising hand poses, orientation, hand combinations, and orientation blends. A notation language is also implemented for designing and communicating poses and gestures in the gesture vocabulary of the SOE. The gesture vocabulary is a system for representing instantaneous ‘pose states’ of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's ‘character locations’ is then a unique description of the instantaneous state, or ‘pose’, of the linkage.

Hand Poses

FIG. 22 illustrates hand poses in an embodiment of a gesture vocabulary of the SOE, under an embodiment. The SOE supposes that each of the five fingers on a hand is used.

These fingers are codes as p-pinkie, r-ring finger, m-middle finger, i-index finger, and t-thumb. A number of poses for the fingers and thumbs are defined and illustrated in FIG. 22. A gesture vocabulary string establishes a single character position for each expressible degree of freedom in the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

With continuing reference to FIG. 22, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the embodiments to use ASCII characters for the notation strings. Any suitable symbol, numeral, or other representation maybe used without departing from the scope and spirit of the embodiments. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the embodiments. Each pose is represented by five characters with the order being p-r-m-i-t as described above. FIG. 22 illustrates a number of poses and a few are described here by way of illustration and example. The hand held flat and parallel to the ground is represented by "11111". A first is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 23 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '–', '+', 'x', '*', '^', and 'v' describe medial, lateral, anterior (forward, away from body), posterior (backward, away from body), cranial (upward), and caudal (downward).

In the notation scheme of an embodiment, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or non-linear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:-x^] is a flat hand with palm facing forward and fingers toward ceiling.

[|||||:-x] is a flat hand with palm facing toward the center of the body (right if left hand, left if right hand) and fingers forward.

[^^^^-:-x] is a single-hand thumbs-up (with thumb pointing toward ceiling).

[^^^|-:-x] is a mime gun pointing forward.

Two Hand Combination

The SOE of an embodiment contemplates single hand commands and poses, as well as two-handed commands and poses. FIG. 24 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 25, 26:
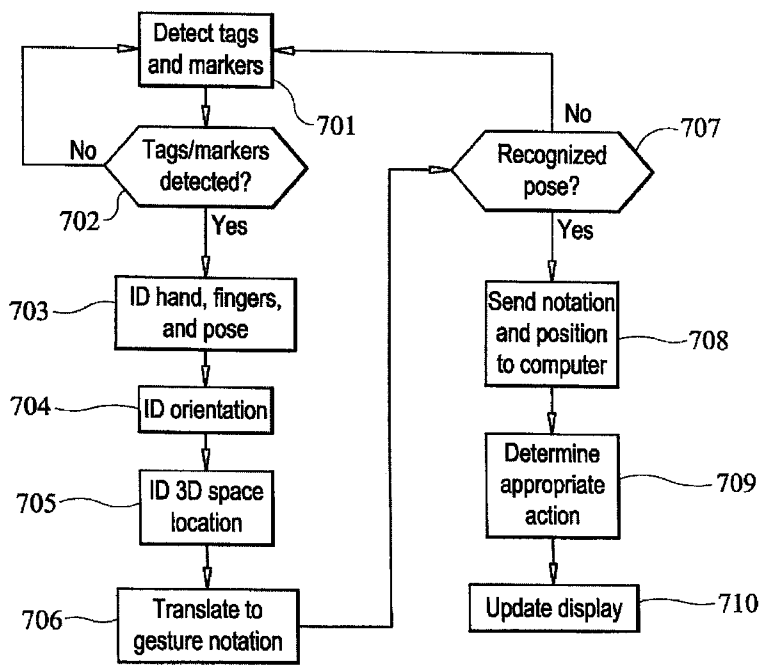
FIG. 25 is a diagram of orientation blends in a gesture vocabulary, under an embodiment.
FIG. 26 is a flow diagram of system operation, under an embodiment.

FIG. 25 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIGS. 27A and 27B show a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 26 is a flow diagram illustrating the operation of the SOE in one embodiment. At 701 the detection system detects the markers and tags. At 702 it is determined if the tags and markers are detected. If not, the system returns to 701. If the tags and markers are detected at 702, the system proceeds to 703. At 703 the system identifies the hand, fingers and pose from the detected tags and markers. At 704 the system identifies the orientation of the pose. At 705 the system identifies the three dimensional spatial location of the hand or hands that are detected. (Please note that any or all of 703, 704, and 705 may be combined).

At 706 the information is translated to the gesture notation described above. At 707 it is determined if the pose is valid. This may be accomplished via a simple string comparison using the generated notation string. If the pose is not valid, the system returns to 701. If the pose is valid, the system sends the notation and position information to the computer at 708. At 709 the computer determines the appropriate action to take in response to the gesture and updates the display accordingly at 710.

In one embodiment of the SOE, 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms maybe embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:

a. a single hand's "pose" (the configuration and orientation of the parts of the hand relative to one another) a single hand's orientation and position in three-dimensional space.

b. two-handed combinations, for either hand taking into account pose, position or both.

c. multi-person combinations; the system can track more than two hands, and so more than one person can cooperatively (or competitively, in the case of game applications) control the target system.

d. sequential gestures in which poses are combined in a series; we call these "animating" gestures.

e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of i) relative orientations between the fingers and the back of the hand, ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to, i) build complex contextual and conditional control states, ii) to dynamically add hysterisis to the control environment, and iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include, i) "entry" state notifiers and "continuation" state notifiers, and ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack that takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Data Representation, Transit, and Interchange

Embodiments of an SOE or spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 28:
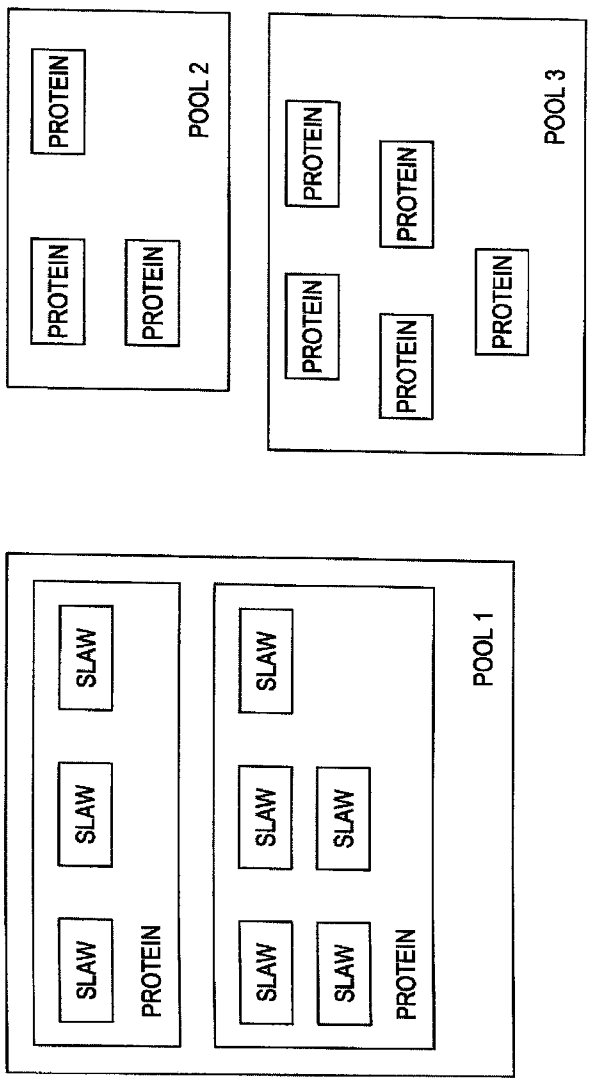
FIG. 28 is a block diagram of a processing environment including data representations using slawx, proteins, and pools, under an embodiment.

FIG. 28 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 29:
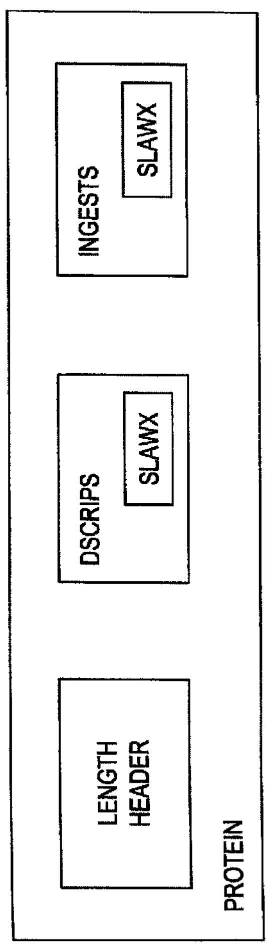
FIG. 29 is a block diagram of a protein, under an embodiment.

FIG. 29 is a block diagram of a protein, under an embodiment. The protein includes a length header, a descrip, and an ingest. Each of the descrip and ingest includes slaw or slawx, as described in detail below.

Figure 30:
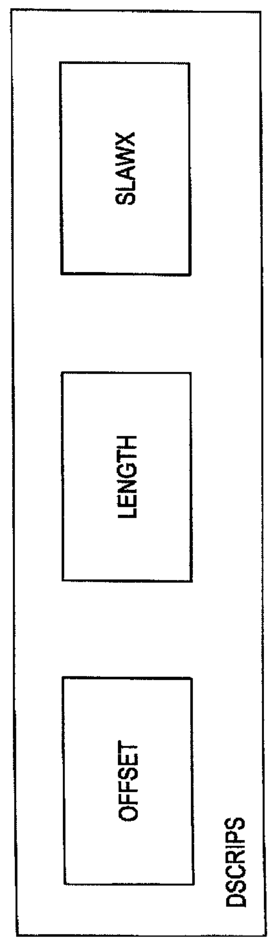
FIG. 30 is a block diagram of a descrip, under an embodiment.

FIG. 30 is a block diagram of a descrip, under an embodiment. The descrip includes an offset, a length, and slawx, as described in detail below.

Figure 31:
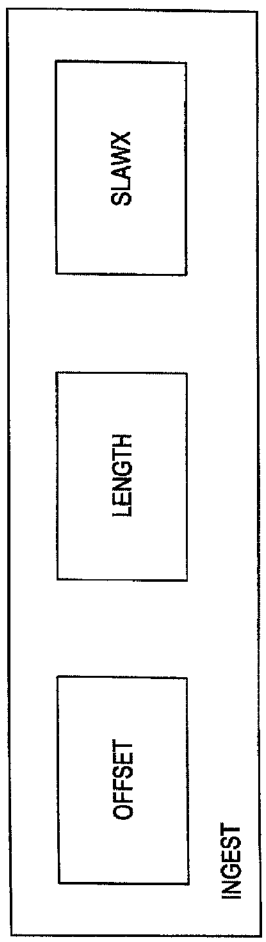
FIG. 31 is a block diagram of an ingest, under an embodiment.

FIG. 31 is a block diagram of an ingest, under an embodiment. The ingest includes an offset, a length, and slawx, as described in detail below.

Figure 32:
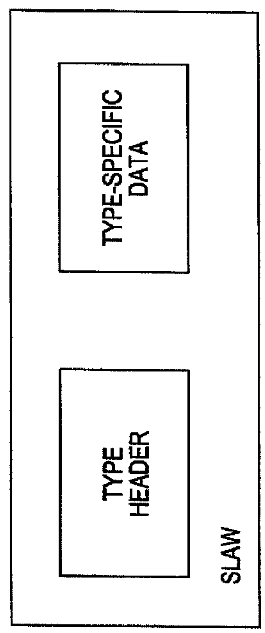
FIG. 32 is a block diagram of a slaw, under an embodiment.

FIG. 32 is a block diagram of a slaw, under an embodiment. The slaw includes a type header and type-specific data, as described in detail below.

Figure 33A:
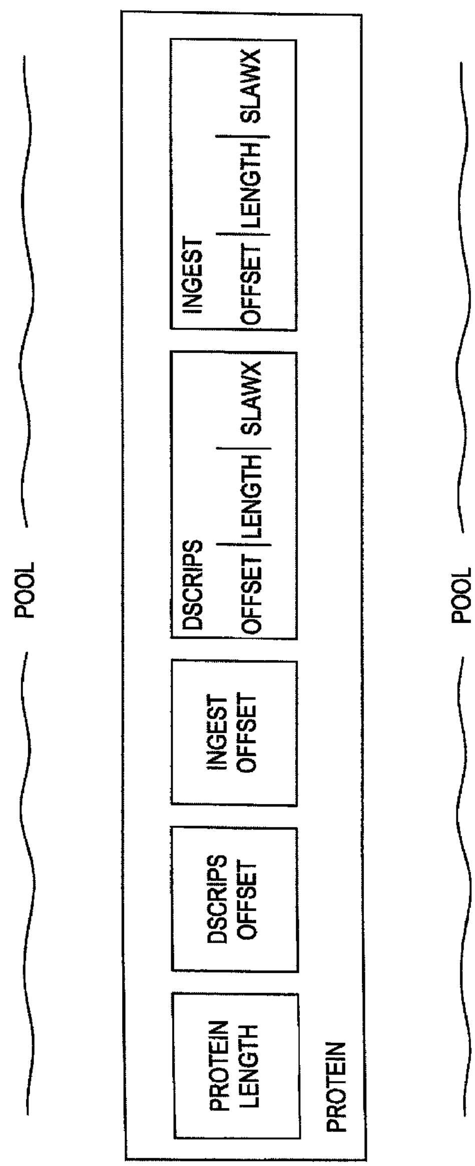
FIG. 33A is a block diagram of a protein in a pool, under an embodiment.

FIG. 33A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 29 and 33A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIGS. 33B/1 and 33B2 show a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 33C:
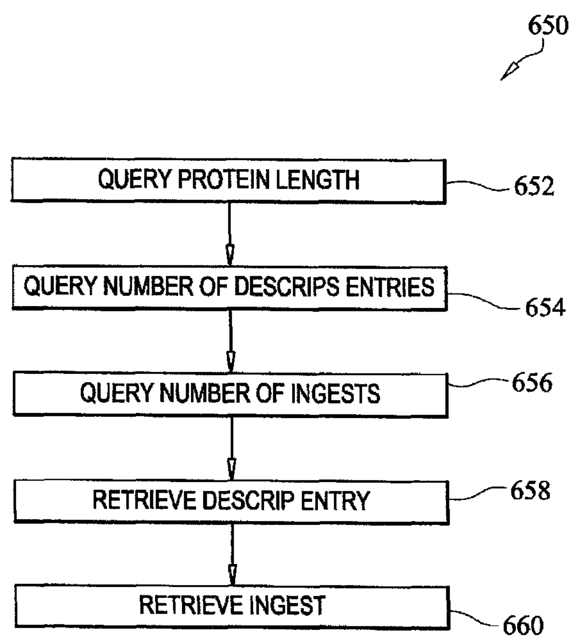
FIG. 33C is a flow diagram for using proteins, under an embodiment.

A minimal (and read-only) protein implementation of an embodiment includes operation or behavior in one or more applications or programming languages making use of proteins. FIG. 33C is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

Figure 33D:
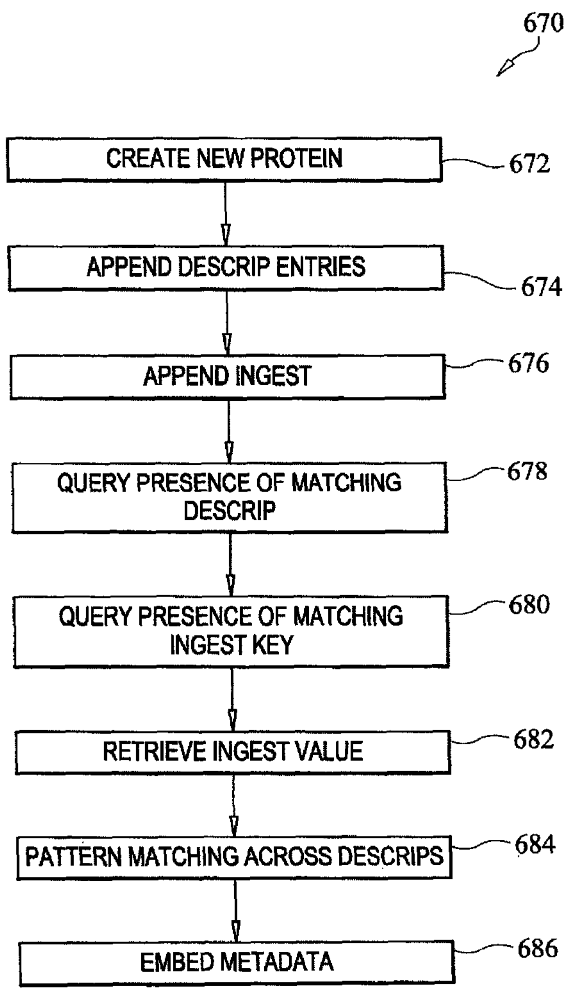
FIG. 33D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 33D is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 34:
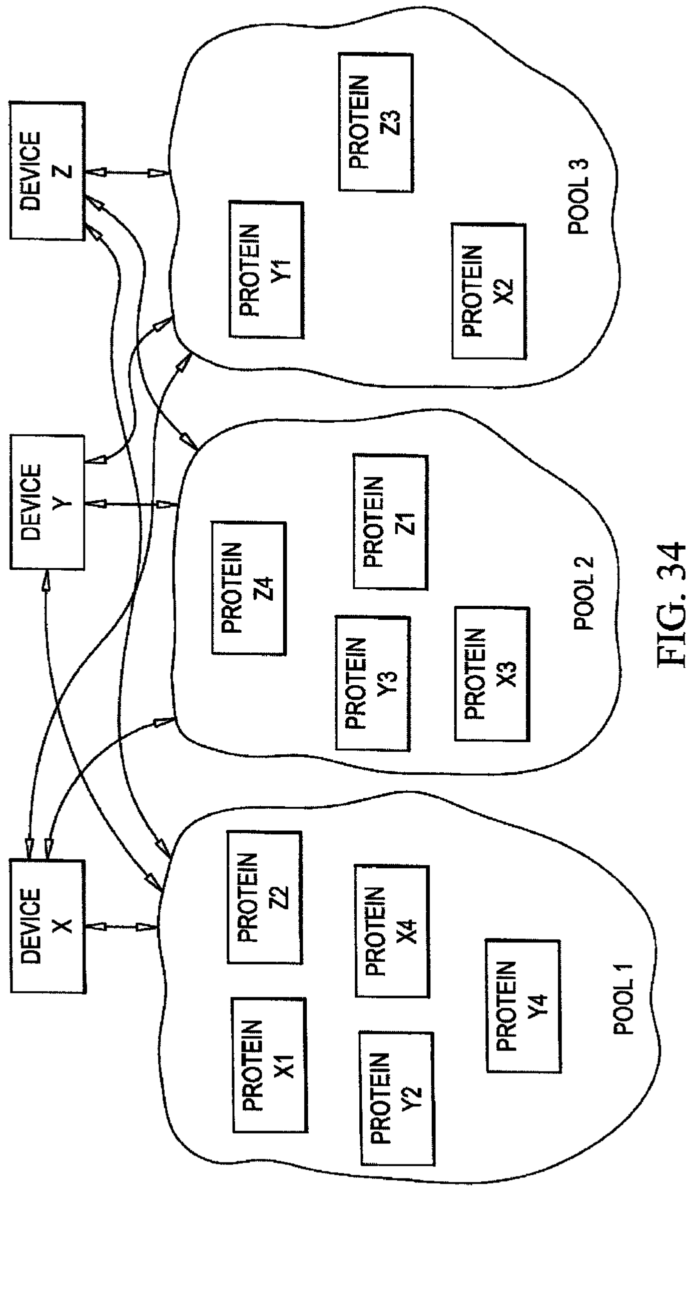
FIG. 34 is a block diagram of a processing environment including data exchange using slawx, proteins, and pools, under an embodiment.

The proteins described above are provided to pools as a way of sharing the protein data contents with other applications. FIG. 34 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices.

Figure 35:
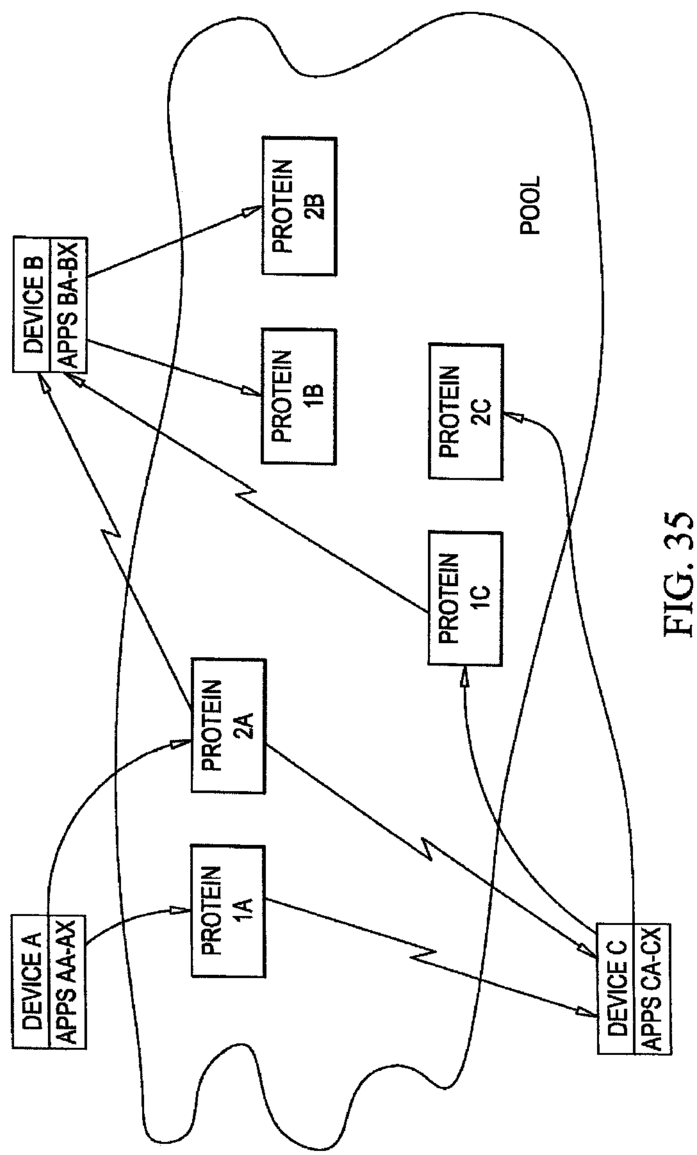
FIG. 35 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 35 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 36:
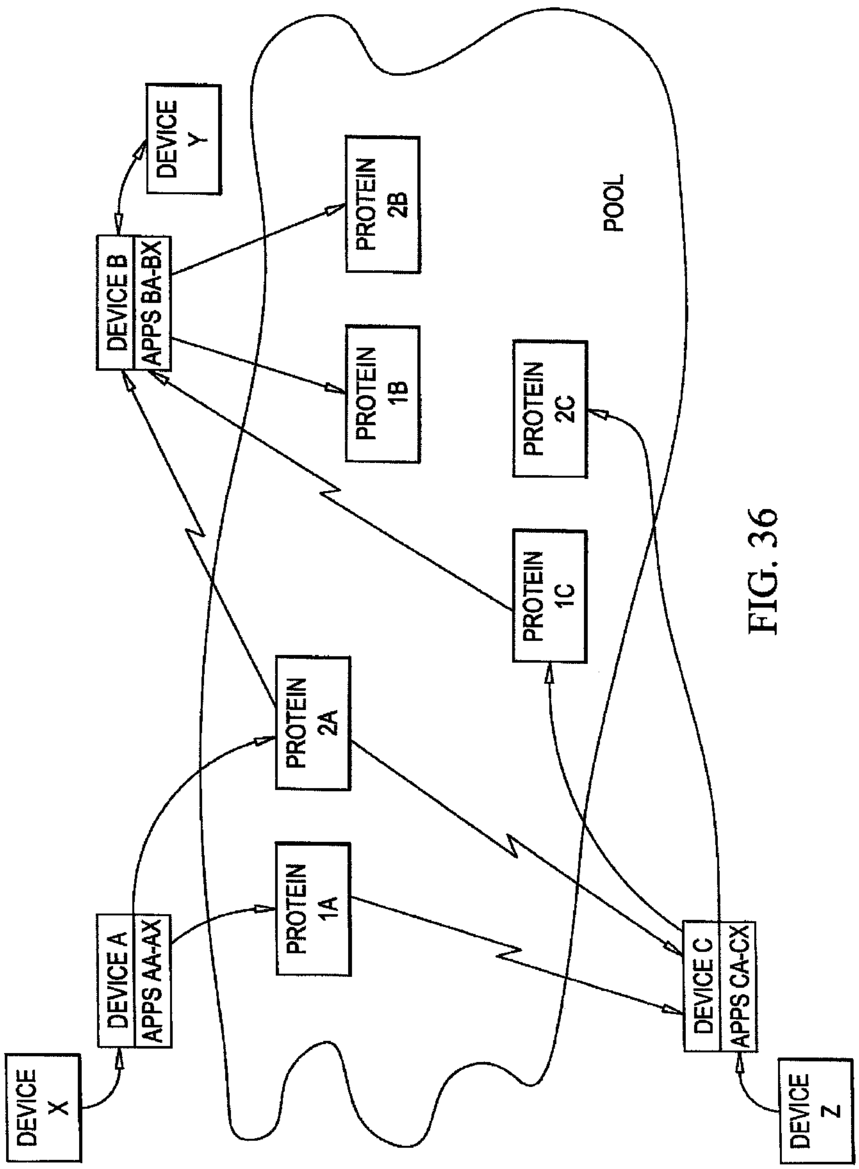
FIG. 36 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 36 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 37:
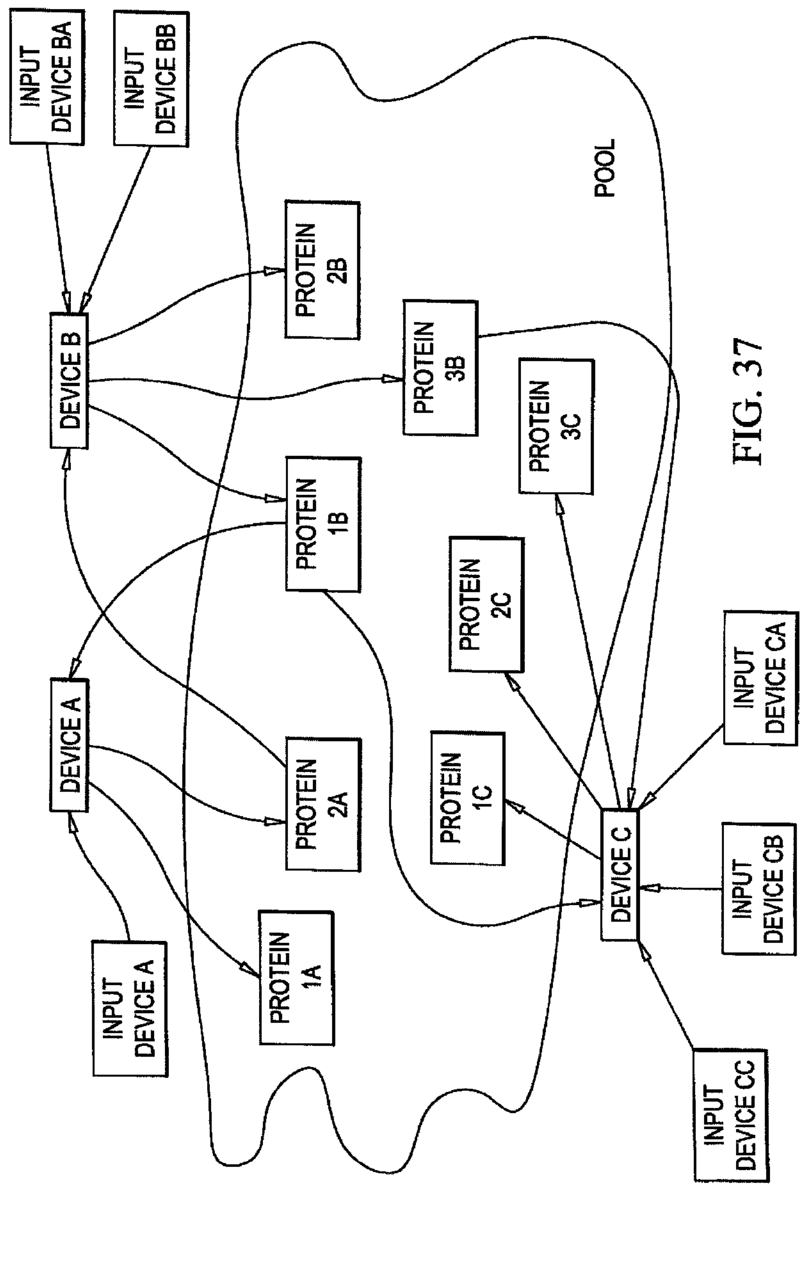
FIG. 37 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 37 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage, hand,
      pilot-id-02, hand-id-23 }
  Ingests: { pilot-id => 02,
    hand-id => 23,
    pos     => [ 0.0, 0.0, 0.0 ]
    angle-axis => [ 0.0, 0.0, 0.0, 0.707 ]
    gripe   => ..^||:vx
    time    => 184437103.29}]
```

As a further example, the protein describing a mouse click is as follows:

```
[ Descrips: { point, click, one, mouse-click, button-one,
      mouse-id-02 }
  Ingests: { mouse-id => 23,
    pos    => [ 0.0, 0.0, 0.0 ]
    time   => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 38:
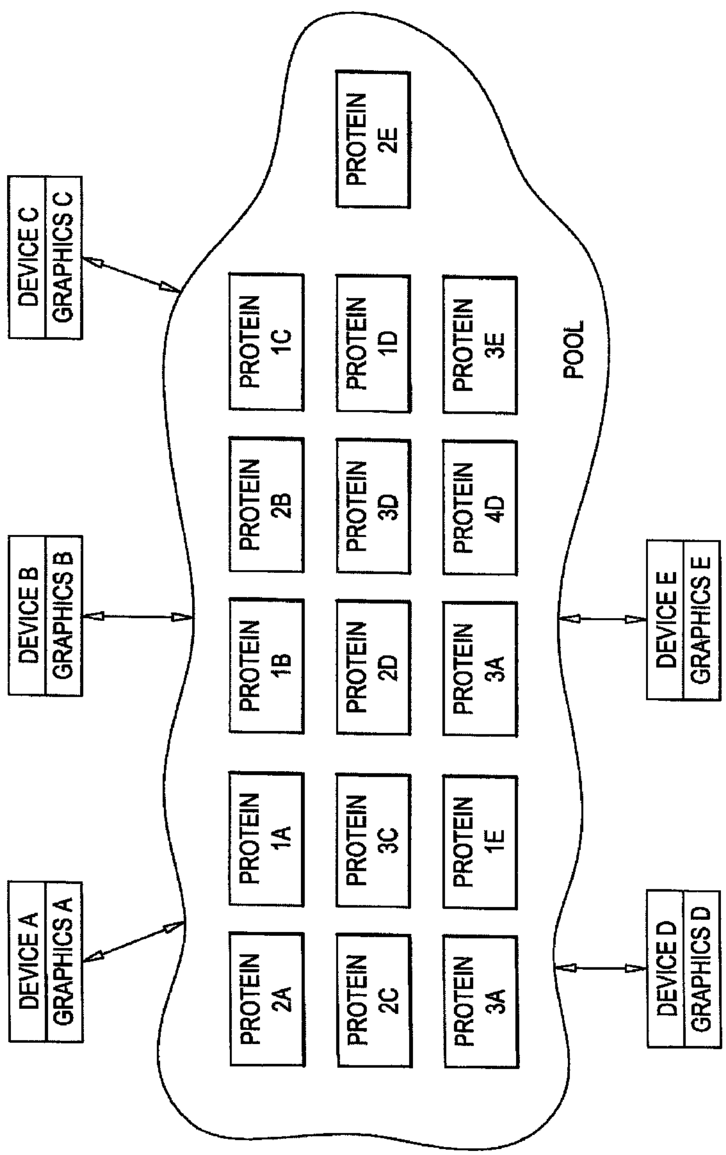
FIG. 38 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 38 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 39:
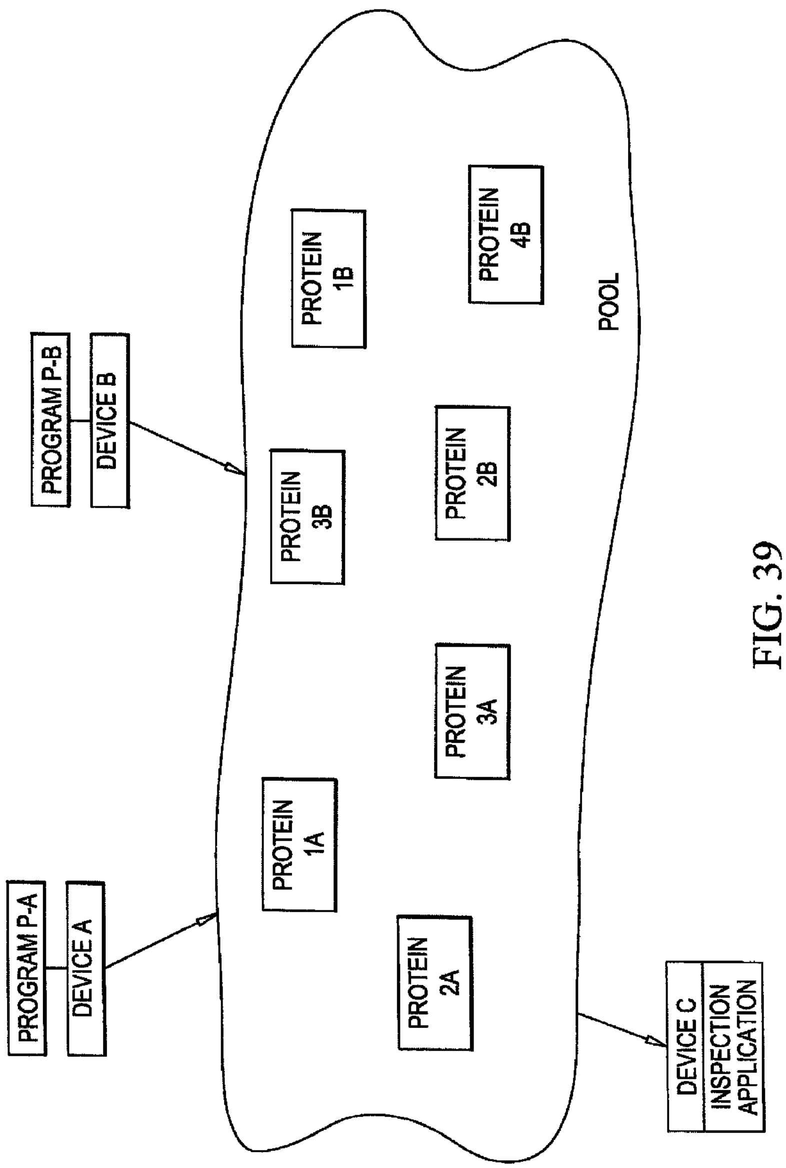
FIG. 39 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 39 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 39, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 40:
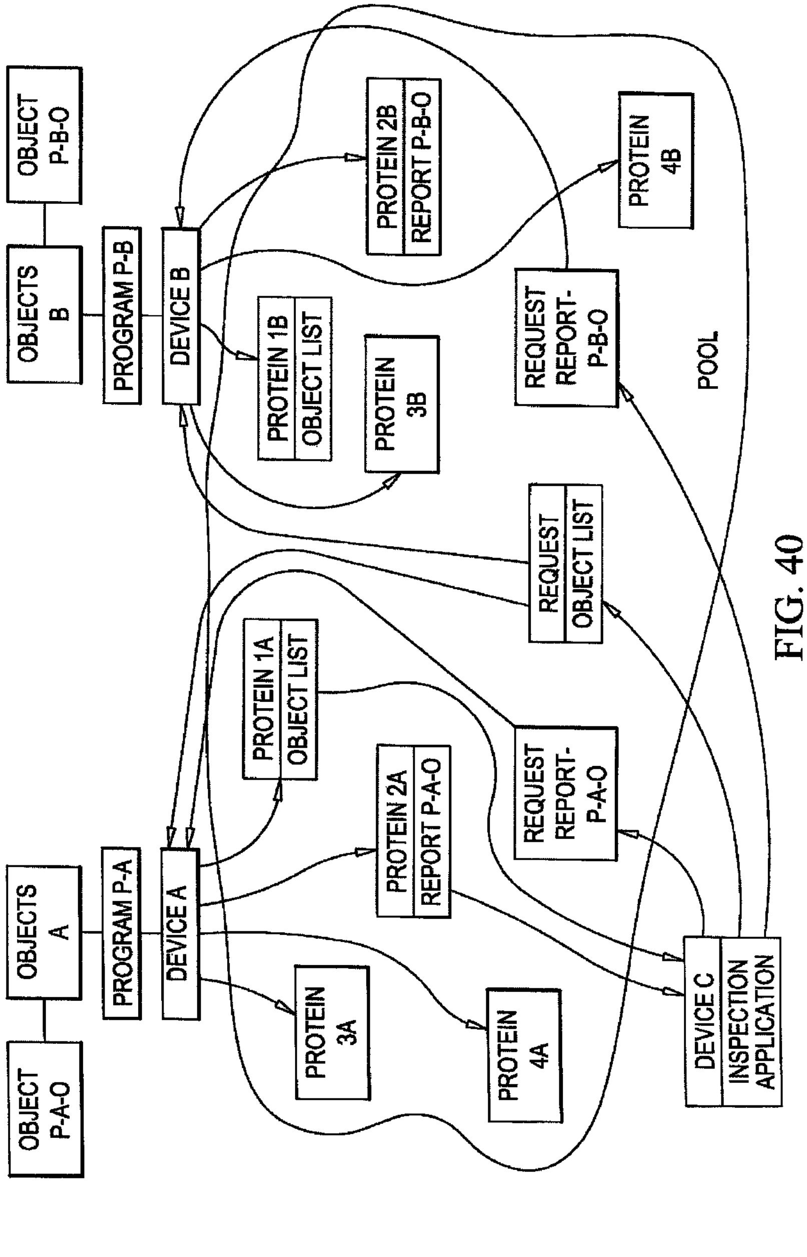
FIG. 40 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 40 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Mezzanine Interactions and Data Representation

As described above, Mezz is a novel collaboration, whiteboarding, and presentation environment whose triptych of high-definition displays forms the center of a shared workspace. Multiple participants simultaneously manipulate elements on Mezz's displays, working via the system's intuitive spatial wands, a fluid browser-based client, and their own portable devices. When laptops are plugged into Mezz, those computers' pixels appear on the display triptych and can be moved, resealed, and integrated into the session's workflow. Any participant is then enabled to 'reach-through' the triptych to interact directly with applications running on any connected computer. Consequently, Mezz is a powerful complement to traditional telepresence and video conferencing, as it melds technologies for collaborative whiteboarding, presentation design and delivery, and application sharing, all within a framework of unprecedented multi-participant control.

More particularly, Mezzanine is an ecosystem of processes and devices that communicate and interact with each other in real time. These separate modules communicate with each other using plasma, Oblong's framework for time-based intra-process, inter-process, and inter-machine data transport. The description that follows defines the key components of Mezz's technical infrastructure and the plasma protocol that enables these components to interact with each other.

In technical terms, Mezzanine is the name of the yovo application that is responsible for rendering elements to the triptych, handling human inputs from wands and other devices, and maintaining overall system state. It is assisted by another yovo process called the Asset Manager, that transforms images received from other devices, called Clients. Clients are broadly defined as non-yovo, non-Mezz devices that coupled or connect to Mezz. Clients include the Mezz web application and mobile devices that support the iOS or Android platforms.

The architectural elements of Mezz include the core yovo process, an Asset Manager, Quartermaster, Eventilator, web clients, and iOS and Android clients. The single-threaded yovo process is the keeper of all application state and the facilitator of communication between all clients. Mezz mediates requests from clients and reports the outcome to all clients as needed. Colloquially, this process is often called the "native application" because it is at home in the g-speak platform. Mezz controls session state, allowing users to select and open a dossier—a Mezz slide deck or document—or to join a session when a dossier is already open. The native Mezz process also renders all the graphics to the triptych and generates all feedback glyphs for inputs from various sources—wand and client alike.

The Asset Manager processes image content from both clients and native Mezz. It is responsible for maintaining and creating image files on disk that are accessible to both Mezz and clients. The Asset Manager may also perform conversion to standard formats and handles the creation of image thumbnails, slide resolution images, and zip archives of Mezz assets and slides.

Quartermaster refers to a group of processes that serve to capture, encode, and transcode video and audio sources, both automatically and in response to user controls. Notably, Quartermaster is used to capture and encode DVI input from Westar HRED PCI cards, for example, but is not so limited. The Mezz hardware has four DVI inputs, and the Mezz software coordinates with Quartermaster to stream video.

Eventilator enables the "pass-through" feature in Mezzanine. Eventilator of an embodiment is an application that users can run on their computers (e.g., laptop computers, etc.). The Eventilator GUI allows a user to associate his/her laptop with a video feed in Mezz so that other meeting participants can control his/her mouse cursor.

The Mezz web application allows users to interact with the triptych of displays via a web browser. Using a mechanism of an embodiment called reachthrough, web clients can use their mouse as a fully-privileged Mezz cursor. The web client can also scroll the deck, upload slides and image content, and adjust the source and volume of video feeds. Web clients can temporarily set their own state independently of Mezz while requests are pending, but should always let Mezz dictate application state. Web clients stay in sync with Mezz through plasma pools.

Mobile devices with iOS or Android can access a Mezz client with a minimal view of the triptych, upload slides, and scroll through the deck of slides when a session is active. The mobile device clients use the same plasma protocol to communicate with the native applications as the web clients.

Mezz enables and includes numerous client interactions facilitated with proteins. In an embodiment, Mezz supports a set of clients that have been identified as a component of the experience. These clients include one or more of web clients running in any web browser, as well as iOS devices (e.g., iPads, iPhones, iPods, etc). Mezz is a participatory environment in which to join a session means to join in participation with the Mezz and with those inhabiting the space within which it resides. As such, any actions invoked by the passage of the documented proteins will be seen and experienced by others participating in the Mezz session.

The proteins described in detail herein comprise a subset of those used within Mezz, and moreover a subset of those referenced within the flow diagrams presented herein. Only those proteins that pass from or to a client are described herein. The flow diagrams presented herein do not all include the possible error states. Nonetheless, the proteins described herein comprise the error proteins that may result from the documented actions.

As described in detail herein regarding slawx, proteins, and pools, slawx are the lowest level of libPlasma. Slawx represent one data unit, and can store many types of data, be they unsigned 64-bit integer, complex number, vector, string, or a list. Proteins are created or generated from slawx, and proteins comprise an amorphous data structure.

Proteins have two components including descrips and ingests. While descrips are supposed to be slaw strings, and ingests are supposed to be key-value pairs, where the key is a string that facilitates access, these expectations may not be strictly enforced.

Every protein comprises a list of descrips. The descrips can be thought of as a schema that identifies the protein. Based on the schema provided in the descrips list, the set of ingests the protein comprises can generally be inferred. However, as described herein, the rules for proteins may be loosely enforced, so it is possible to have a single schema, or descrips list, that maps to several valid and orthogonal sets of ingests for some proteins. Though descrips cannot comprise maps, they can provide key:value data to filter on. When a descrip ends in a colon (:), it is assumed that the next descrip in the list represents its corresponding value. Clients participating in pools can filter proteins based on the descrips list, and metabolize—that is, choose to process—only those that match their specific filter set.

Ingests include a map comprising a collection of key: value pairs, and this is where the data lies. If you consider the descrips as a very loose form of address scrawled on an envelope, albeit one which may reach multiple recipients, then the ingests can be thought of as the letter inside.

Pools are a transport and immutable storage mechanism for proteins, linearly ordered by time deposited. Pools provide a means for processes to communicate via proteins.

The proteins described herein are shown in a pseudo-code syntax that aids in legibility. This syntax does not reflect the actual form that proteins take in Plasma implementation, so proteins should be constructed through the use of libPlasma APIs.

A description follows of the documentation style and some of the key variables referenced in many Mezzanine proteins.

Braces—{ }—are used throughout the documentation to denote maps comprising a list of key:value pairs. Maps are allowed only within ingests, but may be nested. Though the set of ingests for a given protein is a map, the first order braces are omitted for clarity of presentation.

Brackets—[ ]—are used throughout the documentation to denote lists. Both descrips and ingests may comprise lists, which may be nested. Though the set of descrips for a given protein is a list, the first order brackets are omitted for clarity of presentation.

Both descrips and ingests may comprise variables. Variables are denoted by a string included between less-than (<) and greater-than (>) symbols, e.g., <variable name>. Some ingests may accept only specific strings as values. In these instances all possible values are enumerated and separated by logical OR symbols (||). For instance: primary-color: red||yellow||blue.

Most descrips are strings. All keys are, or should be, strings. Many values within ingests are also strings. To avoid extra syntax in this documentation, quotes (") are generally omitted around strings, except in the case of specific examples.

Many ingests accept numeric values, often denoted <int> or <float>. When only values within a certain range are allowed, that range is indicated within the variable. For instance, <float: [0,1]> represents a percentage, and <int: [0,max]> represents a positive integer.

Some ingests accept vectors, which are denoted with a shorthand form matching their type, followed by a multi-part variable substitution, e.g., v3f<x, y, z> or v2f <w, h>.

Common slaw variables of an embodiment include but are not limited to the following: <client uid> (the unique id of a client, eg browser-xxx . . . or iPad-xxx . . . ); <transaction number> (a unique identifier of a request that a corresponding response will include as a monotonically increasing integer); <dossier uid> (the unique id of a dossier, having the form ds-xxx . . . ); <asset uid> (the unique id of an asset, having the form as-xxx . . . ); <utc timestamp> (the Unix epoch time); <timestamp> (a human readable timestamp obtained with strftime).

Figure 41:
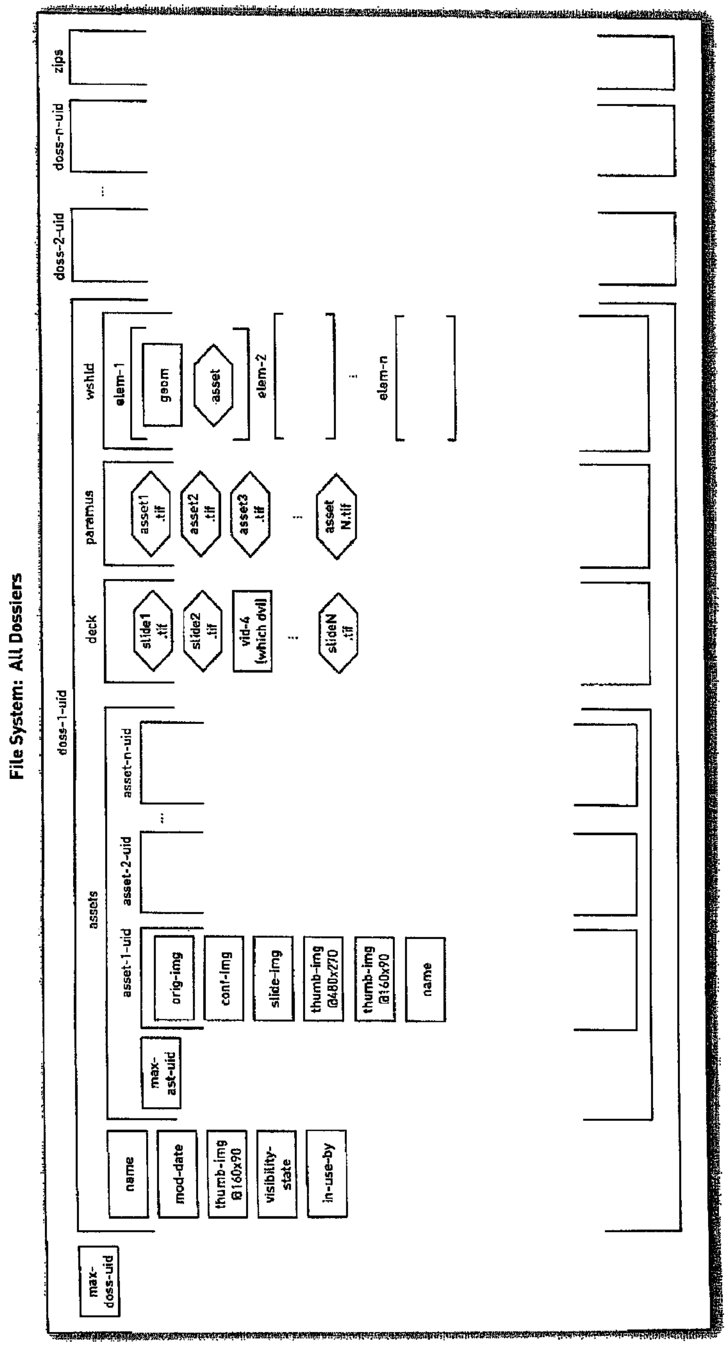
FIG. 41 is a block diagram of the Mezz file system, under an embodiment.

FIG. 41 is a block diagram of the Mezz file system, under an embodiment.

FIGS. 42-85 are flow diagrams of Mezz protein communication by feature, under an embodiment.

Figure 42:
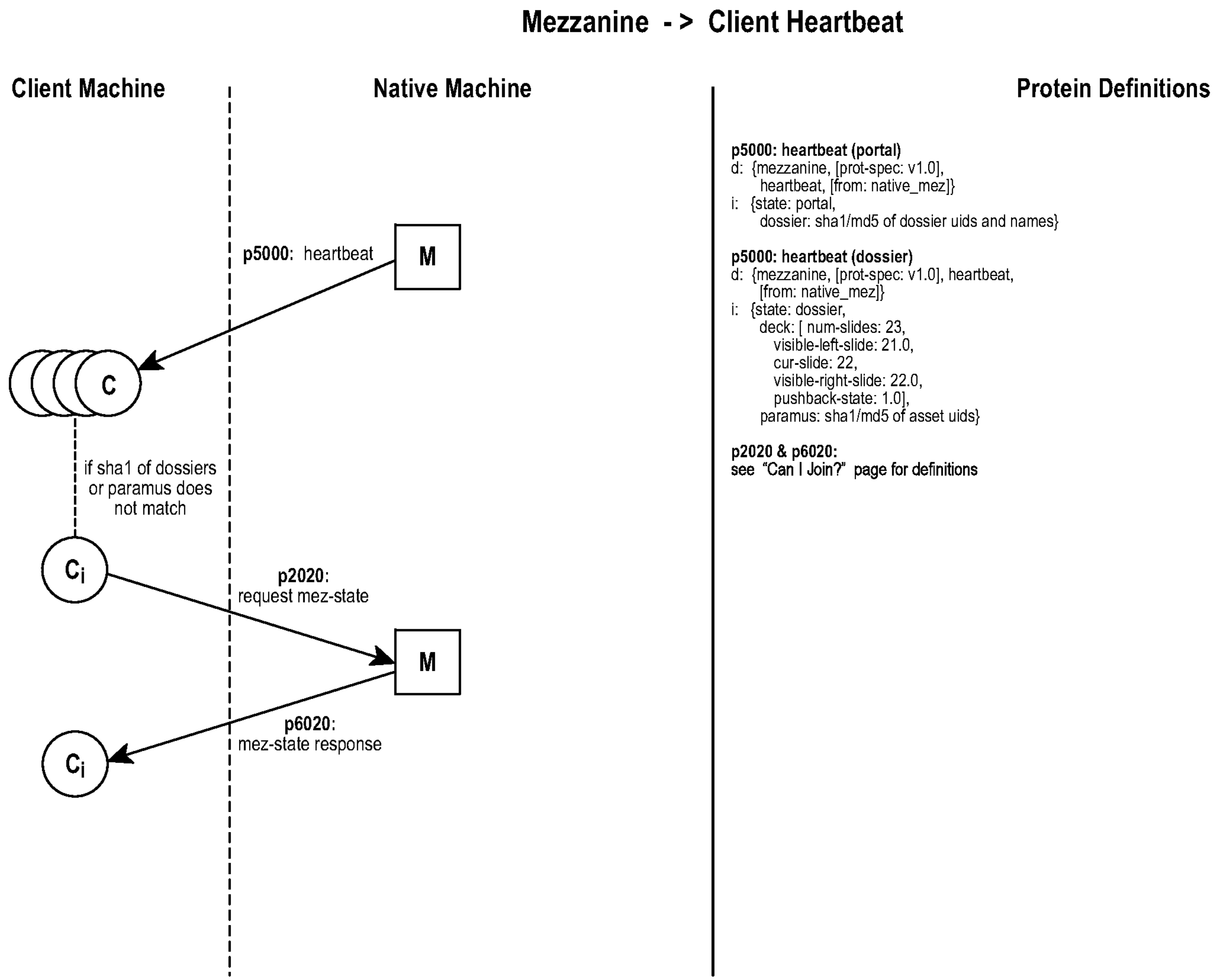

FIG. 42 is a flow diagram of a Mezz process for Mezz initiating a heartbeat with Client, under an embodiment.

Figure 43:
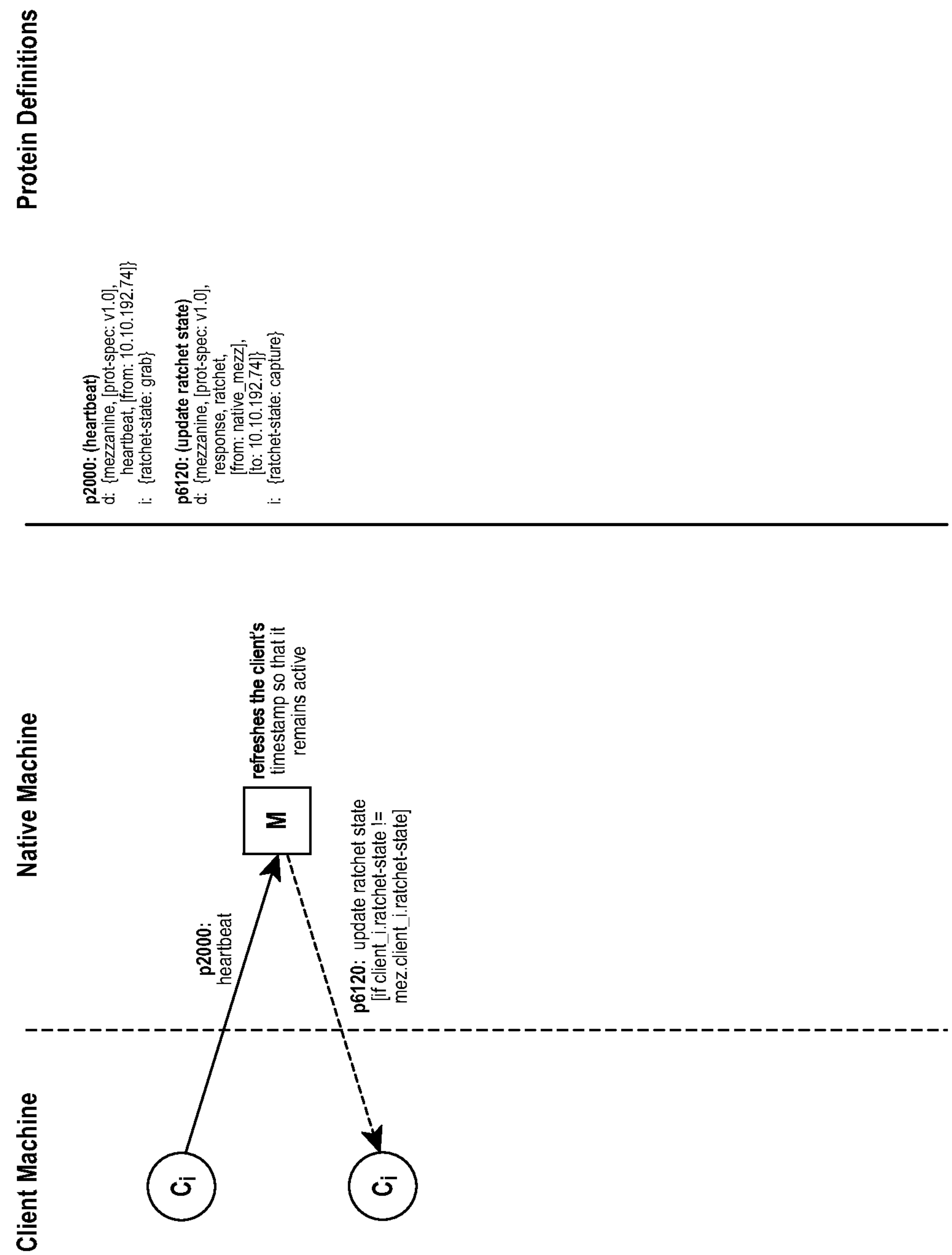

FIG. 43 is a flow diagram of a Mezz process for Client initiating heartbeat with Mezz, under an embodiment.

FIG. 44 is a flow diagram of a Mezz process for Client requesting to join a session, under an embodiment.

FIG. 45 is a flow diagram of a Mezz process for Clients requesting to join a session (max), under an embodiment.

Figure 46:
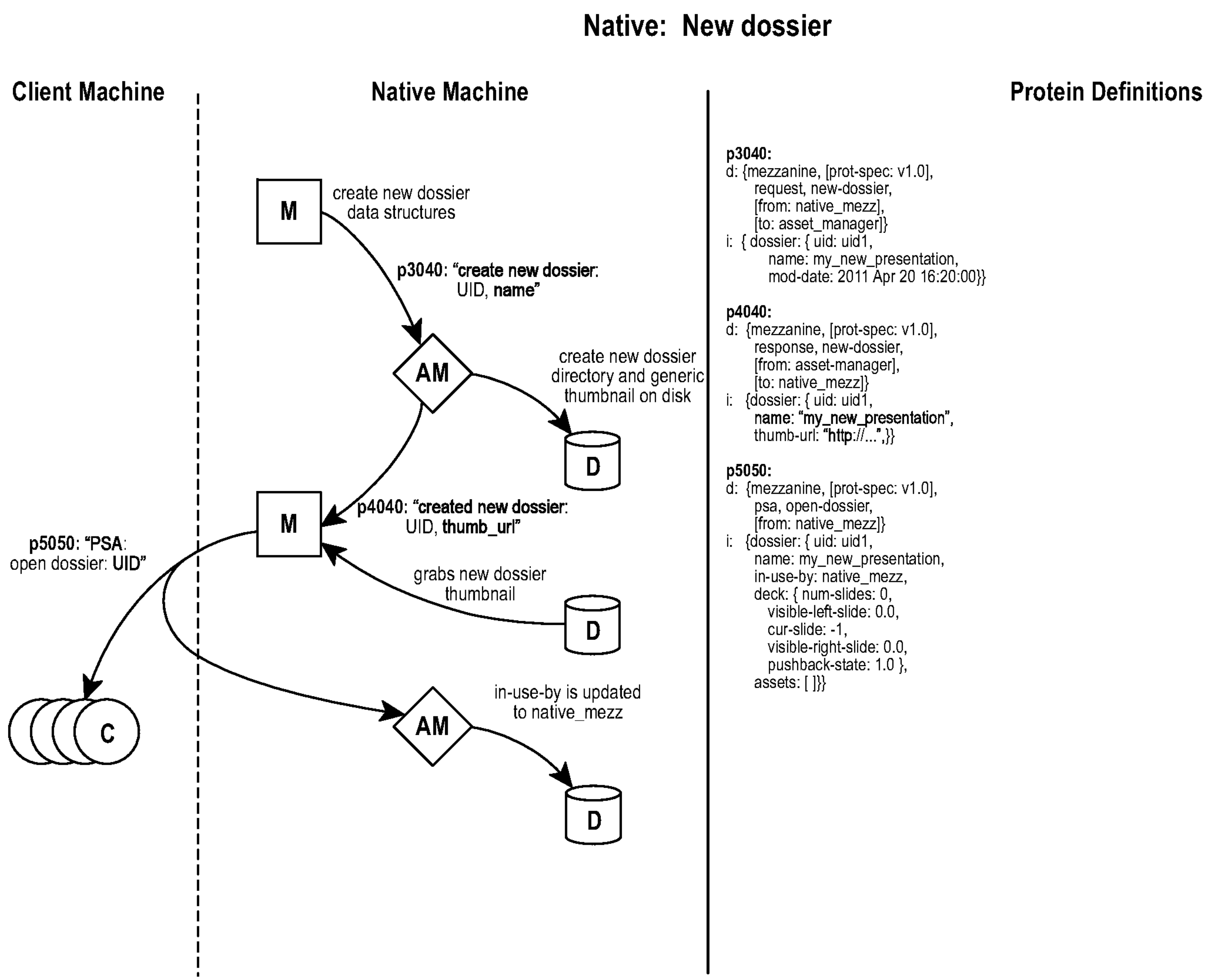

FIG. 46 is a flow diagram of a Mezz process for Mezz creating a new dossier, under an embodiment.

Figure 47:
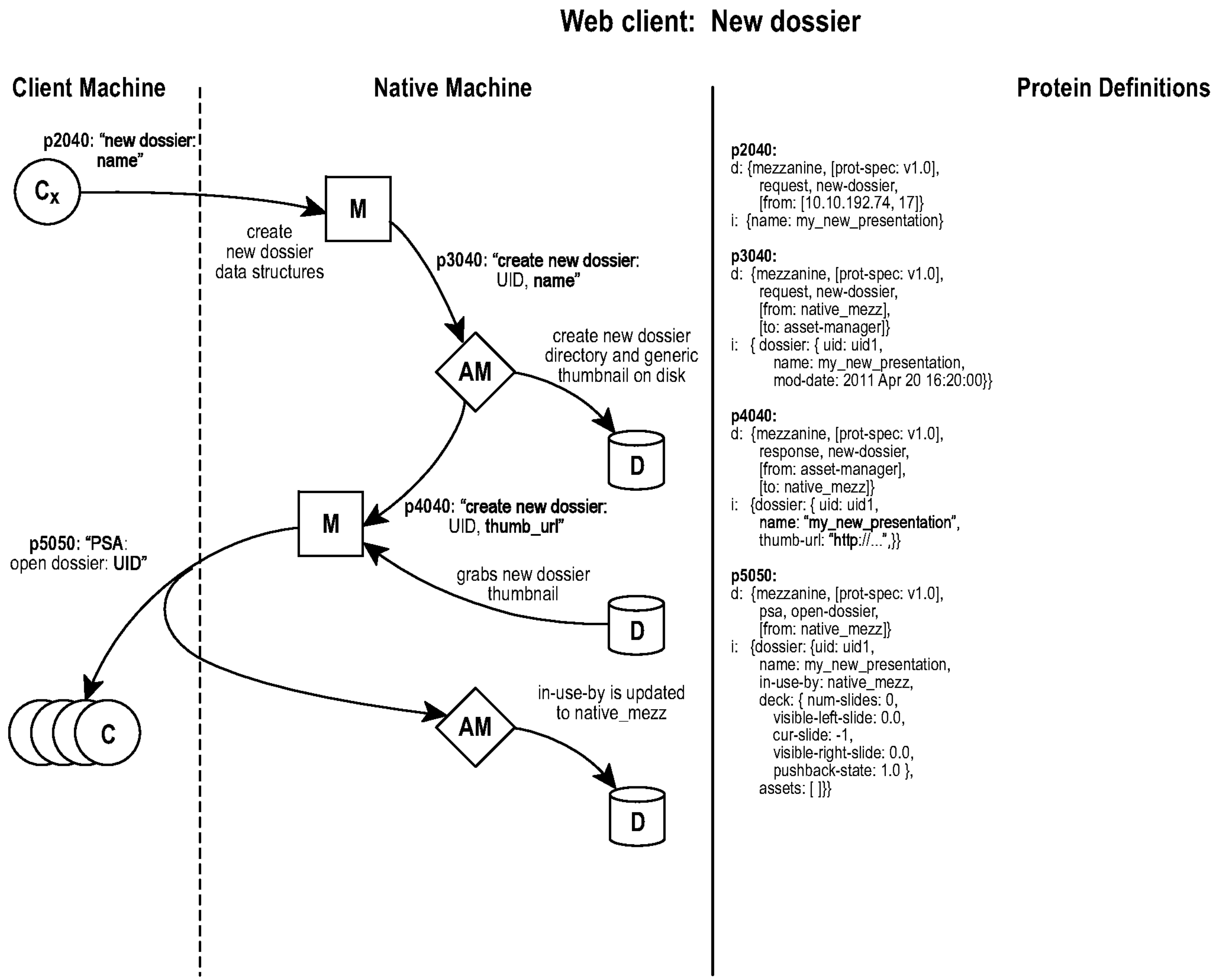

FIG. 47 is a flow diagram of a Mezz process for Client requesting a new dossier, under an embodiment.

FIG. 48 is a flow diagram of a Mezz process for Client requesting a new dossier (error 1), under an embodiment.

Figure 49:
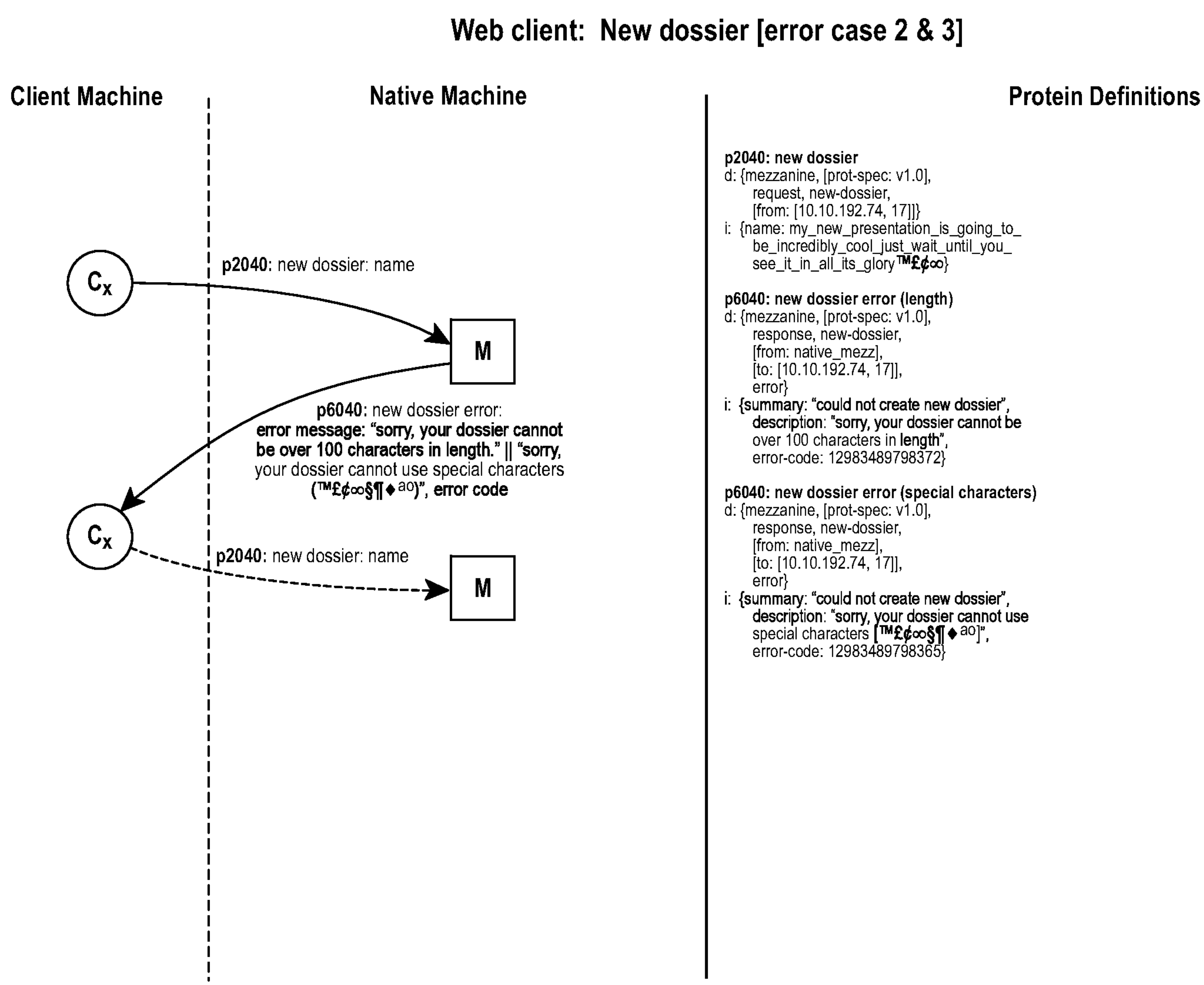

FIG. 49 is a flow diagram of a Mezz process for Client requesting a new dossier (error 2 and 3), under an embodiment.

Figure 50:
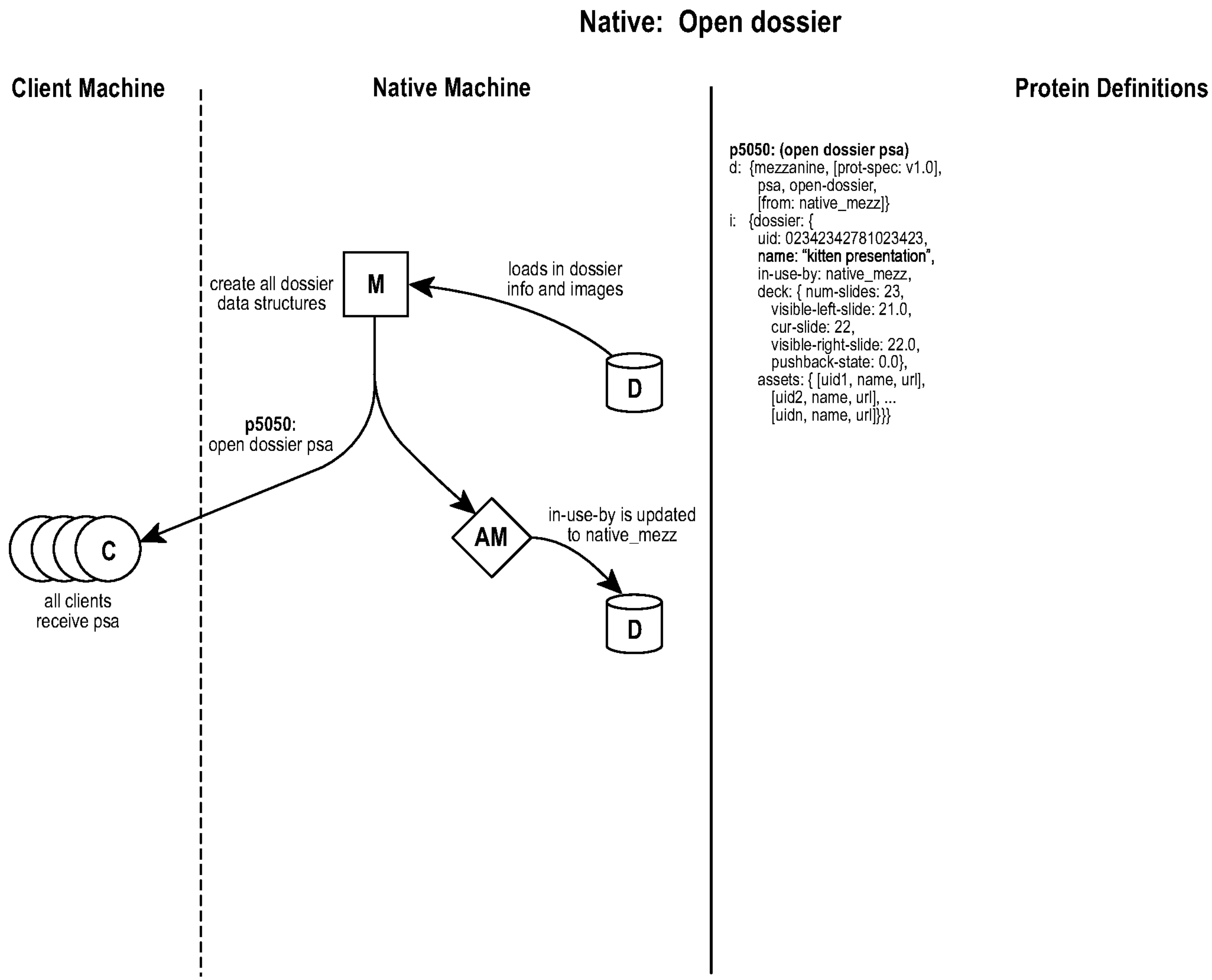

FIG. 50 is a flow diagram of a Mezz process for Mezz opening a dossier, under an embodiment.

Figure 51:
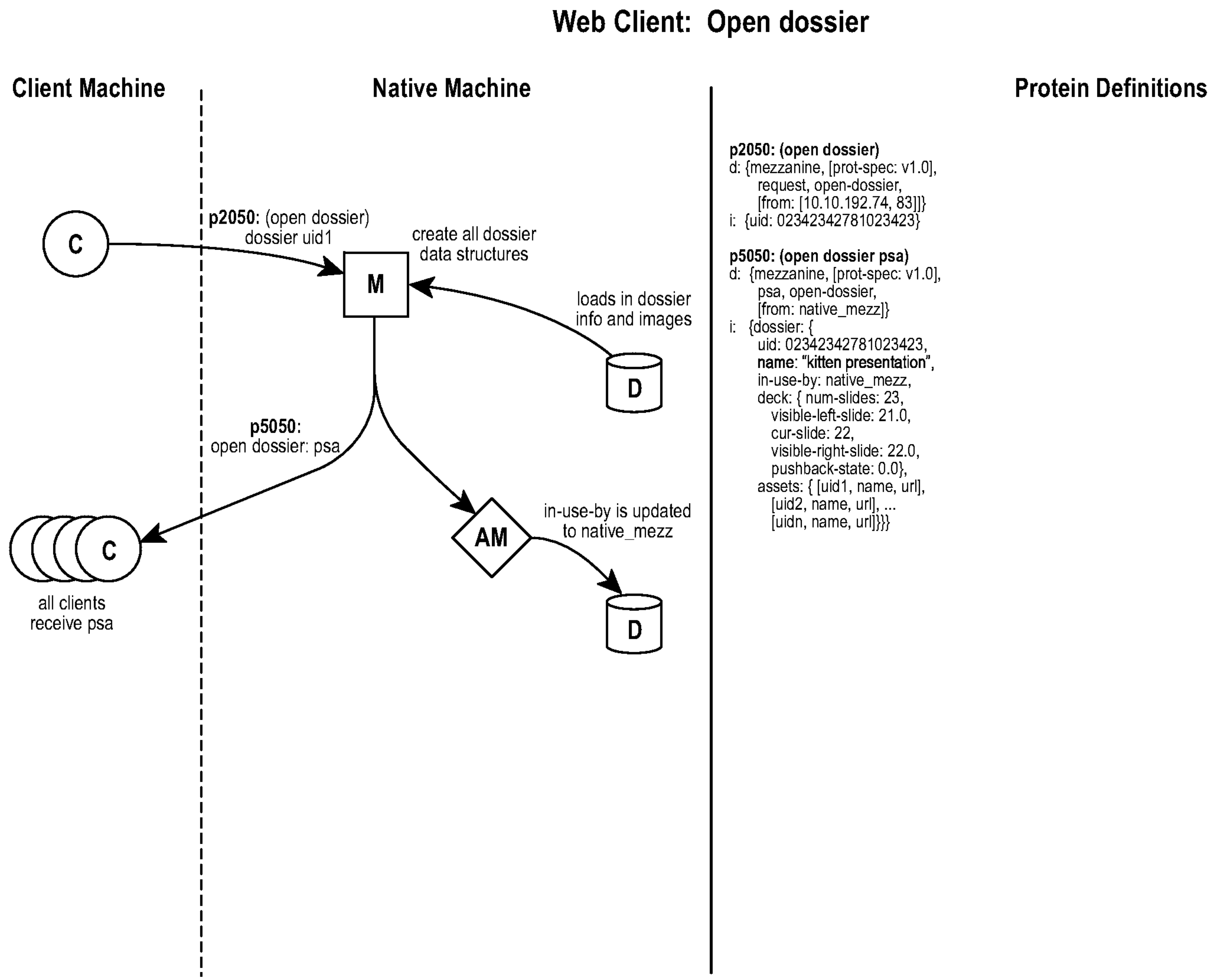

FIG. 51 is a flow diagram of a Mezz process for Client requesting opening a dossier, under an embodiment.

Figure 52:
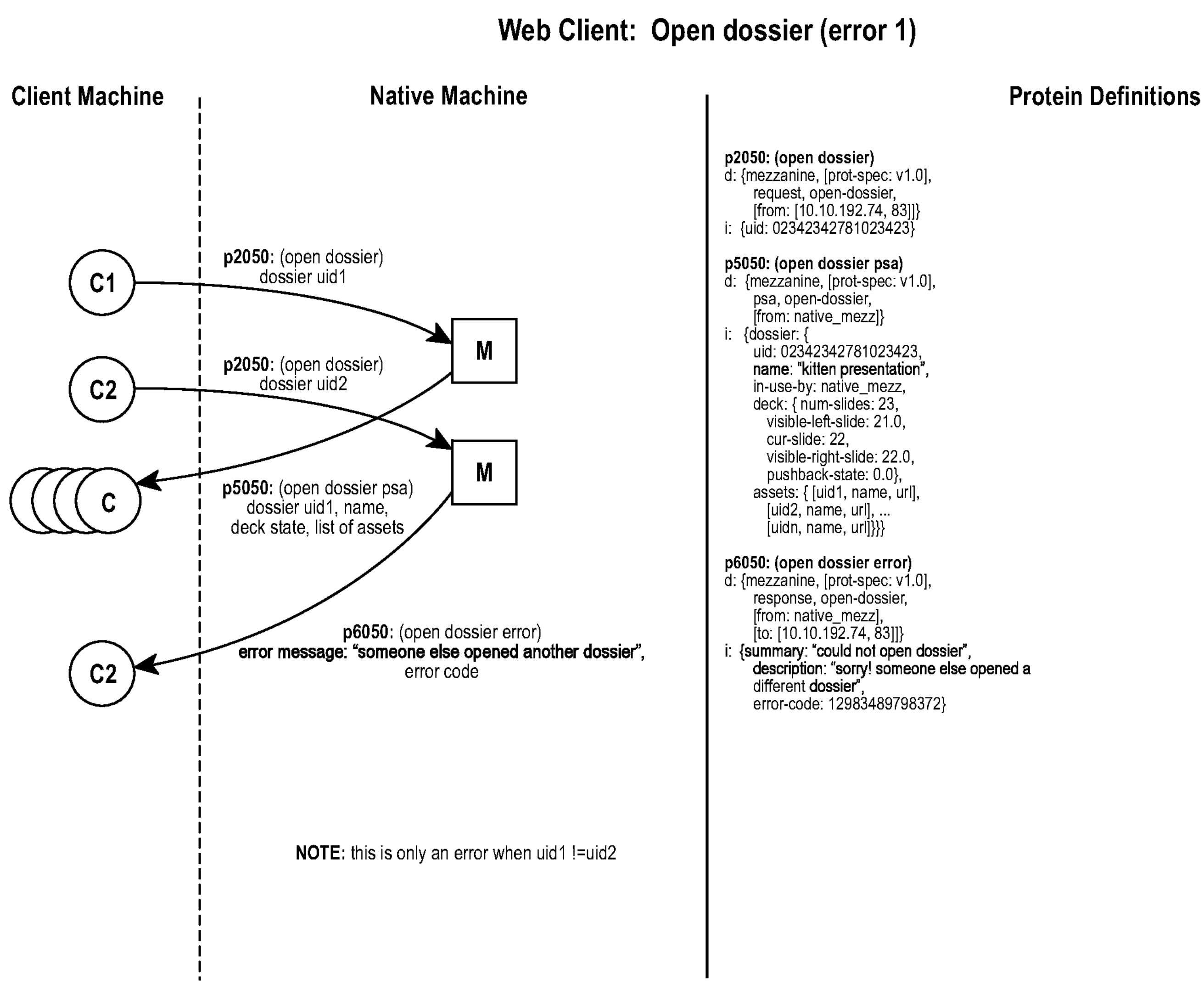

FIG. 52 is a flow diagram of a Mezz process for Client requesting opening a dossier (error 1), under an embodiment.

Figure 53:
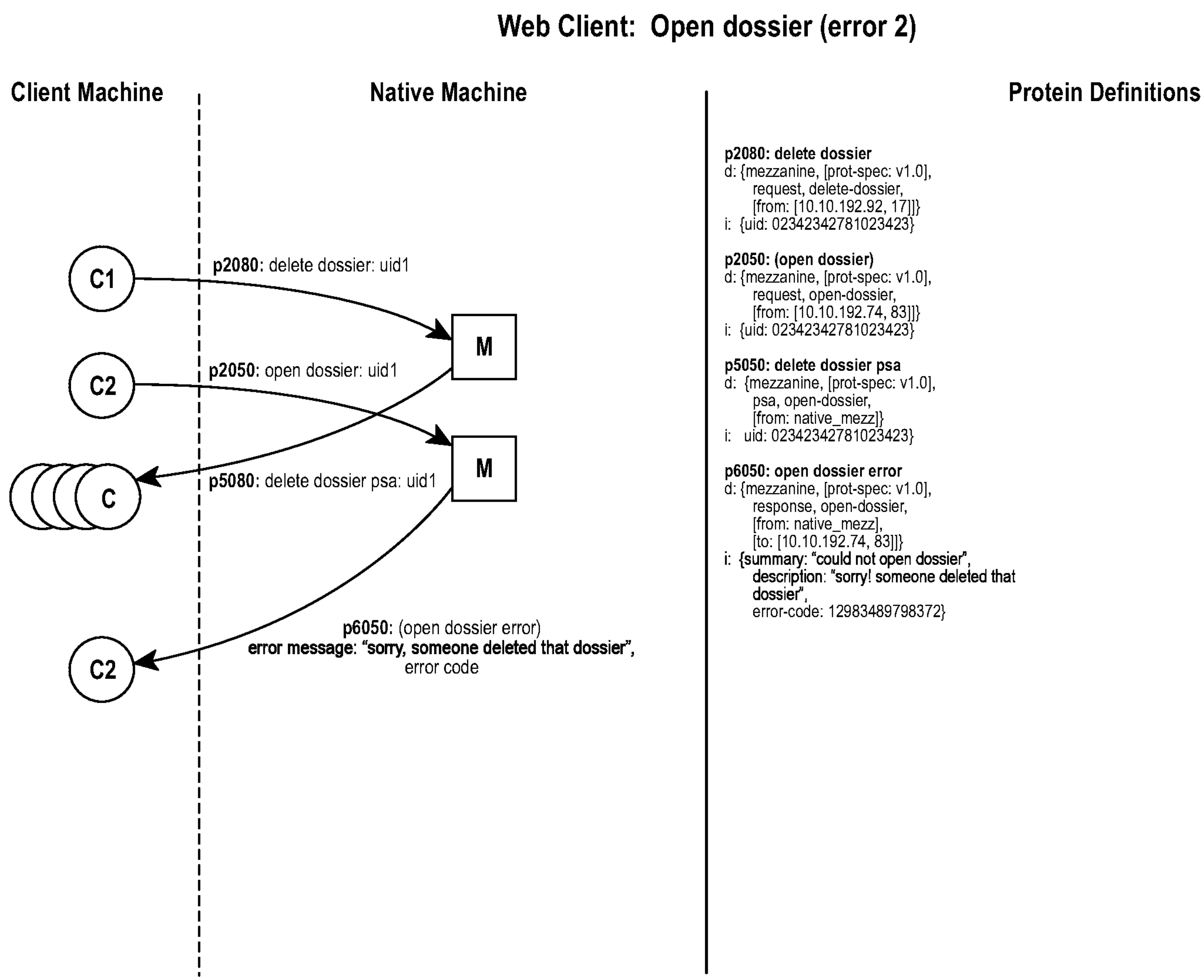

FIG. 53 is a flow diagram of a Mezz process for Client requesting opening a dossier (error 2), under an embodiment.

Figure 54:
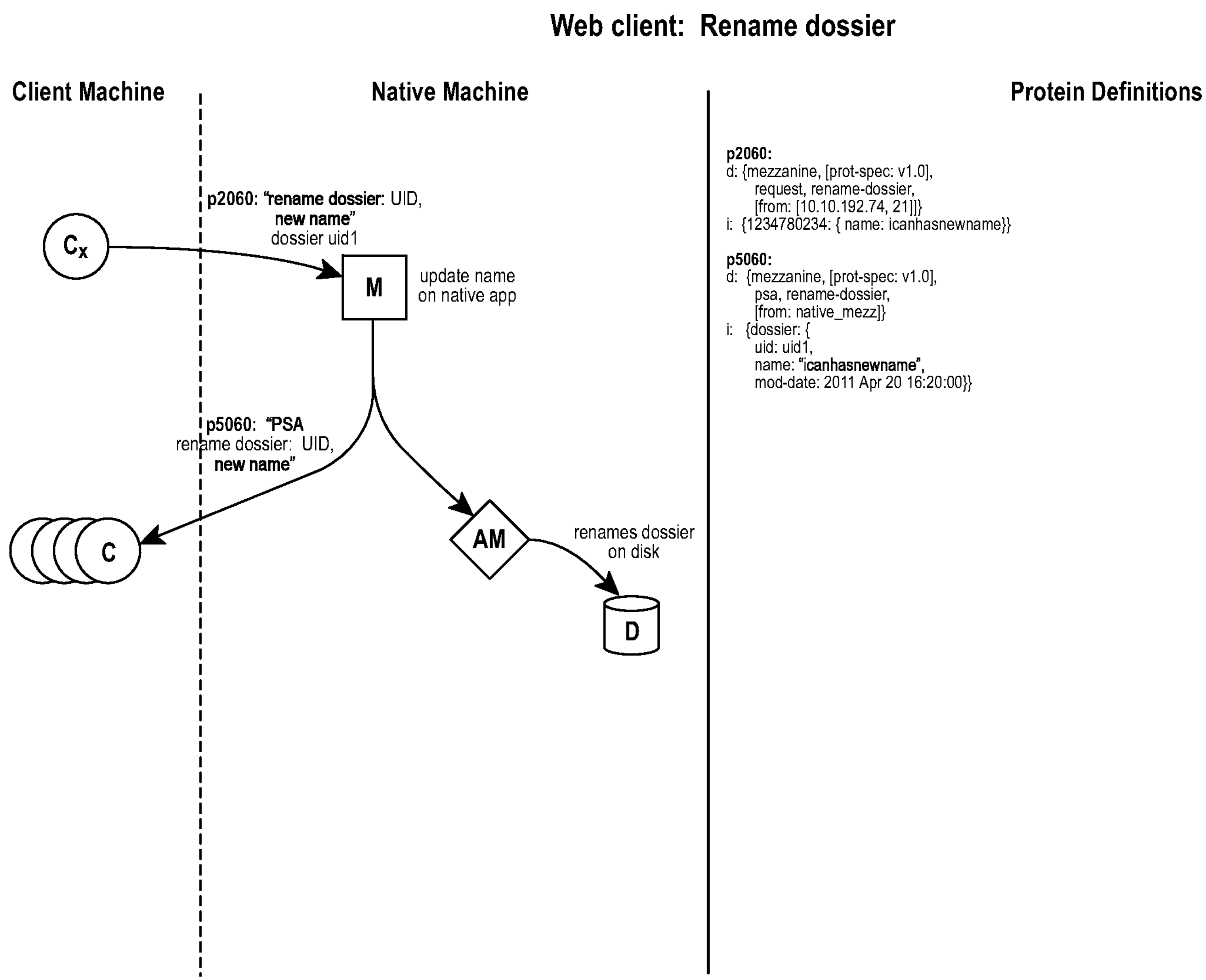

FIG. 54 is a flow diagram of a Mezz process for Client requesting renaming of a dossier, under an embodiment.

FIG. 55 is a flow diagram of a Mezz process for Client requesting renaming of a dossier (error 1), under an embodiment.

Figure 56:
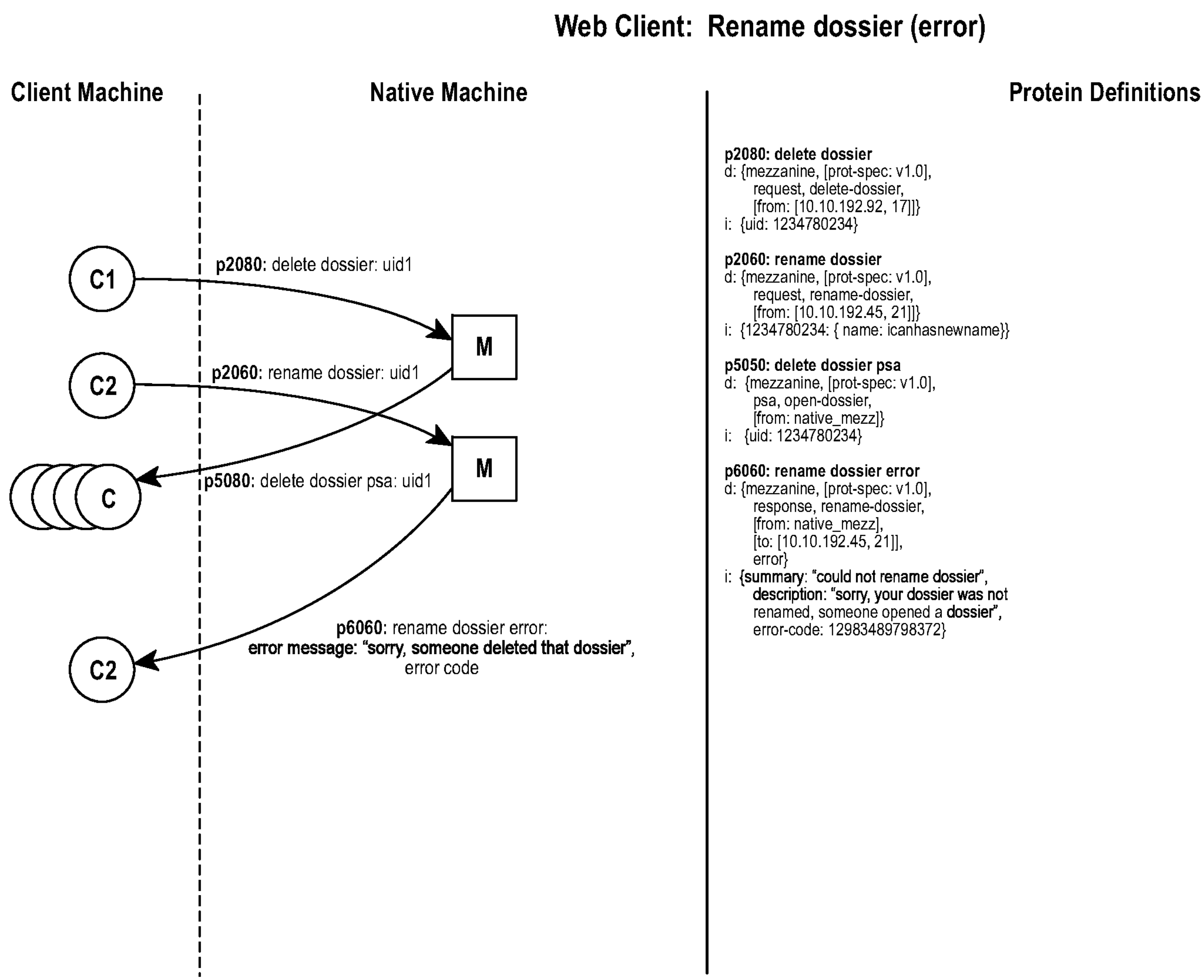

FIG. 56 is a flow diagram of a Mezz process for Client requesting renaming of a dossier (error 2), under an embodiment.

FIG. 57 is a flow diagram of a Mezz process for Mezz duplicating a dossier, under an embodiment.

FIG. 58 is a flow diagram of a Mezz process for Client duplicating a dossier, under an embodiment.

Figure 59:
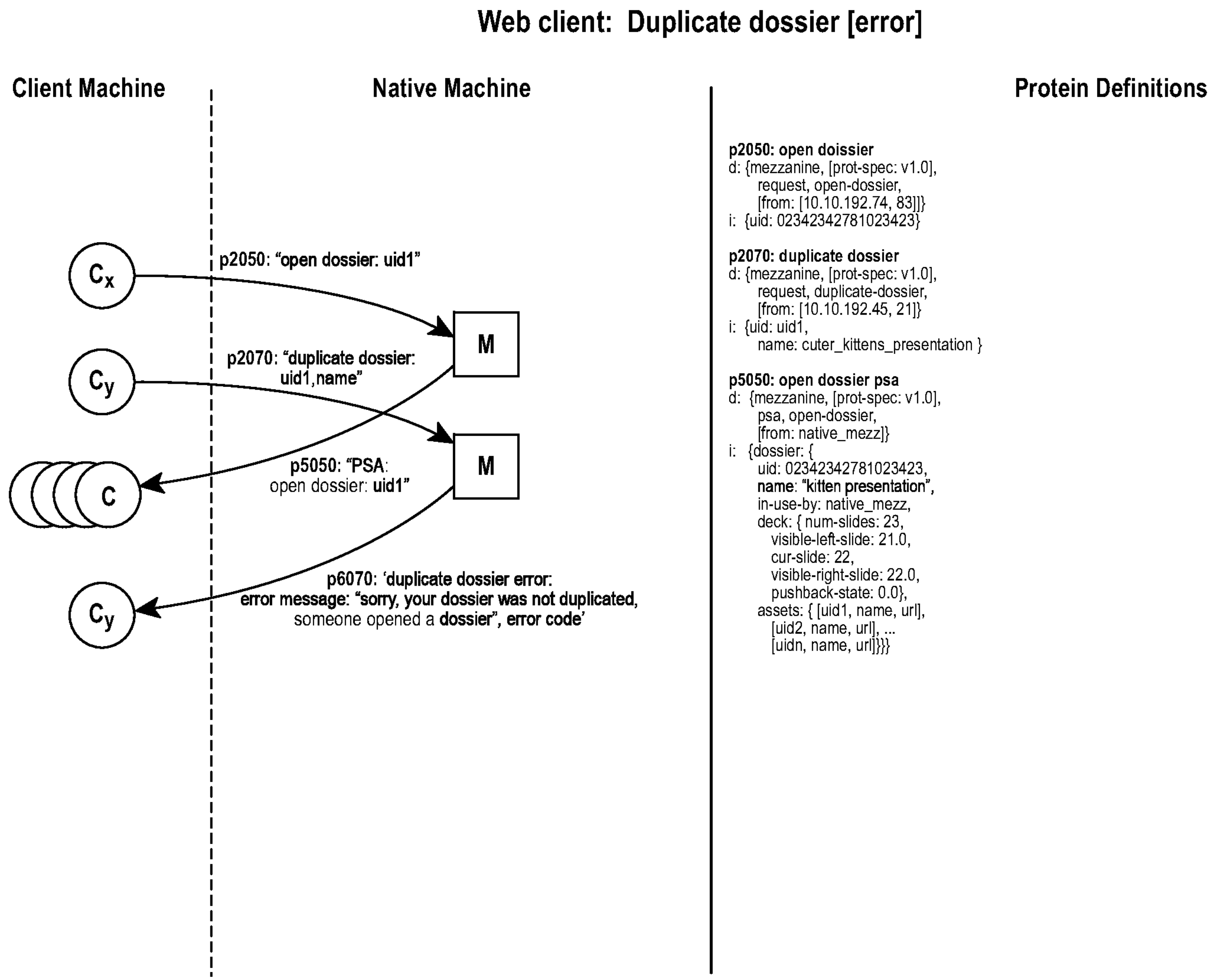

FIG. 59 is a flow diagram of a Mezz process for Client duplicating a dossier (error 1), under an embodiment.

Figure 60:
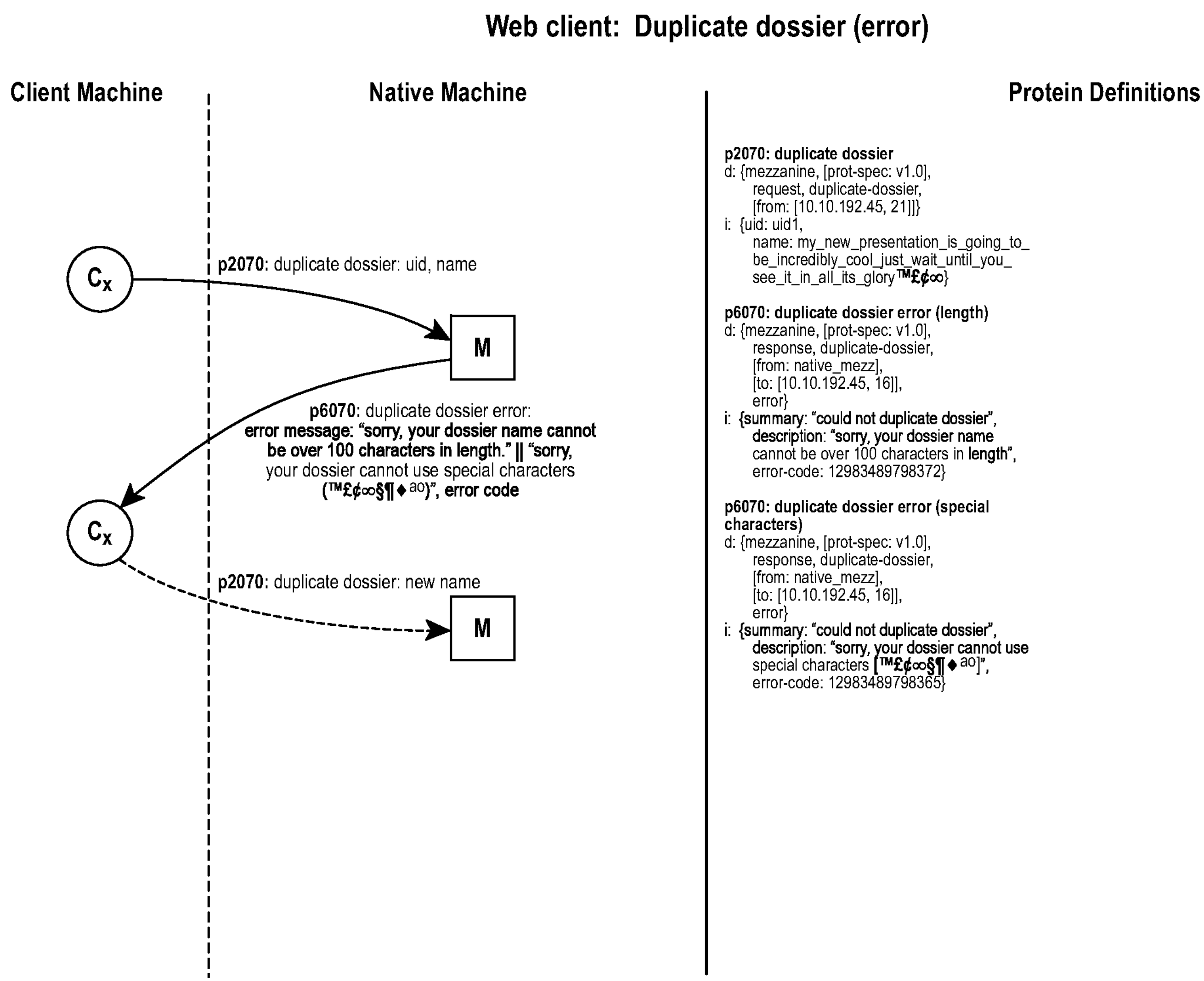

FIG. 60 is a flow diagram of a Mezz process for Client duplicating a dossier (error 2 and 3), under an embodiment.

Figure 61:
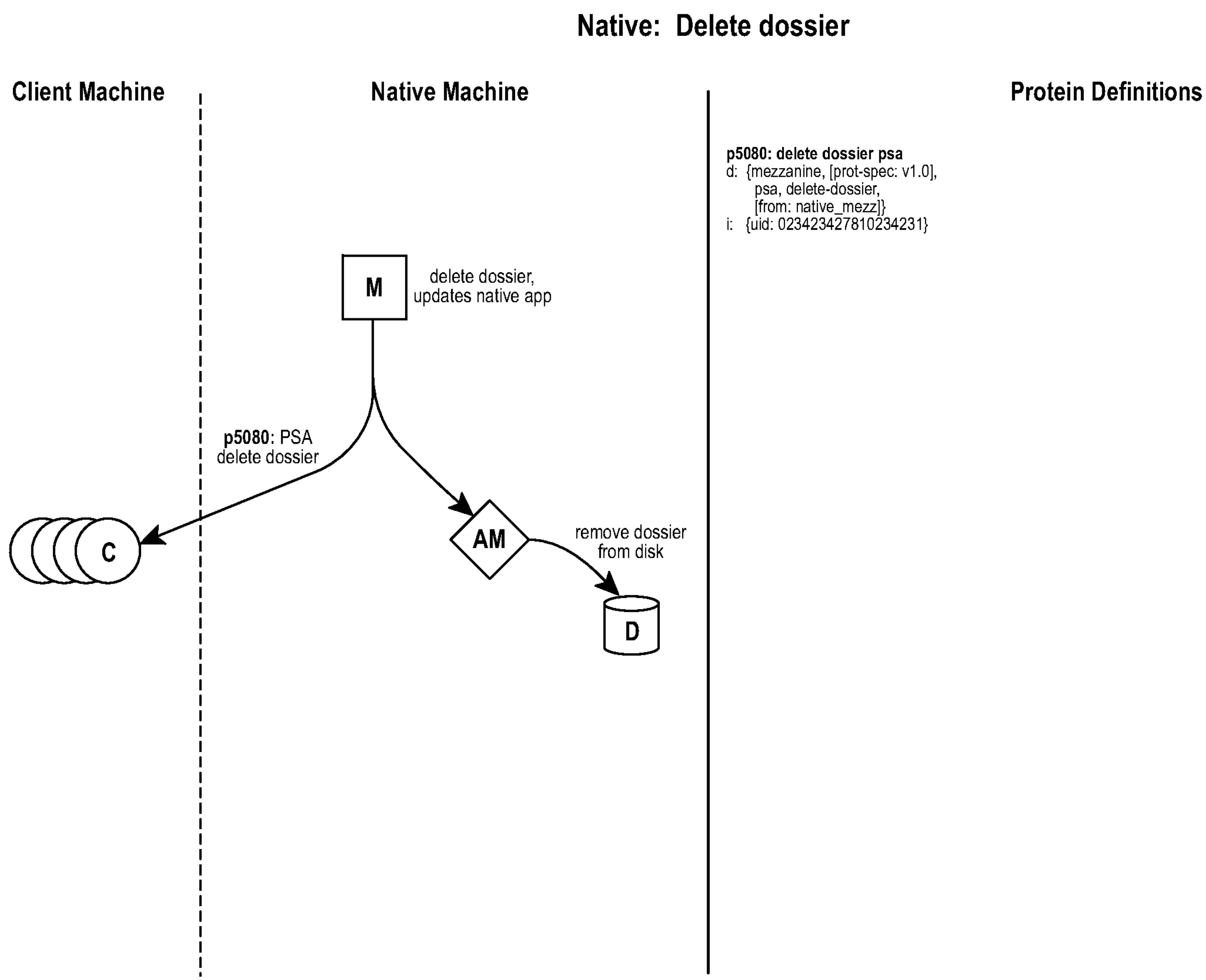

FIG. 61 is a flow diagram of a Mezz process for Mezz deleting a dossier, under an embodiment.

Figure 62:
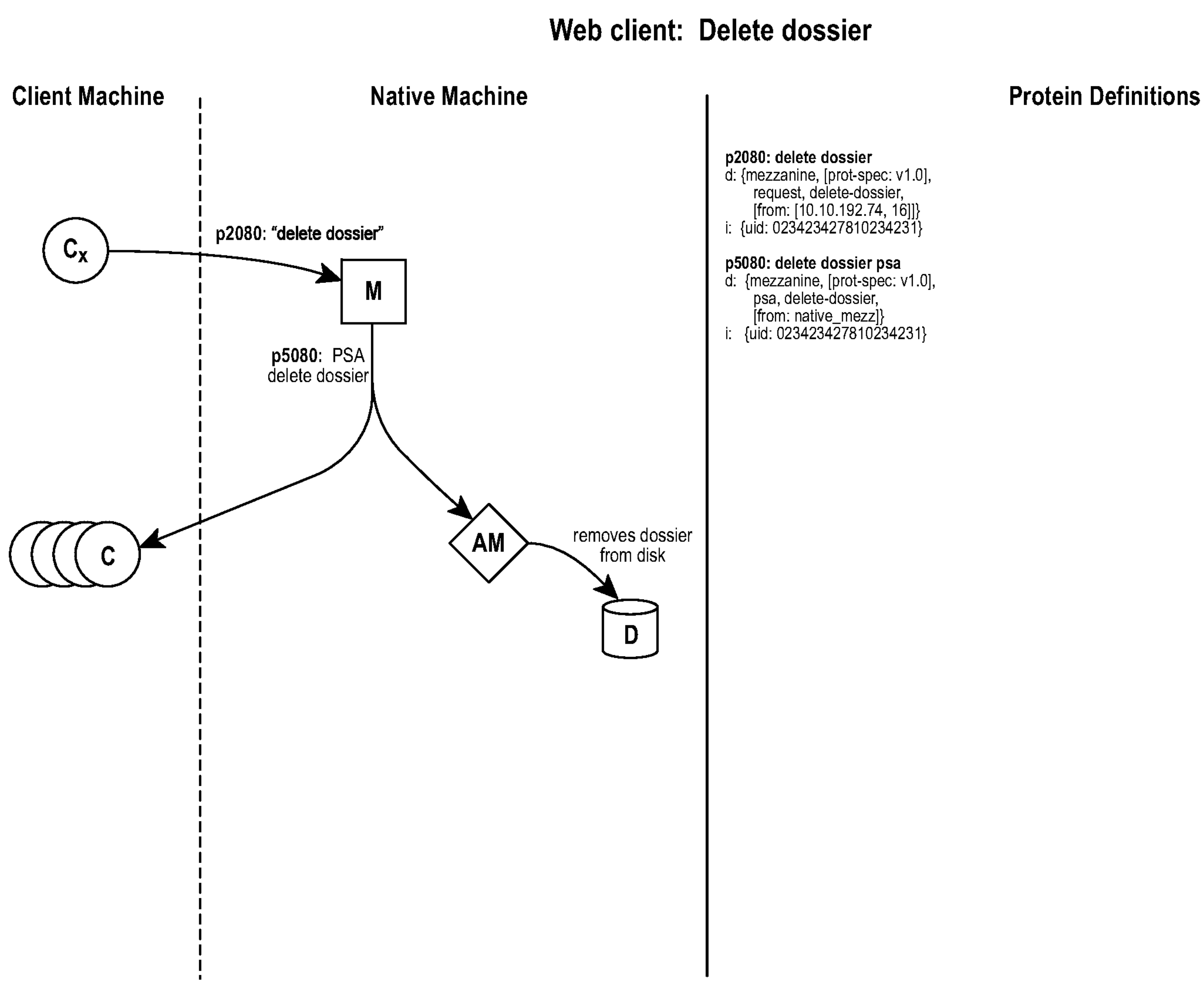

FIG. 62 is a flow diagram of a Mezz process for Client deleting a dossier, under an embodiment.

FIG. 63 is a flow diagram of a Mezz process for Client deleting a dossier (error), under an embodiment.

Figure 64:
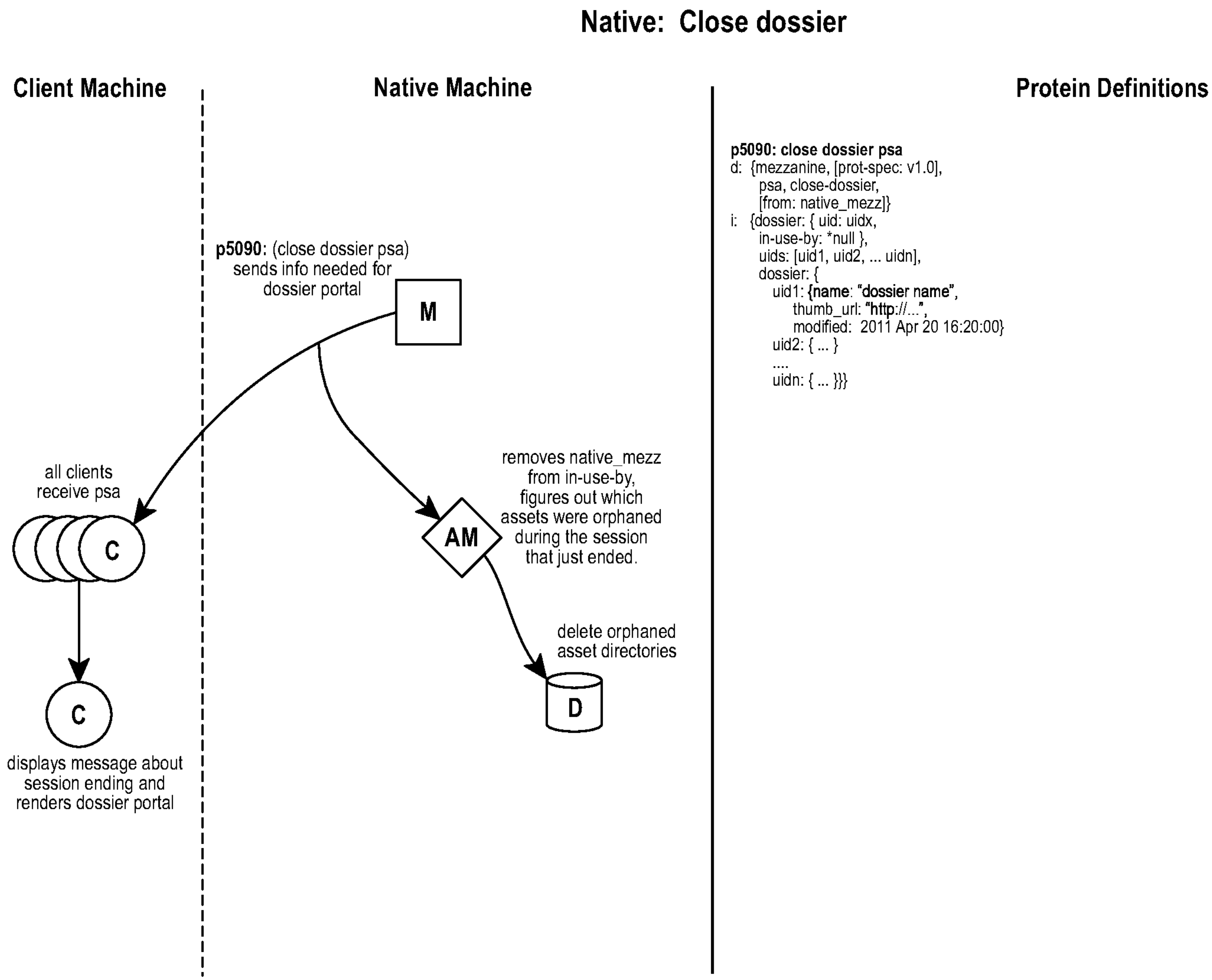

FIG. 64 is a flow diagram of a Mezz process for Mezz closing a dossier, under an embodiment.

Figure 65:
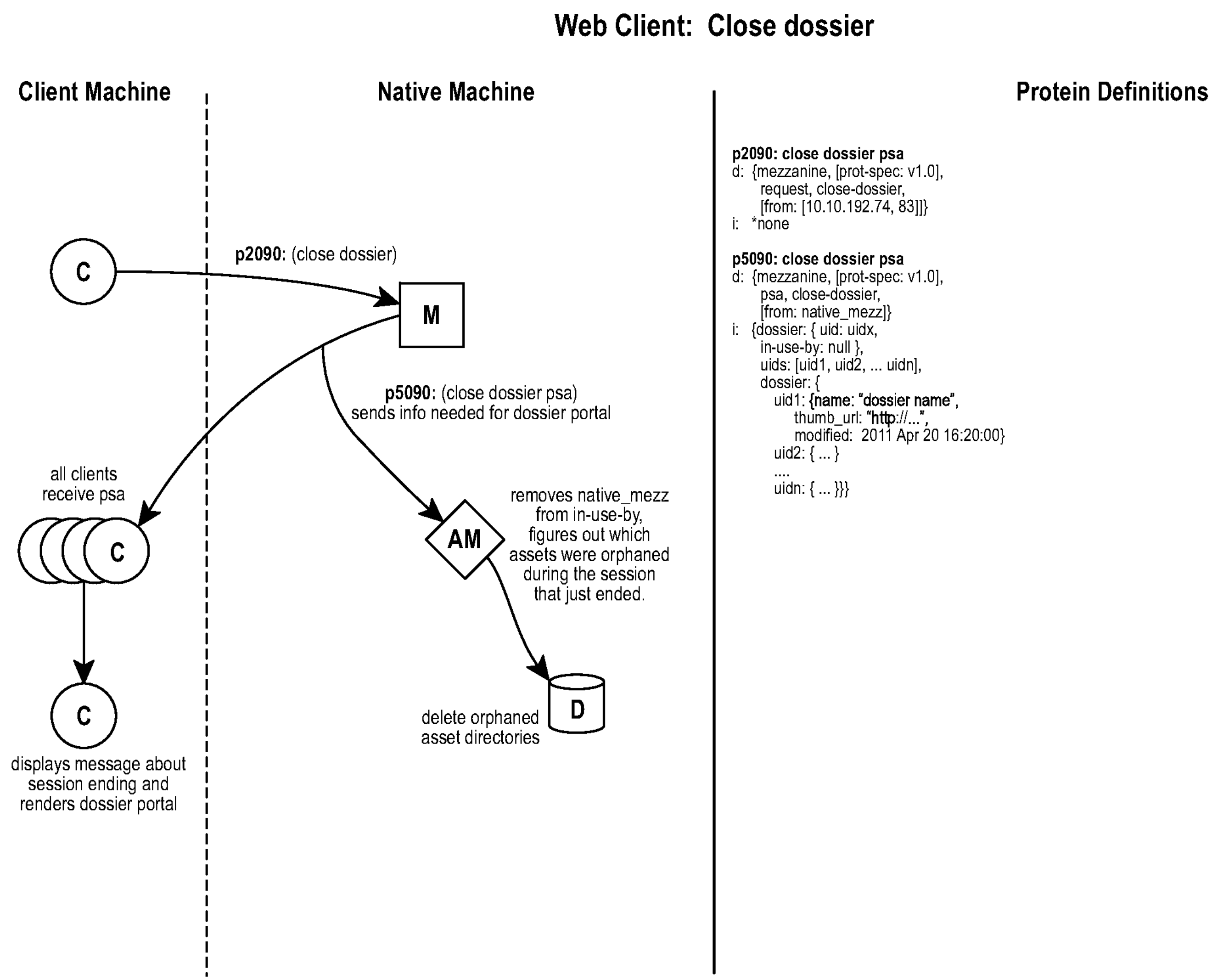

FIG. 65 is a flow diagram of a Mezz process for Client closing a dossier, under an embodiment.

Figure 66:
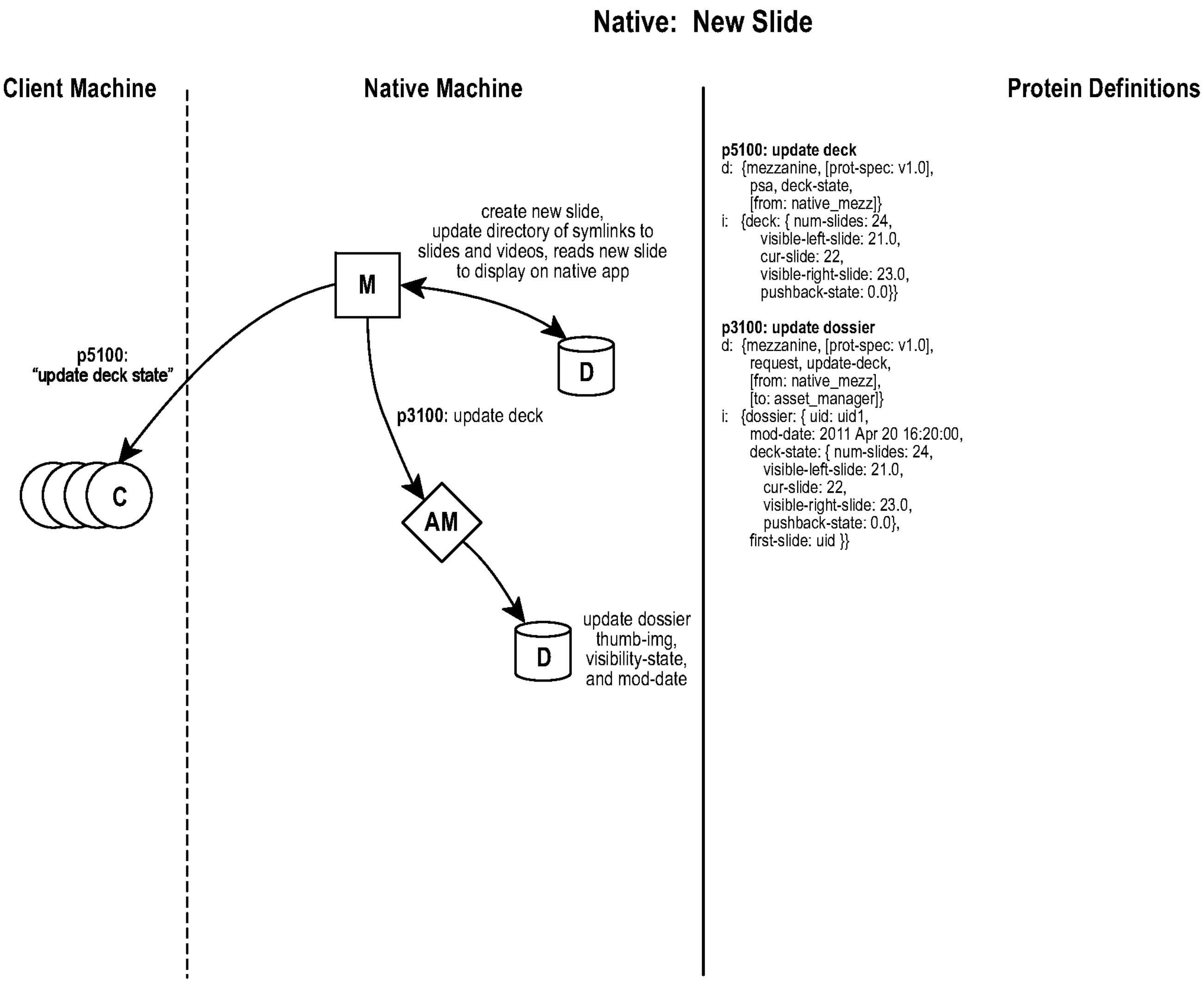

FIG. 66 is a flow diagram of a Mezz process for a new slide, under an embodiment.

Figure 67:
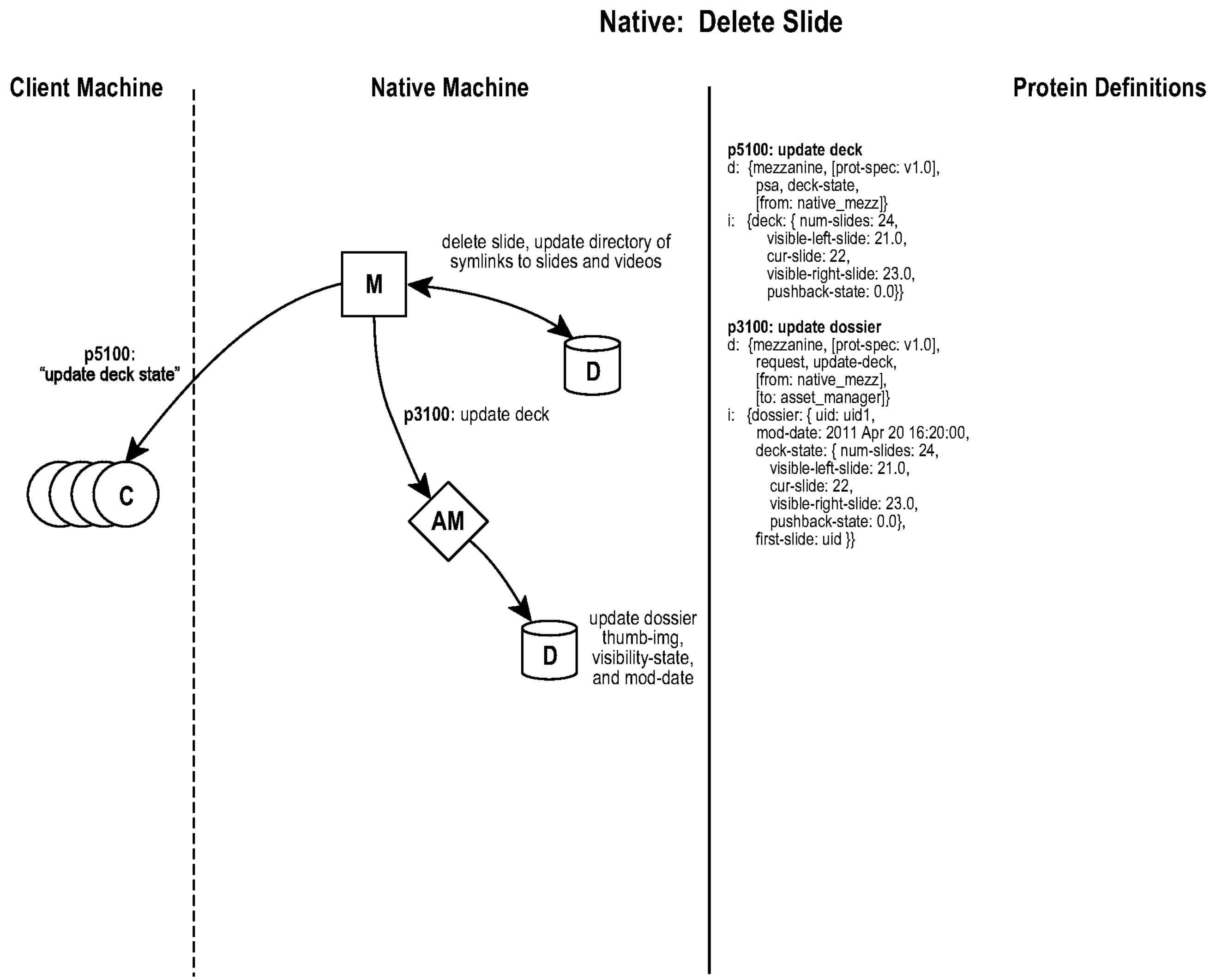

FIG. 67 is a flow diagram of a Mezz process for deleting a slide, under an embodiment.

Figure 68:
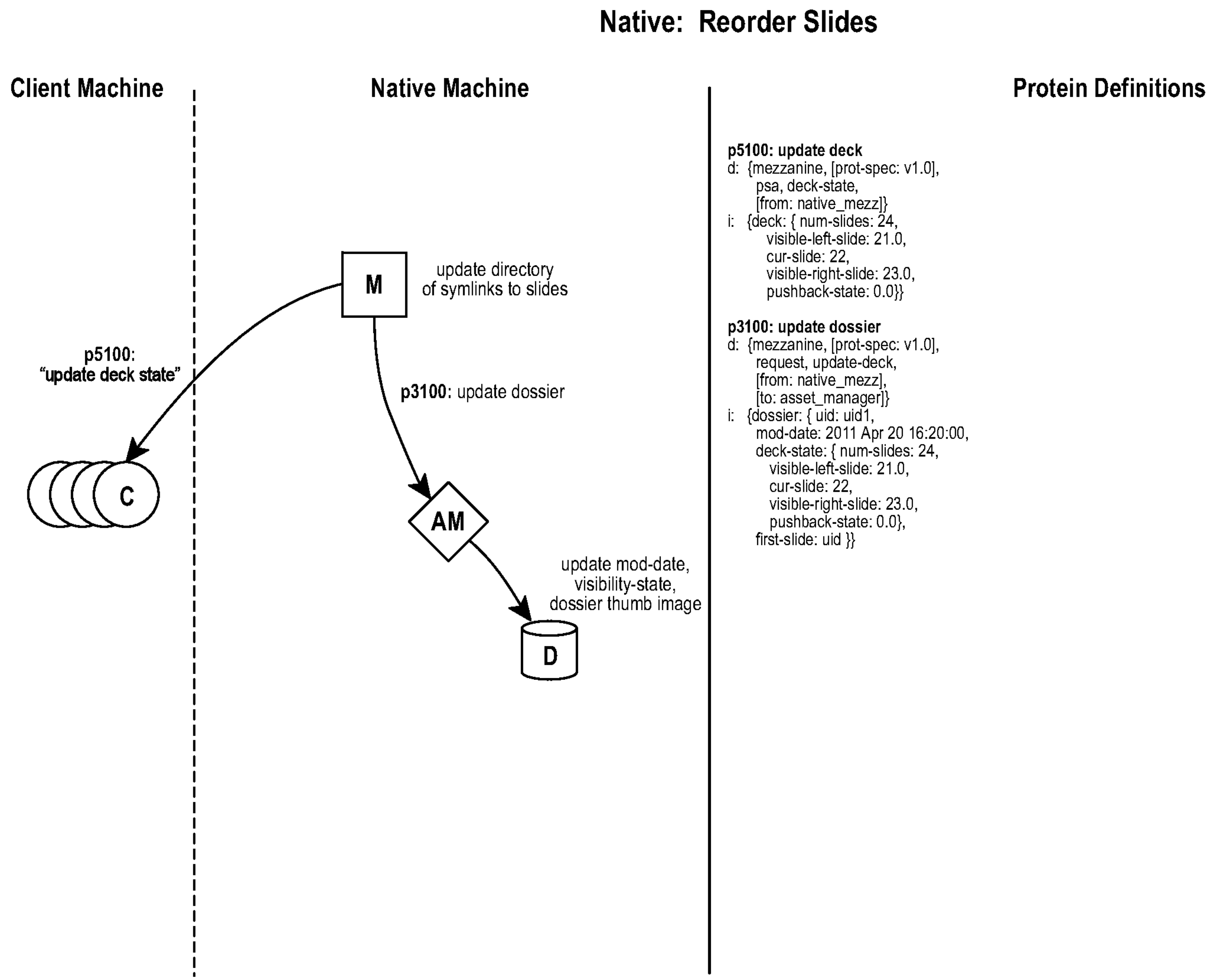

FIG. 68 is a flow diagram of a Mezz process for reordering slides, under an embodiment.

Figure 69:
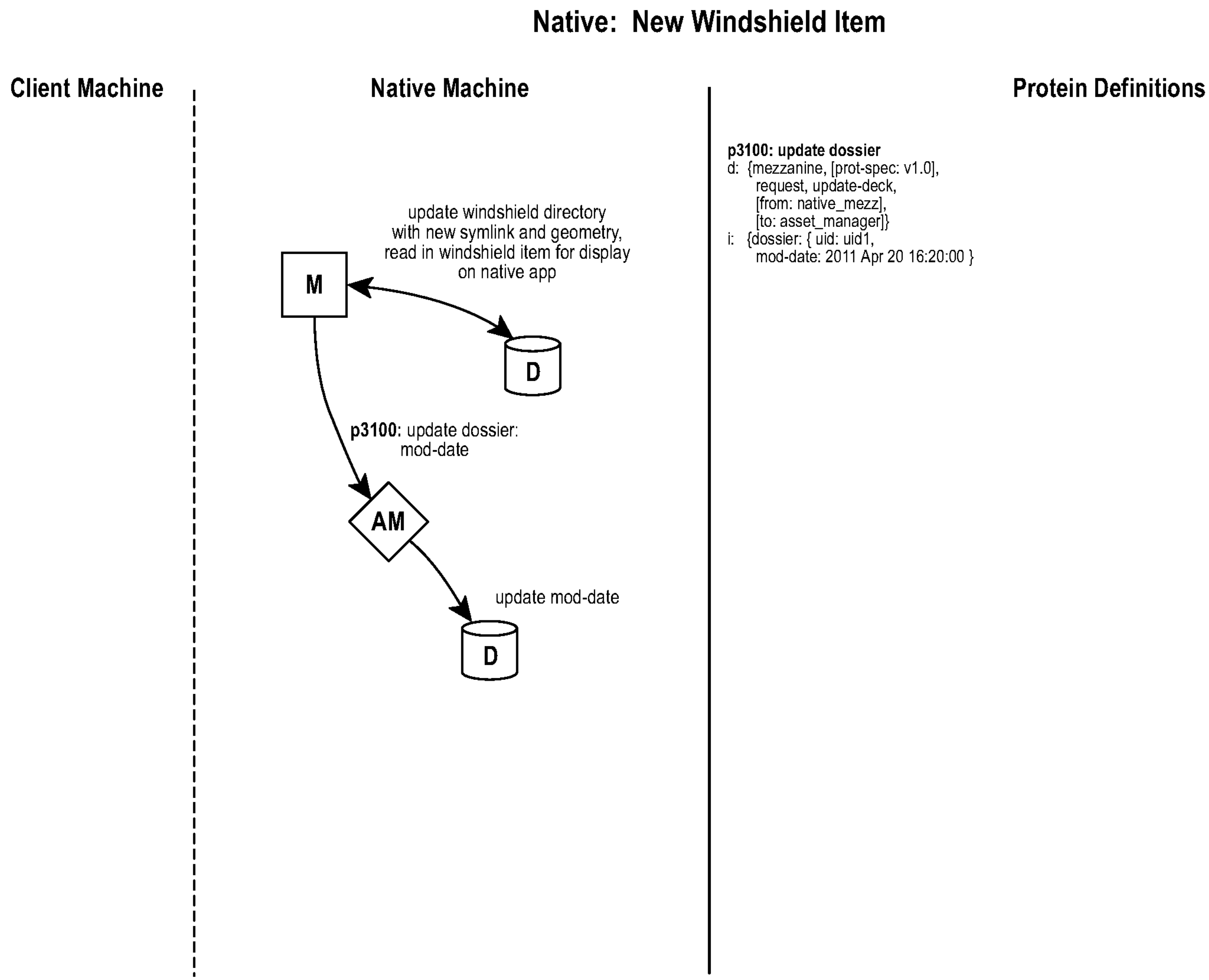

FIG. 69 is a flow diagram of a Mezz process for a new windshield item, under an embodiment.

Figure 70:
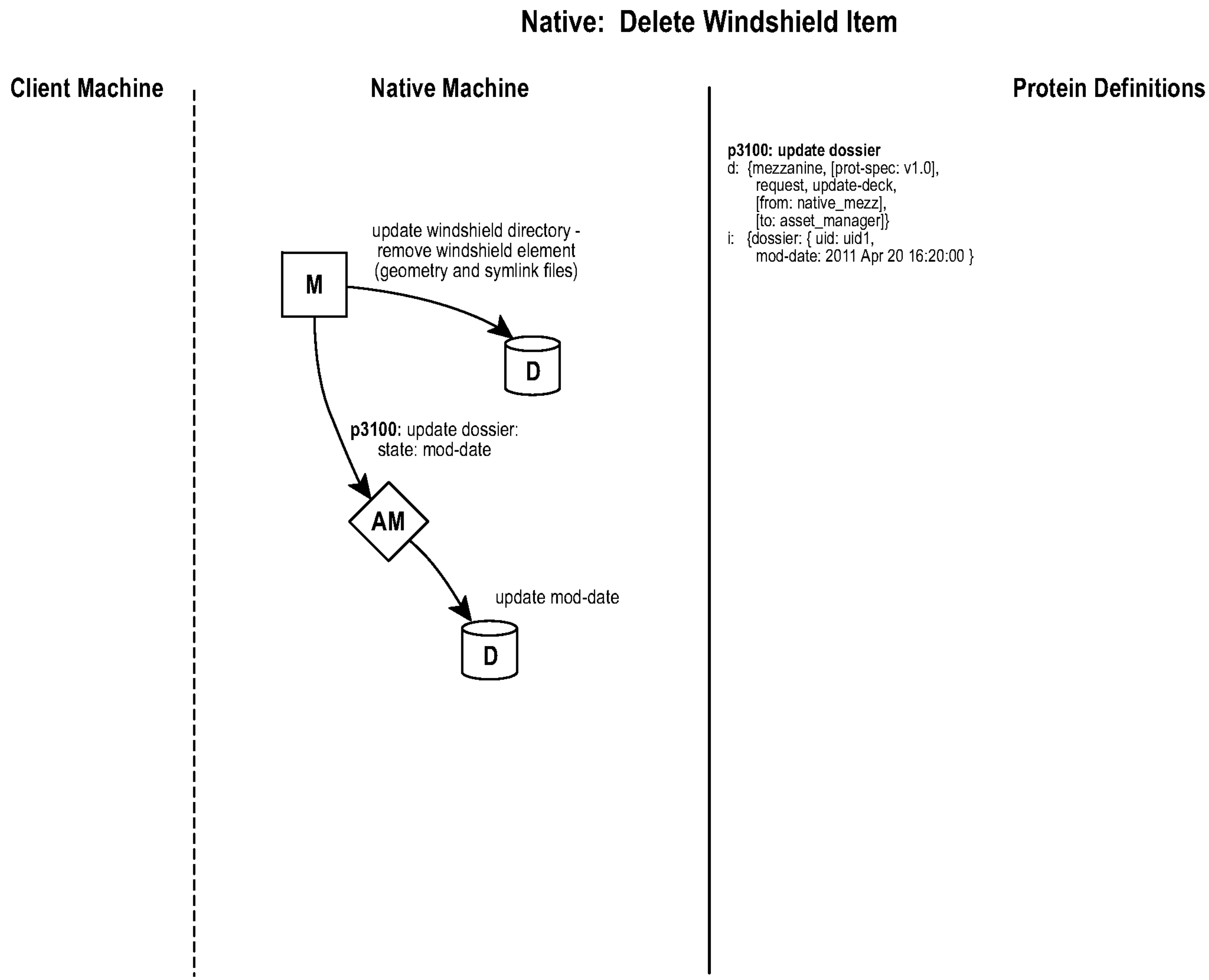

FIG. 70 is a flow diagram of a Mezz process for deleting a windshield item, under an embodiment.

Figure 71:
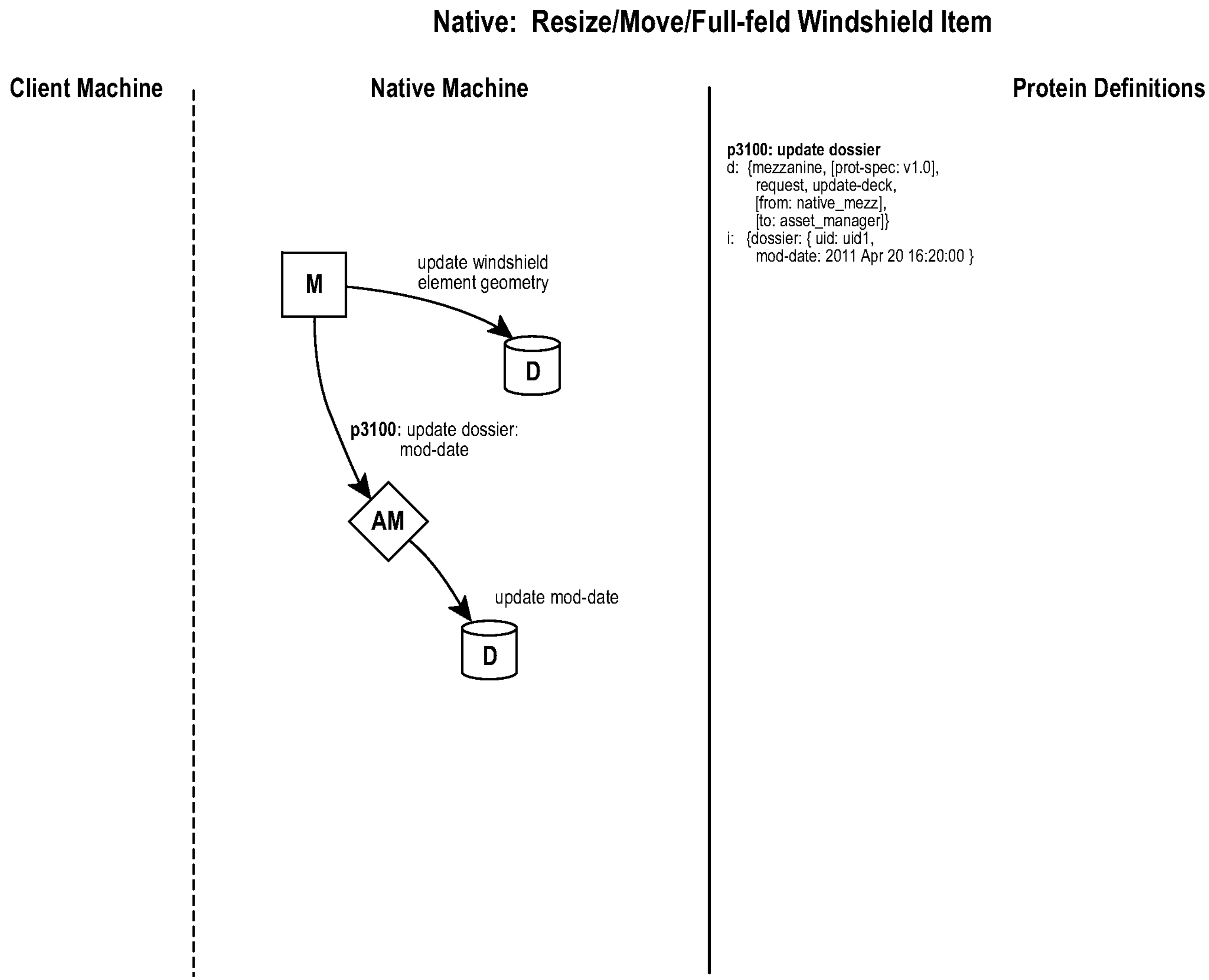

FIG. 71 is a flow diagram of a Mezz process for resizing/moving/full-feld windshield item, under an embodiment.

Figure 72:
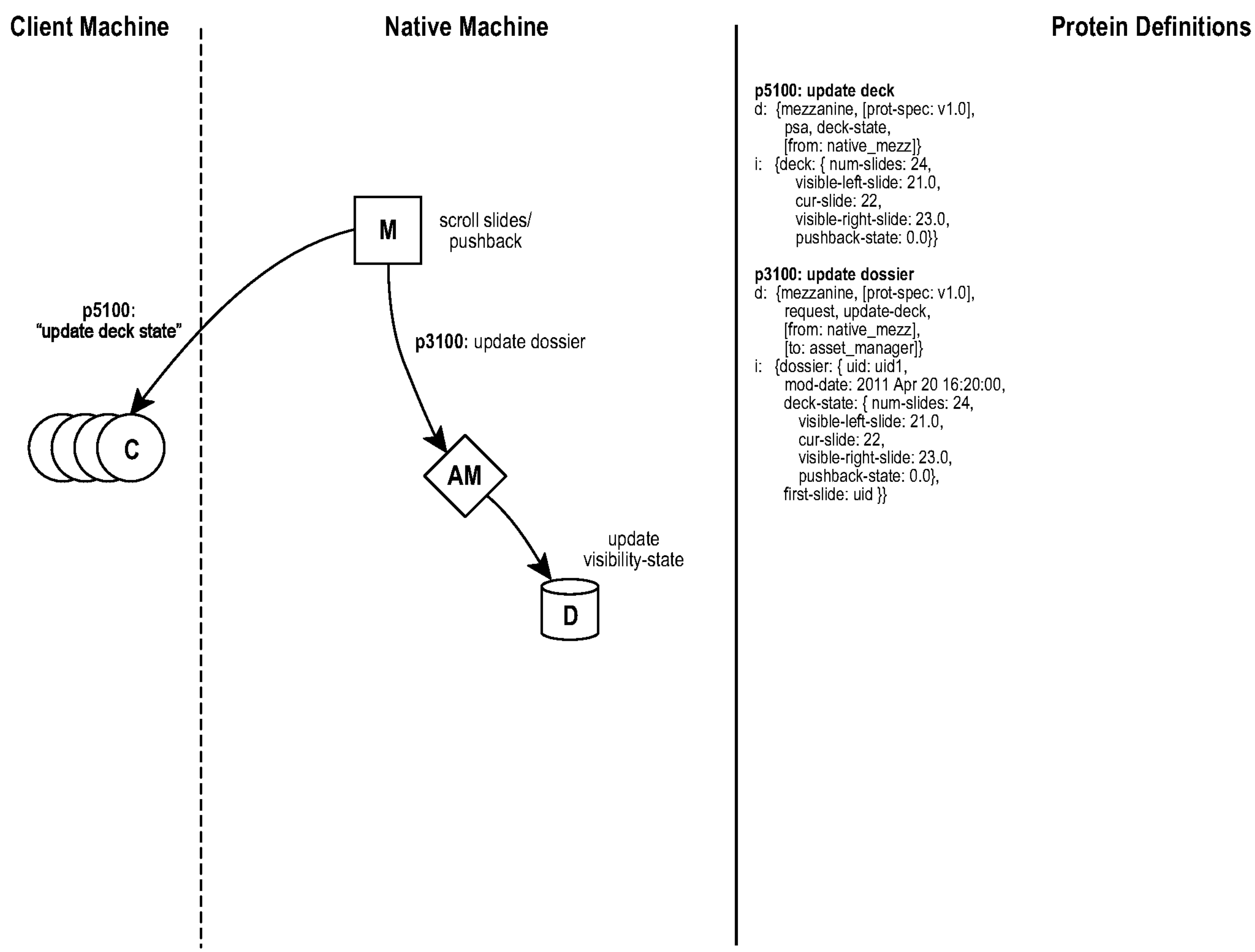

FIG. 72 is a flow diagram of a Mezz process for scrolling slide(s) and pushback, under an embodiment.

FIG. 73 is a flow diagram of a Mezz process for web client scrolling deck, under an embodiment.

Figure 74:
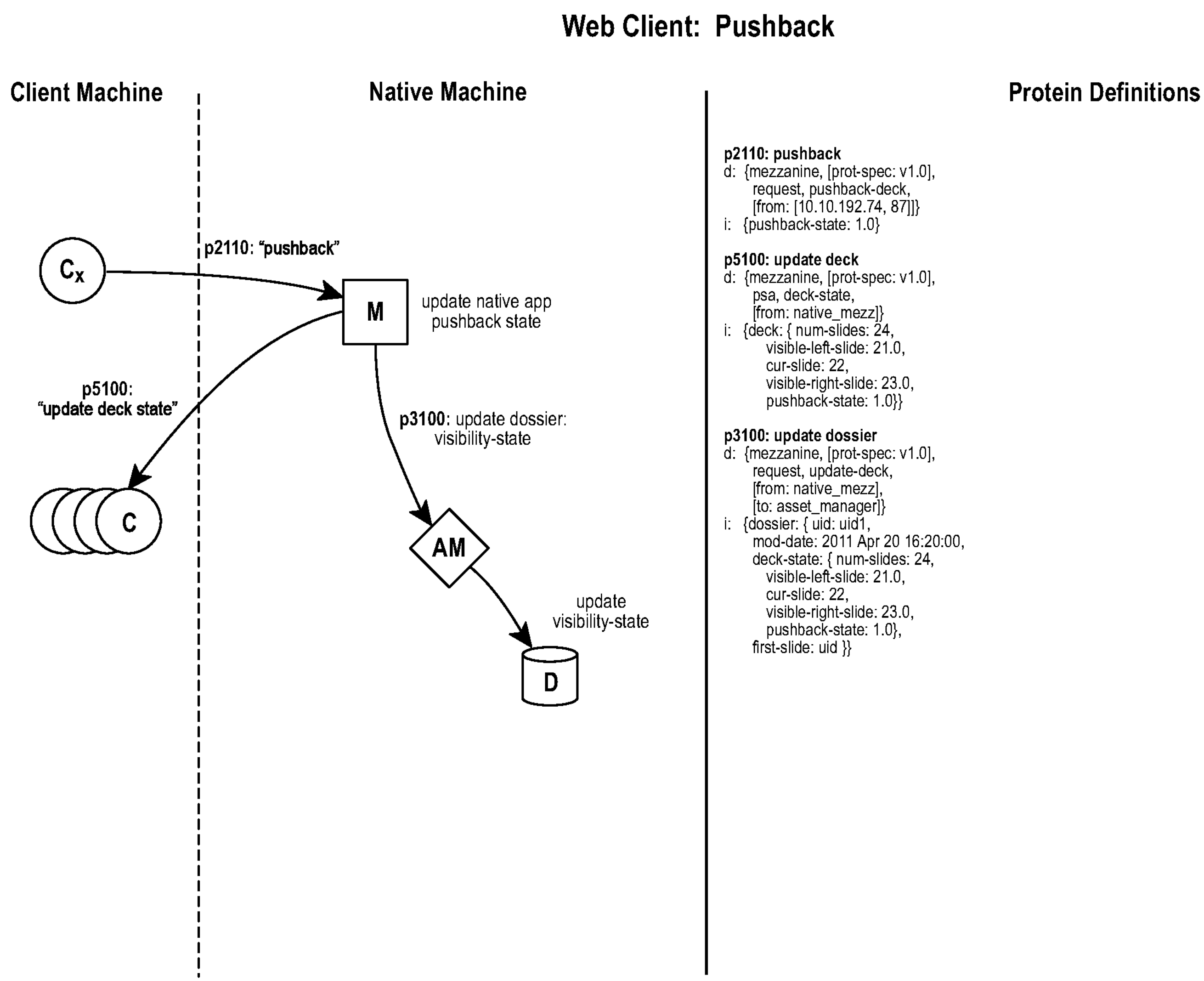

FIG. 74 is a flow diagram of a Mezz process for web client pushback, under an embodiment.

Figure 75:
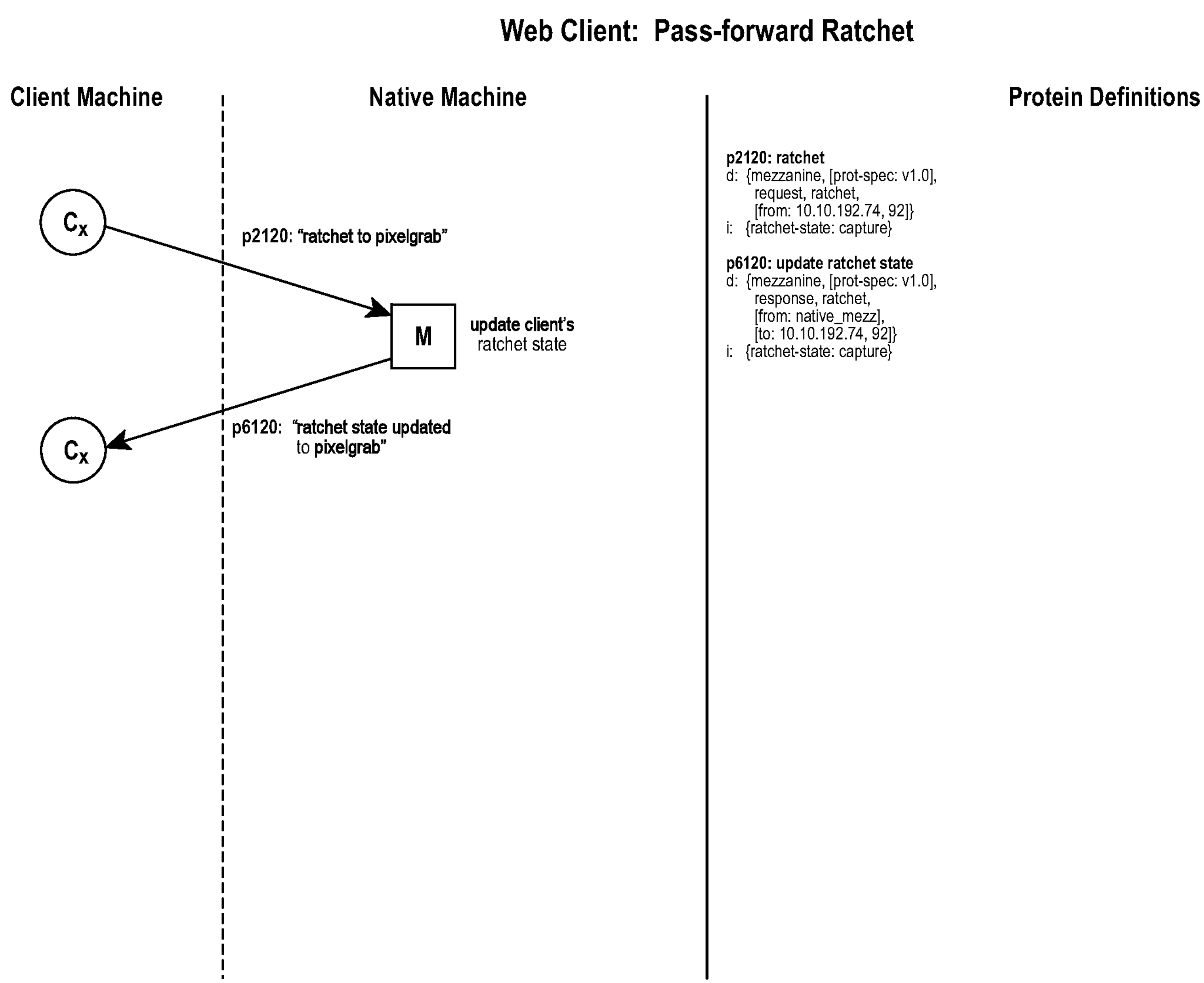

FIG. 75 is a flow diagram of a Mezz process for web client pass-forward ratchet, under an embodiment.

Figure 76:
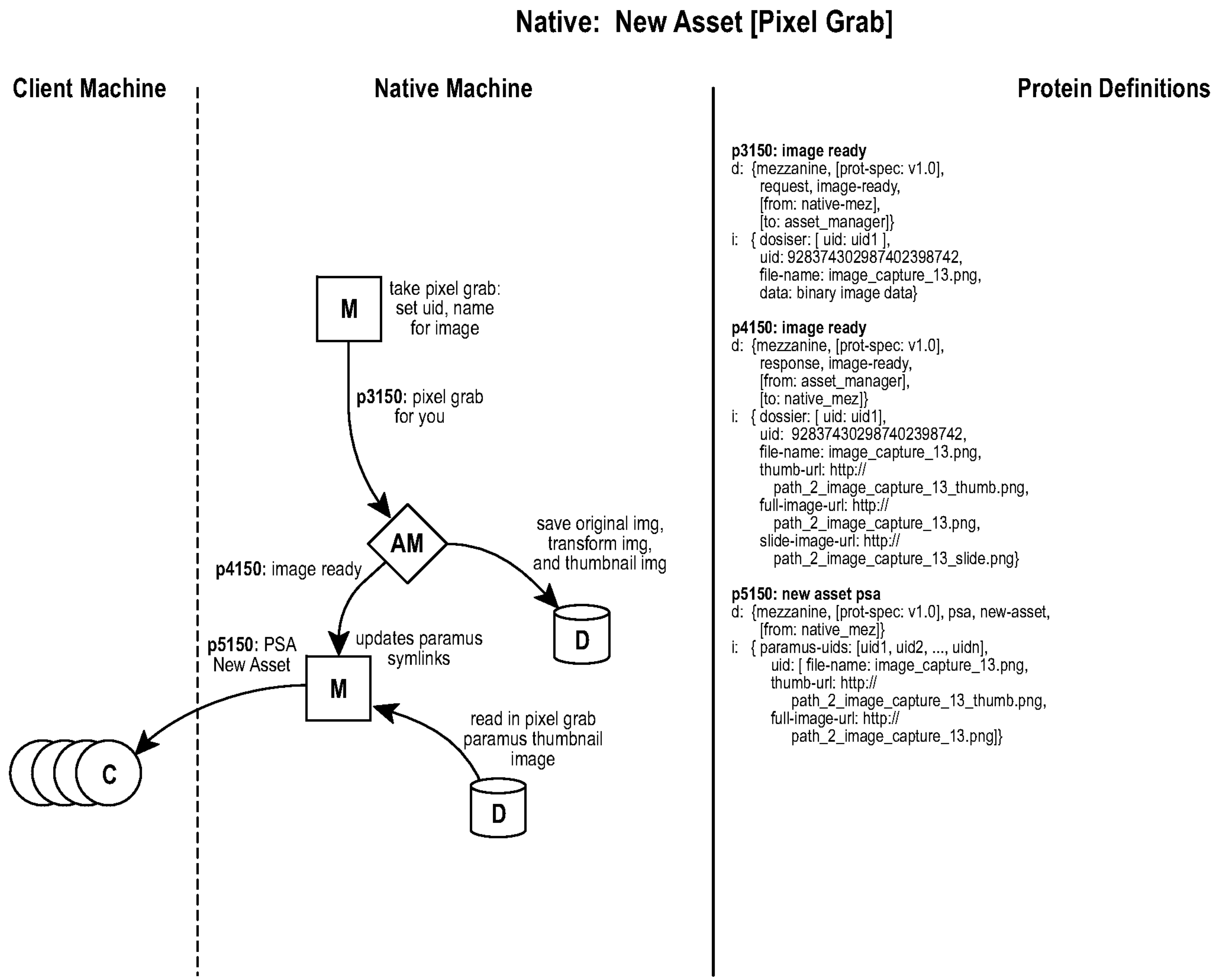

FIG. 76 is a flow diagram of a Mezz process for new asset (pixel grab), under an embodiment.

FIG. 77 is a flow diagram of a Mezz process for Client upload of asset(s)/slide(s), under an embodiment.

Figure 78:
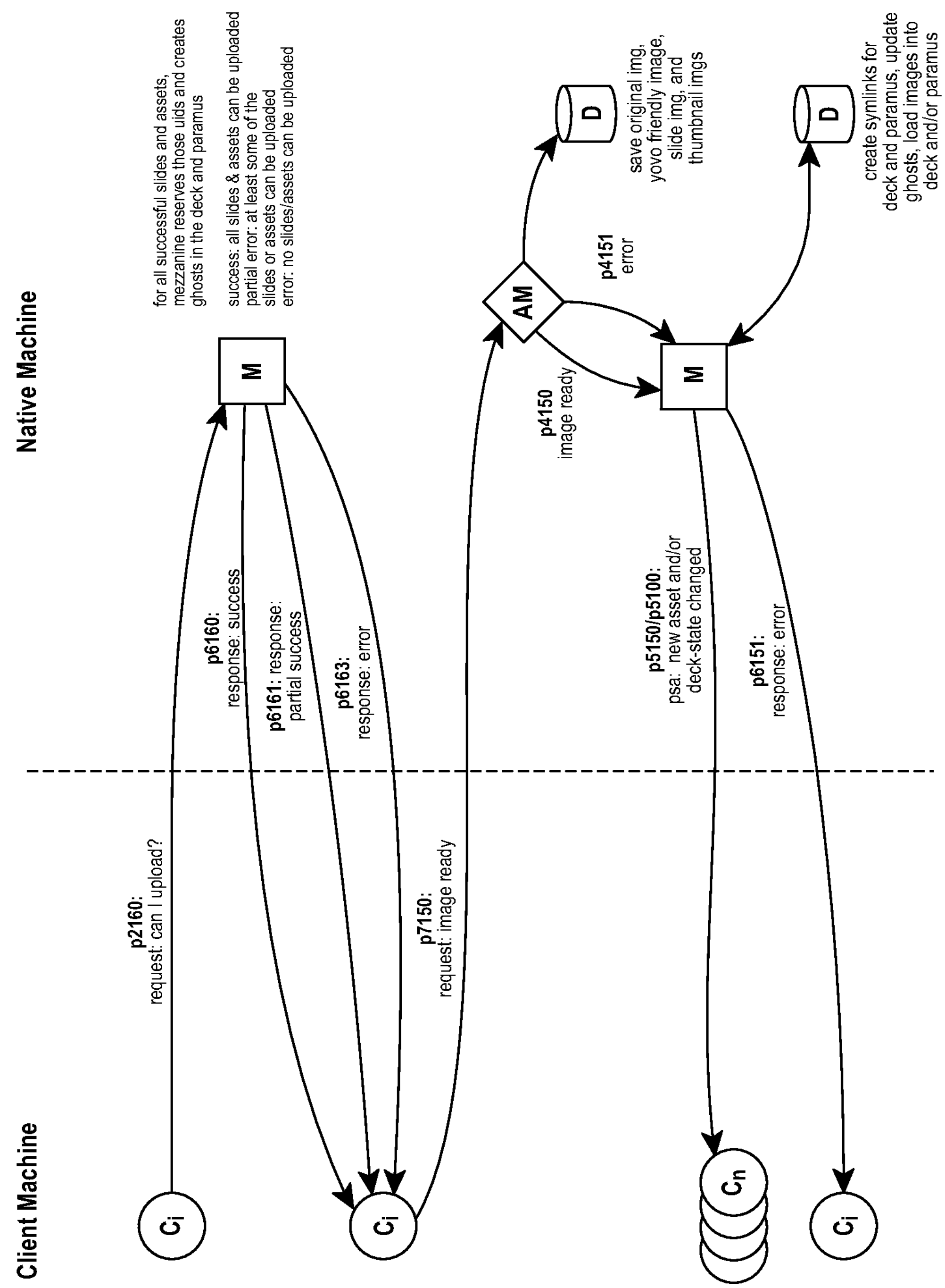

FIG. 78 is a flow diagram of a Mezz process for Client upload of asset(s)/slide(s) directly, under an embodiment.

FIG. 79 is a flow diagram of a Mezz process for web client upload of asset(s)/slide(s) (timeout occurs), under an embodiment.

Figure 80:
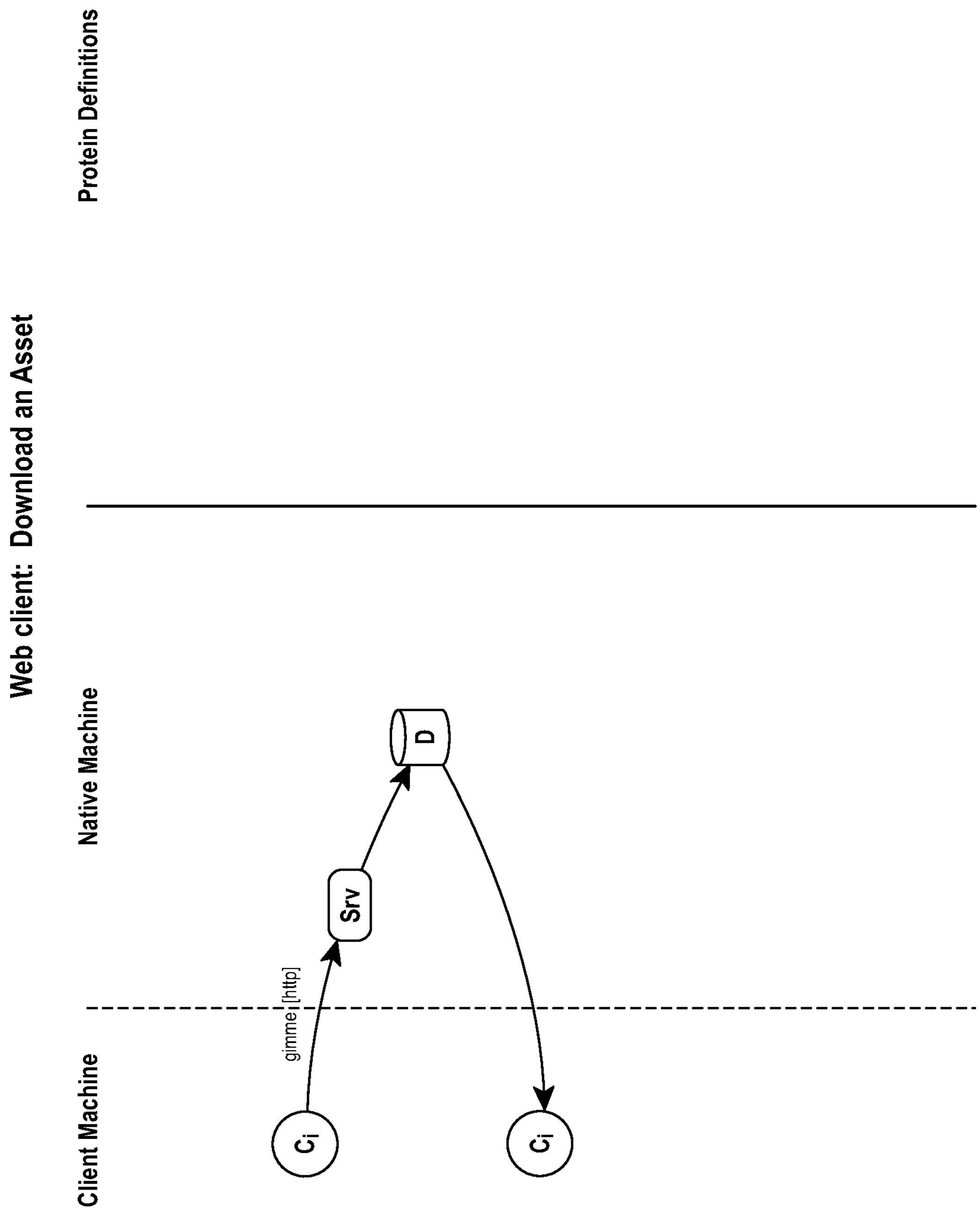

FIG. 80 is a flow diagram of a Mezz process for web client download of an asset, under an embodiment.

FIG. 81 is a flow diagram of a Mezz process for web client download of all assets, under an embodiment.

FIG. 82 is a flow diagram of a Mezz process for web client download of all slides, under an embodiment.

FIG. 83 is a flow diagram of a Mezz process for web client delete of an asset, under an embodiment.

Figure 84:
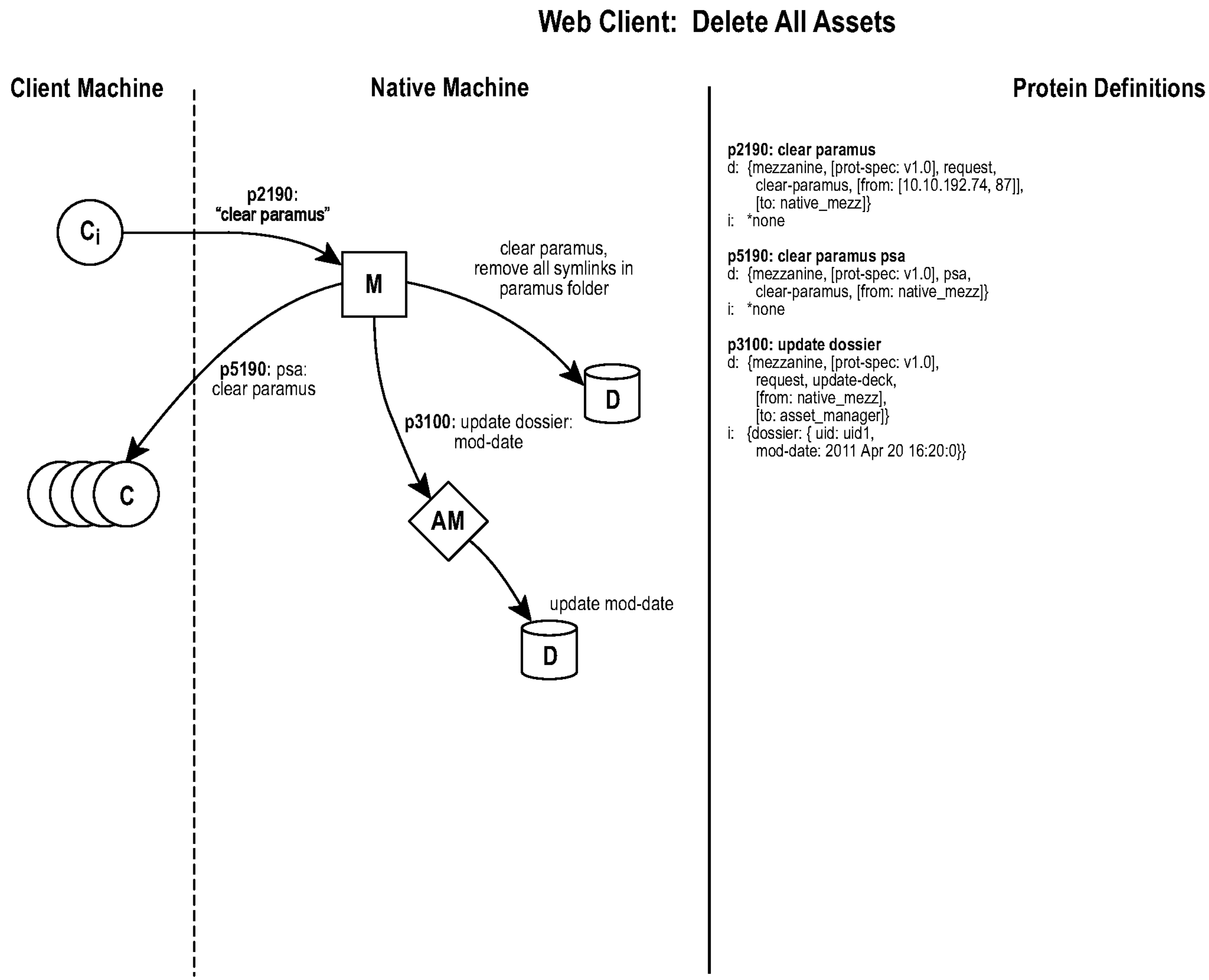

FIG. 84 is a flow diagram of a Mezz process for web client delete of all assets, under an embodiment.

FIG. 85 is a flow diagram of a Mezz process for web client delete of all slides, under an embodiment.

FIGS. 86-166 are protein specifications for Mezz proteins, under an embodiment.

FIG. 86 is an example Mezz protein specification (join), under an embodiment.

FIG. 87 is an example Mezz protein specification (state request), under an embodiment.

FIG. 88 is an example Mezz protein specification (create new dossier), under an embodiment.

FIG. 89 is an example Mezz protein specification (open dossier), under an embodiment.

FIG. 90 is an example Mezz protein specification (rename dossier), under an embodiment.

FIG. 91 is an example Mezz protein specification (duplicate dossier), under an embodiment.

FIG. 92 is an example Mezz protein specification (delete dossier), under an embodiment.

FIG. 93 is an example Mezz protein specification (close dossier), under an embodiment.

FIG. 94 is an example Mezz protein specification (scroll deck), under an embodiment.

FIG. 95 is an example Mezz protein specification (pushback), under an embodiment.

FIG. 96 is an example Mezz protein specification (pass-forward ratchet), under an embodiment.

FIG. 97 is an example Mezz protein specification (download all slides), under an embodiment.

FIG. 98 is an example Mezz protein specification (download all assets), under an embodiment.

FIG. 99 is an example Mezz protein specification (upload images), under an embodiment.

FIG. 100 is an example Mezz protein specification (delete all slides), under an embodiment.

FIG. 101 is an example Mezz protein specification (delete an asset), under an embodiment.

FIG. 102 is an example Mezz protein specification (delete all assets), under an embodiment.

FIG. 103 is an example Mezz protein specification (pass-forward), under an embodiment.

FIG. 104 is an example Mezz protein specification (set windshield opacity), under an embodiment.

FIG. 105 is an example Mezz protein specification (deck detail request), under an embodiment.

FIG. 106 is an example Mezz protein specification (download asset), under an embodiment.

FIG. 107 is an example Mezz protein specification (create new dossier), under an embodiment.

FIG. 108 is an example Mezz protein specification (duplicate dossier), under an embodiment.

FIG. 109 is an example Mezz protein specification (update dossier), under an embodiment.

FIG. 110 is an example Mezz protein specification (download all slides), under an embodiment.

FIG. 111 is an example Mezz protein specification (download all assets), under an embodiment.

FIG. 112 is an example Mezz protein specification (image ready), under an embodiment.

FIG. 113 is an example Mezz protein specification (expect upload), under an embodiment.

FIG. 114 is an example Mezz protein specification (forget upload), under an embodiment.

FIG. 115 is an example Mezz protein specification (convert original image), under an embodiment.

FIG. 116 is an example Mezz protein specification (new dossier created), under an embodiment.

FIG. 117 is an example Mezz protein specification (dossier duplicated), under an embodiment.

FIG. 118 is an example Mezz protein specification (download all slides [success]), under an embodiment.

FIG. 119 is an example Mezz protein specification (download all slides [error]), under an embodiment.

FIG. 120 is an example Mezz protein specification (image ready [success]), under an embodiment.

FIG. 121 is an example Mezz protein specification (image ready [error]), under an embodiment.

FIG. 122 is an example Mezz protein specification (heartbeat [portal], heartbeat [dossier]), under an embodiment.

FIG. 123 is an example Mezz protein specification (new dossier created), under an embodiment.

FIG. 124 is an example Mezz protein specification (dossier opened), under an embodiment.

FIG. 125 is an example Mezz protein specification (dossier renamed), under an embodiment.

FIG. 126 is an example Mezz protein specification (new [duplicate] dossier created), under an embodiment.

FIG. 127 is an example Mezz protein specification (dossier deleted), under an embodiment.

FIG. 128 is an example Mezz protein specification (dossier closed), under an embodiment.

FIG. 129 is an example Mezz protein specification (deck state), under an embodiment.

FIG. 130 is an example Mezz protein specification (new asset), under an embodiment.

FIG. 131 is an example Mezz protein specification (delete an asset [success]), under an embodiment.

FIG. 132 is an example Mezz protein specification (delete all assets [success]), under an embodiment.

FIG. 133 is an example Mezz protein specification (slide deleted), under an embodiment.

FIG. 134 is an example Mezz protein specification (slide reordered), under an embodiment.

FIG. 135 is an example Mezz protein specification (windshield cleared), under an embodiment.

FIG. 136 is an example Mezz protein specification (deck cleared), under an embodiment.

FIG. 137 is an example Mezz protein specification (download asset [success]), under an embodiment.

FIG. 138 is an example Mezz protein specification (download asset [error]), under an embodiment.

FIG. 139 is an example Mezz protein specification (can join, can't join), under an embodiment.

FIG. 140 is an example Mezz protein specification (full state response [portal]), under an embodiment.

FIG. 141 is an example Mezz protein specification (full state response [dossier]), under an embodiment.

FIG. 142 is an example Mezz protein specification (create new dossier [error]), under an embodiment.

FIG. 143 is another example Mezz protein specification (create new dossier [error]), under an embodiment.

FIG. 144 is an example Mezz protein specification (open dossier [error]), under an embodiment.

FIG. 145 is an example Mezz protein specification (rename dossier [error]), under an embodiment.

FIG. 146 is an example Mezz protein specification (duplicate dossier [error]), under an embodiment.

FIG. 147 is an example Mezz protein specification (delete dossier [error]), under an embodiment.

FIG. 148 is another example Mezz protein specification (delete dossier [error]), under an embodiment.

FIG. 149 is another example Mezz protein specification (passforward ratchet state), under an embodiment.

FIG. 150 is an example Mezz protein specification (download all slides [success]), under an embodiment.

FIG. 151 is an example Mezz protein specification (download all slides [error]), under an embodiment.

FIG. 152 is an example Mezz protein specification (download all assets [success]), under an embodiment.

FIG. 153 is an example Mezz protein specification (download all assets [error]), under an embodiment.

FIG. 154 is an example Mezz protein specification (image ready [error]), under an embodiment.

FIG. 155 is an example Mezz protein specification (upload images [success]), under an embodiment.

FIG. 156 is an example Mezz protein specification (upload images [error 1]), under an embodiment.

FIG. 157 is an example Mezz protein specification (upload images [partial success]), under an embodiment.

FIG. 158 is an example Mezz protein specification (delete all assets [error]), under an embodiment.

FIG. 159 is an example Mezz protein specification (deck detail response), under an embodiment.

FIG. 160 is an example Mezz protein specification (image ready), under an embodiment.

FIG. 161 is an example Mezz protein specification (video source list), under an embodiment.

FIG. 162 is an example Mezz protein specification (Hoboken status), under an embodiment.

FIG. 163 is an example Mezz protein specification (video thumbnail available), under an embodiment.

FIG. 164 is an example Mezz protein specification (set Hoboken video source), under an embodiment.

FIG. 165 is an example Mezz protein specification (adjust video audio), under an embodiment.

FIG. 166 is an example Mezz protein specification (video audio adjusted [singular], video audio adjusted [multiple]), under an embodiment.

Mezzanine Example Embodiment

In an embodiment, the Mezz physical network includes a private network with only Mezzanine components and a connection to the customer network. The private network comprises the switch HP ProCurve 1810-24G, a Mezzanine server connected via the Etho port, the Corkwhite server connected via the Etho port, an Intersense tracking system, and one or more power distribution units. Connecting to the customer network is the Mezzanine server via Eth1port and the Corkwhite server via the Eth1 port.

As described herein, user devices connect to the customer's network and interact with the Mezz system from that connection. As described herein, the user communicates with the Mezzanine server via a web client, an iOS client, or an Android client. The Mezzanine system's private network is configured on its own IPv4 subnet. In an embodiment the subnet is configured as: IP Addresses of 172.28.X.Y (X in this place is typically the # of the site, so it is 1 for the first site, 2 for the second, etc.); and Subnet Mask: 255.255.255.X (default Class C Subnet mask)

Wand

An embodiment of Mezz comprises an MMID, described in the Related Applications. An embodiment includes a HandiPoint_ratcheting algorithm. The user can axially rotate the wand to change the state of the HandiPoint, or wand cursor, on the screen. Changing state allows the user to access different functional modes for pointing. The native application supports three pointer modes: pointing, snapshot, and passthrough.

Pointing supports grabbing and moving objects, or interacting with interface elements. Snapshot mode supports the snapshot action or "demarcating" for marking a pixel grab area, as discussed elsewhere. Passthrough mode supports controlling a mouse cursor on a remote device as described herein.

The user rotates the wand to access the different pointing modes. From any ratchet state, after the user engages pushback or pushforward, the wand is set to pointer mode. When the user points at the ceiling and clicks, the wand is reset to pointing mode. The mode is set immediately on click: when the pointer appears on screen again, it already is in default pointing mode. When the user points back at the screen, there is a brief timeout where the user cannot ratchet to a new mode (less than a second). The wand will be locked to pointing mode for this short duration once the user comes out of pushback so that the operator's grip can settle.

From the snapshot ratchet mode, once the wand button is clicked and released, the mode should return to pointing. This happens whether a snapshot is successfully taken or not. The goal here is to let the user quickly grab the asset from paramus, or to quickly recover from an error if they did not want to take a snapshot.

Portal

The portal is the entry point into the Mezzanine interface, and from the portal users can manage the dossiers stored on a Mezzanine or join another Mezzanine in a collaboration. The portal is also called the "dossier portal."

Navigation

The portal offers at least two interactions to participants: managing dossiers and collaborating with other Mezzanines. Both of these capabilities are fundamental to Mezzanine, but the regularity with which they are used depends on the needs of the user. Navigation between these sections is only supported when mezz-to-mezz functionality is enabled via the m2m-is-enabled flag in app-settings. When disabled, the Mezzanine label does not appear, nor do the vertical Winglets. Apart from this, the layout does not change. In another embodiment, when mezz-to-mezz is disabled, the space previously consumed by the Mezzanine label and winglet instead shows show an extra row of dossiers Single-feld setups, in particular, benefit from this design.

Layout

It should be easy and intuitive to use Mezzanine with or without collaboration with remote Mezzanines. To provide easy access to both workflows, Mezzanine positions regions of the UI for these two tasks adjacent to each other in co-planar space, with the dossier list residing above the Mezzanine list.

Only one region of the UI is visible at a time, but the existence of the other is always indicated via a strip at the top or bottom edge of the screen (in the Mezzanine list and dossier list, respectively). The transition between these two regions conveys the spatial relationship by causing the UI to slide vertically to bring the other region into view.

A narrow band including meta information and controls appears between these two regions and remains visible at all times. This provides an area for the display of branding, system notifications, the URL via which clients can participate, and controls for protecting client accent to Mezzanine with a passphrase, as described in another section. The configuration of the content within this band changes based on the number of felds. The portal layout in a triptych includes a middle band for the right feld that contains the session access controls and the URL for joining the session from the web. The middle band in the left and center felds will contain brand elements such as the product name and Oblong logo. The portal layout in a single feld comprises the middle band, which contains the session access controls and the URL for joining the session from the web.

Paging

Paging transitions in a portal have a textual indication at the edge of the feld that alludes to the existence of additional features just beyond. These indicators also serve as buttons which invoke a sliding transition.

The target area for the scroll buttons is generous, extending the full width of the workspace and well beyond its physical edge to the extent defined in app-settings.protein. The large target area reduces the amount of time it takes users to point at the scroll trigger (according to Fitt's Law). This makes the action of switching between the two primary UI regions effortless, as paging can by invoked by clicking anywhere above (or below) the triptych. The entire strip of the portal of an embodiment highlights when the HandiPoint hovers within the target region, clearly indicating the possibility for interaction. The spatial metaphor is maintained through a sliding transition. Unlike many other paging interactions, no visual element (or "blocker") is shown when further paging is not possible. Since there are only two screens to page between and the affordance is indicated by the presence or absence of their corresponding labels, additional UI is unnecessary.

Scrolling

For consistency with other parts of the interface that support paging, it is also possible to scroll through a pushback interaction initiated by hardening while holding the wand vertically. This initiates a panning action which enables movement in either the vertical (to switch between dossiers and Mezzanines) or the horizontal (to scroll the visible list) axis.

Dossier List

The portal shows a list of all available, shared dossiers on the local Mezzanine system. For example, the dossier list shows 6 dossiers per feld (18 total) on a triptych. As another example, the single-feld layout of the dossier list only shows six dossiers.

Dossier Representation

Each dossier in the list is represented by an interactive object that comprises the following elements: name, date, thumbnail, and owner. Regarding name, if one has not yet not yet been provided, the name defaults to "{dossier <yyyy-mm-dd hh:mm:ss>}". The format of the date string ensures lexical ordering from oldest to newest, and the presence of the curly braces ensures they all appear together at one end of the dossier list. The date element comprises the modification date of the dossier, formatted for the machine's current locale (per fprintf's % c feature). The thumbnail is a visual representation of the dossier. A thumbnail of the first slide in the dossier is shown. If the dossier does not contain any slides or the first slide is a video, a generic placeholder is shown. The owner element indicates whether or not the dossier is "anonymous", or owned by an authenticated participant, which is described in another section on security of private dossiers. In the latter case, the name of the authenticated participant is shown.

The dossier modification date of an embodiment shows relative time instead of absolute. The date is relative when less than seven days have passed since its creation, in which case the day of the week of its creation is shown e.g., "Friday". If the day precedes the most recent weekend, the word "last" is prepended e.g., "last Thursday". In all other cases, the absolute date is shown in the format specified by the locale, e.g., Monday, Jan. 23, 2011. The dossier preview of an embodiment shows a trio of images instead of a single thumbnail. Using the first three, as opposed to the current three, allows for some amount of visual consistency to aid in dossier identification, and also increases the likelihood that the title slide and/or representative images are included.

Sorting

Mezzanines are listed in ascending lexical order by name. If the names of two dossiers happen to match, sorting falls back to their modification date. If their name and date both match, they are sorted by their memory address to ensure a canonical ordering. An embodiment also supports custom sorting and filtering of dossiers in the future. The system sorts by name, date, and owner, and filters by owner.

Interacting with Dossiers

A user may interact with dossiers in a variety of ways: creating new dossiers, duplicating existing ones, opening, deleting, or downloading them. Some additional controls relevant to the management of the dossier list appear just beneath it. Though these controls are positioned within the visual bounds of the list region, they remain fixed and do not scroll horizontally with the list so as to remain available at all times.

The user interacts with a dossier by pointing at it with a HandiPoint, then hardening. A "HandiPoint" is a graphic that faithfully corresponds to a pointing source (such as gestures, wand, or mouse). While hardened the dossier expands in size and its border pulses slightly. It also shows a banner when an action is available, such as opening, duplicating, or deleting a dossier. Softening while a banner string is displayed will execute the corresponding action.

To open a dossier, the user selects a dossier, then softens the HandiPoint while within the boundaries of the dossier representation. The banner says "open" when opening the dossier is the action that will be completed on soften. When a dossier is being loaded, all other dossiers fade and are washed out with the background color. The banner text of the dossier that is loading changes to "[loading . . . ]." The border of the selected dossier nub continues to throb while the dossier is loading so that there is some activity on the screen. Additionally, HandiPoints are still able to move, though the framerate drops. When the dossier is finished loading, the dossier portal fades out while the dossier fades up.

The "create new dossier" button resides just beneath the dossier list. Clicking this button will create a fresh, empty dossier bearing the name containing the current date and time. If the newly created dossier is not visible, the list scrolls as necessary to reveal it.

To duplicate a dossier, the user selects a dossier, then points at the ceiling to delete the dossier. The banner changes to "delete" when the threshold angle has been reached to indicate that the action that will be taken on soften. The deleted dossier darkens and fades (i.e. fades to transparent black), then is removed from the list. The remaining dossiers are rearranged to fill in the gap left by the deleted dossier.

Private Dossiers

The native dossier portal will only show "Public" dossiers. The iOS and web apps will show "Private" dossiers in their portals when users sign in successfully. The system does not show public and private dossiers together so it will not be possible to make a public dossier private, or vice versa, by copying. Additional information is provides in sections in iOS Dossier Portal, iOS Authentication, Web Private Dossiers, and Web Authentication.

Mezzanine List

The Mezzanine list shows all of the Mezzanines, configured in the admin interface, with which a Collaboration can be initiated. In an embodiment presence in this list is not symmetric; it is possible to receive Collaboration requests from a Mezzanine not already in the list.

Mezzanine Representation

Each Mezzanine in the list is represented by an interactive object that comprises the following elements: company name, room name, location, and status. Company name is name of the company that owns the Mezzanine. This is particularly useful for inter-company Mezzanine Collaborations, since room names or other identifiers may not be meaningful outside of the company context. Larger companies may also find it convenient to put division names here. Room name is a name that uniquely identifies a particular Mezzanine within the company, or within rooms of a building, similar to named conference rooms. Location is the geographical location of the Mezzanine, displayed as e.g., <City, State, Country>; <City, Country>, <Province, Country>, etc. Status is the status of the Mezzanine: offline, online. This is not listed explicitly, but offline status is shown by greying out the Mezzanine representation. All of these fields should support Unicode characters (subject to the limitation that those that cannot display on screen appear as a special character, like a question mark).

An embodiment provides additional details about a collaborator in the list of Mezzanines that includes local time, status, and icon. Local time is the local time at the Mezzanines location. This is useful when scheduling Collaborations with remote sites, and to know when sending an ad-hoc Collaboration request is appropriate. Status is status of the Mezzanine: offline, online. May be expanded to included collaborating or other statuses in the future. Icon is an iconic representation of the Mezzanine. This is commonly a company logo, but could also represent a specific location or room. If none is provided, a default icon is used instead.

Mezzanines are listed in ascending lexical order by site name. If the site names of two Mezzanines happen to match, sorting falls back first to the company name, and then to the location. If all values match, they are sorted by their memory address to ensure a canonical ordering. An embodiment supports custom sorting and filtering Mezzanines, sorting by company name, room name, location, and status, and filtering on status.

Interacting with Mezzanine

The user interacts with a Mezzanine by pointing at it with a HandiPoint, then hardening. While hardened the Mezzanine expands in size and its border pulses slightly. It also shows a banner when an action is available; currently joining is the only supported action and the banner displays "join". Softening while a banner string is displayed will cause the corresponding action to be taken on the Mezzanine.

To initiate a collaboration, the system sends a join request as described in a section on sending a join request in remote collaborations.

If there are several sites that participate in a regular meeting, users might like to group these to be able to call them all at once. An embodiment supports collaboration groups by tendering one Mezzanine onto another, and for deleting groups via a drag to the ceiling.

Pushback and Display Modes

Pushback is a technology and gesture described in detail in the Related Applications. Pushback provides critical control to the user shifting between views of Mezz displays. In the Mezz environment, "pushback" can refer to the gesture and/or a display mode. The user controls the wand in pushback gesture to shift between pushback and presentation modes. Zooming out with pushback yields pushback mode. Zooming in with pushback yields presentation mode, which is also referred to as "fullscreen."

As described herein, the triptych functions as the "main screen" of the user experience in an embodiment including a triptych. When the user zooms out, and the triptych is in pushback mode, the user can see a greater number of slides, as well as the Paramus and Hoboken bins (which are described below). This view, functionally, is an editing mode, useful for manipulating and editing assets. When the triptych is in presentation mode it includes screen elements for user action, and the user can zoom the triptych into this fullscreen mode, which is effective for presentations.

Paramus

Paramus, also known as "asset bin," comprises a collection of static assets. Residing above the deck, it consumes the upper portion of the triptych. In an embodiment, Paramus supports assets of image types. An embodiment accommodates other formats, such as non-live videos, PDFs, or arbitrary file types. Paramus is accessible in the native interface via pushback, which is described in another section.

Arrangement

The Paramus asset bin occupies the upper portion of the interface when locked in pushback. Assets are arranged from left to right generally in order of upload, beginning with the leftmost position of the primary feld. Each page contains a 2×10 grid of assets for a total of up to 20 assets on a given feld. The grid populates with row-major ordering beginning with the upper left position on each page.

Paramus comprises one large scrolling asset bin that may span multiple pages (or felds). Paramus may contain a maximum of 120, spanning 6 pages in total and allowing more assets than slides. Scrolling and paging interactions, which are described in another section, are supported. Paramus pages reveal newly added assets, but only as necessary. Paramus displays a total of 54 assets at a time on a triptych mezz, but is not so limited.

Uploading Assets

Client devices can upload images to Paramus individually or in batches. This is the primary means through which dossiers become populated with content.

The interface offers immediate feedback that the upload is in progress by visually reserving the slots with placeholders for each asset to be uploaded. These placeholders will be fully interactive, and are allowed to be instantiated onto the Deck/Windshield/Corkboard.

If the dossier is closed before some assets have been uploaded, the placeholders will be removed. Downloading the dossier bin will not include placeholders. A section on progressive loading provides additional information on the appearance of assets during the upload process.

Clients will also display upload placeholders as soon as an upload begins. Clients will replace those placeholders with the uploaded images after each one is uploaded, and remove placeholders upon upload failure. An embodiment uses thumbnails from the local copy of an image on the client that initiates an upload. That embodiment provides additional feedback, to indicate that it still is in the process of uploading.

Individual Uploads

When an upload begins, the native interface first reserves slots in Paramus for the asset or assets pending upload, beginning with the next empty slot, and an upload placeholder appears. The upload placeholder animates up from negligible size and begins pulsing to indicate activity. Once the upload completes the thumbnail for the new asset fades in replacing the placeholder visual treatment, in the same way that thumbnails fade in for asset transfer.

Batch Uploads

Clients may also select multiple files to upload at once in a batch. Slots are reserved in the order in which upload requests arrive such that all assets uploaded in a batch appear in contiguous slots. Upload placeholders are created for every asset in the batch assuming they do not exceed the maximum number of assets. As each individual file in the batch completes, the thumbnail for that new asset fades in to replace the placeholder in the same fashion as a complete asset transfer during collaboration. Uploads from one batch will arrive interleaved with uploads from another batch, but will be in the order that they appear as placeholders in that batch.

An embodiment adds an off-feld indication for asset uploads as well; a spinning carbuncle graphic with a counter indicates the number of pending uploads.

Revealing New Assets

Any time a client initiates a new upload, Paramus automatically scrolls as far as necessary to reveal the new asset, or the first asset in the batch if more than one asset is scheduled for upload. Paramus only scrolls to the first placeholder in any given batch, and does not continue scrolling as uploads of individual assets in a batch complete, even if those assets reside beyond the edge of the workspace. If the upload placeholder is already visible on the workspace when the upload is initiated, then Paramus does not scroll at all.

Upload Errors

If a file fails to upload for any reason, its placeholder (and all its instantiations) must be removed. The placeholder fades to transparent black in the usual style of asset deletion, after which the remaining placeholders and assets (if there are any) rearrange to fill the gap.

Asset Interactions

Asset Appearance

Assets are represented in Paramus by their image thumbnails. These representations are always of a 16:9 aspect ratio. If the asset ratio of the thumbnail differs from 16:9, then the thumbnail is inscribed inside the available region, which has a translucent backing color of nearly transparent white (1.0, 1.0, 1.0, 0.05), and the thumbnail itself is given a 1px white border. When a HandiPoint hovers over an asset, that asset's size increases by about 20%.

Placeholder Interactions

Placeholders including but not limited to uploads and asset transfer are fully interactive in Paramus. Placeholder assets in Paramus may be be deleted, copied to the windshield, copied to the deck, or copied to a corkboard. The behavior of placeholders in each of these locations is covered in the sections on deck, windshield, and corkboard.

Instantiation

Hardening momentarily on an asset causes that asset to become instantiated on windshield of the primary feld at its native (actual pixel) resolution. To avoid accidental instantiation in this manner, the soften event must arrive within a relatively short 200 ms interval following the harden event. Objects instantiated in this manner scale up softly from negligible size (at the correct aspect ratio) to their native size, beginning at the location of the asset in Paramus and animating into their final position at the center of the primary feld. (The quick instantiation behaviors mirror those of Hoboken.)

Drag and Drop

Assets are most commonly instantiated via a drag and drop interaction. When the system hardens on an asset, a graphic known as an "ovipositor" appears, anchored at the point of harden. Ovipositor is described in the later section "Tenderer." A copy of the asset is also created, attached to the tendering end of the Ovipositor with slight translucence. The tendering end follows the HandiPoint, and the manner of instantiation depends upon the target which is softened on. Assets may be instantiated into the Deck, onto the Windshield, or onto a Corkboard. If an asset is placed such that no part of it resides on the workspace or on a corkboard, then the instantiation is aborted and the Ovipositor retracts. Softening above or below the deck area creates a new windshield asset. The Ovipositor fades out and unwinds.

Deletion

As described herein, dragging an asset toward the ceiling enables its deletion via the Tenderer destruction protocol. The label displayed reads "delete" to clarify the intent of the action. Confirmed destruction causes the asset to be deleted: the asset fades out, following which the remaining assets in Paramus rearrange to fill the gap as necessary. If the asset is on the right half of the feld, the delete label appears to the left of the asset. If the asset is on the left half of the feld, its delete label appears on the right. If something happens that causes the asset to shift its location, the label should follow the asset but its orientation (to the left or right of the asset) does not change.

If the deletion of an asset leaves an entire visible page of Paramus empty, Paramus animatedly shrinks to fit the remaining assets. If this occurs and another page of Paramus containing one or more assets resides beyond the opposite edge of the workspace, then Paramus auto-scrolls only as far as necessary to maximize use of the workspace by ensuring that as much of Paramus as possible is visible. In an embodiment, the word "delete" is always visible as it adjusts which side it appears on if the asset crosses the middle of the feld.

Clearing All Assets

Clients may request the deletion of all assets at once, thus clearing the asset bin. Clearing also cancels any uploads currently in progress. All assets fade out in the style of individual asset deletion. If the assets span multiple pages, access to other pages is facilitated through the use of ScrollWings.

Pointing just beyond the left or right edges of the workspace causes the scroll wings to appear when paging is enabled, bearing a single arrow graphic indicating the region to be scrolled. Hardening triggers a paging transition in the corresponding direction. Once the bounds of the list have been reached—either the first or last page resides on the main feld—the arrows are dimmed and vertical blocker bars appear.

The sweep angle of the ScrollWings is fixed at 30 degrees, and their extents are bounded. Specifically, the extent is equal to the horizontal (or right and left) extents, unless Winglets of that size would exceed the vertical (or top) extent, in which case they are constrained accordingly.

Hoboken

Hoboken is a dynamic asset bin. It contains video feeds connected via DVI, network video feeds, and, when possible, videos from remote sites or representations thereof. Hoboken is accessible in the native interface via Pushback and consumes the bottom portion of the triptych.

Hoboken supports the following assets: DVI Videos, Telepresence Videos, Network Videos, Remote Videos, and Web Widgets.

DVI video is Hoboken's primary asset type. Up to four DVI inputs on the box can be connected to laptops in the room. Telepresence Video is a DVI Video source that is connected to the output of a video telepresence codec. A telepresence video differs from other assets in that each Mezzanine shows a different remote view, rather than an identical view on each system (that is, I see you, and you see me). A network video may be displayed when clients connect using MzReach, and is shown on the entire screen or on a single window. A remote video source may appear within Hoboken as well during inter-Mezzanine collaborations. A web widget provides a means of extending Mezzanine's features by creating mini web apps that can be integrated in the workspace.

The Hoboken asset bin occupies the lower portion of the triptych when the environment is locked in pushback. Assets are arranged from left to right, generally in order of appearance, beginning with the leftmost position in the center feld. Up to 5 assets fit on a given feld. Video sources can come and go via MzReach's screenshare feature. Hoboken autoscrolls to show as much content as possible when a source disappears. If there is an empty region on the right feld, it shrinks in and everything shifts to the right.

DVI videos have special privileges due to their association with up to 4 physical DVI connections, cables for which occupy a Mezzanine room. DVI inputs are, for example, laptop or a solution such as Tandberg. Placeholders for these DVI video connections appear in Hoboken at all times, regardless of whether or not a device is connected and a signal provided over that connection, in order to convey their potential to session participants. Video placeholders indicate the presence and number of a video source. The placeholders, as they remain present at all times, occupy the first 4 (leftmost) positions. Their order is fixed such that the second cable always corresponds to the second position in Hoboken, and so on. This relationship is emphasized through numbering of the slots, which corresponds to instances of the video in the UI as well as physical labels on the cables.

Network videos (local and remote) may come and go during a session. Unlike DVI videos, they have no physical association and therefore no placeholders. Instead, these transient assets get added or removed from Hoboken as appropriate.

An asset is appended to the end of the list when a user shares video from their laptop over the network. Assets may also appear when one of this occurs at a remote Mezzanine during a Collaboration. The new asset scales up from nothing to fill its position in the list. Ideally the new asset would appear with the appropriate thumbnail. However, as thumbnails in an embodiment arrive on approximately a one-second interval that is not synchronized with video appearance, a placeholder image may appear briefly. A smooth scaling transition from placeholder to thumbnail should occur when the first thumbnail arrives, as necessary, to preserve the aspect ratio of the source.

If the newly available asset resides beyond the edge of the rightmost feld, then Hoboken pages automatically to the end of the list to both indicate the successful appearance of the video, and to make it immediately available for use.

If the source/stream for a network video asset disappears, that asset is removed from Hoboken. The asset fades out via the standard "condemned" animation, fading at once to transparent and black over the period of approximately 4 tenths of a second. The list adjusts smoothly as necessary, with all assets to its right sliding leftward to fill in the gap. If the disappearance of an asset leaves the rightmost feld empty, then Hoboken collapses by one page and automatically scrolls to the left when possible so that the available space is used.

Instantiation

Quick Instantiation

Hardening momentarily on a video causes that video to become instantiated on the Windshield of the primary feld at its native (actual pixel) resolution. To avoid accidental instantiation in this manner, the soften event must arrive within a relatively short 200 ms interval following the harden event.

Objects instantiated in this manner scale up softly from negligible size (at the correct aspect ratio) to their native size, beginning at the location of the asset in Hoboken and animating into their final position at the center of the primary feld.

Drag and Drop

Videos are most commonly instantiated via a drag and drop interaction. When a video is hardened upon, an Ovipostor appears, anchored at the point of harden. A copy of the video is also created, attached to the tendering end of the Ovipositor with slight translucence.

The tendering end follows the HandiPoint, and the manner of instantiation depends upon the target that is softened on. Assets may be instantiated into the deck, onto the windshield, onto a corkboard.

Navigation

If more than 15 assets appear in Hoboken, access to them is facilitated through ScrollWings, which offer a paging interaction. Pointing to the left or right edges of the feld, or just beyond it, causes the scroll wings to appear when paging is enabled.

Deck

A deck comprises a display of linear collection content, referred to as "slides." An image or a video comprises a slide, and in an embodiment a deck is a collection of no more than 101 slides. As labelled in FIG Deck 1, the deck is arranged horizontally and, when not in fullscreen mode, occupies the middle third of the triptych.

In a deck slides are numbered sequentially and displayed horizontally. Slide numbers appear in the lower right hand corner of the slides during pushback and are invisible when the slides are full felded. In an embodiment, an alpha multiplier is applied to the color of the slide numbers that is linearly proportional to the pushback depth. At full locking depth, the multiplier is 1 (the maximum). At full zoom, the multiplier is 0 (the minimum). At levels in between, the opacity of the slide numbers varies with the pushback depth. The resting color for slides number at full pushback depth is a very pale grey with a little opacity, specifically: (0.95, 0.95, 0.95, 0.85).

Interacting with Slides

Interactions are inserting slides, reordering slides, and deleting slides.

Hover Feedback

Embodiments support Hover Feedback. When the handipoint intersect spatially with a slide, a graphical sequence called "exoskeleton" appears around the slide. The top part of the exoskeleton contains a title with metadata about the slide contents. For image content, the exoskeleton simply says "Image." Video titles are described in another section on video naming conventions. The bottom part of the exoskeleton is tall enough to encapsulate the slide number in the bottom right hand corner of the slide, and expands across the entire width of the slide.

The slide number for the selected slide brightens to white at 100% opacity, then fades back to the resting color when the exoskeleton disappears.

The opacity of exoskeleton is also proportional to the pushback depth, in the same way that slide numbers are. Exoskeletons are invisible at full zoom and the opacity increases with pushback depth.

Inserting Slides

Slides may be inserted into the Deck via an Ovipositor, which may be tendering objects from Paramus or Hoboken. Paramus reports the intended location, width, and height of the slide when probed by the ovipositor, allowing it to update the representation of the tendered object as appropriate.

While the tender is within the bounds of the Deck, the slides adjust as appropriate to indicate the location into which the tendered slide would be dropped on solidify. Slide insertion may also invoke auto-scrolling behaviors when nearing the edges of the workspace, making it easier to insert a slide at any position in the Deck. When the tender solidifies, the slide is inserted in the already vacant position. Slide insertion animations vary by circumstance, which are native insertion (or passforward), local client insertion, and remote insertion (native or client). In a native insertion (or password), the slide animates gracefully into its resting position, without the need for any scaling, from the point at which it was released by the Ovipositor. (This entails scene graph reparenting taking perspective projection into account.) In a local client insertion, the slide appears at its target location within the Deck and animates up from negligible size. In a remote insertion (native or client), the slide appears at its target location within the Deck and animates up from negligible size.

Reordering Slides

In summary, the user reorders slides by dragging them to the left or the right. The user grabs a slide by hardening on it in pointing mode. Though the slide's appearance does not change while grabbed, it moves with the HandiPoint, All other slides in the deck shift as necessary to indicate the position at which the slide come to rest when released.

The deck also supports auto-scrolling behaviors during slide reordering. This makes it easier to move slides across regions of the deck which cannot be seen on screen at once in one fluid interaction, which gains additional importance for single-feld Mezzanines.

Deleting Slides

Slides may be deleted via tendering upward past the threshold of the deletion cone.

Uploading Slides

The system provides upload placeholders. Clients may upload slides directly to the deck, preventing the need to add them one by one. When a slide upload begins, placeholder slides are created for each file in the batch being uploaded. These placeholders appear in same manner as when slides are added by a client, animating up in place from negligible size.

The appearance and behavior of upload placeholders in the Deck match those in Paramus. Placeholder slides are fully interactive. They may be reordered explicitly by grabbing and dragging them, or implicitly by the reordering of other slides around or between them. They may also be instantiated onto the corkboard.

In case of an upload error, when a file fails to upload for any reason, its placeholder slide must be removed. The placeholder fades to transparent black in the usual style of slide deletion, after which the remaining slides (if there are any) rearrange to fill the gap. If the placeholder has been instantiated onto the corkboard and the upload times out, the corkboard placeholder will also be removed. Another section describes the full upload specification, providing additional information about uploads and possible error conditions.

Placeholder slides will also be supported in collaboration. When an upload starts on one Mezz, placeholders will appear on all Mezzes, and transition from placeholder→thumbnail→full-res on other Mezzanines, just as it does in asset-transfer. On the local Mezz, it will transition from placeholder→full-res. Clients will also mimic this placeholder behavior, replacing placeholders with actual images after each one is uploaded.

Navigation

Scrolling

If the slides span multiple pages, access to other pages is facilitated through the use of ScrollWings, or through a pushing interaction. Pointing just beyond the left or right edges of the workspace causes the scroll wings to appear when paging is enabled, bearing a single arrow graphic indicating the region to be scrolled. Hardening triggers a paging transition in the corresponding direction. Once the bounds of the list have been reached—either the first or last slide resides centered on the main feld—the arrows are dimmed and vertical blocker bars appear.

Auto-Scrolling

Only a handful of slides appear on the workspace at a time (approximately nine on a triptych Mezzanine). To facilitate manipulation of the deck through reordering and insertion of slides, the Deck automatically scrolls as needed when the slide reaches the left or right bounds of the workspace, minimizing the number of interactions necessary to perform these tasks. Auto-scroll functionality is available in push-back as well as presentation mode. Auto-scrolling takes advantage of two independent behaviors—slide reordering and scrolling—which are supported in collaborations.

Auto-scrolling behaviors take effect when the HandiPoint, which grabbed the grabbed slide, nears the edge of the workspace, causing the contents of the deck beyond that edge to scroll into view past the dragged object. Auto-scrolling motion is continuous rather than discrete, and the Deck scrolls smoothly at a speed proportional to the dragged object's proximity to the workspace edge. Though auto-scrolling has no effect on most of the workspace, its impact ramps up smoothly near the edges of he workspace. Moving the HandiPoint beyond the edge of the workspace suspends auto-scrolling behaviors entirely to prevent other spatial interactions, such as adding assets to corkboards, from conflicting.

Several factors may also dampen the scrolling speed. To avoid scrolling too far the Deck dampens the scrolling speed as it nears either end, such that scrolling stops when the extremities of the Deck are reached. Additionally, auto-scrolling speeds are initially dampened to prevent sudden scrolling when entering a region of the deck beyond the scrolling threshold, then slowly ramping up over a second or so to the target speed. If the drag leaves the workspace, thus suspending auto-scrolling behaviors, auto-scrolling will begin again from its initially dampened state when it re-enters the workspace.

Auto-scrolling may occur simultaneously with other forms of deck manipulation, including use of the scroll wings and pushback. When multiple interactions affect the Deck's scrolling position their effects are additive. However, the Deck only observes auto-scrolling behaviors for a single HandiPoint at a time. If additional users grab slides in the interim they are placed in a queue, and gain auto-scroll control as others release their grabbed object.

Indication of the possibility for auto-scrolling appears in the form of small arrow glyphs adjacent to the HandiPoint currently yielding control. Though invisible in the center portions of the workspace, their opacity increases proportionally to the scrolling speed—but in advance of the auto-scrolling effect—in order to illustrate the correlation between auto-scrolling behavior and the HandiPoint's position in space. The glyphs fade gracefully when the interaction terminates just as other Tweezers do.

Scrollwings

Scrollwings comprise an element of the native scrolling UI. A set of ScrollWings comprises two winglets, one to control advancing elements in a sequence and another to handle retreating.

System Area

The system area of an embodiment displays meta-information about the current session in the native user interface, and appears transiently when invoked from within a dossier. Some of the elements it contains are persistent, while others are contextual. While much of the persistent information it contains also appears in the portal, its arrangement differs in an embodiment.

The system area manifests as a strip that spans the entire workspace. The strip contains contextual information, session info, and branding. Contextual information and controls include the dossier title and a close button. Though the dossier is the one and only context in which the strip appears in a current embodiment, the implementation allows this content to be dynamically adjusted. Session information and controls include the client URL and session lock button. Branding elements include company logo and product name.

Layout

Contextual Controls

The contextual elements comprising the central feature of the system strip enable interactions that pertain to the current context (such as the presently open dossier).

The system area displays meta-information about the dossier that is currently open as well as controls for manipulating the dossier. The controls in a current embodiment are limited to the name of the dossier and a button for closing it. Activating the close button causes the system strip to slide out of view as the dossier fades down to reveal the portal again. When in collaboration, a modal alert, described in another section, is first displayed asking for confirmation. It comprises a summary, details, and buttons. The summary asks if the dossier should be closed. The details indicate that the dossier will be closed at all Mezzanines in the collaboration. The buttons include close, which closes the dossier; cancel, which cancels the action and the user remains in the dossier; and leave collaboration, where the participant leaves the and the system closes the dossier locally only.

Session Information

Information about the Mezzanine session is displayed in the right feld of the system area. First and foremost, the URL through which clients may join the session is displayed here, making it available at all times during a Mezzanine session.

Additional controls for managing the session are also provided. At the moment, the only additional session control is the session lock, described in another section, which when activated requires clients to enter a temporary session key in order to join. The control provides the ability to lock and unlock the session, and displays the current session key while locked.

Invocation

While in a dossier, the entirety of the screen is needed as a workspace. Therefore, the system area resides just below the bottom edge of the workspace and out of view.

A participant may reveal the system area at any time by pointing to its below-feld resting position. When a HandiPoint hovers in the region below the felds, the system area nudges upward a small amount to reveal its presence, and highlights to attract attention. This aids in discoverability, but avoids accidental invocation that could prove disruptive as it partially covers Hoboken and windshield items when fully visible. The system area does not reveal itself if the HandiPoint hovering over it is driven by an idle wand. An idle wand may be sitting on the table, still on and generating a stream of move events, but not actually moving.

Hardening of the HandiPoint causes the system area to slide up into view along the bottom edge of the triptych. The system area remains visible while any HandiPoint resides within it. After a brief delay during which no HandiPoints have entered the region, it slides back down out of view. The system area may also slide out of view if a wand-driven HandiPoint idles while pointing at it (for example, if a wand has been placed on a table and incidentally points at below a workspace feld or at the system area). The contents of the system area do not respond to evens (such as hover indication, or hardening) except when fully revealed.

To further aid in discoverability, the system area is displayed in full when a dossier is first opened. When entering pushback, the system area is automatically nudged into view as though a HandiPoint had hovered it, providing a hint of its presence. In both cases, the system area hides again according to the above logic.

Idle Invocation

If the system idles, the system area appears so that the web URL and close dossier button are on display when someone next enters the room. The system is idle if no clients are connected and no wand interactions occur for 2 hours. Moving a HandiPoint is enough to keep the system from idling.

Single-Feld Support

In a single-feld embodiment, the system area must condense and reorganize its content. To reduce the footprint and allow continued interaction with the workspace even while shown, the single-feld system area omits the branding present on triptych Mezzanines. The remaining elements—meta info and contextual controls—are then stacked one atop the other to fit.

The contents and layout change slightly in the single-feld scenario. Because the system area is much taller in the single-feld layout, the percentage of its height that peeks up on hover must be adjusted so that the hint has the same height in both layouts.

The contextual controls most relevant to the above workspace appear on top, beneath which the meta informational strip containing the join URL and client-related controls appears. A horizontal rule delineates these two sections.

Element Actions

As described herein, an asset may be scaled, moved, or deleted. A user can take a "snapshot" of an element. In general, to gain control of an object, the user points the wand at an object and clicks.

As described elsewhere, an object can be moved between the deck, bins, and windshield. To scale an object, the user selects it by pointing the wand at an object and holding down the wand button. Pulling the wand away from the screen enlarges the object. Pushing the wand toward the screen shrinks it. At the desired size of an object, the user releases the button to engage the size. When the scaling gesture is active, the system displays a graphic.

An object can be scaled to occupy the full screen. The user enlarges the object as described until the system displays a graphic comprising brackets that appear at the screen edges. The user releases the button to engage the object in fullscreen. An object in fullscreen mode snaps to the center of a single screen of the triptych. (The object fills the single screen that it occupied.) A fullscreen object is composited on top of everything else. Functionally, it lets the user view a single slide at a time, for example. (The system provides feedback to alert the user to fullscreen capability: brackets appear at the screen edges to indicate that released the wand button full screens the object.)

To delete an object, a user engages move-and-scale input mode. The object is removed from a dossier when it is dragged to the ceiling, and the wand button then released. A slide, a windshield object, or an image asset, for example, are deleted by this process. Any visible object in fullscreen mode or pushback mode can be deleted.

In the mode known as "snapshot," the system supports digital capture of any area of the feld. The user activates snapshot mode by switching to snapshot mode of the MMID. To take a snapshot of an area, the user "drags" the wand across an area to highlight it. When the desired capture area comprises the drag area, the user releases the wand button to take the snapshot.

Tenderer

Tenderers are a form of tweezer that facilitate interactions that span regions of space. There are several distinct types, each with their own capabilities and appearances. Types of tenderers are Ovipositor, AffineRig, and BumbleBells. Ovipositor is used primarily for actions which copy or instantiate the tendered object. AffineRig is used for moving and scaling the tendered object. BumbleBells is used to invoke actions or establish relationships between the tendered object and the object to which it is tendered.

Tenderers all share the same general anatomy, consisting of two distinct ends and a visual connection between them. The appearance of the ends may differ depending on the type of tenderer. Types of ends are proximal end, distal end, and UnduLine. The proximal (i.e. nearest or central) end remains anchored at the location of instantiation as though attached to the tendered object. If the tendered object moves for any reason, the proximal end moves with it so as to retain the connection. The distal (i.e. far) end of the Tenderer follows the HandiPoint, and serves as the active indicator for the intent of the tender. The proximal and distal ends are spanned by a sinuous line that undulates sinusoidally, serving as a strong visual connection between the two.

Interaction Model

All forms of tenderers provide a means of taking an action that spans some region of space. Ovipositors are used to instantiate a copy of an item at another location; AffineRigs are used to manipulate the size and location of an image; BumbleBells are used to invoke an action on the tendered object based on the object to which it has been tendered.

More generally, these forms of interactions share similarities with traditional drag-and-drop models. Hardening on an item that supports tendering generates the tenderer, with its proximal end located at the point of harden. The distal end then follows the HandiPoint to another position in space. Softening terminates the tender, and the success or failure (or cancellation) of the tender depends upon whether or not the object tendered to is responsive and receptive to the tender.

When a tender fails or is cancelled for any reason, the tenderer retracts back into its proximal end as it fades out, thus "detaching" itself from the control of the HandiPoint.

Destruction

Tenderers allow for the destruction of tendered objects, or other similar actions that result in the removal or deletion of an object, or the termination of state such as collaboration. Destructive actions occur when the distal end enters the destruction region, an invisible cone defined by the angle of the wand with a point at its current location and extending upward and outward toward the ceiling.

When a tendered object enters the destruction cone the tenderer fades to tinted red (0.8, 0.1, 0.1, 0.8), indicating the potential for a permanently destructive action to be taken. Additionally, a text label in white on a translucent black (0.0, 0.0, 0.0, 0.6) rounded rect backing region appears explaining in a word or two the action to be taken. Lastly, the tendered object itself is made aware of the potential action and may provide alternate feedback of its own.

Lowering the wand beneath the threshold causes the text label to fade out and the tenderer itself (and the tendered item, if necessary) to fade back to its normal state. Softening while within the destruction region, on the other hand, triggers the associated action and terminates the tender, causing the tenderer to retract.

Ovipositor

Ovipositors allow the duplication and/or instantiation of objects at a specific location. Their use always results in the creation of a new instance of the tendered object, or the deletion of the source object being tendered. Ovipositors are used by Paramus and Hoboken for the instantiation of image and video assets into either the Windshield or the Deck.

The Ovipositor is a traditional tenderer that bears hexagonal glyphs at both its proximal and distal ends. The ovipositor bears a nascent representation of the new instance of the tendered object. The nascent object appears at the distal end of the Ovipositor, and as such indicates clearly where the newly created object will reside when the tender is completed. Though a user may harden on any point within the tendered object, the nascent object always adjusts so as to remain centered at the distal end—it initially appears at an offset that matches that of the tendered object, but then softly slides into its centered position. An embodiment can implement a prioritization scheme, in which recipients state their priority—as a positive integer value—such that the highest priority recipient is granted the tender.

By probing possible recipients of the tender the Ovipositor may receive information from one or more possible receptive objects. If more than one potential recipient responds, the Ovipositor chooses which to ignore arbitrarily. Potential recipients may specify intended size and position values for the object once instantiated. Ovipositor uses these values to smoothly resize the object as appropriate for the currently selected recipient.

The nascent object is displayed at 50% opacity both to indicate its nascent status, and to provide a clear view of the interface into which it is being tendered. As soon as the tender ends on soften with a valid recipient, the nascent object fades to full opacity. Though the sole responsibility of the recipient, the object should smoothly scale and position itself according to the parameters previously returned to the Ovipositor when probed.

If the tender is cancelled or fails for any reason, then the nascent object scales down to negligible size and fades out as it is pulled toward the proximal end via standard tenderer retraction. Since the nascent object and the recipient may exist in different coordinate spaces, additional geometric treatment makes the object appear at the size it will be once in its destination coordinate space. Similar treatment also contributes when the object is actually reparented in the scene graph.

Uploads

Image Upload Summary

An embodiment supports image formats including PNG, JPEG, TIF, and GIF, and image size of up to 6000×2000 pixels. If the resolution of an image is too large (greater than 6000×2000), an error will be sent back to the client indicating the image is larger 6000×2000. If the resolution is below 6000×2000, but the file size is larger than 50 MB (to accommodate uncompressed 6 k×2 k RGBA images), then the image will be rejected. If the resolution is below 6000×2000 and the physical size is adequate, the image is saved as it normally would be. Image upload can be initiated from connected clients of types browser, whiteboard and iOS. Image upload can be targeted at the deck, paramus, or both.

A series of protein actions comprise the image upload sequence. An image upload request is sent from a client to native side. The native side checks for upload success or failure conditions as follows. If the deck or paramus is full, an denied response is sent back to the client. If the image upload request is approved or partially approved, a list of image uid is sent back to the client. In the case of request denied, the client should not do any further actions towards image upload. In the case of request approved, a web client would send a via http the image binary along with the uid, which the webservice would translate to an 'image-ready' protein. In the case of request approved, the iOS client would send an 'image-ready' protein directly to the asset manager.

For all clients, the asset manager processes the image-ready protein and responds appropriately. If the uploaded image is acceptable, the asset manager sends siemcy an 'image-ready' protein and siemcy forwards the message to the client in the form of. If the uploaded image is not supported, an error is sent to siemcy, and siemcy forwards the message to the client in the form of. An image upload can be cancelled by a series of protein actions.

Pixel Grab

A "pixel grab" enables a user to designate and capture sections of the feld for upload. The user ratchets to pixel grab "demarcating" mode. The user moves the wand diagonally in one direction until a threshold distance is crossed. Once the threshold is crossed, the pixel grab is now active and direction is locked. Moving the handipoint to other quadrants will result in failed pixel grabs.

When pixel grab succeeds, the marquee area is white. When the pixel grab fails, the marquee area is red. User completes pixel grab by releasing the button. When pixel grab is completed, the user's handipoint reverts to pointing mode.

The pixel grab may fail if paramus is full. If there are no available spots for assets in Paramus, the marquee is tinted red to show that no snapshot will be taken. If another user deletes an asset while marquee is in use, it will change to its normal color (white) because it is now possible to snapshot again. A text label provides further visual feedback that paramus is full. The label follows around the HandiPoint until it reaches the boundary of a feld, in which case it should cling to the side of the feld to remain visible. The label does not appear until user clears initial snapshot distance threshold. The label appears around corner following HandiPoint and outside of initial drag direction. Its location adjusts such that text is always legible. Its background is semi transparent black, and text opaque white DIN Bold.

Timeouts

For client asset uploads, there are three timeouts: the upload timeout, the asset conversion timeout, and the queued upload timeout. In an embodiment these are not configurable; in another, these timeouts are configurable. The upload timeout is used to signal how long a client has to actually complete the upload from the time of upload request to time that the upload as completed and reached the Mezzanine filesystem. The asset conversion timeout is the timeout for how long it should take Mezzanine to perform the image manipulation and conversion algorithms, once after the image has reached Mezzanine. The queued upload timeout is used for how long to wait for when there are successive pending uploads from different clients.

In a collaboration, an upload will only be timed out by the Mezzanine that initiated the upload. Upon timeout, the placeholder will be deleted on all Mezzanines in the collaboration. If the Mezzanine that owns the uploading assets leaves or drops from the collaboration, all of its placeholders will be destroyed by the remaining collaborators.

Windshield

The windshield comprises assets that reside in front of the remainder of the interface, as though they are stuck to the glass of the display. Windshield items do not get affected by pushback.

A slide or a video that comprises a windshield hovers over the deck. Each object can be moved, resized (scaled), or deleted. The windshield can occupy any area of the felds area. If an object is moved outside of the felds area, the system does not allow the action unless corkboards are present. If corkboards are not present, when the user releases the button, the object is returned to its original position. If corkboards are present, the user then has moved the object to the corkboard. A current embodiment limits the total number of slides and video on a windshield, to maintain performance.

The windshield contains live assets and static assets. Live assets are video sources, which are described in the section on Hoboken. Static assets in an embodiment comprise images, but static assets of alternative embodiments include any asset type supported by Paramus.

Windshield Interactions

Windshield interactions include instantiating windshield items, asset ordering, moving and scaling, delete from windshield, clearing the windshield, and pushback.

The system supports instantiating Windshield items. Assets may be placed onto the Windshield via an Ovipositor, which maybe tendering objects from Paramus or Hoboken: the user gains control of an object in pointing mode. The HandiPoint hovers over asset on the windshield, and the user clicks to obtain control 9, which is granted if no other user has move/scale control. In an embodiment a dot matching the provenance color of the HandiPoint appears in the exoskeleton and bobbles.

The Windshield reports the intended location, width, and height of the asset when probed by the Ovipositor, allowing it to update the representation of the tendered object as appropriate. When the tender solidifies and is not consumed by the Deck, the asset is placed on the Windshield at the tendered location in front of all other existing Windshield assets.

Windshield instantiation animations vary by circumstance, which are native instantiation (or passforward), local client instantiation, remote instantiation (native or client). In native instantiation, no animation is necessary as the asset is already at the intended location and size due to the interaction with the Ovipositor during probes. In local client instantiation, the asset appears at its target location and scales up from negligible size. In remote instantiation, the asset appears at its target location and scales up from negligible size.

The Windshield supports up to a maximum number of items as defined in app-settings.protein, for performance reasons. If the Windshield is full, a "windshield full" label appears at the tendering end of the Ovipositor and it is tinted red (0.8, 0.1, 0.1, 0.8) for emphasis. If the tender is terminated without success then the Ovipositor retracts in the usual fashion.

There are two types of placeholders that may be instantiated onto the windshield: asset-transfer and uploads. An asset-transfer Placeholder happens only in a mezz-to-mezz session when the system knows the sizes and aspect ratio of the asset, but has not received the actual asset yet. It typically occurs when a dossier is first opened, or a checkpoint tells the system that windshield assets are missing.

An upload placeholder is the result of instantiated upload placeholders from Paramus. In this scenario, the system does not know the asset's real size/aspect-ratio, and will place a generic placeholder that has a 16-9 aspect ratio. If the placeholder was instantiated with quick-instantiation its size will be full-felded. Otherwise, it will be ⅕th of the feld size. Once the actual asset is available, the placeholder will be replaced with the asset, taking on the real size and aspect-ratio of the asset, unless a user has already modified the size of the placeholder, or if the placeholder was created through quick-instantiation. If the asset becomes available while a user is interacting with the placeholder (either moving or resizing it), the upload placeholder will not be replaced with the real asset until that interaction is complete.

Asset ordering is provided by the system. Newly instantiated assets always appear in front of all other assets already on the Windshield. Hardening on a Windshield asset, regardless of whether or not that asset is then moved or scaled, causes it to jump to the front.

If a windshield item is moved such that no portion of it remains visible on the workspace or on a corkboard, the item will softly animate back to its original position when released to prevent loss of objects in space. This implies that a single-feld Mezzanine cannot move an asset off-feld to the right or left, even while in a collaboration with a triptych mezzanine.

Windshield items may be deleted via tendering upward past the threshold of the deletion cone.

Clients may request the deletion of all assets on the Windshield at once.

During pushback, items on the windshield do not recede into the distance. However, they do become 50% transparent during push interactions to provide a clearer view of the content behind them which does recede. Pushback initiated via clients does not cause an opacity adjustment since it is a one-shot state change.

Video Streaming

Each Mezzanine provides four video capture ports allowing DVI video sources to be ingested and viewed locally. All of these local video sources may be enabled for streaming to remote Mezzanines as remote video sources provided there is sufficient connectivity, as described in another section, and cpu. Each of the Hoboken video asset types is handled differently for Mezzanine to Mezzanine collaboration.

Local DVI Videos are available to remote Mezzanines through an RTSP connection under control of Siemcy. If a user instantiates a DVI source from Hoboken in the deck or windshield, the remote Mezzanine will connect to the local Mezzanine through an RTSP session and receive a video stream to display in its local copy of that video resource. If video streaming is not enabled for that video resource, periodically updated video thumbnails are displayed.

Telepresence Videos are also DVI Video sources, but are handled differently. Telepresence videos are transmitted from one location to another using an external telepresence codec. If a user at one location inserts a telepresence video into the deck, the user at another location will see the same slide added. The video content of each slide will be different however. A user in Geneva will see the user in Singapore, while the user in Singapore will see the user in Geneva. Telepresence Videos are not transcoded and streamed via an RTSP session.

Network Videos are streamed to the Mezzanine from a laptop or other external computer in a fashion described herein.

Remote Videos are video streams that are received on the local Mezzanine from a remote Mezzanine, a process described in the paragraph on local DVI Videos.

Web widgets are similar to other video sources.

Video Previews

All available video sources are represented in Hoboken, the container that resides near the bottom of an open dossier. These videos are represented by live thumbnails rather than static screenshots, both to convey their live-ness and to make it easier to select the desired source to instantiate. An embodiment crossfades between thumbnails so that the thumbnail feeds feel more lively. Only local video sources will be represented in Hoboken. Shared videos will only be shown on remote Mezzanines following instantiation. Remote, ephemeral HandiPoints will still be broadcast in the Hoboken area, but if they are manipulating videos remotely they will not correspond to the videos in the local Hoboken.

Preview Placeholder

Since DVI sources have permanent cables with a fixed ordering, placeholders for these potential sources always remain in the list. The placeholders mark the four corners of the available area to indicate the presence of a potential video source, and display a numbered label to be referenced both by instances of the video in the UI as well as physical labels on the cables.

Thumbnail Previews

Once a DVI video source has been connected, the static thumbnail for the appropriate source index is replaced with a live thumbnail. It can take up four seconds for the first thumbnail to arrive after a DVI input has been connected. The thumbnails are taken directly from the video source, and update at the frequency of approximately a quarter frame per second.

Video sources may vary substantially in aspect ratio. DVI inputs will vary with the resolution of the connected device; network videos, which are captured in software and transmitted wirelessly, may have wildly different sizes—and be much taller than wide in some cases—since they support sharing of specific windows rather than entire screens. The aspect ratio of the thumbnails will always be preserved, with the preview resizing softly as needed when the first thumbnail arrives to fill, inscribed within, the available area.

Instantiating Videos

Video sources may be instantiated by dragging from Hoboken. While dragging, an ovipositor appears from the source, which softly scales up to a larger size and becomes a live feed to provide a higher fidelity preview. Video sources may be dragged into the Deck, onto the Windshield, or all the way over to the Corkboard.

Video Naming Conventions

Instantiated videos on the windshield receive exoskeletons when hovered over. This exoskeleton displays the name and type of the asset. Since streaming videos can come from several different sources, and may have different states at any point in time, their naming is particularly important. In general, the name of a video source is composed of up to three distinct elements: source name, site name, and status.

Source name is the name of the video source, e.g. "Video 1". Custom names for DVI inputs can be configured via app-settings. The generic "Video" term is preferred over "DVI" for two reasons. First, this avoids technical jargon in the UI, and, second, it is not guaranteed that the operational end of the cables will be DVI. (VGA, HDMI, or other adapters may potentially be used.) Software videos (network video shared from MzReach) will automatically be named for the computer that is connecting to Mezzanine, e.g. "Egghead's Laptop". An embodiment prefixes custom names with a consistent label, to facilitate matching them to physical world labels on DVI cables.

Site name is the site name of the Mezzanine that the video source is connected to. Status is the status of the video source, indicating when it is disconnected, streaming, unavailable, etc.

The form of the title shown in the exoskeleton follows the pattern: <source name>, <site name> (<status>), though the site name is only displayed for remote videos. No status is shown in the default case when a video is connected locally and not being streamed to another Mezzanine in a collaboration. If the entire name for the video cannot fit in the exoskeleton label, it is truncated with an ellipsis after rendering as many characters as possible. If the video is on the windshield and resizable, the truncation of the name is updated depending on the size of exoskeleton and shows as much of the string as possible without overflowing from the exoskeleton bounds. Possible video statuses are connected, disconnected, live stream, idle stream, unavailable, and unsupported.

No status is shown in the default, non-streaming, connected state. "Disconnected" is shown when a local DVI or network video source is disconnected or otherwise unavailable. "Live stream" is shown when a local video source is being streamed via the RTSP server to remote participants in a collaboration. "Idle stream" is shown when a local DVI video source is being shown as periodic stills to remote participants in a collaboration. Interacting with an idle stream causes it to become live. "Unavailable" is shown when any source from a remote collaborator, regardless of its type, is unavailable because a collaboration with its owner is not in progress. "Unsupported" is shown for videos which are explicitly not yet supported, such as remote MzReach videos.

Video Placeholder Appearance

Instantiated video objects may not contain a video feed for a number of reasons. For instance, the cable for the hardware input might have been disconnected; the laptop sending MzReach video may have gone to sleep; the original streamer of the video may have left the collaboration; or the source may be unavailable or unsupported for other reasons.

When video cannot be shown for any of these reasons, the object assumes a placeholder appearance. It retains its identity as a slide or windshield asset, but is represented by a dark translucent rectangle with corner glyphs as well as text that identifies the missing source without the need to hover and reveal its exoskeleton. Informational elements may be provided, each on its own line and truncated with an ellipsis as needed. These elements are source name, Mezzanine name, and status. Source name is the source name of the video as defined in app-settings. When the video is streamed from another Mezzanine during Collaboration, the name of the source as defined by that remote Mezzanine should be shown. If a collaboration is ongoing the name of the Mezzanine the video belongs to is displayed. This information is shown on both the sending and receiving Mezzanines. Status is the status of the video, as defined above, in the form "(<status>)". The elements shown are centered horizontally, and their combined block of text is vertically centered.

Video Sharing

Once a participant instantiates a video source, that video instance is automatically shared with all Mezzanines in a collaboration. Only instantiated videos are streamed to remote participants. As long as at least one instance of a video source remains instantiated (on the Windshield or in the Deck), then that source will continue to remain available to other collaborators via the RTSP server. (The source may be paused when out of view). Once the last instance of a source has been deleted, the corresponding stream becomes unavailable.

Streaming Indication

Streaming indications is an overlay that lives on top of the streaming video's lower right hand corner. To communicate the most amount of information in a small amount of space, some of these streaming indicators are animated. For example, an embodiment depicts a high quality connection versus a lower quality connection through the speed of an animation.

Local Versus Remote

The system provides icons for streaming status so users easily can identify which videos are local and which videos are remote when looking at an open dossier. The type of icon or graphic used to distinguish between local and remote videos may differ between embodiments.

Local Video Sources

In Mezzanine, the necessary limits on simultaneously streaming videos do not restrict the richness of the local collaboration. All instantiations of local video sources display as live at all times. However, since the number of instantiated sources may exceed some of the performance/bandwidth limits, some sources that appear live to the local Mezzanine may not be fully available to the other participants of the collaboration. Those Mezzanines will see regular thumbnails instead. In order to provide some indication of which videos participants of the collaboration can see live, a streaming indicator is displayed on those videos.

Indicators comprising icons/graphics reflect live stream, thumbnail stream, ideal streaming states for clients, and aggregated actual streaming states of clients.

Remote Video Sources

Mezzanines viewing remote videos ideally always show live streams at the highest quality possible. However, performance and bandwidth limitations do not always support this. In order to preserve the collaborative experience as well as network usage responsibilities, Mezzanine downgrades video streams to thumbnails. Indicators comprising icons/graphics indicate status of live stream, thumbnail stream, ideal streaming state determined by server, actual streaming state determined by this remote client. In an embodiment these indicators, while identical to the local video indicators, reflect different somatics.

Remote Thumbnails

Participants in a collaboration see periodic thumbnails at a rate of approximately a quarter frame per second for all non-live sources from remote Mezzanines. The thumbnails consume far less bandwidth, but provide a preview of the content from the source.

Thumbnails are implemented by the RTSP server, which simply reduces the framerate of the stream. When transitioning to thumbnail from a live streaming state, the last frame should be displayed until the new thumbnail image comes in. The same is true from transitioning back to a live streaming state, where the last thumbnail is kept around until the first live video frame arrives.

Video Prioritization

Due to resource constraints, not all videos can be streamed live to all Mezzanines in the collaboration. Thus, a mechanism is needed to determine which videos do get to be streamed. Mezzanine uses an intelligent prioritization system, based on most recently selected video instances as well as their visibility, to automatically start and stop the streaming of video sources to remote collaborators. This avoids the need for explicit controls, at the potential risk of some obviousness, to allow collaborators to focus more on the content they care about and the collaborative activity itself.

Videos are prioritized by instance, rather than by source. However, if any instance of a given source is prioritized above the threshold, then that source is streamed to other participants via the RTSP server and all of its instances display the live feed. If no instances of a given source are visible, then that source is paused, ready to be restarted when one becomes visible again. If all instances of a source are removed from the dossier, then the RTSP server is instructed to stop the stream completely.

The prioritization scheme provides a way for Mezzanine to manage reasonably complex logic without devising complex algorithms that explicitly account for all their possible locations in the interface. A video instance may be given a priority by any part of the UI (likely via Bathyscaphe), such as the Windshield and Deck. (An event type, bathyscaphe is a data structure used for events. One such event is making announcement about elements that have appeared in data structure, code, or ui. Another such event is requesting info from another component in the software. For example, a graphic may only need to appear on screen if only certain conditions are met. An object that renders the data does not keep data; it asks another entity whether it is time to render.) Relative priorities between instances are managed implicitly—the Deck, for instance, prioritizes in-view videos at a lower level than the Windshield does to give Windshield videos, which are always on top, preference. When an instance is re-prioritized its position in the priority list is adjusted and the RTSP server is notified as necessary.

The prioritization scheme is run every time a video is instantiated as well as when a video instance is clicked on. In the case of a priority tie, preference is always given to the most recently prioritized source. For instance, the Windshield might always assign a priority of "5" to video instances that get brought to the front of all others by hardening. Nonetheless, the most recently selected video would be guaranteed to stream since it would be listed first in the priority list, ahead of all instances previously given the same priority. These rules are applied in parallel. In the case of collaboration between a mixed set of Mezzanines with different feld counts, using this prioritization scheme optimizes video streaming for those with triptych Mezzanines. The system does not prioritize based on video assets obscuring regions of other assets as this use case is rarely encountered. Therefore, "visible" in the figure means that the asset is on a visible feld.

An embodiment removes the Windshield>Deck requirement and instead uses a flat prioritization scheme for simplicity. This addresses issues that incur when a user clicks on a Deck video, but the system does not start streaming as expected because too many other Windshield videos exist.

Streaming Pipeline

DVI Videos are provisioned by quartermaster for local display and may be provisioned by the RTSP Server to create remote videos for remote display. Quartermaster provisions video streams of 1080p @ 30 Hz and 720P @ 60 Hz from the decklink card and delivers the video to shared memory.

When a DVI Video is instantiated from Hoboken, the video stream is provided to the VidQuad from a stream that is read out of shared memory and sent to the framebuffer.

An embodiment includes RTSP streaming capabilities under control of the Siemcy drome. When Siemcy wishes to provision an RTSP video source, a provisioning protein is deposited into the mz-to-rtsp pool. The RTSP server receives that protein and enables the associated resource as an RTSP stream, returning to Siemcy the URL. This URL is unique for each collaborating Mezzanine, allowing for video url to be explicitly disabled for a given Mezzanine, if necessary. When a remote Mezzanine connection is received by the RTSP server, the appropriate video pipeline is constructed and the video stream is available as an RTP video stream. This video pipeline delivers video only at 30 fps. Audio is not supported.

The Siemcy provision request to the RTSP server contains a video encoding target value and a video encoding floor value. This target value is used as the ideal quality when encoding the video stream. The video pipeline also monitors the RTCP packets received from the remote receiver(s) and will reduce the bandwidth further if an excessive amount of packets are getting lost. When the video stream is being encoded falls below the floor bitrate, the rtsp server will then issue and “insufficient-bandwidth” psa and take necessary action, as noted in the description of client connection inadequacies. When the video stream is being encoded below the target bitrate, the encoder will periodically attempt to increase the bandwidth to meet the bandwidth target, monitoring the RTCP packets to see if the increased bandwidth is successful.

Streaming Security

When RTSP video streams are enabled, client specific URIs are broadcast to participants. Any client with a valid URI will be to view a stream. Once collaboration has ended, the stream is disabled and video is no longer accessible. An embodiment requires authentication to view stream.

Performance Optimization

To facilitate better CPU usage and network behavior, a remote video stream that is off the feld of the Mezzanine showing the video will pause its stream and conserve resources. This mainly applies for triptych-instantiated videos viewed on the off-feld of single-feld Mezzanines and for deck moves where the video is no longer viewable on any feld. When the stream resumes and the video is back in view, the transition will be seamless from frozen frame to new live frames.

Performance Limitations

The system is built to guarantee that mezz to mezz video streams do not monopolize network bandwidth or bog down Mezzanine performance. The video sharing feature has bandwidth limiting and fps monitoring features that will enable server and client side Mezzanines to stop streaming or playing back videos. These performance limitations are loaded at startup of Mezzanine but are not so limited. As network conditions can often fluctuate, an embodiment supports variable limitations in real time. The algorithm of an embodiment also is more dynamic by using network conditions instead of hard numbers.

Corkboard

As described herein, a system may include a corkboard, which is a display that contains a single asset. Typically, two or three co-planar corkboards serve as parking lots for important content during a Mezzanine session. These are not shared in m2m collaborations, but are shared with locally-connected web and iOS clients. Corkboards are felds running under a single corkboard process. The process runs on the cork/white machine, which is separate from the main siemcy/Mezzanine machine. While assets on the corkboards come from various dossiers, they are not currently in sync with those dossiers. If a dossier is closed, the corkboard version will persist, even after another dossier is opened.

Only static assets can be placed on the corkboard; no live video assets can be placed on the corkboard. In the native application, the wand is used to drag the asset from Paramus to any corkboard. In the web application, the asset is dragged from Paramus to the corkboard boxes. Passforward Handi-Point drags will not work unless the corkboard felds happen to be co-planar with the triptych and within the accessible area in the browser. In the iOS client, the user first zooms and pans to engage a display of the corkboards. The asset is then dragged from the Paramus or deck onto the corkboard.

Corkboard assets will persist until they are individually removed. In an embodiment, moving from one corkboard to another will cause any asset on the receiving corkboard to be overwritten. In an embodiment, an asset is removed by dragging it anywhere off the corkboard.

Corkboard assets can be moved between corkboards. Moving onto a populated corkboard will overwrite the previous asset. Assets are moved by dragging them to another corkboard. In an embodiment, assets cannot be moved back to the windshield, deck, or paramus.

In siemcy, the paramus and hoboken have copy semantics, and the deck and windshield have move semantics. In the corkboard, incoming drags are copies, and internal drags are moves.

Corkboard Embodiment

A single corkboard screen is a display that contains a single asset. Typically, two or three co-planar corkboards serve as parking lots for important content during a Mezzanine session. In a collaboration, the corkboards are not synchronized between participating Mezzanines. However, they corkboard assets are shared with locally-connected web and iOS clients. Each corkboard screen is actually a separate feld controlled by a single corkboard process. This corkboard process runs completely separate from the main siemcy/Mezzanine process.

Corkboard Embodiment

In an embodiment of Mezzanine, there are two corkboard setup options for Mezzanine. Inspired by biology for the corkboard relationship with siemcy, a setup also known here as “Mychorrhiza” comprises a multiple-machine setup. A setup also known here as “Mistletoe” comprises a setup (single-machine). The Mychorrhiza setup refers to the mutual relationship between the corkboard machine and siemcy machine. The Mistletoe setup represents the resource parasitism that occurs when the corkboard process lives on the same machine as siemcy.

Mychorrhiza, as described, comprises a multi-machine Mezzanine installation, which may include a corkboard. It is the traditional corkboard setup that exists with the triptych of an embodiment, composed the siemcy and corkboard processes living on separate machines and connected via the consumer network, described below. A second machine call handles all corkboard related tasks, such as receiving and displaying the parked Mezzanine asset.

Mistletoe, as described, comprises a single machine of a system, which may also include a corkboard, and it supports a system with a smaller install footprint. The embodiment runs the corkboard process on the same machine on which siemcy runs. Additional hardware resources (including but not limited to a video card supporting extra video outputs, which is described below) is required drive the extra corkboard screens from a single machine. Also, the extra corkboard process running on the siemcy machine will consume additional cpu and i/o resource. This increased resource usage is mitigated by a process described below, in order to minimizes the impact on user experience.

Adding Assets

In Mychorrhiza, assets that can be added to the corkboard comprise image, and video assets that are local DVI video (as RSTP, Remote RTSPVideo, and MzReach network video (either as RTSP or snooping pools). In Mistletoe, image assets can be added, as well as video assets that are local DVI video (via shared memory), MZReach Network (via pools), and Remote RTSP video.

A placeholder asset can be dragged into the corkboard. A placeholder can come from an asset transfer, as described in another section, and uploads, as described in another section. A placeholder from an asset transfer will update from placeholder→thumbnail→full-res image on the corkboard as the native Mezzanine receives the corresponding asset. For a placeholder from an upload, on a local Mezzanine (which initiated the upload), a placeholder refreshes from placeholder→full-res; on a remote Mezzanine (which did not initiate the upload), the corkboard asset will refresh from placeholder→thumbnail→full-res since it works through asset transfer.

Native Application Asset Transfer

For asset transfer in the native application, any asset can be dragged from Paramus to any corkboard with the wand. Supported video can be dragged with the wand from Hoboken to any corkboard. Any supported asset can be dragged from the deck to the corkboard using the copy semantics described in another section. Any supported asset can be dragged from the Windshield to the corkboard using the copy semantics described.

Web Client Asset Transfer

In an embodiment, an asset can be dragged from Paramus or the deck to the corkboard. Passforward HandiPoint drags will not work unless the corkboard felds happen to be co-planar with the triptych and within the accessible area in the browser.

iOS Client Asset Transfer

In an embodiment, the user calls up a corkboard display with a zoom and pan gesture. An asset then can be dragged from the paramus or deck onto the corkboard.

Assets—Removing, Moving, Persistence

A corkboard asset can be removed by dragging it anywhere off the corkboard. An asset can be moved from one corkboard to another corkboard. Moving an asset onto a previously populated corkboard will overwrite the asset on the receiving corkboard. Corkboard assets cannot be moved back to siemcy. In a future embodiment, an asset can be moved back into the deck, the windshield, or Paramus.

Assets can only live on a corkboard when a dossier is open. Therefore, when a dossier is closed, the assets already on a corkboard will be cleared on dossier close.

Mychorrhiza Corkboard Setup

In the multi-machine case, where the corkboard is running on a separate machine, the simplest way for both local videos (comprising videos in the same physical Mezzanine location) and remote videos to be displayed is via the RTSP stream that is made available by the serving siemcy. Because of this, MzReach videos will not be draggable onto a corkboard.

Local RTSP Corkboard Video

Corkboards connected to a local RTSP video will use a URI generated specifically for the local Mezzanine. Videos that are delivered to the corkboard by a local Mezzanine will be sent through the private network that already exists between Mezzanine and corkboard. This eliminates any excess outgoing network traffic. Additionally, since the decoding of the RTSP stream happens on the corkboard machine, there will not be much additional CPU load on the siemcy machine. While the siemcy machine does use extra CPU cycles to encode the stream, the installation hardware should be sufficient to handle this load. In short, there will not be any additional Mezzanine performance improving actions taken for a Mezzanine streaming RTSP video to al local corkboard. In an alternative embodiment, local RTSP videos add to outgoing network bandwidth and can be limited as specified in the VideoStreaming section.

Remote RTSP Corkboard Video

Since remote RTSP videos cannot be directly instantiated from Hoboken, they must be "copied" over from the Deck or Windshield via a drag by the Handipoint. The new video delivered to the corkboard will use the same URI given to siemcy. When siemcy deletes the Deck or Windshield video from which the corkboard video was "copied," the corkboard video will persist until it is deleted, until the dossier is closed, or until the collaboration has dropped.

With regards to priority, corkboard remote rtsp videos will be added into the priority system in the same fashion that deck and windshield items are added. They will take two basic priorities that can be set via the cb-remote-video-highest-priority setting. Corkboard videos with this set will have the highest priority above anything. Corkboard video or if not set, the lowest priority.

Mistletoe Corkboard Setup

In the single-machine case, where the corkboard is running on the same machine as siemcy, the corkboard will use mostly the same video sources as that of siemcy in order to conserve resources and simplify behavior. Thus, for local DVI sources, the corkboard will display video from the shared memory source provided by the provisioner. For MzReach videos, the corkboard will use the same compressed data stream sent over by mzreach client applications. For remote RTSP videos, the corkboard will access the stream with the same URI that is used by the local siemcy.

Local Corkboard Video are displayed via the shared memory source mechanism that is used by Hoboken and the RTSP Server. Remote RTSP Corkboard Video behave in an identical fashion as described in the Mychorrhiza case. MzReach Corkboard Video are displayed via the video data stream sent by MzReach client application. Actual reach-through is not supported in a current embodiment but will be supported in a future embodiment.

Corkboard Video UI

As noted, the corkboard is used as a place to "park" assets. Because a video placed on a corkboard may not be interacted with frequently, the system provides a "stream identifier," to describe the origin of the video. In a current embodiment of a stream identifier, stacked text at the bottom of the corkboard conveys video stream name and, if in a collaboration, sitename/location.

For videos on the corkboard, the system typically provides "streaming indication" to convey video status.

Whiteboard

The whiteboard is a video capture stream with an associated feld, configured to match a physical whiteboard. Clicking the wand while pointing at the physical whiteboard will cause a picture to be taken and uploaded to the Mezzanine system. The upload uses the same code path as a web or iOS client upload, and is subject to the same 30 s timeout. Web and iOS clients may also trigger whiteboard captures. The processes involved are fletcher, marple, and matloc.

Calibration

This section describes different calibration of a whiteboard in a system.

Calibration

In an embodiment, as part of the configuration process, the installer or administrator will need to record the coordinates of the whiteboard in the g-speak coordinate system. The whiteboard coordinates are provided as the screen.protein. The screen resolution in screen.protein and feld.protein is defined by the resolution of the capture camera.

1. Once the whiteboard feld and screen proteins are established, the installer or admin can calibrate the whiteboard through the following steps:
2. Connect a display monitor to the whiteboard video output and a mouse to the whiteboard server.
3. Launch the whiteboard applications. A script will be provided, but the required applications are qm-provisioner, matloc and fletcher. Each process has a number of pool names and other options used to identify the video stream to be captured, and the Mezzanine pools to connect to.
4. Look at the video stream in the video panel. Adjust the camera so that the desired part of the whiteboard to be captured fills as much of the video frame as possible.
5. Right click on the four corners of the whiteboard to set the bounds of the capture frame. The required sequence is as follows: upper-left corner, upper-right corner, lower-right corner, lower-left corner. Once the bounding region is set, a whiteboard capture will keystone correct so that the image inside the four corners is transformed into a rectangular image. Right clicking one more time will reset the corners so that no keystone correction takes place.
6. Left clicking the mouse in the display window, or pointing at the whiteboard with the wand and clicking the button, will result in a captured image. If the whiteboard processes.
7. If a PTZ camera is being used, it is advisable to save the PTZ settings for the camera at this time. If the PTZ settings are changed, the whiteboard application will need to be recalibrated, unless the settings can be restored via the presets.

Calibration via Web Browser

To calibrate the whiteboard via the admin web browser, the admin/installer opens would perform the following steps:

1. Open the calibration page on the whiteboard admin web page.
2. A video stream from the whiteboard camera is displayed.
3. The user adjusts the camera so that the desired whiteboard capture area fits completely inside the video frame.
4. The user establishes the four corners of the capture area. The user can either save the new settings, cancel to leave the settings unchanged, or reset to remove keystone correction.
5. The user can point at the whiteboard and click to upload an image to Mezzanine to verify the settings are correct. If needed, the user can repeat steps 1-4.

Implementation, Design, Architecture

Quartermaster

Quartermaster is a standard component of the yovo video architecture. It is not a process, but, loosely speaking, a group of processes, protocols, and APIs. In the whiteboard family of processes, the quartermaster provisioning tool is used to capture video from the whiteboard camera and deliver this video into a video capture pool. The flexibility of quartermaster allows any video source to be used for the whiteboard camera. This is particularly useful for testing. In product deployment, the current plan of record is to use a DVI based camera with video captured via a westar card.

Currently, qm-provisioner uses a local (to the whiteboard server) coordination pool (qm) and the standard yovo/projects/quartermaster/dvi.conf configuration file. qm-provisioner should be launched with the—norestore-state option.

The video capture stream receives uncompressed from the westar HRED card, while the video is enpooled in parallel in a westar specific version of JPEG2000. In an embodiment that enables calibration via the web page, the video stream needs to be made available in a format that is viewable in a commonly available browser plugin. An embodiment does not use H.264, which incurs a licensing of technology otherwise not be needed for the whiteboard server. In 1.0 the video pipeline creates periodic thumbnail images in an image format (e.g. Png). These are saved to a file and displayed on the web browser page in lieu of creating another video stream. This also saves the trouble of using an rtsp server, which is an alternative method. In that other approach, qm-provisioner can be configured to provide the transcoding stream, and the rtsp-server can be configured to provide the web app with the address of the video stream through rtsp.

matloc matloc is a VisiDrome although under normal use the visual output is displayed only for calibration purposes. matloc is responsible for receiving the video output uncompressed from the HRED capture device and monitoring the wand input from the Mezzanine wand pool. When a user clicks the wand button, if the wand point vector intersects with the whiteboard, matloc signals fletcher that an asset is about to be ready to be uploaded, grabs the current video frame, performs keystone correction, converts/compresses the corrected image to PNG format, and places the PNG image into the whiteboard pool.

fletcher fletcher is an UrDrome and is responsible for handling the communications with Mezzanine. (UrDrome, the encapsulating of a running process, is an object of g-Speak libBasement.) fletcher is responsible for managing the registration with Mezzanine and monitoring the heartbeats (fletcher to mezz, mezz to fletcher), as well as coordinating dossier changes and asset uploads. When matloc indicates that an asset is about to be ready, fletcher requests permission from Mezzanine to upload the asset. If successful, Mezzanine will provide an asset ID for the asset. When matloc is done processing the image and has placed it in the whiteboard pool, fletcher will grab the asset and upload it (unchanged) to the Mezzanine incoming asset pool.

marple marple is an UrDrome that is responsible for grabbing thumbnail images out of the video coordination pool (the same one used by matloc) and storing the thumbnails in a filepath used by the admin webapp for keystone configuration. The thumbnail size is not set directly with marple in an embodiment, but is specified in the dvi.conf file provided to quartermaster.

Reachthrough & MzReach

Mezzanine includes a function called "Reachthrough." In another embodiment it is known as "passthrough" (or "pass-through"). Reachthrough lets a user take control of a DVI-connect computer with the reachthrough pointer. The user also can share a live video of the contents of a network-connected computer's display without a DVI connection, and optionally control that network-connected computer with the reachthrough pointer, even without a DVI connection. A user in reachthrough can see the entire computer's pixels, capture them into a Mezzanine dossier and control applications on the connected computer.

Distribution

The MzReach application enables the system's reachthrough capability. ("MzReach" can be used as a synonym for "reachthrough.") It is distributed via the Mezzanine web interface, available from the Settings tab at the top right, from a link with a label such as "Download MzReach." Clicking that link opens a download page with text and a link to the latest Mac and Windows MzReach binary (ZIP) files.

The user activates the reachthrough pointer with the ratchet gesture of an MMID. Using the reachthrough pointer, the user performs actions such as click, drag, and select as the user would with a mouse. Feedback using reachthrough is that which the user would procure if controlling the source directly. If MzReach is not running on the connected machine, or if another Mezz user had already engaged reachthrough, the reachthrough pointer changes to indicate that it will not work.

The reachthrough pointer comprises a glyph. The glyph is open in the middle to show the remote mouse cursor inside of it. The design of the glyph seeks to account for lag between the HandiPoint location and the remote mouse cursor. For good connections, the remote cursor typically is visible in the confines of the HandiPoint.

HandiPoint Reachthrough Intent and Styles

The passthrough HandiPoint intent has two styles: one, two show that passthrough is active, and a second to show that passthrough is inactive. When the user does not point at a VidQuad with passthrough enabled, the HandiPoint shows the inactive style. The inactive style also shows when there is a conflict for a single VidQuad (see below). The inactive glyph borrows the top and bottom tines from the active passthrough glyph to create an x in the middle of the HandiPoint.

Activating Passthrough

Passthrough becomes active when the user points a passthrough mode HandiPoint at a video source that enables passthrough. The HandiPoint style changes to show passthrough is active. The location of the HandiPoint is translated to a mouse location on the remote machine, and the remote machine's cursor moves with the HandiPoint (assuming the user has MzReach running). When passthrough is active, a throbbly disc appears in the Exoskeleton (top, right) of the VidQuad, with a black stroke color and fill color that matches the provenance color of the HandiPoint driving passthrough. If another user grabs and drags the VidQuad in pointer mode, the throbbly circle appears to the left of the disc shape [see passthrough-with-scaling.png]. If passthrough stops, the circle should animate to the right edge of the exoskeleton to fill in the space. If passthrough comes in again, it appears on the left. In other words, the activity markers fill in from the right edge of the exoskeleton. When one drops out, the others shift to the right.

Two Users Attempt

When two HandiPoints in passthrough mode are hovering over the same VidQuad, the HandiPoint that first entered the video bounds is granted control over passthrough, and the other is blocked. The blocked HandiPoint glyph borrows the top and bottom line of the hexagon from the normal passthrough glyph to create an x in the center of the glyph.

If there are two passthrough-enabled VidQuads with the same video source, the above rule still applies: only one user is allowed to control the remote cursor, and the first user to gain control keeps it until they relinquish it by moving their HandiPoint out of the VidQuad bounds. For example, suppose there are two VidQuads (1 and 2) on the windshield displaying the same video source with passthrough enabled. There are also two users, A and B. User A points at VidQuad-1 and gets passthrough control. When User B points at VidQuad-2, they see the blocked glyph for their cursor because User A currently has control. When User A moves their HandiPoint away from VidQuad-1, if User B's HandiPoint is still over VidQuad-2 they will see their cursor change to passthrough enabled.

Relinquishing Passthrough

A user loses control over passthrough for a particular VidQuad if the cursor exits the VidQuad for more than 0.5 seconds. This allows the user to recover from errors if they cross the bounds of the quad without ceding control of the remote cursor. This timeout may be adjusted if it proves too much or too little during normal use. When the user loses passthrough control, the HandiPoint animates back to the inactive passthrough style.

Security

Security represents a key feature of Mezzanine. Its implementation enables privacy and security in a way that satisfies the needs and concerns of customers. At the same time, security concepts and features remain as simple as possible to use and understand, and do not compromise the efficiency or intuitiveness of the interface.

Security Versus Privacy

Security and privacy are interrelated concepts, but key differences between them exist as they apply to Mezzanine. Security refers to Mezzanine's ability to protect sensitive information through encryption and/or authentication mechanisms. Privacy refers to Mezzanine's ability to protect private or personal information by making responsible decisions about what information should be made available to other parties, and by allowing the administrator of a Mezzanine or its participants to control access to this information when appropriate.

Use Cases

Users may deploy Mezzanine in many different ways. For example, secrecy is a key concern of a Company A, which owns a Mezz. They regularly host Mezzanine sessions with folks from Companies B and C. The affiliation of company A with companies B and C is private information under NDA, and thus B cannot know of C's affiliation with A, and vice versa. Company A needs a way to host these Mezzanine sessions that prevents B and C from seeing dossiers belonging or relating to the other (or even the existence of those dossiers). Private dossiers, described below in this section, help accommodate this use case.

In another example, sequestration is a concern of a Company A, which owns a Mezzanine. They regularly allow participants to join their Mezzanine sessions using various clients, and everyone in the company knows the URL used to connect to their Mezzanine. On occasion, specific teams within the company need to use the Mezzanine to work on projects that are not to be shared with the entire company. They need a way to ensure that others in the company cannot join their private Mezzanine sessions using these clients. Secure sessions, described below, accommodate this use case.

In a third example, group-efficient organization is a concern of a Company A, which owns a Mezzanine. The company is divided into several teams, and all of these teams use the Mezzanine regularly. Over time, each team creates a large number of dossiers. The dossiers of one team are not meaningful to the other teams. The teams would like an easy way to authenticate in order to see their dossiers without those of the other teams getting in the way. Private dossiers, described below, provide a partial solution for Company A since they can create shared user accounts for each team; However, they'd prefer a solution which offered everyone an individual account with access to the team's dossiers.

Private Dossiers

Private dossiers belong to an individual, or a group of individuals, and are hidden by default from others using the Mezzanine. Authentication via a client device is required in order to access the dossiers. Though only one participant may remain logged in on any one device, any number of participants may authenticate with a Mezzanine at once through their individual client devices.

LDAP

Private dossiers are secured through LDAP authentication, described below. This is a commonly used access protocol that many companies using Mezzanine will already have configured for their employees. The company will be given the choice of servers to authenticate against—it could be one of their own already existing servers, or the Mezzanine server itself. Though the company is given flexibility in choosing the server to authenticate against, the data accessible through this authentication will be stored on the Mezzanine hard drive.

In an embodiment, private dossiers have a single owner, and belong solely to the authenticated user. When users are deleted from a local ldap server, those actions will not result in an auto-deletion of the user's dossiers. That is left up to the administrator to perform manually since they can reset the user's password and login as the user.

Deletion of users from the remote server is trickier because the administrator cannot reset those passwords. The system allows administrators to log into Mezzanines with their credentials and see the entire list of dossiers stored on that Mezzanine.

Authenticating

Authentication requires the ability to enter a username and password. Performing this action accurately and efficiently requires the use of a keyboard, which is not typically part of a standard Mezzanine installation. For this reason, authentication requires the use of a supported client device such as an iPhone or iPad, or a web browser.

A button on these clients reveals the authentication controls, consisting of a username field, a password field, and "log in" and "cancel" buttons. The appearance and behaviors of these elements depend on the most appropriate presentation for each individual client. Once logged in, a log out button is provided where the log in button previously resided. Changes made to a user's account (password, for instance) while a user is logged in only are reflected on the next login attempt. The user is not logged out automatically when such changes are made. In an alternative embodiment, an authenticated client that has remained idle for some time is logged out automatically.

Native mezz keeps track of the login state of each client. If a user logs into a Mezzanine with multiple devices, an embodiment assumed each device gets logged out independent of each other much like browser cookies. Rather than setting a timeout based on when the client first logs in, an embodiment makes sure that the user is not actively using the app when the user is logged out. (Otherwise, the user that perhaps is mid-operation gets an error.) The timeout then is sufficiently long such that a user who is logged in and then passively attends the collaboration should not be logged out prematurely. One embodiment allows, for example, for passivity for a period up to three hours. Every action that requires authentication returns an appropriate error message if the user is no longer authenticated and thus cannot, say, create/rename a private dossier.

Groups

In an embodiment, multiple clients (iOS/web) may stay logged in with the same credentials. With this facility, users of Mezzanine will be able to share an account for a team or group.

Viewing

In the short term, viewing of private dossiers is restricted to the client device through which authentication is performed. This provides a privacy assurance so that a participants can feel comfortable authenticating to access their private dossiers, even if many of those dossiers may not be seen by other participants in the room.

The presentation of private dossiers is similar to the list of anonymous, or fully shared dossiers. If both private and anonymous dossiers are shown together in a list, visual cues are provided to distinguish them. Sorting and filtering options may also be made available. In some cases, one may be presented to the exclusion of the other, with a means of toggling between them. The display of private dossiers varies by client, and is chosen in the manner most appropriate to its interface.

An embodiment extends viewing support, enabling the authenticated participant to display private dossiers in the portal of the native interface. A global toggle hides or shows all private dossiers. In another embodiment, an UI element such as checkboxes allows for selective presentation of a subset of all private dossiers.

Super Users

Mezzanine will allow the designation of "super users" via the web admin app. Though empty by default, this list may be configured by the administrator to contain any number of users. Super users may be added and removed at any time. (Dossiers created by a super user are still available to that user after the super user privileges have been revoked.)

Super users may log in via any client interface. When they do so, Mezzanine returns Super users will have access to all available dossiers—both public and private—on a Mezzanine. To aid the super user in managing a large number of dossiers, client interfaces group them by owner. The remainder of the UI for both the native interface and clients will remain unchanged, with all other standard functionality behaving as usual for any user.

Collaboration

Private dossiers in Mezz-to-Mezz collaboration are, while open, available to all Mezz systems and all web/mobile clients on any collaborating Mezz. Any participant in the collaboration can download slides and assets. Any changes to the dossier (uploaded assets, rearranged slides, etc) are applied to the private dossier, whether they are done locally, on a local web/mobile client, on a remote Mezz natively, or on a remote web/mobile client.

However, once the dossier is closed, it again is available only to the local logged-in web/mobile client. Remote Mezzes that were in the collaboration will have the private dossier deleted when the dossier is closed, and their web/mobile clients are not able to download the dossier.

If collaboration ends, or if the Mezz that has the dossier's owner leaves before the dossier is closed, any changes done (by a Mezz that does not host the dossier and its owner) are lost once the dossier is closed. A notification is displayed once this point is reached to remind remaining collaborators of this situation.

Secure Sessions

Key Generation

Clients such as iOS devices and web browsers can join Mezzanine sessions by navigating to a specific URL. At times, it may be desirable to prevent clients from joining a Mezzanine session in order to specifically limit who may participate. Secure sessions provide a way to lock the Mezzanine, requiring a key—a modified URL—to join instead.

The key itself—the extension of the common URL—is kept as succinct as possible while ensuring reasonable security such that it is easy to communicate verbally and to type when needed. The key consists of a randomly generated string of 3 alphanumeric characters, providing a total of $36^3$=46,656 possible values.

The key is displayed in uppercase characters for clarity. However, the case is ignored when processing the key to avoid potential frustration when it must be entered manually. The key is appended to the common Mezzanine URL as a hash in the following format:

http://<domain>/Mezzanine#<key>

Key Distribution

This session key is valid on any client, and can be disseminated to anyone through email, instant message, text message, over the phone, or via any other means necessary. The URL remains valid until either a new key is generated, or the Mezzanine is unlocked again, at which point it is no longer needed.

Distributing the key as a URL brings several advantages. First, it is a basic extension of the existing URL used to join the Mezzanine already, which frequent participants can bookmark or memorize. As a URL, many forms of communication will allow one-click access to the session, avoiding the need to provide a URL and a password to be typed in separately.

Additionally, clients may be able to handle the URL in unique ways. For instance, on iOS devices it is possible to register particular URLs with apps, such that clicking a Mezzanine session URL in a mail client or text message will automatically launch the appropriate client app. If the session URL is shown in the browser, the iOS device should be detected in order to provide a link to the app in the app store, making it as easy as possible for new clients to join.

Manual Key Entry

When navigating to the common (non-session) URL, access must be blocked. In these circumstances, messaging on the page explains that the session is locked and that the key is required to join. An input field is displayed and automatically focused to accept the key which can then be manually entered. An embodiment improves the entry interface by ignoring non-alphanumeric input (that is, not allowing the characters to be entered into the field at all), and by automatically uppercasing all letters to prevent hesitation regarding case sensitivity.

Locking and Unlocking a Session

The native interface displays a persistent passphrase indicator on screen at all times. This makes it easy to see if the current session is secure, to lock or unlock it, and also ensures that it is possible to connect a client without a wand. The indicator serves as a toggle button which contains the passphrase when locked, lock/unlock descriptive text when interacted with, and an icon. Additionally, the URL at which clients may join the session is displayed within the Portal and the System Area so that clients in the room can see it and navigate to it easily. In the "unlocked" state, the button shows an unlocked padlock icon next to the string "lock." In the "locked" state, the button shows a locked padlock icon next to the current passphrase. The passphrase indicator may have other visual states during user interaction, which are detailed below.

Locking via a pass phrase only locks access to a particular Mezzanine. Every Mezzanine in a session can choose whether to "lock" access to itself, and if one decides to lock, then its pass phrase will be different (as a consequence of random generation, no guarantees are offered about uniqueness or similarity).

Locking a Session

While unlocked, hovering the HandiPoint over the button changes the icon to its locked state. Hardening then toggles the button fully to the locked state, changing the text label to the newly generated passphrase and causing the icon to remain locked. Clients are prompted to enter the passphrase before they can join the session. If clients are already participating when a session is locked, they are immediately disconnected and shown the usual manual key entry prompt. (The client that initiates the session lock, either via passforward or by lock controls provided in the client interface, is exempt and does not get prompted to enter the passphrase.)

While locked the button displays the passphrase. Though the text changes on hover as detailed below, the text does not change until after the HandiPoint has first exited the button. This allows the passphrase to be read easily when the button is initially locked and to makes the result of the locking action more clear.

Users can also lock a session from a client interface. More details are provided in sections on iOS Passphrase and the Web Secure Sessions.

In an embodiment that does not incorporate web passphrase controls, web clients can access the passphrase controls using passforward.

Unlocking a Session

The persistent passphrase indicator is a toggle. While locked, hovering over the button causes the text to change from the current passphrase to "unlock" and the icon to enter its unlocked state. Hardening removes the session passphrase and restores the button to its unlocked state. Unlocking the session restores the common URL and opens the session up for all clients to join anonymously again. Any connected clients remain connected.

Layout

The persistent passphrase indicator resides above windshield elements and sits in the bottom right-hand corner of the workspace. It contains an icon on the left and a text label on the right, which can be either the current passphrase or a description of what happens when the button is pressed. When a collaboration is active, the persistent presence indicator, which is described herein, sits to the left of the passphrase indicator. The look and feel of the indicator is the same as a normal button.

FIGS. 167-173 show Mezzanine presentation mode operations, under an embodiment.

FIG. 167 shows presentation mode slide advance operations, under an embodiment.

FIG. 168 shows presentation mode slide retreat operations, under an embodiment.

FIG. 169 shows presentation mode pushback transport operations, under an embodiment.

FIG. 170 shows presentation mode pushback locking operations, under an embodiment.

FIG. 171 shows presentation mode passthrough operations, under an embodiment.

FIG. 172 shows presentation mode passthrough, button selection operations, under an embodiment.

FIG. 173 shows presentation mode exit operations, under an embodiment.

FIGS. 174-210 show Mezzanine build mode operations, under an embodiment

FIG. 174 shows build mode highlight element operations, under an embodiment.

FIG. 175 shows build mode move element operations, under an embodiment.

FIG. 176 shows build mode scale element operations, under an embodiment.

FIG. 177 shows build mode fullfeld element operations, under an embodiment.

FIG. 178 shows build mode summon context card operations, under an embodiment.

FIG. 179 shows build mode delete element operations, under an embodiment.

FIG. 180 shows build mode duplicate element operations, under an embodiment.

FIG. 181 shows build mode adjust element ordering operations, under an embodiment.

FIG. 182 shows build mode grab on-feld pixel operations, under an embodiment.

FIG. 183 shows build mode adjust element transparency operations, under an embodiment.

FIG. 184 shows build mode adjust element color operations, under an embodiment.

FIG. 185 shows build mode reveal Paramus and hoboken operations, under an embodiment.

FIG. 186 shows build mode return from pushback operations, under an embodiment.

FIG. 187 shows build mode reveal more Paramus operations, under an embodiment.

FIG. 188 shows build mode reveal more hoboken operations, under an embodiment.

FIG. 189 shows build mode inspect asset in Paramus operations, under an embodiment.

FIG. 190 shows build mode scroll Paramus laterally operations, under an embodiment.

FIG. 191 shows build mode insert asset into slide operations, under an embodiment.

FIG. 192 shows build mode insert input into slide operations, under an embodiment.

FIG. 193 shows build mode reorder deck operations, under an embodiment.

FIG. 194 shows build mode scroll deck operations, under an embodiment.

FIG. 195 shows build mode delete slide operations, under an embodiment.

FIG. 196 shows build mode duplicate slide operations, under an embodiment.

FIG. 197 shows build mode insert blank slide operations, under an embodiment.

FIG. 198 shows build mode browse other deck operations, under an embodiment.

FIG. 199 shows build mode delete other deck operations, under an embodiment.

FIG. 200 shows build mode swap current deck with other operations, under an embodiment.

FIG. 201 shows build mode swap current deck with new empty operations, under an embodiment.

FIG. 202 shows build mode engage deck view operations, under an embodiment.

FIG. 203 shows build mode move slide between decks operations, under an embodiment.

FIG. 204 shows build mode reorder slide within deck operations, under an embodiment.

FIG. 205 shows build mode swap decks operations, under an embodiment.

FIG. 206 shows build mode dismiss deck view (1) operations, under an embodiment.

FIG. 207 shows build mode dismiss deck view (2) operations, under an embodiment.

FIG. 208 shows build mode enter presentation mode (1) operations, under an embodiment.

FIG. 209 shows build mode enter presentation mode (2) operations, under an embodiment.

FIG. 210 shows build mode session ending operations, under an embodiment.

Mezzanine Web Client Example

Mezzanine includes a web client, where a user can control the system through a browser. Mezzanine allows a limited number of users to interact with Mezzanine through the web client. The purpose of the limit is to restrict the amount of network traffic between the native mezzanine application and connected web clients. For Mezzanine of an embodiment, the limit is 8 active web clients. As any client, a web client in this embodiment is subject to timeout via a heartbeat listening mechanism. If a client has not issued a heartbeat in 30 seconds, it is considered disconnected and further commands from that client are ignored.

An active web client is defined as a tab (or tabs) in a single web browser on a single machine that is actively responding to heartbeat/pulse check proteins from the native mezzanine application. The native mezzanine application is responsible for tracking how many active clients there are and determining when a client becomes inactive.

Join

Each web client has a unique ID on a per browser basis—that is, multiple tabs in the same browser on the same machine will share an id. An instance of a web client on the same machine but a different browser will be assigned another unique ID. If a client becomes disconnected from Mezzanine, it must go through the join process again. The same errors, restrictions, and timeouts apply.

In a browser where no tabs contain active mezzanine sessions, the user points their browser at the mezzanine URL and a request is made to join the mezzanine session.

If there are already 8 or more participants, the request for a new user to join a session is denied. A placeholder page indicates that too many people are already connected to mezzanine by web client. A button on the page allows the user to try joining the session again. When the user clicks on the button, a new join request is sent and a wait dialog blocks the user from clicking the button again until a response is received (or there is a timeout).

If there are fewer than 8 participants, the request is granted, and the native mezzanine application reserves a HandiPoint for the user. The user is redirected to the dossier portal (if no dossier is open) or to the screens tab (if a dossier is open). If the native application does not respond to the join request within 45 seconds, an error is displayed to the user. The error is a notification dialog with title text “join timeout” and a message that says “Sorry. Could not connect to Mezzanine”. A button shows an option to try again.

If the network connection drops after initial page load, when first request is denied, a secondary request is not supported.

Web client dependencies are dialogues and buttons, described elsewhere. Native dependencies are handipoint, feld geometry, and tracking of connected web clients/web client pulse check.

Tab Bar

The mezzanine web interface uses tabs as its primary mode for navigating between different groups of features. The tabbed interface becomes available when a session is in progress (after a dossier has been opened through the dossier portal on either a connected device or the native mezzanine application).

Three main tabs are screens, assets, and video. A horizontal bar contains the controls for navigating to each of the three different tabs, and one additional link for closing the current dossier.

The tab bar contains controls for switching tabs. The height of the tab bar is 36px and its background color is RGB 119, 119, 129. The tab bar extends across the entire width of the page.

The tab controls each contain a text label describing the content of the page. Tabs are rounded on their top 2 corners with a 2 pixel radius. The selected tab has a background color of RGB 242, 242, 242 and a 1-pixel outline of RGB 49, 49, 59 on the left, top, and right edges of the tab. A line of the same color extends from the bottom corners of the tab to the left and right edges of the browser window (see attached wireframes). Unselected tabs have a darker fill color (RGB 204, 204, 204) and also a different 1 px stroke along the top, left, and right edges of the tab (RGB 179, 179, 179). There is 6px of space between the left edge of the text label and the left edge of the tab (0.5em for 13px).

When the user hovers the mouse over an unselected tab, the fill color becomes white. There is no visual change when the user hovers the cursor over the current active tab. To change tabs, the user clicks on the tab area when it becomes highlighted. The entire tab control should be clickable.

Geometrically, the tabs are aligned to the left edge of the page, with some horizontal spacing before the left edge of the first tab (11px). Each tab selector is separated by 6px of horizontal space. The tabs are all the same width. The text in the selected tab is 13px bold verdana. In unselected tabs, it is 13px regular verdana. All tab labels are black.

The content of the tabs is revealed in the area below the tab selectors. The background color for this region matches the background color of the selected tab, RGB 204, 204, 204.

At times, the application may need to communicate a non-blocking notification back to the user, such as the status of an uploaded file. There is an area for displaying text messages in the tab bar to the right of the last tab. The text is in 11px regular verdana in white. There is 22px (2.0ems) of horizontal space between the notification text and the right-most tab. Depending on the type of message, there may also be an animated gif to indicate that an action is pending. A sample status message with animated gif is shown in the attached image [tab-status-message.png]. The text of the status message should be baseline aligned with the text in the tabs.

A link to close the current dossier is aligned to the right edge of the page (with 11px of padding). The link text is white, 11px verdana regular. This is baseline aligned with the status message and tab text.

When a tab is switched, an event is emitted and propagated to various listeners. Its up to them to determine how to deal with being, or not being, visible.

Each tab is responsible for sending an event when they gain or lose focus used for things such as changing visible content; and informing components to they are no longer visible or are becoming visible so that they can relinquish/request scarce resources, and send other appropriate proteins.

The order of operations are to invoke the change of a tab and then perform a round of confirmations where the components will remove their elements or free scarce resources. Examples include popping up a dialog requesting user action before a tab switch, if such an action is to be specified. Finally, the system performs a round of invocation where the new context is tasked with displaying things on the screen; this involves updating the tab ui to reflect the tab has been switched The screens tab provides interactive controls for manipulating Mezzanine objects via pass-forward, selecting a pass-forward mode, and browsing slides. The screens tab is also the landing page for the mezzanine web client when the user points their web browser to the mezzanine URL, and a dossier is already open. Screen tab components are pointers, passforward, slide scrolling, pushback transport, and asset input/output. Asset input/output includes download all slides, clear all slides, and upload slides.

The video tab allows the user to configure the video streams that appear in Hoboken in the native Mezzanine application. From this tab, the user can control the volume of audio for each video feed (when audio is available). This supports a variety of user scenarios. For example, two users would like to share their laptops with the local Mezzanine system through physical DVI connection, but also stream video from a remote site. Another example is when two remote videos are streaming with audio. One video source has very loud audio, and the other does not, so the mezzanine users would like to balance the sound coming from both parties. In a third example, a remote participant is streaming video via webcam, but is not talking and is in a loud environment. Local mezzanine users would like to mute audio from this source. Features of the video tab are select video source; adjust, mute, and unmute audio, and display video thumbnails.

The assets tab contains interactive controls for browsing and managing image assets in Paramus via the web interface. Its components are asset browser and asset input/output. Asset browser includes remove single asset from paramus. Asset i/o includes clear all assets, upload images, download a single asset, download all assets as .zip archive. The tab also leads to clear all slides and download all slides.

Dossier Portal

The dossier portal provides a web interface for opening a dossier, renaming dossiers, creating dossiers, duplicating dossiers, and deleting dossiers.

The dossier portal is the landing page for the Mezzanine web application when no dossier is currently open. The dossier portal is not accessible when a dossier is already open; instead, users should be taken to the screens tab for the open dossier. If multiple users are looking at the dossier portal when one selects and opens a dossier, all other users should be redirected to the screens tab for the opened dossier. A notification dialog should appear explaining that a dossier has been opened and a new session is beginning.

Components are dossier browser, create new dossier, and dossier options. Dossier options are open dossier, rename dossier, delete dossier, and duplicate dossier. FIG shows an example of a dossier portal.

Dossier Portal listens to change sin portal state and updates ui accordingly. It Listens for user input and sends out portal state change requests.

Dossier Browser

The dossier browser contains a scrollable list of dossiers and resides on the dossier portal page. A user, for example, may browse available dossiers on a Mezzanine system conveniently from her own laptop. Additionally, user might like to select a particular dossier to edit or delete. As a number of dossiers may be stores on a Mezz server, the interface is designed to let the user view as many of them at once as possible.

The dossier list renders a preview of each dossier, along with the dossier's name, and the date it was last opened. The preview is a thumbnail of the first slide in the deck. The list contains a UI element, also called a "nub," for each dossier.

The visual presentation of a single, unselected dossier, includes background RGB (232, 232, 232) with a 3px rounded corner; thumbnail is aligned to left of dossier area; text is black, 11 pt verdana; bold text for dossier title; regular text for mod date; mod date appears on line below title; 9px of space between the right edge of the dossier thumbnail and the text for dossier title and mod date; and 5px margin below dossier title The visual presentation of a single dossier when mouse cursor hovers over it includes: background changes to RGB (119, 119, 129); text color changes to white (no change is made when the mouse hovers over an already selected dossier).

To select a dossier, the user places the mouse cursor over a dossier nub and clicks once. Only one dossier may be selected at a time. Selecting a new dossier automatically replaces any old selection. When selected, the appearance of the dossier nub changes: background is RGB (49, 49, 59); text color is white; dossier options menu animates out from bottom of nub; background area expands to accommodate the options menu; row of dossiers below the selected dossier animates out of the way to make room for the options menu.

If there are more dossiers than can fit in the area on screen, a vertical scroll bar appears to the right of the dossier list. The scroll bar should not appear if all dossiers can fit without scrolling.

The user can sort dossiers by either their name or modification, in both ascending and descending order. To select the sort mode, the user clicks on the text link for the desired sort mode: "name" or "last modified". Clicking on the link for the currently selected sort mode should reverse the sort order (for example, change ascending order to descending order).

The visual properties for the sorting UI are: all text is 11px verdana in black; "sort by:" label text is bold; unselected sorting options are in regular weight text; currently selected sorting option is in bold. An arrow appears along side currently selected sorting algorithm. When current sort order is descending, arrow is pointing down. When current sort order is ascending, arrow is pointing up. User can click text link to change sorting order. The width for each sorting option is fixed, such that selecting a different option does not cause the text to wobble. The sorting UI is aligned to the right edge of the page The dossiers are arranged in reading order. For example, dossiers named A, B, C, D, and E arranged in ascending alphabetical order, with space for 3 dossiers in a single row the arrangement would be:

ABC

DE

The dossiers are rearranged immediately when a new option is selected—there is no animation.

If there are no dossiers on the mezzanine system, the dossier browser prompts the user to create one: there is placeholder text centered in the middle of the dossier list that reads "no dossiers have been created yet" and on another line, a link that says "create one to get started" which produces the same dialog as the create new dossier button. The placeholder text is: −11pt verdana regular in black for prompt −11pt verdana bold in black—left aligned with the "Dossiers" label in the menu bar.

Dossier Portal reflects and responds to changes to Mezzanine's dossiers; it is capable of reacting to both full and delta state broadcasts. It allows creation, opening, renaming, duplication, and deletion of dossiers and creation/handling of all related dialogs. It adjusts size after window resizing, and hides/shows "there are no dossiers". It keeps track of currently selected dossier and disables/enables dossier options dropdown accordingly, and creates custom dropdown menu for 'dossier options.

Create New Dossier

The user can create a new dossier from the dossier portal. The user, for example, may like to provide a custom title when creating a dossier, which in one embodiment is not possible when creating a dossier from the native interface. In another example, a user would like to start a brand new collaboration session with a clean slate. Another user might like to upload a set of slides from PowerPoint or Keynote into a brand new dossier to create a presentation.

The button for creating a new dossier resides under the dossier preview thumbnail for a selected dossier in its dossier options menu. When the user clicks the create new dossier button (a text button), an input dialog box is shown with an option to name the dossier. A default name is given: "{dossier [date]}", where [date] is the current time down to the second. The [date] format is YYYY-MM-DD hh:mm:ss (with 24-hour time)—which ensures that newly created dossiers are also sorted in date order when alphabetized. The user clicks "create dossier" to name and create the dossier. When the user clicks "create dossier" from the input dialog, a wait dialog appears.

In an embodiment, upon successfully creating the new dossier, the web application automatically scrolls the dossier list to show the newly created dossier. It should also select that new dossier, so the user can open it easily should they so desire.

If another user opens a dossier before the request to create a new dossier is processed, the request to create a new dossier is denied. A notification dialog is displayed with the title "could not create new dossier" and body text "sorry! could not create dossier. another dossier is currently in use."

Dossier Portal listens for user input to dossier creation button(s), displays input dialog, and sends out create dossier request protein. Mezzanine (high-level client application object) listens for open dossier protein (the result of a successful dossier creation).

Open Dossier

From the dossier portal, the user can select and open a dossier. The user selects an element in the dossier browser, and then clicks on the open dossier button in the dossier options for the selected dossier. Power users can double click on a dossier to open it.

A wait dialog appears with the text "opening {dossier-name}, please wait . . . " while the dossier is loading. {dossier-name} is the name of the selected dossier. The wait dialog disappears when the dossier has loaded, or when an error condition has been detected. The dossier is finished loading when all data to necessary to show the screens tab is loaded (handipoint registration, slide info, feld info), plus the list of assets, so that the assets tab can load images in the background.

An error occurs when a dossier cannot be loaded (including when another user slips in and deletes the selected dossier before the UI can update). An error occurs when another user has opened a dossier.

If the dossier could not be loaded, the user is presented with a notification dialog and taken back to the dossier portal. If another user opens a different dossier, a notification dialog appears and explains "Sorry! Could not open dossier. Another dossier is currently in use." The other dossier should load in the background while the notification dialog is waiting for the user to press okay.

When the dossier is open, the title text in the browser should include the dossier name. The title text should be the application, space, endash, space, then the name of the dossier.

Dossier Portal listens for user input and sends open dossier requests to the native. Mezzanine (name of the highest level client side object) listens for changes to app state to determine when dossiers are opened. It adjust title to include dossier name.

Close Dossier

The link for closing the current dossier can be found on the right side of the tab bar. When the user clicks this link, they are asked to confirm the action and reminded that closing the dossier effects all users. The native mezzanine application indicates the session has ended and take the application back to the dossier portal. Other web users also are redirected to the dossier portal.

The confirmation dialog reminds the user that closing the dossier means that all users will need to stop editing the dossier. If the user clicks cancel, nothing happens; if the user clicks "close dossier" then the dossier is closed.

The text for this message reads: "The dossier will be closed for all users. Are you sure you want to close it?" Options are "cancel" and "close dossier."

If any users are currently uploading images, dialog text also includes: "The dossier will be closed for all users and all uploads will be canceled. Are you sure you want to close it?"

Other web users are presented with a notification dialog that the session has ended, and taken back to the dossier portal. The user who ended the session should not be presented with the notification dialog. Notification text reads "Dossier was closed by another user."

If the user was uploading files, the dialog contains additional text to explain that their uploads did not finish: "Dossier was closed by another user. Your (n) images were not added to the dossier." "N" is the number of canceled uploads for that particular user.

Rename Dossier

The dossier portal provides the user with a way to change the name of an existing dossier. The user, for example, created a new dossier through the native interface, and would like to replace the default name. In another example, when creating a new dossier, user misspelled a word in the title and would like to correct it. A user also may like to give dossier a more accurate, distinct, or helpful name.

User selects a dossier from the dossier browser. From the dossier options menu, the user selects rename. The rename dialog is an input dialog. It prompts the user to enter a new name for the dossier, and by default provides the current dossier name as pre-selected text.

Dossier Portal listens for rename dossier input, displays input dialog, and sends rename dossier request. It listens for rename dossier psa and updates ui.

Duplicate Dossier

The dossier portal provides the user with a way to create a copy of an existing dossier. The user, for example, may like to add content to an existing presentation, but also leave the original presentation intact. In another example, the user would like to use an existing dossier as a template for a new one.

To duplicate, the user selects a dossier from the dossier browser. From the dossier options menu, the user clicks on the duplicate link. After providing a name, the dossier is duplicated and added to the dossier portal, but not opened automatically. The input dialog allows the user to specify a name for the duplicate. By default, the text field is populated with the selected dossier name plus the text "duplicate" and a string representing the time of duplication. In an embodiment this is consistent with the date format for the title suggestion when creating a new dossier. A wait dialog appears while the dossier is being duplicated. It indicates "creating dossier: {dossier name} . . . " The dialog stays until the native application confirms that the new, duplicate dossier has been created or an error condition is reached.

An error dialog appears if another user opens a dossier while the selection is being duplicated. The dialog says "sorry! could not duplicate dossier. another dossier is currently in use."

The Dossier Portal: listens for duplicate dossier input, pops up input dialog, sends duplicate dossier request protein, and listens for new dossier protein (the result of a successful duplicate request and updates ui.

Delete Dossier

The dossier portal provides the user with a way to remove an existing dossier. Deleting a dossier completely removes it from disk. The user, for example, would like to delete some dossiers from the web client because there are too many dossiers on disk and not enough space for new ones. In another example, users have uploaded content that they do not want to persist on a shared machine, and want to remove the dossier that contains the content. Also, a user may like to remove outdated dossiers.

User selects a dossier from the dossier browser. From the dossier options menu, the user clicks on the delete link. The confirmation dialog asks the user "are you sure you want to delete {dossier name}?" and provides the options "cancel" and "delete dossier".

If two users try to delete the same dossier at roughly the same time, both succeed. A user does not receive an error message when trying to delete a dossier that does not exist.

If the user tries to delete a dossier while has opened a dossier, the requested dossier is not deleted and an error dialog is displayed. The title for the error dialog is "could not delete dossier" and the message body is "sorry! could not delete dossier. another dossier is currently in use."

Dossier Portal listens for 'delete dossier' input, displays confirmation dialog, sends delete dossier request protein. It listens for delete dossier and updates ui.

Web Client 1.0—Asset Browser

The asset browser lives in the assets tab and allows the user to view assets that have been uploaded to paramus by all web users, as well as snapshots that have been taken by all users. The asset browser is a web browser version of paramus. It stays synchronized with the native application when images are uploaded, snapshots are taken, and assets are deleted. The web user can browse thumbnails of the images at a range of sizes (independent of what sizes other users might be browsing). A slider controls the size of the images within the browser. Since it is synchronized with the paramus, the assets in the browser are tied to the current dossier.

The asset grid contains all images in the same logical order they first appeared in paramus. The grid scrolls vertically if it cannot fit all of the images within its allotted space. Assets populate the grid left to right, top to bottom (the oldest image is in the top left). Like the native asset browser, the images are scaled to fit within the bounds of a rectangle that matches the aspect ratio of the felds, but the aspect ratio of the image itself is not warped. Images are not enlarged if they are smaller than the current size: instead, they are centered in the available area.

For example, an embodiment includes an asset grid with a variety of aspect ratios for the images. The first image matches the feld aspect ratio, so it is not letterboxed or pillarboxed. The second image is letter boxed, because is very wide. The third image is pillarboxed, because it has a taller aspect ratio. The fourth image (first image in second row) is centered in the available area because it's smaller. The fifth image takes up all the available area; its aspect ratio matches the feld ratio. The extra background in the letterbox or pillarbox is RGB 230, 230, 230 when visible. There is 11px of spacing between images (horizontally and vertically) in the asset grid.

When the asset grid is empty, it displays a graphic indicating as much.

When the user hovers over an asset in the asset grid, it is highlighted by a 3px border around the image (with 2px rounded corners, of course). If the user clicks on the thumbnail, a menu of asset-specific options slides out from below the image. The next row of images moves out of the way. The user clicks anywhere but on the menu to make it disappear.

In an embodiment, the asset-specific menu will allow the user to download the asset at its full resolution (the thumbnail may not be full size) or to remove the asset from paramus. Both menu options are links. The text is 11px verdana in white. A linebreak separates the menu options to support a linewrapped text option in an embodiment (and menu options should be distinguishable).

Using the slider above the asset grid, the user can control the size of images displayed in the asset grid. The minimum display size is 120px wide and the maximum display size is 480px wide. The user can grab the slider nub, a 12×23px rounded rectangle (2px corner radius) and drag it to change the size of the images in the asset grid. The width of the thumbnails resizes depending on the location of the slider nub: it can be anywhere in the range of 120 to 480 pixels. The fill color of the nub is RGB 119, 119, 129 and the outline color (1px border) is RGB 49, 49, 59.

The left most edge of the slider track is the minimum size, and the right most edge is the maximum size. The width of the track is 360px (1px per size). Its height is 6px and it also has a 2px rounded corner radius. Its fill color is RGB 204, 204, 204.

The image size slider appears above the asset grid, aligned to the right edge of the page with 11px of padding. It is highlighted in FIG Asset Browser 2.

Feature dependents are download single asset, download all assets as a zip, clear all assets, and delete a single asset.

An asset manager will be responsible for listening and broadcasting to relevant pools (via plasma.js code), and for updating the ui of the asset browser. Individual images will use a simple ui widget which handles their scaling/centering.

The asset manager maintains responsibility for adding and removing assets from browser, communication with network library to maintain sync, and resizing assets locally. It listens to delete asset/all asset and add asset; it sends delete asset and add asset. The asset widget, given a size/aspect ratio, scales image so that it fits inside with no overflow. Related proteins are request-paramus-state, paramus-state.

Delete Asset

The web user can remove an asset from Paramus by selecting it in the asset browser. The user clicks on the asset to remove in the asset browser, then picks the correct menu option or presses the delete key. The relevant menu option in the asset menu is "remove asset from palette". A confirmation dialog is displayed to ask the user if they're sure they'd like to remove this asset. When the user confirms deletion, the asset menu and selection feedback disappear immediately. A keyboard shortcut is available; the user can press delete key when asset is selected.

Once the user has requested to remove the object, it is grayed out and a white text overlay says "[removing . . . ]" until the native app confirms that the asset has been removed. The text (11px verdana) is centered over the image. See attached [remove-asset-pending-01.png]. During this time, the item is not selected and the menu should not be visible. If the user clicks on the asset, it should not show selection feedback or reveal the menu.

If the asset is not in use in any slides or windshield items, it should be removed from disk. Otherwise, it should remain on disk. This need not happen immediately upon asset deletion—it can be deferred until the dossier is closed, for example. An asset also should not be deleted/removed from disk until any pending downloads of that asset have finished. If two users try to delete the same asset at the same time, both will appear to succeed. The system does not generate an error if the user tries to delete an asset that doesn't exist.

This feature uses the asset manager. Each thumbnail is an instance of a thumbnail object that has the drop down menu and events associated with it. When the menu expands and the delete link is pressed, then an event is generated to remove the asset with the asset to be removed as the parameter. A dialog is invoked as a test case for this event that confirms that the asset should be removed. Upon affirmation, a wait dialog with the title "removing asset" and text "removing asset form the palette, please wait . . . " is started under the confinements of the wait model.

Clear All Assets

The Mezzanine web application allows the user to remove all images from paramus/the asset palette. The link to clear all slides lives on the assets tab. It is situated to the right of the "download all assets" link, with a 20 pixels of space (~1.8 em for 11 px text size) in between. There is no buffer/active area outside the normal boundaries of the link (no CSS padding for the area elements). When the user clicks the link, a confirmation dialog is shown. The dialog asks for confirmation to clear the entire palette for all users. As soon as the user clicks "clear all assets" in the confirmation dialog, the dialog disappears and a wait dialog appears that says "removing all assets from palette, please wait . . . " until the native mezzanine app confirms that paramus is empty. Like removing a single asset from paramus, deleted assets that are not contained in any slides should be removed from disk. Otherwise, if there are slides containing the deleted assets, the image files should remain on disk.

Download Single Asset

The web user can download an asset from by selecting it in the asset browser. This feature can be used to retrieve files uploaded by other users or snapshots taken with the native snapshot tool. The user clicks on the asset for download in the asset browser, then picks the correct menu option. The relevant menu option in the asset menu is "download full-size asset".

While the web client is waiting for the native mezzanine application to respond with the URL for the requested download, a status message is displayed, saying "preparing to download [asset name]" with the spinner to its right. Once URL is received from the server, an OS-native save dialog should appear and the status message should be cleared.

It is possible that the user requests to download and asset while also uploading other assets. In this case, the status messages should cascade: "uploaded 2 of 4 assets . . . preparing to download flowchart.jpg . . . ."

There is an enspace between each status message. In the event that the user tries to download multiple files before receiving a URL for any of them from the server, the status message should group the requests, in a manner such as: "preparing to download 3 assets . . . ."

Then the counter should decrement as the replies are received from the server. "preparing to download 2 assets . . . ."

And when there is only one left, the system returns to sharing only the file name. "preparing to download albino-alligator.png . . . ."

If the user repeatedly clicks on the link to download a particular asset, only one request should be made until a response is received. The status message should still say that it's preparing to download a single image.

The save dialog is an OS-native save dialog. The user is able to select a location for the image, and the name of the image matches the name of the image on the server. When the user has selected a location, the download begins. There is no progress bar; we leave that feedback to the user's web browser.

The suggested file name in the save dialog should be the original file name. In the case of snapshots generated by the native interface, the asset manager names the file pxlgrb-s.ms.png, where s and ms are the number of seconds and microseconds since siemcy launch, respectively.

The format for an uploaded image is the same as it was when uploaded. The resolution of image and its meta data (EXIF, etc) should also stay intact. For snapshot images, the format is PNG and the resolution matches the resolution of the display area covered by the snapshot. The asset menu stays open after the user is finished with the save dialog (regardless of whether the response is save/cancel). The user can close the menu through the mechanisms described in the asset browser spec.

Download All Assets

The Mezzanine web application allows the user to download a collection of all the images in paramus as a .zip archive, including uploads from other users and snapshots. The images are downloaded at their full size.

The link to download all assets lives on the assets tab. It lives just to the right of the upload image files button, with 20px of padding in between. The link to "download all assets" resides next to the "[upload image files]" link, above the asset browser. The user clicks it like a normal link, which triggers a save dialog.

The text is 11px verdana in black. The default link underline is used. The text's baseline is aligned with the text in the "[upload image files]" link and the clear all assets link.

When the user clicks the link, a notification dialog appears to alert the user that the zip file is being created and the download will start automatically when the zip is ready. If the user doesn't click "okay" before the download starts, the dialog should disappear automatically. During this wait period, the status message in the tab bar should say "preparing assets for download . . . " with the animated spinner graphic to its right. In an alternative embodiment, this step is not necessary due to how the native application implements zip creation. If the zip file is ready immediately, the notification dialog is not displayed. The native application should save the zip as "dossiername.zip"

The save dialog is an OS-native save dialog. The user is able to select a location for the .zip of images. When the user has selected a location, the download begins.

The zip file should contain the images with their original upload size, format, and names. For example, if the user uploads an 800×600 pixel asset called "landscaping.jpg", they should find a jpeg image called "landscaping.jpg" to be in the zip file, and its dimensions should be 800×600 pixel image. Any DPI, camera, or meta information the image had should also be preserved. Snapshots taken in Mezzanine should have the file name and format they are assigned by the asset manager (pygiandros). The number of files contained in the zip is equivalent to the number of assets in paramus. The maximum is 54. There are no extra files in the zip.

Slide Scroller

The slide scroller provides users of the web application with a mechanism for scrolling through slides on the native Mezzanine application. The scroller doubles as a visualization of how much of the deck is currently visible on the Mezzanine displays. The slide scroller sits on the screens tab.

To the left and right of the slide scroller are arrow buttons that allow the web user to scroll to advance or retreat the deck by a single slide. The arrow to the left of the track points to the left, and will decrement the current slide when pressed. As the mouse cursor hovers over the icon, the arrow brightens to a highlight color. When pressed, the arrow darkens to RGB 49, 49, 59 and the window showing the view will slide to the left, and the main mezzanine display will adjust. If the current slide number is one, the left scroll arrow is greyed out and there is no hover highlight. Clicking the button has no effect.

The arrow to the right of the track points right, and will increment the current slide when pressed (primary mouse button click). As the mouse cursor hovers over the icon, the arrow brightens to a highlight color. When pressed, the arrow darkens to RGB 49, 49, 59 and the window showing the view will slide to the right, and the main mezzanine display will adjust. If the current slide is the last slide in the deck, the right scroll arrow is greyed out, there is no hover highlight, and clicking the mouse has no effect.

A five pixel buffer separates the arrows from the main slide scroller track.

When the user hovers over an enabled arrow, the cursor should change to the "pointer" style.

The height of the track is 22 pixels. The minimum width of the track is 4 pixels*number of slides in the deck. In general, the minimum slide number (1) appears underneath the left edge of the track. The maximum slide number appears underneath the right edge of the track. When there is only 1 slide, the number 1 appears below the center of the scroll thumb, and no additional numbers appear at the end or beginning of the track. When there are no slides, the track contains the text "no slides" in black 11pt verdana regular, centered, and no numbers appear below the track or thumb.

The cursor type in the track is "default." Nothing happens when the track is clicked, unless the user is also hovering over the scroll thumb (details below).

The scroll thumb adjusts its width to show how many slides are visible in the Mezzanine feld triptych. During pushback, the nub expands to show more slides. The left and right most edge of the nubs also have labels for the left most and right most slide on screen, respectively. The labels appear below the nub, aligned to the baseline of the labels for the scroller track min & max slide numbers. The thumb also marks the center slide with a graphical element (4px wide rectangle grey rectangle with 49, 49, 59 outline) and the slide number, in bold, below the nub.

The web user can use the mouse to click on the thumb and drag it to scroll through slides. The main mezzanine triptych will scroll with the web user. When the user hits the right or left end of the track, the nub will change size until the marker for the current slide is up against the edge of the track (see illustrations for examples of when the view includes the beginning or end of the deck).

The cursor type when the user hovers over the mouse is "move."

The pushback and slide scroller are grouped for two reasons: (1) their state is synched with the native app and (2) they both relate to the offset and zoom of the slide deck on the native app. To handle this synchronization, a middleman is responsible for taking events from these objects and passing them to the network code (and to each other), and vice versa.

Deck manager exposes methods to transmit the following events to the network code: pushback, current slide, next slide, previous slide, lock/unlock. Deck manager listens to the network code for the following events and broadcasts them: pushback, current slide, number of slides, lock/unlock, can or cannot scroll left (calculated), can or cannot scroll right (calculated). Deck manager also holds slide data, including current slide, number of slides, pushback status, and visible slide range. Deck manager filters remote events by provenance, so we don't update again after our own events.

Slide scroller updates ui, handles lock/unlock, calculates handle width, handles local sliding, and listens to slide data including current slide, number of slides, pushback, and lock status. It sends current slide and lock status messages.

Scroll button responsibilities include update ui, lock/unlock, and it listens for can/cannot scroll left or can/cannot scroll right, as well as lock/unlock. It sends message for next slide OR previous slide.

Passforward

The Mezzanine web interface provides a pointer "pass-forward" mechanism that allows the user to control a native HandiPoint from their own mouse. The web component has visual representation for all three felds of the Mezzanine triptych, and also a buffer region for off-feld HandiPoints. The web user can use pass-forward to access much of the functionality of the native interface. Pass-forward is accessible from the screens tab. Passforward provides Mezzanine participants access to a broad range of features through the web application, with nearly the full privileges of a wand-based pointer. Another goal is to is to make it possible to fully drive shared applications from the web browser client.

Triptych

The triptych shows a miniature representation of the three native mezzanine felds in the web browser. A bare rectangle is drawn for each feld, with a background color (RGB 49, 49, 59) that matches the native mezzanine felds. The aspect ratio and placement of each mini-feld in the web browser should match that of the native feld it represents—e.g., the aspect ratios and mullion spacing should be scaled down by the same factor, "left" feld appears on the left and "right" feld on the right, with "main" in middle, etc. The mullions and buffer regions are filled with a brighter grey/blue: RGB 119, 119, 129. The buffer region on the left and right of the triptych are each equal to one mullion width. The buffer region above and below the felds is roughly equal to four times one mullion width.

Within the wider context of the screens tab, the triptych should scale (but not stretch) to take up the maximum available width as the web user resizes his/her browser window.

The triptych also has a special region, dubbed a "delete buffer," that is used for simulating pointing parallel to the feld (in the "up" direction of the feld) to enable gestural deletion of objects in native mezzanine. The height of this region is one fourth of the buffer height above the feld, plus the area above the triptych during object dragging. The delete buffer does not have visual cues on the web client; but the normal delete feedback appears in the native application when the web user drags their mouse in this area while dragging an object.

The triptych is shown in the attached image, [web-triptych-01.png] annotated, and all mini-felds are annotated (these labels should not appear in the interface and are for reference only). The triptych has a title in its upper left-hand corner. The text is:—verdana 13px bold in RGB (242, 242, 242) (not pure white, so it doesn't compete too much with other white text on the page)—20px from left edge of the page (such that it lines up with the "pointer" and "screens" text)—22px from the top of the triptych area.

Handipoint Acquisition

The native mezzanine application designates a HandiPoint for the user when she or he joins a session. That HandiPoint assignment includes the designation of a color to represent the user, and also a quadrant outside of the cursor where the color designation is located.

Handipoint Control

The user can control their HandiPoint when the mouse cursor is over the triptych area. A HandiPoint appears in the same relative location on the main mezzanine feld. When the user clicks and releases the primary mouse button within the bounds of the triptych, harden and soften events are generated for the native HandiPoint (respectively).

When passforward is active, an identifying mark is displayed outside the bounds of the user's mouse cursor. The color and location of the identifier match the identifier on the native HandiPoint for that user (in the RGB sense of the word "match"). In css styles, the cursor is the default cursor.

If the user drags the mouse out of the triptych area, it should dim and display a message encouraging the user to move the cursor back. That message says: "your mezzanine cursor is inactive. move your mouse here to wake it up!" The text color is RGB 242, 242, 242. It is centered over the center feld in the triptych.

When the user has the cursor over the triptych area and passforward is streaming events to mezzanine, the user can activate 1:1 pixel zoom. There's a prompt in the lower left-hand corner of the left feld that says "hold shift for 1:1 pixel zoom" in 13px verdana RGB 242, 242, 242.

Handipoint Vanish

If the user's mouse position is idle (does not change position) or out of bounds of the triptych area for more than 10 seconds, the native handipoint should vanish. An equivalent HandiPoint Vanish event should be generated on the native mezzanine side of things.

The web client loses its claim to a native mezzanine handipoint when the native application deems the web client is no longer active. The native application should periodically check on web clients to see if they are still connected. After an inactive period of 1 minute (say because the user has exited the browser, powered down their laptop, or lost network connectivity) the native application is free to assign the handipoint to another client. The web client periodically sends a heartbeat protein to the native application to let it know that it is still participating.

Features Accessible Via Pass-Forward

Features are available to web users via pass-forward as describes in this section. Alternatively stated, they are not explicitly designed or implemented for an in-browser experience. A user can drag an asset from windshield or slide to create asset in paramus. A user can drag paramus asset to windshield. The user places HandiPoint over desired asset, clicks mouse, drags. The "move" pointer intent must be selected. A user can drag paramus asset to create slide. User places HandiPoint over desired asset, clicks and holds mouse, drags to slide deck area, releases mouse to create new slide from asset. The "move" pointer intent must be selected. A user can resize asset on windshield. User places HandiPoint over desired asset on Windshield, clicks mouse and drags up (in y-direction) to make object larger, or down to make object smaller. "Resize" pointer intent must be selected. A user can move asset on windshield. User places HandiPoint over desired asset, clicks mouse, drags. The "move" pointer intent must be selected. A user can grab pixels as asset. User moves HandiPoint to desired snapshot origin, clicks mouse and drags to desired snapshot size. The "capture" pointer intent must be selected. A user can reorder deck. User places HandiPoint over desired slide, clicks and holds mouse, drags slide to new position and releases mouse to place the slide. The "move" pointer intent must be selected. A user can engage in pass-through. User moves HandiPoint and clicks as needed over pass-through-enabled DVI feed. User cannot use pass-through to user's own laptop. The "pass" pointer intent must be selected. A user can delete slide from deck or delete asset from windshield. User drags element toward top of triptych region, where the geometry changes such that the "aim" of the event is pointing toward the ceiling. The "move" pointer intent must be selected. A user can full feld/unfull feld asset on windshield. User points at element, clicks, and drags mouse in the Y direction to change the size of the element, subject to all full feld detents that the native application has during scale mode. The "resize" pointer intent must be selected.

Passforward Intents & Ratcheting

The web user can ratchet through different HandiPoint intents when using pass-forward using keyboard shortcuts or a pointer mode toolbar. The toolbar has a label that says "pointer", with 22px of space above and below it. The text is 13px verdana bold in black. The pointer toolbar shows visual feedback for which HandiPoint mode is currently selected, and also provides the user with buttons to change to other modes. The toolbar is essentially a collection of radio buttons: only one item in the set can be selected at a time.

Each button is a 51px rounded square button, with a corner radius of 2px. The selected mode has a background color of RGB 49, 49, 59 and all other buttons have a background color of RGB 119, 119, 129. There is 2px of space in between buttons. The label text for each button is centered horizontally and appears at the bottom of the button area, below an icon that represents the HandiPoint mode. For sizing details, see the screens specifications. The label text is 11px verdana regular in white.

Four modes exist: move, resize, capture, and pass. Move and resize mode are selected via dropdown from the same button because they have the same handipoint graphic in native mezzanine. The mode controls how the 2d mouse coordinates are converted to 3d, and is detailed below.

The "move" control is for dragging objects and changing their location. The handipoint intent is pointing. The third location of the mouse is calculated to be in the plane of the screen, scaled to the relative location of the mouse in the bounds of the feld. The aim of the mouse is the negative of the feld norm, unless the cursor is in the "delete buffer" region, then it is (0.0, 1.0, 0.0).

The "resize" control is for scaling objects. This is an explicit mode in the web interface because it changes how the mouse coordinates are converted to 3d, but it shares the pointing intent (in the native interface) with "move" mode.

When the user presses the left mouse button, the third location is calculated to be in/out of screen, based on y-coordinate of mouse. Moving the mouse "up" constitutes moving in the opposite direction of the screen norm, moving it "down" is equivalent to moving it in the direction of the norm. Note that in this mode, mouse x and y are still are still transformed relative to over and up in the feld plane.

The "capture" control allows the user to take screen captures in native mezzanine. The pointer intent is demarcating. 3d coordinates are calculated the same way as in move.

The "pass" control is for passthrough to DVI input sources. The pointer intent is passthrough. 3d coordinates are calculated the same way as in move.

Keyboard shortcuts will allow the user to jump to a particular state, or to ratchet forward or backward. The exact keys that need to be pressed are documented in keyboard shortcuts section.

If the user clicks and holds the mouse cursor over the arrow icon on the move/resize, a dropdown menu appears that allows them to select the other option. The interaction and visual properties are similar to the dossier options menu, except that it does not have a border, and the first option is also selectable.

On the client side, Feld Manager constructs felds representations based on join response and provides coordinate translation in between page and native. Cursor Reporter tracks/transmits local mouse events related to feld manager element and ratcheting. Handipoint Indicator supports a colored indicator that sticks to the cursor when active. It is Dependent on color and quadrant data from join response protein. On the native side, Inactivity Listener determines if a client has gone inactive and fades handipoint in/out.

Pass-Forward 1:1 Pixel Zoom

The pass-forward 1:1 pixel zoom is designed to allow web users to manipulate mezzanine objects with pixel-level accuracy. It occupies the same visual space as the triptych, as described above. It is accessible from the screens tab.

User presses & holds shift key while over the triptych area to activate 1:1 zooming, and the felds would animate to 1:1 zoom. The animation of an embodiment is less than a second in duration and with a framerate >30, and quadratic easing out. No handipoint move events should be generated while the zoom animation is in progress. When entering this zoom, the position of the HandiPoint should not change on mezzanine (the absolute position of the mouse on the laptop screen is maintained, as well as its relative location on the feld). The triptych takes up all available area below other elements in the screens tab. For examples, see attached mockups (shots are labeled "before" shift is pressed and "after").

Scrolling is not supported at full zoom; the user must let go of the shift key and move the mouse to zoom elsewhere as a substitute for scrolling. When 1:1 zoom is activated, a text label says "1:1 zoom" in 11pt verdana RGB 242, 242, 242. It is 30px to the right of the triptych title (exact title text pending). The baseline of the label is aligned to the baseline of the triptych titled. The user must have their cursor over the triptych area to activate 1:1 pixel zoom. The prompt, hold shift for 1:1 pixel zoom, only appears when the user can activate 1:1 pixel zoom (the cursor is over the triptych). The label should appear and disappear with a smooth transparency animation (less than half a second, let's say).

When 1:1 pixel zoom is activated, the "clear windshield" link should disappear.

To deactivate 1:1 pixel zoom, user releases shift key. Web triptych sizes and locations return to their pre-zoom size & location. On the native end, the cursor jumps to its new location, based on its relative position when the triptych has finished resizing. When 1:1 zoom is deactivated, the "1:1 zoom" label expands to say "hold shift for 1:1 pixel zoom". When 1:1 pixel zoom is deactivated, the "clear windshield" link should reappear.

The class FeldManager resizes and repositions feld container when shift is held while the user is on the screens tab. It also readjusts coordinate translation to account for changes in zoom. A percentage-based based dimensions and positions is used for each feld so that only the parent containers needs to be resized. Cursor Reporters asks Feld Manager for coordinate translations for mouse events. It ignores the zoom state.

Web Client—Pushback

Mezzanine web application users can control pushback on the native mezzanine system with this feature. Web pushback is limited to toggle—web users can only set to "full zoom" or "locked" states, while the native application has a richer range of motion.

Web Client Download

The Mezzanine web application allows the user to download the current deck of slides as a collection of images on their laptop. The slides are downloaded at full feld resolution.

The link to download all slides lives on the screens tab. It is above the slide scroller and grouped with the clear all slides link (as a group, both links are aligned to the left edge of the page). The download link appears to the left of the clear all slides link, and to the right of the upload slides link.

The link to "download all slides" resides above the slide scroller. The user clicks it like a normal link, which triggers a save dialog. The text is 11px verdana in black. The default link underline is used. The text's baseline is aligned with the "slides" label above the slide scroller.

When the user clicks the download link, a notification dialog appears to alert the user that the zip file is being created and the download will start automatically when the zip is ready. If the user doesn't click "okay" before the download starts, the dialog should disappear automatically.

During this wait period, the status message in the tab bar should say "preparing slides for download . . . " with the animated spinner graphic to its right.

If the user has also requested to download all assets and there is currently a status message for that, the status message for each pending download should collapse into "preparing downloads . . . " until one of the requests is fulfilled.

Depending on how the native application implements zip creation, it may not be necessary to have this step. If the zip file is ready immediately, the system does not display the notification dialog.

The save dialog is an OS-native save dialog. The user is able to select a location for the .zip of images. When the user has selected a location, the download begins. There is no progress bar. The default name for the archive in the save dialog is [dossier name].zip.

The zip file contains a PNG file for each slide in the deck, at full feld resolution. The slides are named in a way that preserves the order of the slides in the deck. Each slide is called Slide-###.png, where ### is the slide's position in the deck, with leading zeros as needed to make the number 3 characters. For example, slide number 1 would be Slide-001.png, slide 78 would be Slide-078.png, and slide 101 would be Slide-101.png.

If there are no slides in the deck, the user is presented with an error dialog. The title of the dialog is "error downloading slides" and the message body is "the deck is currently empty. there are no slides to download."

Web Client Clear all Slides

The Mezzanine web application allows the user to clear/delete all slides in the current deck. A confirmation dialog is displayed to minimize the risk of the user accidentally deleting all slides.

The link to clear all slides lives on the screens tab. It is above the slide scroller and grouped with the upload slides and download all slides links (as a group, all links are baseline aligned). There is 22px of space between the left edge the clear all slides link and the right edge of the download all slides link.

When the user clicks the link, a confirmation dialog is shown. The dialog asks the user if they are sure they'd like to delete all the slides, because the action is irreversible. The button options are "don't delete" to cancel the action and "delete all slides" to confirm the deletion. When the deletion is complete, there are 0 slides in the deck. Pending slide uploads are canceled when the deck is cleared; see asset upload spec for more details.

If any slides are being uploaded to the deck when the web application requests to clear the deck, those slides should no longer appear in the deck and the upload feedback in the native mezzanine app should disappear.

Web Client Upload Images

Web application users can upload assets and slides from their laptops. This feature can be used to upload a new deck of slides, populate paramus, or both.

The user can access the image uploader from both the screens tab and assets tab. When accessed from the screens tab, the image uploader is a slide uploader and optional asset uploader. When accessed from the assets tab, the image uploader is an asset uploader and optional slide uploader. Supported image upload formats are PNG, JPEG, TIF, and GIF (no animations are rendered, however). When slides are added, they are appended to the end of the deck.

From the screen tab, the user can click on a link to upload slides. In the file dialog (described below), the user can also select to upload as images to paramus. From the assets tab, the user can click on a link to upload images. In the file dialog (described below), the user can select to also upload the images as slides.

If the client's browser supports Flash, clicking on the "upload image files" link immediately takes them to an OS-native file dialog. When the user has selected files for upload, they are next taken to an intermediate dialog that allows the user to refine his/her selection or add more files. The files selected in the OS-native dialog populate a list in the custom file dialog. The list has a white background with a 1px RGB (128, 128, 128) border around the entire list. Each item in the list is separated by a horizontal 1px RGB (179, 179, 179) that is flush with the edges of the box. Only the short name of the file is shown. The text in the file list is 13px verdana in black. The file names are 11px from the left edge of the list border. A link (underlined, 11px text in verdana) to remove each file is aligned to the right edge of the list, with 30px of space between the text and border [bz #2067]. The list has enough vertical space to accommodate 6 file listings; if there are more than six files to list, a scroll bar should appear on the right edge of the list. File name and remove link should be baseline aligned.

The flash-enabled dialog allows the user to click on a link to add more images. This opens another OS-native file dialog for the user to select additional files. These additional files are appended to the end of the current list.

If the client's browser does not support Flash, clicking on the "upload image files" takes them directly to the custom file dialog. It is pre-populated with a single HTML file input selector, and a link that allows the user to add more file selectors.

A custom dialog presents the user with an option to browse for files on their local machine to upload to the native mezzanine application. The dialog has a standard file selector: a text box with a browse button next to it. The browse button is custom styled to match other mezzanine buttons. The user clicks on the "browse . . . " button to access an OS-native dialog for file selection.

HTML file input fields are added one at a time when the user clicks on the "add another image" link, located below the last file browser. The link animates down and makes way for another file selector (the boundary of the dialog box should grow to accommodate this). There is also a "remove" link next to each file selector, so the user can deselect unwanted files.

If the user wants to add a certain number of images, the custom upload dialog grows vertically (from the bottom) to accommodate them all. When the dialog is too big to fit within view, the browser scrollbar should allow the user to scroll down to add more files.

The custom dialog box also has a custom check box for affirming that uploader should "also add each image to asset palette" (when in the screens tab), or that the uploader should "also create a new slide for each image" (when in the assets tab).

The "also . . . " checkbox is a 12px square with 2px rounded corners. When unselected, the box is empty and its contents match the background color of the dialog. The outline around the box is 1 pixel wide in RGB 49, 49, 59. When selected, the rounded rectangle is filled with RGB 119, 119, 129, and a white X appears in the middle of the box. The checkbox is vertically centered with the adjacent text. There is a space character separating the checkbox and its label. There is an empty "line" of text above and below the checkbox. It appears above the dialog buttons. The user can toggle the checkbox by clicking on the box itself or the text to its right. The user must click and release the left/primary mouse button over the box and/or the text for the toggle to take effect. There is 5px of padding around the checkbox. There is no padding around the label.

In both implementations (flash and non-flash), selection order should be preserved—e.g., the first image in the list should be appended to the deck or paramus first, and the last image (bottom) selected should be appended to the deck or paramus first.

Below the list of files, a label explains how many files the user has selected for upload. The text is 13pt verdana regular in RGB (102, 102, 102). It is 26px to the right of the "add more images" or "add another image" link and baseline aligned with that link. When no files are selected, the file count text says "no files selected" and the upload images button is disabled.

The user is updated as to how many of their files have reached the server. When an upload is in progress, a small message appears in the tab bar to the right of the last tab to indicate how many files have made it over the wire. The message text is 11pt verdana in white, with 22px (2.0em) of horizontal space between it and the last tab. The message is accompanied by the spinning circles graphic on its right. The message should disappear 3 seconds after the last file makes it, and the spinning graphic should disappear when no transaction is in progress.

File uploading is non-blocking. The user should be able to switch tabs, use pass-forward, etc while uploading files. The upload feedback should remain even when the user switches tabs.

When the user receives an error that a file (or files) couldn't be uploaded, the status message should be updated immediately to show the new total number of images that will be uploaded.

If the user fires off a second (or third, or fourth, etc . . . ) batch of images to upload before the initial request finishes, the total number of images are aggregated in the status text. However, the native application acknowledges each upload as distinct, so that the order of each batch is preserved. The aggregated status message remains until all uploads are complete, or an error condition is met.

Mezz support upload of png, jpeg, tif, gif, and other image formats that are readable by ImageMagick's convert command. Images are converted to PNG (yovo-ImageClot-friendly format) for rendering in siemcy. The same PNGs are shared with the web client.

The user is presented with a notification dialog for the following error conditions. If the file (or files) fail to upload (network troubles), or in case of an upload timeout, the native application will generate an error in this case. The native application timeout is 45 seconds for a batch of uploads. That is, the native app starts counting when a request to upload is received. When it sends back the list of UIDs for the requested assets, it starts a timer. As images from the list of UIDs come in, the timer is reset with the receipt of each new image. When the native application detects that an upload times out, it cancels upload all of pending uploads from the same initial upload request (the error protein sent to the client includes the list of UIDs for the canceled uploads). Uploads from subsequent requests from the same user are not canceled. In the event that the client becomes disconnected from Mezzanine, it should also have a timeout after which it stops trying to upload the batch of images. This should be slightly larger than the native application timeout.

Too many assets or slides triggers an error. The native application should generate an error protein if the requested number of slides and/or assets cannot be accommodated. An example error message comprises a title, body, and user action. In an example case, when the deck is full, the title is "Deck Full," the boreads "Sorry! The following images cannot be added to the slide," and the user action option is "dismiss." Other examples are when the asset bin is full, or when the deck and asset bin are full. The native application sends an error like this on a per-file basis; the timeout counter should still be reset for the batch in the case of this type of failure. this could be an image format that is not supported, or another file type that is not an image at all.

An error is triggered when the file (or files) uploaded have corrupted image data. This includes if the file appears to be a supported image type the data has been corrupted. The error should be displayed to the user on a per file basis. The upload timeout counter should be reset when an error like this occurs.

An error is triggered when a file is too big. An error is triggered when paramus is cleared while assets are being uploaded.

An error notification should appear to alert the user about any files that are not uploaded as the result of paramus being cleared. Clearing paramus cancels any pending uploads to paramus, but should not disrupt slide uploads. If this causes the remaining number of images to change, the status message should be updated immediately. The native application will send an error protein if clearing paramus causes any uploads to be canceled. uploads will only be canceled if they are not also being uploaded as slides.

An error is triggered if the deck is cleared while slides are being uploaded. An error notification appears to alert the user about any files that won't be uploaded as the result of the deck being cleared. Clearing the deck cancels any pending image uploads to slides, unless those uploads are also going to paramus. If clearing the deck causes the remaining number of uploads to change, the status message should be updated immediately. The native application will send an error protein if clearing the deck causes any uploads to be canceled. Uploads will only be canceled if they are not also being uploaded to paramus.

When the user clicks the upload button, the system detects whether or not use the flash uploader. Regardless of the implementation, the user goes about selecting files to upload. Upon clicking the button to commence the process, a request goes out for a number of uids. When the list of uids come back, the system checks whether it has all the uids that were requested. If less than the requested, a dialog pops up to inform the user that some assets will not be sent. When the upload process commences, proteins are attached to each image for transmission. The status reporting how many images that are to be sent is continuously uploaded throughout the process with respect to the algorithms outlined above. At the native side, the binary data is serialized and sent to the asset manager. Upon receiving the binary data, the native emits a paramus-status protein to inform the Clients of the newly uploaded Asset.

Each instance of the non-flash uploader has a two-tiered structure. The top level iframe on the upload dialog corresponds to a specific invocation of the dialog itself. It has a separate iframe inside it for each file to be uploaded, thus ensuring that each file transits on a separate post, mitigating aggregated timeouts that may be invoked by parts of the stack that are not controlled.

Web Client—Select Video Source

The user can access the video tab to configure the four video slots available in Hoboken in the native Mezzanine application. By default, when a user creates a new dossier, the four video slots are mapped to the four local DVI connections. If an administrator has configured other video sources, the user can select other, possibly remote, video sources using the dropdown menu below each video thumbnail. A user may want to configure the videos, for example, for streaming remote webcams. In one such scenario, Mezzanine users would like to video conference with a remote co-worker that has a webcam. The local system administrator has configured mezzanine such that the remote co-worker can stream video via pool.

A dropdown menu of configured video sources appears below each video thumbnail. The dropdown menu is a standard OS-native component (a standard HTML select widget) with a list of available video sources. The list is populated with video sources that have been added by the administrator via the web admin configuration application. The user clicks on the collapsed list to expand it and clicks an option to select. The width of the drop down menu matches the width of the video thumbnail above it. There is half an em of space between the video and dropdown. The text is in the dropdown should be verdana 11pt.

Once the user selects a video source, an overlay appears over the video thumbnail saying that it is being changed to a new source. The dropdown menu is grayed out. The spinner graphic appears next to that message. When the native mezzanine application confirms that the video source has been changed, the overlay disappears. The dropdown menu is no longer grayed out.

Once connected, the thumbnail should update. If the video source is found but not actively streaming, a placeholder image should be displayed. The place holder image says "video one" if it's the first video, "video two" if it's the second video, and so on.

If for some reason Mezzanine refuses to change the video source, an advisory is sent back to the web client and a notification dialog is displayed. This scenario might be possible if the administrator deletes the video source while the user is trying to select it. If the web client does not hear back from mezzanine within an allotted period of time, an error is displayed to the client.

The web application should periodically update the list of available video source, so that the user can select new resources added by the administrator without reloading the application.

Web Client—Audio for Videos

From the video tab in the web application, the user can adjust the audio volume of video feeds appearing in Hoboken in the native mezzanine app. The volume can be adjusted individually for each video feed.

Audio control is accessed by clicking on the audio button overlayed on the video thumbnail. The style of the button is similar to the text buttons, but it has an icon in the center instead of text. When the button is pressed, a slider appears above the button. The user can grab the slider nub, a 19×12px rounded rectangle (2px corner radius) and drag it to adjust the audio of the video feed. Dragging the nub upwards increases the volume, while dragging it down decreases the volume (all the way down is mute). The fill color of the nub is RGB 119, 119, 129 and the outline color (1px border) is RGB 49, 49, 59. The mouse cursor type over the nub is the "move" cursor.

The top edge of the slider track is the maximum volume, and the bottom most edge is mute. The height of the track is 86px. Its width is 6px and it also has a 2px rounded corner radius. Its fill color is RGB 204, 204, 204. The slider is enclosed in a rounded (2px radius) rectangular region with a 1px border (RGB 49, 49, 59). The fill color is RGB 242, 242, 242. The width of this region matches the width of the button that triggers the slider. The height of this region gives the slider track 11px of space above and below.

The user dismisses the audio control by clicking the mouse anywhere outside of the slider area, or by clicking on the audio button again. The icon on the audio control changes as the volume changes. When the audio is muted, the icon should visualize that no sound is coming out. When the volume is on, the icon should show that audio is playing. Not all video feeds will have audio. In an embodiment, video feeds without audio should not show the audio control at all. Otherwise, it is acceptable for the audio controls to show, but using them is effectively not accepted.

Web Client Video Thumbnails

The video thumbnails help the user identify which video feeds they are connected to, or if they have found the correct video feed. The native Mezzanine application allows for streaming from four different video sources to be displayed in the Hoboken region below the slide deck. From the video tab in the web application, the user can view thumbnails of the four video feeds and control the volume or source for the video stream. The thumbnails help the user know which video they are adjusting the volume for, or confirm that they have selected the correct video source.

In an embodiment, there are four video slots. When the selected video source is unavailable or not streaming, the thumbnail is a place holder image that says "video one" or "video two", etc, depending on which slot the video resides in.

Dependencies include native quartermaster thumbnails.

End Session

The web user can end their session by closing the browser window or tab. This does not affect other users who are still logged in. If the user returns to the mezzanine website, it will be like they are arriving for the first time. They will be sent to the screens tab (assuming a session is still in progress), or the dossier portal if the dossier has been closed since they closed their window.

Summary of Dialogs

The Mezzanine web interface has notification and confirmation dialogs to alert the user about errors and to confirm destructive actions like deleting an entire deck of slides. Another input dialog type provides a single line of text input, for an action such as naming a dossier. Wait dialogs block the user from taking any action while large operations are taking place (such as loading a dossier or clearing all assets).

Dialog Box Components

In general, the dialog box is a custom design and prevents all other activity on the mezzanine page until it is answered. It does not, however, prevent the user from switching to another tab in the browser. A transparent grey image (or div) is stretched to cover the mezzanine web app and the dialog appears above that image (effectively, the rest of the page is greyed out and the user cannot interact with it until canceling the dialog).

The visual properties of the dialogs are now described. The title bar is RGB 49, 49, 59. The background color for the rest of the dialog area is RGB 242, 242, 242 (the same color as the active tab background). Buttons are aligned to the bottom right of the dialog box. If there are multiple buttons, they appear in a horizontal line. The four corners of the dialog are rounded with a 2px radius and a 5px drop shadow makes the dialog pop above the rest of the page. There is a 1 pixel border around the entire dialog box, in RGB 179, 179, 179. The drop shadow is a nice to have; if it takes too much time to implement, it can be dropped. A spacing of 11px exists between the buttons and the edges of the dialog box.

Dialog boxes are positioned in the horizontal and vertical center of the web page. The default width for all dialogs is 403px (31.0ems when the text size is 13px).

Dialog Type

Four dialog types are: (1) notification that has a single button ("okay")m (2) confirmation dialog that lets the user cancel or confirm an action, (3) text input dialog, and (4) wait dialog, which has no buttons, and appears when the user is not allowed to interact with the mezzanine web application while an action completes.

The notification dialog lets the user know about a problem or change in status, for example, "the current session has ended." It has only one button, and the button says "okay". A line and a half of empty text (13px*2=26px of space) exists above and below the notification message (that is, 26px of vertical space between the title bar and the message text, then 26px of vertical space between the bottom of the message and the okay button). The attached example [notification-dialog-01.png] shows a notification dialog that would be displayed when another user logs out of a session.

The confirmation dialog is just like the notification dialog, except that it presents the user with a choice between two possible outcomes. The dialog asks the user to confirm an action or cancel. The left button cancels the action and the right button confirms the action. There two lines of empty space (26px of space) above and below the confirmation message (in other words, 26px of vertical space between the title bar and the message text, then 26px of vertical space between the bottom of the message and the okay and cancel buttons).

The text input dialog allows the user to enter a single line of text. The prompt/label appears above the text box, and is left aligned to the edge of the dialog box (with 11px/1.0em padding). The text field spans the entire width of the dialog, with 11px of space on either side. Typically the text area is populated with a name. The user has two options: cancel and complete text input: affirmative text is customized for the appropriate context.

There are two lines of empty text (26px of space) above the input label and below the text input box (in other words, 26px of vertical space between the title bar and the input label, then 26px of vertical space between the bottom of the text field and the okay and cancel buttons). FIG Web Dialog Summary 2 shows a text input dialog that appears when the user creates a new dossier.

The wait dialog blocks the user from taking any action while a lengthy or exceptionally destructive operation is taking place. It provides a message about what's happening, with a little moving graphic that shows something is in progress. The graphic does not address how much progress has been made; it just animates to show work is being done. The graphic is a set of three circles spinning around in a circle.

There are two lines of empty space (26px of space) above and below the wait message (in other words, 26px of vertical space between the title bar and the message text, then 26px of vertical space between the bottom of the message and the bottom of the dialog). A wait dialog contains no buttons; the application should close the dialog when the pending operation has completed.

Text Buttons

Several of the features in Mezzanine web interface make use of a standard push-button. The button is a reusable component that appears in notification dialogs, toolbars, and the dossier portal. It is a rounded rectangle and has a text label. An embodiment may use a Javascript UI toolkit. The style guide is described here.

The default font for the buttons is verdana 11px regular, in white. The button is a rounded rectangle with a 2px corner radius. The default button border is a 1px solid RGB 49, 49, 59 line. The default fill color is 119, 119, 129. When the user hovers the mouse cursor over the button, the fill color changes color, and the css cursor style changes to "pointer." The highlight color will be chosen at a later date and will be consistent with other web UI components.

When the user clicks on the button, the fill color changes to RGB 49, 49, 59. It stays this color as long as the user keeps holding the mouse button over the button area. The text color does not change.

A button is disabled when it should not be clicked on. When the button is disabled, the label text changes color to RGB 128, 128, 128. The outline color and fill color are RGB 179, 179, 179 and RGB 230, 230, 230, respectively. In this state, the cursor should not change to "pointer" over the button because the button cannot be pressed.

The button should size itself to fit all text, with 1.0em of space between the label and all sides.

A button widget, supporting styles and handles state for a button, can be disabled/enabled; it also can be invoked for dialogs.

Web Client—Secure Session

Web client users attempting to connect to a locked Mezzanine session must provide the session passphrase.

If the web client attempts to join a locked session, the Session Passphrase Form is shown. The form contains a brief message explaining itself, a single, three-character field for the passphrase, and a submit button. Submitting the correct passphrase removes the form initializes the application. Submitting an incorrect passphrase displays an error and allows the user to retry. While the session passphrase form is visible no other features of the web client are available.

If a web client is connected to a non-secured session, and that session later becomes secured, the client is booted to the Provide Passphrase Form, regardless of the current application state.

An embodiment includes the ability to lock and unlock a session directly from the web client. This functionality will be provided within the Mezzanine menu, which is described in a section on "this session" in the web client.

Web Authentication

Web participants sign in with a username and password. Authenticated web clients can use the Web/Private Dossier feature, as described herein. The description of private dossiers in the security section provides more information on the authentication model.

Sign In

Sign in functionality becomes available after a client has successfully joined a Mezzanine session, and is accessible from both portal and dossier views. A user signs in by supplying a username and password. If authentication succeeds, the client enters the authenticated state. If not, they are notified of the failure and the client remains in the non-authenticated state. The error message comprises a summary and description. In an embodiment the summary reads "Unable to Log In," and the description reads "Incorrect username or password||Authentication server unavailable."

Identity/Sign Out

When the client enters an authenticated state, the Sign In UI is replaced with the current username and sign out button. Upon completing a Sign Out, the client returns to a non-authenticated state.

Revoking Authentication

If the native decides to sign out a particular provenance (possibly due to inactivity), that client will be removed from the authenticated state. The system explains why the user has been removed.

Persistence

If the client is in an authenticated state and the page is reloaded in the same browser (either via a refresh or at a later date), assuming they have not been de-authenticated on the server, they are automatically signed in.

Web Client—Connecting to Mezzanine

The web client provides feedback so that users can determine the status of their attempt to connect to Mezzanine.

The Join Screen is visible while the client is waiting for a join response from its native Mezzanine.

The No Connection to Mezzanine Screen explains that the web client cannot connect to a Mezzanine and offers the chance to retry joining. It is shown in case of a join timeout or a heartbeat timeout. A join timeout occurs when the client has not received a join response after 45 of sending a join request. A heartbeat timeout occurs when the client has not heard a Mezzanine heartbeat in 75 seconds.

Anytime Mezzanine starts all clients, regardless of join state, reload the page completely.

If a web client attempts to connect to a Mezzanine that already has the maximum number of web clients connected, the Session Full Screen is displayed. A join button provides the ability to send a new join request.

The Passphrase Required Screen is described in a section on web client secure sessions.

Web Client—This Mezzanine

Each web client connects to its "host Mezzanine," which resides on the same system from which the web page is served. The web client refers to the host Mezzanine as "This Mezzanine."

The This Mezzanine Summary appears in the Header Toolbar while the web client is connected to its host Mezzanine. It displays text, which in an embodiment is:

THIS MEZZANINE sMEZZANINE_NAME

If m2m is enabled, $MEZZANINE_NAME is the m2m name field for the host Mezzanine. If not, it displays the host name of the mezz system. Clicking the This Mezzanine Summary reveals the This Mezzanine Dropdown, comprising a title and additional information. The title in an embodiment is "THIS MEZZANINE." The dropdown also provides information on on m2m profile, secure session, mzReach link, and streaming format control.

If the host Mezzanine has m2m enabled, its metadata is shown in the following form:

Mezzanine Name

Company

Location

A button labeled "unlocked" or "locked—<passphrase>" indicates the secure session state of the host Mezzanine. Clicking the button toggles the passphrase. A client that activates the passphrase is exempted from being booted to the secure session prompt, which is described in a section on the web client's secure session.

A "Download MzReach" link to the MzReach Splash Page provides downloads for the MzReach Client. Streaming format control comprising a label and radio buttons lets the user adjust the format of stream of the native interface. In an embodiment the label indicates "Streaming Format," and the radio buttons are "Triptych composite" (not displayed for single-feld systems), "center screen," and "no output."

Web Client—Summary of Dialogs

The Mezzanine web interface has notification and confirmation dialogs to alert the user about errors and to confirm destructive actions like deleting an entire deck of slides. Another input dialog type provides a single line of text input, for an action such as naming a dossier. Wait dialogs block the user from taking any action while large operations are taking place (such as loading a dossier or clearing all assets).

Dialog Box Components

In general, the dialog box is a custom design and prevents all other activity on the mezzanine page until it is answered. It does not, however, prevent the user from switching to another tab in the browser. A transparent grey image (or div) is stretched to cover the mezzanine web app and the dialog appears above that image (effectively, the rest of the page is greyed out and the user cannot interact with it until canceling the dialog).

The visual properties of the dialogs are now described. The title bar is RGB 49, 49, 59. The background color for the rest of the dialog area is RGB 242, 242, 242 (the same color as the active tab background). Buttons are aligned to the bottom right of the dialog box. If there are multiple buttons, they appear in a horizontal line. The four corners of the dialog are rounded with a 2px radius and a 5px drop shadow makes the dialog pop above the rest of the page. There is a 1 pixel border around the entire dialog box, in RGB 179, 179, 179. The drop shadow is a nice to have; if it takes too much time to implement, it can be dropped. A spacing of 11px exists between the buttons and the edges of the dialog box.

Dialog boxes are positioned in the horizontal and vertical center of the web page. The default width for all dialogs is 403px (31.0ems when the text size is 13px).

Dialog Types

Four dialog types are: (1) notification that has a single button ("okay"), (2) confirmation dialog that lets the user cancel or confirm an action, (3) text input dialog, and (4) wait dialog, which has no buttons, and appears when the user is not allowed to interact with the mezzanine web application while an action completes.

The notification dialog lets the user know about a problem or change in status, for example, "the current session has ended." It has only one button, and the button says "okay". A line and a half of empty text (13px*2=26px of space) exists above and below the notification message (that is, 26px of vertical space between the title bar and the message text, then 26px of vertical space between the bottom of the message and the okay button).

The confirmation dialog is just like the notification dialog, except that it presents the user with a choice between two possible outcomes. The dialog asks the user to confirm an action or cancel. The left button cancels the action and the right button confirms the action. There two lines of empty space (26px of space) above and below the confirmation message (in other words, 26px of vertical space between the title bar and the message text, then 26px of vertical space between the bottom of the message and the okay and cancel buttons).

The text input dialog allows the user to enter a single line of text. The prompt/label appears above the text box, and is left aligned to the edge of the dialog box (with 11px/1.0em padding). The text field spans the entire width of the dialog, with 11px of space on either side. Typically the text area is populated with a name. The user has two options: cancel and complete text input: affirmative text is customized for the appropriate context.

There are two lines of empty text (26px of space) above the input label and below the text input box (in other words, 26px of vertical space between the title bar and the input label, then 26px of vertical space between the bottom of the text field and the okay and cancel buttons).

The wait dialog blocks the user from taking any action while a lengthy or exceptionally destructive operation is taking place. It provides a message about what's happening, with a moving graphic that indicates an action is in progress. The graphic does not address how much progress has been made; it just animates to show work is being done. The graphic is a set of three circles spinning around in a circle.

There are two lines of empty space (26px of space) above and below the wait message (in other words, 26px of vertical space between the title bar and the message text, then 26px of vertical space between the bottom of the message and the bottom of the dialog). A wait dialog contains no buttons; the application should close the dialog when the pending operation has completed.

Web Client—Corkboard

Web users are able to view and alter the content of Mezzanine corkboards.

Layout

When a Mezzanine has corkboards connected, the corkboard list of is displayed to the right of the slide/windshield area. Since the corkboards are displayed as a list without spacial context, each one displays its name and corkboard channel id.

Each corkboard appears as a 9:16 box. When a corkboard has content, that content is inscribed inside the corkboard. The images displayed should not be pillar or letter boxed as asset and slide images are.

Corkboard Actions

To clear a corkboard, the user drag a corkboard's content to the deletion zone. (This differs from the native experience, where only a drag anywhere outside the corkboard will clear it.)

To copy an asset to the corkboard, the user drags it there. Slides also can be place onto the corkboard. A corkboard can be "swapped." Dragging a corkboard's content onto another corkboard replaces overwrites the latter's content and clears the former's.

Web Client—Whiteboard

Web users can request a whiteboard image capture. If the native mezz has a whiteboard attached to it, discovery occurs via a mez-caps protein. A 'Capture' button will appear in the asset panel. Clicking this button displays a dropdown containing a list of buttons, with one for each whiteboard. An embodiment supports one whiteboard. Clicking on a whiteboard button sends a capture-whiteboard request. The list disappears, and the Capture button is replaced with a spinner until the capture-whiteboard response is received. The whiteboard has a 30-second timeout.

Web Client—Portal

Similar to the portal in the native app, the web client portal provides access to a Mezzanine's dossiers, and on m2m systems, to collaboration management features. It is visible only when there is no open dossier. It contains a dossier browser, as well as mezz to mezz management on m2m Mezzanines (both of these are described in other web client sections).

Only the Dossier Browser or Mezz to mezz section is visible at one time. Clicking the title of the either section in the panel header hides the current section and reveals the other section.

Web Client—Dossier Browser

The Dossier Browser allows web users access to the dossiers on a Mezzanine system.

Dossier List

The dossier browser consists of a single dossier list, which contains different dossiers depending on the authentication state, described in another web client section. Authentication states are not signed in, signed in, and signed in as administrator. "Not signed in" comprises all public dossiers. "Signed in" comprises only dossiers belonging to the signed in user. "Signed in as administrator" comprises all dossiers on the system.

The user clicks on a sort criteria in the portal panel to sort the dossier lists by name or by date modified. The user clicks the same option again to reverse the sort order. When an administrator signs in, a third sort option of "owner" is available.

Creating A Dossier

The user clicks the "create" button n the portal panel to prepend a placeholder dossier to the dossier list with a "Create" banner. The name field for the dossier defaults to: {dossier YYYY-MM-DD HH:mm:ss}. Clicking cancel or clicking anywhere outside the dossier cancels the creation. Clicking create sends the request and gives the dossier a "Creating . . . " banner that is removed when the response is received. The new dossier will belong to the currently signed in user, or will be public if no user is signed in.

Uploading A Dossier

The user clicks the "upload" button in the portal panel to open a native upload dialog. Upon selecting a dossier and confirming the dialog, the upload button is replaced with text "Preparing Upload." When the upload beings, the text changes to "Uploading (% percentage) Cancel." If cancel is clicked, the text changes to "Canceling Upload." When the upload has completed or finishes cancellation, the original button replaces the status text. The uploaded dossier will belong to the currently signed in user, or will be public if no user is signed in. In an embodiment the ui indicates progress and lets the user know when the upload is complete.

Dossiers

Dossiers mimic the style from the native interface: a long rectangle with an image of the first slide on the left and the dossier title and the modified date on the right. In addition, the owner of the dossier appears beneath the modified date.

Dossiers display a banner while they are in current states to provide context about the action being undertaken. They are also used to display waiting feedback.

A number of contextual dossier options are available for each dossier. Clicking the dossier once exposes a drawer from the bottom of the dossier, which contains the options open, rename, duplicate, and delete.

Dossiers can be opened by clicking the open button inside the dossier options menu (or by double clicking the dossier item). Upon receiving the "will-open-dossier" message all web clients fade the entire portal except the dossier about to be opened and the dossier receives an "Opening . . . " banner. If the currently opening dossier is out of view, the portal scrolls so that it is.

Clicking rename from the dossier options menu puts the dossier item into renaming mode. Renaming mode displays a "Rename" banner and replaces the dossier name with a focused text field containing the current dossier name. To submit a value, the user presses enter. Upon submit, a rename-dossier protein request is sent, the dossier item exits renaming mode and a "Renaming . . . " banner is displayed until the response is received. To cancel the user clicks anywhere else on the page, presses tab, and presses escape. Upon cancel, the dossier item exits renaming mode and the original name is restored.

Clicking duplicate from the dossier options menu displays a "Duplicate" banner on the dossier. The user may fill in a desired name for the new dossier or use the default: "<old name> duplicate". "Duplicate" and "Cancel" buttons sit beneath the input. Clicking the cancel button on the dossier or clicking anywhere outside the dossier cancels. Clicking the duplicate button on the dossier sends the duplicate request and displays a "Duplicating . . . " banner. When the dossier is duplicated, it is appended in the dossier list in the correct position according to the current sort mode. If the web user is signed in, the new dossier will be owned by that web user; if not, it will have no owner.

Clicking download dossier sends a download dossier request and displays a "Preparing . . . " banner until the response is received. When the path for the download is received, the download is initiated (behavior may vary by OS and browser).

Clicking delete places a "Delete" banner on the dossier and replaces the dossier details with a deletion confirmation comprising text and button. In an embodiment the text reads "Are you sure you want to delete this dossier?" and the buttons are "don't delete" and "delete." The deletion may be cancelled by clicking the "don't delete" button or by clicking anywhere outside the dossier. If "delete" is clicked, the dossier displays a "Deleting . . . " banner until the dossier is officially deleted and is removed.

Any error that occurs while editing a dossier appears as a standard error notification, which is described in that web client section.

The dossier browser displays all dossiers that the current user has access to and allows them to take certain actions with those dossiers. Depending on the user's authentication state, a number of lists may be visible in the browser. The lists are private dossier list, public dossier list, and administrator dossier list. The private dossier list reflects if there is a signed in user. The administrator dossier list reflects if the signed in user is an administrator. These lists stack vertically.

The private dossier list contains dossiers owned by the signed in user. In an embodiment its header displays the user name and "create" and "upload" options. The public dossier list contains all public dossiers. Its header displays options "public," "create," "upload," and "sign in to access private dossiers." This last option only appears if the user is not signed in.

Clicking the "create" button in the header of either the public or private dossier list prepends a placeholder dossier to that dossier list with a "Create" banner. The user may choose a name for the new dosser or use the default: {dossier YYYY-MM-DD HH:mm:ss}. Clicking cancel or clicking anywhere outside the dossier cancels the creation. Clicking create sends the request and gives the dossier a "Creating . . . " banner that is removed when the response is received.

The administrator dossier list displays a title, reading in an embodiment:

All Dossiers on this Mezzanine
You are an administrator

In the administrator dossier list, which may be lengthy, dossiers are displayed in a concise table format:

$THUMBNAIL
$NAME
$DATE_MODIFIED
$OWNER
Open
Download
Delete checkbox

When at least one delete checkbox has been checked, a button appears above the list with a label "Delete selected dossiers." Clicking this button deletes all selected dossiers.

Web Client—Upload Dossier

Downloaded dossiers may be uploaded to Mezzanine.

Mezz

The Upload Dossier Button is available from the Dossier Portal next to the Create New [Dossier] Button. When the button is clicked, an OS-specific file selection dialog appears for the user to select a file. Upon accepting a file, the Upload dossier button is replaced with an element, comprising a spinning graphic and text. In an embodiment the text reads "Preparing Upload."

When the upload begins, the system displays a spinning graphic, upload information, and a "cancel" button. In an embodiment the display is: "(Spinning graphic) Uploading $Filename ($Percentage %) Cancel." Clicking cancel stops the upload, and the system displays a spinning graphic and "Cancelling Upload" text. An alternative embodiment also lets the user view upload progress or cancel a dossier upload while in dossier mode.

When the upload completes, the upload status text is replaced again with the "Upload Dossier" button and another dossier may be uploaded. The newly uploaded dossier retains the same name of the originally downloaded dossier.

Mezz (Alternative)

The Upload Dossier Button is available from the Dossier Portal next to the "Create New" button. When the Upload Dossier Button is pressed, the browser's native upload dialog box is displayed. After selecting a file and proceeding, an UPLOAD-DOSSIER REQUEST is sent. During this time, the Upload Status Indicator (located in the right corner of the Status Bar) displays "Preparing to upload dossier" text. When the UPLOAD-DOSSIER RESPONSE is received, the browser begins to upload the file to the webserver, which places the dossiers at the path specified by the UPLOAD-DOSSIER RESPONSE.

If the UPLOAD-DOSSIER RESPONSE was an error, the upload does not begin, and a standard error dialog details the cause of the error. During a dossier upload, the Upload Dossier Button is hidden and replaced with the text "Upload In Progress." The Upload Dossier Status Indicator displays a spinning graphic, upload information, and a cancel button, comprising: "(Spinning graphic) Uploading Dossier: $FileName (% $PercentComplete) Cancel."

Upon completion of a dossier upload, the percentage field in the Upload Dossier Status indicator changes to "Verifying," and an UPLOAD-DOSSIER-DONE REQUEST is made. The response to this request will either be a NEW-DOSSIER PSA (success) or a UPLOAD-DOSSIER-DONE ERROR RESPONSE. In the case of either protein, the Upload Dossier Status Indicator is hidden, and the Upload Dossier Button is reshown. If it failed, a standard error dialog is displayed, detailing the cause of the error.

Web Download Dossier

The dossier context menu contains a 'Download' button which, when clicked, submits a download-dossier protein request. The download button becomes visually and functionally disabled during this time. In an embodiment this disabled button appears as {text-decoration: none; color: #aaa; cursor: default;} When the download-dossier protein response containing the download path is received, the user goes through the browser's native download process. If the request fails, a dialog informs the user of the reason for the failure. Either way, the download link is reenabled.

The downloaded file be nothing more than a zip of the entire dossier directory. The file will be named so: <dossier-name>.zip The native implementation will take care to ensure that:

- The archive is created even if the dossier is deleted mid-way
- New archives will only be created if the dossier has changed since the time that the last archive was created
- Native UI will stay responsive during this interaction
- Multiple clients will be able to download different dossiers at the same time without any conflict. Pygiandros will be fully occupied while creating an archive so the creation of other archives or other pygiandros operations will be delayed (similar to how download deck/paramus works today)
- In Low Storage Mode, the system tries to serve the dossier if enough space is available. However, to conserve space, this archive is not saved for later. Repeated downloads of the same dossier will be slower in low storage mode.

Web Client—Dossier

The dossier view is visible when a dossier is open. It consists of a dossier bar, a top half comprising a deck/windshield on the Dossier Workspace Area on the left and corkboards on the right, and a bottom half comprising assets on the left and video sources on the right.

The dossier bar appears at the top of the dossier view and displays in an embodiment "Dossier name." The dossier bar includes a "Close Dossier" button.

Close Dossier Confirmation

Clicking this button opens a "close dossier confirmation," which comprises a confirmation visor covering the entire area beneath the area. The confirmation visor comprises text and button. In an embodiment the text reads "Close dossier" and "Closing this dossier closes it for all users, and cancels uploads immediately." The buttons, prompting their respective actions, are "cancel" and "close dossier." Closing the dossier displays the text "Closing dossier" in place of the buttons until the dossier is closed and the visor closes.

An embodiment includes a third button "Leave collaboration," which appears if the host Mezzanine is in a collaboration. Clicking the button causes the host Mezzanine to leave its collaboration and closes the dossier for the host only.

Dossier Workspace Area

The dossier workspace area displays a representation of the current dossier's geometry. Felds from the host Mezzanine are drawn as rectangles, providing special context for the content displayed on top (slides, windshield).

The dossier's geometry can differ from that of the host Mezzanine's displays. For instance, a single feld system could open a triptych-sized dossier. In this case, the dossier workspace area would display three felds. If the dossier's geometry changes while the dossier is open, the dossier workspace area changes to reflect the new format.

Any feld of the workspace that is not visible on the host Mezzanine, or any of the participants in a collaboration, is differentiated from visible-to-all felds by being a lighter color. For instance, if a single-feld system collaborates with a triptych system, web clients for both systems will distinguish the left and right feld.

Any content that is displayed over the screen space (slides, shielders) attempts to be positioned correctly, relative to the connected Mezzanine's display of the workspace.

Scaling

The workspace area is fit so that its felds are fully visible. All felds should be completely visible. In situations where the aspect ratio of the workspace differs greatly from the container, vertical or horizontal padding will exist.

Overflowing Content

In order to take advantage of the sometimes plentiful buffer region, slides or shielders that run outside the workspace are not clipped, and may even be manipulated. Only content flowing outside of the workspace area container is clipped.

Web Client—Paramus

Paramus displays the current dossier's assets and is located in its own "Assets" tab.

Asset Options Panel

The assets options panel sits above the asset grid. It contains the elements assets header, upload, download, and clear. The assets header comprises a display of the word "Assets" followed by "(<number of assets)." The upload element opens the image uploader with a default upload type of "Assets". The download element allows the user to download all assets currently in the paramus. When clicked, a spinner replaces the link until Mezzanine return the download path for the asset. Default browser download behavior takes over at this point. The clear element allows the user to remove all assets from paramus. When clicked, a confirmation visor is displayed. When confirmed, the visor displays a spinner. If the request succeeds, the visor closes. If it fails, the visor prompts for retry.

Assets

Assets are displayed in a grid, in the same order as those on the native. The number of assets per line varies depending on the size of the window and the value of the asset size slider.

Asset Actions

Asset deletion is available via the asset context menu. Upon click, a DELETE-ASSET request is made and the asset enters a pending state. If DELETE-ASSET succeeds, the asset is removed. If it fails, a visual cue is performed and the asset returns to its normal state.

Asset download is available via the asset context menu. Upon click, a DOWNLOAD-ASSET request is made and the asset enters a pending state. If DOWNLOAD-ASSET succeeds, the asset returns to its normal state and the user is presented with a native file download dialog. If it fails, a visual cue is performed and the asset returns to its normal state.

Upon clicking the Clear All Assets button, the user is presented with a confirmation dialog. If the user accepts, a CLEAR-PARAMUS request is submitted, and all paramus enters a pending state. If it succeeds, all assets are removed. If it fails, a visual cue will indicate the cause of the failure.

Upon clicking the Download All Assets button, a DOWNLOAD-PARAMUS request is made and the button enters a pending state. If the request succeeds, the user is presented with a native file download dialog. If it fails, a visual cue will indicate the cause of the failure.

Web Client—Hoboken

Web users can view and manipulate video sources in hoboken.

Hoboken takes the form of the "Video Sources" section, located in the bottom pane, to the right of assets. Its scroll region is linked to the asset scroll region. A section on videos in the web client provides placeholder details. Dragging a video source to the deck creates a video source slide. Dragging a video source to the windshield creates a video source shielder.

Web Client—Windshield

Web users may view a dossier's windshield space, move and scale windshield elements, and clear the windshield completely. New windshield elements can be created from assets and video sources.

To toggle the windshield, the user clicks the "Windshield" button in the Slides panel to show the windshield. The deck fades partially and cannot be manipulated in this state. The user clicks the "Slides" button to switch back. The user can click either header to toggle, in order to switch quickly.

A video source shielder has the same appearance as a video source in the video source panel (hoboken). A shielder is moved by dragging it. Shielder movement is validated by the native client and will snap back in the case of invalid moves. The user drags a shielder to the deletion zone at the top of the page to delete it. To resize a windshield element the user clicks the "resize" toggle in the windshield panel, which in an embodiment is a checkbox style toggle. The system, instead of moving the elements, resizes them. "Up" corresponds to a bigger resize, and "down" a smaller one.

The user clicks "clear windshield" to show the clear windshield confirmation visor. Accepting the confirmation then clears the windshield. In an embodiment this clear windshield link is located in the top right hand corner of the triptych area on the screens tab. The link text is: −11px verdana in RGB (242, 242, 242)—baseline aligned with the triptych label −11px from the right edge of the browser (so that it lines up with the right edge of the close button, above, in the tab bar). When the user clicks the link, a confirmation dialog asks for confirmation.

Web Client—Deck

User is shown a visual representation of the native mezz's Deck when a dossier is opened. From this view, users can navigate the deck or make changes to it. The deck exists on its own tab called "Slides" in an embodiment and "Deck" in an alternative.

Deck Options Panel

The deck options panel sits above the slides and contains the elements slides header, upload, download, and clear. In an embodiment the slides header displays the word "Slides" followed by "(<number of slides>)." The upload element opens the image uploader, described in another web client section, with a default upload type of "Slides". The download element allows the user to download all slides currently in the deck. When clicked, a spinner replaces the link until Mezzanine return the download path for the asset. Default browser download behavior takes over at this point. A clear element allows the user to remove all slides from the deck. When clicked, a confirmation visor, described in a section on web interface elements, is displayed. When confirmed, the visor displays a spinner. If the request succeeds, the visor closes. If it fails, the visor prompts for retry.

Slides

Slides are displayed horizontally as in the native. The number of visible slides varies based on the state of push-back. The spacing between slides is a fixed percentage and is not representative of the spacing between slides on the native. Slide numbers are displayed below slides but are only visible when pushed back.

Video Source Slides

Video source slides have the same appearance as video sources in the web client's video source panel in Hoboken.

Slide Context Menu

A number of contextual actions are available for each slide. These options take the form of a toggleable menu. This menu is hidden by default. Hovering over the slide exposes a bit of the menu. Clicking the slide pops the menu open completely. Clicking anywhere on the screen closes the menu. Clicking any menu item closes the menu unless otherwise noted.

Slide Deletion

Slide deletion is available via the slide context menu. When the delete link is clicked, the slide enters a pending deletion mode and deletion is requested. While in this pending state, the slide context menu is unavailable, and the slide not sortable. If the request is denied, the slide exits pending mode and displays a visual cue. If the request is affirmed, the slide is removed.

Slide Download

Slide download is available through the slide context menu. Slide Reordering

Slide reordering uses destination placeholders rather than direct manipulation of the original slide. When a drag starts, a copy of the slide content is dragged, and the original stays in place. A grab-slide protein request informs the native that the client wishes to have control of the slide. While the drag helper is inside the deck, a bar shows the position that the slide will be placed in if dropped. The original slide also is slightly transparent. In an embodiment, if the cursor nears the left or right edges, the deck scrolls to allow reordering slides outside of the starting visible range of slides.

If the drag helper is moved outside of the deck, the original becomes fully opaque. If the slide helper is dropped in the deck, a reorder-slide protein request is issued. The position bar stays in place, and the original remains transparent until the response is received. If the request succeeds, the slide moves to its new position.

Pushback State/Pushback Toggle

The level of pushback is synced with the native. Changes to one will affect the other. The pushback toggle allows pushback state to be toggled between 'Pushed Back' and 'Full slide' levels (in native terminology). Clicking the pushback toggle initiates a single-shot pushback-request protein and immediately changes the local pushback state. The response to the request comes in the form of a PSA.

Unlinked Deck Viewing

Unlinked deck viewing allows the user to browse slides independently of Native Mezzanine by disconnecting. By unlinking their web client's view of the deck, they are free to change the current slide and pushback level without affecting that of the native. In order to express and control this linkage, two new components are introduced: one for the literal deck region, and one for the deck slider region.

Web—Image Uploader

Web users can upload images into the currently open dossier as slides and assets. The behavior of the uploader changes based on whether or not the browser has Flash. Flash enables the selection of multiple files in a single file dialog.

To engage the flash uploader, a user clicks "Upload" in either the slides or asset panel. The system displays the browser's upload dialog. Multiple files may be selected. User clicks the <affirm> button in the uploader. The Image Uploader opens and names of the images selected in the previous dialog are displayed in the file list. User may click "Add more files" to reopen the file selection dialog. Upon clicking <affirm>, the new files are appended after the old ones in the file list.

The IFRAME uploaders is accessed by clicking clicks "Upload" in either the slides or asset panel. Once the Image Uploader opens, a user clicks the empty file slot to add a single file. Selecting a file causes an additional empty file slot to appear The user can access both types of uploaders. On a screen the image uploader is centered. The number of files about to be uploaded is noted in the header of the sidebar. User may remove files by clicking the "remove" link next to each file. When the Upload Sidebar opens, the upload type selector is set to "slides" or "assets" depending on which upload button was clicked. User may change the upload type to "assets", "both", or "slides." The "upload" button is disabled if there are no files in the upload list. User may close the Upload Sidebar by clicking the cancel button. User may close the Upload Sidebar by clicking the overlay to the sides. Any time the sidebar is closed, all files list is emptied. The Upload sidebar is closed when dossier view is hidden (dossier close, passphrase enabled, etc.)

During uploads, the slide and asset panels display the number of uploads that remain for the respective type of upload. This feedback is displayed to the right of the panel controls (Upload, Download, Clear) and displays the text "Uploading <x> . . . ." The text disappears when there are no more uploads of the corresponding type.

Web Client—Videos

Videos will be placeholders on the web clients. In an embodiment videos in Mezzanine web are represented as placeholders. The placeholders display the video name and, if m2m is enabled, "shared by [mz name]" text. The display centers the text, which wraps. Text overflow is hidden by the placeholder box.

Web Client—Passforward

Passforward enables web users to take control of a Mezzanine handipoint with their mouse. It is, in essence, a remote control: meant to be used while looking at the native Mezzanine's display rather that that of their own machine. As such, it is only useful for in-room participants.

Passforward Overlay

All passforward functionality is contained inside the Passforward Overlay. When the web application successfully connects to a Mezzanine, the Passforward Overlay Button button is shown on the rightmost side of the header. The user clicks it at any time to open Passforward Overlay. The Passforward Overlay slides down from beneath the header to cover the remainder of the page. The application beneath the overlay continues to change unseen. Clicking the Passforward Overlay Button again closes the Passforward Overlay.

Pointer Modes

A number of pointer modes are available while using passforward from the Ratchet Selector. These modes change the ratchet mode of the web user's native handipoint. Available pointer modes depend on the current environment, which is portal or dossier. In an environment of portal and dossier, the mode is move. If the environment is only dossier, modes available are snapshot, reach, and scale.

Scale differs from other pointer modes in that it is not a native handipoint mode. Scale is a variant of the move mode, which allows scaling by simulating back/forth movement of a wand. When the mouse button is held down in scale mode, moving the cursor up simulates pushing the wand towards the screen, and moving the cursor down simulates pulling the wand away from the screen.

The Ratchet Selector displays the available ratchet modes as a list of radio buttons. The currently selected pointer mode is denoted by a lighter background and a handipoint identity indicator. In some cases, the user's handipoint will be changed for them by the native (i.e. after a snapshot, dossier closes). In this case, this change will be reflected on the client.

Feld Representations

The Feld Representations display a representation of the physical screens of the host Mezzanine, to provide spacial context for passforward. It can be safely assumed that the feld representations are only used as a way to find their handipoint, as the user will then switch their focus to the native display. Moving the cursor into the feld representation area initiates passing forward. The user clicks and drags to perform corresponding hardens and softens with the corresponding handipoint.

Precision Passforward

Precision passforward gives passforward users 1:1 pixel accuracy on high-resolution native screens. User presses and holds shift key while passforward overlay is active. Feld representations change to 1:1 zoom about the cursor (position on native is maintained). Each pixel on the user's display now corresponds to one pixel on the Mezzanine display(s). There is no scrolling at full zoom; the user must let go of the shift key and move the mouse to zoom elsewhere as a substitute for scrolling. To deactivate, user releases shift key. Feld representation sizes and locations return to their pre-zoom size & location.

Web Client—Progressive Loading

Progressive loading occurs in a Mezzanine to Mezzanine situation when one Mezzanine A provides an image to Mezzanine B. Mezzanine B alerts its clients of this new asset, even before the image is fully loaded. This allows the clients to show a placeholder representation of that visual element before the image data is fully loaded, so that users can begin interacting with that element as soon as possible.

An embodiment supports only two image states in for the web client: 'no image' and 'full resolution'. When a protein contains an element for which an image is not yet loaded, the web client will display a placeholder image. So that this image does not need to be loaded, it should exist at a static url, rather than where the final image will be available. When the image becomes available, the web client will react to the relevant proteins and reload the images from the provided path.

Web Client—Pending Transactions

In a standard web application, requests rarely fail. As such, actions taken by the user can be reflected instantaneously in the UI, creating the illusion of zero-latency. Pending states in between the action and confirmation become unnecessary and undesirable.

Mezzanine is designed differently. As a result of the current locking model, where the system rejects unvetted actions, requests are moderately likely to fail. If the client ui optimistically assumes success and the transaction fails, it must revert back to its previous form. A pending state, in this case, creates a transparent interaction and a less jumpy ui.

Instantaneous actions (such as click to delete) that require the native to own the lock will display some sort of waiting feedback in between when an action is initiated and the response. This feedback may be displayed either contextually (on/adjacent to the initiation element) or may be global (a dialog or in some sort of status bar) depending on the interaction.

Continuous, direct-manipulation interactions (ie drag/drop to reorder) are broken into multiple transactions, comprising start, during, and end.

In a start transaction, when the action is first initiated (the start of a drag, for instance), a GRAB request is sent to the native. This allows the native to display feedback that a client is manipulating an element, disallow local element manipulation by more than one client/wand, and attempt to grab the lock in a Mezzanine-to-Mezzanine scenario. The response to this GRAB request enables a large number of possibilities for shaping the remainder of the interaction.

In an end transaction, when the user finishes a continuous action, an ACTION request will be made. This request is identical to its 'instantaneous interaction' counterpart. The client may also choose not to make the request if the initial GRAB request failed. At this point, the manipulated element enters a pending state (although since it was directly manipulated, its state is already optimistic). When the ACTION response returns, the element exits its pending state. If the response was negative, the item returns to its correct, reverted state.

Web Client—Interface Elements

Buttons

In the web client buttons have two variants, light and dark. Each variant has a default, hover, and active appearance. The default state of a light button is a light background, grey border, default text color and normal weight. Its hover state includes a darker border. Its active state includes a darker background. The default state of a dark button is a dark background, white border, white text color and normal weight. Its hover state includes a lighter border. Its active state includes a darker background. For both variants, button color will vary slightly depending on background due to transparency (except in IE8).

Confirmation Visor

Confirmation visors are used for semi-modal confirmation of an action. They cover the space of the UI item they affect, disabling any actions underneath. Unless otherwise specified, a confirmation comprises a summary of the action for which confirmation is being requested and a "don't do action" button and a "do action" button (in that order). Pressing enter is identical to clicking the "do action" button. Pressing escape or clicking anywhere outside the visor's area is identical to clicking the "don't do action" button. Enter and escape are substitutes for having a focused button and using tab to select the correct option. Some visors will display a spinner after "do action" is selected. If the action fails (probably due to a lock acquire fail), some will offer the chance to retry the action.

Image Placeholders

Image placeholders hold the space of an incoming asset that is being uploaded from a client or being transferred in a collaboration. They appear as a dark box and are replaced by the image when it becomes available on the host Mezzanine. In an embodiment, the system uses placeholders for images that are available on the host Mezzanine but have not yet loaded on the client.

Web Client—Error Notifications

In an embodiment the system displays modal error dialogs. An alternative embodiment, and used in later versions, deploys error notifications. They appear at the top of the screen, in a centered container. Clicking the notification to dismisses it. Not all error proteins sent by the native will have their summary and description displayed. In some cases, transactions may have specialized UI for failure.

Web Client—Keyboard Shortcuts

Keyboard shortcuts provide expert users with a way to access common interface elements, like tabs, when a dossier is open. A global key manager, containing a map of all keys→events, will listen for key events, filter based on application state, and fire the appropriate events.

iOS Client

As discussed earlier, a user can engage Mezzanine using an iOS device as controller. Supported iOS devices include iPhone, iPad, and iPod. A user downloads the Mezzanine application from the iOS App Store.

iOS Launch

In an embodiment, on launch, an Oblong splash screen is displayed. If the Mezz iOS application is not in memory, the connection screen is displayed. On the iPhone/iPod this will also animate the Oblong logo to its location in the connection screen. If the application was previously launched and remained in memory, but was not connected to a mezzanine system, the connection screen is displayed. If the application was previously launched and remained in memory, was connected to a mezzanine system, and less than 3 minutes has elapsed since the app left the foreground, the app will attempt to reconnect all pool hoses and resume the session.

If the application was previously launched and remained in memory, was connected to a mezzanine system, and more than 3 minutes has elapsed since the app left the foreground, the app will assume mezzanine has de-provisioned the client and returns the user to the connection screen.

iOS Session Passphrase

A Mezzanine session can be protected from casual client users by setting a passphrase, as described in another section on secure sessions. In an embodiment up to 32 iOS clients are allowed. In an embodiment, an iOS client also can protect a session to allow a fully wandless control.

Appearance

The session locked modal view only shows four elements: a dismiss button on the top left corner, a label to indicate “Session Locked”, three editable textfields comprising squares (similar to the ones used for unlocking any iOS device), and the keyboard.

A horizontal flip animation is used to enter and to exit this modal view. Anytime this view appears a cursor starts blinking in the first square.

Only one character at a time can be inside each field. When a user provides input for one square, the cursor moves to the next one. If a user while in a current square taps the backspace key, any input in that square is deleted as the cursor moves back to the previous square. If a user taps on a “new field,” which is a field different from the one where the cursor is located, the content of the new field is deleted.

Once a passphrase has been entered in the three textfields, the client sends that input without the user engaging in any action. This lets the user easily transition to the passphrase input response, which is either an error popup message or entry into the session. A “spinner” is displayed during the wait for the native application to confirm accepting or rejecting the submitted passphrase.

Joining a Secured Session

On the iOS client, if a user tries to join a native Mezzanine with a passphrase-protected session, a modal dialog pops up requesting passphrase entry. The user can tap on the cancel button to dismiss the view return to the connection view. If the correct passphrase is submitted, the connection is valid, and the client joins the session. If an incorrect passphrase is submitted, an error message is displayed. The user remains in this view to submit another passphrase.

Session Secure while Connected

If a session is locked while the iOS client is connected, Mezzanine will disconnect the client. In this scenario, the iOS client will stop keeping its pool connection alive but not relay UI updates to the view. A passphrase entry view appears prompting the user for the passphrase. The results of entering a correct or incorrect passphrase are the same than in the previous section on joining a secured session.

Securing a Session from an iOS Client

A client can lock a session any time during a connection from the Mezzanine Menu. The client that locks the session is accepted automatically into the secure session: no passphrase entry is requested. Any other client connected at that time will proceed through the sequence described in the previous section on session secured while connected.

Once a client has locked a session, the button to lock the session updates its label to “Unlock,” and the passphrase appears next to it. The popover/modal view persists so that users can view the locking passphrase without needed to go into the menu manually again.

Opening a Securing Session from an iOS Client

While a client participates in a secure session, an “unlock” button is displayed in the Mezzanine Menu. This display disappears immediately when the session is unlocked.

iOS URL Handling

When a user is notified via email to join a Mezzanine session, the email may include a URL to let the user quickly join. Upon the user tapping the custom URL, the iOS devices launches the Mezzanine iOS app and automatically attempts to join the session at the given server. If a passphrase is included in the URL, the app automatically tries to join using the particular passphrase.

If the user was previously connected to different Mezzanine system using the app, the user automatically us disconnected, and a connection attempt will be made on the server specified in the URL. If the session passphrase has changed since the URL was published, the user will be prompted to enter the new passphrase. If the new passphrase is still incorrect, the user will be returned to the connection screen.

Mezzanine can support different embodiments of a url for joining a Mezzanine system. One example URL for joining a Mezzanine system, with the second one including the passphrase, is Mezzanine://mezzdelpi.local and Mezzanine://qamezz02/#KKJ. In an embodiment, if offline dossiers are available, a user can use the path portion of the URL as a means of opening an offline dossier stored on the device; for example: Mezzanine://mezzdelpi.local/ds-EU31-EAAA-CCAE-3E11.

Another type of URL that can be passed into the app is a local file URL. This occurs when a user requests that Mezzanine open a file of an allowed UTI. The URL would have a format such as: file://localhost/private/var/mobile/Applications/8CA6E4A3-2791-4F6C-9C73-FBBFE3FC9EAC/Documents/Inbox/Getting%20Started-2.pdf.

iOS Authentication

A client connected to a native mezz system is initially in a non-authenticated state. In this state, the user is presented with only the public dossiers. On authentication request, the client sends its credentials to native mezz. If the request succeeds, native sends client a list of private dossiers, and the client will display the log in status on the same area on the top right. If the request fails, client will inform user of the problem (incorrect password, for example). If authenticated, only the list of private dossiers are displayed and a log out button is available inside the Mezzanine Menu. Creating or duplicating dossiers when authenticated will result in private dossiers linked to the log-in. Upon log out, public dossiers are shown again.

Appearance

In an embodiment, access to the log in screen is via a button on the top right corner of the dossier portal only, as described in the section on the iOS Mezzanine Menu.

Log In Access. The log in screen is accessible via the Mezzanine Menu by pressing on the log in button. This means that users can log in or log out from both the Dossier portal and the dossier content view.

Log In Form. In the login form available in this view, a user would type in his/her username and password and tap on the log in button to confirm. After logging in the view is automatically dismissed. Otherwise the user must press on “Cancel” button on the iPod or out of the popover in the iPad.

Log Out. While logged in, the Mezzanine Menu will update its interface to show the username and present a button to log out. Again, this process can be done in the dossier portal and inside a dossier. After logging out the view is automatically dismissed. Otherwise the user must press on “Cancel” button on the iPod or out of the popover in the iPad.

Superusers. If the logged in user is a super user, the full list of dossiers across all user logins is sent from native. The iOS client will display the entire dossier list depending on device version. On an iPad on iOS 5 and iPod, the dossiers of each user will be separated into sections and listed alphabetically, using classic iOS Table Dossier Portal. On an iPad on iOS 6, the dossiers will be presented separated by user. The user selection would be done by tapping a button next the Mezzanine Menu.

iOS Mezzanine Menu

The Mezzanine menu combines the functionality of user log in/log out, disconnecting from the current Mezzanine system and, in the iPod, collaborating with remote Mezzanines. It is accessible from the top left corner in both the iPad or iPod versions of the client.

This design serves several purposes, including those discussed here. First, it provides a consistent interface for disconnection whether the user is in the Dossier Portal or inside a Dossier. In either case the button is displayed on the top left of the screen. Second, it cleans up the dossier portal interface (both UITableView-based and UICollectionView-based), as reflected in the section on the iOS Dossier Portal. Third, it centralizes the logging processes and the authenticated user information, described in a section on iOS Authentication. Fourth, it supports securing sessions using a passphrase, as discussed in a section on iOS session passphrase. Fifth, the system disconnects from a Mezzanine system while presenting its name. Finally, in the iPod, it provides access to the collaboration interface and informs about the current state of a collaboration, as discussed in a section on iOS remote collaboration.

On an iPod or iPhone, the Mezzanine menu is presented as a modal view displaying the actions that a user can engage. A button on the top left corner is used to dismiss this view. The features on the system menu are in sections with identifying headers.

On an iPad, the Mezzanine menu is a displayed as a popover view comprising the actions a user can engage. This view is dismissed when the user taps outside or selects an action such as disconnecting or logging in/out.

iOS Authentication

A client connected to a native mezz system is initially in a non-authenticated state. In this state, the user is presented with only the public dossiers. On authentication request, the client sends its credentials to native mezz. If the request succeeds, native sends client a list of private dossiers, and the client will display the log in status on the same area on the top right. If the request fails, client will inform user of the problem (incorrect password, for example). If authenticated, only the list of private dossiers is displayed and a log out button is available inside the Mezzanine Menu. Creating or duplicating dossiers when authenticated will result in private dossiers linked to the log-in. Upon log out, public dossiers are shown again.

Appearance

In an embodiment, access to the log in screen is via a button on the top right corner of the dossier portal only, as described in the section on the iOS Mezzanine Menu.

Log In Access. The log in screen is accessible via the Mezzanine Menu by pressing on the log in button. This means that users can log in or log out from both the Dossier portal and the dossier content view.

Log In Form. In the login form available in this view, a user would type in his/her username and password and tap on the log in button to confirm. After logging in the view is automatically dismissed. Otherwise the user must press on "Cancel" button on the iPod or out of the popover in the iPad.

Log Out. While logged in, the Mezzanine Menu will update its interface to show the username and present a button to log out. Again, this process can be done in the dossier portal and inside a dossier. After logging out the view is automatically dismissed. Otherwise the user must press on "Cancel" button on the iPod or out of the popover in the iPad.

Superusers. If the logged in user is a super user, the full list of dossiers across all user logins is sent from native. The iOS client will display the entire dossier list depending on device version. On an iPad on iOS 5 and iPod, the dossiers of each user will be separated into sections and listed alphabetically, using classic iOS Table Dossier Portal. On an iPad on iOS 6, the dossiers will be presented separated by user. The user selection would be done by tapping a button next the Mezzanine Menu.

iOS Mezzanine Menu

The Mezzanine menu combines the functionality of user log in/log out, disconnecting from the current Mezzanine system and, in the iPod, collaborating with remote Mezzanines. It is accessible from the top left corner in both the iPad or iPod versions of the client.

This design serves several purposes, including those discussed here. First, it provides a consistent interface for disconnection whether the user is in the Dossier Portal or inside a Dossier. In either case the button is displayed on the top left of the screen. Second, it cleans up the dossier portal interface (both UITableView-based and UICollectionView-based), as reflected in the section on the iOS Dossier Portal. Third, it centralizes the logging processes and the authenticated user information, described in a section on iOS Authentication. Fourth, it supports securing sessions using a passphrase, as discussed in a section on iOS session passphrase. Fifth, the system disconnects from a Mezzanine system while presenting its name. Finally, in the iPod, it provides access to the collaboration interface and informs about the current state of a collaboration, as discussed in a section on iOS remote collaboration.

On an iPod or iPhone, the Mezzanine menu is presented as a modal view displaying the actions that a user can engage. A button on the top left corner is used to dismiss this view. The features on the system menu are in sections with identifying headers.

On an iPad, the Mezzanine menu is a displayed as a popover view comprising the actions a user can engage. This view is dismissed when the user taps outside or selects an action such as disconnecting or logging in/out.

iOS Heartbeats

In an embodiment, iOS sends a heartbeat protein to mezzanine every 12 seconds iOS device listens for heartbeat from native Mezzanine. If 30 seconds has elapsed since a heartbeat has last heard from the native side, it is assumed that there were network interruptions or the native side has gone kaput. In this scenario the disconnection mechanism kicks in.

iOS Spaces iOS devices, iPhones in particular, are characterized by limited screen real estate. This presents a design challenge to the pixel flexibility found in Mezzanine. The system must be able to switch between felds to support the viewing of various felds in a triptych and also the corkboards of a Mezzanine. iOS SPACES This section describes a feature that lets the user zoom away from the focused feld and view a visual representation of all the felds, main or auxiliary, in a Mezzanine. The user can then pick a particular feld or corkboard and zoom in to concentrate on its contents.

Layout

Each feld is allocated a space within Spaces. In a view of a single feld (zoomed in), the size of a feld space is exactly the view's frame. The feld's content area within its space is the largest centered rectangle that can be drawn using the feld's aspect ratio. For corkboard felds, there is a padding around the feld for aesthetic reasons.

The feld's space resizes itself when device is rotated to match the new view frame size and aspect ratio. When the user engages Spaces mode by zooming out, all feld spaces are scaled down simultaneously, revealing neighboring felds.

Spaces are arranged from left to right horizontally. Felds are placed first starting with the left feld, center feld, right feld, followed by all corkboards. The order given in the corkboard protein sets the arrangement of corkboards. If the connected Mezzanine is a single feld system, the arrangement is the main feld followed by corkboards.

Feld titles appear above the feld area and are center-aligned. Text colour matches that of of the feld border. Feld titles for tryptich are taken from the felds protein, which typically are 'left', 'main', and 'right.' Feld title for a corkboard are generated using its position on the corkboard protein in the manner 'corkboard 1', 'corkboard 2', etc.

The physical locations of corkboards relative to the main felds are not used when laying out spaces. Corkboards are consistently to the right of the felds. When Paramus is visible, the entire spaces content is pushed downwards such that the felds are centered in the remaining space.

Visual Distinction

A user easily can discern, at a glance, the difference between viewing a feld with slides and viewing Spaces. To help the user note the layout difference between viewing a feld while the dossier is pushbacked (comprising three slides side by side) and viewing Spaces with 3 felds all containing a full-felded slide, Mezz provides visual cues. A feld border is thicker when Spaces mode is engaged, providing a rounded rectangle shape that differs from from the square rectangular shape of a slide. The border of a neighboring feld that might exist is seen at the edge of the view.

When Spaces mode is engaged, a gradient background appears, darkening areas above and below the vertical center of the view to convey a sense of depth.

Collaboration Support

An M2M collaboration may involve a "mixed configuration," which is a collaboration session with both single and triple feld Mezzanines. In such circumstance, the center feld is visible to all Mezzanines while the left and right felds are not visible on the single-feld Mezzanine.

For an iOS app connected to a 3-feld Mezzanine system, all three felds and local corkboards are visible during the collaboration. Felds visible to all Mezzanines have a highlighted border, which distinguishes it from the non-collaboration enabled felds and local corkboards. For a tryptich to tryptich collaboration, all three felds have the highlighted borders. Corkboards are not shared, and thus do not have highlighted borders regardless of collaboration state. User can still navigate to all available felds and interact with the content, even if a given feld is not visible to all. When zoomed into a feld that is not visible by all collaborators, a visual reminder of the feld's non-collaborative state is present.

For an iOS client connected to the single-feld Mezzanine, the app will provision and display the left and right felds for the duration of the collaboration. The arrangement of the new felds in Spaces will be consistent with an iOS client connected to the remote triple-feld Mezzanine, ie 'left', 'main', and 'right.' The left and right felds, which are not present in the local Mezzanine, will have a dashed border to indicate that it only exists on remote Mezzanines. The center feld, which is visible to all Mezzanines, has a highlighted border. Feld contents will be visible on all felds. A user can navigate to the newly available left and right felds and interact with the content, even though the local Mezzanine will not display any of their content.

The following paragraph summarizes visual states of a feld. When not in collaboration, a feld is only visible to local Mezzanine users. Its display includes a solid border with default color. In a collaboration where a feld exists on local Mezzanine and is visible to all collaborators, its display includes a solid border with highlight color. In a collaboration where a feld exists on local Mezzanine and is not visible to all collaborators, the display of feld includes a solid border with default color. In a collaboration where a feld does not exist on the local mezz, the display of the feld includes a dashed border with default colour.

An embodiment responds to the termination of a mixed configuration. (This results when a Mezzanine leaves or disconnects from the collaboration and the remaining collaborators no longer comprise the mixed configuration scenario, or if the collaboration itself ends.) In this occurrence, the iOS app adjusts its Spaces arrangement back to the pre-collaboration state and matches the feld arrangement of the local Mezzanine.

Interaction

The view space of a dossier is pinchable in the same manner that iOS users are used to scaling an image. From a zoomed in state, as the user pinches a deck to zoom out, borders around the feld boundaries begin to grow in width and opacity. If the user ends the pinch gesture after crossing a threshold, the interface settles into Spaces mode. If the user ends the pinch gesture before crossing the threshold, the view zooms in to the closest feld in view. When zoomed out, the scale that Spaces settle to is the minimum zoom, one that allows three felds to fit horizontally. If a user continues to pinch inwards (scale down) below the minimum, the felds will continue to shrink but animates back to the minimum zoom state.

When Spaces is engaged, the deck swiping gestures are no longer enabled (and the user can no longer swipe to next or previous slide). Instead the user uses the same gesture of pan left and right to view all available spaces, which include the tryptych and any available corkboards. The pushback gesture, comprising two finger upwards and downwards, continues to function.

Drag and Drop

When Spaces mode is active, if the user drags an asset and hovers over a feld, the feld border is highlighted. After a short delay, the app automatically zooms into the highlighted feld for the user to drop the asset at a particular spot.

When Spaces mode is active, if the user drags an asset to the edge of the view, the view scrolls left or right if there is more content to be shown. The view stops scrolling if the user moves the asset back towards the center of the view, or when the user lifts a finger. User can also drag and drop between spaces by way of dragging an item to the top toolbar after the initiation of drag and drop. This has the effect of zooming out, and user can drop the asset into the space he or she desires.

iOS Corkboard

If the mez-caps protein received by the client indicates that a corkboard is available, all relevant corkboard information is stored locally by the iOS app. Corkboard spaces are appended to the right of the triptych spaces, as described in a section on iOS Spaces. Each corkboard space displays a single image or video and correctly mirrors the content of the physical corkboard.

Corkboard Content

Content that can be displayed on the corkboard are the image asset and a video asset. An image asset displays as an image. For display of a video asset, the video thumbnail will change every time quartermaster pulses.

Drag and Drop

User can drag and drop assets from paramus into a corkboard directly if the user is currently viewing a corkboard space. If the user is viewing the spaces screen, user can drop an asset into the corkboard space, or hover on top of the space in which case the space will zoom in after a short delay. User should be able to drag windshield objects similarly. Assets that are dropped into a corkboard will be a dimmed version of the image, until native mezz confirms the drop and changes the state of the corkboard to its actual asset.

Clear Corkboard

For the deletion gestural language to be consistent with the rest of the iOS interface, the user swipes upwards on a corkboard content object to reveal its delete button, much like assets in Paramus. Tapping on the delete button then clears the content of the corkboard.

iOS Whiteboard

A native mezz with an attached whiteboard is discovered via a mez-caps protein. A "capture" button appears in the Mezzanine info view under the Windshield action, which is described in a section on iOS info view. A current embodiment supports one whiteboard and displays the capture button for the first whiteboard.

On tapping the capture button, the iOS client sends a capture-whiteboard request protein to native mezz, which initiates the whiteboard capture on behalf of the iOS app. The whiteboard has a 30 s timeout.

iOS Dossier Portal

When the native mezz is in the dossier portal, all connected iOS clients will show the dossier portal. From the dossier portal, an iOS user can open a dossier, create a new dossier, duplicate a dossier, delete a dossier, disconnect from Mezzanine, access to Mezzanine Portal. Unlike the dossier view, view states are not synchronized between native mezz and the iOS client. The client can scroll and browse the list of dossier independently of native mezz. Changes to the list of dossiers, such as insertion or deletion, are reflected on the list of dossiers dynamically. If a user is interacting with a dossier that is deleted, for example when a delete confirmation dialog is foreground, it is dismissed without warning.

Dossier List

The following description is for a version 2.0 and is used for the iPod/iPhone under any iOS and the iPad using iOS 5. Dossiers are presented as a familiar iOS table view. Tapping on a dossier row opens a dossier while the accessory button on the right displays menu items for the following dossier actions: Rename, Duplicate and Delete. On the top right corner a "+" icon is used to add new dossiers. A label is centered in the top toolbar showing the owner name or the public ownership of the dossiers in the list.

On the iPod a segmented control is placed on the bottom toolbar two switch between the dossiers and remote Mezzanines lists. On the iPad the segmented control is placed on the right side of the top toolbar.

iPad Dossier Portal

Dossiers are laid out in a similar manner to native mezz, first vertically and flowing onto new columns as necessary. Once the available horizontal space is used up, the portal can be horizontally scrolled to reveal additional columns.

The layout works in portrait and landscape modes, and the number of rows and columns are adjusted accordingly.

Appearance. Dossier cells have a similar representation as the native interface. Long horizontal rectangle with an image on the left side, a thumbnail of the first slide. Next to the image two labels containing the Dossier name and the last modification date. And the actions button is on the bottom right corner. The same cell contains the action launchers when the actions button is pressed or, in order to avoid accidentally opening the dossier when willing to reveal the actions, all the left most area above this button. This gesture reveals three align buttons for Rename, Duplicate and Delete the dossier. The first two buttons are colored in blue and the last one in red.

Editor View. If a dossier is edited, duplicated or a new one is created the dossier editor view appear. It looks just right a standard cell but it is scaled and centered in the top half side of the screen.

The dossier name textfield becomes editable in this view. Once a change is introduced in the textfield, a letter is written or deleted, two buttons for canceling or accepting the changes appear with an indicative color. The accepting button is named differently depending on the current action, e.g., if user is creating a dossier the accepting button will be named "Create". The same will happen with "Duplicate" and "Rename". While in the Editor View mode, tapping outside the zoomed cell has different meanings depending whether the user has introduced any changes or not. If no changes have been done yet it will simply dismiss the view. If user has introduced a change the gesture will be ignored and only by tapping over "Accept" or "Cancel" buttons the editor view will be dismiss.

Dossier Actions include renaming and duplicating a dossier, deleting a dossier, opening a dossier, and creating a new dossier. The different actions that can be done a selected dossier are initiated by tapping over the actions space on the left side of the cell, tapping it on the rest (most of) its surface, or pinching it if those actions imply a change related to the dossier itself or by tapping on the add (+) button in the case of a still non-existent dossier.

Renaming and duplicating invoke the dossier editor view while focusing into the edited/new dossier by fading out the rest of the dossiers. The name textfield becomes editable and changes to the dossier name are directly typed over it. User can tap on the area around the zoomed cell to dismiss the view or press the correspondent button.

In deleting a dossier, the third button in the actions panel is the delete red button. Deleting animates the disappearance by scaling down the cell to its center.

Opening a dossier is engaged by the action "pinch out." User has to pinch above a threshold to open it, otherwise the cell goes back to its original size and position. A second means of opening the dossier is tapping over the cell in almost all its frame. The right most area around the actions panel button is reserved to reveal the panel only; this design keeps users from unintentionally opening the dossier while trying to tap the actions button. Creating a new dossier can be initiated by pressing a "+" icon on one side of the topbar. The view used for entering the information of the new dossier is the same than the renaming/duplicating one.

Private Dossiers and Administrators

When users, both administrators and standard ones, authenticate the set of public dossiers is swapped by their own ones. The title label is changed from "Public Dossiers" to 'the owner name'+"Dossiers"

In case the user is an administrator a button appears on the top toolbar that activates a dropdown table. This one contains a list of all possible owners and the number of dossier they own. It is used to only show those users' private dossiers.

Since the admin is also a user, when this one logs in, he will first see his own dossiers. He will also be part of the drop down list. This way, after selecting another user's dossiers he can always go back to his own ones by looking for himself in the list.

iOS Paramus

A toggle button on the top toolbar will reveal and hide the Paramus area. In a future version, a drag handle is used to pull the paramus down/up. Paramus is an overlay view with transparent white background, and assets are laid out from left to right horizontally. The view scrolls horizontally to support an arbitrary number of assets. The control is virtualized such that actual UIView instances should only be present if they're currently visible given a scroll position. A mode button switches the paramus view between displaying images and video sources.

An action menu can be revealed by swiping upwards on an asset. The action menu is dismissed when the user first initiates horizontal scrolling, which reveals a different asset's actions menu, and then download swips on the menu. The action menu contains a delete button, tapping on which begins a delete asset transaction. After the transaction begins, the asset will be tinted red with a red border to indicate its pending deletion. If the deletion is successful, the asset disappears. If the deletion failed, the asset will be tinted normally and without the red border.

To initiate a dragdrop event on an asset, tap and hold on an asset until a copy of the asset, slightly bigger and transparent, is overlaid over the existing asset. The ghostly asset will follow the movement of the user's finger, and drop zones (Deck, Windshield, Corkboards) will react according to its location. Moving the finger outside of the screen area will cause the gesture to be cancelled, and should not be considered a drop action.

If editing mode is engaged, delete buttons are placed on the top left corner of each asset. Upon tapping on the delete button, client sends a delete-asset request to native mezz.

iOS Hoboken

Hoboken shows available video sources connected to the native mezz. This is done by monitoring the quartermaster pool and listening to viddle live and died proteins. In an embodiment empty videos are shown as they are "slot" based. Later versions are a different implementation. Instead, video sources are added and removed from the hoboken area when viddles in the quartermaster pool broadcast the viddle-live and viddle-died events respectively.

Hoboken shares the same view as iOS Paramus, described in another section. A toggle button/mode switch button allows users to switch between viewing image assets and video sources.

Instantiation of Video Source onto deck works the same way as Paramus. A user can drag a video source object to instantiate it onto the deck. Deletion of a video source is not allowed. During editing mode delete buttons will be available on image assets but not video sources.

iOS Windshield

Windshield on the iOS maintains spatial/visual equivalence of the windshield and deck on the native app. The windshield exists as a layer that is placed on top of the deck and is not affected by pushback.

In contrast to the native app mode, the iOS windshield can be toggled on or off. A toggle button on the iOS toolbar reveals or hides the windshield. The initial state of the toggle is off.

To move an object on an iOS windshield, the user taps and holds one finger on the object. After a brief moment the object grows slightly and become transparent. At this stage, the user drags the object to move it to a new location whether on the same feld or a different one (via Spaces). A windshield transform-change-request-protein then is sent to the native app, which confirms or rejects the change.

If another user also edits the position the position of the object, the change is not reflected in the iOS interface until the user's finger is released. However, if another user deletes the windshield object while the iOS client is manipulating it, the asset being manipulated will be removed, which prevents the user from thinking that an action can still be performed.

To scale on object, the user taps and holds two fingers on a windshield object. After a brief moment the object grows slightly and becomes transparent. The action does not require that both fingers be touch inside the outlines of the object. Instead, the mid-point between the two touches is used to determine which object is being manipulated.

Once this scaling gesture is activated, pinching the object scales the windshield object as a user would expect with this gesture. Following this interaction, a windshield transform change request protein is sent to the native app, which confirms or rejects the change.

Windshield objects are deleted in a similar manner as assets and slides. Swiping upwards on a windshield object will reveal a delete button, and tapping on the delete button will initiate the deletion request. Re-using the swipe up gesture to reveal deletion interface here maintains consistency within the interface and maximizes code re-use.

Another embodiment provides a more gestural interaction for deletion, such as dragging to a specific area. (This is a slow and cumbersome interaction, especially on an iPad, and presents a less efficient method of deletion.) Another embodiment temporarily increases the size of the windshield object while the deletion button is shown.

An opacity slider, found in the Info View, lets the user can control the opacity of all windshield elements. In an embodiment, when the user drags the opacity slider, the app will continually send the current slider value to the native app (0.0-1.0). The native app will then respond by changing the opacity of every windshield object. When the view is shown, its state may not mirror that of the native app since native does not currently send this state information to clients.

iOS Dossier View

Dossier view refers to the view that a user sees when the native mezz has a dossier opened. The display includes a top toolbar, bottom toolbar, deck, and paramus.

The top toolbar is intended for system and dossier-level UI, such as windshield, corkboards. It contains an info button, text field, feld switcher button, visibility button, and action button. The info button displays information on the connected native Mezzanine, windshield opacity slider, as well as whiteboard capture button. The text field displays the title of the current dossier. The feld switcher button lets users switch between various felds, as well as corkboards. The visibility button lets users toggle the visibility of paramus.

The action button displays a menu for closing a dossier and disconnecting from Mezzanine.

The bottom toolbar contains UI for deck editing and navigation UI. It includes an upload images button, and in an embodiment a deck slider. In an editing mode, a bottom toolbar includes an exit editing mode.

iOS Deck

The view of the deck is synchronized with the native view of the deck. The iOS Deck is a visual representation of the native mezz's Deck when a dossier is opened. Slides are arranged horizontally much like the native mezz. However, the margins between slides are relative to screen dimensions rather than native mullions in order to present the slides on left/right felds in a visually appealing manner. Using the Deck view, users can navigate the deck or make changes to it such as slide insertion, deletion and reordering.

Features include slide advance, slide retreat, pushback mode, deck slider, full slide view, and local browsing. To slide advance (and move forward one slide), the user swipes left. To slide retreat and move back one slide, the user swipes. Pushback in the iOS client is described in another section. Deck slider allows for quick preview and access to the ends of a large deck. An embodiment also supports full slide view. iOS local browsing is described in another section.

In an embodiment, to activate a full slide view, the user in Deck View, either pinch-expands an image slide with two fingers past a certain threshold, or double tap a image slide. The system transitions into the slide viewer. Once the full image is loaded, the user can zoom and pan around the image. Maximum zoom level is capped at 100% pixel zoom. A button on the top left for closing the viewer. Closing the viewer before an image has completed downloading will abort the request.

The deck view covers the entire dossier view area. In any nominal deck viewing state (pushbacked or presentation mode), slides will not extend into the toolbar area. However, when the user is in the middle of pushback or in the middle of pinch-zooming a slide, it is possible to have a slide image appear underneath the toolbars. The paramus view is initially hidden. When it is visible, it extends the visible area of the top toolbar downwards, revealing 1 (iPod/iPhone) or 2 (iPad) rows of asset images. The top toolbar is pegged to the top edge of the screen, and extends horizontally to fill the width of the view. The bottom toolbar is pegged to the bottom edge of the screen, and extends horizontally to fill the width of the view. The background color of both toolbars is a translucent white that matches native's system area.

Next/Prev Slide

Swiping a finger left or right will initiate the next or previous slide gesture. This is a tracking gesture, such that user gets immediate feedback that horizontal movement is causing deck movement. If the user releases the finger before crossing the threshold, the deck animates back to its previous state and no protein is sent. If the user releases the finger after crossing the threshold, the next or previous slide protein is sent to native mezz. To increase perceived UI responsiveness, the deck is pre-emptively scrolled (that is, as soon as user's finger is lifted).

Slide Content

Visual container (CALayer subclass) of slides are pre-allocated and created on load. Default background of the slide container is a dark gray background along with slide index. If a slide is within the bounds of the view, the app sends an http request to retrieve the thumbnail image. The thumbnail image is cached locally, and the cached copy will be used when the app next encounters that image. High resolution (full slide image) is loaded when in presentation mode (slide is full felded). This occurs asynchonously. For video slides, a placeholder graphics is displayed while awaiting thumbnails from the quartermaster pool. Thumbnails are loaded for videos depending on timing of quartermaster thumbnail pulses. No thumbnails are available for shared video from collaborating mezzes, as the remote quartermaster pool may or may not be accessible.

The iOS app connects to the quartermaster coordination pool to retrieve video thumbnail. Currently the pool name is determined from the mezzanine system name. For example, when connecting to a mezzanine system at tcp://mezzytesty/, the app will try the coord pool at tcp://mezzytesty/qm In another embodiment, the native mezz send over certain configuration details after a client joins. A slide's content information are available in the proteins deck-detail and new-slide. Protein deck-detail uses an ingest content-source. Protein new-slide uses an ingest asset-uid. While the ingest required for these two cases differ, they both derive from a slide's ContentSource parameter in an embodiment.

Thumbnail dependencies are libLoam, libPlasma, quartermaster coord pool, and Deck View.

Delete Slides

Swiping up on a slide reveals an actions panel, containing a delete button. Area occupied by the actions panel is dependent on the physical size of the slide on the iOS device. On the iPhone, it may occupy the whole slide area when pushbacked, or only occupy a strip along the bottom of the slide on the iPad. User can tap on the button to delete a particular slide. The slide will be faded as visual indication of the pending deletion. Upon success the slide will disappear from view. Upon failure the slide will regain full opacity.

Reorder Slides

While in editing mode, users can initiate re-ordering of a slide by tapping and holding on a slide. Once a slide is dislodged, a gray square remains in its original position to display the source of the slide. On the iPad 2 or iPhone 4 or above, a user will also see a undulating line joining the slide's original position. When the drag crosses a threshold (more than half way towards the next slide gap), the slide will be swapped with its neighbor. When the user reached the edge of the screen, the Deck will scroll independently of the native mezz's view state, to allow the reordering of slides from one end of the deck to the other. When the user releases the finger, the slide will stay in place while the client sends a slide-reorder request protein to the native mezz. If the request succeeds, the slide remains. If the request fails, the previous slide ordering will be restored. The delete buttons should disappear when a user initiate the reordering of slides. If a slide is inserted or if the deck is reshuffled while user is dragging a slide, the client's view of the slides will shift accordingly. If the slide being dragged is deleted, the user action will be cancelled. If the dossier is closed while user is dragging a slide, the user's gesture will be cancelled. When the user's drag gesture is cancelled, the dragged image disappears.

Insert Slides

The deck is hooked into the drag and drop system and accepts asset drops (image or video). The system indicates the insertion point of a slide, and nudges the neighboring slides to create room. Upon drop, the new slide is created and inserted into the Deck but faded out (50% opacity), and the client sends native mezz a new-slide request. If the request succeeds, the new slide will fade to full opacity. If the request fails, the new slide will disappear and slides to the right will shift back to their original position. If a slide is inserted or if the deck is reordered while user is dragging an asset, the client's view of the slides will shift accordingly. If the asset being dragged is deleted, the user's gesture will be cancelled. If the dossier is closed while user is dragging an asset, the user's gesture will be cancelled. When the user's drag gesture is cancelled, the dragged image disappears.

Deck Slider

A deck slider on the bottom of the deck view lets users navigate the far ends of the deck more easily. It comprises simple gray bars similar to the web client, and less visually distracting than, for example, the Photo app's thumbnail strip. While the user is manipulating the slider, the local viewport will animate the scrolling to that location. However, a protein to native is only sent when the user's finger is lifted. Changes to the native viewport during this time will not be reflected in the iOS app. In an alternative embodiment, a user's finger that strays too far above the slider is a cancel gesture.

Deck View

When the native side is pushbacked, the app will display 3 slides side by side. When the native side is in presentation mode, the app will display the center slide. Top toolbar contains dossier title and an info button to access a dossier details view. Bottom toolbar contains buttons for Image Upload, Close Dossier, and Disconnect. Tapping on disconnect returns the user to the connection screen. Both portrait and landscape device orientations are supported on both iPhone and iPad. On an iPod or iPhone, top and bottom toolbar/menus are moved out of view in landscape mode for fullscreen viewing of slides. Dossier name is displayed on the top of the view.

If another user (native, web, or mobile client) closes the dossier, the iOS app will transition to the Dossier Portal. If another user scrolls the deck, the deck view will center on the appropriate slide and animate the transition. If another user engages or disengages pushback, the deck view animate to one (non-pushback) or three slides (pushback) visual mode. If another user reorders the deck, the slide images will change to reflect the reordering. If another user adds a slide to the deck, the slide will fade in and be inserted into the deck. If another user deletes a slide, the slide visual will fade out.

Dependencies include libLoam, libPlasma, Three20, and deck-status protein in pool mezz-tesla.

iOS Pushback

Pushback is initiated when the user puts two fingers on the deck view and starts moving up or down. Moving fingers up correspond to pushing the wand forward, as described in another section, which increases pushback distance. Moving fingers down correspond to pulling the wand backwards, which decreases pushback distance. When user lifts fingers from the device, the action terminates the pushback sequence. The native app will settle into either its pushbacked state or non-pushbacked state, at which point the iOS device will use the updated deck-status protein to adjust its slide view.

iOS Remote Collaboration

During a remote collaboration iOS client receives a list of remote mezzes available and can request native mezz to perform actions on. The dossier portal displays a list of these available remote and native Mezzanines. Available actions are initiate a collaboration, cancel a pending call, and leave a collaboration. The list of remote mezzes is synchronized with the native application, which informs all clients via PSA when any change occurs on any remote mezz.

Appearance

The iOS user sees a list of remote mezzes after connecting to a native mezz system. This list serves as a calling interface as well as a collaborator list when a collaborative session has started. As described in another section on the Dossier Portal, a user can switch between the dossier and Mezzanine portals via the calling interface. This interface is accessible using a segmented control at the top right on the iPad or the bottom toolbar on the iPod.

Not in Collaboration

As a calling interface, the list of Mezzanines is sorted alphabetically, and displays the name, company and location of each remote Mezzanine. Online mezzes will be highlighted relative to offline mezzes for users to make a visual distinction.

In an iPad using iOS 6.0 and above, the new collection view is used. Remote mezzes are laid out in a similar manner to native mezz, first vertically and flowing onto new columns as necessary. Once the available horizontal space is used up, the portal can be horizontally scrolled to reveal additional columns. The layout works in portrait and landscape modes, and the number of rows and columns are adjusted accordingly.

Pending Call

Once a call has been initiated (whether by the client app or native), the call status is reflected in the Mezzanine list and in the Mezzanine Menu on an iPod or the Collaboration Menu of an iPad. The remote mezz being called reflects this state. The displays of other system names are faded out to indicate they are not eligible at that particular time. Also, switching back to the dossier portal is deactivated.

In Collaboration

Clients display a list of remote systems, called a "collaboration list." When the Mezzanine is in a collaboration session, this collaboration list displays current collaborators more prominently than other remote systems. The Mezzanines connected at that time to the current session are highlighted and also sorted on top. After joining a collaboration, the list of remote Mezzanines is shown for informative purposes. The user does not place new calls from this display; only receiving calls are allowed.

Collaboration Information/Leaving a Collaboration

To effectively use the limited space of an iPod display, when a collaboration exists, information about the collaboration is integrated inside the Mezzanine Menu. A modal view comprises the Mezzanine Menu. The view is dismissed by pressing the Cancel button on the top left corner. In a Mezzanine menu during a collaboration, the cancel button appears on top of the menu that lists the names of remote mezzes. A button to leave the collaboration appears under the list of remote mezzes.

On an iPad the collaboration information has its own menu, which is located next the the Mezzanine Menu on the top bar. The icon indicates the current state of the collaboration. A button to leave the collaboration is located beneath the list of remote mezzeses. When there is no collaboration, the menu notes the state.

Joining: Initiate a collaboration from dossier portal

Calling a Remote Mezz

After accessing the collaboration interface, a user can initiate a call by tapping an online remote Mezzanine in the list of available systems. Mezz sends a PSA to clients indicating the call is placed.

Pending Call

After receiving the PSA noting a pending call, clients in a Dossier Portal are moved into the Mezzanine Portal, where the display scrolls to the remote mezz being called. The display of clients already in the Mezzanine Portal also scrolls to the remote mezz being called.

Mezzanine Portal enters an inactive state in which two actions are supported: canceling the pending call by tapping the Remote Call, or disconnecting from the current session. In this state it is not possible to switch back to the Dossier Portal, scroll the Mezzanine Portal, login, or call another remote Mezzanine. Since all clients see the pending call, any client (and not just the one that initiated it) can cancel the call. Tapping the display of a pending call executes the cancel.

If the pending call is canceled, clients are informed via PSA. They exit from this "pending call" state as described above. The informate state label of the remote mezz being called changes from "Pending call" to either "Online" as it was before the call, or "Offline" if it is not available anymore.

Call Answered

The display indicates if the remote mezz accepts the call on the Mezzanine/Collabration menu icon on the topbar. The remote mezz is highlighted to reflect "in collaboration" state. If the collaboration has been established, the other remote mezz systems are not highlighted, whether they are online or offline, and the user is unable to tap their display name.

Call Answered

To effectively use the limited space of an iPod, and specifically its toolbars, an animated Mezzanine Menu displays information on an answered call. On an iPad a label next to the Collaboration Menu shows the name of any remote mezz in the collaboration.

In case of any error during the connection, an auto-dissipating message error informs clients.

Receiving a Join Request

Clients receive a join request whether they are in dossier portal or inside a dossier. A popup dialog box appears with an invitation message. A user can press an accept button or decline button. If any other client or native Mezz accepts the call, the popup is dismissed automatically after client receipt of an appropriate PSA. The popup also is dismissed if there is no answer. While such a message on the native application times out after 60 seconds, iOS clients respond to a PSA sent by the native application after the 60 seconds has elapsed. If several clients accept the incoming call simultaneously, the native system accepts a first one and ignores the rest.

A client does not receive multiples calls. Instead, it considers only the first call it receives an eligible call. Other calls are kept in a queue on the native application. If the current call is answered by the client that is called, another client, or the native system, the collaboration starts, and the native system ignores the other pending of a queue. If the current call is dismissed by the client that is called, another client or native system, a user action or a PSA dismisses the invitation popup (described above). The native system then moves to the next call in its "pending call" queue and informs a client via PSA. Clients see a new invitation popup, reflecting call information. This sequence repeats until a call is answered or the "pending call" queue is empty.

In Collaboration

Multi-Way Collaboration

After a collaboration is established comprising Mezz A and Mezz B, it can be extended up to three Mezzanines. A third mezz, Mezz C, receives a join request. A client receives a join request only if sufficient room exists in the current collaboration. As described in a section above on receiving a join request, a dialog box appears with options to accept the join request or cancel it.

Leave a Collaboration

At any time a client can press a button for leaving the collaboration from the Mezzanine/Collaboration Menu. A client that was in a dossier portal remains in that view. A client that was viewing a dossier remains inside that dossier. After a remote mezz has left a collaboration, it no longer is highlighted in the collaboration list.

Collaboration Interrupted

If the collaboration is interrupted, a client receives a PSA and sees a dialog box. A title, message and button comprise the box in an embodiment. The title notes "collaboration interrupted" and the message indicates "attempting to reconnect." The box also displays a button to leave the collaboration.

The dialog box is dismissed if contact is reestablished, and the collaboration continues with no changes. If contact is not reestablished, clients are dropped from the collaboration, a state described below. If a user presses the button to leave the collaboration, a PSA is sent, and clients and native application comprising the collaboration are in a state described in the section on leaving a collaboration.

Dropped from a Collaboration

If a Mezzanine system is dropped from a collaboration, all clients are informed, and iOS clients see a dialog box. In an embodiment a title, message, and button comprise the box. The title notes that contact is not re-established; the message notes the user has left the collaboration. Also displayed is a button for dismissing the box.

A remote mezz that once comprised a collaboration but is dropped is no longer highlighted in the Mezzanine portal. The Mezzanine/Collaboration Menu icon also is no longer highlighted.

iOS Local Browsing

The client app can de-couple its view of the dossier from native mezz such that users may browse and review slides independently of native mezz.

Upon joining a Mezzanine session, the view syncing is automatically on, ie. client app will scroll or pushback its view of the dossier whenever there are changes in either state on the native mezz.

In the dossier view UI, a button is available to toggle enabling/disabling the automatic view syncing between native mezz. When local browsing is enabled, client app no longer send scrolling or pushback requests to native mezz but swiping gestures will continue to allow a user to navigate between slides. When view sync is re-enabled, the client's view is automatically shifted back to what native mezz sees.

Changes to the actual dossier state, such as slide insertions, deletions and reorder, will continue to be reflected in the client app independent of view sync state.

The view syncing is only available at the dossier level. Once the user or another user closes the dossier, the state of this mode is no longer valid since view is never synced in the dossier portal.

When a user disconnects and rejoins, the app defaults back to the view-sync enabled state.

iOS Document Interactions

Document interactions allow iOS users to upload files to Mezzanine from other iOS apps. This feature augments the in-app upload mechanism of selecting photos the library or taking one from the camera. A user can upload a document that he received from an email, upload a document she has in her Dropbox or Box.net account, or upload a Keynote presentation. On iOS, each application is sandboxed and one cannot access another app's files. Document Interaction is the mechanism where user specifically tells iOS to open a particular file in a foreign app, such as Mezzanine. iOS then copies the file into the target application's sandbox inside a special read-only Inbox folder which the target app can then access. iOS also does not allow Document Interaction to work with multiple files; that is, the user only can select one file at a time to open in another app. To have an app open several small files, one must use a file package or archive.

Supported formats are pdf [com.adobe.pdf], jpeg [public.jpeg], png [public.png], tiff [public.tiff], bmp [com.microsoft.bmp], and gif [com.compuserve.gif]. An embodiment supports certificates as described in a section on secure connection.

User Workflow

The mechanism for this is the widely used "Open In . . . " option presented to the user in various iOS apps. A user is allowed to upload a file only if the iOS app is already connected to a Mezzanine server with an opened dossier. For example, a user connects to Mezzanine and opens a dossier. He has content in another app to contribute to the meeting. User switches to app such as Mail, Dropbox, Keynote, and Google Drive, and then selects document and opens it in Mezzanine iOS. iOS app asks user to confirm the file upload. iOS app uploads the content to both asset and slides of the native Mezzanine. If the user is not connected to Mezzanine when the app receives the file, a dialog will be displayed asking her to first connect to a Mezzanine before opening a file from another iOS app. If the user is connected to a Mezzanine with no opened dossier and is in the dossier portal (including a dossier opening, call initiated, being called), a dialog will inform the user that he needs to open a dossier before attempting the upload. In both of the above cases, the user does need to go back to the other app and re-open the document.

In an embodiment the system displays Inbox contents, showing the list of files obtained from other apps. The user then can upload the files no matter the app state. In the two examples described in the previous paragraph, the user will be notified that the file is put in a pending upload container and will be available the next time the user is inside a dossier. The upload menu button could have a red badge attached to it displaying the number of pending uploads. A new "Pending Uploads" menu item would appear, and by tapping on it the user is shown the list of documents she had previously opened in Mezzanine but had not uploaded. In this list, the user can choose to upload any of the available files.

PDF Support

The main file format supported is PDF, as it is very common and there are native methods to render the content into images. The following are common sources for PDFs: email attachments, Dropbox/Box.net/Google Drive, Keynote (which can export entire presentations as PDF).

Multi-page PDFs is supported by separating them into individual images. If the Mezzanine's dossier has enough room to hold all available pages, the PDF will be uploaded in its entirety to both Paramus and Deck. If a PDF contains more pages than there is room in Mezzanine, user will be asked whether to continue with the upload or abort completely. There is no page selection UI to individually select specific pages to upload.

If the user taps an approval button, the dialog is dismissed and the app will begin rendering and upload each page. Both rendering and uploading are done in the background while. If the user taps a cancel button, no upload will occur, and the dialog is dismissed. If the dossier is closed while rendering or uploading is happening, these will be cancelled. In an embodiment the user can cancel in-progress render/upload. If the rendering of a PDF page should fail, the user will be informed via a dismissible dialog. Because the exact nature of the failure may vary, the message is a generic error message. If the rendering of a particular PDF page should fail, the renderer will continue with the subsequent pages and attempt to render and upload them. The user will be informed how many errors had occurred during the conversion process via a dismissible dialog at the end of the upload.

User can open an image from apps such as Google Drive or Box.net. (Other services such as Safari, Photos, and Dropbox do not sufficiently support the opening of jpeg: they only allow the image to be saved to library or copied to clipboard.) Supported formats are jpeg, png, tiff, bmp and gif. In the case of animated gif, only the first frame is uploaded.

Certificates

In an embodiment, Mezzanine can also open certificate files (extension TBD) from other apps, in order to support the Secure Connection feature.

Return Journey

In an embodiment, the system supports return journey for slides to the other apps. An embodiment creates a PDF using slide images such that other apps can open the presentation in a known format. Other possibilities for document sources are iTunes file transfer and Dropbox integration (which directly list files available for upload).

A user can use the iOS device to upload an image from their photo library, or take a new photo (if camera is available) to Mezzanine. When shown, the image uploader gives the user a choice to use the photo library or take a new photo with the camera. If a user accesses the photo library, the appropriate UIImagePickerViewController is constructed and displayed. Using this Apple-provided view, a user has the ability to browser the photo library's albums and select a single photo. When the user picks a photo or uses a new camera snapshot, an image upload request protein is sent to Mezzanine. Upon success the app sends the image protein to Mezzanine. If a failure occurred (deck and paramus are full), an error message is displayed. A thumbnail of the sent image is displayed, along with an option to resend or choose another image/take another photo. On the iPod or iPad with no video camera, this will go directly into the photo library browser. On the iPhone/iPod, this view is pushed into the UINavigationController stack. On the iPad, this view is displayed inside a UIPopoverController-hosted UINavigationController. Dependencies include libLoam, libPlasma, Three20, tcp://server/mezz-inbound-snapshots pool available, a camera on iOS device for photo-upload, and the native app image upload.

iOS Annotations

Annotation allows a Mezzanine user to highlight and draw attention to parts of an image, with the goal of enhancing Mezzanine as a collaboration tool. In the absence of built-in tools, the user would have to engage in a series of actions, including: save a slide image to the photo library; open it in an external app (such as Photoshop); modify it; save the result to the photo library; switch to Mezzanine and upload the modified slide. In order to provide users a simpler workflow to annotate a slide, the iPad app contains a succinct set of annotation tools is chosen to satisfy common use cases without encumbering the interface. An embodiment supports annotation features with iOS Touch.

Mezzanine supports Annotation Modes and Annotation Attributes. Annotation modes are mutually exclusive; no two modes can be active at the same time. Modes include Freehand, Arrow, Text, Line, Square, and Circle. Annotation attributes available depend on the particular annotation type.

Attributes include Fill/Primary Color, Font, Stroke Color, Stroke Thickness, and Opacity.

Other features of iOS annotations include Undo/Redo, Clear, Selection, Crop, Delete, Attributes adjustments.

Interface

Annotation is accessible by double tapping or pinching an image slide in the deck. This opens the slide viewer interface containing the annotation interface, which is displayed as a toolbar anchored to the bottom of the view. It contains the following buttons on the iPad from left to right: Navigation Mode (Default), Freehand Mode, Colour Picker, Crop, Undo, Redo, Arrow Mode, Text Mode, Circle/Square Modes. In an embodiment, the slide viewer can be enhanced to accept windshield items.

Mode switching is handled by a series of mode buttons, only one of which can be highlighted at any time to denote the currently selected note. An embodiment version supports menu consolidation as the iPhone client does not provide enough space to layout all available tools. At most, one should only put 5 items in the toolbar for portrait layout. To consolidate some of these menu items for the iPad, all mode button will coalesce into one button, tapping of which reveal a submenu in which the user can choose the annotation mode. On the iPhone, the bottom toolbar becomes Mode menu, Color Picker, Crop, Undo, and Redo.

Navigation Mode

This is the default mode when the user enters the slide viewer. User pans and zooms the map using one and two fingers respectively, conforming to the standard iOS behavior. In an embodiment pinching inwards closes the slide viewer. In an embodiment, pinching inwards does not close the slide viewer: this prevents accidental invocation by users trying to go back to minimum zoom level.

Freehand Annotation Mode

When the user taps on the Freehand icon, this mode is engaged. User drags along the slide to create a freehand annotation using the path the user marks with his finger. The interaction ends when user lifts his finger from the screen. The view does not scroll when the user's finger approaches the edges of the view.

The annotation is created based on slide coordinates, and will be redrawn based on zoom level, but stroke width will scale along with zoom to preserve appearance of the image under various zoom scales.

Text Annotation Mode

User taps on a part of the image to add a text annotation at that location. Only left text alignment is available: the tapped location marks the start of the first character. On the iPad, a popover with a text input interface is displayed with its arrow pointing to the tapped location. The popover is modal, meaning tapping outside of the popover will not dismiss the popover as it is an editing UI. On the toolbar of the iPad popover a Cancel button on the far left allows the user to cancel without saving, and a Save button on the far right will save the annotation. Users can create multiline text by using newline characters in the text field. If the text flows off the right of the image (for example, if the user taps on the far right of the image or if a line of text is long), the text is automatically repositioned such that all of the text is visible. If it is not possible to place the text in its entirely within the width of the image, the text will begin at the left edge of the image+a margin, and the right side of text will be truncated abruptly.

In an embodiment of an iPhone client, a view with a text field is displayed modally from the bottom of the screen. Also in an embodiment of an iPhone client, a Cancel button on the far left allows the user to cancel without saving, and a Save.

Saving

Annotations are auto-saved as soon as user finishes a gesture. There are no explicit Save or Cancel buttons. Annotations are not saved if a gesture is interrupted. A gesture can be interrupted (that is to say cancelled, as opposed to ended) when any of the following occurs during its progress:

- the lock button was pressed
- the home button was pressed
- another user closes the dossier
- the session gets locked and the user needs to enter the passphrase to continue
- timeout disconnection from Mezzanine
- the app crashes
- user receives a phone call
- the device displays a dialog (wife selection, low battery, etc)
- the device runs out of battery and shuts down Color Picker A color button displays the current state of the color picker, and determines the color of the next annotation. Tapping on the button reveals the color picker UI which has 15 colors that a user can choose from. The colors are arranged in a 3 by 5 grid. They are displayed as solid color squares with light bordering around them. The background of the picker is black to match the full slide interface. The currently selected color is highlighted with a border, which in an embodiment is white. On the iPad this is presented as a popover. Tapping on any of the color will set the new color state and dismisses the color picker. Tapping outside the popover will dismiss the color picker and the previous color remains selected.

In an embodiment, the colors will be arranged in a 5 by 3 grid on the iPhone in landscape mode. On the iPhone this is pushed in from below as a modal controller. Tapping on any of the color will set the new color state and dismisses the color picker. A Cancel button is available on the left side of the navigation bar for users to return to the annotation view and the previous color remain selected.

Crop

An embodiment supports a crop feature set. This enters the user into a cropping mode, where a user can select a portion of an image to re-upload to Mezzanine. The feature helps fulfill the use case of a user wanting to highlight a smaller portion of an image, which on native Mezzanine is handled by snapshotting. When this mode is engaged, the bottom toolbar changes its toolset. Annotation modes, Color Picker, as well as the Clear are removed, and instead presents the following arrangement (from left to right): Cancel, Reset, and Crop, To crop the image user drags a finger to draw an area on the image. The interaction ends when user lifts her finger from the view. If the crop area is too narrow or tall, it animates to the smallest allowable region given the user input. A temporary text notification, displayed in slide space, informs the user why the region was adjusted by the app. Once a crop area is set, the parts of the image outside the area will be darkened, thus highlighting the active area. If the user begins to perform another crop gesture, the previous area is discarded. No interface elements will be available for editing/refining the crop area. In an embodiment, the crop area will become interactive: corner handles will be added for users to tweak and resize the crop area. Dragging in the middle of the crop area will allow user to reposition the area. A user also can undo the last crop area adjustment.

Changes are not saved to the model until the user taps the Crop button. Alternatively, he can tap on the Cancel button to abort the change. If the changes are saved, the display of the cropping area persists in the slide display. If changes are not saved, the crop area reverts to its previous value. In either case, the user is returned to the previous annotation mode. The Reset button removes the crop area.

Undo/Redo

The undo functionality allows the user to remove an erroneously placed annotation in the absence of selection/delete feature. Each undo action corresponds to one completed gesture, e.g. the creation of a freehand annotation. The redo feature allows the user to re-perform a previously undone action. If there are no actions to undo, the undo button is disabled. If there are no actions to redo, the redo button is disabled. If there are available redo actions, and the user performs a completely new action, the redo stack is cleared. The undo stack persists as long as the user does not disconnect from the native Mezzanine. It is cleared and discarded when disconnection happens, whether by user or by heartbeat timeout. The undo manager is attached to a slide instance instead of at the dossier level, such that one cannot undo an action on slide A while the slide B is currently displayed. The undo stack is essentially unlimited. In an embodiment, in the case of annotation editing, each adjustment of an attribute are individual items in the undo stack. In the case of continuously moving/repositioning an annotation, each small change of the move gesture are coalesced into one single undo action.

Clear

A clear button is available in the top toolbar. It is disabled but visible when no annotations are on the view, and enabled when annotations exist. When tapped all annotations are removed from the model and the view is updated accordingly, returning the slide to its pre-annotated state. Only the annotations that the local iOS user added are cleared, since the loading of a slide that has been annotated by another user means their contributions have already been baked into the image itself. There is no confirmation dialog for clear, because this is an undo-able action and the user can simply revert to the previous state.

Upload/Share

The annotated slide can be shared either by uploading as a new slide or by replacing the original slide. The asset associated with the slide will remain intact such that it can be re-instantiated from Paramus. If a crop area is active, the upload will consist of the annotated slide cropped to the specified area.

To upload the annotated slide, an 'Upload' button is placed next to the familiar iOS 'Share' button. This re-uses the same upload icon from the Dossier View to provide consistency and strengthen association. The two options in the menu are upload a new slide and replace existing slide. Upload as new slide uploads the annotated image, space permitting, as a new slide whose content is a new asset with a new asset-uid. the annotated image, space permitting, is also inserted into paramus as a new asset. In replace existing slide, the annotated image, space permitting, results in a new asset with a new asset-uid. Every annotated version of this asset would appear as separate assets. The new asset is added to Paramus (and can be dragged to the corkboard). The existing slide that points to the old asset will now point to the new asset (native mezz sends out a slide-content change notification). Other slides that point to the old asset will remain the same. Any collaborating mezzes should see the annotated image, as the annotated image is on disk and can be transferred. In either case, the user remains in the annotation view and have to exit explicitly. This allows the user to make further modifications and upload new versions of the annotated slide.

Collaboration Concerns

If the iOS user is annotating a slide, and another user deletes the slide, the iOS user can continue editing the slide. When this happens, the 'Replace Existing Slide' option will be disabled, but the user can still upload the annotated slide as a new one.

If the dossier is closed, the slide annotation interface will close automatically regardless of whether the user is mid-drawing or not. An in-progress freehand annotation will be discarded, but previously completed annotations will remain in accordance to the Persistence section. If two users both try to replace the same slide at the same time, the last person wins. Neither user's work is lost, since they can drag the new asset in from Paramus.

A remote mezz will receive the annotated asset as it would with a new asset, and if the user is replacing a slide with a new asset, the source slide would point to the new asset on both local and remote mezz. An embodiment allows user to finish annotating and save to the temporary upload pile, described as a holding cell in the section on Document Interaction specs.

Persistence

Annotations only exist as local, in-memory objects. They are not saved to Mezzanine and are deleted when the app disconnects from Mezzanine. They, however, persist during a Mezzanine session. (Annotations are not deleted when a slide is closed or when the dossier is closed.) If the same slide is opened again in the slide viewer during the same session, previously created annotations remain on the slide. This allows users to further annotate a slide if necessary. A user can start from scratch if necessary using the Clear function.

Implementation

Annotation is stored locally as a property on an MZSlide instance. The data model will consist of an array of annotation objects, each Annotation object implementing the CALayerDelegate protocol to handle its own drawing. The -drawLayer:inContext: method is implemented as a category on the Annotation object, as a means of avoiding parallel class structure while separating model and view. The annotation view, which sits on a layer on top of the slide image handles the drawing of annotations by managing each of the CALayers associated with an annotation. In an embodiment, parallel class trees are used.

iOS Interface Orientation

On iOS devices, interface orientation presents an opportunity to reveal or hide interface elements depending on whether the device is oriented horizontally or vertically. The iPad interface is generally unperturbed under interface orientation change. The layout of the toolbars and content area shifts to accommodate changes in view size and aspect ratio, however. On an iPod or iPhone, the top and bottom toolbars are available in portrait mode but not in landscape mode. While this limits interface capabilities in landscape mode, the user's view of the slides is uncluttered by interface elements.

iOS Multitasking

An embodiment supports iOS multi-tasking in the Mezzanine app. When a user presses the home button on an iOS 4.0 device, the app is put in a background state. Network functionality is restricted to audio, VOIP, or a time-limited operations thread. If the user loads many programs after closing Mezzanine, it will be shut down and its memory purged. This case is no different than simply quitting the app. If the user switches to another program and returns to Mezzanine, it attempts to reconnect to all related pools such as mezz-tesla and mezz-inbound-snapshots. Since when the app goes into background, the time elapsed until resumption cannot be known, the system disconnects all hoses and reconnects them when the app is resumed into the foreground. If the Mezzanine system is shut down or cannot be reached during reconnection, the app should return to the login screen.

iOS

Connection Screen

In an embodiment a user specifies a Mezzanine system to join on the connection screen. The class is in the SDK-level and is used by Peek and any other app that connects to a pool. If the string does not start with "tcp://", the app will automatically prepend it, such that users can simply enter more readable names such as 'mezzytesty' or 'mezz107'. The system remembers a list of recently connected servers. A server is only added to this list if it was a previously successful connection. User can select an item from the previously connected server list, and it will populate the text box. A user can clear the recent servers list. Only a portrait orientation is supported for the iPhone; both orientations are supported for the iPad.

Lost Connection

A disconnection can occur in situations such as: device network connectivity problem; pool_tcp service goes down; the native app stops responding or crashes; tther networking problem. The app responds appropriately and the user is informed. If a heartbeat protein is not received from the native app for 30 seconds, the disconnection mechanism kicks in. The user is returned to the connection screen. An alert is shown to the user.

Disconnect

In an embodiment a red 'Disconnect' button is available in the deck view. The button is located in the bottom toolbar, where swiping left and right will reveal more controls (similar to the multi-tasking bar of iOS 4). On the right-most section is a red Disconnect button. On the iPhone, the user needs to be viewing the deck in portrait mode. The user will be given a confirmation alert before actually disconnecting. Upon tapping an approval button, the app does not send mezzanine a message and simply disconnects all pool hoses, readwrite threads and all observation (KVO, NSNotification) hooks. The user is returned to the connection screen immediately. In some cases when network connectivity is down, the disconnection will continue for several minutes in background threads because pool_withdraw will take forever before SIGPIPE interrupts it. Dependencies are libLoam, libPlasma, and Three20.

Android Client

Dependencies

A Java implementation of the TCP pool protocols and Slaw/Protein data structures undergirds the Android client. Non-binding, it does not use any C or C++ code or libraries. Instead, it implements from scratch all routines necessary to communicate with pool servers. The library's public interface lives in a top-level package and uses the core abstractions of the g-speak system, including by not limited to Slaw, Protein, Pool, and Hose. It incorporates new elements, including but not limited to the ability to have in-memory pools.

App Structure

The Mezzanine app for Android consists of one Service of the Android platform for communication with native mezz, and a single Activity of the Android platform. (Below, a Service of the Andoir platform is referred to as "Android Service," and an Activity of the Android platform is referred to as "Android Activity.") In an embodiment, breaking the app into multiple Activities is not necessary. This is based on the design choice that the back button exits Mezzanine, regardless of whether the user is in the connection view, in the dossier portal or in a dossier view. The single Mezzanine activity is broken down into Fragments of the Android platform based on logical division of the interface, which is necessary for code-reuse in the phone and tablet versions of the app.

Components: Mezzanine Service

The Mezzanine app communicates with native mezz on behalf of a subscribed Android Activity, via a single Android Service, which internally manages multiple communication threads. Requests are made to Mezzanine by making calls to the Android Service, while responses and PSAs generate events that the Mezzanine Activity will subscribe and react to. The Mezzanine Service handle tasks including but not limited to joining a Mezzanine, firing change events when proteins are received from the native application, and sending request proteins. The Mezzanine Activity would be the main consumer for such a Service. States of the Mezzanine Service include but are not limited to Idle/Disconnecting, Connecting, Joining, and Connected. In the Idle/Disconnecting state, the Service is not connected to a Mezzanine. In the Connecting state, the app is attempting to establish connections to pools on the native application. In the Joining state, a connection to the system is established, but the app has not joined the Mezzanine session. This is also the state the app is in when the user is required to enter a passphrase. In the Connected state, the app has joined Mezzanine.

For receiving proteins, a read thread is embedded in the Mezzanine Service, which received proteins from the mz-from-native pool. On receipt of proteins, specific protein handlers. For sending proteins, a write thread is spawned from the Mezzanine Service, which sends proteins that have been added to a protein queue. A subscriber to the Mezz Service would call a public API to send various request proteins, but does not need to know specific implementation or communication protocols. For code separation, the generation of various proteins should be done in a separate class askin to the native application's Ribosome or the iOS protein factory.

When the Mezz Service is in the Connected state as described above, and is running and connected to a Mezzanine, the Android client will send a periodic heartbeat protein to prevent the native application from triggering its client input. Reciprocally, the Mezz Service will monitor heartbeat proteins received from the native application.

Components: Mezzanine Activity

The Mezzanine Activity is a single Android Activity, comprising and switching between various Fragments of the Android platform to represent various states of the UI. This does not include the action of photo taking, which uses the Android photo Activity. Android Fragments used in the system includes but is not limited to: Connection Fragment, Login Fragment, Passphrase Fragment, Portal Fragment, Dossier Fragment, and Paramus Fragment. Other Activities include but are not limited to Image Upload, a functionality that uses Android's Image Capture Activity.

Connection

Connection Fragment of a system supports text-entry method of connecting to Mezzanine. The user also views a list of nearby Mezzanines for connection to a native Mezzanine.

Login

Login Fragment of a system enables the user to log in and private dossiers. While in the dossier portal, a user can select the Log In feature. In an embodiment the Login Fragment display comprises a username field, a password field, and a join button. Upon successful login, the username is temporarily saved for this session to the Mezzanine. On subsequent display of this fragment during the same session, the username field will be pre-populated with the last username, but the password field will be cleared.

Passphrase

The Passphrase Fragment is displayed when a user on the native Mezzanine engages the passphrase lock, or when the Android app tries to join an already locked Mezzanine session. When displayed, the Passphrase Fragment covers any area of the screen that pertain to user data of the system, so that users who have not entered the correct passphrase do not see updates from the native application. In an embodiment, the user is prompted to enter the three letter passphrase into the 3 large text fields, and each letter should be automatically capitalized. Each character entry will advance the UI focus (insertion point) to the next field, and when the 3rd character is pressed the passphrase-based join request is immediately. When the Passphrase Fragment is engaged, a click on the back button exits the Mezzanine Activity and returns the user to the previous Activity in the stack.

The Portal Fragment of a system enables the dossier portal. In the dossier portal, the user should see a list of public dossiers, with each row displaying the thumbnail and title. The list is sorted alphabetically and it responds to updates from other clients including but not limited to new dossier, rename dossier, and delete dossier. If the user logs into Mezzanine using a superuser login, the portal fragment displays a list of dossiers that is separated into sections by username. The sections themselves are ordered alphabetically. A menu is presented to a user when a long tap is detected on a dossier row. Options in this menu include but are not limited to rename dossier, duplicate dossier, and delete dossier.

When the native mezz opens a dossier, the system provides feedback. The dossier being opened is highlighted while other dossiers are dimmed to indicate a disabled state. The system also disables controls (visually and interaction-wise) that pertain to creating, renaming, deleting. The system displays this feedback regardless of whether the Android user, the native mezz, or another client initiates the opening of the dossier. The user can engage in actions including but not limited to open dossier, create dossier, rename dossier, duplicate dossier, and delete dossier.

Dossier

The Dossier Fragment enables representation of a dossier that is opened on the native application, including but not limited a deck and toolbars to access features including but not limited to image upload, view sync, and toggle display of the asset bin. In a current embodiment, the deck and deck slider comprise the dossier view. In another embodiment, a more robust asset bin, windshield, and available corkboards also comprise the dossier view.

Paramus

In this latter embodiment, the Paramus Fragment is separate from the Dossier Fragment. This Paramus Fragment supports additional screen modalities related to the asset bin and the video bin, including but not limited to slide creation view. In the Paramaus Fragment view, users can engage in functions including but not limited to dragging and dropping assets onto the deck of windshield.

Deck

In pushback mode on the Android client, the slides comprising the deck are displayed horizontally three at a time. The deck display on the Android client reflects changes made within the native application or other clients, including but not limited to adding slide, removing slide, and reordering slides. If a dossier has zero slides, a label with "No Slides" should be shown.

View Sync: The Android client by default synchronizes its view with native mezz, but users often want to review a previous slide or browse ahead. A local browsing mode/view desync feature decouples the client's viewport from the native mezz's. When local browsing is enabled, viewport updates from the native application are still consumed and stored locally, but they do not affect the visual state of the app. While the user still can navigate slides and perform pushback as necessary, changes are not mirrored on the native mezz. All other actions that manipulate the data content of the dossier (including but not limited to adjustments to deck, windshield and paramus, are still synced to the native application When the user disables local browsing, the system immediately syncs the local view to the native application's viewport. The interface for view sync is presented as an on-screen button with a normal and highlight state, so that the user efficiently can determine the current state of the feature.

Control: A user swipes with one finger to move between slides of a deck. A left swipe moves the deck to the previous slide, and a right swipe advances the deck to the next slide. If the user has engaged the "view sync" of a system, the native application scrolls accordingly. User input of a partial swipe should perturb the deck horizontally but not scroll the deck to the next or previous slide completely until the user releases the finger.

Pushback: In a dossier the user engage pushback by dragging two fingers up and down simultaneously on the deck. An upward gesture causes the system to zoom in (where screen elements become smaller), and the downward gesture causes the system to zoom out. During pushback, the client will continuously adjust the native application's pushback state. When the user releases the fingers, the native application snaps to either pushback mode or fullscreen mode depending on user input.

Thumbnails: On first load of the deck, each slide is displayed as a gray rectangle while thumbnails are loaded to ensure minimal delay in UI feedback. The client app loads thumbnail images lazily based on the content currently visible on the viewport, and places the image in place of the placeholder background. For tablet devices or devices with 'retina'-like pixel density, when a slide is in fullscreen mode, the app also requests the full resolution image while the thumbnail is being displayed. It subsequently can fade in this display of the full resolution image. When a slide with a full-resolution image is scrolled out of view, or if the view is pushed back, the slide releases the full resolution image and displays instead the thumbnail image.

Image Upload

When a user uploads an image to Mezzanine, the system displays a popup with two options: the user can select an image from internal storage or take a photo using the built-in camera. If the device does not have a camera, the user is directed immediately to the photo library. Once an image is selected or a photo is taken, the client sends an upload request to native Mezzanine. The system responds with asset uid reserved for this image upload. The client then sends the image data to the mz-incoming-assets pool to complete the upload.

Mezzanine may also respond with an error, in which case the app displays information on the problem preventing the image upload. While an image is being uploaded, an on-screen status is displayed on the dossier view showing that an activity is happening (no progress information). If there are multiple images being queued to be uploaded, the status text will display the number of pending uploads. The Android standard camera capture activity is shown and the user can take snapshots using the device's camera. On confirmation from the user that the photo is good, the app will begin requesting for the upload of the image. The user is shown a grid of photos taken from the camera's onboard storage, tapping on each photo will select the particular image to be added to the pending upload list.

Remote Collaboration

Remote Collaboration refers to the ability of multiple Mezzanine sites to join each other in collaboration, offering a shared and synchronized workspace from one room to the next, or across the globe. This section describes fundamental components related to joining, leaving, and managing Collaborations. Other sections, including on ephemera, locking, locking algorithm, M2M, presence indication, progressive loading, RTSP server, UI banker bathyscaphe, video streaming, web admin, and windshield proteins, provide additional information on features that facilitate ongoing collaborations. A section on M2M disabled describes how to disable Remote Collaboration.

Terminology

"Collaboration" is a collaborative session between two or more connected Mezzanines. A capital 'C' is used in this section when referring to an inter-Mezzanine Collaboration.

"Join" is the act of initiating a Collaboration with another Mezzanine. A synonym in other collaborative technologies might be "call".

"Invite" is the act of inviting another Mezzanine to join and ongoing Collaboration.

"Leave" is the act of leaving an ongoing Collaboration. A synonym in other collaborative technologies might be "hang up".

In this section, "call" is used to refer to the act of initiating communication with another Mezzanine.

Call Model

Join Only

In an embodiment, Collaborations will function in a call-in only, or "join" model. It is possible to send a request to join a remote Mezzanine; it is not possible to send an invitation to a remote Mezzanine asking it to join you.

This distinction is imposed for a few reasons. Most importantly, Collaborations involve a shared context, such as the currently open dossier. The join-only model simplifies the situation by eliminating the possibility that two potential Collaborators are both in their own independent dossiers, thus eliminating the need for conflict resolution or more detailed messaging.

Multi-Way Collaboration

It is possible to join a remote Mezzanine already in a Collaboration (one-to-one or multi-way), which results in a multi-way Collaboration. This scenario may be common in use cases, as a "host" Mezzanine may arrange to have several others call it for a meeting.

However, all participants do not need to call the same Mezzanine to initiate such a Collaboration. If Mezzanine B joins Mezzanine A—Resulting in Collaboration {A, B}—Mezzanine C can then join either A or B. In both cases, Collaboration {A, B, C} will result. The only notable difference is that only the recipient of the join request receives the notification and has the opportunity to accept or decline it. An embodiment supports up to three Mezzanines in a Collaboration at once. This number is arbitrary (except that the number exceeding two requires a system with multi-way support). Alternative embodiments increase this number.

Host-Less Collaboration

Mezzanine Collaboration operates in a host-less manner. While the technical requirements of the locking system, as described in another section, require one Mezzanine to take on a privileged role from time to time, neither the management of the Collaboration nor its persistence is dependent on any one Mezzanine. In particular, a Collaboration may continue as long as any two Mezzanines remain a part of it. This is true even if the Mezzanine that everyone joined leaves the Collaboration. In other words, any participant may leave a Collaboration at any time with no ill effects for the other participants.

Adding Invitation Support

In the same model, an embodiment includes invitations.

Joining

Sending a Join Request

Clicking on any Mezzanine in the list sends a join request to that Mezzanine, asking for permission to join them in collaboration. While a response is pending clicking anywhere on the dimmed backing region will dismiss the overlay and cancel the request. If no response is received within a period of 60 seconds (this interval may be configurable in app-settings) then the request will time out and a transient "request timed out" banner will display for a second or so before the overlay fades away. In a first stage of this sequence, the HandiPoint hovers over an item in the Mezzanine list. The HandiPoint hardens to select a Mezzanine, banner displaying text "join" appears as MezzanineImp expands. HandiPoint softens within bounds of MezzanineImp, triggering a call to that Mezzanine. Other Mezzanines are grayed out, and navigation is disabled during this time. After joining a session, the Mezzanine list in the portal is replaced with a list of collaborators and a button for "hanging up" or leaving the collaboration.

Canceling a Join Request

With passforward or a wand, the user can click outside the area of the selected Mezzanine to cancel the call.

Receiving a Join Request

When a join request from a remote Mezzanine arrives, the native application displays a modal alert identifying the remote site by name. Options are presented to either accept or decline. If the collaboration is already full (according to the m2m-max-session-size in app-settings.protein) then the call is automatically declined and no alert is shown.

Dossier Transfer

When one Mezzanine joins another, they share any dossiers opened during the course of the collaboration. If Mezzanine A opens a dossier that Mezzanine B does not have, then Mezzanine B receives a fresh copy of that dossier with the same name, contents, and UID.

However, to prevent excessive proliferation of dossiers resulting from repeated (say, weekly) collaborations, Mezzanine attempts to avoid copying dossiers if the same dossier already exists on the receiving Mezzanine. If an equivalent dossier is found on Mezzanine B, then both Mezzanines open their existing and identical dossiers; no copies are made and no UIDs are changed. If no equivalent dossier exists on Mezzanine B, then a new copy is created.

Dossier equality is determined by comparing the contents of the dossier on disk, such as with the following command to compute a hash of the data in dossier directory while ignoring modification dates find /chattel/mezzateria/ds- 2de17c4a-3e87-4f74-9a89-aa48011cbc61-type f|grep-v-e "mod-date\|viddle-event-assocs\|doss-thumb\.png"|sort|xargs cat|shasum-a 512.

The Mezzanine that opens a dossier in a collaboration will run this command prior to the loading process, and send the resulting hash to all collaborating Mezzanines (in the will-open-dossier protein). The Mezzanine receiving the open request will then run the same command on the existing dossier with the same UID, if it exists, and compare the output in order to determine equality.

In creating dossier copies, dossier copies transferred from a remote Mezzanine in a collaboration receive the same UID by default. However, if the receiving Mezzanine has a dossier sharing the same UID as the dossier being opened and it is not determined to be equivalent, then a copy of the remote dossier is created and given a fresh UID.

When a dossier does get reassigned a new UID, Mezzanine appends a number to its name to provide a loose indication of versioning for users, and to ensure that the new copies are sorted in a logical order in the list. The suffix consists of the word "backup" and a padded (3 digits) number in parenthesis, following a space eg. "my doss" will become "my doss (backup 001)", then "my doss (backup 002)", etc. The contents, thumbnail, and modification date of these dossiers will not be changed.

This numbering will be handled in the same way desktop UIs handle duplicate naming. Specifically, the creation of "my doss (backup x)" would require "my doss" as well as "my doss (backup 001)" through "my doss (backup x-1)" to be present. If a user artfully constructed dossier names in this exact manner, the numbering of later copies would follow the pattern, picking up at the next available integer. (An alternative embodiment implements logical sorting, which avoids the need to use padded numbers.)

To further reduce the chance of a UID collision, the product also reassign UIDs when renaming dossiers. A current embodiment only detects identical copies. In the future it would be far preferable to relax the restriction in order to distinguish viewing actions (e.g., scrolling, push-back, etc.) from editing actions (eg. adding or deleting objects, reordering slides, etc.), and only create copies when editing actions have been taken on a dossier. If two dossiers differ only by viewing actions, they could still be considered identical, and their viewing states synced once the dossier is opened.

In Collaboration

In an embodiment that does not support invitations, the Mezzanine list is hidden while in a Collaboration. As soon as the Collaboration starts, an alternate UI appears which blocks view of the list, and displays the list of collaborators. The "Mezzanines" header changes to "Collaboration" to indicate the new state; below it, the list of (other) participants is displayed.

Leaving

A participant can leave at any time. A dossier does not need to be closed to leave. Inside or outside of a dossier, a user leaves by hardening HandiPoint on the persistent presence indicator, pointing toward the ceiling, and softening the HandiPoint. Pointing toward the ceiling while hardened on the presence indicator obscures collaboration information. A message appears asking if the user is leaving the collaboration. Users can confirm or cancel leaving the collaboration via modal alerts, described in another section, after softening. A Collaboration continues even if the participant who left started it. A dossier from remote site implicitly kept following a Collaboration. When a native user tries to leave a collaboration, his/her local Mezzanine shows a Modal Alert asking the user to confirm.

Private Dossiers

Leaving a collaboration while a private dossier is open trigger different notifications than when leaving a public dossier. When the dossier is closed, the m2m copy is automatically removed on non-host systems (as described in a section on security). The notification message is different to indicate that the remotely-private dossier will not be available in the native and web/mobile client portals. On a wandless system where there is no native close-dossier modal dialog, the web/mobile close dialog will not change, but there will be an additional transient modal alert natively to indicate that the dossier will not be available When the Mezz hosting the private dossier is disconnected from other collaborators (whether via a network drop or either side voluntarily leaving), a transient modal alert notification appears. On the Mezz that owns the dossier, the notification indicates that former collaborators cannot download the dossier. On any other collaborating Mezz (that did not own the dossier), a different message indicates that their changes will not persist, and that the dossier will not be available after it is closed.

Dropped Connection

A dropped connection is distinct from leaving the collaboration. Even though a connection is dropped, a participant technically still is in the collaboration. Other participants in the Collaboration may continue working. If the dropped Mezzanine held the lock prior to the drop, the lock holder is renegotiated. A modal alert indicates the drop, as well as an attempted reconnection. An embodiment shows this with a timeout, after which the Collaboration is implicitly left. A "leave" button lets the participant leave the Collaboration explicitly.

Invitations

An embodiment supports invitations. Additional participants can be invited to an ongoing Collaboration from within a dossier. Multiple Mezzanines can be invited to collaborate with one "click" via Collaboration groups.

Syncing

Shared Mindset

A participant is either in the portal or a dossier. A dossier view is shared; the portal view is independent. The view a participant in a Collaboration is in is shared.

State

In some situations it may be possible for several Mezzanines in a Collaboration to get out of sync with each other. For instance, if participants in a Collaboration continue working in the interval between when one Mezzanine drops the connection and rejoins, the rejoining Mezzanine may need to acquire new state. The system deploys periodic state blobs to keep sync. An embodiment transcludes or includes M2M syncing.

Administration

Maintaining and editing the collaborator list, as well as the profile information of the local mezz, will be done through a web-based admin application. Protein and pool information is available in the Protein Spec The Mezzanine profile includes company name, Mezz/room name, location, and timezone. Creating the list of "buddy" Mezzes is a task of the admin UI.

Presence Indication

When participating in a Collaboration with one or more Mezzanines, participants may like to know who they are connected with, or when a remote party is interacting with something on screen. The Collaboration should feel as seamless as possible, while at the same time provide visual cues to help participants understand the model and its limitations in a way that is as intuitive and unobtrusive as possible.

Mezzanine combines several approaches to visualizing presence, including a persistent presence indicator, display and identification of remote HandiPoints, and potentially an instantiable widget containing additional presence information.

Persistent Presence Indicator

A system provides indication of ongoing communication is provided at all times. This indication needs to be persistent, yet unobtrusive so that it does not interfere with the work being done. Participants may also like to know specifically who else is connected, or when a remote party is interacting with something on screen; the presence indicator provides the opportunity to visualize these pieces of information.

The presence indicator resides in the lower right corner of the workspace. It may partially obscure video or MezzanineImp in this location, though not completely, so that interaction with those other elements remains possible. The presence indicator collapses on single-feld workspaces to reduce the obstructed area. It occupies less horizontal space than it would in a triptych (with the collaborator details), but maintains the same height. A presence indicator remains fixed in front of all other interface elements, and as such remains visible when scrolling between dossier and Mezzanine lists.

The border around the presence indicator is white. The background color varies by state.

Expansion States

The presence indicator may collapse or expand as appropriate in a given context, making a tradeoff between the amount of visible information and the extent to which it might interfere with other interactions in the workspace. In particular, it always appears in collapsed mode in a single-feld scenario since the content beneath it cannot be scrolled out of the way given that it appears on the main, and only, feld.

While its crucial that the presence indicator remain visible at all times, there are also circumstances such as single-feld mode in which it could inhibit interaction with the workspace. When collapsed the footprint is reduced, thus reducing the area it obscures. No text is shown; instead, only the iconic lock visualization graphic is displayed by default.

Hovering over the presence indicator causes it to expand to the default state, showing the names and number of participants as usual. After a brief delay of 0.5 seconds without hover, it then collapses again automatically.

In the default state the presence indicator shows the local Mezzanine name, the name of the most recent remote Mezzanine to interact with the workspace, the number of participants in the collaboration, and the iconic visualization of the lock state. An embodiment adds an additional fully expanded state that provides information about all participants in a 3+ Mezzanine Collaboration.

Number of Participants

The presence indicator adjusts its form depending on the number of participants in the Collaboration. When a Collaboration is between only two Mezzanines, the presence indicator displays the name of the remote Mezzanine. One-to-one collaboration is common, and this behavior allows the participants to see, at a glance, who they are collaborating with.

When 3 or more Mezzanines are in a Collaboration together, displaying the names of all of them would require too much screen real estate and conflict with workspace interactions. For this reason, the presence indicator shows only the name of the most recent remote lock holder and the number of additional participants (prefixed with a +). For example, in a Collaboration with 3 participants, the name of the local site will show and the name of one remote site will show followed by "+1" for the remote site not named.

In a single feld Mezzanine, neither the local name nor remote names are shown, so the above does not apply.

Visualizing Lock Possession

The presence indicator takes on the additional role of indicating when a remote Mezzanine currently has the lock. This provides an additional visual cue to local participants that their interactions may not succeed, without needing to point their HandiPoint at the triptych (as the HandiPoints themselves also visualize this information). When a remote Mezzanine has the lock, its name is highlighted, and the lock indicator slides to the right. When the local Mezzanine has the lock, its name is highlighted, and the lock indicator slides to the left. When a collaboration contains more than two participants, a "+n" indicator appears to the right of the most recent remote lock-holder's name.

The presence indicator visualizes any change in lock ownership and shows the name of the current lock holder in white. All other participants are greyed out. An animated graphic sits between the names of the local and remote participants. The graphic indicates a track with two ends; it is overlayed with another graphic (white circle) that changes sides of the track depending on remote or local lock possession. Those animated transitions are described below. The lock possession glyph also animates when a party is actively holding the lock (for example, by dragging an asset on the Windshield). The circle grows and shrinks in size while the lock is actively in use (for both remote and local lock possession).

In a single feld Mezzanine, the lock visualization is the only part of the presence indicator that is visible at all times. The presence indicator collapses on single-feld workspaces to reduce the obstructed area. It only contains the lock visualization.

The system's animated transitions for lock state include remote to remote, remote to local, and local to remote. In remote to remote transition, the name of the old remote lock holder is replaced with the new one. The size of the presence indicator may grow or shrink horizontally to accommodate the new name. The lock indicator graphic does not move; it stays on the right side of the track, just to the left of the new lock holder's name. In remote to local transition, the name of the local Mezzanine turns white and the lock indicator moves to the left of the track to sit next to the local Mezzanine name. The old remote lock holder's name just turns grey. If last remote locker leaves while the local site has the lock, the name of another participating site is chosen at random (unless there is just one other site, then that one is chosen). In local to remote transition, the name of the local Mezzanine turns grey and the lock indicator moves to the right of the track to sit next to the remote Mezzanine name. The new lock holder's name is shown in white to the right of the lock indicator. If there are multiple remote participants, additional participants are shown as "+N" in grey, to the right of the name of the lock holder.

Remote Handipoints

HandiPoints are a visual representation of the wands in the Mezzanine interface, and therefore an extension of the participants holding them. During a Collaboration, the display of remote HandiPoints indicates the presence of others and offers an impression of their interactions with the workspace. This also provides a crucial tool for communication, as the HandiPoints themselves may be used strictly as pointing devices (much like a laser pointer) to call attention to particular areas of the screen.

Furthermore, the presence of the remote HandiPoints can serve as a preliminary indication of the intended actions of a remote participant. This can help reduce the likelihood of conflict and unsuccessful actions.

To support these use cases, the HandiPoints of all collaboration participants are shown at all times. Remote HandiPoints will always be displayed in a manner distinct from the local ones at any given moment since, as described in the section on locking, those without the lock are inverted. As an additional visual cue, remote HandiPoints are ghosted, their alpha value lessened by at least 50% to deemphasize them and make local HandiPoints easier to identify. An embodiment, extending this idea, visualizes glyphs for remote actions (move & scale, etc.) in a manner that is unique also.

Expanded View

In a future embodiment, when a HandiPoint hovers over and/or hardens on the presence widget, more details about the connected Mezzanines is revealed, including their names and the identity of the lockholder. The appearance of the individual participants in expanded view closely matches the appearance of the indicator in a one-to-one Collaboration.

Presence Widget

In an embodiment, the presence widget is draggable from Hoboken.

Progressive Loading

When two Mezzanines are in a collaborative session and one opens a dossier that the other does not have, that latter dossier and its contents must be transferred. This occurs in a progressive fashion so that the dossier interface is shown as quickly as possible, with higher fidelity images and assets loading over time. Progressive loading is essential to providing a collaborative experience between Mezzanines. Interaction with Mezzanine is not affected by progressive loading. The system remains fully responsive to all interactions as soon as the placeholders become visible.

Thumbnails

Thumbnails are the primary means of progressive loading support. By transferring lower resolution images first, the system provides context to the receiving Mezzanine to enable basic understanding of the content and facilitate discussion and manipulation of the workspace.

Placeholders

Even thumbnails will take some amount of time to transmit. In order to provide a functional dossier environment as quickly as possible, asset placeholders are shown before thumbnails load. The size and position of every asset within the dossier is communicated up front, as this information is lightweight and allows the creation of placeholders that as nearly as possible represent the state of the dossier, and allow smooth transitions when the assets do finally load.

The asset placeholders are rectangles that exhibit behaviors identical to those of their full-resolution counterparts. Each corner of the placeholder contains a white L-bracket. While the asset is loading, the brightness and opacity of the bracket oscillates slightly to show activity. The background of the asset is filled in with a light, transparent grey. In the Windshield, the size of the placeholder matches the size of the asset exactly. In the Deck and Paramus, placeholders take up the gridded area for the asset (the full size of a slide, or the full area allocated for the asset preview in Paramus, regardless of the size of the underlying content).

Sizes

Since images are shown at many sizes in the interface—small in Paramus, large in the Deck, and perhaps larger on the Windshield—it is prudent to optimize the creation of thumbnails based on where the assets currently exist in the Dossier. For simplicity thumbnails are provided in a small size or a large size, in addition to full resolution. Small size thumbnails are used to represent assets in Paramus. Large size thumbnails are used for all other assets, such as on the Windshield or Corkboards, and in the Deck.

While it will be possible for participants to change the state of the dossier before the assets load (eg. by adding an asset to the Deck from Paramus), it is not strictly necessary to transmit updated thumbnails in these instances, though this may be ideal.

Transition

The system provides a smooth transition between placeholder and thumbnail, and between thumbnail and full resolution image. The transition simply causes the new image to fade in from fully transparent to fully opaque over a short duration. The underlying placeholder or thumbnail does not fade out during this transition, but remains opaque until the transition completes, at which point it may be removed as appropriate. The thumbnail fades in linearly with a duration of 0.4 seconds. The crossfade from thumbnail to full res asset lasts 1.5 seconds. The size of the asset does not change during this animation; it is at its full size throughout. A future embodiment that supports video assets provides progressive loading of those assets. An overload progress bar indicates that the asset is a video resource, as well as how long it will take to download.

Partially Transferred Dossiers

If asset transfer is underway when a Mezzanine closes the dossier or leaves collaboration, it continues to fetch assets in the background. Opening a new dossier will prioritize assets from this dossier above those that are being transferred already. This prioritization only applies to assets that have not been transferred over the wire already. In other words, if pygiandros' conversion is running behind the network transfers (it usually is), then the assets that have already been transferred will be converted first.

Opening a partially transferred dossier in a collaboration causes the missing assets to be re-requested from participating Mezzanines. If none of the participating Mezzanines has an asset, then nothing is done about the asset. Lockholders may request and fetch assets from non lock-holders or vice versa. If a previously queued up transfer finishes, then the newly transferred asset is announced as available to the other collaborating Mezzanines. They might fetch it if the asset exists in their currently opened dossiers.

Spatial Optimization

Mezzanine, more than most other computing tools, takes great advantage of space. The content within dossiers may stretch across a substantial distance, yet only a small portion of the dossier is visible at any time. The size of the triptych relative to the number of slides supports this possibility, which also depends on the current pushback state.

To further optimize the experience, Mezzanine selectively transfers high fidelity assets in view first, and others that are not visible later. Optionally, downloads could even be suspended, or moved to the back of the queue, if the deck is scrolled to a substantially different location. In general, in an embodiment, asset loading is optimized with the following priorities:

1. assets visible in the Windshield
2. assets currently visible in the Deck
3. upcoming assets in the Deck
4. previous assets in the Deck 5. other assets in the Deck
6. assets visible in Paramus
7. other assets in Paramus Mezzanine Interconnection Protocol The Mezzanine Interconnection Protocol, also known as "MIP," is a connection-level protocol with the robustness and simplicity necessarily for multi-way, consistent, available, persistent, and partition-tolerant interconnectivity.

Purpose

In the following scenario there is a machine "Alice" who wants to know facts about a machine "Bob." Alice seeks to establish if Bob is running Mezzanine (or application X). Stated more formally, Alice seeks to know of Bob's server has a Mezzanine client connection. Alice also seeks to establish if Bob is in her call (or session). State more formally, Alice seeks to know whether she should propagate to Bob and if she should expect Bob to propagate to her.

The interconnect protocol answers such questions, and is a stepping stone to integrating a Session Integration Protocol, also known as "SIP." An embodiment current at this point time can be retrofitted, in the future, to work with third party devices and technologies that are SIP aware.

General Architecture

There are two types of objects, a physical installation and clients. A physical installation can be referred to as server, node or participant. The physical installation generally runs a single server process, which has an associated identification. This identification comprises a unique signature and contains the information necessary to directly contact or indirectly contact it, such as a URL. In a current embodiment, all servers that communicate with each other must have their identifications uploaded prior to contacting. In an embodiment, identifications are propagated.

This refers to an instance of a specific application, which in the following description comprises Mezzanine. Additionally, there are two separate protocols, Server-Server and Client-Server. Client-Server protocol works between standalone servers on these installations and client applications (which in a current embodiment is the Mezzanine application on a Mezzanine installation).

Server-Server Protocol Overview

Server-Server protocol works between physical installations of a connection between physical installations of Mezzanine. It is agnostic, distributed, trusted, half or full-duplex, acknowledgement-based, transactional, and broadcast-driven.

The Server-Server protocol is agnostic. The payloads of the protocol are opaque, human-readable YAML blobs. They are independent of the underlying transport mechanism and can currently work over raw TCP or pools. In the future, this can be extended to HTTP or any other protocols that support transferring arbitrary text.

The Server-Server protocol is distributed. A hierarchical store conferred between nodes comprises the entire tree, or the sub-tree or just an attribute. Each node associates a time-stamp and source with parts of their store so they can make decisions based on how authoritative any fact within the tree is.

The Server-Server protocol is trusted. Participants are only trusted to change facts that correspond to themselves since they are the only ones that have that authoritative information. If a node times out or goes off-line without notice, that is derived separately by each node through a heartbeat mechanism. No node trusts the authority of another node. When Alice calls Bob and Bob accepts, since only Alice can change Alice's state, Alice changes her status to "connected" and then propagates the fact. The other nodes trust that Alice knows about her own state and updates theirs. The protocol is atomic and unambiguous as well. Since the store is a collection of facts about nodes, and since the facts of each node can only be modified by the node itself, any dispute resolution that arises has a clear path to settlement. It looks into the node in dispute and trust state, which is an unambiguous property. Each operation, since it can only be done by one physical machine, is characterized as atomic, even though it comprises a shared store.

The connections are assumed to be half-duplex or full-duplex. Each node can differentiate between its messages and those of others, and can maintain different sending and receiving queues, with the network agnosticism as described above.

The Server-Server protocol includes an acknowledgement system, addressed purposes including a node going offline. First, the node announces its intention to go offline (or leave a session) to all relevant nodes. Each node then sends back an acknowledgement that it has received the message, and then at that time the node goes offline. This sequence includes time-out and retransmission systems, in addition to notifications.

The Server-Server protocol is broadcast-driven. At any given time it comprises two sets of installations, those within a call (or session) and those that are known. Session-based information is broadcasted to all participants of the session and availability information is broadcasted to all known nodes.

Server-Server Protocol

Structure

The YAML payload is broken up into two fields "header and "body." The header field has the fields request-sequence, timestamp, sender, and request-id. Request-sequence comprises increments, starting from 1, unique to the running instance of a server. The timestamp field comprises a floating point epoch-based localtime timestamp corresponding to the emission of the protein from the source. The sender field comprises the uid corresponding to the ident of the sender of the message. The request-uid field comprises something to which a respond is keyed if necessary.

The body field varies between embodiments, but has a structure composed of the fields described above. If the message is a response to a request, the request-id field would contain the request to which it is a response, and the response field contains structured data of the response. The action field comprises a directive as explained below. The participant field comprises the original sender (in a current embodiment this is the same as the header).

Peer Management

Peers can be added and removed either by adding the files directly and restarting or through two features "dock" and "forget." In these commands, the peers are added to disk and will remain there upon a restart.

In dock, a server contacts a known pool on a specified DNS or IP host and then awaits for responses. The response is in the form of a full server definition. After receiving it, the servers will then formally greet each other and add themselves to each others lists.

In a forget scenario, Alice removes Bob from her list of servers. If Bob continues to heartbeat, Alice explicitly requests Bob to stop, and then Bob removes Alice from his list. A protocol hole here assumes that Alice still knows how to get to Bob to tell him to stop. Two hosts can dock and forget each other as much as each desires. After a forget, the hosts should eventually stop contacting each other (pending a final heartbeat or perhaps some other last contact point before the explicit request to stop). After Alice removes Bob, Bob will remove Alice implicitly from his list to keep things consistent.

Heartbeats

Two clients timing out is a subjective measure based upon the application context of the clients. A real-time application versus a slow CRUD (create-read-update-delete) operation would expect different timeouts; for instance, perhaps 20 ms and 20 seconds respectively. Since timeouts are subject to applications, heartbeats are done in a generic enough fashion so that (1) most use cases can be accommodated for; and (2) separate clients on the same server do not require separate, redundant heartbeats. For example, in an embodiment, the heartbeats between the servers are at some period, right now, 4 seconds. When a client sets a heartbeat, the actual heartbeat is at a 4 second precision ceiling. For instance, if the user sets a 5 second heartbeat, this becomes 8. This setting meets the needs of Mezzanine.

Behavior for Offline Mezzanine

In one embodiment, when a Mezzanine or MIP is offline, it the only way it is added is by copying the identity file manually and restarting the server. Even if the file is copied, its context are changed so the file is contextualized for the host. Deleting a Mezzanine that is online or offline is described in a section on MIP Sequences.

Actions

In an embodiment actions that go from the client to the server include hello, new-participant, del-participant, update-participant, db-set-result, global-set-result, session-joined, dial-accept, dial-deny, session-join, session-deny, session-decline, and session-leave.

The hello action is sent when a server comes online. The new-participant action is associated with docking and greeting. This is sent when a genuinely new participant comes online. The del-participant action is associated with either forgetting or inconsistent databases. It is a result of a participant requesting another to stop. The update-participant action is similar to the new-participant but is instead sent when the definition of the participant has changed. An example of when it occurs is when the participant became active or inactive. The db-set-result action is a result of the global-participant based db being set. The db is an arbitrary K/V mapping on a per-participant basis. The global-set-result action is a result of the global-participant based variable being manually set. This differs from db-set-result in that it is the next level up in the hierarchy; thus, setting things arbitrarily (such as an uid to 'cheeseburger') could have undefined consequences. The session-join action is associated with message "(participant) joined (session)". In an embodiment the participant and the session are sent with the payload in a separate K/V. This message is emitted when a user joins a session, independent of who was called in order to do the action of the join. The dial-accept action is associated with message "Accepting (participant)". In a current embodiment the participant is sent separately in the payload along with the session details. In another embodiment the session details were previously and redundantly sent with the updating of the state. The dial-deny action is associated with the message "Denying (participant)". This is the denied version of the "dial-accept" action with a similar layout. An exception is the case of a session not existing wherein the key will exist but the value will be the empty string. The session-join action is associated with the message "Joining session (uid)" now the session uid is sent as a separate k/v. The session-deny action is associated with the message "Not joining session (uid)". Similarly to session-join, the session uid is sent as a separate k/v. The session-decline action is associated with the message "(participant) declined joining session (uid)". The session and the participant are sent as separate K/V pairs. The session-leave action is associated with the message "(participant) left session (uid)". The session uid and participant are sent as separate k/v.

Client-Server Protocol Overview

The client-server protocol has the same feature-set as the server-server protocol but with a different protocol.

Client-Server Protocol

Structure

The YAML payload is broken up into two fields of "header" and "body."

Header

The header has the fields sequence, timestamp, sender, uid, and agent. The sequence field comprises incrementing, starting from 1, unique to the running instance of a server. The timestamp field is a floating point epoch-based local-time timestamp corresponding to the emission of the protein from the source. The sender fields comprises a uid corresponding to this instance of the execution of the application. The uid feld comprises something to which a response can be keyed if necessary. The agent field comprises a colon-separated system that identifies where the message is coming from. The format is (uid):client|server:(name) such as 58695f8e-fc64-4806-8e08-182809a6e921:client:ruby. The uid is unique to the application.

Body

While the body varies, its structure includes fields of caller, uid, value, and type. If the message is a response to a request, the caller field contains the agent to which it is a response, the uid field contains the uid to which is is a response, and the value field contains structured data of the response. The type field comprises a directive as explained below.

MIP Sequence

From a semantics point of view, the terms "greet" and "dock" are nearly functionally equivalent. If Alice docks with Bob, Bob then greets Alice. The separation of the two idea ultimately is not important. The concept in general is referred to as either docking or greeting. Typically, both terms are implied when one is used.

When a machine A docks to machine B, in the description below such a machine A is also referred to as "A" and "primary." Such a machine B is also referred to as "B" and "secondary."

A machine docks via hostname or IP address to a special pool named "docking" reserved on the host to be docked with. When a machine docks, it also provides a definition of itself, to enable response from the secondary. The response sent back is a participant definition, which is used in various other places. The system looks at the definition and looks to see if it knows about that host. If it does, it will see if it needs to update its definition. If not, it "updates" it by adding it. In either an update or an add, the system then saves the definition to disk. This means it will either overwrite and existing file or create a new one so that if the server restarts, it will have remembered the host.

When a machine A docks, it does not know the secondary to which it docks, apart from the IP or host name, nor does it know with how many machines it docks. Since the other half of docking is to send over a definition, and the mechanics of what to do with a definition are general, this implicates that a docking request could lead to as many responses as you want. In practice, however, an embodiment leads to one response.

After A has docked, it is assumed that B knows about A and has performed a sequence where it created or updated a definition of the primary and saved the definition to its disk. This technique is used to greet unknown participants in a session if a machine needs to talk to them in a multi-party conference, as depicted in the figures describing MIP sequence.

Forgetting is fairly symmetrical to greeting. When A forgets B, it removes the definition of B its internal tables and delete the definition of B from its disk. B is not explicitly informed that A has forgotten it as a property of the protocol. B is informed as a side-effect the next time B sends anything to A such as, typically, a heartbeat. For example, when A sends a heartbeat message to B, the message contains sufficient information for a reply message from B to A. This reply message typically is an IP address and a pool. If an unknown agent sends a heartbeat, the recipient can send back a request, "stop heartbeat" below, for the agent to stop.

This stop heartbeat invokes the same deletion mechanism of B as forgetting did of A. It means that B automatically without user-interaction removes A, thus keeping the two participant databases on the different hosts consistent.

A machine can forget another machine that is offline because its status does not have to be confirmed. Then, the offline machines do not retain information in its database. When the offline machine comes back online, it sends a heartbeat machine, and is told to forget. There is only one first-contact point in between Mezzanine systems, comprising sending a definition of itself. Docking is the only way to invoke such contact. This helps keep the definitions between hosts consistent. Also, docking is non-destructive and simply attempts to update if things already exist.

Locking

Locking supports coherent collaboration in a system. When collaborating with one or more other Mezzanines, many shared resources in the workspace cannot be manipulated by participants at multiple sites at the same time. To resolve these potential conflicts, a locking system allows only one Mezzanine site to interact with certain elements of the workspace at a time. The workspace will be locked such that only one site, for example, can move windshield items, and add slides.

Locking is designed so that participants grasp the existence of a lock and its inherent restrictions. At the same time, it is structured to minimize cognitive overhead in the system. As such, the lock will be passed from site to site implicitly when actions are initiated. (While a "locking" terminology is used to describe the technology here, users perhaps may better model the functionality, and the interaction, as a "key.")

Lock Granularity

In an embodiment, the locking implementation operates at the site level, preventing nearly all interactions at sites without the lock. Embodiments increase the granularity of the locking mechanism, enabling more fluid and simultaneous editing of the workspace by only restricting interactions with specific assets, functions, or regions of the screen. For example, each element on the Windshield can be independently moved and scaled without affecting anything else in the workspace. Therefore, it is theoretically possible to allow participants at each Mezzanine site to move unique instances of assets on the Windshield simultaneously.

Lock Model

All Mezzanine sites in a collaborative session are treated as equal to the extent possible. However, one site must be in charge of determining the canonical ordering of events to prevent conflicts due to network latency. This site is known as the "locker." The locker has the responsibility to determine the canonical ordering of events, to pass on these events to other Mezzanines, and to pass the lock when it is requested and it is not already in use.

The lock is always held by someone. Even if a Mezzanine is not actively using the lock on account of the interactions of its participants or other ongoing processes, it remains the locker until another Mezzanine site requests that status.

In the native interface, lock acquisition is implicit when the user attempts an action with a HandiPoint. For most actions this moment comes when the HandiPoint hardens. At this point a request is made to the locker to acquire the lock (if the requesting site does not already hold the lock). In some special circumstances, the request may happen due to other interactions: for instance, on behalf of a web or iOS client, or as a result of a wand ratcheting event.

In the interest of making the interface feel as responsive as possible, and to limit frustration during collaborative sessions, all local interactions with the system are enabled regardless of lock possession. This means that an action may begin fluidly and seamlessly on a Mezzanine without the lock. If the lock is successfully acquired before the action is completed, it will succeed as normal. Otherwise, it is cancelled with snapback when either the action ends on behalf of the user (eg. by softening), or when the lock request is denied. Further description is provided in a section on locking algorithm.

Visualization

The acquisition and ownership of the lock is conveyed to the participants in a Mezzanine session so that they fully understand the limitations of the collaborative environment, and know at any time how the system will respond to their interactions. Several of visual cues work in tandem to communicate this information clearly yet discreetly, including handipoints, the persistent presence indicator, and UI elements during interactions.

HandiPoints

The HandiPoints serve as a visual representation of the wands in the Mezzanine interface, and therefore as an extension of the participants holding them. Since this visual pointing element mediates the actions of the wand holder with the elements of the interface, and will often be visible while a participant is interacting with Mezzanine, it offers a very good way to visualize affordances.

In a collaborative Mezzanine session, the affordances change based upon who currently has the lock. To represent this visually the HandiPoint switches between three visual states. (These states are orthogonal to the ratchet modes and styles.)

The Active state represents the HandiPoint as normal, implicitly indicating lock possession since it appears just as it would in a non-collaborative Mezzanine session. When the HandiPoint is in the active state, its holder can be sure that any action they take will succeed.

The inactive state indicates that someone else has the lock. This does not mean that action cannot be taken since lock acquisition is implicit. While inactive, the HandiPoint is inverted such that it has a black fill and a white stroke. In an alternative embodiment, a HandiPoint could be rendered inactive only when another site is actively engaging the lock through action(s) of its own. This approach removes absolute certainty that an action would succeed even if the HandiPoint were in the inactive state. However, it prevents the potential misunderstanding that the inactive HandiPoint implies that interaction should not be attempted at all, which would break the implicit acquisition model.

As depicted, the HandiPoint oscillates between two color schemes shown (both extremes are not quite the active or inactive colors). The pending state serves as an intermediary between the active and inactive states. When an action is initiated an an implicit request for the lock is made, the HandiPoint enters the pending state until the lock is acquired, the lock request is denied, or the action terminated by the participant. If the lock is acquired, the active state is entered. If the lock request is denied, in which case the inactive state is entered, and a snapback animation occurs. If the action is terminated by the participant, this also results in snapback if the lock hasn't yet been acquired.

Since the pending state provides a liminal space between active and inactive, so too does its visual representation. The HandiPoint pulses sinusoidally between the active and passive states during this time.

Presence Indicator

In the corner of the triptych the persistent presence indicator, which is described in another section, serves as a representation of the collaboration. It also provides an opportunity to visualize possession of the lock. At the very least, it can represent whether or not the lock is currently held locally. It can also, through animation such as—bounce, blink, scale, etc.—indicate a change in lock ownership, even if the lock merely passed between two remote Mezzanines in the collaboration.

In an embodiment, if the presence indicator expands to show a list of individual participants, it represents specifically which of those participants have the lock in that state.

Tweezers and Other UI Elements

Tweezers and other transient UI elements that appear help represent ongoing interaction also reflect the pending nature of those interactions as appropriate. To provide a consistent visual language, these elements match the visuals used for representing HandiPoints in the pending state. This is especially important as many interactions actually hide the HandiPoint itself.

Snapback

When a pending action fails due to denial of the lock, or because it was terminated prior to lock acquisition, the affected element of the UI snaps back to its original state (size, position, opacity, etc.). Likewise, any transient UI elements employed to help represent the action, which would thus be in the pending state, snap back and out of existence.

An alternative embodiment can attempt to re-request the lock while an action remains pending in order to increase the likelihood of its success. An action then is not cancelled upon a lock request denial.

In its design, the snapback animation purposefully and noticeably differs from other animations in Mezzanine to help convey the failure of the attempted action. In particular, it clearly differs from the animation employed to represent successful remote actions. An embodiment uses an elastic ease, causing the object to "bounce" back to its initial state instead of smoothly coming to rest there. This animation gives the impression of a rubber band that refuses to let go of the object being acted upon as a result of the remotely held lock.

Actions

All interactions with Mezzanine belong to categories including blocking and asynchronous. Blocking actions require possession of the lock. Asynchronous actions may occur at any time regardless of lock ownership, though their ordering must still be mediated by the locker. A third category is Queued actions, where a Blocking action triggers a lock request, is queued up instead of being processed, and is popped off the queue and re-evaluated when the response arrives. Additionally, Mezzanine must represent actions of remote users and changes in the state of the workspace on their behalf.

Blocking Actions

Blocking actions require possession of the lock. These actions on the deck, which are described in the deck section, include delete slide, reorder slide, and insert slide from paramus or hoboken. Blocking actions on the windshield, which are described in the windshield section, include move asset, scale asset, delete asset, and add asset. Blocking actions on paramus, described in the paramus section, include delete asset.

Asynchronous actions include upload asset to paramus, snapshots, corkboard add asset, corkboard remove asset.

Queued Actions

Generally, blocking actions that come from web and iOS clients are processed as queued actions. When an action protein that required the lock arrives in siemcy from a web or iOS client, siemcy will process normally if it has the lock. Otherwise, it puts the protein on a queue request the lock, and then reprocesses the protein when the response arrives. If the lock request was denied, an error protein will be sent to the client, otherwise the protein is processed as if it had just arrived and siemcy already has the lock. This approach is also used for two instantaneous native actions of opening a dossier and closing a dossier.

Remote Actions

When remote participants in a collaborative Mezzanine session complete actions (as supported in asynchronous actions, and/or blocking if they are the locker), these must be represented locally. Mezzanine attempts to provide as much context as possible regarding remote actions in order to increase the feeling of real-time collaboration, and to provide participants at a Mezzanine site without the lock a better understanding of when their actions may succeed, or would definitely fail.

At the same time, Mezzanine minimizes the number of simultaneous actions it needs to represent. Only remote actions performed by the locker are visualized on other Mezzanines. Any pending actions in progress by those without the lock are ignored in order to minimize confusion and avoid visualizing actions which fail.

To the extent possible, both the initiation and termination of actions are communicated to other Mezzanines. Ideally, some low-granularity information about intermediate states of an action, if it has any, are also communicated. For instance, the position of an object being moved on the Windshield may be transmitted a few times per second so that remote participants can see the object during the move.

In an alternative embodiment, a system visualizes HandiPoints in an out-of-band manner, and the initiation message indicates the provenance, such that the local Mezz can match the remote behavior accordingly. In any scenario, the result of a remote action upon its termination must be visualized at every site except the one that performed the action. This is done through use of a soft animated transition.

Heartbeats

Network outages may interrupt communication between two collaborating Mezzanines. A heart-beating protocol helps to ensure order in these situations. Heartbeats will detect Mezzanines that have dropped from the locker, detect when the lock holder drops (and pick a new locker), and detect when the network is fragmented (and disconnect the smaller and/or non-locking part). At the code level, the PaceMaker class implements heartbeats, which help the Banker class maintain order.

Pool Topology

Pools involved in locking include m2m-into-lock, m2m-from-lock, m2m-inbound-heartbeats, m2m-outbound-heartbeats, m2m-inbound-ephemera, m2m-outbound-ephemera, and wormhose-glow-pool. The pool m2m-into-lock is used by Banker for all lock sync and actions. The pool m2m-inbound-heartbeats is used by PaceMaker for heartbeats. The pool m2m-inbound-ephemera is used by Banker for low-priority fleeting actions. The pool wormhose-glow-pool is used by WormHose.

Ephemera

Ephemera are continuous m2m actions that do not inherently change the state of the collaboration. A primary example is a remote HandiPoint location, which is described in another section. These actions come from the locker mezz, but are transferred on separate pools because they do not directly change the lock state, can be skipped arbitrarily, and may be subject to various forms of bandwidth throttling.

A list of Ephemera includes Remote HandiPoints, Intermediate windshield item transforms. Ephemera also can include intermediate paramus add positioning (into deck and/or windshield) and intermediate slide move positioning.

The data path of ephera is:

1. locker Banker travail (rate control here)
2. ephemera-collection Bathyscaphe
3. HandiPoints, etc append their Proteins as a BathResponse
4. Loft finishes, and Banker wraps up ephemera sample into an outbound protein
5. WormHose transports inbound ephemera on other mezzes, and will rate limit/skip/etc as needed
6. remote Bankers unpack ephemera and loft each protein
7. classes receive ephemera protein The data rate is controlled at two places in the path. First in the Banker polling period, which is currently set to 25 ms, then in the ephemerally-behaving WormHose, which transfers one protein per 50-55 ms. With Banker travailing at 16 ms intervals, the actual polling interval will be either 16 ms or 33 ms, giving effective transfer intervals between 50 ms and 88 ms, prior to network latency/transfer time. So the remote visual experience could easily degrade to looms (10 FPS), and the animation may appear choppy/jerky (despite the location-move soft). However, the proteins will not go faster than 20 Hz, and data transfer rates seem to be limited to approximately 40-60 k/s (0.2 or 0.3 MBit/s).

To fine-tune these numbers, the WormHose interval should be used to balance the bandwidth usage against effective FPS. The Banker interval should probably be set to 0.5*wormhose_interval (Nyquist theorem, ignoring the travail interval complication), but could be used to balance local CPU and IO usage (Bathyscaphe/Plasma) against additional transfer delays.

Video Chat

An embodiment that includes M2M provides integrated audio/video chat within the native interface. This includes a set of widgets that may be instantiated with various video feeds, as well as solutions for muting audio and/or video.

Web Admin Collaboration

The MIP web admin interface is used to configure MIP m2m settings, which is described in another section. It can be accessed on the collaboration tab of the mezz web admin interface after installing the admin-web-mz-collaboration module inside the mezz-admin-web installation.

An admin configuring M2M engages in the following steps. Admin installs the full Mezzanine stack from scratch. Admin confirms that siemcy and mip are both running. Admin selects the admin page (http://mezz-name/admin) and then the Collaboration Tab. If the visit comprises the first, the fields Mezzanine name, company, and location each say "Unknown." Admin adds values for the 3 fields. "Mezzanine name" is a friendly name for the room; the name does not have to be unique. Company name and location are also expected to be human-friendly strings. The admin saves and waits for confirmation that the system accepts changes. An indicator informs the admin that changes are being applied if system is taking a perceptible amount of time.

After this sequence, which correctly configures a local mezz, the admin adds other Mezzanines. In the other Mezzanines textbox, admin enters the other Mezzanine's resolvable hostname or ip address. When the admin selects "add," the other mezzes pop up in the list below. Admin can click "remove" at any time to remove a Mezzanine from the list. Adding or removing Mezzanines affects whether those Mezzanines show up in the Dossier Portal. If an added mezz is is available and has mip running, its details appear in the admin app as well as the portal.

Wandless Control

Wandless Mezzanine systems do not require the use of optical or radio wand tracking systems, and are instead driven through the growing variety of supported clients.

To allow custom behaviors, wandless Mezzanines must declare themselves as such. The wand-support app-setting is set to none or omitted entirely for Mezzanines which do not support the use of either optical or ultrasonic wands. An embodiment detects support for wands (or lack thereof) at runtime by, for example, running a command to test for the existence of the pipeline or the perception appliance and the type of wands it supports.

Client Connections

Wandless Mezzanines are driven exclusively through clients—web, iOS, Android, etc.—which can be connected to the system when given the appropriate URL. Both the native interface and the individual client interfaces adapt in this scenario to aid users in connecting clients and engaging with Mezzanine.

No Clients Alert

Because the Mezzanine cannot be operated when no clients are connected, Mezzanine adapts when no clients are connected by displaying a message indicating how to connect one. When the last connected client disconnects (or upon first boot before any client has connected) a buttonless modal overlay appears. The overlay indicates clearly how to connect a client and get started with Mezzanine. The overlay dismisses automatically once any client successfully connects to Mezzanine. The message displayed comprises a summary and details. In an embodiment its summary reads "Connect to Mezzanine" and details reads "To participate, please connect your web browser or the Mezzanine app on your mobile device to: <url>." An embodiment also may include additional information such as the network to join in order to connect.

There is one notable exception to the above rules. Client connection feedback is not displayed while in a collaboration because a user may connect in order to initiate a collaboration but remain passive throughout its duration without the need to interact with the workspace. If no clients remain connected when the collaboration ends, the notice is then displayed.

Incoming collaboration requests appear on top of the connection screen. This allows those who know how to connect clients already to respond to incoming join requests that may be pending when they enter the room. Connecting a client to answer the call implicitly dismisses the no client overlay; if no client responds to the request, the no client overlay will remain when the request goes away due to cancellation or timeout.

Disconnected Client Behaviors

Clients will behave normally when not connected. They will display the connection interface as appropriate (non-web clients), and the most recently connected Mezzanine will be auto-populated or shown as the first item in the history/auto-suggestion menu. Additional information is provided in sections on individual clients. In an embodiment clients could automatically detect and connect to Mezzanines on the same network as the client.

Dialogs

Mezzanine displays a variety of modal dialogs. On a wandless Mezzanine, any controls provided to dismiss these dialogs will only be available via passforward, which provides a circuitous and potentially non-obvious means to do so. For this reason, a wandless Mezzanine will refrain from displaying some modal dialogs altogether in favor of transmitting state to the clients for display instead. Exceptions are confirmation dialogs, transient dialogs, and collaboration dialogs. Confirmation dialogs appear to confirm actions taken in the native interface. Since, on a wandless system, these actions may only be taken via passforward, it is safe to assume the user may easily respond to them in the same manner. On the other hand, the same actions when taken from a client interface will invoke confirmation dialogs on the client itself. Transient dialogs contain no buttons, have a short timeout interval, and as such appear transiently in the interface. Transient dialogs will still be shown since no user action is needed to dismiss them. Dialogs related to collaboration are still shown since all clients display corresponding alerts via separate protein transmissions, thus allowing dismissal of such dialogs directly via the client interface or through passforward. These dialogs are still shown in the native interface also to ensure that attention is drawn to them in a timely manner.

These exceptions leave only the one dialog of low storage alert to be omitted on wandless Mezzanines. The low storage notice continues to appear in the Portal, but the alert that would appear were the threshold to be crossed while in a dossier is omitted in favor of corresponding and transient notice that appears on individual clients.

An embodiment handles all cases, primarily for collaborations, in which dialogs are shown independently. An alternative supports a generic dialog forwarding scheme, which includes but is not limited to the following elements. Dialogs appear on all connected clients. The system would indicate modality requirements. Buttons would still appear on native dialogs since passforward can be used at all times. Any client may respond to the dialog; the first to reach native "wins." When multiple clients respond in a conflicting manner, the system represents outcomes. The system also takes down dialogs again, by id, when necessary, even if not responded to. Confirmation dialogs either would be initiated by action already on the client and are therefore local, or they are initiated via passforward, in which case passforward can be used to respond as well. Because of this, confirmation dialogs would never get passed to clients.

Pointing Methods

Passforward

Passforward is a top level feature of the web application. As such, passforward remains available at all times, even when a modal state is imposed for the remainder of the interface. For this reason, it is not necessary to remove buttons, dialogs, or other interactive elements from the native interface in a wandless scenario, as users may interact with them via passforward. This sustains consistency in the interface across Mezzanine installations, to limit any user confusion. Though passforward remains available at all times in the web app, the web app is the only client which provides passforward functionality. Without a web client connected to a wandless Mezzanine, some interactive elements will remain unavailable and reachthrough will not be supported.

An alternative embodiment disables Reachthrough since it only can be used via passforward. Another alternative embodiment adds Reachthrough support to other touch-enabled clients such as the iPad.

Pointing App(s)

An alternative embodiment supports a Pointer app for iOS and Android devices, allowing wand-like control of the interface. It provides support in native event-handling semantics, due to the discrepancies between these relative pointing devices and the absolute behavior of the wands.

Administration

To support wandless Mezzanines, an embodiment deploys changes in the base install and the corresponding administration tools. In particular, the perception package that enables wand tracking will not be installed, and the wands tab will be omitted from the web admin interface.

Low Storage Mode

Mezzanine may not operate as expected when the available disk storage reaches particularly low levels. A low storage mode is entered when this situation is encountered to notify participants and prevent certain interactions which could exacerbate the problem by writing even more data to disk.

Entering Low Storage Mode

Low storage mode is entered when the available disk space crosses below the minimum threshold defined by min-free-disk-space, which is described in a section on app settings. This check is not continuous, but gets triggered by a handful of events such as opening or closing a dossier, creating or duplicating dossiers, taking snapshots, capturing from the whiteboard, or uploading assets and slides.

An additional approaching-low-disk-space threshold, described in a section on app settings, is also configured. When available storage drops below this more generous threshold, Mezzanine attempts to reclaim additional space by performing garbage collection through the deletion of assets which no longer belong to any extant dossiers.

Exiting Low Storage Mode

Mezzanine checks the storage status when any of the above actions which cause the mode to be entered occur. Additionally, the deletion of a dossier triggers an immediate storage check. If the available storage rises above the minimum value the low storage notice disappears, the create and duplicate buttons become enabled, and any other features affected return to their normal operational state. Additionally, the low storage alert is implicitly dismissed if it remains displayed.

Low Storage Notice

The low storage notice manifests in different forms depending on the context in which the mode is entered. An embodiment sends an email or other notification to a system administrator when entering low storage mode.

Low Storage Banner

The deletion of dossiers serves as the primary means by which users of Mezzanine can reduce storage consumption. Additionally, the creation and duplication of dossiers is suspended and the corresponding buttons in the portal disabled. A low storage notice appears in the portal when Mezzanine's remaining storage space reaches a critically low level. The low storage banner replaces the create and duplicate buttons. It reads: "Low storage! Please delete some dossiers." To garner attention the banner background is red (209, 48, 54) with a dark gray (39, 39, 49) border and white (255) text. Though only visible in the portal, the banner persists as storage remains low inform users of how to correct the problem.

The list appearance remains the same in single-feld scenarios. The notice remains visible even when viewing the Mezzanine list. The Mezzanine list also displays additional information when in low storage mode and not in collaboration. The main notice still appears when entering low storage mode while in collaboration, but the collaboration area remains visible until the collaboration ends, at which point the Mezzanine list notice appears as well.

Low Storage Alert

If a dossier is open (or opening) when entering low storage mode, a modal alert appears to let everyone know about the situation, and informing them that some features will not be available until they free additional space. Users may dismiss this alert, which does not reappear until the next time low storage mode is entered. The alert is also dismissed implicitly if the situation is corrected before it has been dismissed explicitly by a user.

In an embodiment this alert can appear intermittently, such as every two hours until the situation is remedied. The low storage alert is not show in wandless Mezzanine systems.

Prohibited Interactions

Mezzanine limits some interactions while in low storage mode to avoid writing substantial amounts of additional data to the disk, exacerbating the issue. When possible, Mezzanine also offers inline feedback explaining these limitations, though not all interactions lend themselves to such feedback. No restriction is placed on the opening of dossiers, allowing the inspection of their contents prior to their potential deletion.

A list of prohibited interactions includes creating new dossiers, duplicating dossiers, entering a collaboration, whiteboard capture, snapshotting, uploads and downloads, and asset transfers.

New dossiers may not be created via the native interface or clients. The "create new dossier" button in the portal is disabled in this mode. Web clients display an error message on attempt. Dossiers may not be duplicated via the native interface or clients. The "duplicate dossier" button in the portal is disabled in this mode. Web clients display an error message on attempt.

Collaboration is not supported in this mode since it could result in the creation of new dossiers and the transfer of new assets. The Mezzanine list is hidden (though only after a collaboration has ended, if there is one) and replaced with a text message in this mode. Incoming join requests are automatically declined. The message reads: "Collaboration is not available because Mezzanine is almost out of storage space." This message is shown in white (180) text and sits against a buffed background region with a background color of (39, 39, 49) and stroke color of (209, 48, 54).

The Whiteboard cannot be captured in this mode. No error feedback is currently provided for this action in the native UI. Web clients display an error message on attempt. Snapshots may not be taken in this mode. The snapshot marquee displays a label indicating that Mezzanine is low on storage, which reads: "Cannot snapshot! No space available." Uploads aren not supported because the newly uploaded files would require additional space; downloads are not supported because the preparation of an archive to download would also require additional space. Clients display an error message to this effect. Incoming asset transfers are prevented, and placeholders are displayed for any new assets created by a remote collaborator.

If low storage mode is hit while in a collaboration, remote Mezzanines may create and/or open other dossiers but the Mezzanine that is out of storage will not receive any assets from them. It will continue to use a small amount of disk space for each additional dossier opened; however, the system is not vulnerable because of its relatively large "minimum-disk-space" setting.

Client Error Messages

A number of client features will not work as expected due to the interaction limitations that low storage mode imposes. These features include create new dossier, duplicate dossier, upload dossier, download dossier, asset upload, asset download, deck download, whiteboard capture, and start collaboration. In these circumstances the native interface sends an appropriate error message for the clients to display.

Error messages are shown on clients when attempting to perform prohibited actions, such as creating or duplicating dossiers, while in low storage mode. An embodiment instead disables controls that are unavailable. An embodiment also displays a persistent storage notice on clients as well as the native UI when in this mode.

FIGS. 211-216 show Mezzanine web client presentation mode operations, under an embodiment FIG. 211 shows web client presentation mode entry operations, under an embodiment.

FIG. 212 shows web client presentation mode slide advance operations, under an embodiment.

FIG. 213 shows web client presentation mode slide retreat operations, under an embodiment.

FIG. 214 shows web client presentation mode toggle pushback operations, under an embodiment.

FIG. 215 shows web client presentation mode pointer pass forward operations, under an embodiment.

FIG. 216 shows web client presentation mode exit operations, under an embodiment.

FIGS. 217-252 show Mezzanine web client build mode operations, under an embodiment FIG. 217 shows web client build mode highlight element operations, under an embodiment.

FIGS. 218A and 218B show web client build mode move element operations, under an embodiment.

FIGS. 219A and 219B show web client build mode scale element operations, under an embodiment.

FIG. 220 shows web client build mode summon context card for element operations, under an embodiment.

FIG. 221 shows web client build mode full feld element operations, under an embodiment.

FIG. 222 shows web client build mode delete element operations, under an embodiment.

FIG. 223 shows web client build mode duplicate element operations, under an embodiment.

FIGS. 224A and 224B show web client build mode adjust element ordering operations, under an embodiment.

FIGS. 225A and 225B show web client build mode grab on-slide pixel operations, under an embodiment.

FIG. 226 shows web client build mode adjust element transparency operations, under an embodiment.

FIG. 227 shows web client build mode adjust element color operations, under an embodiment.

FIG. 228 shows web client build mode reveal asset browser operations, under an embodiment.

FIG. 229 shows web client build mode reveal more asset browser operations, under an embodiment.

FIGS. 230A and 230B show web client build mode upload new asset operations, under an embodiment.

FIG. 231 shows web client build mode reveal deck and video browser operations, under an embodiment.

FIG. 232 shows web client build mode reveal more deck and video browser operations, under an embodiment.

FIGS. 233A and 233B show web client build mode zoom slide viewer area operations, under an embodiment.

FIG. 234 shows web client build mode inspect asset in asset browser operations, under an embodiment.

FIG. 235 shows web client build mode insert asset into slide operations, under an embodiment.

FIG. 236 shows web client build mode insert input into slide operations, under an embodiment.

FIG. 237 shows web client build mode enter slide mode operations, under an embodiment.

FIG. 238 shows web client build mode reorder deck operations, under an embodiment.

FIG. 239 shows web client build mode scroll deck operations, under an embodiment.

FIG. 240 shows web client build mode jump to slide operations, under an embodiment.

FIG. 241 shows web client build mode delete slide operations, under an embodiment.

FIG. 242 shows web client build mode duplicate slide operations, under an embodiment.

FIG. 243 shows web client build mode insert blank slide operations, under an embodiment.

FIG. 244 shows web client build mode browse other deck operations, under an embodiment.

FIG. 245 shows web client build mode swap current deck with other operations, under an embodiment.

FIG. 246 shows web client build mode conflict resolution operations, under an embodiment.

FIG. 247 shows web client build mode move slide between decks operations, under an embodiment.

FIG. 248 shows web client build mode session ending operations, under an embodiment.

FIG. 249 shows web client build mode session download slide operations, under an embodiment.

FIG. 250 shows web client build mode session share view operations, under an embodiment.

FIG. 251 shows web client build mode session sync view operations, under an embodiment.

FIG. 252 shows web client build mode session pass forward operations, under an embodiment.

Embodiments described herein include a system comprising a processor coupled to a plurality of display devices. The system comprises a plurality of remote client devices coupled to the processor. The system comprises a plurality of applications coupled to the processor. The plurality of applications orchestrate content of the plurality of remote client devices simultaneously across at least one of the plurality of display devices and the plurality of remote client devices, and allow simultaneous control of the plurality of display devices. The simultaneous control comprises automatically detecting a gesture of at least one object from gesture data received at the processor. The detecting comprises identifying the gesture and translating the gesture to a gesture signal. The system controls the plurality of display devices in response to the gesture signal.

Embodiments described herein include a system comprising a processor coupled to a plurality of display devices, a plurality of remote client devices coupled to the processor, and a plurality of applications coupled to the processor, wherein the plurality of applications orchestrate content of the plurality of remote client devices simultaneously across at least one of the plurality of display devices and the plurality of remote client devices, and allow simultaneous control of the plurality of display devices, wherein the simultaneous control comprises automatically detecting a gesture of at least one object from gesture data received at the processor, the detecting comprising identifying the gesture and translating the gesture to a gesture signal, and controlling the plurality of display devices in response to the gesture signal.

Embodiments described herein include a system comprising a processor coupled to a plurality of display devices and a plurality of sensors. The system includes a plurality of remote client devices coupled to the processor. The system includes a plurality of applications coupled to the processor. The plurality of applications orchestrate content of the plurality of remote client devices simultaneously across at least one of the plurality of display devices and the plurality of remote client devices, and allow simultaneous control of the plurality of display devices. The simultaneous control comprises automatically detecting a gesture of at least one object from gesture data received via the plurality of sensors. The gesture data is absolute three-space location data of an instantaneous state of the at least one object at a point in time and space. The detecting comprises aggregating the gesture data, and identifying the gesture using only the gesture data. The plurality of applications translate the gesture to a gesture signal, and control at least one of the plurality of display devices and the plurality of remote client devices in response to the gesture signal.

Embodiments described herein includes a system comprising: a processor coupled to a plurality of display devices and a plurality of sensors; a plurality of remote client devices coupled to the processor; and a plurality of applications coupled to the processor, wherein the plurality of applications orchestrate content of the plurality of remote client devices simultaneously across at least one of the plurality of display devices and the plurality of remote client devices, and allow simultaneous control of the plurality of display devices, wherein the simultaneous control comprises automatically detecting a gesture of at least one object from gesture data received via the plurality of sensors, wherein the gesture data is absolute three-space location data of an instantaneous state of the at least one object at a point in time and space, the detecting comprising aggregating the gesture data, and identifying the gesture using only the gesture data, the plurality of applications translating the gesture to a gesture signal, and controlling at least one of the plurality of display devices and the plurality of remote client devices in response to the gesture signal.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the processing environment is not intended to be exhaustive or to limit the systems and methods described to the precise form disclosed. While specific embodiments of, and examples for, the processing environment are described herein for illustrative purposes, various equivalent modifications are possible within the scope of other systems and methods, as those skilled in the relevant art will recognize. The teachings of the processing environment provided herein can be applied to other processing systems and methods, not only for the systems and methods described above.

The elements and acts of the various embodiments described above can be combined to provide further embodiments. These and other changes can be made to the processing environment in light of the above detailed description.

What is claimed is:

1. A system comprising:

a multi-user collaboration server constructed to control at least one display device to display content of at least a first collaboration session that includes content streams received from a plurality of remote client devices;

a plurality of wands; and a tracking system;

wherein the collaboration server is constructed to receive three-dimensional position and orientation information for each of the plurality of wands by using the tracking system, and wherein the collaboration server is constructed to control the at least one display device to update display of at least one displayed first object of the first collaboration session based on a change in at least one of position and orientation of a first wand that is aimed at the displayed first object, as determined by the tracking system.

2. The system of claim 1, wherein the collaboration server is constructed to receive a plurality of content streams from a first remote client device of the plurality of remote client devices.

3. The system of claim 1, wherein the collaboration server is constructed to:

control at least one display device to display content of a second collaboration session that includes content streams received from a second plurality of remote client devices, receive three-dimensional position and orientation information for each of a second plurality of wands, and control the at least one display device to update display of at least one displayed second object of the second collaboration session based on a change in at least one of position and orientation of a wand of the second plurality of wands that is aimed at the displayed second object.

4. The system of claim 1, wherein the first object is a video stream object.

5. The system of claim 2, wherein the collaboration server is constructed to update at least one of a display size of the video stream object and a display location of the video stream object.

6. The system of claim 1, wherein the first object is one of a plurality of objects included in a content stream received from one of the plurality of remote client devices.

7. The system of claim 6, wherein the collaboration server is constructed to update at least one of a display size of the first object, a display location of the first object, and an appearance of the first object.

8. The system of claim 1, wherein the at least one display device includes a display device of the collaboration server.

9. The system of claim 8, wherein the at least one display device further includes a display device of a first remote client device of the plurality of remote client devices that provides content streams included in the first collaboration session, and wherein the collaboration server is constructed to simultaneously update display of the at least one displayed first object at the display device of the collaboration server and the display device of the first remote client device.

10. A method comprising: with a multi-user collaboration server:

controlling at least one display device to display content of at least a first collaboration session that includes content streams received from a plurality of remote client devices;

receiving three-dimensional position and orientation information for each of a plurality of wands by using a tracking system;

controlling the at least one display device to update display of at least one displayed first object of the first collaboration session based on a change in at least one of position and orientation of a first wand that is aimed at the displayed first object, as determined by a tracking system.

11. The method of claim 10, further comprising: with the collaboration server, receiving a plurality of content streams from a first remote client device of the plurality of remote client devices.

12. The method of claim 10, further comprising with the collaboration server:

controlling at least one display device to display content of a second collaboration session that includes content streams received from a second plurality of remote client devices;

receiving three-dimensional position and orientation information for each of a second plurality of wands; and controlling the at least one display device to update display of at least one displayed second object of the second collaboration session based on a change in at least one of position and orientation of a wand of the second plurality of wands that is aimed at the displayed second object.

13. The method of claim 10, wherein the first object is a video stream object.

14. The method of claim 11, wherein controlling the at least one display device to update display of at least one displayed first object comprises at least one of updating a display size of the video stream object and updating a display location of the video stream object.

15. The method of claim 10, wherein the first object is one of a plurality of objects included in a content stream received from one of the plurality of remote client devices.

16. The method of claim 15, wherein controlling the at least one display device to update display of at least one displayed first object comprises at least one of updating a display size of the first object, updating a display location of the first object, and updating an appearance of the first object.

17. The method of claim 10, wherein the at least one display device includes a display device of the collaboration server.

18. The method of claim 17, wherein the at least one display device further includes a display device of a first remote client device of the plurality of remote client devices that provides content streams included in the first collaboration session, and wherein updating display of the at least one displayed first object comprises simultaneously updating display of the at least one displayed first object at the display device of the collaboration server and the display device of the first remote client device.

19. The method of claim 10, further comprising with the collaboration server:

controlling at least one display device to display content of a second collaboration session that includes content streams received from a second plurality of remote client devices;

receiving three-dimensional position and orientation information for each of a second plurality of wands; and controlling the at least one display device to update display of at least one displayed second object of the second collaboration session based on a change in at least one of position and orientation of a wand of the second plurality of wands that is aimed at the displayed second object, wherein the collaboration server receives a first content stream for the first collaboration session and a second content stream for the second collaboration session from a remote client device included in the second plurality of remote client devices.

20. The method of claim 10, further comprising: with the collaboration server, controlling a display device of the collaboration server to display a unique pointer for at least one wand.

* * * * *